US012769803B2

(12) United States Patent
Kol et al.

(10) Patent No.: US 12,769,803 B2
(45) Date of Patent: Oct. 20, 2026

(54) EMULATING WEB BROWSER IN A DEDICATED INTERMEDIARY BOX

(71) Applicant: BRIGHT DATA LTD., Netanya (IL)

(72) Inventors: Ron Kol, Modi'in (IL); Or Lenchner, Ra'anana (IL)

(73) Assignee: BRIGHT DATA LTD., Netanya (IL)

( * ) Notice: Subject to any disclaimer, the term of this patent is extended or adjusted under 35 U.S.C. 154(b) by 0 days.

(21) Appl. No.: 18/628,739

(22) Filed: Apr. 7, 2024

(65) Prior Publication Data

US 2024/0273157 A1 Aug. 15, 2024

Related U.S. Application Data

(63) Continuation of application No. 18/211,338, filed on Jun. 19, 2023, which is a continuation of application No. PCT/IL2022/050746, filed on Jul. 11, 2022.
(Continued)

(51) Int. Cl.

*G06F 16/955* (2019.01)
*G06F 9/455* (2018.01)
*G06F 16/957* (2019.01)

(52) U.S. Cl.

CPC .......... *G06F 16/955* (2019.01); *G06F 9/4555* (2013.01); *G06F 16/9566* (2019.01); *G06F 16/957* (2019.01); *G06F 16/9574* (2019.01)

(58) Field of Classification Search

CPC .. G06F 16/955; G06F 9/4555; G06F 16/9566; G06F 16/957; G06F 16/9574;
(Continued)

(56) References Cited

U.S. PATENT DOCUMENTS

| | | | |
|---|---|---|---|
| 3,962,539 | A | 6/1976 | Ehrsam et al. |
| 4,243,631 | A | 1/1981 | Ryerson |

(Continued)

FOREIGN PATENT DOCUMENTS

| | | | |
|---|---|---|---|
| CA | 2328548 | A1 | 6/2002 |
| CA | 2353623 | A1 | 1/2003 |

(Continued)

OTHER PUBLICATIONS

"Keep Alive"—Imperva, 2019 https://www.imperva.com/learn/performance/keep-alive (2019) (3 pages).

(Continued)

*Primary Examiner* — Abdulkader M Alriyashi
(74) *Attorney, Agent, or Firm* — May Patents Ltd. c/o Dorit Shem-Tov

(57) ABSTRACT

Anonymity and privacy of a client device that fetches a content from a web server are improved by using an intermediate device located along the communication path between the client device and the web server. The primary or exclusive function of the intermediate device may be to serve as an intermediate device, and may be implemented as a stand-alone dedicated client device located at a residential premises, or may be integrated with another device, such as a router or a sensor unit, and may communicate using wired communication (such as LAN) or wireless communication (such as WLAN). The intermediate device may modify a content request from the client device in order to avoid identification or blocking by a web server that uses web tracking, such as fingerprinting. The modification may use a web browser, such as a headless browser, for emulating a different device or user.

103 Claims, 99 Drawing Sheets

Related U.S. Application Data

(60) Provisional application No. 63/225,577, filed on Jul. 26, 2021, provisional application No. 63/291,512, filed on Dec. 20, 2021, provisional application No. 63/318,788, filed on Mar. 11, 2022.

(58) Field of Classification Search
CPC ....... G06F 16/958; G06F 9/455; H04L 67/56; H04L 67/59; H04L 63/0272; H04L 63/029; H04L 63/0876; H04L 63/0227; H04L 67/02
See application file for complete search history.

(56) References Cited

U.S. PATENT DOCUMENTS 4,347,827 A 9/1982 Lo Cascio
4,405,829 A 9/1983 Rivest et al.
4,853,884 A 8/1989 Brown et al.
4,855,894 A 8/1989 Asahi
4,905,176 A 2/1990 Schulz
5,105,087 A 4/1992 Jagielinski
5,511,547 A 4/1996 Markle
5,519,693 A 5/1996 Galuszka
5,577,243 A 11/1996 Sherwood et al.
5,578,755 A 11/1996 Offenberg
5,734,829 A 3/1998 Robinson
5,826,014 A 10/1998 Coley
5,933,604 A 8/1999 Inakoshi
5,961,593 A 10/1999 Gabber et al.
5,962,786 A 10/1999 Le Traon et al.
5,974,566 A 10/1999 Ault
6,009,455 A 12/1999 Doyle
6,012,083 A 1/2000 Savitzky
6,012,090 A 1/2000 Chung
6,085,193 A 7/2000 Malkin
6,134,584 A 10/2000 Chang
6,154,782 A 11/2000 Kawaguchi
6,185,625 B1 2/2001 Tso
6,236,652 B1 5/2001 Preston et al.
6,240,444 B1 5/2001 Fin
6,266,704 B1 7/2001 Reed
6,311,216 B1 10/2001 Smith
6,345,303 B1 2/2002 Knauerhase et al.
6,351,775 B1 2/2002 Yu
6,356,934 B1 3/2002 Delph
6,389,422 B1 5/2002 Doi
6,389,462 B1 5/2002 Cohen et al.
6,397,259 B1 5/2002 Lincke et al.
6,412,008 B1 6/2002 Fields et al.
6,421,733 B1 7/2002 Tso
6,449,640 B1 9/2002 Haverstock
6,452,499 B1 9/2002 Runge et al.
6,477,581 B1 11/2002 Carpenter et al.
6,484,149 B1 11/2002 Jammes et al.
6,513,061 B1 1/2003 Ebata et al.
6,519,693 B1 2/2003 Debey
6,578,066 B1 6/2003 Logan et al.
6,601,098 B1 7/2003 Case et al.
6,658,463 B1 12/2003 Dillon et al.
6,661,799 B1 12/2003 Molitor
6,665,658 B1 12/2003 DaCosta et al.
6,665,715 B1 12/2003 Houri
6,670,212 B2 12/2003 McNie et al.
6,687,732 B1 2/2004 Bector
6,694,316 B1 2/2004 Langseth et al.
6,701,374 B2 3/2004 Gupta et al.
6,747,258 B2 6/2004 Benz et al.
6,785,705 B1 8/2004 Kocherlakota
6,792,461 B1 9/2004 Hericourt
6,795,848 B1 9/2004 Border et al.
6,820,133 B1 11/2004 Grove
6,829,638 B1 12/2004 McBrearty
6,842,463 B1 1/2005 Drwiega
6,868,453 B1 3/2005 Watanabe
6,895,011 B1 5/2005 Lassers
6,934,426 B2 8/2005 Rich et al.
6,941,562 B2 9/2005 Gao et al.
6,961,783 B1 11/2005 Cook
6,961,873 B2 11/2005 Dubovsky
6,967,565 B2 11/2005 Lingemann
6,970,913 B1 11/2005 Albert et al.
6,988,100 B2 1/2006 Jackson et al.
6,996,387 B2 2/2006 Chan
7,007,228 B1 2/2006 Carro
7,010,050 B2 3/2006 Maryanka
7,010,526 B2 3/2006 Denesuk et al.
7,020,667 B2 3/2006 Guest et al.
7,020,700 B1 3/2006 Bennett et al.
7,027,418 B2 4/2006 Gan et al.
7,047,315 B1 5/2006 Srivastava
7,080,158 B1 7/2006 Squire
7,091,876 B2 8/2006 Steger
7,099,927 B2 8/2006 Cudd et al.
7,120,666 B2 10/2006 McCanne et al.
7,124,157 B2 10/2006 Ikake
7,136,482 B2 11/2006 Wille
7,139,276 B1 11/2006 Sitaraman et al.
7,139,557 B2 11/2006 Tang et al.
7,139,579 B2 11/2006 Hatano
7,139,747 B1 11/2006 Najork
7,145,933 B1 12/2006 Szajnowski
7,159,234 B1 1/2007 Murphy et al.
7,162,539 B2 1/2007 Garcia-Luna-Aceves et al.
7,203,741 B2 4/2007 Marco et al.
7,213,061 B1 5/2007 Hite et al.
7,234,059 B1 6/2007 Beaver
7,240,100 B1 7/2007 Wein et al.
7,246,272 B2 7/2007 Cabezas
7,254,636 B1 8/2007 O'Toole, Jr. et al.
7,256,466 B2 8/2007 Lieber et al.
7,257,634 B2 8/2007 Colby et al.
7,308,643 B1 12/2007 Zhu et al.
7,326,866 B2 2/2008 Whitmore et al.
7,334,001 B2 2/2008 Eichstaedt et al.
7,353,279 B2 4/2008 Durvasula et al.
7,381,366 B2 6/2008 Carter
7,401,115 B1 7/2008 Arsenault
7,440,994 B2 10/2008 Harrow et al.
7,464,123 B2 12/2008 Croker
7,479,949 B2 1/2009 Jobs et al.
7,536,445 B2 5/2009 Kinoshita
7,543,018 B2 6/2009 Appelman
7,546,370 B1 6/2009 Acharya et al.
7,557,689 B2 7/2009 Seddigh et al.
7,558,854 B2 7/2009 Nakahara et al.
7,562,112 B2 7/2009 Harrow et al.
7,565,450 B2 7/2009 Garcia-Luna-Aceves et al.
7,574,515 B2 8/2009 Fontijn et al.
7,603,710 B2 10/2009 Harvey et al.
7,605,714 B2 10/2009 Thompson et al.
7,617,729 B2 11/2009 Axelrod et al.
7,620,703 B1 11/2009 Shteyn
7,624,184 B1 11/2009 Aviani et al.
7,639,682 B2 12/2009 Suzuki et al.
7,640,580 B1 12/2009 Plotnikov et al.
7,653,573 B2 1/2010 Hayes, Jr. et al.
7,664,125 B1 2/2010 Bauer et al.
7,673,048 B1 3/2010 O'toole et al.
7,702,784 B2 4/2010 Berstis
7,706,362 B1 4/2010 Senthilnathan
7,716,985 B2 5/2010 Zhang et al.
7,719,971 B1 5/2010 Issa
7,734,777 B2 6/2010 Raja
7,742,485 B2 6/2010 Zhang
7,751,628 B1 7/2010 Reisman
7,761,500 B1 7/2010 Wei et al.
7,774,155 B2 8/2010 Sato et al.
7,783,777 B1 8/2010 Pabla et al.
7,788,378 B2 8/2010 Rao et al.
7,801,824 B1 9/2010 Bryar
7,805,517 B2 9/2010 Shim
7,818,430 B2 10/2010 Zuckerman
7,831,720 B1 11/2010 Noureddine
7,840,660 B1 11/2010 Johnston et al.

(56) References Cited

U.S. PATENT DOCUMENTS 7,843,336 B2 11/2010 Kucharyson
7,853,472 B2 12/2010 Al-Abdulqader
7,853,795 B2 12/2010 Dick et al.
7,860,988 B2 12/2010 Aoki et al.
7,865,585 B2 1/2011 Samuels
7,877,511 B1 1/2011 Berger
7,886,050 B2 2/2011 Raja et al.
7,890,547 B2 2/2011 Hotti
7,890,624 B2 2/2011 Bivens
7,892,876 B2 2/2011 Mehregany
7,894,431 B2 2/2011 Goring
7,917,755 B1 3/2011 Giliyaru
7,929,429 B2 4/2011 Bornstein
7,929,535 B2 4/2011 Chen et al.
7,984,110 B1 7/2011 Raman
8,014,292 B1 9/2011 Breau et al.
8,041,784 B1 10/2011 Amidon
8,078,601 B1 12/2011 Egnor et al.
8,108,554 B1 1/2012 Masters
8,115,646 B2 2/2012 Tanielian et al.
8,135,912 B2 3/2012 Shribman et al.
8,144,611 B2 3/2012 Agarwal
8,156,275 B2 4/2012 de Cesare
8,156,441 B1 4/2012 Bihari et al.
8,190,593 B1 5/2012 Dean
8,285,808 B1 10/2012 Joel et al.
8,301,787 B2 10/2012 Li
8,302,161 B2 10/2012 Burch et al.
8,306,022 B1 11/2012 Cranor
8,307,089 B1 11/2012 Rothschild
8,312,075 B1 11/2012 Makinson et al.
8,347,405 B2 1/2013 Backhouse
8,375,434 B2 2/2013 Cottrell
8,453,227 B2 5/2013 Aiello
8,458,786 B1 6/2013 Kailash
8,464,350 B2 6/2013 Kanevsky
8,473,593 B1 6/2013 Graham et al.
8,479,251 B2 7/2013 Feinleib et al.
8,490,059 B2 7/2013 Huang et al.
8,499,059 B2 7/2013 Stoyanov
8,504,723 B2 8/2013 Kohli
8,508,472 B1 8/2013 Wieder
8,514,812 B2 8/2013 Tang et al.
8,516,084 B1 8/2013 Grieve
8,527,631 B1 9/2013 Liang
8,527,635 B2 9/2013 Jeon et al.
8,527,639 B1 9/2013 Liskov et al.
8,533,628 B2 9/2013 Rohrabaugh
8,543,721 B2 9/2013 White et al.
8,560,604 B2 10/2013 Shribman et al.
8,566,452 B1 10/2013 Goodwin, III et al.
8,577,724 B1 11/2013 Gandhi
8,595,786 B2 11/2013 Choi
8,612,641 B1 12/2013 Bozarth et al.
8,627,422 B2 1/2014 Hawkes
8,639,630 B2 1/2014 Fomenko et al.
8,639,748 B2 1/2014 Kazerani et al.
8,655,838 B2 2/2014 Wright
8,655,985 B2 2/2014 De
8,671,221 B2 3/2014 Shribman et al.
8,676,783 B1 3/2014 Fedorynski et al.
8,680,906 B1 3/2014 McDonald et al.
8,719,430 B2 5/2014 Van Ackere et al.
8,719,505 B2 5/2014 Shribman et al.
8,788,316 B1 7/2014 Karnik et al.
8,793,347 B2 7/2014 Chow et al.
8,832,179 B2 9/2014 Owen et al.
8,832,260 B2 9/2014 Raja et al.
8,838,811 B2 9/2014 Chen et al.
8,874,594 B2 10/2014 Want et al.
8,934,947 B2 1/2015 Aerrabotu
8,935,418 B2 1/2015 Knouse et al.
8,935,798 B1 1/2015 Smith
8,948,832 B2 2/2015 Hong et al.
8,957,988 B2 2/2015 Wexler et al.
8,972,602 B2 3/2015 Mithyantha
8,977,621 B1 3/2015 Paiz
8,990,357 B2 3/2015 Graham-Cumming
8,996,856 B2 3/2015 Amit
9,015,335 B1 4/2015 Gigliotti
9,049,247 B2 6/2015 Holloway
9,059,938 B1 6/2015 Strand
9,060,031 B1 6/2015 Taylor et al.
9,071,668 B2 6/2015 Brueck et al.
9,100,320 B2 8/2015 Hsy
9,122,554 B2 9/2015 Callaghan et al.
9,148,467 B1 9/2015 Colton et al.
9,154,557 B2 10/2015 Lev-Ran
9,177,157 B2 11/2015 Binder
9,201,808 B2 12/2015 Shribman et al.
9,203,931 B1 12/2015 Ngo et al.
9,210,094 B1 12/2015 Warren et al.
9,237,210 B2 1/2016 Liu
9,241,044 B2 1/2016 Shribman et al.
9,244,682 B2 1/2016 Rowles et al.
9,253,164 B2 2/2016 Gouge
9,298,843 B1 3/2016 Jenkins et al.
9,313,100 B1 4/2016 Jenkins
9,350,796 B2 5/2016 Denoual et al.
9,363,237 B2 6/2016 Harada et al.
9,374,244 B1 6/2016 Reed
9,378,473 B2 6/2016 Wolfe
9,380,028 B2 6/2016 Rizzo
9,380,523 B1 6/2016 Mijar
9,418,243 B2 8/2016 Bauer
9,438,564 B1 9/2016 Weng et al.
9,444,903 B2 9/2016 Nuaimi
9,497,136 B1 11/2016 Ramarao et al.
9,503,498 B2 11/2016 Burckart et al.
9,503,540 B2 11/2016 Athas et al.
9,516,091 B2 12/2016 Burckart et al.
9,529,911 B2 12/2016 Richard et al.
9,584,529 B2 2/2017 Su
9,634,994 B2 4/2017 Prince
9,635,041 B1 * 4/2017 Warman .................. G06F 21/55
9,654,581 B2 5/2017 Pollack et al.
9,660,895 B1 5/2017 Bennett
9,673,996 B1 6/2017 Upadhyay et al.
9,705,959 B1 7/2017 Strand
9,712,887 B2 7/2017 Myers et al.
9,742,866 B2 8/2017 Shribman
9,769,030 B1 9/2017 Ramalingam et al.
9,769,121 B2 9/2017 Joy et al.
9,838,497 B2 12/2017 Lawrence
9,860,688 B2 1/2018 Kulkarni et al.
9,866,655 B2 1/2018 Steiner et al.
9,880,881 B1 1/2018 Perez et al.
9,935,958 B2 4/2018 Mizhar
9,942,349 B2 4/2018 Johannsen
9,979,674 B1 5/2018 Kumar
9,979,717 B2 5/2018 Whiteside et al.
9,984,365 B2 5/2018 Desai et al.
9,990,295 B2 6/2018 Shribman et al.
9,990,422 B2 6/2018 Chang
9,995,586 B2 6/2018 Geelen
10,069,852 B2 9/2018 Turgeman et al.
10,104,165 B1 10/2018 Killian
10,110,606 B2 10/2018 Mizhar
10,148,735 B1 12/2018 Kolam
10,182,466 B2 1/2019 Nirantar
10,198,408 B1 2/2019 Commisso
10,277,711 B2 4/2019 Shribman
10,339,198 B2 7/2019 Comstock et al.
10,348,851 B1 7/2019 Cheung et al.
10,361,911 B2 7/2019 Brandwine
10,375,192 B1 8/2019 Lepeska
10,404,791 B2 9/2019 Puri
10,410,244 B2 9/2019 Toval
10,432,576 B2 10/2019 Kennedy
10,484,337 B2 11/2019 Subbarayan
10,484,510 B2 11/2019 Shribman
10,511,630 B1 12/2019 Weiss et al.
10,554,706 B1 2/2020 Good
10,560,509 B2 2/2020 Lo

(56) References Cited

U.S. PATENT DOCUMENTS 10,594,660 B2 3/2020 Smith
10,601,948 B1 3/2020 Juravicius
10,601,984 B2 3/2020 Olligschlaeger
10,609,091 B2 3/2020 Hong et al.
10,630,771 B1 4/2020 Garza et al.
10,637,956 B1 4/2020 Juravicius et al.
10,642,738 B1 5/2020 Parakh et al.
10,645,654 B1 5/2020 Backholm
10,650,166 B1 5/2020 Sundberg
10,652,357 B2 5/2020 Shribman et al.
10,671,439 B1 6/2020 Frandzel et al.
10,735,322 B2 8/2020 Alstad et al.
10,743,051 B1 8/2020 Reed
10,749,893 B1 8/2020 Dahlberg
10,771,524 B1 9/2020 Long
10,798,209 B1 10/2020 Juravicius et al.
10,805,181 B2 10/2020 Boutros et al.
10,826,931 B1 11/2020 Quan et al.
10,873,647 B1 12/2020 Pilkauskas et al.
10,880,266 B1 12/2020 Shribman et al.
10,887,313 B2 1/2021 Mitevski
10,963,531 B2 3/2021 Shribman et al.
10,965,770 B1 3/2021 Vilcinskas et al.
10,970,743 B2 4/2021 Gottlieb et al.
10,972,434 B2 4/2021 Kupisiewicz et al.
10,972,436 B1 4/2021 Simanel et al.
11,050,587 B1 6/2021 Norbutas et al.
11,057,351 B1 7/2021 Simanel et al.
11,057,446 B2 7/2021 Shribman et al.
11,140,136 B1 10/2021 Li et al.
11,140,235 B1 10/2021 Vilcinskas et al.
11,184,458 B1 11/2021 Suckel
11,196,712 B1 12/2021 Norbutas
11,196,719 B1 12/2021 Nedzinskas
11,196,833 B1 12/2021 Norbutas
11,204,971 B1 12/2021 Vilcinskas et al.
11,212,354 B1 12/2021 Pilkauskas et al.
11,245,670 B1 2/2022 Celiesius et al.
11,258,872 B1 2/2022 Gogel
11,343,380 B2 5/2022 Dawes
11,368,498 B2 6/2022 LaJoie et al.
11,411,922 B2 8/2022 Shribman et al.
11,424,946 B2 8/2022 Shribman et al.
11,443,010 B2 9/2022 Comstock et al.
11,457,022 B1 9/2022 Neel
11,469,992 B2 10/2022 Gerstel
11,574,536 B2 2/2023 Saurin et al.
11,593,446 B2 2/2023 Shribman et al.
11,614,893 B2 3/2023 Kannan et al.
11,615,157 B2 3/2023 Juravicius
11,635,877 B2 4/2023 Lopez et al.
11,657,110 B2 5/2023 Shribman et al.
11,658,876 B2 5/2023 Hooda et al.
11,677,853 B2 6/2023 Acharya et al.
11,757,961 B2 9/2023 Shribman et al.
11,818,096 B2 11/2023 Jain et al.
11,831,532 B2 11/2023 Nakamura et al.
11,947,619 B2 4/2024 Comstock et al.
12,003,546 B1 6/2024 Quiros
12,517,972 B2 1/2026 Shribman et al.
12,524,490 B2 1/2026 Shribman et al.
2001/0011312 A1 8/2001 Chu
2001/0054020 A1 12/2001 Barth
2001/0056416 A1 12/2001 Garcia-Luna-Aceves
2002/0007413 A1 1/2002 Garcia-Luna-Aceves et al.
2002/0010758 A1 1/2002 Chan
2002/0026517 A1 2/2002 Watson
2002/0032799 A1 3/2002 Wiedeman et al.
2002/0052947 A1 5/2002 Duimovich et al.
2002/0055956 A1 5/2002 Krasnoiarov et al.
2002/0055966 A1 5/2002 Border et al.
2002/0059371 A1 5/2002 Jamail
2002/0059429 A1 5/2002 Carpenter
2002/0069241 A1 6/2002 Narlikar et al.
2002/0073075 A1 6/2002 Dutta et al.
2002/0073232 A1 6/2002 Hong
2002/0078371 A1 6/2002 Heilig et al.
2002/0091760 A1 7/2002 Rozen
2002/0099781 A1 7/2002 Scheussler et al.
2002/0103823 A1 8/2002 Jackson
2002/0112036 A1 8/2002 Bohannon
2002/0112152 A1 8/2002 VanHeyningen
2002/0120714 A1 8/2002 Agapiev
2002/0133621 A1 9/2002 Marco et al.
2002/0169818 A1 11/2002 Stewart
2002/0178217 A1 11/2002 Nguyen
2002/0194183 A1 12/2002 Yoakum
2002/0194292 A1 12/2002 King
2003/0009518 A1 1/2003 Harrow et al.
2003/0009583 A1 1/2003 Chan et al.
2003/0018705 A1 1/2003 Chen
2003/0018834 A1 1/2003 Eilers
2003/0026231 A1 2/2003 Lazaridis et al.
2003/0061282 A1 3/2003 Ebata et al.
2003/0065745 A1 4/2003 Wolfe et al.
2003/0074403 A1 4/2003 Harrow et al.
2003/0095520 A1 5/2003 Aalbers
2003/0097408 A1 5/2003 Kageyama
2003/0120805 A1 6/2003 Couts
2003/0135487 A1 7/2003 Beyer et al.
2003/0149720 A1 8/2003 Goldstein
2003/0163413 A1 8/2003 Wiczkowski
2003/0174648 A1 9/2003 Wang et al.
2003/0187925 A1 10/2003 Inala
2003/0200307 A1 10/2003 Raju et al.
2003/0204602 A1 10/2003 Hudson et al.
2003/0210694 A1 11/2003 Jayaraman et al.
2003/0212648 A1 11/2003 Cunningham et al.
2003/0217144 A1 11/2003 Fu et al.
2003/0225897 A1 12/2003 Krawetz
2003/0229718 A1 12/2003 Tock
2003/0229785 A1 12/2003 Daseke
2004/0044731 A1 3/2004 Chen
2004/0052257 A1 3/2004 Abdo
2004/0054748 A1 3/2004 Ackaouy
2004/0054800 A1 3/2004 Shah
2004/0068579 A1 4/2004 Marmigere
2004/0087268 A1 5/2004 Hatano
2004/0088646 A1 5/2004 Yeager et al.
2004/0111529 A1 6/2004 Parmar
2004/0117455 A1 6/2004 Kaminsky
2004/0133692 A1 7/2004 Blanchet
2004/0136370 A1 7/2004 Moore et al.
2004/0143665 A1 7/2004 Mace
2004/0153473 A1 8/2004 Hutchinson
2004/0162076 A1 8/2004 Chowdry et al.
2004/0199623 A1 10/2004 Houri
2004/0199629 A1 10/2004 Bomer
2004/0212490 A1 10/2004 Fredericks
2004/0215717 A1 10/2004 Seifert
2004/0221207 A1 11/2004 Yokota
2004/0230593 A1 11/2004 Rudin
2004/0236962 A1 11/2004 Wong
2004/0254907 A1 12/2004 Crow et al.
2004/0257761 A1 12/2004 Park
2004/0263479 A1 12/2004 Shkolnikov
2005/0015552 A1 1/2005 So et al.
2005/0018645 A1 1/2005 Mustonen et al.
2005/0022236 A1 1/2005 Ito et al.
2005/0025070 A1 2/2005 Yamada
2005/0027782 A1 2/2005 Jalan
2005/0027834 A1 2/2005 Chen et al.
2005/0050097 A1 3/2005 Yeh
2005/0050317 A1 3/2005 Kramer et al.
2005/0060542 A1 3/2005 Risan
2005/0086328 A1 4/2005 Landram et al.
2005/0091399 A1 4/2005 Candan et al.
2005/0091540 A1 4/2005 Dick
2005/0096753 A1 5/2005 Arling
2005/0097217 A1 5/2005 Val et al.
2005/0097221 A1 5/2005 James
2005/0097441 A1 5/2005 Herbach
2005/0108244 A1 5/2005 Riise
2005/0108517 A1 5/2005 Dillon et al.

(56) References Cited

U.S. PATENT DOCUMENTS

| | | | |
|---|---|---|---|
| 2005/0108551 | A1 | 5/2005 | Toomey |
| 2005/0120111 | A1 | 6/2005 | Bailey et al. |
| 2005/0125412 | A1 | 6/2005 | Glover |
| 2005/0138426 | A1 | 6/2005 | Styslinger |
| 2005/0165903 | A1 | 7/2005 | Doan |
| 2005/0180319 | A1 | 8/2005 | Hutnik |
| 2005/0190059 | A1 | 9/2005 | Wehrenberg |
| 2005/0198261 | A1 | 9/2005 | Durvasula et al. |
| 2005/0198309 | A1 | 9/2005 | Li et al. |
| 2005/0228964 | A1 | 10/2005 | Sechrest et al. |
| 2005/0235044 | A1 | 10/2005 | Tazuma |
| 2005/0246442 | A1 | 11/2005 | Gutjahr |
| 2005/0289648 | A1 | 12/2005 | Grobman et al. |
| 2006/0015545 | A1 | 1/2006 | Ezra |
| 2006/0026304 | A1 | 2/2006 | Price |
| 2006/0031407 | A1 | 2/2006 | Dispensa et al. |
| 2006/0036755 | A1 | 2/2006 | Abdullah |
| 2006/0039352 | A1 | 2/2006 | Karstens |
| 2006/0047844 | A1 | 3/2006 | Deng |
| 2006/0059091 | A1 | 3/2006 | Wang et al. |
| 2006/0075114 | A1 | 4/2006 | Panasyuk |
| 2006/0155995 | A1 | 7/2006 | Torvinen |
| 2006/0164383 | A1 | 7/2006 | Machin et al. |
| 2006/0184647 | A1 | 8/2006 | Dixit |
| 2006/0200541 | A1 | 9/2006 | Wikman et al. |
| 2006/0206586 | A1 | 9/2006 | Ling et al. |
| 2006/0212542 | A1 | 9/2006 | Fang |
| 2006/0212584 | A1 | 9/2006 | Yu |
| 2006/0218285 | A1 | 9/2006 | Talwar et al. |
| 2006/0224687 | A1 | 10/2006 | Popkin et al. |
| 2006/0236083 | A1 | 10/2006 | Fritsch |
| 2006/0242318 | A1 | 10/2006 | Nettle |
| 2006/0256772 | A1 | 11/2006 | Yarlagadda |
| 2006/0259607 | A1 | 11/2006 | O'Neal et al. |
| 2006/0259728 | A1 | 11/2006 | Chandrasekaran et al. |
| 2006/0271438 | A1 | 11/2006 | Shotland |
| 2006/0280191 | A1 | 12/2006 | Nishida |
| 2006/0287738 | A1 | 12/2006 | Rizzi et al. |
| 2006/0293052 | A1 | 12/2006 | Orler et al. |
| 2007/0004449 | A1 | 1/2007 | Sham |
| 2007/0005777 | A1 | 1/2007 | Fremantle et al. |
| 2007/0011674 | A1 | 1/2007 | Joo |
| 2007/0047452 | A1 | 3/2007 | Lohr |
| 2007/0052672 | A1 | 3/2007 | Ritter et al. |
| 2007/0061440 | A1 | 3/2007 | Sundaram |
| 2007/0073878 | A1 | 3/2007 | Issa |
| 2007/0088821 | A1 | 4/2007 | Sankuratripati |
| 2007/0100839 | A1 | 5/2007 | Kim |
| 2007/0112939 | A1 | 5/2007 | Wilson et al. |
| 2007/0142036 | A1 | 6/2007 | Wikman et al. |
| 2007/0156855 | A1 | 7/2007 | Johnson |
| 2007/0160072 | A1 | 7/2007 | Thalanany et al. |
| 2007/0164865 | A1 | 7/2007 | Giasson et al. |
| 2007/0171921 | A1 | 7/2007 | Wookey |
| 2007/0174246 | A1 | 7/2007 | Sigurdsson et al. |
| 2007/0177513 | A1 | 8/2007 | Kuokkanen |
| 2007/0180111 | A1 | 8/2007 | Chmaytelli |
| 2007/0198144 | A1 | 8/2007 | Norris et al. |
| 2007/0198401 | A1 | 8/2007 | Kunz |
| 2007/0204003 | A1 | 8/2007 | Abramson |
| 2007/0214095 | A1 | 9/2007 | Adams et al. |
| 2007/0220145 | A1 | 9/2007 | Kozakura et al. |
| 2007/0226810 | A1 | 9/2007 | Hotti |
| 2007/0233706 | A1 | 10/2007 | Farber et al. |
| 2007/0239655 | A1 | 10/2007 | Agetsuma |
| 2007/0264623 | A1 | 11/2007 | Wang et al. |
| 2007/0283026 | A1 | 12/2007 | Lohmar |
| 2007/0299954 | A1 | 12/2007 | Fatula |
| 2008/0008089 | A1 | 1/2008 | Bornstein et al. |
| 2008/0010365 | A1 | 1/2008 | Schneider |
| 2008/0028022 | A1 | 1/2008 | Nakagawa |
| 2008/0034072 | A1 | 2/2008 | He et al. |
| 2008/0034416 | A1 | 2/2008 | Kumar et al. |
| 2008/0037536 | A1 | 2/2008 | Padmanabhan |
| 2008/0045267 | A1 | 2/2008 | Hind et al. |
| 2008/0052156 | A1 | 2/2008 | Brenner |
| 2008/0062879 | A1 | 3/2008 | Sivakumar et al. |
| 2008/0071907 | A1 | 3/2008 | Thompson |
| 2008/0071925 | A1 | 3/2008 | Leighton |
| 2008/0072178 | A1 | 3/2008 | Budzisch |
| 2008/0072232 | A1 | 3/2008 | O'Toole |
| 2008/0086730 | A1 | 4/2008 | Vertes |
| 2008/0091812 | A1 | 4/2008 | Lev-Ran |
| 2008/0098101 | A1 | 4/2008 | Black |
| 2008/0101382 | A1 | 5/2008 | Bannerjee et al. |
| 2008/0109446 | A1 | 5/2008 | Wang |
| 2008/0120427 | A1 | 5/2008 | Ramanathan |
| 2008/0125123 | A1 | 5/2008 | Dorenbosch |
| 2008/0134258 | A1 | 6/2008 | Goose et al. |
| 2008/0140868 | A1 | 6/2008 | Kalayjian et al. |
| 2008/0147588 | A1 | 6/2008 | Leffingwell et al. |
| 2008/0155016 | A1 | 6/2008 | Tsai |
| 2008/0162700 | A1 | 7/2008 | Aborn |
| 2008/0195712 | A1 | 8/2008 | Lin et al. |
| 2008/0195743 | A1 | 8/2008 | Brueck et al. |
| 2008/0196098 | A1 | 8/2008 | Cottrell et al. |
| 2008/0201438 | A1 | 8/2008 | Mandre |
| 2008/0209028 | A1 | 8/2008 | Kurup |
| 2008/0214152 | A1 | 9/2008 | Ramer |
| 2008/0215755 | A1 | 9/2008 | Farber et al. |
| 2008/0222244 | A1 | 9/2008 | Huang |
| 2008/0222267 | A1 | 9/2008 | Horn |
| 2008/0222291 | A1 | 9/2008 | Weller et al. |
| 2008/0225710 | A1 | 9/2008 | Raja |
| 2008/0228537 | A1 | 9/2008 | Monfried |
| 2008/0228938 | A1 | 9/2008 | Plamondon |
| 2008/0235385 | A1 | 9/2008 | Li |
| 2008/0235391 | A1 | 9/2008 | Painter et al. |
| 2008/0235623 | A1 | 9/2008 | Li |
| 2008/0235746 | A1 | 9/2008 | Peters |
| 2008/0243735 | A1 | 10/2008 | Rish |
| 2008/0256175 | A1 | 10/2008 | Lee |
| 2008/0258913 | A1 | 10/2008 | Busey |
| 2008/0263180 | A1 | 10/2008 | Hurst |
| 2008/0263193 | A1 | 10/2008 | Chalemin et al. |
| 2008/0270589 | A1 | 10/2008 | Hwang |
| 2008/0281944 | A1 | 11/2008 | Vorne et al. |
| 2008/0282112 | A1 | 11/2008 | Bailey |
| 2008/0288973 | A1 | 11/2008 | Carson |
| 2008/0298328 | A1 | 12/2008 | Sharma |
| 2008/0320151 | A1 | 12/2008 | McCanne |
| 2009/0010426 | A1 | 1/2009 | Redmond |
| 2009/0016337 | A1 | 1/2009 | Jorgensen |
| 2009/0021790 | A1 | 1/2009 | Krovitz et al. |
| 2009/0024759 | A1 | 1/2009 | McKibben et al. |
| 2009/0029723 | A1 | 1/2009 | Doyle et al. |
| 2009/0037529 | A1 | 2/2009 | Armon-Kest |
| 2009/0037977 | A1 | 2/2009 | Gai et al. |
| 2009/0055471 | A1 | 2/2009 | Kozat et al. |
| 2009/0055749 | A1 | 2/2009 | Chatterjee |
| 2009/0070489 | A1 | 3/2009 | Lu |
| 2009/0076919 | A1 | 3/2009 | Shuster |
| 2009/0077233 | A1 | 3/2009 | Kurebayashi |
| 2009/0100005 | A1 | 4/2009 | Guo |
| 2009/0106551 | A1 | 4/2009 | Boren |
| 2009/0115853 | A1 | 5/2009 | Umeyama |
| 2009/0117846 | A1 | 5/2009 | Mavrakakis |
| 2009/0136219 | A1 | 5/2009 | Kikugawa |
| 2009/0138538 | A1 | 5/2009 | Klein |
| 2009/0150534 | A1 | 6/2009 | Miller |
| 2009/0150930 | A1 | 6/2009 | Sherwin |
| 2009/0157850 | A1 | 6/2009 | Gagliardi |
| 2009/0161554 | A1 | 6/2009 | Agarwal |
| 2009/0177761 | A1 | 7/2009 | Meyer |
| 2009/0182843 | A1 | 7/2009 | Hluchyj et al. |
| 2009/0187654 | A1 | 7/2009 | Raja |
| 2009/0193498 | A1 | 7/2009 | Agarwal |
| 2009/0199000 | A1 | 8/2009 | Hsu |
| 2009/0204700 | A1 | 8/2009 | Sudhaka |
| 2009/0216887 | A1 | 8/2009 | Hertle et al. |
| 2009/0217351 | A1 | 8/2009 | Burch |
| 2009/0222515 | A1 | 9/2009 | Thompson |
| 2009/0222554 | A1 | 9/2009 | Schneider |
| 2009/0228603 | A1 | 9/2009 | Ritzau et al. |

(56) References Cited

U.S. PATENT DOCUMENTS

2009/0232003 A1 9/2009 Vasseur
2009/0234970 A1 9/2009 Sun
2009/0248793 A1 10/2009 Jacobsson et al.
2009/0262724 A1 10/2009 Suzuki
2009/0278506 A1 11/2009 Winger
2009/0287641 A1 11/2009 Rahm
2009/0292816 A1 11/2009 Etchegoyen
2009/0300208 A1 12/2009 Lepeska
2009/0305732 A1 12/2009 Marcellino et al.
2009/0307351 A1 12/2009 Raja et al.
2009/0313318 A1 12/2009 Dye
2009/0319502 A1 12/2009 Chalouhi et al.
2009/0320119 A1 12/2009 Hicks
2009/0327489 A1 12/2009 Swildens
2010/0014464 A1 1/2010 Hirano et al.
2010/0030839 A1 2/2010 Ceragioli et al.
2010/0031183 A1 2/2010 Kang
2010/0036954 A1 2/2010 Sakata
2010/0042724 A1 2/2010 Jeon
2010/0067703 A1 3/2010 Candelore
2010/0070725 A1 3/2010 Prahlad et al.
2010/0082513 A1 4/2010 Liu
2010/0082804 A1 4/2010 Patel et al.
2010/0087167 A1 4/2010 Tsurutome et al.
2010/0094970 A1 4/2010 Zuckerman
2010/0095197 A1 4/2010 Klevenz et al.
2010/0095208 A1 4/2010 White
2010/0100327 A1 4/2010 Jensen
2010/0100952 A1 4/2010 Sample
2010/0105443 A1 4/2010 Vaisanen
2010/0110368 A1 5/2010 Chaum
2010/0115613 A1 5/2010 Ramaswami
2010/0125673 A1 5/2010 Richardson et al.
2010/0125675 A1 5/2010 Richardson
2010/0138485 A1 6/2010 Chow et al.
2010/0145925 A1 6/2010 Flinta
2010/0146569 A1 6/2010 Janardhan
2010/0161752 A1 6/2010 Collet
2010/0161756 A1 6/2010 Lewis
2010/0161760 A1 6/2010 Maloo
2010/0161795 A1 6/2010 Deridder et al.
2010/0161799 A1 6/2010 Maloo
2010/0162126 A1 6/2010 Donaldson
2010/0180082 A1 7/2010 Sebastian
2010/0197239 A1 8/2010 Catovic et al.
2010/0235438 A1 9/2010 Narayanan et al.
2010/0235473 A1 9/2010 Koren
2010/0262650 A1 10/2010 Chauhan et al.
2010/0269044 A1 10/2010 Ivanyi et al.
2010/0322237 A1 12/2010 Raja
2011/0007665 A1 1/2011 Dinur
2011/0022582 A1 1/2011 Unnikrishnan
2011/0023125 A1 1/2011 Kim
2011/0035503 A1 2/2011 Zaid et al.
2011/0045523 A1 2/2011 Strano et al.
2011/0066924 A1 3/2011 Dorso et al.
2011/0069675 A1 3/2011 Tang et al.
2011/0072129 A1 3/2011 Le Pennec et al.
2011/0087733 A1 4/2011 Shribman
2011/0099619 A1 4/2011 Jewell
2011/0106972 A1 5/2011 Grube
2011/0117938 A1 5/2011 Pyo
2011/0128911 A1 6/2011 Shaheen
2011/0137973 A1 6/2011 Wei
2011/0154477 A1 6/2011 Parla
2011/0173345 A1 7/2011 Knox
2011/0191445 A1 8/2011 Dazzi
2011/0208732 A1 8/2011 Melton et al.
2011/0213898 A1 9/2011 Fiatal et al.
2011/0218866 A1 9/2011 Wilson
2011/0231569 A1 9/2011 Luby et al.
2011/0255692 A1 10/2011 Soliman et al.
2011/0258628 A1 10/2011 Devadhar
2011/0264809 A1 10/2011 Koster
2011/0275544 A1 11/2011 Zhou et al.
2011/0282997 A1 11/2011 Prince
2011/0296048 A1 12/2011 Knox et al.
2011/0320589 A1 12/2011 Hietala
2012/0002815 A1 1/2012 Wei et al.
2012/0005334 A1 1/2012 Raja et al.
2012/0011550 A1 1/2012 Holland
2012/0023155 A1 1/2012 Myers et al.
2012/0023190 A1 1/2012 Backholm et al.
2012/0023212 A1 1/2012 Roth
2012/0023236 A1 1/2012 Backholm et al.
2012/0036220 A1 2/2012 Dare
2012/0050144 A1 3/2012 Morlock
2012/0050668 A1 3/2012 Howell et al.
2012/0059934 A1 3/2012 Rafiq et al.
2012/0079100 A1 3/2012 McIntyre et al.
2012/0089704 A1 4/2012 Trahan et al.
2012/0096116 A1 4/2012 Mislove
2012/0099566 A1 4/2012 Laine et al.
2012/0117641 A1 5/2012 Holloway et al.
2012/0124173 A1 5/2012 De et al.
2012/0124239 A1 5/2012 Shribman et al.
2012/0124348 A1 5/2012 Dundas et al.
2012/0124384 A1 5/2012 Livni et al.
2012/0136926 A1 5/2012 Dillon
2012/0144016 A1 6/2012 Zhang et al.
2012/0144047 A1 6/2012 Armstrong
2012/0164980 A1 6/2012 Van Phan
2012/0166582 A1 6/2012 Binder
2012/0166611 A1 6/2012 Kim
2012/0180109 A1 7/2012 Chen
2012/0185947 A1 7/2012 Phillips
2012/0198524 A1 8/2012 Celebisoy
2012/0209945 A1 8/2012 Chandrasekhar
2012/0239785 A1 9/2012 Pazos
2012/0239811 A1 9/2012 Kohli
2012/0246273 A1 9/2012 Bornstein
2012/0246338 A1 9/2012 Li
2012/0254370 A1 10/2012 Bacher
2012/0254456 A1 10/2012 Visharam et al.
2012/0254960 A1 10/2012 Lortz
2012/0257610 A1 10/2012 Maki et al.
2012/0259826 A1 10/2012 Zalila-Wenkstern
2012/0259833 A1 10/2012 Paduroiu
2012/0259926 A1 10/2012 Lockhart
2012/0264520 A1 10/2012 Marsland
2012/0265853 A1 10/2012 Knox et al.
2012/0271823 A1 10/2012 Asikainen et al.
2012/0271920 A1 10/2012 Isaksson
2012/0278431 A1 11/2012 Luna
2012/0278432 A1 11/2012 Luna
2012/0280917 A1 11/2012 Toksvig et al.
2012/0284370 A1 11/2012 Hierro
2012/0290717 A1 11/2012 Luna
2012/0297041 A1 11/2012 Momchilov
2012/0310906 A1 12/2012 Miller et al.
2012/0311094 A1 12/2012 Biderman et al.
2012/0323674 A1 12/2012 Simmons
2012/0324113 A1 12/2012 Prince et al.
2013/0007031 A1 1/2013 Makino
2013/0007232 A1 1/2013 Wang
2013/0007253 A1 1/2013 Li et al.
2013/0019258 A1 1/2013 Bhatia
2013/0031459 A1 1/2013 Khorashadi et al.
2013/0041808 A1 2/2013 Pham et al.
2013/0046817 A1 2/2013 Isbister
2013/0047020 A1 2/2013 Hershko
2013/0060925 A1 3/2013 Nagamine et al.
2013/0061128 A1 3/2013 Lucco et al.
2013/0064370 A1 3/2013 Gouge et al.
2013/0067085 A1 3/2013 Hershko et al.
2013/0067086 A1 3/2013 Hershko
2013/0072233 A1 3/2013 Sandholm
2013/0073514 A1 3/2013 Cai et al.
2013/0080498 A1 3/2013 Desilva
2013/0080575 A1 3/2013 Prince et al.
2013/0081129 A1 3/2013 Niemelä
2013/0083800 A1 4/2013 Lezama Bounine
2013/0090129 A1 4/2013 Turner et al.
2013/0091273 A1 4/2013 Ly

(56) References Cited

U.S. PATENT DOCUMENTS

2013/0095806 A1 4/2013 Salkintzis et al.
2013/0097236 A1 4/2013 Khorashadi et al.
2013/0117252 A1 5/2013 Samaddar et al.
2013/0117413 A1 5/2013 Kaneko et al.
2013/0117418 A1 5/2013 Mutton et al.
2013/0124683 A1 5/2013 Watanabe et al.
2013/0145010 A1 6/2013 Luna et al.
2013/0145017 A1 6/2013 Luna
2013/0145036 A1 6/2013 Ly et al.
2013/0151649 A1 6/2013 Luna
2013/0151709 A1 6/2013 Luna
2013/0157699 A1 6/2013 Talwar
2013/0166768 A1 6/2013 Licensing
2013/0167045 A1 6/2013 Xu
2013/0169513 A1 7/2013 Heinrich et al.
2013/0171960 A1 7/2013 Kandregula
2013/0171964 A1 7/2013 Bhatia et al.
2013/0173756 A1 7/2013 Luna
2013/0191456 A1 7/2013 Ting et al.
2013/0201316 A1 8/2013 Binder et al.
2013/0212205 A1 8/2013 Flockhart et al.
2013/0212442 A1 8/2013 Patil
2013/0212462 A1 8/2013 Athas
2013/0219281 A1 8/2013 Trevelyan
2013/0219458 A1 8/2013 Ramanathan
2013/0246643 A1 9/2013 Luby et al.
2013/0252583 A1 9/2013 Brown et al.
2013/0262696 A1 10/2013 Watanabe
2013/0263280 A1 10/2013 Cote
2013/0268357 A1 10/2013 Heath
2013/0275492 A1 10/2013 Kaufman et al.
2013/0275557 A1 10/2013 Myers et al.
2013/0281154 A1 10/2013 Aerrabotu
2013/0301504 A1 11/2013 Lenart et al.
2013/0304796 A1 11/2013 Jackowski et al.
2013/0326607 A1 12/2013 Feng
2013/0332621 A1 12/2013 Keller et al.
2013/0335029 A1 12/2013 Cooper et al.
2013/0337853 A1 12/2013 Korn et al.
2013/0339477 A1 12/2013 Majeti
2013/0340031 A1 12/2013 Amit et al.
2013/0346472 A1 12/2013 Wheeldon
2014/0006479 A1* 1/2014 Maloo .................. H04L 67/563
709/203
2014/0013001 A1 1/2014 Cox
2014/0040035 A1 2/2014 Cusack
2014/0045547 A1 2/2014 Singamsetty et al.
2014/0059168 A1 2/2014 Ponec et al.
2014/0070613 A1 3/2014 Garb et al.
2014/0078462 A1 3/2014 Abreu
2014/0079225 A1 3/2014 Jarske et al.
2014/0108671 A1 4/2014 Watson et al.
2014/0115119 A1 4/2014 Padinjareveetil
2014/0122580 A1 5/2014 Nuaimi
2014/0122682 A1 5/2014 Falkenberg et al.
2014/0122865 A1 5/2014 Ovsiannikov
2014/0133392 A1 5/2014 Das et al.
2014/0143431 A1 5/2014 Watson et al.
2014/0159877 A1 6/2014 Huang
2014/0189061 A1 7/2014 Stockwell et al.
2014/0189069 A1 7/2014 Gero et al.
2014/0189802 A1 7/2014 Montgomery
2014/0199044 A1 7/2014 Gupta
2014/0201323 A1 7/2014 Fall
2014/0215391 A1 7/2014 Little et al.
2014/0222798 A1 8/2014 Want et al.
2014/0222963 A1 8/2014 Gangadharan
2014/0222974 A1 8/2014 Liu
2014/0223537 A1 8/2014 Islam
2014/0244727 A1 8/2014 Kang et al.
2014/0244778 A1 8/2014 Wyatt
2014/0244830 A1 8/2014 Smacinih
2014/0258465 A1 9/2014 Li
2014/0259093 A1 9/2014 Narayanaswamy
2014/0269279 A1 9/2014 Ismail et al.
2014/0273923 A1 9/2014 Papakostas
2014/0280784 A1 9/2014 Moroney et al.
2014/0280884 A1 9/2014 Searle et al.
2014/0282784 A1 9/2014 Pfeffer
2014/0283068 A1 9/2014 Call et al.
2014/0297570 A1 10/2014 Garera et al.
2014/0301334 A1 10/2014 Labranche
2014/0310709 A1 10/2014 Nirantar
2014/0337308 A1 11/2014 De Francisci Morales
2014/0344400 A1 11/2014 Varney et al.
2014/0344908 A1 11/2014 Rizzo
2014/0359081 A1 12/2014 Van Deventer
2014/0364104 A1 12/2014 Wood et al.
2014/0372624 A1 12/2014 Wang et al.
2014/0372627 A1 12/2014 Axelrod
2014/0376403 A1 12/2014 Shao
2014/0380410 A1 12/2014 Khemani et al.
2015/0006615 A1 1/2015 Wainner
2015/0016261 A1 1/2015 Backholm
2015/0017967 A1 1/2015 Cao et al.
2015/0020106 A1 1/2015 Belyaev et al.
2015/0026239 A1 1/2015 Hofmann
2015/0026341 A1 1/2015 Blacka
2015/0032803 A1 1/2015 Graham-Cumming
2015/0036485 A1 2/2015 Poulson
2015/0039674 A1 2/2015 Agarwal
2015/0052249 A1 2/2015 Mericle et al.
2015/0055594 A1 2/2015 Nirantar et al.
2015/0058488 A1 2/2015 Backholm
2015/0067819 A1 3/2015 Shribman et al.
2015/0071139 A1 3/2015 Nix
2015/0074266 A1 3/2015 Alisawi et al.
2015/0092860 A1 4/2015 Benight
2015/0095630 A1 4/2015 Cote et al.
2015/0106221 A1 4/2015 Tapley et al.
2015/0117425 A1 4/2015 Gupta
2015/0120863 A1 4/2015 Wu
2015/0131438 A1 5/2015 Nirantar et al.
2015/0134848 A1 5/2015 Mutz et al.
2015/0135302 A1 5/2015 Cohen
2015/0143456 A1 5/2015 Raleigh et al.
2015/0149431 A1 5/2015 Trevelyan
2015/0153810 A1 6/2015 Sasidharan et al.
2015/0156525 A1 6/2015 Lemmons
2015/0163087 A1 6/2015 Conner et al.
2015/0169620 A1 6/2015 Schmidt et al.
2015/0172324 A1 6/2015 Calme
2015/0172406 A1 6/2015 Hansen
2015/0180762 A1 6/2015 Medved et al.
2015/0189401 A1 7/2015 Yi
2015/0195341 A1 7/2015 Swerdlow et al.
2015/0199498 A1 7/2015 Liu et al.
2015/0206176 A1 7/2015 Toval et al.
2015/0207894 A1 7/2015 De Los Reyes et al.
2015/0208352 A1 7/2015 Backholm
2015/0215426 A1 7/2015 Torii et al.
2015/0237155 A1 8/2015 Power et al.
2015/0237159 A1 8/2015 Lawrence et al.
2015/0242066 A1 8/2015 Chen
2015/0244839 A1 8/2015 Horn
2015/0268905 A1 9/2015 Chakirov
2015/0271188 A1 9/2015 Call
2015/0277559 A1 10/2015 Vescovi et al.
2015/0281331 A1 10/2015 Steiner et al.
2015/0295988 A1 10/2015 Goodwin
2015/0304292 A1 10/2015 Dulkin et al.
2015/0317218 A1 11/2015 Verde
2015/0341812 A1 11/2015 Dion
2015/0341901 A1 11/2015 Ryu et al.
2015/0347118 A1 12/2015 Yeung
2015/0349556 A1 12/2015 Mercando et al.
2015/0350362 A1 12/2015 Pollack
2015/0356289 A1 12/2015 Brown et al.
2015/0363791 A1 12/2015 Raz et al.
2015/0372972 A1 12/2015 Kennedy
2015/0373443 A1 12/2015 Carroll
2016/0021215 A1 1/2016 Spencer
2016/0029402 A1 1/2016 Backholm et al.
2016/0035019 A1 2/2016 Rosner

(56) References Cited

U.S. PATENT DOCUMENTS

| | | | |
|---|---|---|---|
| 2016/0055225 | A1 | 2/2016 | Xu et al. |
| 2016/0056880 | A1 | 2/2016 | Yamasaki et al. |
| 2016/0066137 | A1 | 3/2016 | Kulkarni et al. |
| 2016/0072847 | A1 | 3/2016 | Bremen et al. |
| 2016/0077547 | A1 | 3/2016 | Aimone |
| 2016/0086391 | A1 | 3/2016 | Ricci |
| 2016/0098049 | A1 | 4/2016 | Fan |
| 2016/0104346 | A1 | 4/2016 | Ovalle et al. |
| 2016/0112213 | A1 | 4/2016 | Lee et al. |
| 2016/0140405 | A1 | 5/2016 | Graumann |
| 2016/0162706 | A1 | 6/2016 | Famulari |
| 2016/0164992 | A1 | 6/2016 | Prasad et al. |
| 2016/0170814 | A1 | 6/2016 | Li |
| 2016/0173452 | A1 | 6/2016 | Seo |
| 2016/0182657 | A1 | 6/2016 | Mukherjee et al. |
| 2016/0188657 | A1 | 6/2016 | Montana |
| 2016/0205028 | A1 | 7/2016 | Luna |
| 2016/0205557 | A1 | 7/2016 | Tuupola et al. |
| 2016/0226985 | A1 | 8/2016 | Yoon et al. |
| 2016/0232538 | A1 | 8/2016 | Papakostas et al. |
| 2016/0241664 | A1 | 8/2016 | Xia |
| 2016/0248803 | A1 | 8/2016 | O'Connell et al. |
| 2016/0261688 | A1 | 9/2016 | Anand |
| 2016/0262205 | A1 | 9/2016 | Flynn et al. |
| 2016/0269369 | A1 | 9/2016 | Thomson |
| 2016/0275190 | A1 | 9/2016 | Seed et al. |
| 2016/0294642 | A1 | 10/2016 | Hopkins et al. |
| 2016/0294956 | A1 | 10/2016 | Fix |
| 2016/0295569 | A1 | 10/2016 | Braun et al. |
| 2016/0316280 | A1 | 10/2016 | Bulley et al. |
| 2016/0323239 | A1 | 11/2016 | Cheng et al. |
| 2016/0323409 | A1 | 11/2016 | Kölhi |
| 2016/0330075 | A1 | 11/2016 | Tiwari et al. |
| 2016/0337426 | A1 | 11/2016 | Shribman et al. |
| 2016/0337464 | A1 | 11/2016 | Eriksson |
| 2016/0352628 | A1 | 12/2016 | Reddy et al. |
| 2016/0365989 | A1 | 12/2016 | Herrero |
| 2016/0366233 | A1 | 12/2016 | Le |
| 2016/0380778 | A1 | 12/2016 | Shen et al. |
| 2017/0006075 | A1 | 1/2017 | Li |
| 2017/0041416 | A1 | 2/2017 | Zhou |
| 2017/0046437 | A1 | 2/2017 | Desineni et al. |
| 2017/0046787 | A1 | 2/2017 | Bothwell et al. |
| 2017/0048192 | A1 | 2/2017 | Herrero |
| 2017/0063948 | A1 | 3/2017 | Shroff et al. |
| 2017/0070551 | A1 | 3/2017 | Phillips et al. |
| 2017/0083068 | A1 | 3/2017 | Kashyap et al. |
| 2017/0094710 | A1 | 3/2017 | Nirantar |
| 2017/0103140 | A1 | 4/2017 | Zhang et al. |
| 2017/0104829 | A1 | 4/2017 | Degroat |
| 2017/0118313 | A1 | 4/2017 | Aladdin et al. |
| 2017/0149781 | A1 | 5/2017 | Tubi et al. |
| 2017/0155654 | A1 | 6/2017 | Burke |
| 2017/0163724 | A1 | 6/2017 | Puri et al. |
| 2017/0171588 | A1 | 6/2017 | Phillips et al. |
| 2017/0177596 | A1 | 6/2017 | Comstock et al. |
| 2017/0187472 | A1 | 6/2017 | Chini et al. |
| 2017/0195451 | A1 | 7/2017 | Backholm |
| 2017/0220651 | A1 | 8/2017 | Mathew et al. |
| 2017/0221092 | A1 | 8/2017 | Toval et al. |
| 2017/0230434 | A1 | 8/2017 | Wang |
| 2017/0235829 | A1 | 8/2017 | Han |
| 2017/0235848 | A1 | 8/2017 | Van Dusen et al. |
| 2017/0237812 | A1 | 8/2017 | Sutardja |
| 2017/0250861 | A1 | 8/2017 | Gheorghe |
| 2017/0272316 | A1 | 9/2017 | Johnson |
| 2017/0272530 | A1 | 9/2017 | Lo et al. |
| 2017/0272543 | A1 | 9/2017 | Lo et al. |
| 2017/0330245 | A1 | 11/2017 | Guermas et al. |
| 2017/0331869 | A1 | 11/2017 | Bendahan et al. |
| 2017/0339253 | A1 | 11/2017 | Pathak |
| 2017/0359349 | A1 | 12/2017 | Knecht |
| 2017/0364700 | A1 | 12/2017 | Goldfarb et al. |
| 2017/0374566 | A1 | 12/2017 | Backholm |
| 2018/0019909 | A1 | 1/2018 | Tanabe et al. |
| 2018/0020002 | A1 | 1/2018 | Duca et al. |
| 2018/0020324 | A1 | 1/2018 | Beauford |
| 2018/0027112 | A1 | 1/2018 | Baldassari et al. |
| 2018/0034766 | A1 | 2/2018 | Chiba |
| 2018/0042067 | A1 | 2/2018 | Nirantar |
| 2018/0047072 | A1 | 2/2018 | Chow |
| 2018/0063228 | A1 | 3/2018 | Deen |
| 2018/0070129 | A1 | 3/2018 | Cholas et al. |
| 2018/0077624 | A1 | 3/2018 | Jung |
| 2018/0091619 | A1 | 3/2018 | Power et al. |
| 2018/0091873 | A1 | 3/2018 | Navin et al. |
| 2018/0121677 | A1 | 5/2018 | Avancha et al. |
| 2018/0124123 | A1 | 5/2018 | Moore et al. |
| 2018/0131668 | A1 | 5/2018 | Prince |
| 2018/0146378 | A1 | 5/2018 | Christmas et al. |
| 2018/0167336 | A1 | 6/2018 | Lawrence |
| 2018/0191764 | A1 | 7/2018 | Chawla et al. |
| 2018/0213038 | A1 | 7/2018 | Chung |
| 2018/0213060 | A1 | 7/2018 | Koonce |
| 2018/0219830 | A1 | 8/2018 | O'Brien |
| 2018/0219970 | A1 | 8/2018 | Shribman et al. |
| 2018/0225387 | A1 | 8/2018 | Pang |
| 2018/0226760 | A1 | 8/2018 | Bolouri-Saransar et al. |
| 2018/0226780 | A1 | 8/2018 | Draper |
| 2018/0227210 | A1 | 8/2018 | Cosgrove |
| 2018/0234364 | A1 | 8/2018 | Gong et al. |
| 2018/0248926 | A1 | 8/2018 | Binns et al. |
| 2018/0262388 | A1 | 9/2018 | Johnson |
| 2018/0262910 | A1 | 9/2018 | Smith et al. |
| 2018/0267847 | A1 | 9/2018 | Smith et al. |
| 2018/0302292 | A1 | 10/2018 | Khurana et al. |
| 2018/0337972 | A1 | 11/2018 | Lepeska et al. |
| 2018/0349354 | A1 | 12/2018 | Gonzalez |
| 2018/0363572 | A1 | 12/2018 | Glugla et al. |
| 2018/0367433 | A1 | 12/2018 | Luna |
| 2018/0367560 | A1 | 12/2018 | Mahaffey |
| 2018/0375712 | A1 | 12/2018 | Kröhling et al. |
| 2018/0375828 | A1 | 12/2018 | Rawat |
| 2018/0375896 | A1 | 12/2018 | Wang |
| 2018/0375952 | A1 | 12/2018 | Knecht |
| 2019/0005050 | A1 | 1/2019 | Proux |
| 2019/0005388 | A1 | 1/2019 | Glyman et al. |
| 2019/0026828 | A1 | 1/2019 | Preston et al. |
| 2019/0028548 | A1 | 1/2019 | Lauer |
| 2019/0033845 | A1 | 1/2019 | Cella |
| 2019/0036777 | A1 | 1/2019 | Frizzell |
| 2019/0037047 | A1 | 1/2019 | Shribman |
| 2019/0041934 | A1 | 2/2019 | Tan et al. |
| 2019/0050164 | A1 | 2/2019 | Kotian |
| 2019/0058902 | A1 | 2/2019 | Kipp et al. |
| 2019/0059083 | A1 | 2/2019 | Backholm |
| 2019/0068740 | A1 | 2/2019 | Graham-Cumming |
| 2019/0098518 | A1 | 3/2019 | Luna |
| 2019/0102280 | A1 | 4/2019 | Caldato |
| 2019/0110173 | A1 | 4/2019 | Collier |
| 2019/0116236 | A1 | 4/2019 | He |
| 2019/0124018 | A1 | 4/2019 | Zhang |
| 2019/0130361 | A1 | 5/2019 | Hazarika et al. |
| 2019/0137594 | A1 | 5/2019 | Annamalai et al. |
| 2019/0138560 | A1 | 5/2019 | Holloway |
| 2019/0139075 | A1 | 5/2019 | Cimino et al. |
| 2019/0140467 | A1 | 5/2019 | Abiri et al. |
| 2019/0155665 | A1 | 5/2019 | Bott |
| 2019/0166520 | A1 | 5/2019 | Luna |
| 2019/0171474 | A1 | 6/2019 | Malboubi |
| 2019/0174449 | A1 | 6/2019 | Shan |
| 2019/0180316 | A1 | 6/2019 | Toval |
| 2019/0180327 | A1 | 6/2019 | Balagopalan et al. |
| 2019/0182034 | A1 | 6/2019 | McCarthy et al. |
| 2019/0182297 | A1 | 6/2019 | Montalto et al. |
| 2019/0197063 | A1 | 6/2019 | Sekar et al. |
| 2019/0199611 | A1 | 6/2019 | Kotadia |
| 2019/0230394 | A1 | 7/2019 | Gates et al. |
| 2019/0238510 | A1 | 8/2019 | Li |
| 2019/0239208 | A1 | 8/2019 | Misawa et al. |
| 2019/0260859 | A1 | 8/2019 | Patil |
| 2019/0268308 | A1 | 8/2019 | Sinha |
| 2019/0268442 | A1 | 8/2019 | Puniani et al. |
| 2019/0324996 | A1 | 10/2019 | Comstock et al. |

(56) References Cited

U.S. PATENT DOCUMENTS

| | | | |
|---|---|---|---|
| 2019/0334864 | A1 | 10/2019 | Yin et al. |
| 2019/0342607 | A1 | 11/2019 | Major |
| 2019/0372878 | A1 | 12/2019 | Chakra |
| 2019/0373083 | A1 | 12/2019 | Nucci |
| 2019/0379766 | A1 | 12/2019 | Decenzo |
| 2019/0385057 | A1 | 12/2019 | Litichever et al. |
| 2019/0387430 | A1 | 12/2019 | Ingerman |
| 2020/0007494 | A1 | 1/2020 | Prince |
| 2020/0045131 | A1 | 2/2020 | Nigam et al. |
| 2020/0050773 | A1 | 2/2020 | Schroeder et al. |
| 2020/0052896 | A1 | 2/2020 | Acharya et al. |
| 2020/0083706 | A1 | 3/2020 | Paskov et al. |
| 2020/0134666 | A1 | 4/2020 | Gottlieb et al. |
| 2020/0136911 | A1 | 4/2020 | Assali |
| 2020/0159622 | A1 | 5/2020 | Chintagunta |
| 2020/0162432 | A1 | 5/2020 | Ludin |
| 2020/0169536 | A1 | 5/2020 | Santelia |
| 2020/0184035 | A1 | 6/2020 | Santelia |
| 2020/0186614 | A1 | 6/2020 | Luna |
| 2020/0205058 | A1 | 6/2020 | Yoshikawa |
| 2020/0220746 | A1 | 7/2020 | Shribman et al. |
| 2020/0259893 | A1 | 8/2020 | James |
| 2020/0287867 | A1 | 9/2020 | Knecht |
| 2020/0296036 | A1 | 9/2020 | Chu |
| 2020/0358858 | A1 | 11/2020 | Shribman |
| 2020/0382580 | A1 | 12/2020 | Devanneaux et al. |
| 2021/0058271 | A1 | 2/2021 | Sung |
| 2021/0058748 | A1 | 2/2021 | Liao |
| 2021/0075860 | A1 | 3/2021 | Binder et al. |
| 2021/0097112 | A1 | 4/2021 | Zhang |
| 2021/0141843 | A1 | 5/2021 | Gabdrakipov |
| 2021/0159548 | A1 | 5/2021 | Deng et al. |
| 2021/0183174 | A1 | 6/2021 | Wells et al. |
| 2021/0194986 | A1 | 6/2021 | Shribman et al. |
| 2021/0226933 | A1 | 7/2021 | Puzeris et al. |
| 2021/0234721 | A1 | 7/2021 | Shribman et al. |
| 2021/0392112 | A1 | 12/2021 | Nagrockas et al. |
| 2022/0043546 | A1 | 2/2022 | Glezeris et al. |
| 2022/0070216 | A1 | 3/2022 | Kohavi |
| 2022/0070271 | A1 | 3/2022 | Vasiliauskas et al. |
| 2022/0100808 | A1 | 3/2022 | Juravicius |
| 2022/0103523 | A1 | 3/2022 | Starr et al. |
| 2022/0103525 | A1 | 3/2022 | Shribman et al. |
| 2022/0158978 | A1 | 5/2022 | Shribman et al. |
| 2022/0164400 | A1 | 5/2022 | Holloway |
| 2022/0173924 | A1 | 6/2022 | Shribman et al. |
| 2022/0286724 | A1 | 9/2022 | Whittaker et al. |
| 2022/0335495 | A1 | 10/2022 | Motes |
| 2023/0289329 | A1 | 9/2023 | Luthra et al. |
| 2023/0359607 | A1 | 11/2023 | Kuhnke et al. |
| 2023/0379531 | A1 | 11/2023 | Azuolas et al. |
| 2023/0394058 | A1 | 12/2023 | Miyauchi et al. |
| 2024/0163334 | A1 | 5/2024 | Karpiniec et al. |
| 2024/0267245 | A1 | 8/2024 | Ittelson et al. |
| 2024/0370190 | A1 | 11/2024 | Sajeepa et al. |
| 2025/0310367 | A1 | 10/2025 | du Preez et al. |

FOREIGN PATENT DOCUMENTS

| | | | |
|---|---|---|---|
| CN | 102314348 | | 1/2012 |
| CN | 105245607 | B | 1/2016 |
| CN | 106210050 | | 12/2016 |
| CN | 106210050 | A | 12/2016 |
| CN | 106534244 | A | 3/2017 |
| CN | 106547793 | A | 3/2017 |
| CN | 106982268 | | 7/2017 |
| CN | 107808011 | | 3/2018 |
| CN | 107832355 | A | 3/2018 |
| CN | 107864143 | A | 3/2018 |
| CN | 108551452 | | 9/2018 |
| CN | 108924199 | A | 11/2018 |
| CN | 109413153 | | 3/2019 |
| CN | 109902220 | | 6/2019 |
| CN | 110062025 | A | 7/2019 |
| CN | 110071980 | A | 7/2019 |
| CN | 110147271 | A | 8/2019 |
| CN | 110489626 | | 11/2019 |
| CN | 110555146 | | 12/2019 |
| CN | 110555146 | A | 12/2019 |
| CN | 110704713 | | 1/2020 |
| CN | 111314298 | | 6/2020 |
| CN | 111666465 | | 9/2020 |
| CN | 111666465 | A | 9/2020 |
| CN | 111753087 | | 10/2020 |
| CN | 110516139 | | 7/2023 |
| EP | 1035708 | | 9/2000 |
| EP | 1672826 | | 6/2006 |
| EP | 2501104 | | 9/2012 |
| EP | 2597869 | A1 | 12/2013 |
| EP | 3272105 | | 3/2016 |
| EP | 3226515 | | 4/2017 |
| EP | 3502925 | | 6/2019 |
| EP | 4227829 | | 8/2023 |
| ES | 2189743 | T3 | 7/2003 |
| GB | 2418108 | A | 3/2006 |
| JP | H11-355302 | | 12/1999 |
| JP | 2007280388 | | 10/2007 |
| KR | 1020090097034 | | 9/2009 |
| KR | 20190047940 | | 5/2019 |
| WO | 97/42582 | A1 | 11/1997 |
| WO | WO2000051031 | A1 | 8/2000 |
| WO | 2003023639 | | 3/2003 |
| WO | 2004094980 | A2 | 11/2004 |
| WO | 2007/136665 | | 11/2007 |
| WO | 2009/086134 | A1 | 7/2009 |
| WO | 2010/014747 | A2 | 2/2010 |
| WO | 2010090562 | A1 | 12/2010 |
| WO | 2011/005390 | A2 | 1/2011 |
| WO | 2011068784 | A1 | 9/2011 |
| WO | 2015034752 | A1 | 3/2015 |
| WO | 2015/157646 | | 10/2015 |
| WO | 2016093444 | | 6/2016 |
| WO | 2016/123293 | A1 | 8/2016 |
| WO | 2016/181383 | | 11/2016 |
| WO | 2016/198961 | A2 | 12/2016 |
| WO | 2019/024755 | | 2/2019 |
| WO | 2019/043687 | | 3/2019 |
| WO | 2019/174613 | | 9/2019 |
| WO | 2020/141462 | | 7/2020 |
| WO | 2020202135 | | 10/2020 |
| WO | WO2021060973 | A1 | 4/2021 |

OTHER PUBLICATIONS

Third party observation filed on Jun. 21, 2019 in PCT Application No. PCT/IL2018/050910 (7 pages).

IETF named: IPV6 Tunnel Broker, Apr. 1999—First uploaded document submitted with third party observation dated Jun. 21, 2019 (13 pages).

Octoparse Blog: "Top 20 Web Crawling Tools to Scrape the Websites Quickly", Aug. 23, 2019 (15 pages).

Arndt Rachel, "How to get around Country-Specific streaming rules" Jul. 31, 2013 (2 pages).

Anonymous, "Where is located a website? Website location finder : IPVoid", Mar. 20, 2019 (1 page).

International Search Report issued in PCT Application No. PCT/IL2022/050746 dated Jan. 3, 2023.

Written Opinion issued in PCT Application No. PCT/IL2022/050746 dated Jan. 3, 2023.

Diego Calvanese, Giuseppe De Giancomo, and Maurizio Lenzerini, "Representing and Reasoning on SGML Documents", of Universita di Roma, Italy (10 pages).

David Barron published 1989 by John Wiley & Sons, Ltd. (0894-3982/89/010003-22), "Why use SGML?", published Electronic Publishing, vol. 2(1), 3-24 (Apr. 1989) (22 pages).

John Wiley & Sons, Ltd. (0894-3982/89/020065-26), "The implementation of the Amsterdam SGML Parser", by Jos Warmer and Sylvia Van Egmond, published Electronic Publishing, vol. 2(2), 65-90 (Dec. 1989) (26 pages).

W3C Recommendation (REC-XML-19980210), "Extensible Markup Language (XML) 1.0", Feb. 10, 1998 (36 pages).

(56) References Cited

OTHER PUBLICATIONS

IETF RFC 7303, "XML Media Types", Jul. 2014 (35 pages).
IETF RFC 3470, "Guidelines for the Use of Extensible Markup Language (XML) within IETF Protocols", Jan. 2003 (28 pages).
Chapter 3: "XMLHttpRequest Object" in a book "Ajax: The Complete Reference", by Thomas Powell published 2008 (ISBN: 978-0-07-149216) (54 pages).
W3C Working Draft, "XMLHttpRequest Level 2", (Jan. 17, 2012) (38 pages).
Agilent Technologies Application Note 90B, "DC Power Supply Handbook", dated Oct. 1, 2000 (5925-4020) (126 pages).
Application Note 1554, "Understanding Linear Power Supply Operation", dated Feb. 4, 2005 (5989-2291EN) (8 pages).
On Semiconductor® Reference Manual Rev. 4 "Switch-Mode Power Supply", dated Apr. 2014 (SMPSRM/D) (73 pages).
IPhone 6 technical specification (retrieved Oct. 2015 from www.apple.com/iphone-6/specs/), (32 pages).
User Guide, "iPhone User Guide for IOS 8.4 Software", dated 2015 (019-00155/2015-06) by Apple Inc. (196 pages).
User manual numbered English (Eu), "SM-G925F SM-G925FQ SM-G925I User Manual" Mar. 2015 (Rev. 1.0) (145 pages).
Galaxy S6 Edge—Technical Specification (retrieved Oct. 2015 from www.samsung.com/us/explore/galaxy-s-6-features-and-specs) (1 page).
Publication entitled: "Android Tutorial", downloaded from tutorialspoint.com on Jul. 2014 (216 pages).
"iOS Tutorial", downloaded from tutorialspoint.com on Jul. 2014 (185 pages).
Yong Wang et al., "Towards Street-Level Client-Independent IP Geolocation", 2011 (14 pages).
Information Systems Audit and Control Association (ISACA) white paper entitled: "Geolocation: Risk, Issues and Strategies", 2011 (13 pages).
Muhammad Ayoub Kamal, Hafiz Wahab Raza, Muhammad Mansoor Alam, and Mazliham Mohd Su'ud, "Highlight the Features of AWS, GCP and Microsoft Azure that Have an Impact when Choosing a Cloud Service Provider", 'International Journal of Recent Technology and Engineering (IJRTE)' ISSN: 2277-3878, vol. 8, Jan. 2020 (10 pages).
Dac-Nhuong Le et al., "Cloud Computing and Virtualization", published 2018 by John Wiley & Sons, Inc. [ISBN 978-1-119-48790-6] (223 pages).
EBook authored by Gustavo Alessandro Andrade Santana, "Data Center Virtualization Fundamentals", published 2014 by Cisco Systems, Inc. (Cisco Press) [ISBN-13: 978-1-58714-324-3] (1406 pages).
IBM RedBook entitled: "IBM PowerVM Virtualization—Introduction and Configuration" published by IBM Corporation Jun. 2013 (790 pages).
IBM Corporation, "Power Systems—Introduction to virtualization", published 2009 (54 pages).
Cisco Systems, Inc. publication No. 1-587005-001-3 (Jun. 1999), "Internetworking Technologies Handbook", Chapter 7: "Ethernet Technologies", pp. 7-1 to 7-38 (38 pages).
Standard Microsystems Corporation (SMSC) data-sheet "LAN91C111 10/100 Non-PCI Ethernet Single Chip MAC + PHY" Data-Sheet, Rev. 15 (Feb. 20, 2004) (127 pages).
Chapter 2: "Structural Overview of ISP Networks" of the book entitled: "Guide to Reliable Internet Services and Applications", by Robert D. Doverspike, K.K. Ramakrishnan, and Chris Chase, published 2010 (ISBN: 978-1-84882-827-8) (76 pages).
Cisco Systems, Inc. document entitled: "An Introduction to IP Security (IPSec) Encryption", updated May 19, 2008 (26 pages).
RFC 1919, "Classical versus Transparent IP Proxies", Mar. 1996 (35 pages).
RFC 3143, "Known HTTP Proxy/Caching Problems", Jun. 2001 (32 pages).
Wessels, "Squid: The Definitive Guide," ISBN-10: 9780596001629, ISBN-13: 978-0596001629, O'Reilly Media; 1st Ed. (Jan. 1, 2004) (468 pages).
Article entitled: "ICP and the Squid web cache" published Apr. 1998 in 'IEEE Journal on Selected Areas in Communications' (vol. 16, Issue: 3, Apr. 1998) [DOI: 10.1109/49.669043] (25 pages).
Luotonen, "Web Proxy Servers," ISBN-10: 0136806120, ISBN-13: 978-0136806127, Prentice Hall; 1st Ed. (Dec. 30, 1997-1998) (452 pages).
Loutonen et al., "World-Wide Web proxies," Computer Networks and ISDN Systems 27, 147-154 (Elsevier Science B. V.) (1994) (8 pages).
ProxyList.net, as captured by the Wayback Machine (web.archive.org), on Jul. 17, 2011 (1 page).
Printout of VIP72 Youtube web page at https://www.youtube.com/watch?v=L0Hct2kSnn4, retrieved Nov. 21, 2019 (1 page).
VIP72 Scene Images extracted from VIP72.com/nvpnnet, MPEG-4 video recording of "nVPN.net | Double your Safety and use Socks5 +nVpn", accessed from https://www.youtube.com/watch?v=LoHct2kSnn4, published Sep. 11, 2011 (221 pages).
VIP72.com home page as of 2013 from Wayback Machine (3 pages).
AnchorFree and performed by AV-TEST GmbH entitled: "VPN Comparative Test", Jun. 15, 2018 (29 pages).
RFC 1750, "Randomness Recommendations for Security", Dec. 1994 (31 pages).
'True Random Number Generation IC RPG100 / RPG100B' available from FDK Corporation and described in the data sheet 'Physical Random number generator RPG100.RPG100B' Rev. 08 publication No. HM-RAE106-0812 (13 pages).
RFC 2637 entitled: "Point-to-Point Tunneling Protocol (PPTP)", Jul. 1999 (57 pages).
RFC 2661 entitled: "Layer Two Tunneling Protocol "L2TP"", Aug. 1999 (80 pages).
Cisco Systems, Inc. handbook 'Internetworking Technologies Handbook' (Jul. 1999) [No. 1-58705-001-3] chapter 18 entitled: "Virtual Private Networks", (pp. 18-1 to 18-4) (4 pages).
IBM Corporation Redbook series, entitled: "A Comprehensive Guide to Virtual Private Networks" "vol. I: IBM Firewall, Server and Client Solutions" [SG24-5201-00, Jun. 1998] (250 pages).
IBM Corporation Redbook series, entitled: "A Comprehensive Guide to Virtual Private Networks" "vol. II: IBM Nways Router Solutions" [SG24-5234-01, Nov. 1999] (642 pages).
IBM Corporation Redbook series, entitled: "A Comprehensive Guide to Virtual Private Networks" "vol. III: Cross-Platform Key and Policy Management" [SG24-5309-00, Nov. 1999] (686 pages).
RFC 4026 entitled: "Provider Provisioned Virtual Private Network (VPN) Terminology", Mar. 2005 (20 pages).
RFC 3022, Traditional IP Network Address Translator (Traditional NAT), Jan. 2001 (16 pages).
RFC 2068, Hypertext Transfer Protocol—HTTP/1.1, Jan. 1997 (162 pages).
HAProxy Architecture Guide, Version 1.2.18, Willy Tarreau, May 25, 2008 (23 pages).
HAProxy Reference Manual, Version 1.2.18, Willy Tarreau, May 25, 2008 (40 pages).
Rob Thubron, "Opera Builds Free and Unlimited VPN Service Directly Into Its Desktop Browser", Apr. 16, 2016 (6 pages).
Anthony Caruana, "3 Ways to Sneak Past Site Blocks", Mar. 12, 2018 (7 pages).
Jack Schofield, "How Can I Access Restriced UK Sites When I'm Overseas?", Oct. 3, 2014 (6 pages).
Huang, S. et al, "Middleboxes in the Internet: a HTTP perspective", 2017 Network Traffic Conference, IEEE, Jun. 21-23, 2017, pp. 1-9 (9 pages).
Goldbert, I. and Shostack A., "Freedom Network 1.0 Architecture and Protocols", Zero-Knowledge Systems Inc, Nov. 29, 1999 (23 pages).
Screenshot from Internet Archive demonstrating availability of Goldbert, I. and Shostack A., "Freedom Network 1.0 Architecture and Protocols" (1 page).
Fifield David et al., "Evading Censorship with Browser-Based Proxies", Privacy Enhancing Technologies 2012, vol. 7384, Berlin, Springer, 2012, pp. 239-258 (20 pages).

(56) References Cited

OTHER PUBLICATIONS

Skvorc, D. et al., "Performance Evaluation of Websocket Protocol for Implementation of Full-Duplex Web Streams", 37th International Convention MIPRO, IEEE, May 26-30, 2014, pp. 1003-1008 (6 pages).
Rao A. et al., "Using the Middle to Meddle with Mobile", CCIS, Dec. 2013 (14 pages).
Screenshot from Internet Archive demonstrating availability of Rao A. et al., "Using the Middle to Meddle with Mobile" (1 page).
Netronome Systems, Inc., "Examining SSL-encrypted Communications", White Paper, 2010 (8 pages).
Screenshot from Internet Archive demonstrating availability of Netronome Systems, Inc., "Examining SSL-encrypted Communications" (1 pages).
Peterson, Larry L. and Davie, Bruce S., "Computer Networks. A Systems Approach", 2nd Ed., San Francisco, 2000, p. 610 (18 pages).
Liu, C. et al., "Managing Internet Information Services", Sebastopol, O'Reilly & Associates, 1994, pp. 497-513 (19 pages).
Tanenbaum, Andrew S. and Wetherall, David J., "Computer Networks", 5th Ed., Boston, 2011 pp. 813-822 (12 pages).
Comer, D.E., "Internetworking with TCP/IP—vol. 1: Principles, Protocols and Architectures", 5th Ed., New Jersey, 2006, pp. 249-268 (22 pages).
Krishnamurthy, B. and Rexford, J., "Web Protocols and Practice" HTTP/1.1, networking protocols, caching and traffic measurement, Indianapolis, 2001, pp. 184-203 and 249-254 (29 pages).
Geosurf, "What is IP Rotation—Rotating Proxy Server", Nov. 12, 2017 (4 pages).
Bright Data, "The Ultimate Guide to Buying a Proxy Server", DataCenter Proxies, ProxyCompass Apr. 26, 2022 (23 pages).
Kozierok, The TCP/IP Guide—TCP Connection Preparation, Apr. 6, 2005 (3 pages).
Jovovic, Turning your HD TV into an Android SmartTV is easier than you think!, Feb. 26, 2013 (3 pages).
Allen, A Software Developer's Guide to HTTP Part III—Connections, Jan. 26, 2012 (10 pages).
Google Scholar: MorphMix citation in Alessandro Acquisti, et al., Digital Privacy: Theory, Technologies, and Practices (2007) (2 pages).
RFC 959, File Transfer Protocol (FTP), Oct. 1985 (69 pages).
RFC 821, Jonathan B. Postel, Simple Mail Transfer Protocol, Aug. 1982 (70 pages).
RFC 918, Post Office Protocol, Oct. 1984 (5 pages).
RFC 937, Post Office Protocol—Version 2, Feb. 1985 (24 pages).
Roger Dingledine et al., "The Free Haven Project: Distributed Anonymous Storage Service", Dec. 17, 2000 (23 pages).
Michael Freedman et al., "Tarzan: A Peer-to-Peer Anonymizing Network Layer", Nov. 18-22, 2002 (14 pages).
RFC 791, DARPA Internet Program Protocol Specification, Sep. 1981 (49 pages).
RFC 1034, "Domain Names—Concepts and Facilities", Nov. 1987 (55 pages).
RFC 1035, "Domain Names—Implementation and Specification", Nov. 1987 (54 pages).
RFC 1939, Post Office Protocol—Version 3, May 1996 (23 pages).
Pierre Laperdrix et al., "Mitigating browser fingerprint tracking: multi-level reconfiguration and diversification", 10th International Symposium on Software Engineering, 2015 IEEE (11 pages).
RFC 1180, A TCP/IP Tutorial, Jan. 1991 (28 pages).
RFC 4098 "Terminology for Benchmarking BGP Device Convergence in the Control Plane", Jun. 2005 (36 pages).
Cisco Systems, Inc. (Jul. 1999), publication No. 1-587005-001-3, "Internetworking Technologies Handbook" Chapter 5: "Routing Basics" (pp. 5-1 to 5-10) (5 pages).
Cisco Systems, Inc. (Jul. 1999), publication No. 1-587005-001-3, "Internetworking Technologies Handbook" Chapter 30: "Internet Protocols" (pp. 30-31 to 30-16) (16 pages).
Cisco Systems, Inc. (Jul. 1999), publication No. 1-587005-001-3, "Internetworking Technologies Handbook" Chapter 32: "IPv6" (pp. 32-1 to 32-6) (6 pages).
Cisco Systems, Inc. (Jul. 1999), publication No. 1-587005-001-3, "Internetworking Technologies Handbook" Chapter 45: "OSI Routing" (pp. 45-1 to 45-8) (8 pages).
Cisco Systems, Inc. (Jul. 1999), publication No. 1-587005-001-3, "Internetworking Technologies Handbook" Chapter 51: "Security" (pp. 51-1 to 51-12) (12 pages).
Redbook Document No. GG24-3376-07 "TCP/IP Tutorial and Technical Overview", ISBN 0738494682 8th Edition Dec. 2006 (1004 pages).
IBM Corporation, International Technical Support Organization Redbook Documents No. GG24-4756-00, "Local Area Network Concepts and Products: LAN Operation Systems and Management", 1st Edition May 1996 (216 pages).
Redbook Document No. GG24-4338-00, "Introduction to Networking Technologies", 1st Edition Apr. 1994 (222 pages).
Redbook Document No. SG24-2580-01 "IP Network Design Guide", 2nd Edition Jun. 1999 (324 pages).
RFC 2818, "HTTP Over TLS", May 2000 (7 pages).
RFC 9114, "HTTP/3", Jun. 2022 (57 pages).
IETF RFC 7231, " Hypertext Transfer Protocol (HTTP/1.1): Semantics and Content", Jun. 2014 (101 pages).
RFC 7540, "Hypertext Transfer Protocol Version 2 (HTTP/2)", May 2015 (96 pages).
Microsoft publication entitled: "Inside-Out Windows Server 2012", by William R. Stanek, published 2013 by Microsoft Press. (1552 pages).
"UNIX Tutorial" by tutorialspoint.com, downloaded on Jul. 2014 (152 pages).
"Windows Internals—Part 1" by Mark Russinovich, David A. Solomon, and Alex Ioescu, published by Microsoft Press in 2012 (752 pages).
"Windows Internals—Part 2", by Mark Russinovich, David A. Solomon, and Alex Ioescu, published by Microsoft Press in 2012 (672 pages).
Jerry Honeycutt, "Introducing Windows 8—An Overview for IT Professionals" Microsoft Press 2012 (168 pages).
Samsung Electronics Co., Ltd. presentation entitled: "Google™ Chrome OS User Guide" published 2011 (41 pages).
Application Note No. RES05B00008-0100/Rec. 1.00 by Renesas Technology Corp. entitled: "R8C Family—General RTOS Concepts", published Jan. 2010 (20 pages).
Walter Cedeno et al, "An Overview of Real-Time Operating Systems", The Association for Laboratory Automation, Feb. 2007 (6 pages).
Chapter 2 entitled: "Basic Concepts of Real Time Operating Systems" of a book entitled: "Hardware-Dependent Software—Principles and Practice", published 2009 [ISBN—978-1-4020-9435-4] by Springer Science + Business Media B.V. (304 pages).
Nicolas Melot, "Study of an operating system: FreeRTOS—Operating systems for embedded devices", (downloaded Jul. 2015) (39 pages).
Dr. Richard Wall entitled: "Carebot PIC32 MX7ck implementation of Free RTOS", (dated Sep. 23, 2013) (18 pages).
"FreeRTOS™ Modules" published in the www,freertos.org website dated 26.11.2006 (112 pages).
Rich Goyette of Carleton University as part of 'SYSC5701: Operating System Methods for Real-Time Applications', entitled: "An Analysis and Description of the Inner Workings of the FreeRTOS Kernel", published Apr. 1, 2007 (46 pages).
Sun Microsystem Inc., "tmpfs: A Virtual Memory File System" by Peter Snyder, downloaded on Jul. 2014 (8 pages).
"Microsoft Windows Driver Model (WDM)", by Mohamad (Hani) Atassy, submitted to Dr. Dennis R. Hafermann dated Jan. 28, 2002 (32 pages).
Melekam Tsegaye and Ricahrd Foss, both from Rhodes University, South-Africa, "A Comparison of the Linux and Windows Device Driver Architecture", downloaded from the Internet on Jul. 2014 (26 pages).

(56) References Cited

OTHER PUBLICATIONS

Prof. M. Saeed, "Welcome to Version 2.0 of the Win32 API Tutorial", published by Brook Miles, downloaded from the Internet on Jul. 2014 (108 pages).
IBM Corporation (headquartered in Armonk, New York) publication No. SC34-2597-03, "Device Drivers, Features, and Commands on Red Hat Enterprise Linux 6.3", IBM Corporation 2002, 2012, downloaded from the Internet on Jul. 2014 (580 pages).
Wofgang Mauerer, "Professional Linux Kernel Architecture", Wiley Publishing, Inc., published 2008 (1370 pages).
Peter Jay Salzman, Michael Burian, and Ori Pomerantz, "The Linux Kernel Module Programming Guide" ver. 2.6.4, from Rhodes University, South-Africa, dated May 18, 2007, downloaded from the Internet on Jul. 2014 (82 pages).
"Filter Driver Development Guide" Version 1.0a by Microsoft Corporation, dated 2004 (28 pages).
Brian Mariani, "Userland Hooking in Windows", presentation by High-Tech Bridge SA, dated Aug. 2011 (33 pages).
Brian Mariani, "Inline Hooking in Windows", presentation by High-Tech Bridge SA, dated Sep. 2011 (26 pages).
Marko Vuskovic 1998-2002 publication 'Operating Systems', Chapter 9: "Interprocess Communication" (20 pages).
SAS Institute Inc. Share Session 5958 tutorial 'C Socket Programming Tutorial', "Writing Client / Server Programs in C Using Sockets (A Tutorial) Part I", by Greg Granger, dated Feb. 1998 (31 pages).
Alan Grosskurth and Michael W. Godfrey of the University of Waterloo in Canada, "Architecture and evolution of the modern web browser", Jun. 20, 2006 (24 pages).
"Step by Step Tutorials for Microsoft Internet Explorer 8 Accessibility Options", Microsoft 2009 publication (25 pages).
Apple publication entitled: "Safari Web Content Guide", dated Oct. 12, 2011 (113 pages).
John Wiley & Sons, Inc. (ISBN—978-1-118-00818-8), "HTML & CSS—Design and Build Websites", by Jon Duckett, 2011 (514 pages).
IETF RFC 1866, "Hypertext Markup Language—2.0", Nov. 1995 (77 pages).
World Wide Web Consortium (W3C) Proposed Recommendation, "HTML 4.01 Specification", Aug. 24, 1999 (389 pages).
W3C Editor's Draft, "HTML5 Reference—The Syntax, Vocabulary, and APIs of HTML5", Aug. 9, 2010 (91 pages).
W3C Editor's Draft, "HTML 5.1 Nightly", (Mar. 23, 2016) (24 pages).
IETF RFC 2318, "The text/css Media Type", Mar. 1998 (5 pages).
W3C recommendation, "Cascading Style Sheets Level 2 Revision 1 (CSS 2.1) Specification", (Jun. 7, 2011) (487 pages).
YouTube video clip entitled "nVpn.net | Double your Safety and use Socks5 + nVpn" <https://www.youtube.com/watch?v=L0Hct2kSnn4>.
Screen captures from YouTube video clip entitle "nVpn.net | Double your Safety and use Socks5 + nVpn" 38 pages, last accessed Nov. 20, 2018 <https://www.youtube.com/watch?v=L0Hct2kSnn4>.
Screen captures from YouTube video clip entitle "Andromeda" 47 pages, publicly known and available as of at least 2011 <https://www.youtube.com/watch?v=yRRYpFLbKNU>.
Screen captures from YouTube video clip entitle "Change Your Country IP Address & Location with Easy Hide IP Software" 9 pages, publicly known and available as of at least 2011, <https://www.youtube.com/watch?v=ulwkf1sOfdA and https://www.youtube.com/watch?v=iFEMT-09DTc>.
Spyeye, https://www.symantec.com/security-center/writeup/2010-020216-0135-9; http://securesql.info/riskyclouds/ spyeye-user-manual; known as of at least 2010.
CoralCDN ("CoralCDN"), https://pdos.csail.mit.edu/6.824/papers/freedman-coral.pdf (14 Pages).
YouTube video clip entitled "Andromeda" <https://www.youtube.com/watch?v=yRRYpFLbKNU>.
YouTube video clip entitled "Change Your Country IP Address & Location with Easy Hide IP Software" <https://www.youtube.com/watch?v=ulwkf1sOfdA and https://www.youtube.com/watch?v=iFEMT-o9DTc>.
RFC 2409 entitled: "The Internet Key Exchange (IKE)", Nov. 1998 (41 pages).
RFC 4306 entitled: "Internet Key Exchange (IKEv2) Protocol", Dec. 2005 (99 pages).
RFC 2631 entitled: "Diffie-Hellman Key Agreement Method", Jun. 1999 (12 pages).
RFC 760, DOD Standard Internet Protocol, Jan. 1980 (46 pages).
Gavin Gear, Windows 8 Task Manager In-Depth, Jun. 6, 2013 (32 pages).
Greg Shultz, Windows Vista's Task Manager: The harder-to-detect changes—TechRepublic, Feb. 21, 2007 (16 pages).
RFC 1122, Requirements for Internet Hosts—Communication Layers, Oct. 1989 (116 pages).
Andrei Popescu, Google, Inc, Geolocation API Specification, W3C Working Draft Dec. 22, 2008 (8 pages).
Andrei Popescu, Google, Inc, Geolocation API Specification, W3C Recommendation Oct. 24, 2013 (10 pages).
IETF RFC 2914, "Congestion Control Principles", Sep. 2000 (17 pages).
William R. Stanek, Introducing Microsoft Windows Vista 81, 2006 (9 pages).
IETF RFC 2460 "Internet Protocol, Version 6 (IPv6)", Dec. 1998 (39 pages).
IETF RFC 793 "Protocol Specification", Sep. 1981 (90 pages).
IETF RFC 1349 "Type of Service in the Internet Protocol Suite", Jul. 1992 (28 pages).
IEEE Std 802-2001, IEEE Standard for Local and Metropolitan Area Networks: Overview and Architecture, Feb. 7, 2002 (47 pages).
Scott Lowe, Use Resource Monitor to monitor network performance—TechRepublic, Jul. 29, 2011 (11 pages).
Kei Suzuki, a study on Cooperative Peer Selection Method in P2P Video Delivery, vol. 109, No. 37, IEICE Technical Engineers Report, The Institute of Electronics, Information and Communication, May 14, 2009.
Paper by Oracle Corporation, entitled: "Oracle Sharding: Linear Scalability, Fault Isolation and Geo-distribution for Web-scale OLTP Applications", Apr. 2017 (22 pages).
MongoDB Documentation Project paper entitled: "Sharding and MongoDB", Jan. 12, 2015 (Release 2.8.0-rc3) (83 pages).
RFC 4634 entitled: "US Secure Hash Algorithms (SHA and HMAC-SHA)", Jul. 2006 (108 pages).
RFC 3874 entitled: "A 224-bit One-way Hash Function: SHA-224", Sep. 2004 (6 pages).
Jun Wang, Wei Liu, Sanjiv Kumar, and Shih-Fu Chang, to the Proceedings of the IEEE (http://arxiv.org/abs/1509.05472v1) entitled: "Learning to Hash for Indexing Big Data—A Survey", Submitted on Sep. 17, 2015 (22 pages).
Josef Pieprzyk and Babak Sadeghiyan, by Springer-Verlag [ISBN 3-540-57500-6] entitled: "Design of Hashing Algorithms", published 1993 (208 pages).
Berners-Lee et al., RFC 1945, Hypertext Transfer Protocol, HTTP/1.0 (May 1996) (60 pages).
Certification dated Nov. 8, 2019 of Anjali Shresta of Google, Proof of Date for VIP72 Youtube web page and video (4 pages).
Data-sheet 'Datasheet SQ-SEN-200 Omnidirectional Tilt and Vibration Sensor' Updated Aug. 3, 2009 (6 pages).
RFC 3053 (Jan. 2001) IETF named: IPV6 Tunnel Broker, Apr. 1999.
Cisco Validated Design document entitled: "Building Automation System over IP (BAS/IP) Design and Implementation Guide" by Cisco Systems and Johnson Controls, Aug. 15, 2008 (107 pages).
Amin Tootoonchian, "Tutorial on Socket Programming", University of Toronto, Department of Computer Science, downloaded on Aug. 2014 (27 pages).
Proxychains source code (Oct. 20, 2004) (53 pages).
Selected pages from the website proxifier.com as of Feb. 2008 (15 pages).

(56) References Cited

OTHER PUBLICATIONS

RFC 2817, "Upgrading to TLS Within HTTP/1.1" to R. Khare et al. dated May 2000 (13 pages).
Bernardo, V. and Domingos, D., "Web-based Fingerprinting Techniques" published 2016 in Proceedings of the 13th International Joint Conference on e-Business and Telecommunications (ICETE 2016)—vol. 4: SECRYPT, pp. 271-282 [DOI: 10.5220/0005965602710282 ISBN: 978-989-758-196-0], (12 pages).
A study entitled: "Survey on Device Fingerprinting" published 2019 by the 'Agencia Espanola Proteccion Datos' (33 pages).
Pierre Laperdrix et al. , "Browser Fingerprinting: A survey", published Nov. 2019 in arXiv, vol. 1, No. 1, [https://doi.org/10.48550/arXiv.1905.01051] (32 pages).
Yinzhi Cao Lehigh, Song Li Lehigh, and Erik Wijmans, "(Cross-)Browser Fingerprinting via OS and Hardware Level Features", published 2017 in NDSS '17, Feb. 26-Mar. 1, 2017, San Diego, CA, USA [ISBN 1-1891562-46-0; http://dx.doi.org/10.14722/ndss.2017.23152] (15 pages).
Gunes Acar et al., "The Web Never Forgets: Persistent Tracking Mechanisms in the Wild", presented at CCS'14, Nov. 3-7, 2014, Scottsdale, Arizona, USA, [ACM 978-1-4503-2957-6/14/11 . . . $15.00; http://dx.doi.org/10.1145/2660267.2660347], (16 pages).
Keaton Mowery and Hovav Shacham of the Department of Computer Science and Engineering University of California, San Diego La Jolla, California, USA, "Pixel Perfect: Fingerprinting Canvas in HTML5" by published in Proceedings of W2SP 2012 [IEEE Computer Society, May 2012], (12 pages).
International Standard ISO 8879-1986 entitled: "Information Processing—Text and Office Systems—Standard Generalized Markup Language (SGML)—First Edition", Dec. 6, 1998 (22 pages).
Michel Goossens and Janne Saarela, "A practical introduction to SGML", CERN, CN Division of Geneva, Switzerland (69 pages).
HTTP Wikipedia, year 2024 retrieved from Internet Mar. 22, 2024 (21 pages).
"Private Proxy Goes Global With a Netherlands Anonymous Proxy Server" University of South Florida Feb. 22, 2008 (1 page).
Li et at, "Toward the Identification of Anonymous Web Proxies", University of Cambridge & University of Genoa, Apr. 3, 2009 (2 pages).
Duane Wessels, "ICP and the Squid Web Cache", Aug. 13, 1997 (25 pages).
"Anonymizing Proxies: What They Are and who They Work"—Enterprise Services Mar. 2013 (Year: 2012) (2 pages).
Reed et al, "Anonymous Connections and Onion Routing", Naval Research Laboratory, Mar. 1998 https://www.onion-router.net/Publications/JSAC-1998.pdf (Year: 1998).
David Gourley et al, "HTTP-The-Definitive-Guide", O'Reilly Media, Inc. Sep. 27, 2002 (658 pages).
Floss Manuals, "Circumvention Tools", Free Software Foundation Inc., May 31, 2021 (240 pages).
David Fifield et al, "Blocking resistant communication through domain fronting", Proceeding on Privacy Enhanching Technologies 2015, May 15, 2015 (19 pages).
Wang Qiyan et al, "CensorSpoofer: Asymmetric Communication with IP Spoofing for ensorship-Resistant Web Browsing", Mar. 9, 2012 (16 pages).
R. Fielding et al, RFC 2616: Hypertext Transfer Protocol—HTTP/1.1, Jun. 1999, retrieved from the Internet http://rcf-editor.org [retrieved Apr. 15, 2002].
"On the leakage of personally identifiable information via online social networks", Wills et al. AT&T, Apr. 2009 http://www2.research.att.com/-bala/papers/wosn09.pdf*.
RFC 2764 entitled: "A Framework for IP Based Virtual Private Networks", Feb. 2000 (62 pages).
RFC 3931 entitled: "Layer Two Tunneling Protocol—Version 3 (L2TPv3)", Mar. 2005 (94 pages).
RFC 2547 entitled: "BGP/MPLS VPNs", Mar. 1999 (25 pages).
Cisco Systems, Inc. publication No. 1-587005-001-3 (Jun. 1999), "Internetworking Technologies Handbook", Chapter Chapter 18: "Multiservice Access Technologies" (pp. 18-1 to 18-10) (10 pages).
Cisco Systems, Inc. handbook 'Internetworking Technologies Handbook' (Jul. 1999) [No. 1-58705-001-3] chapter 19 entitled: "Voice / Data Integration Technologies" (pp. 19-1 to 19-30) (30 pages).
RFC 1323, "TCP Extensions for High Performance", May 1992 (37 pages).
RFC 6323, "Sender RTT Estimate Option for the Datagram Congestion Control Protocol (DCCP)", Jul. 2011 (13 pages).
Karn, Phil and Craig Partridge in ACM SIGCOMM '87—Computer Communication Review publication, entitled: "Improving Round-Trip Time Estimates in Reliable Transport Protocols", (8 pages).
RFC 792, "Internet Control Message Protocol: DARPA Internet Program Protocol Specification", Sep. 1981 (21 pages).
RFC 1885, "Internet Control Message Protocol (ICMPv6) for the Internet Protocol Version 6 (IPv6) Specification", Dec. 1995 (20 pages).
RFE 2463, "Internet Control Message Protocol (ICMPv6) for the Internet Protocol Version 6 (IPv6) Specification", Dec. 1998 (18 pages).
RFC 6520, "Transport Layer Security (TLS) and Datagram Transport Layer Security (DTLS) Heartbeat Extension", Feb. 2012 (9 pages).
Telecom Regulatory Authority, entitled: "WiFi Technology" , Jul. 2003 (60 pages).
RFC 2131, entitled "Dynamic Host Configuration Protocol", Mar. 1997 (45 pages).
RFC 3315, entitled: "Dynamic Host Configuration Protocol for IPV6 (DHCPv6)", Jul. 2003 (101 pages).
RFC 4388 entitled: "Dynamic Host Configuration Protocol (DHCP) Leasequery" Feb. 2006 (27 pages).
White paper entitled: "Home Gateway" by Wipro Technologies (20 pages).
Home Gateway Initiative (HGI) documents entitled: "Home Gateway Technical Requirements: Residential Profile", Version 1.0, HGI guideline paper entitled: "Remote Access" Version 1.01, May 18, 2008 (19 pages).
Home Gateway Initiative (HGI) documents entitled: "Requirements for an energy efficient home gateway" HGI-RD009-R3, Oct. 14, 2010 (66 pages).
RFC 3467 entitled: "Role of the Domain Name System (DNS)", Feb. 2003 (31 pages).
RFC 6195 entitled: "Domain Name System (DNS) IANA Considerations", Mar. 2011 (17 pages).
RFC 1591 entitled: "Domain Name System Structure and Delegation", Mar. 1994 (7 pages).
RFC 1928, entitled: "SOCKS Protocol Version 5", Mar. 1996 (9 pages).
RFC 1929, entitled: "Username/Password Authentication for SOCKS V5", Mar. 1996 (2 pages).
RFC 1961, entitled: "GSS-API Authentication Method for SOCKS Version 5", Jun. 1996 (9 pages).
RFC 3089, entitled: "A SOCKS-based IPV6/IPV4 Gateway Mechanism", Apr. 2001 (12 pages).
RFC 6455 entitled: "The WebSocket Protocol", Dec. 2011 (71 pages).
RFC 2663 entitled: "IP Network Address Translator (NAT) Terminology and Considerations", Aug. 1999 (30 pages).
RFC 3715 entitled: "IPsec-Network Address Translation (NAT) Compatibility Requirements", Mar. 2004 (18 pages).
RFC 3947 entitled: "Negotiation of NAT-Traversal in the IKE", Jan. 2005 (16 pages).
RFC 5128 entitled: "State of Peer-to-Peer (P2P) Communication across Network Address Translators (NATs)", Mar. 2008 (32 pages).
RFC 5245 entitled: "Interactive Connectivity Establishment (ICE): A Protocol for Network Address Translator (NAT) Traversal for Offer/Answer Protocols", Apr. 2010 (117 pages).
RFC 5389 entitled: "Session Traversal Utilities for Nat (STUN)", Oct. 2008 (51 pages).
RFC 7350 entitled: "Datagram Transport Layer Security (DTLS) as Transport for Session Traversal Utilities for NAT (STUN)", Aug. 2014 (16 pages).

(56) References Cited

OTHER PUBLICATIONS

Bryan Ford (of Massachusetts Institute of Technology), Pyda Srisuresh (of Caymas Systems, Inc.) and Dan Kegel, "Peer-to-Peer Communication Across Network Address Translators", published 2008 (14 pages).
Huynh Cong Phuoc, Ray Hunt, and Andrew Mckenzie (all of University of Canterbury, Chistchurch, New Zealand), "NAT Traversal Techniques in Peer-to-Peer Networks", Jan. 2008 (5 pages).
RFC 7157 "IPv6 Multihoming without Network Address Translation", Mar. 2014 (22 pages).
Chapter 20: "Wireless Technologies" of the publication No. 1-587005-001-3 by Cisco Systems, Inc. (Jul. 1999) "Internetworking Technologies Handbook" (42 pages).
Book published 2005 by Pearson Education, Inc. William Stallings [ISBN: 0-13-191835-4] "Wireless Communications and Networks—second Edition" (569 pages).
Carles Gomez et al., "Overview and Evaluation of Bluetooth Low Energy: An Emerging Low-Power Wireless Technology", published 2012 in Sensors [ISSN 1424-8220] [Sensors 2012, 12, 11734-11753; doi: 10.3390/s120211734] (20 pages).
Book authored by Owen Bishop entitled: "Electronics—Circuits and Systems" Fourth Edition, published 2011 by Elsevier Ltd. [ISBN—978-0-08-096634-2] (381 pages).
Book entitled: "Practical Design Techniques for Sensor Signal Conditioning", by Analog Devices, Inc., 1999 (ISBN-0-916550-20-6) (366 pages).
Book entitled: "Fundamentals of Industrial Instrumentation and Process Control", by William C. Dunn, 2005, The McGraw-Hill Companies, ISBN: 0-07-145735-6 (337 pages).
Book entitled: "Sensor technology Handbook", Edited by Jon Wilson, by Newnes-Elsevier 2005, ISBN:0-7506-7729-5 (702 pages).
Book entitled: "Sensors and Control Systems in manufacturing", Second Edition 2010, by Sabrie Soloman, The McGraw-Hill Companies, ISBN: 978-0-07-160573-1 (625 pages).
SAE J3016, entitled: "Taxonomy and Definitions for Terms Related to On-Road Motor Vehicle Automated Driving Systems" [Revised Sep. 2016] (35 pages).
Book published by Robert Bosch GmbH, "Bosch Automotive Electric and Automotive Electronics", (5th Edition, Jul. 2007) (530 pages).
Vineet P. Aras of the Department of Electrical Engineering, Indian Institute of Technology Bombay, "Design of Electronic Control Unit (ECU) for Automobiles—Electronic Engine Management system", M. Tech. Project first stage report (EE696) dated Jul. 2004 (51 pages).
National Instruments paper entitled: "ECU Designing and Testing using National Instruments Products", published Nov. 7, 2009 (9 pages).
Brochure by Sensor-Technik Wiedemann Gmbh entitled "Control System Electronics", dated 20110304 GB (20 pages).
Data Sheet Document No. MPC5748G Rev. 2 entitled: "MPC5748 Microcontroller Datasheet", Freescale Semiconductor, Inc. (headquartered in Tokyo, Japan) May 2014 (67 pages).
ISO 11898-2:2003 entitled: "Road vehicles—Controller area network (CAN)—Part 2: High-speed medium access unit" (26 pages).
ISO 11898-5:2007 entitled: "Road vehicles—Controller area network (CAN)—Part 5: High-speed medium access unit with low-power mode" (28 pages).
ISO 11898-4:2004 entitled: "Road vehicles—Controller area network (CAN)—Part 4: Time-triggered communication" (40 pages).
The standard ISO 11992-1:2003 entitled: "Road vehicles—Interchange of digital information on electrical connections between towing and towed vehicles—Part 1: Physical and data-link layer" (28 pages).
SAE J1939 Surface Vehicle Recommended Practice entitled: "Recommended Practice for a Serial Control and Communication Vehicle Network", issued on Apr. 2000 (257 pages).
SAE J1939-01 Surface Vehicle Standard entitled: "Recommended Practice for Control and Communication Network for On-Highway Equipment", Sep. 2000 (7 pages).
SAE J1939-11 Surface Vehicle Recommended Practice entitled: "Physical Layer, 250K bits/s, Twisted Shielded Pair", issued on Dec. 1994 (31 pages).
SAE J1939-15 Surface Vehicle Recommended Practice entitled: "Reduced Physical Layer, 250K bits/s, Un-Shielded Twisted Pair (UTP)", issued on Nov. 2003 (19 pages).
SAE J2411_200002 entitled: "Single Wire Can Network for Vehicle Applications", issued on Feb. 2000 (33 pages).
ISO 9141 "LIN Specification Package—Revision 2.2A" by the LIN Consortium (dated Dec. 31, 2010) (194 pages).
Application Note AN-1123 (AN10035-0-2/12(0) Rev. 0) entitled: "Controller Area Network (CAN) Implementation Guide—by Dr. Conal Watterson", Analog Devices, Inc., published 2012 (16 pages).
Product data sheet entitled: "TJA1044 High-speed CAN transceiver with Standby mode - Rev. Jul. 4-10, 2015—Product data sheet", Jul. 10, 2015 (22 pages).
Product Data Sheet entitled: "TJA1055 Enhanced fault-tolerant CAN transceiver—Rev. Dec. 5-6, 2013—Product data sheet", (document Identifier TJA1055, date of release: Dec. 6, 2013) (26 pages).
A specification entitled: "CAN with Flexible Data-Rate", by Robert Bosch GmbH, Version 1.0, released on Apr. 17, 2012 (34 pages).
Automation article by Florian Hatwich entitled: "Bit Time Requirements for CAN FD" (6 pages).
Automation article by Florian Hatwich entitled: "Can with Flexible Data-Rate" (9 pages).
National Instruments article entitled: "Understanding CAN with Flexible Data-Rate (CAN FD)", published Aug. 1, 2014 (2 pages).
Application Note AN4389 (document No. DocD025493 Rev 2) entitled: "SPC57472/SPC57EM80 Getting Started", published 2014 (53 pages).
Data Sheet DS20005284A entitled: "MCP2561/2FD—High-Speed CAN Flexible Data Rate Transceiver", published 2014 [ISBN—978-1-63276-020-3] (32 pages).
Data-Sheet Document No. MC33689 Rev. 8.0 entitled: "System Basis Chip with LIN Transceiver", dated Sep. 2012 (31 pages).
Franzis Verlag Gmbh, edited by Prof. Dr. Ing. Andreas Grzemba, entitled: "MOST—The Automotive Multimedia Network—From MOST25 to MOST 150", [ISBN—978-3-645-65061-8] published 2011 (337 pages).
MOST Dynamic Specification by MOST Cooperation Rev. 3.0.2 entitled: "MOST—Multimedia and Control Networking Technology", dated Oct. 2012 (82 pages).
MOST Specification Rev. 3.0 E2 by MOST Cooperation, dated Jul. 2010 (262 pages).
FlexRay consortium publication entitled: "FlexRay Communications System—Protocol Specification—Version 3.0.1", Oct. 2010 (341 pages).
Lorenz, Steffen entitled: "The FlexRay Electrical Physical Layer Evolution", Carl Hanser Verlag Gmbh 2010 publication (Automotive 2010) (6 pages).
National Instruments Corporation Technical Overview Publication entitled: "FlexRay Automotive Communication Bus Overview", Aug. 21, 2009 (8 pages).
ISO 14230-1:2012 entitled: "Road vehicles—Diagnostic communication over K-Line (Dok-Line)—Part 1: Physical layer" (12 pages).
ISO 14230-2:2013 entitled: "Road vehicles—Diagnostic communication over K-Line (Dok-Line)—Part 2: Data link layer" (28 pages).
ISO 14230-3:1999 entitled: "Road vehicles—Diagnostic systems—Keyword Protocol 2000—Part 3: Application layer" (11 pages).
ISO 14230-4:2000 entitled: "Road vehicles—Diagnostic systems—Keyword Protocol 2000—Part 4: Requirements for emission-related systems" (10 pages).
Yunxin (Jeff) Li, "An Overview of the DSRC/WAVE Technology", (Eveleigh, NSW 2015, Australia) downloaded from the Internet on Jul. 2017 (15 pages).
ARIB STD—T75 Version 1.0, "Dedicated Short-Range Communication System—Arib Standard Version 1.0", published Sep. 2001 by Association of Radio Industries and Businesses Kasumigaseki, Chiyoda-ku, Tokyo 100-0013, Japan (469 pages).

(56) References Cited

OTHER PUBLICATIONS

Datasheet # SWRS158A entitled: "CC2650 SimpleLink™ Multistandard Wireless MCU", by Texas Instrument, published Feb. 2015, Revised Oct. 2015 (59 pages).
Texas Instrument 2015 publication # SWRT022 entitled: "SimpleLink™ Ultra-Low Power—Wireless Microcontroller Platform" (6 pages).
Michael K. Reiter and Aviel D. Rubin, "Crowds: Anonymity for Web Transactions", ACM Transactions on Information and System Security, Nov. 1998 (27 pages).
Rennhard, Marc, "MorphMix—A Peer-to-Peer based System for Anonymous Internet Access", 2004 (307 pages).
RFC 2187, "Application of Internet Cache Protocol (ICP), version 2", Sep. 1997 (24 pages).
RFC 1738, "Uniform Resource Locators (URL)", Dec. 1994 (25 pages).
RFC 1918, "Address Allocation for Private Internets", Feb. 1996 (9 pages).
Doxa Chatzopoulou and Marios Kokkodis, entitled: "IP Geolocation", Jan. 2007 (7 pages).
Jayaprabha Bendale and Prof. J. Ratanaraj Kumar, article (ISSN:0975-9646), entitled: "Review of Different IP Geolocation Methods and Concepts", published in (IJCSIT) International Journal of Computer Science and Information Technologies, vol. 5 (1), 2014, 436-440, downloaded from the Internet Aug. 2017 (5 pages).
Andrew Daviel et al., Geographic extensions for HTTP transactions, Dec. 7, 2007 (15 pages).
Media Presentation. Iso/Iec 23009-1:2012(E), Mpeg-Dash standard, entitled: "Information technology - Dynamic adaptive streaming over http (dash)—Part 1: Media presentation description and segment formats", Jan. 5. 2012 (133 pages).
Cooper et al., RFC 3040, Internet Web Replication and Caching Taxonomy (Jan. 2001) (32 pages).
Marek's—totally not insane—idea of the day', entitled: "Dissecting SSL handshake", Jun. 2012 (9 pages).
Netronome Systems, Inc. white-paper, entitled: "Examining SSL-encrypted Communications", published 2010 (8 pages).
RFC 2544 entitled: "Benchmarking Methodology for Network Interconnect Devices", Mar. 1999 (32 pages).
ITU-T Y.1564 entitled: "Ethernet Service Activation Test Methodology", Feb. 2016 (38 pages).
Data-sheet LIS302DL STMicroelectronics NV, 'MEMS motion sensor 3-axis—±2g/±8g smart digital output "piccolo" accelerometer', Rev. 4, Oct. 2008 (42 pages).
Archived Internet Society webpage for TCP Keepalive Howto, available at https://web.archive.org/web/20080611153148/https://tldp.org/HOWTO/TCP-Keepalive-HOWTO/index.html, Jun. 11, 2008 (15 pages).
Authors Alain Durand (IMAG) et al., "IPv6 Tunnel Broker <draft-ietf-ngtrans-broker-00.txt>", Internet Society (ISOC), Apr. 2, 1999 (14 pages).
Sophie Gastellier-Prevost et al., "Defeating pharming attacks at the client-side", Network and System Security (NSS), Sep. 6, 2011 (8 pages).
Bharat K et al. "Mirror, Mirror on the Web: a study of host pairs with replicated content", Computer Networks, Amsterdam, vol. 31, No. 11-16, May 17, 1999 (12 pages).
European Search Report of EP 20190259 dated Dec. 16, 2020.
European Search Report of EP 20195090 dated Dec. 8, 2020.
Perino Diego et al., "ProxyTorrent: Untangling the Free HTTP(S) Proxy Ecosystem", The Web Conference 2018, Apr. 23, 2018, pp. 197-206 (10 pages).
"Tunneling for Transparency: A Large-Scale Analysis of End-to-End Violations in the Internet", Taejoong Chung, David Choffnes, and Alan Mislove, all of Northeastern University, IMC 2016, Nov. 14-16, 2016, Santa Monica, CA, USA, [DOI: http://dx.doi.org/10.1145/2987443.2987455] (16 pages).
N. Gautam, "Performance Analysis and Optimization of Web Proxy Servers and Mirror Sites", European Journal Operational Research 142 (2002), 396-418 (23 pages).
https faq, The HTTPS-Only Standard, Jul. 6, 2015 (3 pages).
Perspective Access Networks, A dissertation presented by Geoffrey Lewis Goodell, Jul. 2006 (292 pages).
Perspective Access Networks, by Geoffrey Lewis Goodell, 2006 (1 page).
Perspective access networks, by Geoffrey Lewis Goodell, Dissertation Abstracts International. vol. 67, No. 12, 2006 (2 pages).
Dissertation Abstracts International. by ProQuest, vol. 65, No. 05, Nov. 2004 (11 pages).
Roger Dingledine and Nick Mathewson, Design of a blocking-resistant anonymity system, Tor Tech Report 2006-11-001 (25 pages).
Printout of 2006 capture history of afs.eecs.harvard.edu/ goodell/thesis.pdf from Internet Archive's Wayback Machine (2 pages).
Printout of 2007 capture history of afs.eecs.harvard.edu/ goodell/thesis.pdf from Internet Archive's Wayback Machine (2 pages).
Printout of capture of http://serifos.eecs.harvard.edu/cgi-bin/blossom.pl dated Sep. 5, 2006, from Internet Archive's Wayback Machine (1 page).
Printout of https://ethanzuckerman.com/2006/04/06/blossom-tor-and-touring-the-internets/, a blog post entitled: "Blossom, Tor and touring the internets" dated Apr. 6, 2006 (9 pages).
Printout of search on Google Scholar for "Perspective Access Networks", date unknown (1 page).
Printout of capture of http://afs.eecs.harvard.edu/ goodlell/blossom/bib/author.html dated Sep. 2, 2006, from Internet Archive's Wayback Machine (45 pages).
Printout of capture history of http://afs.eecs.harvard.edu/ goodell/blossom/bib/author.html from Internet Archive's Wayback Machine, date unknown (2 pages).
Printout of capture of http://afs.eecs.harvard.edu/ goodlell/blossom/ dated Sep. 2, 2006, from Internet Archive's Wayback Machine (2 pages).
Printout of capture of http://youtube.com/ dated Aug. 29, 2005, from Internet Archive's Wayback Machine (2 pages).
RFC 2186, Internet Cache Protocol (ICP), version 2, Sep. 1997 (9 pages).
Roger Dingledine, Nick Mathewon, and Paul Syverson, Tor: The Second-Generation Onion Router, In Proceedings of the 13th conference on USENIX Security Symposium, vol. 13, 2004 (17 pages).
Goldschlag D.M., Reed M.G., Syverson P.F., Hiding Routing Information, Lecture Notes in Computer Science, vol. 1174, Springer, Berlin, Heidelberg, 1996 (14 pages).
Schneier, Anonymity and Tor Network, Schneier on Security Sep. 20, 2007, https://www.schneier.com/blog/archives/2007/09...html, p. 1-22, accessed Apr. 26, 20 (22 pages).
Reed M.G., Syverson P.F. Goldschlag D.M., Protocols Using Anonymous Connections: Mobile applications, Lecture Notes in Computer Science, vol. 1361, Springer, Berlin, Heidelberg, 1997 (11 pages).
Nick Mathewon, and Roger Dingledine, Location Diversity in Anonymity Networks, In Proceedings of the 2004 ACM workshop on Privacy in the electronic society. Association for Computing Machinery, New York, NY, USA 66-67 (11 pages).
Mathew Edman and Paul Syverson, As-Awareness in Tor Path Selection, In Proceedings of the 16th ACM conference on Computer and Communication Security (CCS 09). Association for Computing Machinery, New York, NY, USA 380-389 (10 pages).
Banerjee, Priyanka, Anonymous Routing in Wireless Networks: Onion Routing, Team Project Report 2007, p. 1-16 (16 pages).
McCoy D., Bauer K., Grunwald D., Kohno T., Sicker D., Shining Light in Dark Places: Understandings the Tor Network, Lecture Notes in Computer Science, vol. 5134, Springer, Berlin, Heidelberg, 2008 (14 pages).
Harry Newton, Newton's Telecom Dictionary, Mar. 2004, CNP Books, p. 182, 183, 433, 434, 435, 437, 665, 737 (10 pages).
Chakravarty et al., Identifying Proxy Nodes in a Tor Anonymization Circuit, 2008, IEEE International Conference on Signal Image Technology and Internet Based Systems, Bali, 2008, pp. 633-639 (7 pages).
Orfali et al., Client/Server Survival Guide, 3rd ed., John Wiley and Sons Inc. 1999, p. 15 (3 pages).
Reed M.G., Syverson P.F., Goldschlag D.M., Proxies for Anonymous Routing, In Proceedings 12th Annual Computer Security Applications Conference, 1996, pp. 95-104 (10 pages).

(56) References Cited

OTHER PUBLICATIONS

Dejuan Lukan, "Achieving Anonymity with Tor Part 2: Proxies and DNS Servers", InfoSec Resource, Aug. 16, 2012 (20 pages).
Rajkurnar Buyya et al., "Content Delivery Networks" © 2008 Springer-Verlag Berlin Heidelberg (392 pages).
Request for Comments 1123, "Requirements for Internet Hosts—Application and Support", Oct. 1989 (98 pages).
Andrew S. Tanenbaum, "Computer Networks", 4th Edition, 2003 (908 pages).
Chou Chie Ming et al., "Triggering and Relay Node Selection for Self-User Relaying", IEEE Communications Letters, vol. 19, No. 11, Nov. 1, 2015 pp. 2029-2032 (4 pages).
Request for Comments 2396, "Uniform Resource Identifiers (URI): Generic Syntax", Aug. 1998 (40 pages).
Ashish Mohta, worldproxy202—Proxy that's pretty useful, available at https://web.archive.org/web/20080601050011/http://www.technospot.net/blogs/worldproxy202-proxy-that's-pretty-useful, Jun. 1, 2006 (6 pages).
Wikipedia article on "Routing", https://en.wikipedia.org/wiki/Routing Jul. 26, 2021 (8 pages).
Dejan Lukan, Achieving Anonymity with Tor Part 2: Proxies and DNA Servers, INFOSEC Aug. 16, 2012 (17 pages).
Kim et al, "RAD: Recipient Anonymous Data Delivery Based on Public Routing Proxies" Computer Notworks, vol. 55, Issue 15 Elsevier, Science Direct, Oct. 27, 2011 (16 pages).
Third-party submission under 37 CFR 1.290 filed on Jul. 23, 2019 and entered in U.S. Appl. No. 16/140,749.
Third-party submission under 37 CFR 1.290 filed on Jul. 23, 2019 and entered in U.S. Appl. No. 16/140,785.
Third-party submission under 37 CFR 1.290 filed on Jul. 23, 2019 and entered in U.S. Appl. No. 16/214,433.
Third-party submission under 37 CFR 1.290 filed on Jul. 23, 2019 and entered in U.S. Appl. No. 16/214,451.
Third-party submission under 37 CFR 1.290 filed on Jul. 23, 2019 and entered in U.S. Appl. No. 16/214,476.
Third-party submission under 37 CFR 1.290 filed on Jul. 23, 2019 and entered in U.S. Appl. No. 16/214,496.
Third-party submission under 37 CFR 1.290 filed on Jul. 23, 2019 and entered in U.S. Appl. No. 16/292,363.
Third-party submission under 37 CFR 1.290 filed on Jul. 22, 2019 and entered in U.S. Appl. No. 16/292,364.
Third-party submission under 37 CFR 1.290 filed on Jul. 23, 2019 and entered in U.S. Appl. No. 16/292,374.
Third-party submission under 37 CFR 1.290 filed on Jul. 23, 2019 and entered in U.S. Appl. No. 16/292,382.
Third-party submission under 37 CFR 1.290 filed on Jul. 25, 2019 and entered in U.S. Appl. No. 16/365,250.
Third-party submission under 37 CFR 1.290 filed on Jul. 25, 2019 and entered in U.S. Appl. No. 16/365, 315.
"Slice Embedding Solutions for Distributed Service Architectures"—Esposito et al., Boston University, Feb. 12, 2011 http://www.cs.bu.edu/techreports/pdf/2011-025-slice-embedding.pdf (Year 2011) (16 pages).
Michael J. Freedman, Princeton University, "Experiences with CoralCDN: a five-year operational view", Proceeding NSDI'10 Proceedings of the 7th USENIX conference on Networked systems design and implementation San Jose, California—Apr. 28-30, 2010 (17 pages).
"The BitTorrent Protocol Specification", Website: https://web.archive.org/web/20120513011037/http:/www.bittorrent.org/beps/bep_0003.html describing BitTorrent dated Jan. 10, 2008 downloaded using web archive on Aug. 16, 2019 (6 pages).
"BitTorrent", Website: https://en.wikipedia.org/w/index.php?title=BitTorrent&oldid=530466721 describing BitTorrent dated Dec. 30, 2012 downloaded using Wikipedia on Aug. 16, 2019 (9 pages).
"VIP SOCKS/VPN Service", Website: http://vip72.com:80/?drgn=1 describing VIP72 proxy service dated Jan. 2010 downloaded using VIP Technologies webpage on Aug. 16, 2019 (3 pages).
"Welcome to Easy Hide IP", Website: https://web.archive.org/web/20130702093456/http://www.easy-hide-ip.com:80/describing Easy Hide IP dated Jun. 26, 2007 downloaded using web archive on Aug. 16, 2019 (2 pages).
"You make it fun; we'll make it run", Website: https://web.archive.org/web/20130726050810/https://www.coralcdn.org describing CoralCDN dated Jan. 25, 2005 downloaded using web archive on Aug. 16, 2019 (2 pages).
"Net Transport", Website: http://www.xi-soft.com/default.htm describing Net Transport Overview dated 2005 downloaded using Net Transport webpage on Aug. 16, 2019 (2 pages).
Net Transport—Develop History, Website: http://www.xi-soft.com/download.htm describing Net Transport Download dated 2005 downloaded using Net Transport webpage on Aug. 16, 2019 (10 pages).
Net Transport FAQ, Website: http://www.xi-soft.com/faq.htm describing Net Transport FAQ dated 2005 downloaded using Net Transport webpage on Aug. 16, 2019 (4 pages).
Net Transport News, Website: http://www.xi-soft.com/news.htm describing Net Transport News dated 2005 downloaded using Net Transport webpage on Aug. 16, 2019 (5 pages).
W3C, Glossary of Terms for Device Independence, Jan. 2005 (12 pages).
RFC 1001: Protocol Standard for a NetBIOS Service on a TCP/UDP Transport: Concepts and Methods, Mar. 1987 (68 pages).
RFC 1630: Universal Resource Identifiers in WWW, Jun. 1994 (28 pages).
RFC 2960: Stream Control Transmission Protocol, Oct. 2000 (134 pages).
RFC 2109, HTTP State Management Mechanism, Feb. 1997 (21 pages).
L.L. Peterson, B.S. Davie, Computer Networks: A Systems Approach, 4th ed., San Francisco, CA, 2007 (20 pages).
Mell et al., "Creating a Patch and Vulnerability Management Program", NIST Special Publication 800-40 Version 2.0, 2005 (76 pages).
Rowstron et al., "Pastry: Scalable, Decentralized Object Location, and Routing for Large-Scale Peer-to-Peer Systems", IFIP/ACM International Conference on Distributed Systems Platforms and Open Distributed Processing: Middleware 2001, pp. 329-350 (22 pages).
Ratnasamy, et al., "Topologically aware overlay construction and server selection", Proceedings Twenty-First Annual Joint Conference of the IEEE Computer and Communications Societies, vol. 3, pp. 1190-1199 (2002) (10 pages).
Padmanabhan et al., "An Investigation of Geographic Mapping Techniques for Internet Hosts", ACM SIGCOMM Computer Communication Review, vol. 3, No. 4, pp. 173-185 (2001) (13 pages).
Freedman et al., "OASIS: Anyeast for Any Service", Proceedings of the 3rd Conference on Networked Systems Design & Implementation, vol. 3, pp. 129-142 (2006) (14 pages).
Agarwal et al., "Matchmaking for Online Games and Other Latency-Sensitive P2P Systems", ACM SIGCOMM Computer Communication Review, vol. 39. No. 4, pp. 315-326 (2009) (12 pages).
H. Casanova, "Benefits and Drawbacks of Redundant Batch Requests", Journal of Grid Computing, vol. 5, pp. 235-250 (2007) (16 pages).
S. J. Murdoch, "New Tor distribution for testing: Tor Browser Bundle", Jan. 30, 2008 post to tor-talk mailing list (1 page).
Erich Gamma et al., Design Patterns: Elements of Reusable Object-Oriented Software (1st ed., 1994) (12 pages).
L.J Fogel et al., "Modeling the Human Operator with Finite-State Machines" NASA Contractor Report (Jul. 1968) (238 pages).
MacPherson Decl. Exh. A, IEEE 802.Nov. 2007—Telecommunications and Information Exchange Between Systems—Local and Metropolitan Area Networks—Specific Requirements—Part 11: Wireless LAN Medium Access Control (MAC) and Physical Layer (PHY) Specifications, Revision of ANSI/IEEE Std 802.11, 1999 Edition (R2003) (1236 pages).
W. R. Stevens "TCP/IP Illustrated, vol. I: The Protocols", Addison Wesley Longman, Inc. 1994 (67 pages).
Michael J. Freedman et al., "Democratizing content publication with Coral", In Proc. 1st Symposium, Mar. 2004 (14 pages).

(56) References Cited

OTHER PUBLICATIONS

Andy Oram, "Peer-to-Peer: Harnessing the Power of Disruptive Technology", Chapters Accountability and Free Haven, First Edition Mar. 2001 (265 pages).
"Database—Wikipedia", Dec. 1, 2018 (20 pages).
Dias, Stevina and Gadge, Jayant. Identifying Informative Web Content Blocks using Web Page Segmentation. International Journal of Applied Information Systems (IJAIS). Apr. 2014, vol. 7, No. 1, pp. 37-41. ISSN 2249-0868. Available at:https://research.ijais.org/volume7/number1/ijais14-451129.pdf (5 pages).
Lockhart, Joshua, et al. Some people aren't worth listening to: periodically retraining classifiers with feedback from a team of end users. arXiv preprint arXiv:2004.13152 (2020). Available at: https://arxiv.org/pdf/2004.13152 (8 pages).
Mihai Gheorghe, et al., "Modern techniques of web scraping for data scientists", Revista Romana de Interactiune Om-Calculator 11 (1) 2018, 63-75 (13 pages).
Ram Sharan Chaulagain et al., "Cloud Based Web Scraping for Big Data Applications", Nov. 2017 (7 pages).
Brett Massimino, Accessing Online Data: Web-Crawling and Information-Scraping Techniques to Automate the Assembly of Research Data, Journal of Business Logistics, 2016, 37(1): 34-42 (9 pages).
Richard N. Landers et al., A Primer on Theory-Driven Web Scraping: Automatic Extraction of Big Data From the Internet for Use in Psychological Research, Psychological Methods 2016, vol. 21, No. 4, 475-492 (18 pages).
Saram Han et al., Web Scraping for Hospitality Research: Overview, Opportunities, and Implications, Cornell Hospitality Quarterly 2021, vol. 62(1) 89-104 (16 pages).
Katharine Jarmul et al., Python Web Scraping, Second Edition, Packt Publishing Ltd., May 2017 (12 pages).
White Paper: The Application of AI and ML in Large-Scale Data Gathering Operation, Oxylabs, Aug. 26, 2020 (27 pages).
White Paper: Load Testing with Residential Proxies, Oxylabs, Sep. 16, 2020 (17 pages).
How to Change Browser Parameters, Kameleo Team, Mar. 18, 2020 (6 pages).
Master of Internet Privacy, https://web.archive.org/web/20200920150344/https://kameleo.io/ Copyright 2017-2020 © Kameleo Team (8 pages).
Fatenaite, Gabija. How websites Block Bots. Oxylabs.io, Oct. 4, 2019 (6 pages).
Vistorskyte, Iveta. Most Common User Agents for Price Scraping. Oxylabs.io, May 12, 2019 (4 pages).
Oxylabs. Cutting Edge Scraping Solution. Oxylabs.io, Jun. 14, 2020 (8 pages).
Fatenaite, Gabija. Next-Gen Residential Proxies Vs. Regular Residential Proxies. Oxylabs.io, Aug. 5, 2020 (8 pages).
Meschenmoser, Philipp, et al., Scraping scientific web repositories: Challenges and solutions for automated content extraction. D-Lib Magazine, 2016 (7 pages).
Miksenas, Mantas. HTTP Headers Explained. Oxylabs.io, Jun. 21, 2020 (5 pages).

* cited by examiner

100

| | 102a | 102b | 102c | 102d | 102e | 102f | 102g | 102h |
|---|---|---|---|---|---|---|---|---|
| 101 | Date - Time | Tunnel IP Address | Geographic Location | ASN | Connection Type | Operating System | BW (Kb/s) | RTT (ms) |
| 101a | 3/5 – 19:35 | 80.12.105.150 | Paris, France | 3215 | VDSL | Chrome 2.0 | 1000 | 30 |
| 101b | 3/5 - 19:38 | 176.94.1.17 | Munich, Germany | 3209 | 3G | iOS 3.0 | 350 | 70 |
| 101c | 5/5 - 00:05 | 162.115.192.24 | Boston, MA, USA | 12079 | DOCSIS | Windows 10 | 2500 | 540 |
| 101d | 11/5 -00:07 | 83.220.232.67 | Moskow, Russia | 16345 | ADSL | Windows 7 | 1400 | 170 |
| 101e | 12/5 - 00:15 | 185.93.228.98 | Riad, Saudi-Arabia | 30148 | WiFi | Android 2.0 | 1200 | 120 |
| 101f | 12/5 - 05:38 | 59.144.192.23 | Mumbai, India | 9498 | 4G/LTE | iOS 4.0 | 2100 | 230 |
| 101g | 12/5 - 22:13 | 200.196.224.89 | San-Paulo, Brazil | 11419 | ADSL | Chrome 3.0 | 800 | 310 |

FIG. 10 (Prior Art)

330

| | 102a | 102b | 102c | 102d | 102e | 102f | 102g | 102h | 102i |
|---|---|---|---|---|---|---|---|---|---|
| 101 | Date - Time | Tunnel IP Address | Geographic Location | ASN | Connection Type | Operating System | BW (Kb/s) | RTT (ms) | IDLE |
| 101a | 3/5 -- 19:35 | 80.12.105.150 | Paris, France | 3215 | VDSL | Chrome 2.0 | 1000 | 30 | Y |
| 101b | 3/5 - 19:38 | 176.94.1.17 | Munich, Germany | 3209 | 3G | iOS 3.0 | 350 | 70 | N |
| 101c | 5/5 - 00:05 | 162.115.192.24 | Boston, MA, USA | 12079 | DOCSIS | Windows 10 | 2500 | 540 | N |
| 101d | 11/5 -00:07 | 83.220.232.67 | Moskow, Russia | 16345 | ADSL | Windows 7 | 1400 | 170 | Y |
| 101e | 12/5 - 00:15 | 185.93.228.98 | Riad, Saudi-Arabia | 30148 | WiFi | Android 2.0 | 1200 | 120 | Y |
| 101f | 12/5 - 05:38 | 59.144.192.23 | Mumbai, India | 9498 | 4G/LTE | iOS 4.0 | 2100 | 230 | N |
| 101g | 12/5 - 22:13 | 200.196.224.89 | San-Paulo, Brazil | 11419 | ADSL | Chrome 3.0 | 800 | 310 | Y |

FIG. 33 (Prior Art)

| SAE level | Name | Narrative Definition | Execution of Steering and Acceleration/Deceleration | Monitoring of Driving Environment | Fallback Performance of Dynamic Driving Task | System Capability (Driving Modes) |
|---|---|---|---|---|---|---|
| Human driver monitors the driving environment | | | | | | |
| 0 | No Automation | the full-time performance by the human driver of all aspects of the dynamic driving task, even when enhanced by warning or intervention systems | Human driver | Human driver | Human driver | n/a |
| 1 | Driver Assistance | the driving mode-specific execution by a driver assistance system of either steering or acceleration/deceleration using information about the driving environment and with the expectation that the human driver perform all remaining aspects of the dynamic driving task | Human driver and system | Human driver | Human driver | Some driving modes |
| 2 | Partial Automation | the driving mode-specific execution by one or more driver assistance systems of both steering or acceleration/deceleration using information about the driving environment and with the expectation that the human driver perform all remaining aspects of the dynamic driving task | System | Human driver | Human driver | Some driving modes |
| Automated driving system ("system") monitors the driving environment | | | | | | |
| 3 | Conditional Automation | the driving mode-specific performance by an automated driving system of all the aspects of the dynamic driving task with the expectation that the human driver will respond appropriately to a request to intervene | System | System | Human driver | Some driving modes |
| 4 | High Automation | the driving mode-specific performance by an automated driving system of all the aspects of the dynamic driving task, even if a human driver does not respond appropriately to a request to intervene | System | System | System | Some driving modes |
| 5 | Full Automation | the full-time performance by an automated driving system of all the aspects of the dynamic driving task under all roadway and environmental conditions that can be managed by a human driver | System | System | System | All driving modes |

330a

FIG. 33a (Prior Art)

360

| | 362a | 362b | 362c | 362d | 362e | 362f | 362g | 362h |
|---|---|---|---|---|---|---|---|---|
| 361 | Registration Date - Time | Dedicated Device IP Address | Device Geographic Location | Device ID | Operation Duration (Hours) | Traffic Volume (GB) | User Contact | Available |
| 361a | 8/3 – 17:23 | 79.13.104.151 | Bangkok, Thailand | MAC#1 | 720 | 100 | email#1 | Y |
| 361b | 4/6 - 18:23 | 177.93.11.18 | Tokyo, Japan | MAC#2 | 33 | 250 | Address#1 | N |
| 361c | 2/2 - 01:25 | 160.117.190.26 | Denver, CO, USA | MAC#3 | 360 | 26 | Number#1 | N |
| 361d | 12/6 -00:55 | 80.223.229.63 | Kiev, Ukraine | MAC#4 | 74 | 78 | email#2 | Y |
| 361e | 10/3 - 02:18 | 189.89.232.94 | Tel Aviv, Israel | MAC#5 | 360 | 89 | Address#2 | Y |
| 361f | 10/6 - 04:39 | 64.139.197.18 | London, UK | MAC#6 | 720 | 69 | Number#2 | N |
| 361g | 10/7 - 19:16 | 206.190.230.83 | Taipei, Taiwan | MAC#7 | 108 | 53 | email#3 | Y |

363

| |
|---|
| Domain #1 |
| Domain #2 |
| Domain #3 |
| Domain #4 |
| Domain #5 |

FIG. 36

Tunnel

EMULATING WEB BROWSER IN A DEDICATED INTERMEDIARY BOX

RELATED APPLICATION

This patent application is a continuation application of U.S. patent application Ser. No. 18/211,338 filed on Jun. 19, 2023, which is a continuation of International Application PCT/IL2022/050746, with an international filing date of Jul. 11, 2022, which claims priority from U.S. Provisional Application Ser. No. 63/225,577, which was filed on Jul. 26, 2021, from U.S. Provisional Application Ser. No. 63/291,512, which was filed on Dec. 20, 2021, and from U.S. Provisional Application Ser. No. 63/318,788, which was filed on Mar. 11, 2022, which are all hereby incorporated herein by reference in their entirety.

TECHNICAL FIELD

This disclosure relates generally to an apparatus and method for improving anonymity and privacy when fetching, by a client device, a content from a web server, by using an intermediate device. In particular, the intermediate device may be a dedicated stand-alone device, or may be integrated into a router or a sensor unit. Further, the intermediate device may modify a content request from the client device to avoid identification or blocking by the web server using web tracking, such as fingerprinting.

BACKGROUND

Unless otherwise indicated herein, the materials described in this section are not prior art to the claims in this application and are not admitted to be prior art by inclusion in this section.

The Internet is a global system of interconnected computer networks that use the standardized Internet Protocol Suite (TCP/IP), including the Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routes are hosted by commercial, government, academic, and other high-capacity network centers, the Internet exchange points and network access points that interchange Internet traffic between the countries, continents, and across the oceans of the world. Traffic interchange between Internet service providers (often Tier 1 networks) participating in the Internet backbone exchange traffic by privately negotiated interconnection agreements, primarily governed by the principle of settlement-free peering.

The Transmission Control Protocol (TCP) is one of the core protocols of the Internet Protocol suite (IP) described in RFC 675 and RFC 793, and the entire suite is often referred to as TCP/IP. TCP provides reliable, ordered, and error-checked delivery of a stream of octets between programs running on computers connected to a local area network, intranet or the public Internet, and resides at a transport layer. Web browsers typically use TCP when they connect to servers on the World Wide Web (WWW), and are used to deliver an email and transfer files from one location to another. HTTP, HTTPS, SMTP, POP3, IMAP, SSH, FTP, Telnet and a variety of other protocols that are typically encapsulated in TCP. As the transport layer of TCP/IP suite, the TCP provides a communication service at an intermediate level between an application program and the Internet Protocol (IP). Due to a network congestion, traffic load balancing, or other unpredictable network behavior, IP packets can be lost, duplicated, or delivered out of order. TCP detects these problems, requests retransmission of lost data, rearranges out-of-order data, and even helps minimize the network congestion to reduce the occurrence of the other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While the IP layer handles the actual delivery of the data, TCP keeps track of the individual units of data transmission, called segments, which a message is divided into for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error-free as it streams them to an application.

The TCP protocol operations may be divided into three phases. Connections must be properly established in a multi-step handshake process (connection establishment) before entering the data transfer phase. After data transmission is completed, the connection termination closes established virtual circuits and releases all allocated resources. A TCP connection is typically managed by an operating system through a programming interface that represents the local end-point for communications, an Internet socket. During the duration of a TCP connection, the local end-point undergoes a series of state changes. A tutorial on the TCP/IP protocol suite, focusing particularly on the steps in forwarding an IP datagram from source host to destination host through a router, is disclosed in IETF RFC 1180 by Socolofsky, T. et al., entitled "*TCP/IP Tutorial*", RFC 1180, dated January 1991, which is incorporated in its entirety for all purposes as if fully set forth herein.

Since TCP/IP is based on the client/server model of operation, the TCP connection setup involves the client and server preparing for the connection by performing an OPEN operation. A client process initiates a TCP connection by performing an active OPEN, sending a SYN message to a server. The server process using TCP prepares for an incoming connection request by performing a passive OPEN. Both devices create for each TCP session a data structure used to hold important data related to the connection, called a Transmission Control Block (TCB).

There are two different kinds of OPEN, named 'Active OPEN' and 'Passive OPEN'. In Active OPEN the client process using TCP takes the "active role" and initiates the connection by actually sending a TCP message to start the connection (the SYN message). In Passive OPEN the server process designed to use TCP is contacting TCP and saying: "I am here, and I am waiting for clients that may wish to talk to me to send me a message on the following port number". The OPEN is called passive because aside from indicating that the process is listening, the server process does nothing. The passive OPEN can in fact specify that the server is waiting for an active OPEN from a specific client, though not all TCP/IP APIs support this capability. More commonly, a server process is willing to accept connections from all comers, and as such the passive OPEN is then to be unspecified.

In the passive OPEN, the TCP uses a three-way handshake, and before a client attempts to connect with a server, the server must first bind to and listen at a port to open it up for connections. Once the passive OPEN is established, a client may initiate an active OPEN. To establish a connection, the three-way (or 3-step) handshake occurs:

1. SYN: The active open is performed by the client sending the SYN to the server. The client sets the segment's sequence number to a random value A.
2. SYN-ACK: In response, the server replies with a SYN-ACK. The acknowledgment number is set to one more than the received sequence number, i.e. A+1, and the sequence number that the server chooses for the packet is another random number, B.
3. ACK: Finally, the client sends an ACK back to the server. The sequence number is set to the received acknowledgement value, i.e. A+1, and the acknowledgement number is set to one more than the received sequence number i.e., B+1.

At this point, both the client and server have received an acknowledgment of the connection. The steps 1 and 2 establish the connection parameter (sequence number) for one direction and it is acknowledged. The steps 2 and 3 establish the connection parameter (sequence number) for the other direction and it is acknowledged, and then a full-duplex communication is established.

TCP keepalive. When two hosts are connected over a network via TCP/IP, TCP Keepalive Packets can be used to determine if the connection is still valid, and terminate it if needed. Most of the hosts that support TCP also support TCP Keepalive, where each host (or peer) periodically sends a TCP packet to its peer which solicits a response. The TCP keepalive scheme involves using timers when setting up a TCP connection, and when the keepalive timer reaches zero, a keepalive probe packet is sent with no data in it and the ACK flag turned on. This procedure is useful because if the other peers lose their connection (for example by rebooting) the broken connection is noticed, even when no traffic on it is being exchanged. If the keepalive probe is not replied to, the connection cannot be considered valid anymore. The TCP keepalive mechanism may be used to prevent inactivity from disconnecting the channel. For example, when being behind a NAT proxy or a firewall, a host may be disconnected without any reason. This behavior is caused by the connection tracking procedures implemented in proxies and firewalls, which keep track of all connections that pass through them. Due to the physical limits of these machines, they can only keep a finite number of connections in their memory. The most common and logical policy is to keep the newest connections and to discard the old and inactive connections first.

A keepalive signal is often sent at predefined intervals, and plays an important role on the Internet. After a signal is sent, if no reply is received the link is assumed to be down and future data will be routed via another path until the link is up again. The keepalive signal can also be used to indicate to Internet infrastructure that the connection should be preserved. Without a keepalive signal, intermediate NAT-enabled routers can drop the connection after the timeout. Since the only purpose is to find links that don't work or to indicate connections that should be preserved, the keepalive messages tend to be short and not take much bandwidth.

Transmission Control Protocol (TCP) keepalives are an optional feature, and if included must default to off. The keepalive packet contains null data, and in an Ethernet network, a keepalive frame length is 60 bytes, while the server response to this, also a null data frame, is 54 bytes. There are three parameters related to the keepalive mechanism: (1) Keepalive time is the duration between two keepalive transmissions in an idle condition where the TCP keepalive period is required to be configurable and by default is set to no less than 2 hours; (2) Keepalive interval is the duration between two successive keepalive retransmissions, if acknowledgement to the previous keepalive transmission is not received; and (3) Keepalive retry is the number of retransmissions to be carried out before declaring that remote end is not available.

Internet Protocol (IP). The Internet Protocol (IP) is the principal communications protocol used for relaying datagrams (packets) across a network using the Internet Protocol Suite. Responsible for routing packets across network boundaries, it is the primary protocol that establishes the Internet. The IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. Further, IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3\times10^9$ addresses), while IPv6 uses 128-bit addresses (providing 340 undecillion or $3.4\times10^{38}$ addresses), as described in RFC 2460.

An overview of an IP-based packet 15 is shown in FIG. 2*a*. The packet may be generally segmented into the IP data 16*b* to be carried as payload, and the IP header 16*f*. The IP header 16*f* contains the IP address of the source as Source IP Address field 16*d* and the Destination IP Address field 16*c*. In most cases, the IP header 16*f* and the payload 16*b* are further encapsulated by adding a Frame Header 16*e* and a Frame Footer 16*a* used by the higher-layer protocols.

The Internet Protocol is responsible for addressing hosts and routing datagrams (packets) from a source host to the destination host across one or more IP networks. For this purpose, the Internet Protocol defines an addressing system that has two functions. Addresses identify hosts and provide a logical location service, each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The main aspects of the IP technology are IP addressing and routing. Addressing refers to how IP addresses are assigned to end hosts and how sub-networks of IP host addresses are divided and grouped together. IP routing is performed by all hosts, but most importantly by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (July 1999) entitled: "*Internetworking Technologies Handbook*", which are all incorporated in their entirety for all purposes as if fully set forth herein: Chapter 5: *"Routing Basics"* (pages 5-1 to 5-10), Chapter 30: *"Internet Protocols"* (pages 30-1 to 30-16), Chapter 32: "IPv6" (pages 32-1 to 32-6), Chapter 45: *"OSI Routing"* (pages 45-1 to 45-8) and Chapter 51: *"Security"* (pages 51-1 to 51-12), as well as in an IBM Corporation, International Technical Support Organization Redbook Documents No. GG24-4756-00, entitled: "*Local area Network Concepts and Products: LAN Operation Systems and management*", 1st Edition May 1996, Redbook Document No. GG24-4338-00, entitled: "*Introduction to Networking Technologies*", 1$^{st}$ Edition April 1994, Redbook Document No. SG24-2580-01 *"IP Network Design Guide"*, 2$^{nd}$ Edition June 1999, and Redbook Document No. GG24-3376-07 *"TCP/IP Tutorial and Technical Overview"*, ISBN 0738494682 8$^{th}$ Edition December 2006, which are incorporated in their entirety for all purposes as if fully set forth herein.

An Internet packet typically includes a value of Time-to-Live (TTL) for avoiding the case of packet looping endlessly. The initial TTL value is set in the header of the packet, and each router in the packet path subtracts one from the TTL field, and the packet is discarded upon the value exhaustion. Since the packets may be routed via different and disparately located routers and servers, the TTL of the packets reaching the ultimate destination computer is expected to vary.

The Internet architecture employs a client-server model, among other arrangements. The terms 'server' or 'server computer' relates herein to a device or a computer (or plurality of computers) connected to the Internet and is used for providing facilities or services to other computers or other devices (referred to in this context as 'clients') connected to the Internet. The server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device (such as a computer or a series of computers) executing this program, which accesses the server over the Internet for a service or a resource. Clients commonly initiate connections that a server may accept. For non-limiting example, web browsers are clients that connect to web servers for retrieving web pages, and email clients connect to mail storage servers for retrieving the mails.

Web-page. A web-page is typically a collection of information, consisting of one or more resources, intended to be rendered simultaneously, and identified by a single Uniform Resource Identifier. More specifically, the web page may consist of a resource with zero, one, or more embedded resources intended to be rendered as a single unit, and referred to by the URI of the one resource which is not embedded. A Uniform Resource Identifier (URI) is intended to be recognized by a user as representing the identity of a specific Web Page (resource). A resource may include a network data object or service that can be identified by a URI. Resources may be available in multiple representations (e.g., multiple languages, data formats, size, or resolution) or vary in other ways. The URI specification defines a Uniform Resource Identifier (URI) or URL (Uniform Resource Locator) as a compact string of characters for identifying an abstract or physical resource. A web-page may be generated using one or more browser-supported languages including, but are not limited to, JavaScript, VBScript, Hyper Text Markup Language (HTML), or any other type of language for writing web pages. Any web page may be served over the network using one or more servers as may be necessary.

Hostname. A hostname is a label that is assigned to a device connected to a computer network and that is used to identify the device in various forms of electronic communication, such as the World Wide Web (WWW). The hostnames may be simple names consisting of a single word or phrase, or they may be structured. Each hostname usually has at least one numeric network address associated with it for routing packets for performance and other reasons. Internet hostnames may have appended the name of a Domain Name System (DNS) domain, separated from the host-specific label by a period ("dot"). In the latter form, a hostname is also called a domain name. If the domain name is completely specified, including a top-level domain of the Internet, then the hostname is referred to as a Fully Qualified Domain Name (FQDN). The hostnames that include DNS domains are often stored in the Domain Name System together with the IP addresses of the host they represent for the purpose of mapping the hostname to an address, or the reverse process.

A hostname may be a domain name, if it is properly organized into the domain name system. A domain name may be a hostname if it has been assigned to an Internet host and associated with the host's IP address. Hostnames are composed of a sequence of labels concatenated with dots. For example, "en.wikipedia.org" is a hostname. Each label must be from 1 to 63 characters long. The entire hostname, including the delimiting dots, has a maximum of 253 ASCII characters. General guidelines on choosing a good hostname are outlined in RFC 1178.

HTTP. The Hypertext Transfer Protocol (HTTP) is an application protocol for distributed, collaborative, hypermedia information systems, commonly used for communication over the Internet. The HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230—'*HTTP/1.1: Message Syntax and Routing*', RFC 7231—'*HTTP/1.1: Semantics and Content*', RFC 7232-'*HTTP/1.1: Conditional Requests*', RFC 7233—'*HTTP/1.1: Range Requests*', RFC 7234—'*HTTP/1.1: Caching*', and RFC 7235—'*HTTP/1.1: Authentication*'. HTTP functions as a request-response protocol in the client-server computing model. A web browser, for example, may be the client and an application running on a computer hosting a website may be the server. The client submits an HTTP request message to the server. The server, which provides resources such as HTML files and other content, or performs other functions on behalf of the client, returns a response message to the client. The response contains completion status information about the request and may also contain requested content in its message body. A web browser is an example of a User Agent (UA). Other types of the user agent include the indexing software used by search providers (web crawlers), voice browsers, mobile apps and other software that accesses, consumes or displays web content.

HTTP is designed to permit intermediate network elements to improve or enable communications between clients and servers. High-traffic websites often benefit from web cache servers that deliver content on behalf of upstream servers to improve response time. Web browsers cache previously accessed web resources and reuse them when possible, to reduce network traffic. HTTP proxy servers at private network boundaries can facilitate communication for clients without a globally routable address, by relaying messages with external servers. HTTP is an application layer protocol designed within the framework of the Internet Protocol Suite. Its definition presumes an underlying and reliable transport layer protocol, and Transmission Control Protocol (TCP) is commonly used. However, HTTP can use unreliable protocols such as the User Datagram Protocol (UDP), for example, in the Simple Service Discovery Protocol (SSDP). HTTP resources are identified and located on the network by Uniform Resource Identifiers (URIs) or, more specifically, Uniform Resource Locators (URLs), using the http or https URI schemes. URIs and hyperlinks in Hypertext Markup Language (HTML) documents form webs of inter-linked hypertext documents. An HTTP session is a sequence of network request-response transactions. An HTTP client initiates a request by establishing a Transmission Control Protocol (TCP) connection to a particular port on a server. An HTTP server listening on that port waits for a client's request message. Upon receiving the request, the server sends back a status line, such as "HTTP/1.1 200 OK", and a message of its own. The body of this message is typically the requested resource, although an error message or other information may also be returned. HTTP is a stateless protocol that does not require the HTTP server to retain information or status HTTP persistent connection, also called HTTP keep-alive, or HTTP connection reuse, refers to using a single TCP connection to send and receive multiple HTTP requests/responses, as opposed to opening a new connection for every single request/response pair. Persistent connections provide a mechanism by which a client and a server can signal the close of a TCP connection. This signaling takes place using the Connection header field. The HTTP persistent connection is described in IETF RFC 2616, entitled: "*Hypertext Transfer Protocol—HTTP/*1.1". In HTTP 1.1, all connections are considered persistent unless declared otherwise. The HTTP persistent connections do not use separate keepalive messages, but they allow multiple requests to use a single connection. The advantages of using persistent connections involve lower CPU and memory usage (because fewer connections are open simultaneously), enabling HTTP pipelining of requests and responses, reduced network congestion (due to fewer TCP connections), and reduced latency in subsequent requests (due to minimal handshaking). Any connection herein may use, or be based on, an HTTP persistent connection.

HTTPS. HTTPS (also referred to as HTTP over Transport Layer Security (TLS), HTTP over SSL, and HTTP Secure) is a communications protocol for secure communication over a computer network which is widely used on the Internet. HTTPS consists of communication over Hypertext Transfer Protocol (HTTP) within a connection encrypted by Transport Layer Security, or its predecessor, Secure Sockets Layer. The main motivation for HTTPS is authentication of the visited website and protection of the privacy and integrity of the exchanged data. HTTPS typically provides authentication of the website and associated web server with which one is communicating, which protects against man-in-the-middle attacks. Additionally, it provides bidirectional encryption of communications between a client and server, which protects against eavesdropping and tampering with or forging the contents of the communication. In practice, this provides a reasonable guarantee that one is communicating with precisely the website that one intended to communicate with (as opposed to an impostor), as well as ensuring that the contents of communications between the user and site cannot be read or forged by any third party.

The HTTPS Uniform Resource Identifier (URI) scheme has identical syntax to the standard HTTP scheme, aside from its scheme token. However, HTTPS signals the browser to use an added encryption layer of SSL/TLS to protect the traffic. SSL/TLS is especially suited for HTTP, since it can provide some protection even if only one side of the communication is authenticated. This is the case with HTTP transactions over the Internet, where typically only the server is authenticated (by the client examining the server's certificate). HTTPS creates a secure channel over an insecure network, hence ensuring reasonable protection from eavesdroppers and man-in-the-middle attacks, provided that adequate cipher suites are used and that the server certificate is verified and trusted. Because HTTPS piggybacks HTTP entirely on top of TLS, the entirety of the underlying HTTP protocol can be encrypted. This includes the request URL (which particular web-page was requested), query parameters, headers, and cookies (which often contain identity information about the user). However, because host (website) addresses and port numbers are necessarily part of the underlying TCP/IP protocols, HTTPS cannot protect their disclosure. In practice this means that even on a correctly configured web server, eavesdroppers can infer the IP address and port number of the web server (sometimes even the domain name e.g., www.example.org, but not the rest of the URL) that one is communicating with, as well as the amount (data transferred) and duration (length of session) of the communication, though not the content of the communication. A 'domain' or a 'network domain' is an administrative grouping of multiple private computer networks or local hosts within the same infrastructure. Domains can be identified using a domain name; domains which need to be accessible from the public Internet can be assigned a globally unique name within the Domain Name System (DNS).

Deploying HTTPS also allows the use of HTTP/2 (or its predecessor, the now-deprecated protocol SPDY), that are new generations of HTTP, designed to reduce page load times and latency. HTTP Strict Transport Security (HSTS) is typically used with HTTPS to protect users from man-in-the-middle attacks, especially SSL stripping. While HTTPS URLs begin with "https://" and use port 443 by default, or alternatively 8443, the HTTP URLs begin with "http://" and use port 80 by default, and HTTP is not encrypted and is thus vulnerable to man-in-the-middle and eavesdropping attacks, which can let attackers gain access to website accounts and sensitive information, and modify webpages to inject malware or advertisements. HTTPS is designed to withstand such attacks and is considered secure against them (with the exception of older, deprecated versions of SSL).

IETF RFC 2818 by E. Rescorla entitled: "*HTTP Over TLS*" published May 2000, which is incorporated in its entirety for all purposes as if fully set forth herein, describes how to use TLS to secure HTTP connections over the Internet. Current practice is to layer HTTP over SSL (the predecessor to TLS), distinguishing secured traffic from insecure traffic by the use of a different server port. This document documents that practice using TLS. A companion document describes a method for using HTTP/TLS over the same port as normal HTTP [RFC2817].

HTTP/2. HTTP/2 is a major revision of the HTTP network protocol used by the World Wide Web. It was derived from the earlier experimental SPDY protocol, originally developed by Google, and was developed by the HTTP Working of the Internet Engineering Task Force (IETF). The HTTP/2 specification was published as IETF RFC 7540 on May 14, 2015, is entitled: "*Hypertext Transfer Protocol Version* 2 (*HTTP/*2)" and is incorporated in its entirety for all purposes as if fully set forth herein. The RFC 7540 describes an optimized expression of the semantics of the Hypertext Transfer Protocol (HTTP), referred to as HTTP version 2 (HTTP/2). HTTP/2 enables a more efficient use of network resources and a reduced perception of latency by introducing header field compression and allowing multiple concurrent exchanges on the same connection. It also introduces unsolicited push of representations from servers to clients.

HTTP/3. HTTP/3 is the third major version of the Hypertext Transfer Protocol used to exchange information on the World Wide Web, alongside HTTP/1.1 and HTTP/2. HTTP/3 always runs over QUIC relying on UDP (as opposed to TCP used by earlier revisions of HTTP), and uses the same semantics as the earlier revisions, including the same request methods, status codes, and message fields, but encodes them differently and maintains session state differently. HTTP semantics are consistent across versions: the same request methods, status codes, and message fields are typically applicable to all versions. The differences are in the mapping of these semantics to underlying transports. Both HTTP/1.1 and HTTP/2 use TCP as their transport. HTTP/3 uses QUIC, a transport layer network protocol which uses user space congestion control over the User Datagram Protocol (UDP). The switch to QUIC aims to fix a major problem of HTTP/2 called "head-of-line blocking": because the parallel nature of HTTP/2's multiplexing is not visible to TCP's loss recovery mechanisms, a lost or reordered packet causes all active transactions to experience a stall regardless of whether that transaction was impacted by the lost packet. Because QUIC provides native multiplexing, lost packets only impact the streams where data has been lost.

HTTP/3 is described in IETF RFC 9114 entitled: "*HTTP/*3" published June 2022, which is incorporated in its entirety for all purposes as if fully set forth herein. The QUIC transport protocol has several features that are desirable in a transport for HTTP, such as stream multiplexing, per-stream flow control, and low-latency connection establishment. The RFC 9114 document describes a mapping of HTTP semantics over QUIC, and also identifies HTTP/2 features that are subsumed by QUIC and describes how HTTP/2 extensions can be ported to HTTP/3.

HTTP Status codes. The Hypertext Transfer Protocol (HTTP) is a stateless application-level protocol for distributed, collaborative, hypertext information systems. The semantics of HTTP/1.1 messages, as expressed by request methods, request header fields, response status codes, and response header fields, along with the payload of messages (metadata and body content) and mechanisms for content, are described in IETF RFC 7231, entitled: "*Hypertext Transfer Protocol* (*HTTP/*1.1): *Semantics and Content*" (June 2014), which is incorporated in its entirety for all purposes as if fully set forth herein. Status codes are typically issued by a server in response to a client request made to the server. The first digit of the status code specifies one of five standard classes of responses. The message phrases shown are typical, but any human-readable alternative may be provided.

All HTTP response status codes are separated into five classes or categories. The first digit of the status code defines the class of response, while the last two digits do not have any classifying or categorization role. There are five classes defined by the standard: 1xx (100 to 199) informational response—the request was received, continuing process; 2xx (200 to 299) successful—the request was successfully received, understood and accepted; 3xx (300-399) redirection—further action needs to be taken in order to complete the request; 4xx (400 to 499) client error—the request contains bad syntax or cannot be fulfilled; and 5xx (500 to 599) server error—the server failed to fulfil an apparently valid request.

The status code '200 OK' is a standard response for successful HTTP requests. The actual response will depend on the request method used. In a GET request, the response will contain an entity corresponding to the requested resource. In a POST request, the response will contain an entity describing or containing the result of the action.

The HTTP 404, '404 Not Found', '404', 'Page Not Found', or 'Server Not Found' error message is a Hypertext Transfer Protocol (HTTP) standard response code, in computer network communications, to indicate that the browser was able to communicate with a given server, but the server could not find what was requested. Further, when the requested information is found but access is not granted, the server may return a 404 error if it wishes to not disclose this information, as well. The website hosting server will typically generate a "404 Not Found" web page when a user attempts to follow a broken or dead link; hence the 404 error is one of the most recognizable errors encountered on the World Wide Web (WWW). When communicating via HTTP, a server is required to respond to a request, such as a web browser request for a web-page, with a numeric response code and an optional, mandatory, or disallowed (based upon the status code) message. In the code 404, the first digit indicates a client error, such as a mistyped Uniform Resource Locator (URL). The following two digits indicate the specific error encountered. HTTP's use of three-digit codes is similar to the use of such codes in earlier protocols such as FTP and NNTP. At the HTTP level, a '404' response code is followed by a human-readable "reason phrase". The HTTP specification suggests the phrase "Not Found"[2] and many web servers by default issue an HTML page that includes both the 404 code and the "Not Found" phrase.

The 404 error is often returned when pages have been moved or deleted. In the first case, it is better to employ URL mapping or URL redirection by returning a '301 Moved Permanently' response, which can be configured in most server configuration files, or through URL rewriting; in the second case, a '410 Gone' should be returned. Because these two options require special server configuration, most websites do not make use of them. The 404 error indicates that the server itself was found, but that the server was not able to retrieve the requested page.

5xx Server errors indicate that the server failed to fulfill a request. Response status codes beginning with the digit "5" indicate cases in which the server is aware that it has encountered an error or is otherwise incapable of performing the request. Except when responding to a HEAD request, the server should include an entity containing an explanation of the error situation, and indicate whether it is a temporary or permanent condition. Likewise, user agents should display any included entity to the user. These response codes are applicable to any request method.

URL Redirection. URL redirection, also referred to as 'URL forwarding', is a technique for making a web-page available under more than one URL address. When a web browser attempts to open a URL that has been redirected, a page with a different URL is opened. Similarly, domain redirection or domain forwarding is when all pages in a URL domain are redirected to a different domain, as when wikipedia.com and wikipedia.net are automatically redirected to wikipedia.org. URL redirection is done for various reasons: for URL shortening; to prevent broken links when webpages are moved; to allow multiple domain names belonging to the same owner to refer to a single web site; to guide navigation into and out of a website; for privacy protection; and for hostile purposes such as phishing attacks or malware distribution.

'3xx Redirection' is a class of status code that indicates the client must take additional action to complete the request. Many of these status codes are used in URL redirection. A user agent may carry out the additional action with no user interaction only if the method used in the second request is GET or HEAD. A user agent may automatically redirect a request. A user agent should detect and intervene to prevent cyclical redirects. In the HTTP protocol used by the World Wide Web (WWW), a redirect is a response with a status code beginning with 3 that causes a browser to display a different page. If a client encounters a redirect, it needs to make a number of decisions on how to handle the redirect. Different status codes are used by clients to understand the purpose of the redirect, how to handle caching, and which request method to use for the subsequent request. The HTTP/1.1 defines several status codes for redirection (RFC 7231): 300 multiple choices (e.g. offer different languages); 301 moved permanently (redirects permanently from one URL to another passing link equity to the redirected page); 302 found (originally "temporary redirect" in HTTP/1.0 and popularly used for CGI scripts; superseded by 303 and 307 in HTTP/1.1 but preserved for backward compatibility); 303 see other (forces a GET request to the new URL even if the original request was POST); 307 temporary redirect (provides a new URL for the browser to resubmit a GET or POST request); and 308 permanent redirect (provides a new URL for the browser to resubmit a GET or POST request).

ASN. Within the Internet, an Autonomous System (AS) is a collection of connected Internet Protocol (IP) routing prefixes under the control of one or more network operators on behalf of a single administrative entity or domain that presents a common, clearly defined routing policy to the Internet. The Autonomous System (AS) Numbers (ASNs) are used by various routing protocols, and IANA allocates AS Numbers to Regional Internet Registries (RIRs). The RIRs further allocate or assign AS Numbers to network operators in line with RIR policies. Originally the definition required control by a single entity, typically an Internet Service Provider (ISP) or a very large organization with independent connections to multiple networks, that adheres to a single and clearly defined routing policy, as originally defined in RFC 1771. The newer definition in RFC 1930 came into use to support multiple organizations that run Border Gateway Protocol (BGP) using private AS numbers to an ISP that connects all those organizations to the Internet. Even though there may be multiple autonomous systems supported by the ISP, the Internet only sees the routing policy of the ISP. The ISP must have an officially registered Autonomous System Number (ASN). A unique ASN is allocated to each AS for use in BGP routing, and an ASN uniquely identifies each network on the Internet. ASN representation is described in IETF 5396 dated December 2008 and entitled: "Textual Representation of Autonomous System (AS) Numbers", and four octets ASKs are described in IETF RFC 6793 dated December 2012 entitled: "*BGP Support for Four-Octet Autonomous System* (*AS*) *Number Space*".

Autonomous systems can be grouped into four categories, depending on their connectivity and operating policy. A multihomed autonomous system is an AS that maintains connections to more than one other AS. This allows the AS to remain connected to the Internet in the event of a complete failure of one of their connections. However, unlike a transit AS, this type of AS would not allow traffic from one AS to pass through on its way to another AS. Further, a stub autonomous system refers to an AS that is connected to only one other AS. This may be an apparent waste of an AS number if the network's routing policy is the same as its upstream AS's. However, the stub AS may, in fact, have peering with other autonomous systems that is not reflected in public route-view servers. Specific examples include private interconnections in the financial and transportation sectors. Furthermore, a transit autonomous system is an AS that provides connections through itself to other networks. That is, network A can use network B, the transit AS, to connect to network C. If one AS is an ISP for another, then the former is a transit AS. An Internet Exchange Point autonomous system (IX or IXP) is a physical infrastructure through which Internet service providers (ISPs) or content delivery networks (CDNs) exchange Internet traffic between their networks (autonomous systems).

A server device (in server/client architecture) typically offers information resources, services, and applications to clients, and is using a server dedicated or oriented operating system. Current popular server operating systems are based on Microsoft Windows (by Microsoft Corporation, headquartered in Redmond, Washington, U.S.A.), Unix, and Linux-based solutions, such as the 'Windows Server 2012' server operating system is part of the Microsoft 'Windows Server' OS family, that was released by Microsoft on 2012, providing enterprise-class datacenter and hybrid cloud solutions that are simple to deploy, cost-effective, application-focused, and user-centric, and is described in Microsoft publication entitled: "*Inside-Out Windows Server* 2012", by William R. Stanek, published 2013 by Microsoft Press, which is incorporated in its entirety for all purposes as if fully set forth herein.

Unix (trademarked as 'UNIX') operating systems are widely used in servers, and is a multitasking, multiuser computer operating system that exists in many variants and is characterized by a modular design that is sometimes called the "Unix philosophy," meaning the OS provides a set of simple tools that each perform a limited, well-defined function, with a unified filesystem as the main means of communication, and a shell scripting and command language to combine the tools to perform complex workflows. The Unix was designed to be portable, multi-tasking and multi-user in a time-sharing configuration, and the Unix systems are characterized by various concepts: the use of plain text for storing data; a hierarchical file system; treating devices and certain types of Inter-Process Communication (IPC) as files; and the use of a large number of software tools, small programs that can be strung together through a command line interpreter using pipes, as opposed to using a single monolithic program that includes all of the same functionality. Under Unix, the operating system consists of many utilities along with the master control program, a kernel. The kernel provides services to start and stop programs, handles the file system and other common "low level" tasks that most programs share, and schedules access to avoid conflicts when programs try to access the same resource or device simultaneously. To mediate such access, the kernel has special rights, reflected in the division between user-space and kernel-space. The Unix is described in a publication entitled: "*UNIX Tutorial*" by tutorialspoint.com, downloaded on July 2014, which is incorporated in its entirety for all purposes as if fully set forth herein.

A client device (in server/client architecture) typically receives information resources, services, and applications from servers, and is using a client dedicated or oriented operating system. Current popular server operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "*Windows Internals—Part* 1" and "*Windows Internals—Part* 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of the Windows NT family of operating systems, that was released for general availability on October 2012, and is described in Microsoft Press 2012 publication entitled: "*Introducing Windows 8—An Overview for IT Professionals*" by Jerry Honeycutt, which is incorporated in its entirety for all purposes as if fully set forth herein.

Chrome OS is a Linux kernel-based operating system designed by Google Inc. out of Mountain View, California, U.S.A., to work primarily with web applications. The user interface takes a minimalist approach and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "*Google™ Chrome OS USER GUIDE*" published 2011, which is incorporated in its entirety for all purposes as if fully set forth herein.

RTOS. A Real-Time Operating System (RTOS) is an Operating System (OS) intended to serve real-time applications that process data as it comes in, typically without buffer delays. The processing time requirements (including any OS delay) are typically measured in tenths of seconds or shorter increments of time, and is a time bound system which has well defined fixed time constraints. The processing is commonly to be done within the defined constraints, or the system will fail. They either are event driven or time sharing, where event driven systems switch between tasks based on their priorities while time sharing systems switch the task based on clock interrupts. A key characteristic of the RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. An RTOS that can usually or generally meet a deadline is a soft real-time OS, but if it can meet a deadline deterministically it is a hard real-time OS. The RTOS has an advanced algorithm for scheduling, and includes a scheduler flexibility that enables a wider, computer-system orchestration of process priorities. Key factors in a real-time OS are minimal interrupt latency and minimal thread switching latency; a real-time OS is valued more for how quickly or how predictably it can respond than for the amount of work it can perform in a given period of time.

Common designs of RTOS include event-driven, where tasks are switched only when an event of higher priority needs servicing; called preemptive priority, or priority scheduling, and time-sharing, where tasks are switched on a regular clocked interrupt, and on events; called round robin. The time-sharing design switches tasks more often than strictly needed, but give smoother multitasking, giving the illusion that a process or user has sole use of a machine. In typical designs, a task has three states: Running (executing on the CPU); Ready (ready to be executed); and Blocked (waiting for an event, I/O for example). Most tasks are blocked or ready most of the time because generally only one task can run at a time per CPU. The number of items in the ready queue can vary greatly, depending on the number of tasks the system needs to perform and the type of scheduler that the system uses. On simpler non-preemptive but still multitasking systems, a task has to give up its time on the CPU to other tasks, which can cause the ready queue to have a greater number of overall tasks in the ready to be executed state (resource starvation).

RTOS concepts and implementations are described in an Application Note No. RES05B00008-0100/Rec. 1.00 published January 2010 by Renesas Technology Corp. entitled: "*R8C Family General RTOS Concepts*", in JAJA Technology Review article published February 2007 [1535-5535/$32.00] by The Association for Laboratory Automation [doi:10.1016/j.jala.2006.10.016] entitled: "*An Overview of Real-Time Operating Systems*", and in Chapter 2 entitled: "*Basic Concepts of Real Time Operating Systems*" of a book published 2009 [ISBN-978-1-4020-9435-4] by Springer Science+Business Media B.V. entitled: "*Hardware-Dependent Software Principles and Practice*", which are all incorporated in their entirety for all purposes as if fully set forth herein.

QNX. One example of RTOS is QNX, which is a commercial Unix-like real-time operating system, aimed primarily at the embedded systems market. QNX was one of the first commercially successful microkernel operating systems and is used in a variety of devices including cars and mobile phones. As a microkernel-based OS, QNX is based on the idea of running most of the operating system kernel in the form of a number of small tasks, known as Resource Managers. In the case of QNX, the use of a microkernel allows users (developers) to turn off any functionality they do not require without having to change the OS itself; instead, those services will simply not run.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is 1/1000 of a second to 1/100 of a second, via an interrupt from a hardware timer, but this interval is often changed to suit a particular application. FreeRTOS™ is described in a paper by Nicolas Melot (downloaded July 2015) entitled: "*Study of an operating system: FreeRTOS Operating systems for embedded devices*", in a paper (dated Sep. 23, 2013) by Dr. Richard Wall entitled: "*Carebot PIC32 MX7ck implementation of Free RTOS*", FreeRTOS™ modules are described in the web-pages entitled: "*FreeRTOS™ Modules*" published in the www.freertos.org web-site dated 26 Nov. 2006, and FreeRTOS kernel is described in a paper published 1 Apr. 2007 by Rich Goyette of Carleton University as part of 'SYSC5701: Operating System Methods for Real-Time Applications', entitled: "*An Analysis and Description of the Inner Workings of the FreeRTOS Kernel*", which are all incorporated in their entirety for all purposes as if fully set forth herein.

SafeRTOS. SafeRTOS was constructed as a complementary offering to FreeRTOS, with common functionality but with a uniquely designed safety-critical implementation. When the FreeRTOS functional model was subjected to a full HAZOP, weaknesses with respect to user misuse and hardware failure within the functional model and API were identified and resolved. Both SafeRTOS and FreeRTOS share the same scheduling algorithm, have similar APIs, and are otherwise very similar, but they were developed with differing objectives. The SafeRTOS was developed solely in the C language to meet requirements for certification to IEC61508. SafeRTOS is known for its ability to reside solely in the on-chip read only memory of a microcontroller for standards compliance. When implemented in hardware memory, SafeRTOS code can only be utilized in its original configuration, so certification testing of systems using this OS need not re-test this portion of their designs during the functional safety certification process.

Vx Works. VxWorks is an RTOS developed as proprietary software and designed for use in embedded systems requiring real-time, deterministic performance and, in many cases, safety and security certification, for industries, such as aerospace and defense, medical devices, industrial equipment, robotics, energy, transportation, network infrastructure, automotive, and consumer electronics. The VxWorks supports Intel architecture, POWER architecture, and ARM architectures, and may be used in multicore asymmetric multiprocessing (AMP), symmetric multiprocessing (SMP), and mixed modes and multi-OS (via Type 1 hypervisor) designs on 32- and 64-bit processors. The Vx Works comes with the kernel, middleware, board support packages, Wind River Workbench development suite and complementary third-party software and hardware technologies. In its latest release, VxWorks 7, the RTOS has been re-engineered for modularity and upgradeability so the OS kernel is separate from middleware, applications and other packages. Scalability, security, safety, connectivity, and graphics have been improved to address Internet of Things (IoT) needs.

μC/OS. Micro-Controller Operating Systems (MicroC/OS, stylized as μC/OS) is a real-time operating system (RTOS) that is a priority-based preemptive real-time kernel for microprocessors, written mostly in the programming language C, and is intended for use in embedded systems. The MicroC/OS allows defining several functions in C, each of which can execute as an independent thread or task. Each task runs at a different priority, and runs as if it owns the central processing unit (CPU). Lower priority tasks can be preempted by higher priority tasks at any time. Higher priority tasks use operating system (OS) services (such as a delay or event) to allow lower priority tasks to execute. OS services are provided for managing tasks and memory, communicating between tasks, and timing.

Operating System (OS). An Operating System (OS) is software that manages computer hardware resources and provides common services for computer programs. The operating system is an essential component of any system software in a computer system, and most application programs usually require the operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

Process management. The operating system provides an interface between an application program and the computer hardware, so that an application program can interact with the hardware only by obeying rules and procedures programmed into the operating system. The operating system is also a set of services which simplify the development and execution of application programs. Executing an application program involves the creation of a process by the operating system kernel which assigns memory space and other resources, establishes a priority for the process in multi-tasking systems, loads program binary code into memory, and initiates execution of the application program which then interacts with the user and with hardware devices. The OS must allocate resources to processes, enable processes to share and exchange information, protect the resources of each process from other processes, and enable synchronization among processes. The OS maintains the data structure for each process, which describes the state and resource ownership of that process and enables the OS to exert control over each process.

In many modern operating systems, there can be more than one instance of a program loaded in memory at the same time; for example, more than one user could be executing the same program, each user having separate copies of the program loaded into memory. With some programs, known as re-entrant type, it is possible to have one copy loaded into memory, while several users have shared access to it so that they each can execute the same program-code. The processor at any instant can only be executing one instruction from one program but several processes can be sustained over a period of time by assigning each process to the processor at intervals while the remainder becomes temporarily inactive. A number of processes being executed over a period of time instead of at the same time is called concurrent execution. A multiprogramming or multitasking OS is a system executing many processes concurrently. A multiprogramming requires that the processor be allocated to each process for a period of time, and de-allocated at an appropriate moment. If the processor is de-allocated during the execution of a process, it must be done in such a way that it can be restarted later as easily as possible.

There are two typical ways for an OS to regain control of the processor during a program's execution in order for the OS to perform de-allocation or allocation: The process issues a system call (sometimes called a software interrupt); for example, an I/O request occurs requesting to access a file on a hard disk. Alternatively, a hardware interrupt occurs; for example, a key was pressed on the keyboard, or a timer runs out (used in pre-emptive multitasking). The stopping of one process and starting (or restarting) of another process is called a context switch or context change. In many modern operating systems, processes can consist of many sub-processes, known as the concept of a thread, that may be viewed as a sub-process; that is, a separate, independent sequence of execution within the code of one process. The threads are becoming increasingly important in the design of distributed and client-server systems and in software run on multi-processor systems.

Modes. Many contemporary processors incorporate a mode bit to define the execution capability of a program in the processor. This bit can be set to a kernel-mode or a user mode. The kernel-mode is also commonly referred to as supervisor mode, monitor mode, or ring 0, in which the processor can execute every instruction in its hardware repertoire, whereas in user mode, it can only execute a subset of the instructions. Instructions that can be executed only in kernel mode are called kernel, privileged or protected instructions to distinguish them from the user mode instructions. For example, I/O instructions are privileged. So, if an application program executes in user mode, it cannot perform its own I/O, and must request the OS to perform I/O on its behalf. The system may logically extend the mode bit to define areas of memory to be used when the processor is in kernel mode versus user mode. If the mode bit is set to kernel mode, the process executing in the processor can access either the kernel or user partition of the memory. However, if user mode is set, the process can reference only the user memory space, hence two classes of memory are defined, the user space and the system space (or kernel, supervisor, or protected space). In general, the mode bit extends the operating system's protection rights, and is set by the user-mode trap instruction, also called a supervisor call instruction. This instruction sets the mode bit, and branches to a fixed location in the system space. Since only the system code is loaded in the system space, only the system code can be invoked via a trap. When the OS has completed the supervisor call, it resets the mode bit to user mode prior to the return.

Computer operating systems provide different levels of access to resources, and these hierarchical protection domains are often referred to as 'protection rings', and are used to protect data and functionality from faults (by improving fault tolerance) and malicious behavior (by providing computer security). A protection ring is one of two or more hierarchical levels or layers of privilege within the architecture of the computer system. These levels may be hardware-enforced by some CPU architectures that provide different CPU modes at the hardware or microcode level. The rings are arranged in a hierarchy from most privileged (most trusted, usually numbered zero) to least privileged (least trusted, usually with the highest ring number). On most operating systems, kernel mode or 'Ring 0' is the level with the most privileges and interacts most directly with the physical hardware such as the CPU and memory. Special gates between rings are provided to allow an outer ring to access an inner ring's resources in a predefined manner, as opposed to allowing arbitrary usage. Correctly gating access between rings can improve security by preventing programs from one ring or privilege level from misusing resources intended for programs in another. For example, spyware running as a user program in Ring 3 should be prevented from turning on a web camera without informing the user, since hardware access should be a Ring 1 function reserved for device drivers. Programs such as web browsers running in higher numbered rings must request access to the network, a resource restricted to a lower numbered ring.

Kernel. With the aid of the firmware and the device drivers, the kernel provides most basic level of control over all of the computer's hardware devices. It manages memory access for programs in the RAM, it determines which programs get access to which hardware resources, it sets up or resets the CPU's operating states for optimal operation at all times, and it organizes the data for long-term non-volatile storage with file systems on such media as disks, tapes, flash memory, etc. The part of the system executing in the kernel supervisor state is called the kernel, or nucleus, of the operating system. The kernel operates as trusted software, meaning that when it was designed and implemented, it was intended to implement protection mechanisms that could not be covertly changed through the actions of untrusted software executing in user space. Extensions to the OS execute in user mode, so the OS does not rely on the correctness of those parts of the system software for the correct operation of the OS. Hence, a fundamental design decision for any function to be incorporated into the OS is whether it needs to be implemented in the kernel. If it is implemented in the kernel, it will execute in kernel (supervisor) space, and have access to other parts of the kernel. It will also be trusted software by the other parts of the kernel. If the function is implemented to execute in user mode, it will have no access to kernel data structures.

There are two techniques by which a program executing in user mode can request the kernel's services, namely 'System call' and 'Message passing'. Operating systems are typically with one or the other of these two facilities, but commonly not both. Assuming that a user process wishes to invoke a particular target system function, in the system call approach, the user process uses the trap instruction, so the system call should appear to be an ordinary procedure call to the application program; the OS provides a library of user functions with names corresponding to each actual system call. Each of these stub functions contains a trap to the OS function, and when the application program calls the stub, it executes the trap instruction, which switches the CPU to kernel mode, and then branches (indirectly through an OS table), to the entry point of the function which is to be invoked. When the function completes, it switches the processor to user mode and then returns control to the user process; thus, simulating a normal procedure return. In the message passing approach, the user process constructs a message, that describes the desired service, and then it uses a trusted send function to pass the message to a trusted OS process. The send function serves the same purpose as the trap; that is, it carefully checks the message, switches the processor to kernel mode, and then delivers the message to a process that implements the target functions. Meanwhile, the user process waits for the result of the service request with a message receive operation. When the OS process completes the operation, it sends a message back to the user process.

Interrupts handling. Interrupts are central to any operating system, as they provide an efficient way for the operating system to interact with and react to its environment. The interrupts are typically handled by the operating system's kernel, and provide a computer with a way of automatically saving local register contexts, and running specific code in response to events. When an interrupt is received, the computer's hardware automatically suspends whatever program is currently running, saves its status, and runs computer code previously associated with the interrupt. When a hardware device triggers an interrupt, the operating system's kernel decides how to deal with this event, generally by running some processing code. The amount of code being run depends on the priority of the interrupt, and the processing of hardware interrupts is executed by a device driver, which may be either part of the operating system's kernel, part of another program, or both. The device drivers may then relay information to a running program by various means. A program may also trigger an interrupt to the operating system. For example, if a program wishes to access a hardware (such as a peripheral), it may interrupt the operating system's kernel, which causes control to be passed back to the kernel. The kernel will then process the request. If a program wishes additional resources (or wishes to shed resources) such as memory, it will trigger an interrupt to get the kernel's attention. Each interrupt has its own interrupt handler. The number of hardware interrupts is limited by the number of interrupt request (IRQ) lines to the processor, but there may be hundreds of different software interrupts. Interrupts are a commonly used technique for computer multitasking, especially in real-time computing systems, which are commonly referred to as interrupt-driven systems.

Memory management. A multiprogramming operating system kernel is responsible for managing all system memory which is currently in use by programs, ensuring that a program does not interfere with memory already in use by another program. Since programs time share, each program must have independent access to memory. Memory protection enables the kernel to limit a process' access to the computer's memory. Various methods of memory protection exist, including memory segmentation and paging. In both segmentation and paging, certain protected mode registers specify to the CPU what memory address it should allow a running program to access. Attempts to access other addresses will trigger an interrupt which will cause the CPU to re-enter supervisor mode, placing the kernel in charge. This is called a segmentation violation (or Seg-V), and the kernel will generally resort to terminating the offending program, and will report the error.

Memory management further provides ways to dynamically allocate portions of memory to programs at their request, and free it for reuse when no longer needed. This is critical for any advanced computer system where more than a single process might be underway at any time. Several methods have been devised that increase the effectiveness of memory management. Virtual memory systems separate the memory addresses used by a process from actual physical addresses, allowing separation of processes and increasing the effectively available amount of RAM using paging or swapping to secondary storage. The quality of the virtual memory manager can have an extensive effect on overall system performance.

File system. Commonly a file system (or filesystem) is used to control how data is stored and retrieved. By separating the data into individual pieces, and giving each piece a name, the information is easily separated and identified, where each piece of data is called a "file". The structure and logic rules used to manage the groups of information and their names is called a "file system". There are many different kinds of file systems. Each one has a different structure and logic, properties of speed, flexibility, security, size, and more. Some file systems have been designed to be used for specific applications. For example, the ISO 9660 file system is designed specifically for optical discs. The file systems can be used on many different kinds of storage devices. Some file systems are used on local data storage devices; others provide file access via a network protocol (for example, NFS, SMB, or 9P clients). Some file systems are "virtual", in that the "files" supplied are computed on request (e.g., procfs) or are merely a mapping into a different file system used as a backing store. The file system manages access to both the content of files and the metadata about those files. It is responsible for arranging storage space, reliability, efficiency, and tuning with regard to the physical storage medium are important design considerations.

A disk file system takes advantages of the ability of disk storage media to randomly address data in a short amount of time. Additional considerations include the speed of accessing data following that was initially requested and the anticipation that the following data may also be requested. This permits multiple users (or processes) access to various data on the disk without regard to the sequential location of the data. Examples include FAT (FAT12, FAT16, FAT32), exFAT, NTFS, HFS and HFS+, HPFS, UFS, ext2, ext3, ext4, XFS, btrfs, ISO 9660, Files-11, Veritas File System, VMFS, ZFS, ReiserFS and UDF. Some disk file systems are journaling file systems or versioning file systems.

TMPFS. TMPFS (or tmpfs) is a common name for a temporary file storage facility on many Unix-like operating systems. While intended to appear as a mounted file system, it is stored in volatile memory instead of a non-volatile storage device. A similar construction is a RAM disk, which appears as a virtual disk drive and hosts a disk file system. The tmpfs is typically a file system based on SunOS virtual memory resources, which does not use traditional non-volatile media to store file data; instead, the tmpfs files exist solely in virtual memory maintained by the UNIX kernel. Because the tmpfs file systems do not use dedicated physical memory for file data, but instead use VM system resources and facilities, they can take advantage of kernel resource management policies. The tmpfs is designed primarily as a performance enhancement to allow short-lived files to be written and accessed without generating disk or network I/O. Tmpfs maximizes file manipulation speed while preserving UNIX file semantics. It does not require dedicated disk space for files and has no negative performance impact. The tmpfs is described in a Sun Microsystem Inc. paper entitled: "*tmpfs: A Virtual Memory File System*" by Peter Snyder, downloaded on July 2014, which is incorporated in its entirety for all purposes as if fully set forth herein.

Device drivers. A device driver is a specific type of computer software developed to allow interaction with hardware devices. Typically, this constitutes an interface for communicating with the device, through the specific computer bus or communications subsystem that the hardware is connected to, providing commands to and/or receiving data from the device, and on the other end, the requisite interfaces to the operating system and software applications. It is a specialized hardware-dependent computer program which is also operating system specific that enables another program, typically an operating system or applications software package or computer program running under the operating system kernel, to interact transparently with a hardware device, and usually provides the requisite interrupt handling necessary for any necessary asynchronous time-dependent hardware interfacing needs.

Networking. Most operating systems support a variety of networking protocols, hardware, and applications for using them, allowing computers running dissimilar operating systems to participate in a common network, for sharing resources such as computing, files, printers, and scanners, using either wired or wireless connections. Networking can essentially allow a computer's operating system to access the resources of a remote computer, to support the same functions as it could if those resources were connected directly to the local computer. This includes everything from simple communication, to using networked file systems, or sharing another computer's graphics or sound hardware. Some network services allow the resources of a computer to be accessed transparently, such as SSH, which allows networked users direct access to a computer's command line interface. A client/server networking allows a program on a computer, called a client, to connect via a network to another computer, called a server. Servers offer (or host) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

Input/Output (I/O) handling. An input/output (or I/O) is the communication between an information processing system (such as a computer) and the outside world, possibly a human or other information processing system. The inputs are typically the signals or data received by the system, and the outputs are the signals or data sent from it. The I/O devices may be used by a person (or other system) to communicate with a computer. For instance, a keyboard or a mouse may be an input device for a computer, while monitors and printers are considered output devices for a computer. The devices for communication between computers, such as modems and network cards, typically serve for both input and output.

User interface. Every computer that is to be operated by a human being requires a user interface, usually referred to as a 'shell', and is essential if human interaction is to be supported. The user interface views the directory structure and requests services from the operating system that will acquire data from input hardware devices, such as a keyboard, mouse or credit card reader, and requests operating system services to display prompts, status messages and such on output hardware devices, such as a video monitor or printer. The two most common forms of a user interface have historically been the command-line interface, where computer commands are typed out line-by-line, and the Graphical User Interface (GUI), where a visual environment (most commonly a WIMP) is present. Typically the GUI is integrated into the kernel, allowing the GUI to be more responsive by reducing the number of context switches required for the GUI to perform its output functions.

WDM. The Windows Driver Model (WDM), also known as the Win32 Driver Model, is a standard model defining a framework for device drivers specified by Microsoft, providing unified driver models. The WDM model is based on WDM drivers that are layered in a complex hierarchy and communicate with each other via I/O Request Packets (IRPs). The WDM was introduced with Windows 98 and Windows 2000 to replace VxD which was used on older versions of Windows such as Windows 95 and Windows 3.1, as well as the Windows NT Driver Model, and WDM drivers are usable on all of Microsoft's operating systems of Windows 95 and later. The WDM is described in the publication entitled: "*Microsoft Windows Driver Model* (*WDM*)", by Mohamad (Hani) Atassy, submitted to Dr. Dennis R. Hafermann dated Jan. 28, 2002, and in a publication entitled: "*A Comparison of the Linux and Windows Device Driver Architecture*", by Melekam Tsegaye and Richard Foss, both from Rhodes University, South-Africa, downloaded from the Internet on July 2014, both are incorporated in their entirety for all purposes as if fully set forth herein.

A general schematic view of the WDM architecture 930 is shown in FIG. 3. In the example shown, three applications designated as application #1 931*a*, application #2 931*b*, and application #3 931*c*, are accessing three peripheral hardware devices, designated as peripheral #1 939*a*, peripheral #2 939*b*, and peripheral #3 939*c*. The model involves three layers. The lower layer is the hardware layer 930*c*, which includes the hardware devices and peripherals, accessed by a processor (such as a processor 27) via a hardware bus 930*d*, which may correspond to an internal bus 13 shown in FIG. 1. The highest layer is a 'user space' layer 930*a*, corresponding to the user mode and to the higher 'ring' layers such as Ring 3, and is relating to the space is the memory area where application software and some drivers execute. The kernel of the operating system provides the services as part of a 'kernel space' layer 930*b*, serving as an intermediate layer between the user space layer 930*a* and the hardware layer 930*c*. The kernel space 930*b* operates in a highly privileged hierarchical protection domain, and is strictly reserved for running privileged kernel, kernel extensions, and most device drivers, and is typically corresponding to the kernel mode and to the 'ring-0' layer (in x86 processors). The kernel mode may be supported by the processor hardware, or may be supported by a code segment level.

The user mode applications (such as application #1 931*a*, application #2 931*b*, and application #3 931*c*) access the kernel space 930*b* by the invoking of system calls respectively denoted as connections 932*a*, 932*b* and 932*c*. Typically, such system calls are processed via an intermediating entity known as Windows API, such as a Win32 API 933, which may access the kernel space 930*b* via a standard messaging 934. The Win32 API 933 is an example of a Windows API (informally WinAPI), which is Microsoft's core set of Application Programming Interfaces (APIs) available in the Microsoft Windows operating systems.

Almost all Windows programs interact with the Windows API; on the Windows NT line of operating systems, a small number (such as programs started early in the Windows startup process) uses the Native API. Supporting for developers is in the form of the Windows Software Development Kit (SDK), providing documentation and tools necessary to build software based upon the Windows API and associated Windows interfaces. The Win32 API 933 is the 32-bit API for modern versions of Windows, and consists of functions implemented, as with Win16, in system DLLs. The core DLLs of the Win32 include the kernel32.dll, user32.dll, and gdi32.dll. The Win32 API is described in the tutorial entitled: "*Welcome to Version* 2.0 *of the Win*32 *API Tutorial*" by Prof. M. Saeed, published by Brook Miles, downloaded from the Internet on July 2014, which is incorporated in its entirety for all purposes as if fully set forth herein.

System calls provide an essential interface between a process and the operating system. A system call is how a program requests a service from an operating system's kernel. This may include hardware related services (e.g., accessing the hard disk), creating and executing new processes, and communicating with integral kernel services (such as scheduling). A system call is typically processed in the kernel mode, which is accomplished by changing the processor execution mode to a more privileged one. The hardware sees the world in terms of the execution mode according to the processor status register, and processes are an abstraction provided by the operating system. A system call does not require a context switch to another process, it is processed in the context of whichever process invoked it. The system calls are often executed via traps or interrupts, that automatically puts the CPU into some required privilege level, and then pass control to the kernel, which determines whether the calling program should be granted the requested service. If the service is granted, the kernel executes a specific set of instructions over which the calling program has no direct control, returns the privilege level to that of the calling program, and then returns control to the calling program. Implementing system calls requires a control transfer, which involves some sort of architecture-specific feature.

System calls can be roughly grouped into five major categories: Process control, such as load, execute, create/terminate process, get/set process attributes, wait for time, wait event, and signal event; file management, such as request/release device, create/delete file, open/close file, read/write/reposition file, and get/set file attributes; device management, such as read/write/reposition device, get/set device attributes, and logically attach/detach devices; information maintenance, such as get/set time or date, get/set system data, and get/set process, file, or device attributes; and communication such as create, delete communication connection, transfer status information, and attach or detach remote devices.

The system calls are commonly handled by the I/O manager 935*b*, which allows devices to communicate with user-mode subsystems. It translates user-mode read and write commands into a read or write IRPs which it passes to the device drivers. It accepts file system I/O requests and translates them into device specific calls, and can incorporate low-level device drivers that directly manipulate the hardware to either read input or write output. It also includes a cache manager to improve disk performance by caching read requests and write to the disk in the background. The I/O manager 935*b* may interface with a power manager 935*c*, which deals with power events (power-off, stand-by, hibernate, etc.) and notifies affected drivers with special IRPs (Power IRPs).

A PnP manager 935*a* handles 'Plug and Play' and supports device detection and installation at boot time. It also has the responsibility to stop and start devices on demand, which can happen when a bus (such as USB or FireWire) gains a new device and needs to have a device driver loaded to support it. The PnP manager 935*a* may be partially implemented in user mode, in the Plug and Play Service, which handles the often complex tasks of installing the appropriate drivers, notifying services and applications of the arrival of new devices, and displaying GUI to the user.

The I/O Request Packets (IRPs) are kernel mode structures that are used to communicate with each other and with the operating system. They are data structures that describe the I/O requests, to a driver, all of these parameters (such as buffer address, buffer size, I/O function type, etc.) are passed via a single pointer to this persistent data structure. The IRPs with all of its parameters can be put on a queue if the I/O request cannot be performed immediately. The I/O completion is reported back to the I/O manager by passing its address to a routine for that purpose, 'I/O Complete Request'. The IRPs may be repurposed as a special kernel APC object if such is required to report the completion of the I/O to the requesting thread. The IRPs are typically created by the I/O Manager in response to I/O requests from user mode. However, IRPs are sometimes created by the plug-and-play manager, power manager, and other system components, and can also be created by drivers and then passed to other drivers.

The WDM uses kernel-mode device drivers to enable it to interact with hardware devices, where each of the drivers has well defined system routines and internal routines that it exports to the rest of the operating system. DriverEntry is the first routine called after a driver is loaded, and is responsible for initializing the driver. All devices are seen by user mode code as a file object in the I/O manager, though to the I/O manager itself the devices are seen as device objects, which it defines as either file, device, or driver objects. The drivers may be aggregated as a drivers stack 936, including kernel mode drivers in three levels: highest level drivers 936*a*, intermediate drivers 936*b*, and low-level drivers 936*c*. The highest level drivers 936*a*, such as file system drivers for FAT and NTFS, rely on the intermediate drivers 936*b*, which consist of function drivers or main drivers for a device, that are optionally sandwiched between lower and higher level filter drivers. The highest-level drivers 936*a* typically know how files are represented on disk, but not the details of how to actually fetch the data, the intermediate level drivers process the requests from the highest-level driver by breaking down a large request into a series of small chunks. The function driver commonly possesses the details relating to how the hardware of the peripheral works, and typically relies on a bus driver, or a driver that services a bus controller, adapter, or bridge, which can have an optional bus filter driver that sits between itself and the function driver. For example, a PCI bus driver detects the PCI-slot plugged card or hardware, and determines the I/O-mapped or the memory-mapped connection with the host. Intermediate drivers 936*b* rely on the low-level drivers 936*c* to function. The lowest-level drivers 936*c* are either legacy device drivers that control a device directly, or can be a PnP hardware bus. These lower-level drivers 936*c* directly control hardware and do not rely on any other drivers. The I/O manager 935*b* communicate with the high-level driver 936*a* using IRP 937*a*, the high-level driver 936*a* communicates with the intermediate level driver 936*b* using IRP 937*b*, the intermediate level driver 936*b* communicates with the low-level driver 936*c* using IRP 937*c*, and the low-level driver 936*c* communicates with a HAL 938 using IRP 937*d*.

WDM drivers can be classified into the following types and sub-types: Device function drivers, bus drivers, and filter drivers. A function driver is the main driver for a device. A function driver is typically written by the device vendor and is required (unless the device is being used in raw mode). The function driver can service one or more devices. Miniport drivers are a type of function drivers for interfaces such as USB, audio, SCSI and network adapters. They are hardware specific, but the control access to the hardware is through a specific bus class driver. Class drivers are a type of function drivers and can be thought of as built-in framework drivers that miniport and other class drivers can be built on top of. The class drivers provide interfaces between different levels of the WDM architecture. Common functionality between different classes of drivers can be written into the class driver and used by other class and miniport drivers. The lower edge of the class driver will have its interface exposed to the miniport driver, while the upper edge of top-level class drivers is operating system specific. Class drivers can be dynamically loaded and unloaded at will. They can do class specific functions that are not hardware or bus-specific (with the exception of bus-type class drivers) and in fact sometimes only do class specific functions such as enumeration.

A bus driver services a bus controller, adapter, or bridge. Microsoft provides the bus drivers for most common buses, such as Advanced Configuration and Power Interface (ACPI), Peripheral Component Interconnect (PCI), PnPISA, SCSI, Universal Serial Bus (USB), and Fire Wire. The bus driver can service more than one bus if there is more than one bus of the same type on the machine. The ACPI bus driver interacts with the ACPI BIOS to enumerate the devices in the system and control their power use, the PCI bus driver (such as pci.sys) enumerates and configures devices connected via the PCI bus, the FireWire and the USB bus driver respectively enumerates and controls devices connected via the IEEE 1394 high speed bus and the USB. The stream class driver provides a basic processing supporting high bandwidth, time critical, and video and audio data related hardware, and uses minidrivers for interfacing the actual hardware, and hard-disk, floppies, CDs, and DVDs are interfaces using SCSI and CDROM/DVD class driver. The Human Input Device (HID) provides an abstract view of input devices, and the Still Image Architecture (SIA) class driver is used to obtain content from a scanner and a still camera, using minidrivers. For example, accessing the hard disk (such as the HDD 25*c*) involves a file system driver as high-level driver, a volume manager driver as an intermediate level driver, and a disk driver as a low-level driver.

The filter drivers are optional drivers that add value to or modify the behavior of a device and may be non-device drivers, and can also serve as one or more devices. Upper-level filter drivers sit above the primary driver for the device (the function driver), while lower-level filter drivers sit below the function driver and above the bus driver. The driver service is a type of kernel-level filter driver implemented as a Windows service that enables applications to work with devices.

The Hardware Abstraction Layer 938, or HAL, is a layer between the physical hardware layer 930*c* of the computer and the rest of the operating system. It was designed to hide differences in hardware and therefore provide a consistent platform on which the kernel is run. The HAL 938 includes hardware-specific code that controls I/O interfaces, interrupt controllers, and multiple processors. Typically, the particular hardware abstraction does not involve abstracting the instruction set, which generally falls under the wider concept of portability. Abstracting the instruction set, when necessary (such as for handling the several revisions to the x86 instruction set, or emulating a missing math coprocessor), is performed by the kernel, or via platform virtualization.

Linux is a Unix-like and mostly POSIX-compliant computer operating system assembled under the model of free and open source software development and distribution. The defining component of Linux is the Linux kernel, an operating system kernel first released on 5 Oct. 1991 by Linus Torvalds. Linux was originally developed as a free operating system for Intel x86-based personal computers, but has since been ported to more computer hardware platforms than any other operating system. Linux also runs on embedded systems such as mobile phones, tablet computers, network routers, facility automation controls, televisions, and video game consoles. Android, which is a widely used operating system for mobile devices, is built on top of the Linux kernel. Typically, Linux is packaged in a format known as a Linux distribution for desktop and server use.

Linux distributions include the Linux kernel, supporting utilities and libraries, and usually a large amount of application software to fulfill the distribution's intended use. A Linux-based system is a modular Unix-like operating system, that uses a monolithic kernel, the Linux kernel, which handles process control, networking, and peripheral and file system access. The device drivers are either integrated directly with the kernel or added as modules loaded while the system is running. Some components of an installed Linux system are a bootloader, for example, GNU GRUB or LILO, which is executed by the computer when it is first turned on, and loads the Linux kernel into memory; an initialization program, which is the first process launched by the Linux kernel, and is at the root of the process tree, and starts processes such as system services and login prompts (whether graphical or in terminal mode); Software libraries which contain code which can be used by running processes; and user interface programs such as command shells or windowing environments. A version of Linux is described, for example, in IBM Corporation (headquartered in Armonk, New-York, U.S.A.) publication No. SC34-2597-03 entitled: "*Device Drivers, Features, and Commands on Red Hat Exterprise Linux* 6.3", downloaded from the Internet on July 2014, which is incorporated in its entirety for all purposes as if fully set forth herein.

The general schematic Linux driver architecture 950 is shown in FIG. 3*a*, and the Linux kernel is further described in Wiley Publishing, Inc. publication entitled: "Professional Linux Kernel Architecture", by Wofgang Mauerer published 2008, and Linux programming is described in the book entitled: "*The Linux Kernel Module Programming Guide*" ver. 2.6.4 by Peter Jay Salzman, Michael Burian, and Ori Pomerantz, dated May 18, 2007, and in the publication entitled: "*A Comparison of the Linux and Windows Device Driver Architecture*", by Melekam Tsegaye and Richard Foss, both from Rhodes University, South-Africa, downloaded from the Internet on July 2014, which are all incorporated in their entirety for all purposes as if fully set forth herein.

Similar to the WDM 930 shown in FIG. 3, the Linux kernel involves a 'System Call Interface' 953, receiving system calls 952*a*, 952*b*, and 952*c* from the respective applications such as an application #1 931*a*, an application #2 931*b*, and an application #3 931*c*, and serves as the denomination for the entirety of all implemented and available system calls in a kernel. The Linux kernel is based on a layered modules stack 954, which may include three levels of modules, such as module #1 954*a*, module #2 954*b*, and module #3 954*c*, where the module #1 954*a* communicate over connection 955*a* with the system call interface 953, the module #2 954*b* communicates with the module #1 954*a* over connection 955*b*, the module #3 954*c* communicates over the connection 955*c* with the module #2 954*b* and over a connection 955*d* with the HAL 938.

Similar to the WDM 930 shown in FIG. 3, the Linux kernel shown as the arrangement 950 in FIG. 3*a*, is using the concept of layered architecture of a modules stack 954, which may comprise module #1 954*a*, module #2 954*b*, and module #3 954*c*, communicating using messaging mechanism, such as a connection 955*a* between the system call interface 953 and the module #1 954*a*, a connection 955*b* between the module #1 954*a* and the module #2 954*b*, a connection 955*c* between the module #2 954*b* and the module #3 954*c*, and a connection 955*d* between the module #3 954*c* and the HAL 938.

The modules in the modules stack 954, typically referred to as Loadable Kernel Modules (LKMs), are object files that contain code to extend the running Linux kernel, or so-called base kernel. The LKMs are typically used to add support for new hardware and/or filesystems, or for adding system calls. When the functionality provided by the LKM is no longer required, it can be unloaded in order to free memory and other resources. The loadable kernel modules in Linux are located in /lib/modules and have had the extension '.ko' ("kernel object") since version 2.6 (previous versions used the .o extension), and are loaded (and unloaded) by the modprobe command. The lsmod command lists the loaded kernel modules. In emergency cases, when the system fails to boot (due to e.g., broken modules), specific modules can be enabled or disabled by modifying the kernel boot parameters list (for example, if using GRUB, by pressing 'e' in the GRUB start menu, then editing the kernel parameter line). Linux allows disabling module loading via sysctl option/proc/sys/kernel/modules_disabled. An initramfs system may load specific modules needed for a machine at boot and then disable module loading.

Multicasting. A multitasking is a method where multiple tasks (also known as processes or programs) are performed during the same period of time, and executed concurrently (in overlapping time periods, new tasks starting before others have ended) instead of sequentially (one completing before the next starts). The tasks share common processing resources, such as a CPU and main memory. Multitasking does not necessarily mean that multiple tasks are being executed, exactly at the same instant. In other words, multitasking does not imply parallelism, but it does mean that more than one task can be part-way through execution at the same time, and more than one task is advancing over a given period of time.

In the case of a computer with a single CPU, only one task is said to be running at any point in time, meaning that the CPU is actively executing instructions for that task. Multitasking solves the problem by scheduling which task may be the one running at any given time, and when another waiting task gets its turn. The act of reassigning a CPU from one task to another one is called a context switch. When context switches occur frequently enough, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than the number of available CPUs.

Operating systems may adopt one of many different scheduling strategies. In multiprogramming systems, the running task keeps running until it performs an operation that requires waiting for an external event (e.g., reading from a tape) or until the computer's scheduler forcibly swaps the running task out of the CPU. Multiprogramming systems are designed to maximize CPU usage. In time-sharing systems, the running task is required to relinquish the CPU, either voluntarily or by an external event such as a hardware interrupt. Time sharing systems are designed to allow several programs to execute simultaneously. In real-time systems, some waiting tasks are guaranteed to the CPU when an external event occurs. Real time systems are designed to control mechanical devices such as industrial robots, which require timely processing.

Multiprocessing. Multiprocessing is the use of two or more processors or Central Processing Units (CPUs) within a single computer system, typically combined with the ability to allocate tasks between them. In order to process programs simultaneously, the multiple processors commonly share the main memory and peripherals. In a multiprocessing system, all CPUs may be equal, or some may be reserved for special purposes. A combination of hardware and operating system software design considerations determine the symmetry (or lack thereof) in a given system. For example, hardware or software considerations may require that only one particular CPU respond to all hardware interrupts, whereas all other work in the system may be distributed equally among CPUs; or execution of kernel-mode code may be restricted to only one particular CPU, whereas user-mode code may be executed in any combination of processors. Systems that treat all CPUs equally are called symmetric multiprocessing (SMP) systems. In systems where all CPUs are not equal, system resources may be divided in a number of ways, including Asymmetric Multiprocessing (ASMP), Non-Uniform Memory Access (NUMA) multiprocessing, and clustered multiprocessing.

In multiprocessing, the processors are typically used to execute a single sequence of instructions in multiple contexts (single-instruction, multiple-data or SIMD, often used in vector processing), multiple sequences of instructions in a single context (multiple-instruction, single-data or MISD, used for redundancy in fail-safe systems and sometimes applied to describe pipelined processors or hyper-threading), or multiple sequences of instructions in multiple contexts (multiple-instruction, multiple-data or MIMD). Tightly coupled multiprocessor systems contain multiple CPUs that are connected at the bus level, and may have access to a central shared memory (SMP or UMA), or may participate in a memory hierarchy with both local and shared memory (NUMA). Chip multiprocessors, also known as multi-core computing, involves more than one processor placed on a single chip and can be thought of as the most extreme form of tightly-coupled multiprocessing. Loosely coupled multiprocessor systems (often referred to as clusters) are based on multiple standalone single, or dual processor commodity computers interconnected via a high-speed communication system (Gigabit Ethernet is common). Tightly-coupled systems perform better and are physically smaller than loosely-coupled systems, but have historically required greater initial investments and may depreciate rapidly. Nodes in a loosely-coupled system are usually inexpensive commodity computers and can be recycled as independent machines upon retirement from the cluster.

Filter driver. A filter driver is a Microsoft Windows compatible driver that extends or modifies the function of peripheral devices, or supports a specialized device in a personal computer, and commonly relates to a driver, program, or module that is inserted into the existing driver stack to perform some specific function, while not affecting the normal working of the existing driver stack in any major way. Any number of filter drivers can be added to Windows, where upper-level filter drivers sit above the primary driver for the device (the function driver), while lower level filter drivers sit below the function driver and above a bus driver. Filter drivers may work on a certain brand of devices such as a mouse or keyboard, or they may perform some operation on a class of devices, such as any mouse or any keyboard. The filter driver may be developed using the guide entitled: "*Filter Driver Development Guide*" Version 1.0a by Microsoft Corporation, dated 2004, which is incorporated in its entirety for all purposes as if fully set forth herein.

Hook. A hook (also known as a hook procedure or hook function) is a mechanism by which an application can intercept events, such as messages, mouse actions, and keystrokes, and generally refers to a function provided by a software application that receives certain data before the normal or intended recipient of the data. The hook function can thus examine or modify certain data before passing on the data. The hook function allows a software application to examine, or modify data before the data is passed to the intended recipient. A function that intercepts a particular type of event is known as a hook procedure. The hook procedure can act on each event it receives, and then modify or discard the event. The term 'hooking' is used herein to include, but not limited to, a range of techniques used to alter or augment the behavior of an operating system, applications, or other software components by intercepting function calls, messages, or events passed between software components. A code that handles such intercepted function calls, events or messages is called a "hook". The hooking is used for many purposes, including debugging and extending functionality.

Examples may include intercepting keyboard or mouse event messages before they reach an application, or intercepting operating system calls in order to monitor behavior, or modifying the function of an application or another component. It is also widely used in benchmarking programs, for example frame rate measuring in 3D games, where the output and input are done through hooking. Hooking is described in the presentations by High-Tech Bridge SA and titled: "*Userland Hooking in Windows*" dated August 2011, and "*Inline Hooking in Windows*" dated September 2011, both by Brian Mariani, and both incorporated in their entirety for all purposes as if fully set forth herein.

Physical modification. A hooking may be achieved by physically modifying an executable or library before an application is run through techniques of reverse engineering. This is typically used to intercept function calls to either monitor or replace them entirely. For example, by using a disassembler, the entry point of a function within a module can be found. It can then be altered to dynamically load some other library module and then have it execute desired methods within that loaded library. If applicable, altering an import table of an executable is another related approach by which hooking can be achieved. This table can be modified to load any additional library modules as well as changing what external code is invoked when a function is called by an application. An alternate method for achieving the function of hooking is by intercepting function calls through a wrapper library. When creating a wrapper, you make your own version of a library that an application loads, with all the same functionality of the original library that it will replace, so all the functions that are accessible, are essentially the same between the original and the replacement. This wrapper library can be designed to call any of the functionality from the original library, or replace it with an entirely new set of logic.

Runtime modification. Operating systems and software may provide the means to easily insert event hooks at runtime, as long as the process of inserting the hook is granted enough permission to do so. Microsoft Windows allows inserting hooks that can be used to process or modify system events and application events for dialogs, scrollbars, and menus, as well as other items. It also allows a hook to insert, remove, process, or modify keyboard and mouse events. Linux provides another example where hooks can be used in a similar manner to process network events within the kernel through NetFilter. When such functionality is not provided, a special form of hooking employs intercepting library function calls that are made by a process. Function hooking is implemented by changing the very first few code instructions of the target function to jump to an injected code. Alternatively, on systems using the shared library concept, the interrupt vector table or the import descriptor table can be modified in memory.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, while others can modify the messages, or stop their progress through the chain, restricting them from reaching the next hook procedure, or a destination window.

Plug-in. A plug-in (or 'plugin', 'extension', or 'add-on'/'addon') is a software component that adds a specific feature to an existing software application, such as enabling customization. The common examples are the plug-ins used in web browsers to add new features such as search-engines or virus scanners, or the ability to utilize a new file type such as a new video format. An 'Add-on' (or 'addon') is the general term for what enhances an application, and comprises snap-in, plug-in, theme, and skin. An extension add-on tailors the core features of an application by adding an optional module, whereas a plug-in add-on would tailor the outer layers of an application to personalize functionality. A theme or a skin add-on is a preset package containing additional or changed graphical appearance details, achieved by the use of a Graphical User Interface (GUI) that can be applied to a specific software and websites to suit the purpose, topic, or tastes of different users to customize the look and feel of a piece of computer software or an operating system front-end GUI (and window managers).

Typically, the host application provides services which the plug-in can use, including a way for plug-ins to register themselves with the host application, and a protocol for the exchange of data with plug-ins. Plug-ins depend on the services provided by the host application and do not usually work by themselves. Conversely, the host application operates independently of the plug-ins, making it possible for end-users to add and update plug-ins dynamically without needing to make changes to the host application. The term 'plug-in' is used herein to include, but not limited to, a software extension, which is software that serves to extend the capabilities of, or data available to existing software applications; it becomes included in the program. Therefore, after integration, extensions can be seen as part of the browser itself, tailored from a set of optional modules.

IPC. An Inter-Process Communication (IPC) (also be referred to as inter-thread communication and inter-application communication) is a set of methods for the exchange of data between multiple threads, in one or more processes. IPC methods may use message passing, synchronization, shared memory, and Remote Procedure Calls (RPC). It provides an environment that allows process cooperation, and may be used for providing information sharing, computational speedup, modularity, convenience, and privileged separation. In the Windows operating system environment, the IPC provides mechanisms for facilitating communications and data sharing between processes or applications.

Common IPC methods include file sharing, where a record (or any other information) stored on disk (or any other memory) can be accessed by name by any process; a signal which is an asynchronous notification sent to a process, or to a specific thread within the same process in order to notify it of an event that occurred; a socket which is a data stream sent over a network interface, either to a different process on the same computer or on another computer, such as Internet sockets; a pipe (or pipeline) which is a two-way data stream interfaced through standard input and output and is read character by character, commonly used in Unix-like computer operating systems; message queues which are anonymous data stream similar to the pipe that stores and retrieves information in packets, providing an asynchronous communications protocol; a semaphore which is a variable or abstract data type that is used for controlling access to a common resource; a shared memory which is a memory that may be simultaneously accessed by multiple programs with an intent to provide communication among them, or avoid redundant copies, such as where one process creates an area in RAM which other processes can access; and memory mapped file, where a file that is physically present on-disk, but can also be a device, shared memory object, or other resource that the operating system can reference through a file descriptor. Few IPC mechanisms are described in Chapter 9 of the Marko Vuskovic publication 'Operating Systems', entitled: "*INTERPROCESS COMMUNICATION*", which is incorporated in its entirety for all purposes as if fully set forth herein.

The Windows operating system supports IPC mechanisms such as a clipboard, where the clipboard acts as a central depository for data sharing among applications, so when a user performs a cut or copy operation in an application, the application puts the selected data on the clipboard in one or more standard, or application-defined formats, and any other application can then retrieve the data from the clipboard, choosing from the available formats that it understands; using Component Object Model (COM), where applications that use Object Linking and Embedding (OLE) manage compound documents can be used to call on other applications for data editing; Using Data Copy enabling an application to send information to another application using the WM_COPYDATA message; DDE protocol that enables applications to exchange data in a variety of formats; and mailslots providing one-way communication where processes write messages to their mailslot.

Browser extension. A browser extension is a computer program that extends the functionality of a web browser in some way. Extensions can be created through the use of web technologies such as HTML, JavaScript, and CSS. Browser extensions can also improve the user interface of the web browser without directly affecting the viewable content of a web-page, which can be achieved through a variety of add-ons, such as toolbars and plug-ins. The syntax for extensions may differ from browser to browser, or at least enough difference is that an extension working on a browser does not work on another one.

Plug-ins add specific abilities into browsers using Application Programming Interfaces (APIs) allowing third parties to create plug-ins that interact with the browser. The original API was NPAPI, but subsequently, Google introduced the PPAPI interface in Chrome. In addition, plug-ins allow browser extensions to perform tasks such as blocking ads, creating a secure online connection, and adding applications to a browser. Common browser plug-ins include the Adobe Flash Player, the QuickTime Player, and the Java plug-in, which can launch a user-activated Java applet on a web-page, and the applet is then executed within a Java Virtual Machine (JVM) in a process separate from the web browser itself.

Sockets. A socket (a.k.a. 'network socket') is an endpoint of an IPCflow across a computer network. In the case the communication is based on IP (Internet Protocol), the network sockets are referred to as Internet sockets. A socket API is an application programming interface (API), usually provided by the operating system that allows application programs to control and use network sockets. Internet socket APIs are usually based on the Berkeley sockets standard. The socket address is the combination of an IP address and a port number, similar to one end of a telephone connection in the combination of a phone number and a particular extension. Based on this address, internet sockets deliver incoming data packets to the appropriate application process or thread. The sockets are further described in a University of Toronto, Department of Computer Science presentation entitled: "*Tutorial on Socket Programming*" by Amin Tootoonchian, downloaded on August 2014, and in the SAS Institute Inc. SHARE Session 5958 tutorial 'C Socket Programming Tutorial' entitled: "*Writing Client/Server Programs in C Using Sockets* (*A Tutorial*) *Part I*", by Greg Granger, dated February of 1998, which are both incorporated in their entirety for all purposes as if fully set forth herein.

The Internet socket is characterized by a unique combination of a Local socket address (Local IP address and port number), remote socket address (used for established TCP sockets), and the used Protocol, typically a transport protocol (e.g., TCP, UDP, raw IP, or others). Within the operating system and the application that created a socket, a socket is referred to by a unique integer value called a socket descriptor. The operating system forwards the payload of incoming IP packets to the corresponding application by extracting the socket address information from the IP and transport protocol headers, and stripping the headers from the application data.

Several Internet socket types are available, such as Datagram sockets, also known as connectionless sockets, which use User Datagram Protocol (UDP), Stream sockets, also known as connection-oriented sockets, which use Transmission Control Protocol (TCP) or Stream Control Transmission Protocol (SCTP), and Raw sockets (or Raw IP sockets), typically available in routers and other network equipment. Here the transport layer is bypassed, and the packet headers are made accessible to the application. Other socket types are implemented over other transport protocols, such as Systems Network Architecture (SNA). Communicating local and remote sockets are called socket pairs. Each socket pair is described by a unique 4-tuple consisting of source and destination IP addresses and port numbers, i.e., of local and remote socket addresses. In the TCP case, each unique socket pair 4-tuple is assigned a socket number, while in the UDP case each unique local socket address is assigned a socket number.

The socket is primarily a concept used in the Transport Layer of the Internet model. Networking equipment such as routers and switches, do not require implementations of the Transport Layer, as they operate on the Link Layer level (switches) or at the Internet Layer (routers). However, stateful network firewalls, network address translators, and proxy servers keep track of active socket pairs. Also in fair queuing, layer 3 switching and quality of service (QoS) support in routers, packet flows may be identified by extracting information about the socket pairs. Raw sockets are typically available in network equipment and are used for routing protocols such as IGRP and OSPF, and in Internet Control Message Protocol (ICMP).

Web browser. A web browser (commonly referred to as a browser) is a software application for retrieving, presenting, and traversing information resources on the World Wide Web (WWW). An information resource is identified by a Uniform Resource Identifier (URI/URL) and may be part of a web-page, a whole web-page, an image, a video, or any other piece of content. Hyperlinks present in resources enable users easily to navigate their browsers to related resources. Although browsers are primarily intended to use the World Wide Web, they can also be used to access information provided by web servers in private networks or files in file systems. The primary purpose of the web browser is to bring information resources to the user ("retrieval" or "fetching"), allowing them to view the information ("display", "rendering"), and then access other information ("navigation", "following links"). Currently the major web browsers are known as Firefox, Internet Explorer, Google Chrome, Opera, and Safari.

The process begins when the user inputs a Uniform Resource Locator (URL), for example 'http://en.wikipedia.org/', into the browser. The prefix of the URL, the Uniform Resource Identifier or URI, determines how the URL will be interpreted. The most commonly used kind of URI starts with http: and identifies a resource to be retrieved over the Hypertext Transfer Protocol (HTTP). Many browsers also support a variety of other prefixes, such as https: for HTTPS, ftp: for the File Transfer Protocol, and file: for local files. Prefixes that the web browser cannot directly handle are often handed off to another application entirely. For example, 'mailto: URIs' are usually passed to the user's default e-mail application, and 'news: URIs' are passed to the user's default newsgroup reader. In the case of http, https, file, and others, once the resource has been retrieved the web browser will display it. HTML and associated content (image files, formatting information such as CSS, etc.) are passed to the browser's layout engine to be transformed from markup to an interactive document, a process known as "rendering". Aside from HTML, web browsers can generally display any kind of content that can be part of the web-page. Most of the browsers can display images, audio, video, and XML files, and often have plug-ins to support Flash applications and Java applets. Upon encountering a file of an unsupported type or a file that is set up to be downloaded rather than displayed, the browser prompts the user to save the file to disk. Information resources may contain hyperlinks to other information resources. Each link contains the URI of a resource to go to, and when a link is clicked, the browser navigates to the resource indicated by the link's target URI, and the process of bringing content to the user begins again. The architecture of a web browser is described in the publication entitled: "*Architecture and evolution of the modern web browser*" by Alan Grosskurth and Michael W. Godfrey of the University of Waterloo in Canada, dated Jun. 20, 2006, which is incorporated in its entirety for all purposes as if fully set forth herein.

A currently popular web browser is the Internet Explorer (formerly Microsoft Internet Explorer and Windows Internet Explorer, commonly abbreviated IE or MSIE) from Microsoft Corporation, headquartered in Redmond, Washington, U.S.A., which is a series of graphical web browsers developed by Microsoft and included as part of the Microsoft Windows line of operating systems. The Internet Explorer 8 is described, for example, in Microsoft 2009 publication entitled: "*Step by Step Tutorials for Microsoft Internet Explorer* 8 *Accessibility Options*", which is incorporated in its entirety for all purposes as if fully set forth herein. Another popular web browser is the Google Chrome which is a freeware web browser developed by Google, headquartered in Googleplex, Mountain View, California, U.S.A. Google Chrome aims to be secure, fast, simple, and stable, providing strong application performance and JavaScript processing speed.

A mobile browser, also called a microbrowser, minibrowser, or Wireless Internet Browser (WIB), is a web browser designed for use on a mobile device such as a mobile phone or PDA. Mobile browsers are optimized so as to display web content most effectively for small screens on portable devices. The mobile browser software must be small and efficient to accommodate the low memory capacity and low-bandwidth of wireless handheld devices. Some mobile browsers can handle more recent technologies like CSS 2.1, JavaScript, and Ajax. Websites designed for access from these browsers are referred to as wireless portals or collectively as the Mobile Web, and may automatically create "mobile" versions of each page.

The mobile browser typically connects via a cellular network, via Wireless LAN, or via other wireless networks, and are using standard HTTP over TCP/IP, and displays the web-pages written in HTML, XHTML Mobile Profile (WAP 2.0), or WML (which evolved from HDML). WML and HDML are stripped-down formats suitable for transmission across limited bandwidth, and wireless data connection called WAP. WAP 2.0 specifies XHTML Mobile Profile plus WAP CSS, subsets of the W3C's standard XHTML and CSS with minor mobile extensions. Some mobile browsers are full-featured Web browsers capable of HTML, CSS, ECMAScript, as well as mobile technologies such as WML, i-mode HTML, or cHTML. To accommodate small screens, some mobile browsers use Post-WIMP interfaces. An example of a mobile browser is Safari, which is a mobile web browser developed by Apple Inc. (headquartered in Apple Campus, Cupertino, California, U.S.A), included with the OS X and iOS operating systems, and described in Apple publication entitled: "*Safari Web Content Guide*", dated March 2014, which is incorporated in its entirety for all purposes as if fully set forth herein.

Markup Language. A markup language is a set of tags and/or a set of rules for creating tags that can be embedded in a digital text to provide additional information about the text in order to facilitate automated processing of it, including editing and formatting for display or printing. The markup language is typically used for annotating a document in a way that is syntactically distinguishable from the text. Instructions are expressed directly by tags or "instruction text encapsulated by tags". Examples include typesetting instructions such as those found in troff, TeX, and LaTeX, or structural markers such as XML tags. A Markup code instructs the software displaying the text to carry out appropriate actions, but the actions are usually omitted from the version of the text visible to the users. Some markup languages, such as the widely used HTML, have pre-defined presentation semantics. It means that their specification prescribes how to present the structured data. Others, such as XML, do not. HyperText Markup Language (HTML), one of the document formats of the World Wide Web, is an instance of SGML, and follows many of the markup conventions used in the publishing industry in the communication of printed work between authors, editors, and printers.

Descriptive markup is commonly used to label parts of the document rather than to provide specific instructions as to how they should be processed. The objective is to decouple the inherent structure of the document from any particular treatment or rendition of it, and such markup is often described as 'semantic'. An example of descriptive markup would be HTML <cite> tag, which is used to label a citation. Descriptive markup, sometimes called logical markup or conceptual markup, enables authors to write in a way that describes the material conceptually, rather than visually.

A common feature of many markup languages is that they intermix the text of a document with markup instructions in the same data stream or file. This is not necessary; it is possible to isolate markup from text content, using pointers, offsets, IDs, or other methods to co-ordinate the two. Such "standoff markup" is typical for the internal representations that programs use to work with marked-up documents. Examples of markup languages commonly used in Internet browsing include Hypertext Markup Language (HTML), Extensible Hypertext Markup Language (XHTML), Scalable Vector Graphics (SVG), Cascading Style Sheets (CSS), and Extensible Markup Language (XML).

HTML. HyperText Markup Language, commonly referred to as HTML, is the standard markup language used to create web-pages. It is written in the form of HTML elements consisting of tags enclosed in angle brackets (like <html>). HTML tags most commonly come in pairs like <h1> and </h1>, although some represent empty elements, and so are unpaired, for example <img>. The first tag in such a pair is the start tag, and the second is the end tag (they are also called opening tags and closing tags). Web browsers can read HTML files and render them into visible or audible web-pages; using HTML elements to form the building blocks of all websites. Browsers do not display the HTML tags and scripts but use them to interpret the content of the page. HTML describes the structure of a website semantically along with cues for presentation, making it a markup language, rather than a programming language. HTML allows images and objects to be embedded and can be used to create interactive forms. It provides a means to create structured documents by denoting structural semantics for text such as headings, paragraphs, lists, links, quotes, and other items. It can embed scripts written in languages such as JavaScript, which affects the behavior of HTML web-pages. HTML markup consists of several key components, including tags (and their attributes), character-based data types, character references, and entity references. Another important component is the Document Type Declaration (DTD), which triggers standards mode rendering.

In the case of HTML type program file, the objects may be HTML elements. The HTML element is an individual component of an HTML document or web-page, once parsed into the Document Object Model (DOM). HTML is composed of a tree of the HTML elements and other nodes, such as text nodes. Each element can have HTML attributes specified. Elements can also have content, including other elements and text. HTML elements represent semantics or meaning, for example, the title element represents the title of the document. HTML documents are delivered as "documents" that are parsed and turned into the Document Object Model (DOM) internal representation, within the web browser. Presentation by the web browser, such as screen rendering or access by JavaScript, is then performed on this internal model, not the original document.

There are multiple kinds of HTML elements: void elements, raw text elements, and normal elements. Void elements only have start tags and may contain any HTML attributes. They may not contain any children, such as text or other elements. Often, they are placeholders for elements that reference external files, such as the image (<img/>) element. Raw text elements are constructed with: a start tag (<tag>) marking the beginning of an element, which may incorporate any number of HTML attributes, some amount of text content, but no elements (all tags, apart from the applicable end tag, will be interpreted as content), and an end tag in which the element name is prefixed with a slash: </tag>. In some versions of HTML, the end tag is optional for some elements. Normal elements usually have both a start tag and an end tag, but for some elements, the end tag, or both tags may be omitted. It is constructed in a similar way: a start tag (<tag>) marking the beginning of an element, which may incorporate any number of HTML attributes, content such as text and other elements, and an end tag, in which the element name is prefixed with a slash: </tag>. HTML attributes define desired behavior or indicate additional element properties. Most attributes require a value. In HTML, the value can be left unquoted if it does not include spaces (name=value), or it can be quoted with single or double quotes (name='value' or name="value"). HTML is described in a book published by John Wiley & Sons, Inc. 2011 (ISBN-978-1-118-00818-8) authored by Jon Duckett entitled: "*HTML & CSS—Design and Build Websites*", HTML 2.0 is described in IETF RFC 1866 entitled: "*Hypertext Markup Language*—2.0", HTML 4.01 (standardized as ISO/IEC 15445:200) is described in the World Wide Web Consortium (W3C) Proposed Recommendation (24 Aug. 1999) entitled: "*HTML* 4.01 *Specification*", HTML 5 is described in the W3C Editor's Draft (9 Aug. 2010) entitled: "*HTML5 Reference—The Syntax, Vocabulary, and APIs of HTML5*", and HTML 5.1 is described in W3C Editor's Draft (23 Mar. 2016) entitled: "*HTML* 5.1 *Nightly*", which are all incorporated in their entirety for all purposes as if fully set forth herein.

HTML5. HTML5 is a markup language used for structuring and presenting content on the World Wide Web (WWW). HTML5 includes detailed processing models to encourage more interoperable implementations; it extends, improves, and rationalizes the markup available for documents and introduces markup and Application Programming Interfaces (APIs) for complex web applications. For the same reasons, HTML5 is also a candidate for cross-platform mobile applications because it includes features designed with low-powered devices in mind. Many new syntactic features are included. To natively include and handle multimedia and graphical content, the new <video>, <audio> and <canvas> elements were added, and expandable sections are natively implemented through <summary> . . . </summary> and <details></details> rather than depending on CSS or JavaScript, and support for scalable vector graphics (SVG) content and MathML for mathematical formulas was also added. To enrich the semantic content of documents, new page structure elements such as <main>, <section>, <article>, <header>, <footer>, <aside>, <nav>, and <figure> are added. New attributes were introduced, some elements and attributes were removed, and others such as <a>, <cite>, and <menu> were changed, redefined, or standardized. The APIs and Document Object Model (DOM) are now fundamental parts of the HTML5 specification, and HTML5 also better defines the processing for any invalid documents.

Markup. HTML5 introduces elements and attributes that reflect typical usage on modern websites. Some of them are semantic replacements for common uses of a generic block (<div>) and inline (<span>) elements, for example <nav> (website navigation block), <footer> (usually referring to the bottom of a web page or to last lines of HTML code), or <audio> and <video> instead of <object>. Some deprecated elements from HTML 4.01 have been dropped, including purely presentational elements such as <font> and <center>, whose effects have long been superseded by the more capable Cascading Style Sheets. There is also a renewed emphasis on the importance of client-side JavaScript used to create dynamic web pages. The HTML5 syntax is no longer based on SGML despite the similarity of its markup. It has, however, been designed to be backward-compatible with common parsing of older versions of HTML. It comes with a new introductory line that looks like an SGML document type declaration, <!DOCTYPE html>, which triggers the standards-compliant rendering mode. Since 5 Jan. 2009, HTML5 also includes Web Forms 2.0, a previously separate WHATWG specification. A specification of HTML5, last updated on 20 May 2022, is available from https://www.w3.org/TR/html5/.

Canvas element. A canvas element is part of HTML5 and allows for dynamic, scriptable rendering of 2D shapes and bitmap images. It is a low level, procedural model that updates a bitmap. HTML5 Canvas also helps in making 2D games. While the HTML5 canvas offers its own 2D drawing API, it also supports the WebGL API to allow 3D rendering with OpenGL ES. A canvas consists of a drawable region defined in HTML code with height and width attributes. JavaScript code may access the area through a full set of drawing functions similar to those of other common 2D APIs, thus allowing for dynamically generated graphics. Some anticipated uses of canvas include building graphs, animations, games, and image composition. Interacting with the canvas involves obtaining the canvas' rendering context, which determines whether to use a canvas API, WebGL, or WebGL2 rendering context.

CSS. Cascading Style Sheets (CSS) is a style sheet language used for describing the look and formatting of a document written in a markup language. While most often used to change the style of web-pages and user interfaces written in HTML and XHTML, the language can be applied to any kind of XML document, including plain XML, SVG and XUL. Along with HTML and JavaScript, CSS is a technology used by many websites to create visually engaging web-pages, user interfaces for web applications, and user interfaces for many mobile applications. CSS makes it possible to separate presentation instructions from the HTML content in a separate file, or style section of the HTML file. For each matching HTML element, it provides a list of formatting instructions. For example, a CSS rule might specify that "all heading 1 elements should be bold," leaving pure semantic HTML markup that asserts "this text is a level 1 heading" without formatting code such as a <bold> tag indicating how such text should be displayed.

CSS is designed primarily to enable the separation of document content from document presentation, including elements such as the layout, colors, and fonts. This separation of formatting and content makes it possible to present the same markup page in different styles for different rendering methods, such as on-screen, in print, by voice (when read out by a speech-based browser or screen reader), and on Braille-based tactile devices. It can also be used to display the web-page differently depending on the screen size or device on which it is being viewed. While an author of a web-page typically links to a CSS file within the markup file, readers can specify a different style sheet, such as a CSS file stored on their own computer, to override the one the author has specified. If the author or the reader did not link the document to a style sheet, the default style of the browser will be applied. Another advantage of CSS is that aesthetic changes to the graphic design of a document (or hundreds of documents) can be applied quickly and easily by editing a few lines in one file, rather than by a laborious (and thus expensive) process of crawling over every document line-by-line, changing markup.

The CSS specification describes a priority scheme to determine which style rules apply if more than one rule matches against a particular element. In this so-called cascade, priorities or weights are calculated and assigned to rules, so that the results are predictable. The CSS specifications are maintained by the World Wide Web Consortium (W3C), and Internet media type (MIME type) text/css is registered for use with CSS by RFC 2318 (March 1998). CSS is further described in a book published by John Wiley & Sons, Inc. 2011 (ISBN-978-1-118-00818-8) authored by Jon Duckett entitled: "HTML & CSS Design and Build Websites", CSS 2.1 is described in W3C recommendation (7 Jun. 2011) entitled: "Cascading Style Sheets Level 2 Revision 1 (CSS 2.1) Specification", IETF RFC 2318 entitled: "The text/css Media Type", which are all incorporated in their entirety for all purposes as if fully set forth herein.

SGML. The Standard Generalized Markup Language (SGML) is a standard for defining generalized markup languages for documents. Generalized markup is based on two postulates: Markup should be declarative, and it should describe a document's structure and other attributes, rather than specify the processing to be performed on it. Declarative markup is less likely to conflict with unforeseen future processing needs and techniques. Markup should be rigorous so that the techniques available for processing precisely defined objects, like programs and databases, may be used for processing documents as well. The SGML is standardized as International Standard ISO 8879-1986 entitled: "*Information Processing—Text and Office Systems—Standard Generalized Markup Language (SGML)—First Edition*" where ISO 8879 Annex A.1 defines generalized markup, and is further described in ISO/IEC TR 9573, entitled: "*Information processing SGML support facilities Techniques for using SGML*". SGML is further described in a paper by Michel Goossens and Janne Saarela of CERN, CN Division of Geneva, Switzerland, entitled: "*A practical introduction to SGML*", in a paper by Diego Calvanese, Giuseppe De Giancomo, and Maurizio Lenzerini of Universita di Roma, Italy, entitled: "*Representing and Reasoning on SGML Documents*", in a paper by David Barron published 1989 by John Wiley & Sons, Ltd. (0894-3982/89/010003-22)—published Electronic Publishing, Vol. 2(1), 3-24 (April 1989), entitled: "*Why use SGML?*", and in a paper by Jos Warmer and Sylvia Van Egmond published 1989 by John Wiley & Sons, Ltd. (0894-3982/89/020065-26)—published Electronic Publishing, Vol. 2(2), 65-90 (December 1989), entitled: "*The implementation of the Amsterdam SGML Parser*", which are all incorporated in their entirety for all purposes as if fully set forth herein.

XML. Extensible Markup Language (XML) is a markup language that defines a set of rules for encoding documents in a format which is both human-readable and machine-readable. The design goals of XML emphasize simplicity, generality, and usability across the Internet. It is a textual data format with strong support via Unicode for different human languages. While the design of XML focuses on documents, it is commonly used for the representation of arbitrary data structures such as those used in web services. XML is described in W3C Recommendation 10 Feb. 1998 (REC-xml-19980210) entitled: "*Extensible Markup Language* (*XML*) 1.0", rules for the construction of Internet Media Types for use when sending XML are described in IETF RFC 7303 entitled: "*XML Media Types*", and various aspects of designing and deploying an XML-based language are detailed in IETF RFC 3470 entitled: "*Guidelines for the Use of Extensible Markup Language* (*XML*) *within IETF Protocols*", which are all incorporated in their entirety for all purposes as if fully set forth herein.

XHTML. Extensible Hypertext Markup Language (XHTML) is a family of XML markup languages that mirror or extend versions of the widely used Hypertext Markup Language (HTML), the language in which web-pages are formulated. XHTML is an application of XML that is a more restrictive subset of SGML, where the documents are well formed and may, therefore, be parsed using standard XML parsers.

XMLHttpRequest (XHR) is an API available to web browser scripting languages such as JavaScript, and is used to send HTTP or HTTPS requests to a web server and load the server response data back into the script. Data from the response can be used to alter the current document in the browser window without loading a new web-page, and despite the name of the API, this data can be in the form of not only XML, but also JSON, HTML, or plain text.

The Ajax web development technique used by many websites to implement responsive and dynamic web applications depends on XMLHttpRequest. For security reasons, XMLHttpRequest requests follow the browser same-origin policy, and will therefore only succeed if they are made to the host that served the original web page. The XMLHttpRequest is described in Chapter 3 named: "XMLHttpRequest Object" in a book by Thomas Powell published 2008 (ISBN: 978-0-07-149216) entitled: "*Ajax: The Complete Reference*", and in W3C Working Draft (17 Jan. 2012) entitled: "XMLHttpRequest Level 2", which are both incorporated in their entirety for all purposes as if fully set forth herein. Examples of using XMLHttpRequest are described in U.S. Pat. No. 8,473,593 to Graham et al. entitled: "Method for Dynamically Generating Information Objects Based on a Restful Subscription request", in U.S. Patent Application No. 2009/0222554 to Schneider entitled: "Statistics for Online Advertising", and in U.S. Patent Application No. 2014/0244830 to Smacinih entitled: "Web Application Monitoring", which are all incorporated in their entirety for all purposes as if fully set forth herein.

Headless browser. Headless browser refers to a web browser without a graphical user interface, that includes software that accesses web pages without showing them to any human being, but rather used to provide the content of web pages to other programs. The ability to manipulate the browser directly, by writing and running code, allows for much faster automated testing of websites and web applications. Typically, headless browsers provide automated control of a web-page in an environment similar to popular web browsers, but they are executed via a command-line interface or using network communication. They are particularly useful for testing web pages as they are able to render and understand HTML the same way a browser would, including styling elements such as page layout, colour, font selection, and execution of JavaScript and Ajax, which are usually not available when using other testing methods. In a headless testing environment, the code scripts can be written and executed for the following tasks: Testing basic and alternative flows; Simulating clicks on links and buttons; Automating form filling and submission; Testing SSL performance; Experimenting with various server loads; Generating reports on page response times; Scraping useful website code; and Taking screenshots of results. Some of the popular Headless Browsers for web testing includes Firefox headless mode, Headless Chrome, PhantomJS, Zombie.js, HtmlUnit, and Splash.

Systems and methods for media streaming using a headless browser are disclosed in U.S. Pat. No. 10,554,706 to Charles F. Good, entitled "Media streaming using a headless browser", which is incorporated in its entirety for all purposes as if fully set forth herein. To enhance playback, prior to transmission of the encoded media stream, a hardware encoder utilizes a headless browser to add additional content (e.g., social media interactions, a title, a webpage, a background, etc.) to the encoded media stream. Since the headless browser is executed independent from the encoding operations of the hardware encoder, latency is improved in scenarios where the headless browser experiences suboptimal performance (e.g., stalls, crashes, etc.). Method and system for enabling read and write access to secured data by a mobile device that executes a "native" mobile application and a headless browser are disclosed in U.S. Patent Publication No. 2018/0262910 to Charles Eric Smith, et al., entitled "Secured data access from a mobile device executing a native mobile application and a headless browser", which is incorporated in its entirety for all purposes as if fully set forth herein.

A technique for hardening the entry of user credentials in web sites is disclosed in U.S. Pat. No. 9,979,717 to Greg Whiteside, et al., entitled "Algorithm hardening in background context and external from the browser to prevent malicious intervention with the browser", which is incorporated in its entirety for all purposes as if fully set forth herein. A headless web browser is provided for authenticating the user to a target web site with credentials previously stored in a secure database, and generating a session cookie. The headless browser provides the session cookie to the user's web browser, allowing the user to continue the session established by the headless browser.

A system for flexible and scalable automated end-to-end chat-based contact center testing, having a test case management platform, a chat cruncher, a contact center manager, a chat classifier, a desktop automation engine, and headless browser-based virtual agents and customers. Is disclosed in European Patent EP 3226515 to Alok Kulkarni et al. entitled "System and method for automated end-to-end web interaction testing", which is incorporated in its entirety for all purposes as if fully set forth herein. The test case management platform allows a user to configure the operation of the system. The chat cruncher operates a plurality of virtual customers. The contact center manager operates a plurality of virtual agents to participate in chat session with virtual customers.

A web application architecture 960 that includes a software stack is shown in FIG. 3*c*. In this architecture 960, a set of applications 961 operates through one or more APIs 962 with a wrapper application 963 which runs on a web browser 965 through one or more APIs 964. In one example, the web browser 965 in turn runs through one or more APIs 966 on a preemptive multitasking operating system 967. Alternatively, the multitasking operating system 967 may be replaced by other known operating systems which are not preemptive or not multitasking. All the software shown in the software stack 960 operate on any data processing system (such as a client device), and in particular on the hardware of the data processing system 968.

The set of applications 961 may be web applications or web services applications, such as web email applications, web calendar applications, web contact or address book applications, web document applications (e.g., access to iWork documents), map applications such as applications for navigation or applications for finding a device, such as finding a smart phone, and other applications which can be implemented as a web application through a web browser which is in communication with one or more web servers to exchange data between the web application and the one or more web servers. The user data, such as emails, calendar data, contact data, etc. can be stored on one or more web servers and can be accessed and used through a web browser on a client device. These applications in the set of applications can operate on one or client devices that may comprise the data processing system hardware 968, and may be a desktop computer, a laptop computer, a tablet system, a smartphone, or a gaming device such as a game console or other consumer electronic devices.

The one or more APIs 962 may provide a variety of calls for functions or operations between the set of applications 961 and the wrapper application 963. The term 'transfer' or 'transferring' herein in connection with a call or API includes one of issuing or initiating or invoking or receiving a call or software message through the API. In one example, each of the applications in the set of applications can be written in part or entirely in JavaScript, and in another example, each of the applications can execute, in one embodiment, inside an iframe which runs in the wrapper application 963 which itself can be written at least in part in JavaScript and which runs on the web browser 965.

The wrapper application 963 may provide a virtual machine environment for the set of applications 961 and may run on the web browser 965 and can transfer calls between the wrapper application on and the web browser through the API 964. In one example, the wrapper application 963 owns the URL text entry field in the web browser and uses calls to the web browser to control the URL field and uses calls to the web browser to control the title bar; for example, the wrapper application may, through calls between the wrapper application and the web browser, change the name in the title bar to reflect the currently front most application. The wrapper application 963 may provide for life cycle management for each application in the set of applications, such as launching and quitting each of the applications. Furthermore, the wrapper application 963 can provide other features and functions and operations, including switching between applications, and handling errors of an application (e.g., tearing down a misbehaving or crashed application and offering to relaunch the application for a user). Further, in one embodiment the wrapper application can force a shutdown of an inactive or crashed or badly behaving application. Further, the wrapper application 963 can also provide a single log in and single log out point for the user and for all the applications in the set of applications. Further, the wrapper application 963 may not include certain features of a traditional operating system, such as a kernel, and memory handling, and scheduling of the operations of processes and threads, although in another example, the wrapper application 963 may include these functions or features or a portion of these functions or features of a traditional operating system.

In one example, the wrapper application 963 may further provide for push notification to one or more of the web applications in the set of applications 961, and may further allow a push notification to be presented for an application which is not front most through a user interface on the application that is front most in the set of applications 961. In one example, the wrapper application 963 and the set of applications 961 operate in a memory space which is defined by the memory space of the web browser 965 and operate within a thread or process which is defined by the web browser's window in which the wrapper application 963 and the set of applications 961 are running.

The web browser 965 may be a software application program that processes a web-page encoded in a markup language, such as HTML; the web page is retrieved by the web browser through one or more URLs (Uniform Resource Locator). The web browser 965 may be configured to process, using a layout engine in the web browser 965, the markup language of the web page into a DOM (Document Object Model) of the web page, and further the web browser 965 may be configured to process a cascading style sheet associated with the web page to present the web page. Furthermore, the web browser 965 may use one or more APIs 966 to interact with the operating system 967, and these APIs can support calls to the operating system for windowing and networking functions, such as TCP/IP, etc. as is known in the art.

API. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API may define one or more parameters that are passed between the API-calling component and the API-implementing component. An API allows a developer of an API-calling component (which may be a third-party developer) to leverage specified features provided by an API-implementing component. There may be one API-calling component or there may be more than one such component. An API may be a source code interface that a computer system or program library provides in order to support requests for services from an application. An Operating System (OS) may have multiple APIs to allow applications running on the OS to call one or more of those APIs, and a service (such as a program library) may have multiple APIs to allow an application that uses the service to call one or more of those APIs. An API can be specified in terms of a programming language that may be interpreted or compiled when an application is built.

In some examples the API-implementing component may provide more than one API, each providing a different view of or with different aspects that access different aspects of the functionality implemented by the API-implementing component. For example, one API of an API-implementing component may provide a first set of functions and may be exposed to third party developers, and another API of the API-implementing component can be hidden (not exposed) and provide a subset of the first set of functions and in addition provide another set of functions, such as testing or debugging functions which are not in the first set of functions. In other examples the API-implementing component may itself call one or more other components via an underlying API and thus be both an API-calling component and the API-implementing component.

The API typically defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call docs), the API may not reveal how the API call accomplishes the function specified by the API call. Various API calls are transferred via the one or more application programming interfaces between the calling (API-calling component) and the API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API. Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the AI-implementing component or to initiate the performance of an operation or computation provided by the API-implementing component. By way of example, the API-implementing component and the API-calling component may each be any one of an operating system, a library, a device driver, an API, an application program, or other module (the API-implementing component and the API-calling component may be the same, or different type of module from each other). API-implementing components may in some cases be embodied at least in part in firmware, microcode, or other hardware logic. In some examples, the API may allow a client program to use the services provided by a Software Development Kit (SDK) library. In other examples an application or other client program may use the API provided by an Application Framework. In these embodiments the application or client program may incorporate calls to functions or methods provided by the SDK and provided by the API or use data types or objects defined in the SDK and provided by the API. An Application Framework may in these examples may provide a main event loop for a program that responds to various events defined by the Framework. The API allows the application to specify the events and the responses to the events using the Application Framework. In some examples, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) a component (i.e., on a different data processing system from API-implementing component) that communicates with the API-implementing component through the API over a network. It should be understood that the API-implementing component may also act as an API-calling component (i.e., it may make API calls to an API exposed by a different API-implementing component) and the API-calling component may also act as an API-implementing component by implementing an API that is exposed to a different API-calling component. The API may allow multiple API-calling components written in different programming languages to communicate with the API-implementing component (thus the API may include features for translating calls and returns between the API-implementing component and the API-calling component), however, the API may be implemented in terms of a specific programming language. An API-calling component may call APIs from different providers such as a set of APIs from an OS provider and another set of APIs from a plug-in provider and another set of APIs from another provider (e.g., the provider of a software library) or creator of the another set of APIs.

A block diagram illustrating an exemplary API architecture 970 is shown in FIG. 3f and includes an API-implementing component 973 (e.g., an operating system, a library, a device driver, an API, an application program, software, or other modules) that implements an API 972. The API 972 specifies one or more functions, methods, classes, objects, protocols, data structures, formats and/or other features of the API-implementing component that may be used by an API-calling component 971. The API 972 can specify at least one calling convention that specifies how a function in the API-implementing component receives parameters from the API-calling component and how the function returns a result to the API-calling component. The API-calling component 971 (e.g., an operating system, a library, a device driver, an API, an application program, software, or other modules), makes API calls through the API 972 to access and use the features of the API-implementing component 973 that are specified by the API 972. The API-implementing component 973 may return a value through the API 972 to the API-calling component 971 in response to an API call.

It will be appreciated that the API-implementing component 973 may include additional functions, methods, classes, data structures, and/or other features that are not specified through the API 972 and are not available to the API-calling component 971. It should be understood that the API-calling component 971 may be on the same system as the API-implementing component 973 or may be located remotely and accesses the API-implementing component 973 using the API 972 over a network. While a single API-calling component 971 interacting with the API 972 is shown in FIG. 3f, other API-calling components may equally be used, which may be written in different languages (or the same language) than the API-calling component 971, may use the API 972.

The API-implementing component 973, the API 972, and the API-calling component 971 may be stored in a machine-readable non-transitory storage medium, which includes any mechanism for storing information in a form readable by a machine (e.g., a computer or other data processing system). For example, a machine-readable medium includes magnetic disks, optical disks, random access memory; read only memory, flash memory devices, etc. and can be a local storage medium or a storage medium on a remote device that is coupled to a client device by one or more networks.

Hardware. Hardware generally refers to computer-related hardware, that comprises the physical parts of a computer and related or connected devices, that are typically interconnected electronic components, which perform analog or logic operations on received and locally stored information to produce as output, or store resulting new information or to provide control for output actuator mechanisms. Internal hardware devices may include motherboards, hard drives, and RAM, and external hardware devices include monitors, keyboards, mice, printers, and scanners.

Electronic hardware can range from individual chips/circuits to distributed information processing systems. All the physical parts of a computer, such as the case, Central Processing Unit (CPU), Random Access Memory (RAM), monitor, mouse, keyboard, computer data storage, graphics card, sound card, speakers and motherboard, are considered as hardware. Accordingly, as used herein, the term "hardware" should be understood to encompass any tangible entity, be that an entity that is physically constructed, permanently configured (e.g., hardwired), or temporarily configured (e.g., programmed) to operate in a certain manner or to perform certain operations described herein. Further, hardware refers to single, multiple, or collection of tangible entities, as well as the arrangement of such interconnected tangible entities, such as any arrangement for delivering or sharing power or data.

The term "peripheral device" (or "peripheral") is used herein to include, but not limited to, any auxiliary standalone device that is external to, connectable to, works with, used to interact with, or sends data to, a host computer in some way, and a peripheral device may be an input or an output device. Input devices includes a pointing device (e.g., computer mouse), a keyboard, a graphic tablet, a touchscreen, a barcode reader, an image scanner, a microphone, or a digital camera (e.g., webcam). An output device, which provides output from the host computer to a user or to another device, may be a display device, an image projector, a graphical output device, a loudspeaker, or a printer. The peripheral may be used to connect the host computer to an external network, such as a modem or a Network Interface Card (NIC). Further, the peripheral may be in part, or in full, integrated with the host computer. While exampled above regarding a general computer system, any device embedding firmware or software may equally be used, and in particular, any communication related devices such as a router or a firewall.

AC/DC Power Supply. A power supply is an electronic device that supplies electric energy to an electrical load, where the primary function of a power supply is to convert one form of electrical energy to another and, as a result, power supplies are sometimes referred to as electric power converters. Some power supplies are discrete, stand-alone devices, whereas others are built into larger devices along with their loads. Examples of the latter include power supplies found in desktop computers and consumer electronics devices. Every power supply must obtain the energy it supplies to its load, as well as any energy it consumes while performing that task, from an energy source. Depending on its design, a power supply may obtain energy from various types of energy sources, including electrical energy transmission systems, energy storage devices such as a batteries and fuel cells, electromechanical systems such as generators and alternators, solar power converters, or another power supply. All power supplies have a power input, which receives energy from the energy source, and a power output that delivers energy to the load. In most power supplies, the power input and the power output consist of electrical connectors or hardwired circuit connections, though some power supplies employ wireless energy transfer in lieu of galvanic connections for the power input or output.

Some power supplies have other types of inputs and outputs as well, for functions such as external monitoring and control. Power supplies are categorized in various ways, including by functional features. For example, a regulated power supply is one that maintains constant output voltage or current despite variations in load current or input voltage. Conversely, the output of an unregulated power supply can change significantly when its input voltage or load current changes. Adjustable power supplies allow the output voltage or current to be programmed by mechanical controls (e.g., knobs on the power supply front panel), or by means of a control input, or both. An adjustable regulated power supply is one that is both adjustable and regulated. An isolated power supply has a power output that is electrically independent of its power input; this is in contrast to other power supplies that share a common connection between power input and output.

AC-to-DC (AC/DC) power supply uses AC mains electricity as an energy source, and typically employs a transformer to convert the input voltage to a higher, or commonly lower AC voltage. A rectifier is used to convert the transformer output voltage to a varying DC voltage, which in turn is passed through an electronic filter to convert it to an unregulated DC voltage. The filter removes most, but not all of the AC voltage variations; the remaining voltage variations are known as a ripple. The electric load tolerance of ripple dictates the minimum amount of filtering that must be provided by a power supply. In some applications, high ripple is tolerated and therefore no filtering is required. For example, in some battery charging applications, it is possible to implement a mains-powered DC power supply with nothing more than a transformer and a single rectifier diode, with a resistor in series with the output to limit the charging current.

The function of a linear voltage regulator is to convert a varying AC or DC voltage to a constant, often specific, lower DC voltage. In addition, they often provide a current limiting function to protect the power supply and load from overcurrent (excessive, potentially destructive current). A constant output voltage is required in many power supply applications, but the voltage provided by many energy sources will vary with changes in load impedance. Furthermore, when an unregulated DC power supply is the energy source, its output voltage will also vary with changing input voltage. To circumvent this, some power supplies use a linear voltage regulator to maintain the output voltage at a steady value, independent of fluctuations in input voltage and load impedance. Linear regulators can also reduce the magnitude of ripple and noise present appearing on the output voltage.

In a Switched-Mode Power Supply (SMPS), the AC mains input is directly rectified and then filtered to obtain a DC voltage, which is then switched "on" and "off" at a high frequency by electronic switching circuitry, thus producing an AC current that will pass through a high-frequency transformer or inductor. Switching occurs at a very high frequency (typically 10 kHz-1 MHZ), thereby enabling the use of transformers and filter capacitors that are much smaller, lighter, and less expensive than those found in linear power supplies operating at mains frequency. After the inductor or transformer secondary, the high frequency AC is rectified and filtered to produce the DC output voltage. If the SMPS uses an adequately insulated high-frequency transformer, the output will be electrically isolated from the mains; this feature is often essential for safety. Switched-mode power supplies are usually regulated, and to keep the output voltage constant, the power supply employs a feedback controller that monitors the current drawn by the load. SMPSs often include safety features such as current limiting or a crowbar circuit to help protect the device and the user from harm. In the event that an abnormally high-current power draw is detected, the switched-mode supply can assume this is a direct short and will shut itself down before damage is done. PC power supplies often provide a power good signal to the motherboard; the absence of this signal prevents operation when abnormal supply voltages are present.

Power supplies are described in Agilent Technologies Application Note 90B dated Oct. 1, 2000 (5925-4020) entitled: "*DC Power Supply Handbook*" and in Application Note 1554 dated Feb. 4, 2005 (5989-2291EN) entitled: "*Understanding Linear Power Supply Operation*", and in On Semiconductor® Reference Manual Rev. 4 dated April 2014 (SMPSRM/D) entitled: "*Switch-Mode Power Supply*", which are all incorporated in their entirety for all purposes as if fully set forth herein.

PoE. Power over Ethernet (POE), describes any of several standards or ad hoc systems that pass electric power along with data on twisted-pair Ethernet cabling. This allows a single cable to provide both data connection and electric power to devices such as wireless access points (WAPs), Internet Protocol (IP) cameras, and voice over Internet Protocol (VOIP) phones. There are several common techniques for transmitting power over Ethernet cabling. Three of them have been standardized by the Institute of Electrical and Electronics Engineers (IEEE) standard IEEE 802.3 since 2003. These standards are known as alternative A, alternative B, and 4PPoE. For 10BASE-T and 100BASE-TX, only two of the four signal pairs in typical Cat. 5 cable are used. Alternative B separates the data and the power conductors, making troubleshooting easier. It also makes full use of all four twisted pairs in a typical Cat. 5 cable. The positive voltage runs along pins 4 and 5, and the negative along pins 7 and 8.

In the Alternative A, the power is transported on the same wires as data for 10 and 100 Mbit/s Ethernet variants. This is similar to the phantom power technique commonly used for powering condenser microphones. Power is transmitted on the data conductors by applying a common voltage to each pair. Because twisted-pair Ethernet uses differential signaling, this does not interfere with data transmission. The common-mode voltage is easily extracted using the center tap of the standard Ethernet pulse transformer. For Gigabit Ethernet and faster, both alternatives A and B transport power on wire pairs also used for data since all four pairs are used for data transmission at these speeds. 4PPoE provides power using all four pairs of a twisted-pair cable. This enables higher power for applications like Pan-Tilt-Zoom (PTZ) cameras, high-performance WAPs, or even charging laptop batteries.

In addition to standardizing existing practice for spare-pair (Alternative B), common-mode data pair power (Alternative A) and 4-pair transmission (4PPoE), the IEEE POE standards provide for signaling between the power sourcing equipment (PSE) and powered device (PD). This signaling allows the presence of a conformant device to be detected by the power source, and allows the device and source to negotiate the amount of power required or available.

The original IEEE 802.3af-2003 PoE standard provides up to 15.4 W of DC power (minimum 44 V DC and 350 mA) on each port, however, only 12.95 W is assured to be available at the powered device as some power dissipates in the cable. The updated IEEE 802.3at-2009 PoE standard also known as PoE+ or PoE plus, provides up to 25.5 W of power for Type 2 devices. The 2009 standard prohibits a powered device from using all four pairs for power. Both of these standards have since been incorporated into the IEEE 802.3-2012 publication. The IEEE 802.3bt-2018 standard further expands the power capabilities of 802.3at. It is also known as PoE++ or 4PPoE. The standard introduces two additional power types: up to 51 W delivered power (Type 3) and up to 71.3 W delivered power (Type 4). Each pair of twisted pairs needs to handle a current of up to 600 mA (Type 3) or 960 mA (Type 4). Additionally, support for 2.5GBASE-T, 5GBASE-T and 10GBASE-T is included.

Single-pair Ethernet. The IEEE 802.3bu-2016 amendment introduced single-pair Power over Data Lines (PoDL) for the single-pair Ethernet standards 100BASE-T1 and 1000BASE-T1 intended for automotive and industrial applications. On the two-pair or four-pair standards, the same power voltage is applied to each conductor of the pair, so that within each pair there is no differential voltage other than that representing the transmitted data. With single-pair Ethernet, power is transmitted in parallel to the data. PoDL initially defined ten power classes, ranging from 0.5 to 50 W (at PD). Subsequently, PoDL was added to the single-pair variants 10BASE-T1, 2.5GBASE-T1, 5GBASE-T1, and 10GBASE-T1 and as of 2021 includes a total of 15 power classes with additional intermediate voltage and power levels.

Power Sourcing Equipment (PSE) are devices that provide (source) power on the Ethernet cable. This device may be a network switch, commonly referred to as an 'endspan' (IEEE 802.3af refers to it as endpoint), or an intermediary device between a non-PoE-capable switch and a PoE device, an external POE injector, called a midspan device. A Powered Device (PD) is any device powered by PoE, thus consuming energy. Examples include wireless access points, VoIP phones, and IP cameras.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web-pages rather than just mobile-optimized sites, GPS navigation, Wi-Fi, and mobile broadband access. In addition to telephony, the smartphones may support a wide variety of other services such as text messaging, MMS, email, Internet access, short-range wireless communications (infrared, Bluetooth), business applications, gaming, and photography.

An example of a contemporary smartphone is a model iPhone 6 available from Apple Inc., headquartered in Cupertino, California, U.S.A., and described in iPhone 6 technical specification (retrieved October 2015 from www.apple.com/iphone-6/specs/), and in a User Guide dated 2015 (019-

00155/2015-06) by Apple Inc. entitled: "*iPhone User Guide For iOS* 8.4 *Software*", which are both incorporated in their entirety for all purposes as if fully set forth herein. Another example of a smartphone is Samsung Galaxy S6 available from Samsung Electronics headquartered in Suwon, South-Korea, described in the user manual numbered English (EU), March 2015 (Rev. 1.0) entitled: "*SM-G925F SM-G925FQ SM-G9251 User Manual*" and having features and specification described in "*Galaxy S6 Edge—Technical Specification*" (retrieved October 2015 from www.samsung.com/us/explore/galaxy-s-6-features-and-specs), which are both incorporated in their entirety for all purposes as if fully set forth herein.

A mobile operating system (also referred to as mobile OS), is an operating system that operates a smartphone, tablet, PDA, or other mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently, the popular mobile operating systems are Android, Symbian, Apple IOS, BlackBerry, MecGo, Windows Phone, and Bada. Mobile devices with mobile communications capabilities (e.g., smartphones) typically contain two mobile operating systems—the main user-facing software platform is supplemented by a second low-level proprietary real-time operating system which operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes, and proximity sensors are used by some applications to respond to additional user actions, for example, adjusting the screen from portrait to landscape depending on how the device is oriented, or allowing the user to steer a vehicle in a racing game by rotating the device, simulating control of a steering wheel.

Android devices typically boot to the home-screen, the primary navigation and information point on the device, which is similar to the desktop found on PCs. The Android home-screens are typically made up of app icons and widgets; app icons launch the associated app, whereas widgets display live, auto-updating content such as the weather forecast, the user's email inbox, or a news ticker directly on the homescreen. The homescreen may be made up of several pages that the user can swipe back and forth between, though Android's home-screen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS is described in the publication entitled: "IOS Tutorial", downloaded from tutorialspoint.com on July 2014, which is incorporated in its entirety for all purposes as if fully set forth herein.

Geolocation. IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Time-zone. Deeper data sets can determine other parameters such as domain name, connection speed, ISP, Language, proxies, company name, US DMA/MSA, NAICS codes, and home/business classification. The geolocation is further described in the publication entitled: "*Towards Street-Level Client-Independent IP Geolocation*" by Yong Wang et al., downloaded from the Internet on July 2014, and in an Information Systems Audit and Control Association (ISACA) 2011 white paper entitled: "*Geolocation: Risk, Issues and Strategies*", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating web-site http://ipinfodb.com, and by Max Mind, Inc., based in Waltham, Massachusetts, U.S.A, operating the web-site www.maxmind.com/en/home.

Further, the W3C Geolocation API is an effort by the World Wide Web Consortium (W3C) to standardize an interface to retrieve the geographical location information for a client-side device. It defines a set of objects, ECMA Script standard compliant, executing in the client application, give the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024. Geolocation-based addressing is described in U.S. Pat. No. 7,929,535 to Chen et al., entitled: "Geolocation-based Addressing Method for IPV6 Addresses", and in U.S. Pat. No. 6,236,652 to Preston et al., entitled: "Geo-spacial Internet Protocol Addressing", and in U.S. Patent Application Publication No. 2005/0018645 to Mustonen et al., entitled: "Utilization of Geographic Location Information in IP Addressing", which are all incorporated in their entirety for all purposes as if fully set forth herein.

Virtualization. The term virtualization typically refers to the technology that allows for the creation of software-based virtual machines that can run multiple operating systems from a single physical machine. In one example, virtual machines can be used to consolidate the workloads of several under-utilized servers to fewer machines, perhaps a single machine (server consolidation), providing benefits (perceived or real, but often cited by vendors) such as savings on hardware, environmental costs, management, and administration of the server infrastructure. Virtualization scheme allows for the creation of substitutes for real resources, that is, substitutes that have the same functions and external interfaces as their counterparts, but that differ in attributes, such as size, performance, and cost. These substitutes are called virtual resources, and their users are typically unaware of the substitution.

Virtualization is commonly applied to physical hardware resources by combining multiple physical resources into shared pools from which users receive virtual resources. With virtualization, you can make one physical resource look like multiple virtual resources. Virtual resources can have functions or features that are not available in their underlying physical resources. Virtualization can provide the benefits of consolidation to reduce hardware cost, such as to efficiently accessing and manage resources to reduce operations and systems management costs while maintaining needed capacity, and having a single server function as multiple virtual servers. In addition, virtualization can provide optimization of workloads, such as responding dynamically to the application needs of its users, and increasing the use of existing resources by enabling dynamic sharing of resource pools. Further, virtualization may be used for IT flexibility and responsiveness, such as by having a single, consolidated view of, and easy access to, all available resources in the network, regardless of location, and reducing the management of your environment by providing emulation for compatibility and improved interoperability.

Virtual machine (VM). Virtual machine is a representation of a real machine using software that provides an operating environment which can run or host a guest operating system. In one example, the virtual machine may include a self-contained software emulation of a machine, which does not physically exist, but shares resources of an underlying physical machine. Like a physical computer, a virtual machine runs an operating system and applications. Multiple virtual machines can operate concurrently on a single host system. There are different kinds of virtual machines, each with different functions: System virtual machines (also termed full virtualization VMs) provide a substitute for a real machine, and provide the functionality needed to execute entire operating systems. A hypervisor uses native execution to share and manage hardware, allowing for multiple environments which are isolated from one another, yet exist on the same physical machine. Modern hypervisors use hardware-assisted virtualization, virtualization-specific hardware, primarily from the host CPUs. Process virtual machines are designed to execute computer programs in a platform-independent environment. Some virtual machines, such as QEMU, are designed to also emulate different architectures and allow the execution of software applications and operating systems written for another CPU or architecture. Operating-system-level virtualization allows the resources of a computer to be partitioned via the kernel's support for multiple isolated user space instances, which are usually called containers and may look and feel like real machines to the end users.

Guest Operating System. A guest operating system is an operating system running in a virtual machine environment that would otherwise run directly on a separate physical system. Operating-system-level virtualization, also known as containerization, refers to an operating system feature in which the kernel allows the existence of multiple isolated user-space instances. Such instances, called containers, partitions, Virtualization Engines (VEs) or jails (FreeBSD jail or chroot jail), may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container. In addition to isolation mechanisms, the kernel often provides resource-management features to limit the impact of one container's activities on other containers. With operating-system-virtualization, or containerization, it is possible to run programs within containers, to which only parts of these resources are allocated. A program expecting to see the whole computer, once run inside a container, can only see the allocated resources and believes them to be all that is available. Several containers can be created on each operating system, to each of which a subset of the computer's resources is allocated. Each container may contain any number of computer programs. These programs may run concurrently or separately, even interact with each other.

Hypervisor. Hypervisor commonly refers to a thin layer of software that generally provides virtual partitioning capabilities and runs directly on the hardware, but underneath higher-level virtualization services. The hypervisor typically manages virtual machines, allowing them to interact directly with the underlying hardware. System virtualization creates many virtual systems within a single physical system. The virtual systems are independent operating environments that use virtual resources. The system virtualization can be approached through hardware partitioning or hypervisor technology. The hardware partitioning subdivides a physical server into fractions, each of which can run an operating system. These fractions are typically created with coarse units of allocation, such as whole processors or physical boards. This type of virtualization allows for hardware consolidation, but does not have the full benefits of resource sharing and emulation offered by hypervisors. Hypervisors use the thin layer of code in software or firmware to achieve fine-grained, dynamic resource sharing. Because hypervisors provide the greatest level of flexibility in how virtual resources are defined and managed, they are the primary technology for system virtualization.

Virtual Machine Monitor. A Virtual Machine Monitor (VMM) is computer software, firmware or hardware that creates and runs virtual machines. The computer on which the hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, where all instances (usually called containers)

must share a single kernel, though the guest operating systems can differ in user space, such as different Linux distributions with the same kernel. Typically, a VMM refers to a software that runs in a layer between the hypervisor or host operating system and one or more virtual machines, and provides the virtual machines abstraction to the guest operating systems. With full virtualization, the VMM exports a virtual machine abstraction identical to the physical machine, so the standard operating system can run just as they would on physical hardware.

Hardware virtualization or platform virtualization refers to the creation of a virtual machine that acts like a real computer with an operating system. Software executed on these virtual machines is separated from the underlying hardware resources. In hardware virtualization, the host machine is the actual machine on which the virtualization takes place, and the guest machine is the virtual machine. The words host and guest are used to distinguishing the software that runs on the physical machine from the software that runs on the virtual machine. The software or firmware that creates a virtual machine on the host hardware is called a hypervisor or Virtual Machine Manager. Different types of hardware virtualization include full-virtualization, where almost complete simulation of the actual hardware allows software, which typically consists of a guest operating system, to run unmodified, and Para-virtualization, where a hardware environment is not simulated; however, the guest programs are executed in their own isolated domains, as if they are running on a separate system. Guest programs need to be specifically modified to run in this environment.

Hardware-assisted virtualization is a way of improving the overall efficiency of virtualization. It involves CPUs that provide support for virtualization in hardware, and other hardware components that help improve the performance of a guest environment. Hardware virtualization can be viewed as part of an overall trend in enterprise IT that includes autonomic computing, a scenario in which the IT environment will be able to manage itself based on perceived activity, and utility computing, in which computer processing power is seen as a utility that clients can pay for only as needed. The usual goal of virtualization is to centralize administrative tasks while improving scalability and overall hardware-resource utilization. With virtualization, several operating systems can be run in parallel on a single central processing unit (CPU). This parallelism tends to reduce overhead costs and differs from multitasking, which involves running several programs on the same OS. Using virtualization, an enterprise can better manage updates and rapid changes to the operating system and applications without disrupting the user.

Server Virtualization. Server virtualization is a virtualization technique that involves partitioning a physical server into a number of small, virtual servers with the help of virtualization software. In server virtualization, each virtual server runs multiple operating system instances at the same time. A Virtual Private Server (VPS) is a virtual machine sold as a service by an Internet hosting service, that runs its own copy of an Operating System (OS), and customers may have superuser-level access to that operating system instance, so they can install almost any software that runs on that OS. For many purposes, they are functionally equivalent to a dedicated physical server, and being software-defined, are able to be much more easily created and configured. They are typically priced much lower than an equivalent physical server. However, as they share the underlying physical hardware with other VPS's, performance may be lower, depending on the workload of any other executing virtual machines. Dedicated Servers may also be more efficient with CPU dependent processes such as hashing algorithms.

Application Virtualization. Application virtualization is software technology that encapsulates computer programs from the underlying operating system on which it is executed. A fully virtualized application is not installed in the traditional sense, although it is still executed as if it were. The application behaves at runtime like it is directly interfacing with the original operating system and all the resources managed by it, but can be isolated or sandboxed to varying degrees. The application virtualization is layered on top of other virtualization technologies, allowing computing resources to be distributed dynamically in real-time. In this context, the term "virtualization" commonly refers to the artifact being encapsulated (application), which is quite different from its meaning in hardware virtualization, where it refers to the artifact being abstracted (physical hardware).

Network Virtualization. Network Virtualization refers to the process of combining hardware and software network resources to create a single pool of resources that make up a virtual network that can be accessed without regard to the physical component. The network virtualization typically involves combining hardware and software network resources and network functionality into a single, software-based administrative entity, a virtual network. Further, network virtualization involves platform virtualization, often combined with resource virtualization. The network virtualization is categorized as either external virtualization, combining many networks or parts of networks into a virtual unit, or internal virtualization, providing network-like functionality to software containers on a single network server.

Storage Virtualization. Storage virtualization refers to the process of consolidating the physical storage from multiple network storage devices so that it appears to be a single storage unit. Within the context of a storage system, there are two primary types of virtualization that can occur: Block virtualization used in this context refers to the abstraction (separation) of logical storage (partition) from physical storage so that it may be accessed without regard to physical storage or heterogeneous structure. This separation allows the administrators of the storage system greater flexibility in how they manage storage for end users. File virtualization addresses the NAS challenges by eliminating the dependencies between the data accessed at the file level and the location where the files are physically stored. This provides opportunities to optimize storage use and server consolidation and to perform non-disruptive file migrations.

Desktop Virtualization. Desktop virtualization refers to a process of virtualizing desktop computers using virtualization software, such that the desktop computer and the associated operating system and applications are separated from the physical client device that is used to access it. The desktop virtualization is software technology that separates the desktop environment and associated application software from the physical client device that is used to access it.

Further, the desktop virtualization can be used in conjunction with application virtualization and user profile management systems, now termed "user virtualization," to provide a comprehensive desktop environment management system. In this mode, all the components of the desktop are virtualized, which allows for a highly flexible and much more secure desktop delivery model. In addition, this approach supports a more complete desktop disaster recovery strategy as all components are essentially saved in the data center and backed up through traditional redundant maintenance systems. If a user's device or hardware is lost, the restore is straightforward and simple, because the components will be present at login from another device. In addition, because no data is saved to the user's device, if that device is lost, there is much less chance that any critical data can be retrieved and compromised. Virtual Desktop Infrastructure (VDI)—The practice of hosting a desktop environment within a virtual machine that runs on a centralized or remote server.

An example of a virtualization architecture 900 is shown in FIG. 3*b*, where three virtual machines are exemplified. A Virtual Machine (VM) #1 910*a* provides virtualization for the application 901*a* that uses the guest OS 902*a*, which in turn interfaces with the virtual hardware 903*a* that emulates the actual hardware. Similarly, a Virtual Machine (VM) #2 910*b* provides virtualization for the application 901*b* that uses the guest OS 902*b*, which in turn interfaces with the virtual hardware 903*b* that emulates the associated actual hardware, and a Virtual Machine (VM) #3 910*c* provides virtualization for the application 901*c* that uses the guest OS 902*c*, which in turn interfaces with the virtual hardware 903*c* that emulates the associated actual hardware. The abstraction layer is provided by VMM 904, allowing of hardware-independence of operating systems and applications, provisioning on any single physical system, and managing the applications and the OSs as a single encapsulated unit.

A hosted architecture 900*a* for virtualization is shown in FIG. 3*c*, where a wide range of actual host hardware 906 may be used by implementing a host operating system 905 layer between the actual hardware 906 and the VMM 904. Such configuration relies on the host OS 905 for device support and physical resource management. In contrast, a bare-metal architecture 900*b* is shown in FIG. 3*d*, where a hypervisor layer (in addition to, or as part of, the VMM 904) is used as the first layer, allowing the VMM 904 to have direct access to the hardware resources, hence providing more efficient, and greater scalability, robustness, and performance.

Cloud. The term "Cloud" or "Cloud computing" as used herein is defined as a technology infrastructure facilitating supplement, consumption, and delivery of IT services, and generally refers to any group of networked computers capable of delivering computing services (such as computations, applications, data access, and data management and storage resources) to end users. This disclosure does not limit the type (such as public or private) of the cloud, as well as the underlying system architecture used by the cloud. The IT services are internet based and may involve elastic provisioning of dynamically scalable and time virtualized resources. Although such virtualization environments can be privately deployed and used within a local area or wide area networks owned by an enterprise, a number of "cloud service providers" host virtualization environments accessible through the public internet (the "public cloud") that is generally open to anyone, or through private IP or other type of network accessible only by entities given access to it (a "private cloud."). Using a cloud-based control server or using the system above may allow for reduced capital or operational expenditures. The users may further access the system using a web browser regardless of their location or what device they are using, and the virtualization technology allows servers and storage devices to be shared and utilization to be increased. Examples of public cloud providers include Amazon AWS, Microsoft Azure and Google GCP. The comparison of service features such as computation, storage, and infrastructure of the three cloud service providers (AWS, Microsoft Azure, and GCP) is disclosed in an article entitled: "*Highlight the Features of AWS, GCP and Microsoft Azure that Have an Impact when Choosing a Cloud Service Provider*" by Muhammad Ayoub Kamal, Hafiz Wahab Raza, Muhammad Mansoor Alam, and Mazliham Mohd Su'ud, published January 2020 in 'International Journal of Recent Technology and Engineering (IJRTE)' ISSN: 2277-3878, Volume-8by Blue Eyes Intelligence Engineering & Sciences Publication [DOI:10.35940/ijrte.D8573.018520], which is incorporated in its entirety for all purposes as if fully set forth herein.

The term "Software as a Service (SaaS)" as used herein in this application, is defined as a model of software deployment whereby a provider licenses a Software Application (SA) to customers for use as a service on demand. Similarly, an "Infrastructure as a Service" (IaaS) allows enterprises to access virtualized computing systems through the public Internet. The term "customer" as used herein in this application, is defined as a business entity that is served by an SA, provided on the SaaS platform. A customer may be a person or an organization and may be represented by a user that responsible for the administration of the application in aspects of permissions configuration, user related configuration, and data security policy. The service is supplied and consumed over the Internet, thus eliminating requirements to install and run applications locally on a site of a customer as well as simplifying maintenance and support. Particularly, it is advantageous in massive business applications. Licensing is a common form of billing for the service and it is paid periodically. SaaS is becoming ever more common as a form of SA delivery over the Internet and is being facilitated in a technology infrastructure called "Cloud Computing". In this form of SA delivery, where the SA is controlled by a service provider, a customer may experience stability and data security issues. In many cases, the customer is a business organization that is using the SaaS for business purposes such as business software; hence, stability and data security are primary requirements. As part of a cloud service arrangement, any computer system may also be emulated using software running on a hardware computer system. This virtualization allows for multiple instances of a computer system, each referred to as a virtual machine, to run on a single machine. Each virtual machine behaves like a computer system running directly on hardware. It is isolated from the other virtual machines, as would two hardware computers. Each virtual machine comprises an instance of an operating system (the "guest operating system"). There is a host operating system running directly on the hardware that supports the software that emulates the hardware, and the emulation software is commonly referred to as a hypervisor.

The term "cloud-based" generally refers to a hosted service that is remotely located from a data source and configured to receive, store and process data delivered by the data source over a network. The cloud-based systems may be configured to operate as a public cloud-based service, a private cloud-based service or a hybrid cloud-based service. A "public cloud-based service" may include a third-party provider that supplies one or more servers to host multi-tenant services. Examples of a public cloud-based service include Amazon Web Services® (AWS®), Microsoft® Azure™, and Google® Compute Engine™ (GCP) as examples. In contrast, a "private" cloud-based service may include one or more servers that host services provided to a single subscriber (enterprise) and a hybrid cloud-based service may be a combination of certain functionality from a public cloud-based service and a private cloud-based service.

Cloud computing and virtualization are described in a book entitled "*Cloud Computing and Virtualization*" authored by Dac-Nhuong Le (Faculty of Information Technology, Haiphong University, Haiphong, Vietnam), Raghvendra Kumar (Department of Computer Science and Engineering, LNCT, Jabalpur, India), Gia Nhu Nguyen (Graduate School, Duy Tan University, Da Nang, Vietnam), and Jyotir Moy Chatterjee (Department of Computer Science and Engineering at GD-RCET, Bhilai, India), and published 2018 by John Wiley & Sons, Inc. [ISBN 978-1-119-48790-6], which is incorporated in its entirety for all purposes as if fully set forth herein. The book describes the adoption of virtualization in data centers creates the need for a new class of networks designed to support elasticity of resource allocation, increasing mobile workloads and the shift to production of virtual workloads, requiring maximum availability. Building a network that spans both physical servers and virtual machines with consistent capabilities demands a new architectural approach to designing and building the IT infrastructure. Performance, elasticity, and logical addressing structures must be considered as well as the management of the physical and virtual networking infrastructure. Once deployed, a network that is virtualization-ready can offer many revolutionary services over a common shared infrastructure. Virtualization technologies from VMware, Citrix and Microsoft encapsulate existing applications and extract them from the physical hardware. Unlike physical machines, virtual machines are represented by a portable software image, which can be instantiated on physical hardware at a moment's notice. With virtualization, comes elasticity where computer capacity can be scaled up or down on demand by adjusting the number of virtual machines actively executing on a given physical server. Additionally, virtual machines can be migrated while in service from one physical server to another.

Extending this further, virtualization creates "location freedom" enabling virtual machines to become portable across an ever-increasing geographical distance. As cloud architectures and multi-tenancy capabilities continue to develop and mature, there is an economy of scale that can be realized by aggregating resources across applications, business units, and separate corporations to a common shared, yet segmented, infrastructure. Elasticity, mobility, automation, and density of virtual machines demand new network architectures focusing on high performance, addressing portability, and the innate understanding of the virtual machine as the new building block of the data center. Consistent network-supported and virtualization-driven policy and controls are necessary for visibility to virtual machines' state and location as they are created and moved across a virtualized infrastructure.

Virtualization technologies in data center environments are described in an eBook authored by Gustavo Alessandro Andrade Santana and published 2014 by Cisco Systems, Inc. (Cisco Press) [ISBN-13: 978-1-58714-324-3] entitled: "*Data Center Virtualization Fundamentals*", which is incorporated in its entirety for all purposes as if fully set forth herein. PowerVM technology for virtualization is described in IBM RedBook entitled: "*IBM PowerVM Virtualization—Introduction and Configuration*" published by IBM Corporation June 2013, and virtualization basics is described in a paper by IBM Corporation published 2009 entitled: "*Power Systems—Introduction to virtualization*", which are both incorporated in their entirety for all purposes as if fully set forth herein.

FIG. 1 shows a block diagram that illustrates a system 10 including a computer system 11 and an associated Internet 113 connection. Such configuration is typically used for computers (hosts) connected to the Internet 113 and executing a server or a client (or a combination) software. The system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), and/or any other handheld or fixed location computing devices, or a combination of any of these devices. Note that while FIG. 1 illustrates various components of a computer system, it is not intended to represent any particular architecture or manner of interconnecting the components; as such details are not germane. It will also be appreciated that network computers, handheld computers, cell phones, and other data processing systems which have fewer components or perhaps more components may also be used. The computer system of FIG. 1 may, for example, be an Apple Macintosh computer or Power Book, or an IBM compatible PC.

The computer system 11 includes a bus 13, an interconnect, or other communication mechanism for communicating information, and a processor 27, commonly in the form of an integrated circuit, coupled to the bus 13 for processing information and for executing the computer executable instructions. The computer system 11 also includes a main memory 25*a*, such as a Random Access Memory (RAM) or other dynamic storage device, coupled to the bus 13 for storing information and instructions to be executed by the processor 27. The main memory 25*a* also may be used for storing temporary variables or other intermediate information during execution of instructions to be executed by processor 27. The computer system 11 further includes a Read Only Memory (ROM) 25*b* (or other non-volatile memory) or other static storage device coupled to the bus 13 for storing static information and instructions for the processor 27. A storage device 25*c*, such as a magnetic disk or optical disk, a Hard Disk Drive (HDD) for reading from and writing to the hard disk, a magnetic disk drive for reading from and writing to a magnetic disk, and/or an optical disk drive (such as DVD) for reading from and writing to a removable optical disk, is coupled to the bus 13 for storing information and instructions. The hard disk drive, magnetic disk drive, and optical disk drive may be connected to the system bus by the hard disk drive interface, a magnetic disk drive interface, and an optical disk drive interface, respectively. The drives and their associated computer-readable media provide non-volatile storage of computer readable instructions, data structures, program modules, and other data for the general-purpose computing devices. Typically, the computer system 11 includes an Operating System (OS) stored in a non-volatile storage for managing the computer resources and provides the applications and programs with an access to the computer resources and interfaces. An operating system commonly processes system data and user input, and responds by allocating and managing tasks and internal systems resources, such as controlling and allocating memory, prioritizing system requests, controlling input and output devices, facilitating networking, and managing files. Non-limiting examples of operating systems are Microsoft Windows, Mac OS X, and Linux.

The term "processor" is used herein to include, but not limited to, any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The computer system 11 may be coupled via the bus 13 to a display 17, such as a Cathode Ray Tube (CRT), a Liquid Crystal Display (LCD), a flat screen monitor, a touch screen monitor, or similar means for displaying text and graphical data to a user. The display may be connected via a video adapter for supporting the display. The display 17 allows a user to view, enter, and/or edit the information that is relevant to the operation of the system. An input device 18, including alphanumeric and other keys, is coupled to the bus 13 for communicating information and command selections to the processor 27. Another type of user input device is a cursor control 19, such as a mouse, a trackball, or cursor direction keys for communicating direction information and command selections to the processor 27 and for controlling cursor movement on the display 17. This input device 18 typically has two degrees of freedom in two axes, a first axis (e.g., 'x') and a second axis (e.g., 'y'), that allows the device to specify positions in a plane.

A touch-screen may be used as a combination of a display 17 and input device 18. A computing device with a touch screen display, and a computer-implemented method for use in conjunction with the computing device with a touch screen display, is disclosed in U.S. Pat. No. 7,479,949 to Jobs et al., entitled "Touch screen device, method, and graphical user interface for determining commands by applying heuristics", which is incorporated in its entirety for all purposes as if fully set forth herein. The method comprises detecting one or more finger contacts with the touch screen display, applying one or more heuristics to the one or more finger contacts to determine a command for the device, and processing the command. The one or more heuristics comprise a heuristic for determining that the one or more finger contacts correspond to a one-dimensional vertical screen scrolling command, a heuristic for determining that the one or more finger contacts correspond to a two-dimensional screen translation command, and a heuristic for determining that the one or more finger contacts correspond to a command to transition from displaying a respective item in a set of items to displaying a next item in the set of items.

The computer system 11 may be used for implementing the methods and techniques described herein. According to one embodiment, those methods and techniques are performed by the computer system 11 in response to the processor 27 executing one or more sequences of one or more instructions contained in a main memory 25*a*. Such instructions may be read into the main memory 25*a* from another computer-readable medium, such as the storage device 25*c*. Execution of the sequences of instructions contained in the main memory 25*a* causes the processor 27 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") is used herein to include, but not limited to, any medium or any memory, that participates in providing instructions to a processor, (such as the processor 27) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise the bus 13. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 27 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal and appropriate circuitry can place the data on the bus 13. The bus 13 carries the data to the main memory 25*a*, from which the processor 27 retrieves and executes the instructions. The instructions received by the main memory 25*a* may optionally be stored on the storage device 25*c* either before or after execution by the processor 27.

The computer system 11 commonly includes a communication interface 29 coupled to the bus 13. The communication interface 29 provides a two-way data communication coupling to a network link 28 that is connected to a local network 14. For example, the communication interface 29 may be an Integrated Services Digital Network (ISDN) card or a modem to provide a data communication connection to a corresponding type of telephone line. As another non-limiting example, the communication interface 29 may be a local area network (LAN) card to provide a data communication connection to a compatible LAN. For example, Ethernet based connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "Internetworking Technologies Handbook", Chapter 7: "Ethernet Technologies", pages 7-1 to 7-38, which is incorporated in its entirety for all purposes as if fully set forth herein. In such a case, the communication interface 29 typically includes a LAN transceiver or a modem, such as Standard Microsystems Corporation (SMSC) LAN91C111 10/100 Ethernet transceiver, described in a Standard Microsystems Corporation (SMSC) data-sheet "LAN91C111 10/100 Non-PCI Ethernet Single Chip MAC+PHY" Data-Sheet, Rev. 15 (Feb. 20, 2004), which is incorporated in its entirety for all purposes as if fully set forth herein.

The Internet 113 is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routes are hosted by commercial, government, academic and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

An Internet Service Provider (ISP) 12 is an organization that provides services for accessing, using, or participating in the Internet 113. Internet Service Providers may be organized in various forms, such as commercial, community-owned, non-profit, or otherwise privately owned. Internet services typically provided by ISPs include Internet access, Internet transit, domain name registration, web hosting, and colocation. Various ISP Structures are described in Chapter 2: "Structural Overview of ISP Networks" of the book entitled: "Guide to Reliable Internet Services and Applications", by Robert D. Doverspike, K. K. Ramakrishnan, and Chris Chase, published 2010 (ISBN: 978-1-84882-827-8), which is incorporated in its entirety for all purposes as if fully set forth herein.

A mailbox provider is an organization that provides services for hosting electronic mail domains with access to storage for mailboxes. It provides email servers to send, receive, accept, and store email for end users or other organizations. Internet hosting services provide email, web-hosting, or online storage services. Other services include virtual server, cloud services, or physical server operation. A virtual ISP (VISP) is an operation that purchases services from another ISP, sometimes called a wholesale ISP in this context, which allows the VISP's customers to access the Internet using services and infrastructure owned and operated by the wholesale ISP. It is akin to mobile virtual network operators and competitive local exchange carriers for voice communications. A Wireless Internet Service Provider (WISP) is an Internet service provider with a network based on wireless networking. Technology may include commonplace Wi-Fi wireless mesh networking, or proprietary equipment designed to operate over open 900 MHZ, 2.4 GHz, 4.9, 5.2, 5.4, 5.7, and 5.8 GHz bands or licensed frequencies in the UHF band (including the MMDS frequency band) and LMDS.

ISPs may engage in peering, where multiple ISPs interconnect at peering points or Internet exchange points (IXs), allowing routing of data between each network, without charging one another for the data transmitted—data that would otherwise have passed through a third upstream ISP, incurring charges from the upstream ISP. ISPs requiring no upstream and having only customers (end customers and/or peer ISPs), are referred to as Tier 1 ISPs.

A multitasking is a method where multiple tasks (also known as processes or programs) are performed during the same period of time—they are executed concurrently (in overlapping time periods, new tasks starting before others have ended) instead of sequentially (one completing before the next starts). The tasks share common processing resources, such as a CPU and main memory. Multitasking does not necessarily mean that multiple tasks are executing at exactly the same instant. In other words, multitasking does not imply parallelism, but it does mean that more than one task can be part-way through execution at the same time, and more than one task is advancing over a given period of time.

In the case of a computer with a single CPU, only one task is running at any point in time, meaning that the CPU is actively executing instructions for that task. Multitasking solves the problem by scheduling which task may be the one running at any given time, and when another waiting task gets a turn. The act of reassigning a CPU from one task to another one is called a context switch. When context switches occur frequently enough, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than there are CPUs.

Operating systems may adopt one of many different scheduling strategies. In multiprogramming systems, the running task keeps running until it performs an operation that requires waiting for an external event (e.g., reading from a tape) or until the computer's scheduler forcibly swaps the running task out of the CPU. Multiprogramming systems are designed to maximize CPU usage. In time-sharing systems, the running task is required to relinquish the CPU, either voluntarily or by an external event such as a hardware interrupt. Time sharing systems are designed to allow several programs to execute apparently simultaneously. In real-time systems, some waiting tasks are guaranteed to be given the CPU when an external event occurs. Real-time systems are designed to control mechanical devices such as industrial robots, which require timely processing.

Encryption based mechanisms are commonly end-to-end processes involving only the sender and the receiver, where the sender encrypts the plain text message by transforming it using an algorithm, making it unreadable to anyone, except the receiver which possesses special knowledge. The data is then sent to the receiver over a network such as the Internet, and when received the special knowledge enables the receiver to reverse the process (decrypt) to make the information readable as in the original message. The encryption process commonly involves computing resources such as processing power, storage space and requires time for executing the encryption/decryption algorithm, which may delay the delivery of the message.

Transport Layer Security (TLS) and its predecessor Secure Sockets Layer (SSL) are non-limiting examples of end-to-end cryptographic protocols, providing secured communication above the OSI Transport Layer, using keyed message authentication code and symmetric cryptography. In client/server applications, the TLS client and server negotiate a stateful connection by using a handshake procedure, during which various parameters are agreed upon, allowing a communication in a way designed to prevent eavesdropping and tampering. The TLS 1.2 is defined in RFC 5246, and several versions of the protocol are in widespread use in applications such as web browsing, electronic mail, Internet faxing, instant messaging, and Voice-over-IP (VOIP). In application design, TLS is usually implemented on top of any of the Transport Layer protocols, encapsulating the application-specific protocols such as HTTP, FTP, SMTP, NNTP, and XMPP. It has been used primarily with reliable transport protocols such as the Transmission Control Protocol (TCP). However, it has also been implemented with datagram-oriented transport protocols, such as the User Datagram Protocol (UDP) and the Datagram Congestion Control Protocol (DCCP), a usage which has been standardized independently using the term Datagram Transport Layer Security (DTLS). A prominent use of TLS is for securing World Wide Web traffic carried by HTTP to form HTTPS. Notable applications are electronic commerce and asset management. Increasingly, the Simple Mail Transfer Protocol (SMTP) is also protected by TLS (RFC 3207). These applications use public key certificates to verify the identity of endpoints. Another Layer 4 (Transport Layer) and upper layers encryption-based communication protocols include SSH (Secure Shell) and SSL (Secure Socket Layer).

To provide the server name, RFC 4366 Transport Layer Security (TLS) Extensions allow clients to include a Server Name Indication extension (SNI) in the extended ClientHello message. This extension hints to the server immediately which name the client wishes to connect to, so the server can select the appropriate certificate to send to the clients.

Layer 3 (Network Layer) and lower layer encryption-based protocols include an IPsec, L2TP (Layer 2 Tunneling Protocol) over IPsec, and Ethernet over IPsec. The IPsec is a protocol suite for securing IP communication by encrypting and authenticating each IP packet of a communication session. The IPsec standard is currently based on RFC 4301 and RFC 4309, and was originally described in RFCs 1825-1829, which are now obsolete, and uses the Security Parameter Index (SPI, as per RFC 2401) as an identification tag added to the header while using IPsec for tunneling the IP traffic. The IPsec overview is provided in Cisco Systems, Inc. document entitled: "An Introduction to IP Security (IPSec) Encryption", which is incorporated in its entirety for all purposes as if fully set forth herein.

Two common approaches to cryptography are found in U.S. Pat. No. 3,962,539 to Ehrsam et al., entitled "Product Block Cipher System for Data Security", and in U.S. Pat. No. 4,405,829 to Rivest et al., entitled "Cryptographic Communications System and Method", which are both incorporated in their entirety for all purposes as if fully set forth herein. The Ehrsam patent discloses what is commonly known as the Data Encryption Standard (DES), while the Rivest patent discloses what is commonly known as the RSA algorithm (which stands for Rivest, Shamir, and Adleman who first publicly described it), which is widely used in electronic commerce protocols. The RSA involves using a public key and a private key. DES is based upon secret-key cryptography, also referred to as symmetric cryptography, and relies upon a 56-bit key for encryption. In this form of cryptography, the sender and receiver of cipher text both possess identical secret keys, which are, in an ideal world, completely unique and unknown to the world outside of the sender and receiver. By encoding plain text into cipher text using the secret key, the sender may send the cipher text to the receiver using any available public or otherwise insecure communication system. The receiver, having received the cipher text, decrypts it using the secret key to arrive at the plain text.

SNI. Server Name Indication (SNI) is an extension to the TLS computer networking protocol by which a client indicates which hostname it is attempting to connect to at the start of the handshaking process. This allows a server to present multiple certificates on the same IP address and TCP port number and hence allows multiple secure (HTTPS) websites (or any other Service over TLS) to be served by the same IP address without requiring all those sites to use the same certificate. It is the conceptual equivalent to HTTP/1.1 name-based virtual hosting, but for HTTPS. The desired hostname is not encrypted, so an eavesdropper can see which site is being requested.

SNI addresses this issue by having the client sends the name of the virtual domain as part of the TLS negotiation. This enables the server to select the correct virtual domain early and present the browser with the certificate containing the correct name. Therefore, with clients and servers that implement SNI, a server with a single IP address can serve a group of domain names for which it is impractical to get a common certificate. SNI was added to the IETF's Internet RFCs in June 2003 through RFC 3546, Transport Layer Security (TLS) Extensions. The latest version of the standard is RFC 6066. For an application program to implement SNI, the TLS library it uses must implement it and the application must pass the hostname to the TLS library. Further, the TLS library may either be included in the application program or be a component of the underlying operating system.

Proxy. According to IETF RFC 2616, a 'proxy' is an intermediary program which acts as both a server and a client for the purpose of making requests on behalf of other clients. Requests are serviced internally or by passing them on, with possible translation, to other servers. A proxy MUST implement both the client and server requirements of this specification. A "transparent proxy" is a proxy that does not modify the request or response beyond what is required for proxy authentication and identification. A "non-transparent proxy" is a proxy that modifies the request or response in order to provide some added service to the user agent, such as group annotation services, media type transformation, protocol reduction, or anonymity filtering. Except where either transparent or non-transparent behavior is explicitly stated, the HTTP proxy requirements apply to both types of proxies.

Proxy server. A proxy server is a server (a computer system or an application) that acts as an intermediary for requests from clients seeking resources from other servers. The client connects to the proxy server, requesting some service, such as a file, connection, web page, or other resource, available from a different server and the proxy server evaluates the request as a way to simplify and control its complexity. Proxies may be used to add structure and encapsulation to distributed systems. Today, most proxies are web proxies, facilitating access to content on the World Wide Web and providing anonymity. A proxy server may reside on the user's local computer, or at various points between the user's computer and destination servers on the Internet. A proxy server that passes requests and responses unmodified is usually called a gateway or sometimes a tunneling proxy. A forward proxy is an Internet-facing proxy used to retrieve from a wide range of sources (in most cases anywhere on the Internet). Forward proxies are proxies in which the client server names the target server to connect to, and are able to retrieve from a wide range of sources (in most cases anywhere on the Internet). An open proxy is a forwarding proxy server that is accessible by any Internet user, while browsing the Web or using other Internet services. There are varying degrees of anonymity, however, as well as a number of methods of 'tricking' the client into revealing itself regardless of the proxy being used. The proxy server is further described in IETF RFC 1919 (March 1996) "*Classical versus Transparent IP Proxies*" and in IETF RFC 3143 (March 1996) "*Known HTTP Proxy/Caching Problems*" (June 2001), which are both incorporated in their entirety for all purposes as if fully set forth herein.

A reverse proxy (or surrogate) is a proxy server that appears to clients to be an ordinary server. Requests are forwarded to one or more proxy servers which handle the request. The response from the proxy server is returned as if it came directly from the original server, leaving the client no knowledge of the origin servers. Reverse proxies are installed in the neighborhood of one or more web servers. All traffic coming from the Internet and with a destination of one of the neighborhood's web servers goes through the proxy server. The use of "reverse" originates in its counterpart "forward proxy" since the reverse proxy sits closer to the web server and serves only a restricted set of websites.

FIG. 5 shows a system 50 including two client devices, a client device #1 31*a* and a client device #2 31*b*, that may access the web servers (data servers) 22*a* and 22*b*. These network elements communicate with each other using the Internet 113. An illustrative example of direct fetching or content without any use of any intermediary device (such as a proxy server) is shown in a schematic messaging flow diagram 50*a* in FIG. 5*a*. As part of executing a web server application in the client device #1 31*a*, a request for content from the data server #1 22*a*, typically by means of an URL request is identified. As a result, the client device #1 31*a* sends a 'Content Request' message 55*a* over the Internet 113 (typically as an HTTP request) to the data server #1 22*a*. The IP packets that form the 'Content Request' message 55*a* include the IP of the data server #1 22*a* in the 'Destination IP Address' field 16*c*, and the IP address of the requesting client device #1 31*a* is included in the 'Source IP Address' field 16*d*. As a result, the data server #1 22*a* responds to the received request by sending the requested content (such as a web page) as a 'Send Content' message 55*b* over the Internet 113 (typically as an HTTP request) to the requesting client device #1 31*a*. The IP packets that form the 'Send Content' message 55*b* include the IP address of the data server #1 22*a* in the 'Source IP Address' field 16*d*, and the IP address of the requesting client device #1 31*a* is included in the 'Destination IP Address' field 16*c*.

Since the IP address of the requesting client device #1 31*a* is included in the packets that are received by the data server #1 22*a* as part of the HTTP request in the 'Content Request' message 55*a* over the Internet 113, the data server #1 22*a* is aware of the identity of the requesting client #1 31*a*, revealing its identity, and no anonymity is obtained.

An illustrative example of using a proxy server is shown in a schematic messaging flow diagram 50*b* in FIG. 5*b*. A 'Content Request' message 54*a* is first sent from the client device #1 31*a* to a proxy server 53, which responds by forwarding the request to the data server #1 22*a* using a 'Content Request' message 54*b*. In turn the data server #1 22*a* replies and sends the content in a 'Send Content' message 54*c* to the requesting proxy server 53, which in turn forward the fetched content to the asking client device #1 31*a* using a 'Send Content' message 54*d*. Hence, the client device #1 31*a* received the requested content in response to the sent 'Content Request' message 54*a*.

The main benefit of using the proxy server 53 relates to the anonymity obtained. While the 'Content Request' message 54*a* typically includes the IP address of the sending requesting client device #1 31*a* (in the 'Source IP Address' field 16*d*), the request message that arrives as part of the 'Content Request' message 54*b* includes the IP address of the proxy server 53 in the 'Source IP Address' field 16*d* of the packets that form the 'Content Request' message 54*b*. Hence, the data server #1 22*a* is only aware of the identity of the proxy server 53 as the requesting device, and the anonymity of the actual requesting client #1 31*a* is reserved, while properly fetching the requested content.

A 'transparent proxy' is a proxy that does not modify the request or response beyond what is required for proxy authentication and identification. The transparent proxy, also known as an intercepting proxy, inline proxy, or forced proxy, is a proxy that intercepts normal communication at the network layer without requiring any special client configuration. Clients need not be aware of the existence of the proxy. The transparent proxy is normally located between the client and the Internet, with the proxy performing some of the functions of a gateway or router. A 'non-transparent proxy' is a proxy that modifies the request or response in order to provide some added service to the user agent, such as group annotation services, media type transformation, protocol reduction, or anonymity filtering. TCP Intercept is a traffic filtering security feature that protects TCP servers from TCP SYN flood attacks, which are a type of denial-of-service attack. TCP Intercept is available for IP traffic only. Intercepting proxies are commonly used in businesses to enforce acceptable use policy, and to case administrative overheads, since no client browser configuration is required. This second reason however is mitigated by features such as Active Directory group policy, or DHCP and automatic proxy detection. Intercepting proxies are also commonly used by ISPs in some countries to save upstream bandwidth and improve customer response times by caching.

An 'open proxy' is used for forwarding requests from and to anywhere on the Internet, and is a forwarding proxy server that is accessible by any Internet user. An 'anonymous proxy' reveals its identity as a proxy server, but does not disclose the originating IP address of the client. While this type of server may be easily discovered, it may be beneficial for some users for hiding their originating IP address. A 'transparent proxy' does not only identifies itself as a proxy server, but with the support of HTTP header fields such as X-Forwarded-For, the originating IP address may be retrieved as well. The main benefit of using this type of server is its ability to cache a website for faster retrieval.

A 'reverse proxy' is taking requests from the Internet and forwarding them to servers in an internal network, while those making requests connect to the proxy and may not be aware of the internal network. The reverse proxy (or surrogate) is a proxy server that appears to clients to be an ordinary server. Reverse proxies forward requests to one or more ordinary servers which handle the request. The response from the proxy server is returned as if it came directly from the original server, leaving the client with no knowledge of the original server. The reverse proxies are installed in the neighborhood of one or more web servers. All traffic coming from the Internet and with a destination of one of the neighborhood's web servers goes through the proxy server. The use of "reverse" originates in its counterpart "forward proxy" since the reverse proxy sits closer to the web server and serves only a restricted set of websites. Reverse proxy servers typically support or provide Encryption/SSL acceleration—when secure web sites are created, the Secure Sockets Layer (SSL) encryption is often not done by the web server itself, but by a reverse proxy that is equipped with SSL acceleration hardware. Furthermore, a host can provide a single "SSL proxy" to provide SSL encryption for an arbitrary number of hosts; removing the need for a separate SSL Server Certificate for each host, with the downside that all hosts behind the SSL proxy have to share a common DNS name or IP address for SSL connections. Further, reverse proxy servers typically support or provide load balancing—the reverse proxy can distribute the load to several web servers, each web server serving its own application area. In such a case, the reverse proxy may need to rewrite the URLs in each of the web-page (translation from externally known URLs to the internal locations), and serve/cache static content—the reverse proxy can offload the web servers by caching static content like pictures and other static graphical content. Further, the proxy server can optimize and compress the content to speed up the load time, and may further support or provides Spoon feeding, where reduced resource usage is caused by slow clients on the web servers by caching the content the web server sent and slowly "spoon feeding" it to the client, which benefits dynamically generated pages. Further, reverse proxy servers typically support or provide security, where the proxy server is an additional layer of defense and can protect against some OS and Web Server specific attacks, and Extranet Publishing—where a reverse proxy server facing the Internet can be used to communicate to a firewall server internal to an organization, providing extranet access to some functions while keeping the servers behind the firewalls. If used in this way, security measures should be considered to protect the rest of your infrastructure in case this server is compromised, as its web application is exposed to attack from the Internet.

A 'translation proxy' is a proxy server that is used to localize a website experience for different markets. Traffic from global audience is routed through the translation proxy to the source website, and as visitors browse the proxied site, requests go back to the source site where pages are rendered. The original language content in the response is replaced by the translated content as it passes back through the proxy. The translations used in the translation proxy can be either machine translation, human translation, or a combination of machine and human translation. Different translation proxy implementations have different capabilities. Some allow further customization of the source site for local audience such as excluding the source content or substituting the source content with the original local content. A 'SOCKS proxy' forwards arbitrary data after a connection phase, and is similar to HTTP CONNECT in web proxies.

A 'CGI web proxy' accepts target URLs using a Web form in the user's browser window, processes the request, and returns the results to the user's browser. Consequently, it can be used on a device or network that does not allow "true" proxy settings to be changed. Typically CGI proxies are powered by one of CGIProxy (written in the Perl language), Glype (written in the PHP language), or PHProxy (written in the PHP language). Some CGI proxies were set up for purposes such as making websites more accessible to disabled people, but have since been shut down due to excessive traffic, usually caused by a third party advertising the service as a means to bypass local filtering. Since many of these users do not care about the collateral damage they are causing, it became necessary for organizations to hide their proxies, disclosing the URLs only to those who take the trouble to contact the organization and demonstrate a genuine need.

A 'suffix proxy' allows a user to access web content by appending the name of the proxy server to the URL of the requested content (e.g., "en.wikipedia.org.SuffixProxy-.com"). The suffix proxy servers are easier to use than regular proxy servers but they do not offer high levels of anonymity and their primary use is for bypassing web filters.

An 'I2P anonymous proxy' is part of the I2P anonymous network ('I2P'), that is a proxy network aiming at online anonymity. It implements garlic routing, which is an enhancement of Tor's onion routing. I2P is fully distributed and works by encrypting all communications in various layers and relaying them through a network of routers run by volunteers in various locations. By keeping the source of the information hidden, I2P offers censorship resistance. The goals of I2P are to protect users' personal freedom, privacy, and ability to conduct confidential business. Each user of I2P runs an I2P router on their computer (node). The I2P router takes care of finding other peers and building anonymizing tunnels through them. I2P provides proxies for all protocols, such as HTTP, IRC, and SOCKS. The Onion Router (Tor or TOR) is a system intended to provide online anonymity. Tor client software routes Internet traffic through a worldwide volunteer network of servers for concealing a user computer location or usage from someone conducting network surveillance or traffic analysis. Using Tor makes tracing Internet activity more difficult, and is intended to protect users' personal freedom, privacy. "Onion routing" refers to the layered nature of the encryption service: the original data are encrypted and re-encrypted multiple times, then sent through successive Tor relays, each one of which decrypts a "layer" of encryption before passing the data on to the next relay and ultimately the destination. This reduces the possibility of the original data being unscrambled or understood in transit. A 'DNS proxy server' takes DNS queries from a (usually local) network and forwards them to an Internet Domain Name Server. It may also cache DNS records.

Squid is an open source caching proxy for the Web, allowing for using less bandwidth on your Internet connection when surfing the Web, reducing the amount of time web-pages take to load, protecting the hosts on your internal network by proxying their web traffic, collecting statistics about web traffic on your network, preventing users from visiting inappropriate web sites at work or school, ensuring that only authorized users can surf the Internet, enhancing your user's privacy by filtering sensitive information from web requests, reducing the load on your own web server(s), and converting encrypted (HTTPS) requests on one side, to unencrypted (HTTP). Squid's job is to be both a proxy and a cache. As a proxy, Squid is an intermediary in a web transaction. It accepts a request from a client, processes that request, and then forwards the request to the origin server. The request may be logged, rejected, and even modified before forwarding. As a cache, Squid stores recently retrieved web content for possible reuse later. Subsequent requests for the same content may be served from the cache, rather than contacting the origin server again. You can disable the caching part of Squid if you like, but the proxying part is essential. Squid is described in a book by Duane Wessels entitled: "Squid: The Definitive Guide" published by O'Reilly Media; 1st Ed. [ISBN-10: 9780596001629, ISBN-13: 978-0596001629, (Jan. 1, 2004)], which is incorporated in its entirety for all purposes as if fully set forth herein.

Squid improves network performance by reducing the amount of bandwidth used when surfing the Web. It makes web-pages load faster and can even reduce the load on your web server. By caching and reusing popular web content, Squid allows you to get by with smaller network connections. It also protects the host on your internal network by acting as a firewall and proxying your internal web traffic. You can use Squid to collect statistics about the traffic on your network, prevent users from visiting inappropriate web sites at work or school, ensure that only authorized users can surf the Internet, and enhance your privacy by filtering sensitive information from web requests. Companies, schools, libraries, and organizations that use web-caching proxies can look forward to a multitude of benefits. The book "Squid: The Definitive Guide" helps to configure and tune Squid for your particular situation. Newcomers to Squid will learn how to download, compile, and install code. The later chapters tackle advanced topics such as high-performance storage options, rewriting requests, HTTP server acceleration, monitoring, debugging, and trouble-shooting Squid. Topics covered include: compiling and installing Squid, Running Squid, using Squid's sophisticated access controls, tuning disk storage for optimal performance, Configuring the operating system for HTTP interception, forwarding Requests to other web caches, using redirectors to rewrite user requests, monitoring Squid with the cache manager and SNMP, using Squid to accelerate and protect HTTP servers, managing bandwidth consumption with Delay Pools.

The structure and functionality of the Internet cache protocol (ICP) and its implementation in the Squid web caching software is described in an article entitled: "ICP and the Squid web cache" published April 1998 in 'IEEE Journal on Selected Areas in Communications' (Volume: 16, Issue: 3, April 1998) [DOI: 10.1109/49.669043], which is incorporated in its entirety for all purposes as if fully set forth herein. ICP is a lightweight message format used for communication among Web caches. Caches exchange ICP queries and replies to gather information to use in selecting the most appropriate location from which to retrieve an object. The history of ICP is presented, and issues in ICP deployment are discussed, such as efficiency, security, and interaction with other aspects of Web traffic behavior. The article catalogs successes, failures, and lessons learned from using ICP to deploy a global Web cache hierarchy.

Web proxy servers are described in a book by Luotonen entitled: "Web Proxy Servers" published by Prentice Hall; 1st Ed. [ISBN-10: 0136806120, ISBN-13: 978-0136806127, (Dec. 30, 1997)], which is incorporated in its entirety for all purposes as if fully set forth herein. An overview of proxies and reports their status is provided in a paper by Luotonen et al. entitled: "World-Wide Web proxies", published Computer Networks and ISDN Systems 27, 147-154 (Elsevier Science B.V.) (1994), which is incorporated in its entirety for all purposes as if fully set forth herein. A WWW proxy server, proxy for short, provides access to the Web for people on closed subnets who can only access the Internet through a firewall machine. The hypertext server developed at CERN, cern_httpd, is capable of running as a proxy, providing seamless external access to HTTP, Gopher, WAIS and FTP. ccm_httpd has had gateway features for a long time, but only this spring they were extended to support all the methods in the HTTP protocol used by WWW clients. Clients do not lose any functionality by going through a proxy, except special processing they may have done for non-native Web protocols such as Gopher and FTP. A brand new feature is caching performed by the proxy, resulting in shorter response times after the first document fetch. This makes proxies useful even to the people who do have full Internet access and do not really need the proxy just to get out of their local subnet.

An example of an open proxy is ProxyList.net, a web site that maintained a list of links to open proxies, as described in ProxyList.net and as captured by the Wayback Machine (web.archive.org), on Jul. 17, 2011, which is incorporated in its entirety for all purposes as if fully set forth herein. VIP72 is a website that sells its registered users access to anonymizing proxies, that is described in a printout that comprises a numbered sequence the representing approximately second-by-second screen dumps of the video of VIP72 YouTube web-page bearing a publication date of Sep. 22, 2011, at https://www.youtube.com/watch?v=LOHct2kSnn4, retrieved Nov. 21, 2019, and further described in VIP72 Scene Images extracted from VIP72.com/nvpnnet, MPEG-4 video recording of "nVPN.net|Double your Safety and use Socks5+nVpn", accessed from https://www.youtube.com/watch?v=LOHct2kSnn4, published Sep. 11, 2011, as well as VIP72.com home page as of 2013 from Wayback Machine, which are all incorporated in their entirety for all purposes as if fully set forth herein.

Distributing transmission of requests across multiple IP addresses of a proxy server is described in U.S. Patent Application Publication No. 2013/0080575 to Prince et al. entitled: "*Distributing transmission of requests across multiple ip addresses of a proxy server in a cloud-based proxy service*", which is incorporated in its entirety for all purposes as if fully set forth herein. A first packet is received at a proxy server from a client and includes a first incoming request for an action to be performed on an identified resource. The first packet is received at the proxy server as a result of a DNS request for a domain corresponding to the identified resource resolving to an IP address of the proxy server. The proxy server selects, based on at least in part on a set of parameters associated with the first packet, one of the multiple IP addresses for use as a source IP address for a second packet that carries an outgoing request and transmits the second packet. The proxy server receives a third packet that includes an incoming response from the destination origin server in response to the outgoing request and transmits a fourth packet to the client that includes an outgoing response based on the incoming response.

Data Center (DC) Proxy server. While the arrangement **50*b* that is shown in FIG. 5*b* provides some level of anonymity, such anonymity may be limited. The data server #1 22*a* may identify that the IP address corresponding to the received requests as part of the 'Content Request' 54*b* from the proxy server 53 belongs to a server or a proxy server, and may block this IP address, obviating the access of the proxy server 53 to serve as an intermediate device for the client device #1 31*a*. Further, particularly if used frequently and by multiple client devices, the data server #1 22*a* may detect the excessive load of requests from the proxy server 53, and may conclude that the IP address corresponding to the received requests as part of the 'Content Request' 54*b* from the proxy server 53** does not identify a client device but rather an intermediate device, and may then block this IP address, and will not respond to requests for content originating by this IP address.

An improved arrangement **50*c* is shown in FIG. 5*c*, using a Data Center (DC) proxy server 56. The DC proxy server 56 stores, or has access to, a list of IP addresses, such as the IP addresses list 59. The exemplary IP addresses list 58 is exampled to include 6 IP addresses, shown as IP #1 58*a*, IP #2 58*b*, IP #3 58*c*, IP #4 58*d*, IP #5 58*e*, and IP #6 58*f*. While exampled regarding 6 IP addresses, any number of IP addresses may be equally used. The IP addresses in the list 58 serves as IP addresses 'bank', and upon receiving a request for a content (such as a URL) from a client device, the DC proxy server 56 selects one of the IP addresses (such as randomly or any other load balancing technique), and use the selected IP address for requesting the content from the web server. Since many IP addresses are used, the web server, such as the data server #1 22***a*, cannot easily identify the request's origin to be a single device, and the traffic seems to be originated from a legitimate pool of client devices.

For example, upon receiving the 'Content Request' message 54*a* from the client device #1 31*a* by the DC proxy server 56, it responds by selecting an IP address from the list 58, such as the IP #3 58*c*, and then forwarding the request to the data server #1 22*a* using the IP #3 58*c* as the originating IP address source 16*d* as part of the 'Content Request' message 54*b*. In turn the data server #1 22*a* replies and sends the content in the 'Send Content' message 54*c* to the requesting DC proxy server 56, which in turn forward the fetched content to the asking client device #1 31*a* using the 'Send Content' message 54*d*. Hence, the client device #1 31*a* received the requested content in response to the sent 'Content Request' message 54*a*, however the data server #1 22*a* is only aware of the IP #3 58*c* identity, and is not aware of the client device #1 31*a* identity (IP address).

In a case where the client device #1 31*a* requests another content from the data server #1 22*a*, it sends another 'Content Request' message 57*a* to the DC proxy server 56. Upon receiving the 'Content Request' message 57*a* from the client device #1 31*a* by the DC proxy server 56, it responds by selecting another IP address from the list 58, such as the IP #6 58*f*, and then forwarding the request to the data server #1 22*a* using the IP #6 58*f* as the originating IP address source 16*d* as part of another 'Content Request' message 57*b*. In turn the data server #1 22*a* replies and sends the content in the 'Send Content' message 57*c* to the requesting DC proxy server 56, which in turn forward the fetched content to the asking client device #1 31*a* using another 'Send Content' message 57*d*. Hence, the client device #1 31*a* received the additional requested content in response to the sent 'Content Request' message 57*a*, however, the data server #1 22*a* is only aware of the IP #6 58*f* identity, and is not aware of the client device #1 31*a* identity (IP address). Further, the data server #1 22*a* receives the requests from two different IP addresses IP #3 58*c* and IP #6 58*f*, and is not aware that both requests were sent from the same originating device.

Typically, DC proxy servers are offered as a service by various corporations, and not by an ISP. When you visit a website, the web server will detect the credentials of the DC proxy instead of your actual information. DC proxy server services are typically a cheap, fast, and stable way to provide anonymity, and prevent blocking by a web server. Typical DC proxy server service provides high performance and bandwidth up 1000 MB/s speed, the proxy IP addresses used may be static or dynamically changed, and have a presence in multiple countries worldwide. Using DC proxies are typically used to hide user real identity or IP from the internet. Comparison of performance of various commercially available DC proxy server services (referred to as VPN services) is described in a test report of a test commissioned by AnchorFree and performed by AV-TEST GmbH (dated Jun. 15, 2018), entitled: "VPN Comparative Test", which is incorporated in its entirety for all purposes as if fully set forth herein. The report presents an evaluation assesses AnchorFree's Hotspot Shield Elite, Avast SecureLine, Avira Phantom VPN Pro, Cisco VPN, ExpressVPN, F-Secure FREEDOME VPN, KeepSolid's VPN Unlimited, London Trust Media's Private Internet Access, NordVPN, Pulse VPN, Symantec's Norton WiFi Privacy and Tunnel Bear. The evaluation was based on usability, privacy and security, performance, and functionality.

Random. Randomness is commonly implemented by using random numbers, defined as a sequence of numbers or symbols that lack any pattern and thus appear random and that are commonly generated by a random number generator. Randomness for security is also described in IETF RFC 1750 "Randomness Recommendations for Security" (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect, or other quantum phenomena. Alternatively, or in addition, the generation of the random numbers can be software based, using a processor executing an algorithm for generating pseudo-random numbers which approximate the properties of random numbers.

The term 'random' herein is intended to cover not only pure random, non-deterministically, and non-predicted generated signals, but also pseudo-random, deterministic signals such as the output of a shift-register arrangement provided with a feedback circuit as used to generate pseudo-random binary signals or as scramblers, and chaotic signals, and where a randomness factor may be used.

A digital random signal generator (known as a random number generator) wherein numbers in binary form replaces the analog voltage value output may be used for any randomness. One approach to random number generation is based on using linear feedback shift registers. An example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback" and in U.S. Pat. No. 7,145,933 to Szajnowski entitled: "Method and Apparatus for generating Random signals", which are incorporated in its entirety for all purposes as if fully set forth herein.

A digital random signal generator may be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein. The digital random signal generator can be hardware based, generating random numbers from a natural physical process or phenomenon, such as the thermal noise of a semiconductor which has no periodicity. Typically, such hardware random number generators are based on microscopic phenomena such as thermal noise, shot noise, nuclear decaying radiation, photoelectric effect or other quantum phenomena, and typically contain a transducer to convert some aspect of the physical phenomenon to an electrical signal, an amplifier and other electronic to bring the output into a signal that can be converted into a digital representation by an analog to digital converter. In the case where digitized serial random number signals are generated, the output is converted to parallel, such as 8 bits data, with 256 values of random numbers (values from 0 to 255). Alternatively or in addition, the digital random signal generator may be software (or firmware) based, such as pseudo-random number generators. Such generators include a processor for executing software that includes an algorithm for generating numbers, which approximates the properties of random numbers. The random signal generator (either analog or digital) may output a signal having uniform distribution, in which there is a substantially or purely equal probability of a signal falling between two defined limits, having no appearance outside these limits. However, Gaussian and other distribution may be equally used.

Internet censorship. Internet censorship is the control or suppression of what can be accessed, published, or viewed on the Internet enacted by regulators, or on their own initiative. Individuals and organizations may engage in self-censorship for moral, religious, or business reasons, to conform to societal norms, due to intimidation, or out of fear of legal or other consequences. The extent of the Internet censorship varies on a country-to-country basis. While most democratic countries have moderate Internet censorship, other countries go as far as to limit the access of information such as news and suppress discussion among citizens. The Internet censorship also occurs in response to or in anticipation of events such as elections, protests, and riots. An example is the increased censorship due to the events of the Arab Spring. Other types of censorship include the use of copyrights, defamation, harassment, and obscene material claims as a way to suppress content.

Blocking and filtering can be based on relatively static blacklists or be determined more dynamically based on a real-time examination of the information being exchanged. Blacklists may be produced manually or automatically and are often not available to non-customers of the blocking software. Blocking or filtering can be done at a centralized national level, at a decentralized sub-national level, or at an institutional level, for example in libraries, universities, or Internet cafes. Blocking and filtering may also vary within a country across different ISPs. Countries may filter sensitive content on an ongoing basis and/or introduce temporary filtering during key time periods such as elections. In some cases, the censoring authorities may surreptitiously block content to mislead the public into believing that censorship has not been applied. This is achieved by returning a fake "Not Found" error message when an attempt is made to access a blocked website.

Internet Protocol (IP) address blocking. Access to a certain IP address is denied. If the target Web site is hosted in a shared hosting server, all websites on the same server will be blocked. This affects IP-based protocols such as HTTP, FTP and POP. A typical circumvention method is to find proxies that have access to the target websites, but proxies may be jammed or blocked, and some Web sites, such as Wikipedia (when editing), also block proxies. Some large websites such as Google have allocated additional IP addresses to circumvent the block, but later the block was extended to cover the new addresses. Due to challenges with geolocation, geo-blocking is normally implemented via IP address blocking.

Domain Name System (DNS) filtering and redirection. Blocked domain names are not resolved, or an incorrect IP address is returned via DNS hijacking or other means. This affects all IP-based protocols such as HTTP, FTP and POP. A typical circumvention method is to find an alternative DNS resolver that resolves domain names correctly, but domain name servers are subject to blockage as well, especially IP address blocking. Another workaround is to bypass DNS if the IP address is obtainable from other sources and is not itself blocked. Examples are modifying the Hosts file or typing the IP address instead of the domain name as part of a URL given to a Web browser.

Uniform Resource Locator (URL) filtering. URL strings are scanned for target keywords regardless of the domain name specified in the URL. This affects the HTTP protocol. Typical circumvention methods are to use escaped characters in the URL, or to use encrypted protocols such as VPN and TLS/SSL.

Packet filtering. Terminate TCP packet transmissions when a certain number of controversial keywords are detected. This affects all TCP-based protocols such as HTTP, FTP and POP, but Search engine results pages are more likely to be censored. Typical circumvention methods are to use encrypted connections—such as VPN and TLS/SSL—to escape the HTML content, or by reducing the TCP/IP stack's MTU/MSS to reduce the amount of text contained in a given packet.

Connection reset. If a previous TCP connection is blocked by the filter, future connection attempts from both sides can also be blocked for some variable amount of time. Depending on the location of the block, other users or websites may also be blocked, if the communication is routed through the blocking location. A circumvention method is to ignore the reset packet sent by the firewall.

Network disconnection. A technically simpler method of Internet censorship is to completely cut off all routers, either by software or by hardware (turning off machines, pulling out cables). A circumvention method could be to use a satellite ISP to access the Internet.

Portal censorship and search result removal. Major portals, including search engines, may exclude web sites that they would ordinarily include. This renders a site invisible to people who do not know where to find it. When a major portal does this, it has a similar effect as censorship. Sometimes this exclusion is done to satisfy a legal or other requirement, other times it is purely at the discretion of the portal. For example, Google.de and Google.fr remove Neo-Nazi and other listings in compliance with German and French law.

Computer network attacks. Denial-of-service attacks and attacks that deface opposition websites can produce the same result as other blocking techniques, preventing or limiting access to certain websites or other online services, although only for a limited period of time. This technique might be used during the lead up to an election or some other sensitive period. It is more frequently used by non-state actors seeking to disrupt services.

Tunneling. Computer networks may use a tunneling protocol where one network protocol (the delivery protocol) encapsulates a different payload protocol. The tunneling enables the encapsulation of a packet from one type of protocol within the datagram of a different protocol. For example, VPN uses PPTP to encapsulate IP packets over a public network, such as the Internet. A VPN solution based on Point-to-Point Tunneling Protocol (PPTP), Layer Two Tunneling Protocol (L2TP), or Secure Socket Tunneling Protocol (SSTP) can be configured. By using the tunneling, a payload may be carried over an incompatible delivery-network, or provide a secure path through an untrusted network. Typically, the delivery protocol operates at an equal or higher OSI layer than does the payload protocol. In one example of a network layer over a network layer, Generic Routing Encapsulation (GRE), a protocol running over IP (IP Protocol Number 47), often serves to carry IP packets, with RFC 1918 private addresses, over the Internet using delivery packets with public IP addresses. In this case, the delivery and payload protocols are compatible, but the payload addresses are incompatible with those of the delivery network. In contrast, an IP payload might believe it sees a data link layer delivery when it is carried inside the Layer 2 Tunneling Protocol (L2TP), which appears to the payload mechanism as a protocol of the data link layer. L2TP, however, actually runs over the transport layer using User Datagram Protocol (UDP) over IP. The IP in the delivery protocol could run over any data-link protocol from IEEE 802.2 over IEEE 802.3 (i.e., standards-based Ethernet) to the Point-to-Point Protocol (PPP) over a dialup modem link.

Tunneling protocols may use data encryption to transport insecure payload protocols over a public network (such as the Internet), thereby providing VPN functionality. IPsec has an end-to-end Transport Mode, but can also operate in a tunneling mode through a trusted security gateway. HTTP tunneling is a technique by which communications performed using various network protocols are encapsulated using the HTTP protocol, the network protocols in question usually belong to the TCP/IP family of protocols. The HTTP protocol, therefore, acts as a wrapper for a channel that the network protocol being tunneled uses to communicate. An HTTP stream with its covert channel is termed an HTTP tunnel. The HTTP tunnel software consists of client-server HTTP tunneling applications that integrate with existing application software, permitting them to be used in conditions of restricted network connectivity including firewalled networks, networks behind proxy servers, and network address translation.

Virtual Private Networks (VPNs) are point-to-point connections across a private or public network, such as the Internet. The VPN client typically uses special TCP/IP-based protocols, called tunneling protocols, to make a virtual call to a virtual port on a VPN server. In a typical VPN deployment, a client initiates a virtual point-to-point connection to a remote access server over the Internet, then the remote access server answers the call, authenticates the caller, and transfers data between the VPN client and the organization's private network. To emulate a point-to-point link, data is encapsulated, or wrapped, with a header. The header provides routing information that enables the data to traverse the shared or public network to reach its endpoint. To emulate a private link, the data being sent is encrypted for confidentiality. Packets that are intercepted on the shared or public network are indecipherable without the encryption keys. The link in which the private data is encapsulated and encrypted is known as a VPN connection. Commonly two types of VPN connections are used, referred to as Remote Access VPN and Site-to-Site VPN. Popular VPN connections use PPTP, L2TP/IPsec, or SSTP protocols. The RFC 4026 provides 'Provider Provisioned Virtual Private Network (VPN) Terminology', and RFC 2547 provides a VPN method based on MPLS (Multiprotocol Label Switching) and BGP (Border Gateway Protocol).

PPTP is described in IETF RFC 2637 entitled: "Point-to-Point Tunneling Protocol (PPTP)", L2TP is described in IETF RFC 2661 entitled: "Layer Two Tunneling Protocol "L2TP"", which are both incorporated in their entirety for all purposes as if fully set forth herein. VPN and VPN uses are described in Cisco Systems, Inc. 2001 publication entitled: "IP Tunneling and VPNs", and in Cisco Systems, Inc. 2001 handbook 'Internetworking Technologies Handbook' [No. 1-58705-001-3] chapter 18 entitled: "Virtual Private Networks", and in IBM Corporation Redbook series publications entitled: "A Comprehensive Guide to Virtual Private Networks" including "Vol. I: IBM Firewall, Server and Client Solutions" [SG24-5201-00, June 1998], "Vol II: IBM Nways Router Solutions" [SG24-5234-01, November 1999], and "Vol III: Cross-Platform Key and Policy Management" [SG24-5309-00, November 1999], which are all incorporated in their entirety for all purposes as if fully set forth herein.

VPN and its uses are further described in the IETF RFC 4026 entitled: "Provider Provisioned Virtual Private Network (VPN) Terminology" that describes provider provisioned Virtual Private Network (VPN), in the IETF RFC 2764 entitled: "A Framework for IP Based Virtual Private Networks" that describes a framework for Virtual Private Networks (VPNs) running across IP backbones, in the IETF RFC 3931 entitled: "Layer Two Tunneling Protocol—Version 3 (L2TPv3)", and in the IETF RFC 2547 entitled: "BGP/MPLS VPNs" that provides a VPN method based on MPLS (Multiprotocol Label Switching) and BGP (Border Gateway Protocol), which are all incorporated in their entirety for all purposes as if fully set forth herein.

Remote access VPN connections enable users working at home or on the road to access a server on a private network using the infrastructure provided by a public network, such as the Internet. From the user's perspective, the VPN is a point-to-point connection between the computer (the VPN client) and an organization's server. The exact infrastructure of the shared or public network is irrelevant because it appears logically as if the data is sent over a dedicated private link.

Site-to-site VPN connections (also known as router-to-router VPN connections) enable organizations to have routed connections between separate offices or with other organizations over a public network while helping to maintain secure communications. A routed VPN connection across the Internet logically operates as a dedicated wide area network (WAN) link. When networks are connected over the Internet, a router forwards packets to another router across a VPN connection. To the routers, the VPN connection operates as a data-link layer link. A site-to-site VPN connection connects two portions of a private network. The VPN server provides a routed connection to the network to which the VPN server is attached. The calling router (the VPN client) authenticates itself to the answering router (the VPN server), and, for mutual authentication, the answering router authenticates itself to the calling router. In the site-to site VPN connection, the packets sent from either router across the VPN connection typically do not originate at the routers.

There is a growing widespread use of the Internet for carrying multimedia, such as a video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such as VoIP or other telephony services and video-conferencing are delay sensitive. In some cases, the delays induced by the encryption process, as well as the hardware/software costs associated with the encryption, render encryption as non-practical. Therefore, it is not easy to secure enough capacity of the Internet accessible by users to endure real-time communication applications such as Internet games, chatting, VOIP, and MoIP (Multimedia-over-IP), so there may be a data loss, delay or severe jitter in the course of communication due to the property of an Internet protocol, thereby causing inappropriate real-time video communication. The following chapters of the publication number 1-587005-001-3 by Cisco Systems, Inc. (July 1999), entitled: "Internetworking Technologies Handbook", relate to multimedia carried over the Internet, and are all incorporated in their entirety for all purposes as if fully set forth herein: Chapter 18: "Multiservice Access Technologies" (pages 18-1 to 18-10), and Chapter 19: "Voice/Data Integration Technologies" (pages 19-1 to 19-30).

VoIP systems in widespread use today fall into three groups: systems using the ITU-T H.323 protocol, systems using the SIP protocol, and systems that use proprietary protocols. H.323 is a standard for teleconferencing that was developed by the International Telecommunications Union (ITU). It supports full multimedia, audio, video, and data transmission between groups of two or more participants, and it is designed to support large networks. H.323 is network-independent: it can be used over networks using transport protocols other than TCP/IP. H.323 is still a very important protocol, but it has fallen out of use for consumer VoIP products due to the fact that it is difficult to make it work through firewalls that are designed to protect computers running many different applications. It is a system best suited to large organizations that possess the technical skills to overcome these problems.

Session Initiation Protocol (SIP) is an Internet Engineering Task Force (IETF) standard signaling protocol for teleconferencing, telephony, presence and event notification, and instant messaging. It provides a mechanism for setting up and managing connections, but not for transporting the audio or video data. It is probably now the most widely used protocol for managing Internet telephony. Similar to the IETF protocols, SIP is defined in a number of RFCs, principally RFC 3261. A SIP-based VOIP implementation may send the encoded voice data over the network in a number of ways. Most implementations use a Real-time Transport Protocol (RTP), which is defined in RFC 3550. Both SIP and RTP are implemented on UDP, which, as a connectionless protocol, can cause difficulties with certain types of routers and firewalls. Usable SIP phones therefore also need to use Simple Traversal of UDP over NAT (STUN), a protocol defined in RFC 3489 that allows a client behind a NAT router to find out its external IP address and the type of NAT device.

FIG. 2 shows an arrangement 20 of devices communicating over the Internet. Various devices such as a client #1 24*a*, a client #2 24*b*, a client #3 24*c*, a client #4 24*d*, and a client #5 24*e*, may communicate over the Internet 113 for obtaining data from a data server #1 22*a* and a data server #2 22*b*. It is noted that the terms 'Data Server' and 'Web server' are used herein interchangeably. In one example, the servers are HTTP servers, sometimes known as web servers. A method describing a more efficient communication over the Internet is described in U.S. Pat. No. 8,560,604 to Shribman et al., entitled: "System and Method for Providing Faster and More Efficient Data Communication" (hereinafter the "'604 patent"), which is incorporated in its entirety for all purposes as if fully set forth herein. The method described in the '604 patent uses an acceleration server 23 for managing the traffic in the network, as shown in FIG. 2. A splitting of a message or a content into slices, and transferring each of the slices over a distinct data path is described in U.S. Patent Application No. 2012/0166582 to Binder entitled: "System and Method for Routing-Based Internet Security", which is incorporated in its entirety for all purposes as if fully set forth herein.

The amount of data transferred in a given period in commonly referred to as 'bandwidth' (BW) or 'bit-rate', which is the number of bits that are conveyed or processed per unit of time. The bit rate is quantified using the bits per second unit (symbol bit/s or b/s), often in conjunction with an SI prefix such as kilo- (1 Kbit/s=1000 bit/s), mega- (1 Mbit/s=1000 Kbit/s), giga- (1 Gbit/s=1000 Mbit/s) or tera- (1 Tbit/s=1000 Gbit/s). The non-standard abbreviation bps is often used to replace the standard symbol bit/s, so that, for example, "1 Mbps" (or 1 Mb/s) is used to mean one million bits per second. One byte per second (1 B/s) corresponds to 8 bit/s.

Latency is typically defined as a time interval between the stimulation and the response, or, from a more general point of view, as a time delay between the cause and the effect of some physical change in the system being observed. Network-related latency, such as in a packet-switched network, is measured either one-way (the time from the source sending a packet to the destination receiving it), or Round-Trip delay Time (RTT), referring to the one-way latency from source to destination plus the one-way latency from the destination back to the source, plus any delays at the destination, such as processing or other delays. Round-trip latency can be measured from a single point. Latency limits total bandwidth in reliable two-way communication systems as described by the bandwidth-delay product, which refers to the product of a data link's capacity (in bits per second) and its end-to-end delay (in seconds). The result, an amount of data measured in bits (or bytes), is equivalent to the maximum amount of data on the network circuit at any given time, i.e., data that has been transmitted but not yet acknowledged. Sometimes it is calculated as the data link's capacity multiplied by its round trip time. A network with a large bandwidth-delay product is commonly known as a Long Fat Network (LFN). As defined in IETF RFC 1072, a network is considered an LFN if its bandwidth-delay product is significantly larger than 105 bits (12500 bytes).

The Round-trip Delay Time (RTD) or Round-Trip Time (RTT) is the length of time it takes for a signal to be sent and to be received and processed at the destination node, plus the length of time it takes for an acknowledgment of that signal to be received. This time delay, therefore, includes the propagation times between the two points of a signal. The signal is generally a data packet, and the RTT is also known as the ping time, and an internet user can determine the RTT by using the ping command. Network links with both a high bandwidth and a high RTT can have a very large amount of data (the bandwidth-delay product) "in flight" at any given time. Such "long fat pipes" require a special protocol design. One example is the TCP window scale option. The RTT was originally estimated in TCP by: $RTT=(\alpha\cdot Old\_RTT)+(1-\alpha)\cdot New\_Round\_Trip\_Sample$, where $\alpha$ is a constant weighting factor ($0\leq\alpha<1$). Choosing a value $\alpha$ close to 1 makes the weighted average immune to changes that last a short time (e.g., a single segment that encounters long delay). Choosing a value for $\alpha$ close to 0 makes the weighted average response to changes in delay very quickly. Once a new RTT is calculated, it is entered into the above equation to obtain an average RTT for that connection, and the procedure continues for every new calculation. The RTT may be measured as described in IETF 1323, and may be estimated by using a method described in IETF RFC 6323, which are both incorporated in their entirety for all purposes as if fully set forth herein.

An estimation of RTT for messages using TCP may use Karn's Algorithm, described by Karn Phil and Craig Partridge in ACM SIGCOMM '87—Computer Communication Review publication, entitled: "Improving Round-Trip Time Estimates in Reliable Transport Protocols", which is incorporated in its entirety for all purposes as if fully set forth herein. The round trip time is estimated as the difference between the time that a segment was sent and the time that its acknowledgment was returned to the sender, but when packets are re-transmitted there is an ambiguity: the acknowledgment may be a response to the first transmission of the segment or to a subsequent re-transmission. Karn's Algorithm ignores re-transmitted segments when updating the round-trip time estimate. Round trip time estimation is based only on unambiguous acknowledgments, which are acknowledgments for segments that were sent only once.

Many software platforms provide a service called 'ping' that can be used to measure round-trip latency. Ping performs no packet processing; it merely sends a response back when it receives a packet (i.e., performs a no-op), thus it is a first rough way of measuring latency. Ping operates by sending Internet Control Message Protocol (ICMP) echo requesting packets to the target host, and waiting for an ICMP response. During this process, it measures the time from transmission to reception (round-trip time) and records any packet loss. The results of the test are printed in a form of a statistical summary of the response packets received, including the minimum, maximum, and the mean round-trip times, and sometimes the standard deviation of the mean.

The Transmission Control Protocol/Internet Protocol (TCP/IP) suite normally used on the Internet has included an Internet Message Control Protocol (ICMP) that is commonly used in echo testing or ping and trace route applications. In general, the Internet standard 'ping' or 'ICMP echo' has a request/response format, wherein one device sends an ICMP echo request and another device responds to a received ICMP echo request with a transmitted ICMP echo response. Normally, IP devices are expected to implement the ICMP as part of the support for IP, to be able to use ICMP for testing. Internet RFC 792, entitled "Internet Control Message Protocol: DARPA Internet Program Protocol Specification", which is incorporated in its entirety for all purposes as if fully set forth herein, at least partially describes the behavior of ICMP. The ICMP echo message has a type field, a code field, a checksum field, an identifier field, a sequence number field, and a data field. According to RFC 79: "The data received in the echo message must be returned in the echo reply message". Thus, an RFC compliant ping responder, or an ICMP echo reply message responder, are supposed to copy the received data field in an echo request message directly into the data field of the transmitted echo response message.

A newer version of ICMP known as ICMP version 6 or ICMPv6 as described at least partially in RFCs 1885 and 2463, which are both entitled "Internet Control Message Protocol (ICMPv6) for the Internet Protocol Version 6 (IPv6) Specification", which are both incorporated in their entirety for all purposes as if fully set forth herein. According to RFC 2463, "Every [IPv6] node MUST implement an ICMPv6 Echo responder function that receives Echo Requests and sends corresponding Echo Replies. An IPV6 node SHOULD also implement an application-layer interface for sending Echo Requests and receiving Echo Replies, for diagnostic purposes.". Thus, responding to ICMP echo requests normally is a necessary function in supporting IPv4 and/or IPv6 standards. The ICMPv6 RFCs 1885 and 2464 goes on to specify that the data field of an ICMP echo response contains the "data from the invoking Echo Request message." Therefore, both ICMP and ICMP v6 associated with IPv4 and IPV6, respectively, specify that the data field in an ICMP echo reply message is to essentially contain a copy of the data received in the corresponding ICMP echo request message.

Moreover, the ICMP echo protocol is basically a two-way echo in which one initiating device and/or process starts the communication by transmitting an echo request message, which may be then received by an echo responder process. The echo responder process, generally located on another device, receives the echo request message and responds with an echo reply back to the initiating process. Once the initiating device and/or process receives the response or times out waiting on the response, the two-way echo exchange of messages is complete. Although the echo request and echo response normally are performed between processes on two different devices, one skilled in the art will be aware that a device can ping its own IP address implying that the echo request and echo responder reply processes are on the same device. In addition, the loopback address of network 127.0.0.0 in IPv4 can be used to allow a device to the loopback outbound echo request messages back into the device's own incoming echo request responder processes. IPv6 has a loopback functionality as well.

This copying of data exactly in the ICMP echo response is somewhat wasteful because the responder generally does not convey that much (if any) information back to the ICMP echo request initiating device. Arguably the initiating device could compute bit error rate (BER) statistics on the transmitted versus the received data field in ICMP echo packets. However, such physical layer issues as BER statistics normally are not as relevant for network layer IP datagrams that already include various error control code mechanisms. Arguably the device running the responding process can communicate information to the device running the initiating process by having the device running the original responding process initiate its own echo request and wait for an echo response from the original initiating device. Such a solution results in four packets, with a first echo request from a local device responded to by a first echo response from a remote device, and with a second echo request from the remote device responded to by a second echo response from the local device.

An identifier and/or sequence number in ping packets generally has allowed the ping to be used by a device to determine the round-trip delay from the time an ICMP echo request packet is sent to the time corresponding to when an associated received ICMP echo request is received back at an initiating device. Furthermore, ping packets generally convey little or no information about the type of the device that initiated the ping. Moreover, although IPv4 has Type of Service (ToS) fields in the IP datagram, these fields have become more important as the services used over the Internet and networks using Internet technology have grown from basic computer data communication to also include real-time applications such as voice and/or video. Various Type of Service (ToS) in IPv4 and IPV6 have been used in implementing various (Quality of Service) QoS characteristics that are defined for different classes of service and/or Service Level Agreements (SLAs).

SDK. As used herein, the term Software Development Kit (SDK) refers to a specific software package, software framework, hardware platform, or a set of development tools and the like at the time of the establishment of the operating system software. Typically, an SDK includes a programming package that enables a programmer to develop applications for a specific platform, and may include one or more APIs, programming tools, and documentation. It may be as simple as the implementation of one or more Application Programming Interfaces (APIs) in the form of some libraries to interface to a particular programming language or to include sophisticated hardware that can communicate with a particular embedded system. Common tools include debugging facilities and other utilities, often presented in an Integrated Development Environment (IDE). The SDKs also frequently include sample code and supporting technical notes or other supporting documentation to help clarify points made by the primary reference material. Some SDKs may have attached licenses that make them unsuitable for building software intended to be developed under an incompatible license. For example, a proprietary SDK will probably be incompatible with free software development, while a GPL-licensed SDK could be incompatible with proprietary software development. LGPL SDKs are typically safe for proprietary development.

A software engineer typically receives the SDK from the target system developer. Often the SDK can be downloaded directly via the Internet or via SDKs marketplaces. Many SDKs are provided for free to encourage developers to use the system or language. Sometimes this is used as a marketing tool. Freely offered SDKs may still be able to monetize, based on user data taken from the apps, which may serve the interests of big players in the ecosystem, for example the operating system. A SDK for an operating system add-on (for instance, QuickTime for classic Mac OS) may include the add-on software itself to be used for development purposes, albeit not necessarily for redistribution together with the developed product.

Heartbeat. A heartbeat is a periodic signal generated by hardware or software to indicate normal operation or to synchronize other parts of a system. Usually a heartbeat is sent between machines at a regular interval of an order of seconds. If a heartbeat is not received for a time—usually a few heartbeat intervals—the machine that should have sent the heartbeat is assumed to have failed. As used herein, a heartbeat is a periodic message, such as a 'ping', generated by devices connected to the Internet to indicate being 'online' (connected to the Internet) and normal operation, and if a heartbeat is not received for a time, the device is assumed to be 'offline' (not connected to the Internet). A heartbeat protocol is generally used to negotiate and monitor the availability of a resource, such as a floating IP address. Typically, when a heartbeat starts on a machine, it will perform an election process with other machines on the network to determine which machine, if any, owns the resource. The IETF RFC 6520 describes Heartbeat operation for the Transport Layer Security (TLS), and is incorporated in its entirety for all purposes as if fully set forth herein.

Users in the Internet may desire anonymity in order not to be identified as a publisher (sender), or reader (receiver), of information. Common reasons include censorship at the local, organizational, or national level, personal privacy preferences such as preventing tracking or data mining activities, the material or its distribution is considered illegal or incriminating by possible eavesdroppers, the material may be legal but socially deplored, embarrassing, or problematic in the individual's social world, and fear of retribution (against whistleblowers, unofficial leaks, and activists who do not believe in restrictions on information nor knowledge). Full anonymity on the Internet, however, is not guaranteed since IP addresses can be tracked, allowing to identify the computer from which a certain post was made, albeit not the actual user. Anonymizing services, such as I2P—'The Anonymous Network' or Tor, address the issue of IP tracking, as their distributed technology approach may grant a higher degree of security than centralized anonymizing services where a central point exists that could disclose one's identity. An anonymous web browsing refers to browsing the World Wide Web while hiding the user's IP address and any other personally identifiable information from the websites that one is visiting. There are many ways of accomplishing anonymous web browsing. Anonymous web browsing is generally useful to internet users who want to ensure that their sessions cannot be monitored. For instance, it is used to circumvent traffic monitoring by organizations that want to find out or control which web sites employees visit. Further, since some web-sites respond differently when approached from mobile devices, anonymity may allow for accessing such a web-site from a non-mobile device, posing as a mobile device.

WiFi. A device herein (such as the computer system 11) may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, a device may consist of, be part of, or include, a handheld PDA device, an on-board device, an off-board device, a hybrid device, a vehicular device, a non-vehicular device, a mobile device, or a portable device. A network herein (such as the LAN 14), may consist of, be part of, or include, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), or a Wireless PAN (WPAN). Alternatively or in addition, a network herein may be operating substantially in accordance with existing Institute of Electrical and Electronics Engineers (IEEE) IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device which incorporates a wireless communication device, or a mobile/portable Global Positioning System (GPS) device. The communication interface 29 may consist of, be part of, or include, a transceiver or modem for communication with the network, such as LAN 14. In the case of wired networks, the communication interface 29 connects to the network via a port 28 that may include a connector, and in the case of wireless network, the communication interface 29 connects to the network via the port 28 that may include an antenna.

The LAN 14 may be a Wireless LAN (WLAN) such as according to, or based on, Institute of Electrical and Electronics Engineers (IEEE) IEEE 802.11-2012, and the WLAN port may be a WLAN antenna and the WLAN transceiver may be a WLAN modem. The WLAN may be according to, or based on, IEEE 802.11a, IEEE 802.11b, IEEE 802.11g, IEEE 802.11n, or IEEE 802.11ac. Commonly referred to as Wireless Local Area Network (WLAN), such communication makes use of the Industrial, Scientific and Medical (ISM) frequency spectrum. In the US, three of the bands within the ISM spectrum are the A-Band, 902-928 MHZ; the B-Band, 2.4-2.484 GHZ (a.k.a. 2.4 GHZ); and the C-Band, 5.725-5.875 GHZ (a.k.a. 5 GHZ). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). The IEEE 802.11b standard describes a communication using the 2.4 GHz frequency band and supporting a communication rate of 11 Mb/s, IEEE 802.11a uses the 5 GHZ frequency band to carry 54 MB/s, and IEEE 802.11g uses the 2.4 GHz band to support 54 Mb/s. The WiFi technology is further described in a publication entitled: "WiFi Technology" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

Image/video. Any content herein may consist of, be part of, or include, an image or a video content. The video content may be in a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. A intraframe or interframe compression may be used, and the compression may a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

DHCP. The Dynamic Host Configuration Protocol (DHCP) is a standardized networking protocol used on Internet Protocol (IP) networks for dynamically distributing network configuration parameters, such as IP addresses for interfaces and services. With DHCP, network elements request IP addresses and networking parameters automatically from a DHCP server, reducing the need for a network administrator or a user to configure these settings manually.

DHCP is typically used by network elements for requesting Internet Protocol parameters, such as an IP address from a network server, and is based on the client-server model. When a network element connects to a network, its DHCP client software in the operating system sends a broadcast query requesting the necessary information. Any DHCP server on the network may service the request. The DHCP server manages a pool of IP addresses and information about client configuration parameters such as default gateway, domain name, the name servers, and time servers. On receiving a request, the server may respond with specific information for each client, as previously configured by an administrator, or with a specific address and any other information valid for the entire network, and the time period for which the allocation (lease) is valid. A host typically queries for this information immediately after booting, and periodically thereafter before the expiration of the information. When an assignment is refreshed by the client computer, it initially requests the same parameter values, and may be assigned a new address from the server, based on the assignment policies set by administrators.

Depending on the implementation, the DHCP server may have three methods of allocating IP-addresses: (a) Dynamic allocation, where a network administrator reserves a range of IP addresses for DHCP, and each client computer on the LAN is configured to request an IP address from the DHCP server during network initialization. The request-and-grant process uses a lease concept with a controllable time period, allowing the DHCP server to reclaim (and then reallocate) IP addresses that are not renewed. (b) Automatic allocation, where the DHCP server permanently assigns an IP address to a requesting client from the range defined by the administrator. This is similar to dynamic allocation, but the DHCP server keeps a table of past IP address assignments, so that it can preferentially assign to a client the same IP address that the client previously had. (c) Static allocation, where the DHCP server allocates an IP address based on a preconfigured mapping to each client's MAC address.

DHCP used for Internet Protocol version 4 (IPv4) is described in IETF RFC 2131, entitled "Dynamic Host Configuration Protocol", and DHCP for IPV6 is described IETF RFC 3315, entitled: "Dynamic Host Configuration Protocol for IPV6 (DHCPv6)", both incorporated in their entirety for all purposes as if fully set forth herein. While both versions serve the same purpose, the details of the protocol for IPV4 and IPV6 are sufficiently different that they may be considered separate protocols. For IPV6 operation, devices may alternatively use stateless address autoconfiguration. IPv4 hosts may also use link-local addressing to achieve operations restricted to the local network link.

A Dynamic Host Configuration Protocol version 4 (DHCPv4) server is the authoritative source of IP addresses that it has provided to DHCPv4 clients, and is described in IETF RFC 4388 entitled: "Dynamic Host Configuration Protocol (DHCP) Leasequery" published February 2006, which is incorporated in its entirety for all purposes as if fully set forth herein. Other processes and devices that already make use of DHCPv4 may need to access this information. The leasequery protocol provides these processes and devices a lightweight way to access IP address information.

The DHCP protocol employs a connectionless service model, using the User Datagram Protocol (UDP). It is implemented with two UDP port numbers for its operations, which are the same as for the BOOTP protocol. The UDP port number 67 is the destination port of a server, and the UDP port number 68 is used by the client. DHCP operations fall into four phases: Server discovery, IP lease offer, IP request, and IP lease acknowledgment. These stages are often abbreviated as DORA for discovery, offer, request, and acknowledgment. The DHCP protocol operation begins with clients broadcasting a request. If the client and server are on different subnets, a DHCP Helper or DHCP Relay Agent may be used. Clients requesting renewal of an existing lease may communicate directly via an UDP unicast, since the client already has an established IP address at that point.

Router. A router is a Layer-3 (IP) networking device which forwards data packets to the appropriate parts of a computer network or that forwards data packets between computer networks. Routers perform the traffic directing functions on the Internet. The router is typically connected to two or more data connection from different IP networks by using the Layer-3 (IP) network address information in the packet header to determine the ultimate destination, using information in its routing table or routing policy. The main purpose of a router is to connect multiple networks and forward packets destined either for directly attached networks or more remote networks. A router is considered a layer-3 device because its primary forwarding decision is based on the information in the layer-3 IP packet, specifically the destination IP address. When a router receives a packet, it searches its routing table to find the best match between the destination IP address of the packet and one of the addresses in the routing table. Once a match is found, the packet is encapsulated in the layer-2 data link frame for the outgoing interface indicated in the table entry. A router typically does not look into the packet payload, but only at the layer-3 addresses to make a forwarding decision, plus optionally other information in the header for hints on, for example, quality of service (QOS). For pure IP forwarding, a router is designed to minimize the state information associated with individual packets. Once a packet is forwarded, the router does not retain any historical information about the packet.

Commonly a router supports OSI Layer 3 (the Network Layer), but may also support bridging functionality at OSI Layer 2 (the Link Layer). The router commonly uses headers and forwarding tables to determine the best path for forwarding the data packets, and they also use protocols such as ICMP to communicate with each other and configure the best route between any two hosts. The router may also support NAT (Network Address Translation), allowing multiple devices to share a single IP address on the Internet. Internet connection sharing routers may also support an SPI firewall and may serve as a DHCP Server. The wireless router may also provide features relevant to wireless security such as WiFi Protected Access (WPA) and wireless MAC address filtering. Additionally, the wireless router may be configured for "invisible mode" so that the internal wireless network cannot be scanned by outside wireless clients.

The routing table itself can contain information derived from a variety of sources, such as a default or static routes that are configured manually, or dynamic entries from routing protocols where the router learns routes from other routers. A default route is one that is used to route all traffic whose destination does not otherwise appear in the routing table; it is common—even necessary—in small networks, such as a home or small business where the default route simply sends all non-local traffic to the Internet service provider. The default route can be manually configured (as a static route); learned by dynamic routing protocols; or be obtained by DHCP.

Gateway. The term 'gateway' is used herein to include, but not limited to, a network element (or node) that is equipped for interfacing between networks that uses different protocols. The gateway converts information, data or other communications from one protocol or format to another, and typically contains components such as protocol translators, impedance matching devices, rate converters, fault isolators, or signal translators, as necessary to provide networking interoperability. A gateway may be a router or a proxy server that routes between networks, and may operate at any network layer. In a network for an enterprise, a computer server acting as a gateway node is often also acting as a proxy server and a firewall server. A gateway is often associated with both a router, which knows where to direct a given packet of data that arrives at the gateway, and a switch, which furnishes the actual path in and out of the gateway for a given packet.

A subnet mask is a mask used to determine what subnet belongs to an IP address. An IP address has two components, the network address and the host address. For example, consider the IP address 150.215.017.009. Assuming this is part of a Class B network, the first two numbers (150.215) represent the Class B network address, and the second two numbers (017.009) identify a particular host on this network. A subnetting enables the network administrator to further divide the host part of the address into two or more subnets. In this case, a part of the host address is reserved to identify the particular subnet. On an IP network, clients should automatically send IP packets with a destination outside a given subnet mask to a network gateway. A subnet mask defines the IP range of a private network. For example, if a private network has a base IP address of 192.168.0.0 and has a subnet mask of 255.255.255.0, then any data going to an IP address outside of 192.168.0.X will be sent to that network gateway. While forwarding an IP packet to another network, the gateway might or might not perform Network Address Translation (NAT).

Residential Gateway. A residential gateway is a small consumer-grade gateway which bridges network access between connected local area network (LAN) hosts to a wide area network (WAN) (such as the Internet) via a modem, or directly connects to a WAN (as in EttH), while routing. The WAN is a larger computer network, generally operated by an Internet service provider. Multiple devices have been described as "residential gateways", such as Cable modem, DSL modem, FTTx modem, IP-DECT telephone (base station), Network switch, Smart home hub, TV/VOD Set-top box, Voice over Internet protocol (VOIP) analog telephone adapter, Wired router, Wireless access point, Wireless router, or certain combinations of the above. For example, the residential gateway and the related functionalities may be as described in U.S. Patent Application No. 2007/0112939 to Wilson et al., entitled: "System and Method for Home Automation", and in U.S. Pat. No. 7,213,061 to Hite et al., entitled: "Internet Control System and Method", which are both incorporated in their entirety for all purposes as if fully set forth herein. Further, a gateway may be according to, or based on, the white paper entitled: "Home Gateway" by Wipro Technologies, or may be according to, or based on, the Home Gateway Initiative (HGI) documents entitled: "Home Gateway Technical Requirements: Residential Profile", Version 1.0, HGI guideline paper entitled: "Remote Access" Version 1.01, and HGI document entitled: "Requirements for an energy efficient home gateway" HGI-RD009-R3, which are all incorporated in their entirety for all purposes as if fully set forth herein.

A modem (e.g., DSL modem, Cable modem) by itself provides none of the functions of a router. It merely allows ATM or PPP or PPPOE traffic to be transmitted across telephone lines, cable wires, optical fibers, wireless radio frequencies, or other physical layers. On the receiving end is another modem that re-converts the transmission format back into digital data packets. This allows network bridging using telephone, cable, optical, and radio connection methods. The modem also provides handshake protocols, so that the devices on each end of the connection are able to recognize each other. However, a modem generally provides few other network functions. It may also provide other functions such as Dynamic DNS, and converged "triple play" services such as TV and telephony.

A residential gateway typically provides configuration via a web interface, or app on mobile device, routing between the home network and the Internet, connectivity within the home network like a network switch, hub, or WLAN base station, network address translation (NAT), DHCP for IPV4 and IPv6, and firewall functions.

Firewall. Network firewalls are security devices used to stop or mitigate unauthorized access to private networks connected to the Internet, especially intranets. The only traffic allowed on the network is defined via firewall policies—any other traffic attempting to access the network is blocked. Network firewalls sit at the front line of a network, acting as a communications liaison between internal and external devices. A network firewall can be configured so that any data entering or exiting the network has to pass through it—it accomplishes this by examining each incoming message and rejecting those that fail to meet the defined security criteria. When properly configured, a firewall allows users to access any of the resources they need while simultaneously keeping out unwanted users, hackers, viruses, worms or other malicious programs trying to access the protected network.

As used herein, the term 'firewall' is a device that inspects network traffic passing through it, and may perform actions, such as denying or permitting passage of the traffic based on a set of rules. Firewalls may be implemented as stand-alone network devices or, in some cases, integrated with a single network device, such as a router or switch that performs other functions. For instance, a network switch may perform firewall related functions as well as switching functions. The firewall may be implemented using a hardware and/or software-based, and may include all necessary subsystems that may control incoming and outgoing network traffic based on an applied rule set. Further, the firewall may be used to establish a barrier between a trusted, secure internal network and another network, such as the Internet, that may not be secure and trusted. Firewalls exist both as software to run on general-purpose hardware and as a hardware appliance. Many hardware-based firewall environments also offer other functionalities to the internal network that the firewall environments protect.

Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for the purpose of locating computer services and devices worldwide. The DNS is described, for example, in the IETF RFC 3467 entitled: "Role of the Domain Name System (DNS)", in the IETF RFC 6195 entitled: "Domain Name System (DNS) IANA Considerations", and in the IETF RFC 1591 entitled: "Domain Name System Structure and Delegation", which are incorporated in their entirety for all purposes as if fully set forth herein.

Tunnel. As used herein, the term 'tunnel' includes an intermediary program which is acting as a blind relay between two connections. Once active, a tunnel is not considered a party to the HTTP communication, though the tunnel may have been initiated by an HTTP request. The tunnel ceases to exist when both ends of the relayed connections are closed.

Proxy. As used herein, the term 'proxy' includes an intermediary program which acts as both a server and a client for the purpose of making requests on behalf of other clients. Requests are serviced internally or by passing them on, with possible translation, to other servers. The proxy MUST implement both the client and server requirements of this specification. A "transparent proxy" is a proxy that does not modify the request or response beyond what is required for proxy authentication and identification. A "non-transparent proxy" is a proxy that modifies the request or response in order to provide some added service to the user agent, such as group annotation services, media type transformation, protocol reduction, or anonymity filtering. Except where either transparent or non-transparent behavior is explicitly stated, HTTP proxy requirements apply to both types of proxies, and is described in IETF RFC 2616, entitled: "Hypertext Transfer Protocol—HTTP/1.1".

HTTP tunneling. HTTP tunneling is a technique by which communications performed using various network protocols are encapsulated using the HTTP protocol, the network protocols in question usually belong to the TCP/IP family of protocols. The HTTP protocol therefore acts as a wrapper for a channel that the network protocol being tunneled uses to communicate. The HTTP stream with its covert channel is termed an HTTP tunnel, and an HTTP tunnel software consists of client-server HTTP tunneling applications that integrate with existing application software, permitting them to be used in conditions of restricted network connectivity including firewalled networks, networks behind proxy servers, and network address translation.

The HTTP tunnel is used most often as a means for communication from network locations with restricted connectivity—most often behind NATs, firewalls, or proxy servers, and most often with applications that lack native support for communication in such conditions of restricted connectivity. Restricted connectivity in the form of blocked TCP/IP ports, blocking traffic initiated from outside the network, or blocking of all network protocols except a few is a commonly used method to lock down a network to secure it against internal and external threats.

HTTP CONNECT tunneling. A variation of HTTP tunneling when behind an HTTP proxy server is to use the "CONNECT" HTTP method. In this mechanism, the client asks an HTTP proxy server to forward the TCP connection to the desired destination. The server then proceeds to make the connection on behalf of the client. Once the connection has been established by the server, the proxy server continues to proxy the TCP stream to and from the client. Note that only the initial connection request is HTTP—after that, the server simply proxies the established TCP connection. This mechanism is how a client behind an HTTP proxy can access websites using SSL or TLS (i.e., HTTPS). Not all HTTP proxy servers support this feature, and even those that do may limit the behavior (for example only allowing connections to the default HTTPS port 443, or blocking traffic which doesn't appear to be SSL).

HTTP tunneling without using CONNECT. In some networks, the use of CONNECT method is restricted to some trusted sites. In such cases, an HTTP tunnel can still be implemented using only the usual HTTP methods as POST, GET, PUT and DELETE. This is similar to the approach used in Bidirectional-streams Over Synchronous HTTP (BOSH). In this proof-of-concept program, the server runs outside the protected network and acts as a special HTTP server. The client program is run on a computer inside the protected network. Whenever any network traffic is passed from the client, the client repackages the traffic data as an HTTP request and relays the data to the outside server, which extracts and executes the original network request for the client. The response to the request, sent to the server, is then repackaged as an HTTP response and relayed back to the client. Since all traffic is encapsulated inside normal GET and POST requests and responses, this approach works through most proxies and firewalls.

SOCKS. Socket Secure (SOCKS) is an Internet protocol that performs at Layer 5 of the OSI model (the session layer, an intermediate layer between the presentation layer and the transport layer) that exchanges network packets between a client and server through a proxy server. SOCKS5 additionally provides authentication so only authorized users may access a server. Practically, a SOCKS server proxies TCP connections to an arbitrary IP address, and provides a means for UDP packets to be forwarded. SOCKS server accepts incoming client connection on TCP port 1080. SOCKS is a de facto standard for circuit-level gateways, and is also used as a circumvention tool, allowing traffic to bypass Internet filtering to access content otherwise blocked, e.g., by governments, workplaces, schools, and country-specific web services. Client software must have native SOCKS support in order to connect through SOCKS.

Further, the SOCKS protocol provides a framework for client-server applications in both the TCP and UDP domains to conveniently and securely use the services of a network firewall. The protocol is conceptually a "shim-layer" between the application layer and the transport layer, and as such does not provide network-layer gateway services, such as forwarding of ICMP messages. The SOCKS protocol typically relays TCP sessions at a firewall host to allow application users transparent access across the firewall. Because the protocol is independent of application protocols, it can be (and has been) used for many different services, such as telnet, ftp, finger, whois, gopher, WWW, etc. Access control can be applied at the beginning of each TCP session; thereafter the server simply relays the data between the client and the application server, incurring minimum processing overhead. Since SOCKS never has to know anything about the application protocol, it should also be easy for it to accommodate applications which use encryption to protect their traffic from nosey snoopers.

SOCKS operates at a lower level than HTTP proxying: SOCKS uses a handshake protocol to inform the proxy software about the connection that the client is trying to make, and then acts as transparently as possible, whereas a regular proxy may interpret and rewrite headers (say, to employ another underlying protocol, such as FTP; however, an HTTP proxy simply forwards an HTTP request to the desired HTTP server). Though HTTP proxying has a different usage model in mind, the CONNECT method allows for forwarding TCP connections; however, SOCKS proxies can also forward UDP traffic and work in reverse, while HTTP proxies cannot. HTTP proxies are traditionally more aware of the HTTP protocol, performing higher-level filtering (though that usually only applies to GET and POST methods, not the CONNECT method). SOCKS4a extends the SOCKS4 protocol to allow a client to specify a destination domain name rather than an IP address; this is useful when the client itself cannot resolve the destination host's domain name to an IP address.

The SOCKS5 protocol is defined in RFC 1928 dated March 1996 and entitled: "SOCKS Protocol Version 5", which is incorporated in its entirety for all purposes as if fully set forth herein. It is an extension of the SOCKS4 protocol; it offers more choices for authentication and adds support for IPV6 and UDP, the latter of which can be used for DNS lookups. The protocol specification for SOCKS Version 5 RFC 1929 dated March 1996 and entitled: "Username/Password Authentication for SOCKS V5", which is incorporated in its entirety for all purposes as if fully set forth herein, specifies a generalized framework for the use of arbitrary authentication protocols in the initial SOCKS connection setup, and describes one of those protocols, as it fits into the SOCKS Version 5. RFC 1961 dated June 1996 entitled: "GSS-API Authentication Method for SOCKS Version 5", which is incorporated in its entirety for all purposes as if fully set forth herein, provides the specification for the SOCKS V5 GSS-API authentication protocol, and defines a GSS-API-based encapsulation for provision of integrity, authentication, and optional confidentiality. RFC 3089 dated April 2001 entitled: "A SOCKS-based IPV6/IPV4 Gateway Mechanism", which is incorporated in its entirety for all purposes as if fully set forth herein, describes a SOCKS-based IPv6/IPV4 gateway mechanism that enables smooth heterogeneous communications between the IPV6 nodes and IPv4 nodes.

WebSocket. WebSocket is a computer communications protocol, providing full-duplex communication channels over a single TCP connection. The WebSocket Protocol enables two-way communication between a client that runs untrusted code in a controlled environment to a remote host that has opted-in to communications from that code. The security model used for this is the origin-based security model commonly used by web browsers. The protocol consists of an opening handshake followed by basic message framing, layered over TCP. The goal of this technology is to provide a mechanism for browser-based applications that need two-way communication with servers that do not rely on opening multiple HTTP connections (e.g., using XMLHttpRequest or <iframe>s and long polling). The WebSocket protocol is defined in RFC6455 dated December 2011 and entitled: "The WebSocket Protocol", which is incorporated in its entirety for all purposes as if fully set forth herein.

While both WebSocket and HTTP protocols are located at layer 7 in the OSI model and, as such, depend on TCP at layer 4, and while WebSocket is designed to work over HTTP ports 80 and 443 as well as to support HTTP proxies and intermediaries, the protocols are different. Unlike HTTP, WebSocket provides full-duplex communication, and in addition, WebSocket enables streams of messages on top of TCP. TCP alone deals with streams of bytes with no inherent concept of a message. To achieve compatibility, the WebSocket handshake uses the HTTP Upgrade header to change from the HTTP protocol to the WebSocket protocol. The WebSocket protocol enables interaction between a web client (e.g., a browser) and a web server with lower overheads, facilitating real-time data transfer from and to the server. This is made possible by providing a standardized way for the server to send content to the client without being first requested by the client, and allowing for messages to be passed back and forth while keeping the connection open. In this way, a two-way (bi-directional) ongoing conversation can take place between the client and the server. The communications are done over TCP port number 80 (or 443 in the case of TLS-encrypted connections), which is of benefit for those environments which block non-web Internet connections using a firewall.

The WebSocket protocol specification defines ws (or WS) (WebSocket) and wss (or WSS) (WebSocket Secure) as two new Uniform Resource Identifier (URI) schemes that are used for unencrypted and encrypted connections, respectively. Apart from the scheme name and fragment (# is not supported), the rest of the URI components are defined to use URI generic syntax. Using browser developer tools, developers can inspect the WebSocket handshake as well as the WebSocket frames. WebSocket protocol client implementations try to detect if the user agent is configured to use a proxy when connecting to the destination host and port and, if it is, uses the HTTP CONNECT method to set up a persistent tunnel.

While the WebSocket protocol itself is unaware of proxy servers and firewalls, it features an HTTP-compatible handshake thus allowing HTTP servers to share their default HTTP and HTTPS ports (80 and 443) with a WebSocket gateway or server. The WebSocket protocol defines a ws:// and wss:// prefix to indicate the WebSocket and the WebSocket Secure connection, respectively. Both schemes use an HTTP upgrade mechanism to upgrade to the WebSocket protocol. Some proxy servers are transparent and work fine with WebSocket; others will prevent WebSocket from working correctly, causing the connection to fail. In some cases, additional proxy server configuration may be required, and certain proxy servers may need to be upgraded to support WebSocket. If unencrypted WebSocket traffic flows through an explicit or a transparent proxy server without WebSockets support, the connection will likely fail.

Further, if an encrypted WebSocket connection is used, then the use of Transport Layer Security (TLS) in the WebSocket Secure connection ensures that the HTTP CONNECT command is issued when the browser is configured to use an explicit proxy server. This sets up a tunnel, which provides low-level end-to-end TCP communication through the HTTP proxy, between the WebSocket Secure client and the WebSocket server. In the case of transparent proxy servers, the browser is unaware of the proxy server, so no HTTP CONNECT is sent. However, since the wire traffic is encrypted, intermediate transparent proxy servers may simply allow the encrypted traffic through, so there is a much better chance that the WebSocket connection will succeed if WebSocket Secure is used.

Firewall. As used herein, the term 'firewall' is a device that inspects network traffic passing through it, and may perform actions, such as denying or permitting passage of the traffic based on a set of rules. Firewalls may be implemented as stand-alone network devices or, in some cases, integrated in a single network device, such as a router or switch that performs other functions. For instance, a network switch may perform firewall related functions as well as switching functions. A firewall may be implemented using a hardware and/or software-based, and may include all necessary subsystems that may control incoming and outgoing network traffic based on an applied rule set. A firewall may be used to establish a barrier between a trusted, secure internal network and another network, such as the Internet, that may not be secure and trusted. Firewalls exist both as software to run on general purpose hardware and as a hardware appliance. Many hardware-based firewall environments also offer other functionalities to the internal network that the firewall environments protect.

NAT Traversal. Network Address Translator (NAT) traversal is a networking technique of establishing and maintaining Internet protocol connections across gateways that implement network address translation (NAT). The NAT traversal techniques are required for many network applications, such as peer-to-peer file sharing and Voice over IP. NAT devices are commonly used to alleviate IPv4 address exhaustion by allowing the use of private IP addresses on private networks behind routers with a single public IP address facing the public Internet. The internal network devices communicate with hosts on the external network by changing the source address of outgoing requests to that of the NAT device and relaying replies back to the originating device. Common NAT traversal techniques usually bypass enterprise security policies. Enterprise security experts prefer techniques that explicitly cooperate with NAT and firewalls, allowing NAT traversal while still enabling marshalling at the NAT to enforce enterprise security policies. IETF standards based on this security model are Realm-Specific IP (RSIP) and middlebox communications (MIDCOM).

Various NAT traversal techniques are available, such as WebSocket (ws) or WebSocket Secure (wss), Socket Secure (SOCKS) that uses proxy servers to relay traffic between networks or systems, Traversal Using Relays around NAT (TURN) that is a relay protocol designed specifically for NAT traversal, NAT hole punching is a general technique that exploits how NATs handle some protocols (for example UDP, TCP, or ICMP) to allow previously blocked packets through the NAT, Session Traversal Utilities for NAT (STUN) is a standardized set of methods and a network protocol for NAT hole punching. It was designed for UDP but was also extended to TCP, Interactive Connectivity Establishment (ICE) is a complete protocol for using STUN and/or TURN to do NAT traversal while picking the best network route available, UPnP Internet Gateway Device Protocol (IGDP) is supported by many small NAT gateways in home or small office settings. It allows a device on a network to ask the router to open a port, NAT-PMP is a protocol introduced by Apple as an alternative to IGDP, PCP is a successor of NAT-PMP, and Application-Level Gateway (ALG) is a component of a firewall or NAT that allows for configuring NAT traversal filters.

IPsec virtual private network clients use NAT traversal in order to have Encapsulating Security Payload packets traverse NAT. IPsec uses several protocols in its operation which must be enabled to traverse firewalls and network address translators: Internet Key Exchange (IKE)—User Datagram Protocol (UDP) port 500, Encapsulating Security Payload (ESP)—IP protocol number 50, Authentication Header (AH)—IP protocol number 51, and IPsec NAT traversal—UDP port 4500, when NAT traversal is in use. Many routers provide explicit features, often called 'IPsec Passthrough'. NAT traversal and IPsec may be used to enable opportunistic encryption of traffic between systems. NAT traversal allows systems behind NATs to request and establish secure connections on demand.

NAT Traversal techniques, method, utilities and uses are described in the IETF RFC 2663 (dated August 1999) entitled: "IP Network Address Translator (NAT) Terminology and Considerations", in the IETF RFC 3715 (dated March 2004) entitled: "IPsec-Network Address Translation (NAT) Compatibility Requirements", in the IETF RFC 3947 (dated January 2005) entitled: "Negotiation of NAT-Traversal in the IKE", in the IETF RFC 5128 (dated March 2008) entitled: "State of Peer-to-Peer (P2P) Communication across Network Address Translators (NATs)", in the IETF RFC 5245 (dated April 2010) entitled: "Interactive Connectivity Establishment (ICE): A Protocol for Network Address Translator (NAT) Traversal for Offer/Answer Protocols", in the IETF RFC 5389 (dated October 2008) entitled: "Session Traversal Utilities for NAT (STUN)", and in the IETF RFC 7350 (dated August 2014) entitled: "Datagram Transport Layer Security (DTLS) as Transport for Session Traversal Utilities for NAT (STUN)", which are all incorporated in their entirety for all purposes as if fully set forth herein. One of the simplest but most robust and practical NAT traversal techniques, commonly known as "hole punching", is described in a paper by Bryan Ford (of Massachusetts Institute of Technology), Pyda Srisuresh (of Caymas Systems, Inc.) and Dan Kegel published 2008 and entitled: "Peer-to-Peer Communication Across Network Address Translators", which is incorporated in its entirety for all purposes as if fully set forth herein. The paper documents and analyzes Hole punching for UDP communication, and how it can be reliably used to set up peer-to-peer TCP streams as well. NAT traversal techniques in P2P networks are described in a paper dated January 2008 by Huynh Cong Phuoc, Ray Hunt, and Andrew Mckenzie (all of University of Canterbury, Chistchurch, New Zealand) entitled: "NAT Traversal Techniques in Peer-to-Peer Networks", which is incorporated in its entirety for all purposes as if fully set forth herein. Initially Network Address Translation (NAT) detection is categorized and both UDP and TCP traversal techniques are discussed. Methodologies such as Relaying, Connection Reversal, and Hole Punching are then analyzed. Finally the development of a testbed is described which can be used to evaluate NAT traversal techniques and to determine appropriate configurations in order to achieve P2P networking.

Multihoming. Multihoming refers to the practice of connecting a host or a computer network to more than one network, in order to increase reliability or performance, or to reduce cost. While a typical host or end-user network is connected to just one network, in many circumstances it can be useful to connect a host or network to multiple networks, in order to increase reliability (if a single link fails, packets can still be routed through the remaining networks), to improve performance (depending on the destination, it may be more efficient to route through one network or the other) and to decrease cost (depending on the destination, it may be cheaper to route through one network or the other).

There are several different ways to perform the multihoming. In host multihoming, a single host may be connected to multiple networks. For example, a mobile phone might be simultaneously connected to a WiFi network and a 3G network, and a desktop computer might be connected to both a home network and a VPN. The multihomed host usually is assigned multiple addresses, one per connected network. In classical multihoming, a network is connected to multiple providers, and uses its own range of addresses (typically from a Provider Independent (PI) range). The network's edge routers communicate with the providers using a dynamic routing protocol, typically BGP, which announces the network's address range to all providers. If one of the links fail, the dynamic routing protocol recognizes the failure within seconds or minutes, and reconfigures its routing tables to use the remaining links, transparently to the hosts. Classical multihoming is costly, since it requires the use of address space that is accepted by all providers, a public Autonomous System (AS) number, and a dynamic routing protocol. Since multihomed address space cannot be aggregated, it causes the growth of the global routing table. In the multihoming with multiple addresses approach, the network is connected to multiple providers, and assigned multiple address ranges, one for each provider. Hosts are assigned multiple addresses, one for each provider. Multihoming with multiple addresses is cheaper than classical multihoming, and can be used without any cooperation from the providers (e.g., in a home network) but requires additional technology in order to perform routing: for incoming traffic, hosts must be associated with multiple A or AAAA DNS records so that they are reachable through all providers; and for outgoing traffic, a technique such as source-specific routing must be used to route packets through the correct provider, and reasonable source address selection policies must be implemented by hosts. Classical multihoming is the dominant technique for IPV4, and requires that a network have its own public IP address range and a public Autonomous System (AS) number. It is also possible to implement multihoming for IPV4 using multiple NAT gateways.

Both classical multihoming and multihoming with multiple addresses may be used in IPv6. When using classical multihoming, the Provider Independent Address Space (PI) that is available in IPV6 may be used. This technique has the advantage of working like IPv4, supporting traffic balancing across multiple providers, and maintaining existing TCP and UDP sessions through cut-overs. Multihoming with multiple addresses may be implemented for IPV6, where for outgoing traffic, the host uses either protocol agnostic (Multipath TCP, SCTP, etc.) or IPv6 specific (e.g. SHIM6). The functional requirements and possible solutions for multihoming without the use of NAT in IPv6 for hosts and small IPv6 networks are described in the IETF RFC 7157 (dated March 2014) entitled: "IPv6 Multihoming without Network Address Translation", which is incorporated in its entirety for all purposes as if fully set forth herein.

DNS. Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for the purpose of locating computer services and devices worldwide. The DNS is described, for example, in the IETF RFC 3467 entitled: "Role of the Domain Name System (DNS)", in the IETF RFC 6195 entitled: "Domain Name System (DNS) IANA Considerations", and in the IETF RFC 1591 entitled: "Domain Name System Structure and Delegation", which are incorporated in their entirety for all purposes as if fully set forth herein.

A system for resolving Domain Name System (DNS) queries that contains a communication device for resolving DNS queries, wherein the communication device further contains a memory and a processor that is configured by the memory, a cache storage for use by the communication device, and a network of authoritative domain name servers, where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to, is described in U.S. Pat. No. 8,671,221 to Shribman et al. entitled: "Method and System for Increasing Speed of Domain Name System Resolution within a Computing Device", which is incorporated in its entirety for all purposes as if fully set forth herein.

Systems and methods of storing previously transmitted data and using it to reduce bandwidth usage and accelerate future communications, and using algorithms to identify long compression history matches. A network device that may improve compression efficiency and speed is described in U.S. Pat. No. 7,865,585 to Samuels et al., entitled: "Systems and Methods for Providing Dynamic Ad Hok Proxy-Cache Hierarchies", which is incorporated in its entirety for all purposes as if fully set forth herein. Further, a method and system for accelerating the receipt of data in a client-to-client network described in U.S. Pat. No. 7,203,741 to Marco et al., entitled: "Method and System for Accelerating Receipt of Data in a Client-to-Client Network", which is incorporated in its entirety for all purposes as if fully set forth herein.

Wireless. Any embodiment herein may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing Institute of Electrical and Electronics Engineers (IEEE) IEEE 802.11, 802.11a, 802.11b, 802.11g, 802.11k, 802.11n, 802.11r, 802.16, 802.16d, 802.16c, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "Wireless Technologies" of the publication number 1-587005-001-3 by Cisco Systems, Inc. (July 1999) entitled: "Internetworking Technologies Handbook", which is incorporated in its entirety for all purposes as if fully set forth herein. Wireless technologies and networks are further described in a book published 2005 by Pearson Education, Inc. William Stallings [ISBN: 0-13-191835-4] entitled: "Wireless Communications and Networks—second Edition", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during the reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

ZigBee. ZigBee is a standard for a suite of high-level communication protocols using small, low-power digital radios based on an IEEE 802 standard for Personal Area Network (PAN). The applications include wireless light switches, electrical meters with in-home-displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. The ZigBee standard defines a rate of 250 Kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include the keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus an average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device and forms the root of the network tree and might bridge to other networks. There is exactly one defined ZigBee coordinator in each network, since it is the device that started the network originally. It is able to store information about the network, including acting as the Trust Center & repository for security keys. ZigBee Router (ZR) may be running an application function as well as may be acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirements, may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems, and household appliances. Z-Wave communicates using a low-power wireless technology designed specifically for remote control applications. Z-Wave operates in the sub-gigahertz frequency range, around 900 MHZ. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms, and security sensors.

Z-Wave is a mesh networking technology where each node or device on the network is capable of sending and receiving control commands through walls or floors, and use intermediate nodes to route around household obstacles or radio dead spots that might occur in the home. The Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHZ ISM band: 908.42 MHZ (United States); 868.42 MHz (Europe); 919.82 MHZ (Hong Kong); and 921.42 MHZ (Australia/New Zealand).

Z-Wave uses a source-routed mesh network topology and has one or more master controllers that control routing and security. The devices can communicate to one another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific, and Medical (ISM) frequency spectrum. In the US, three of the bands within the ISM spectrum are the A band, 902-928 MHZ; the B band, 2.4-2.484 GHZ (a.k.a. 2.4 GHZ); and the C band, 5.725-5.875 GHZ (a.k.a. 5 GHZ). Overlapping and/or similar bands are used in different regions such as Europe and Japan. In order to allow interoperability between equipment manufactured by different vendors, few WLAN standards have evolved, as part of the IEEE 802.11 standard group, branded as WiFi (or Wi-Fi) (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "WiFi Technology" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHZ) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHZ (single channel wide) frequency band signal. The signal is then up converted to the 2.4 GHZ (RF) and placed in the center frequency of the required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. The Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. The authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

Bluetooth. Bluetooth is a wireless technology standard for exchanging data over short distances (using short-wavelength UHF radio waves in the ISM band from 2.4 to 2.485 GHZ) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHZ including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 μs intervals. Two clock ticks make up a slot of 625 μs, and two slots make up a slot pair of 1250 μs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: "Master Table of Contents & Compliance Requirements—Specification Volume 0", and in an article published 2012 in Sensors [ISSN 1424-8220] by Carles Gomez et al. [*Sensors* 2012, 12, 11734-11753; doi: 10.3390/s120211734] entitled: "*Overview and Evaluation of Bluetooth Low Energy: An Emerging Low-Power Wireless Technology*", which are both incorporated in their entirety for all purposes as if fully set forth herein.

Bluetooth Smart technology operates in the same spectrum range (the 2.400 GHZ-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

Cellular. Cellular telephone network may be compatible with, may comprise, may be part of, or may be based on, a Third Generation (3G) network that uses UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

Electronic circuits and components are described in a book by Wikipedia entitled: "Electronics" downloaded from en.wikibooks.org dated Mar. 15, 2015, and in a book authored by Owen Bishop entitled: "Electronics—Circuits and Systems" Fourth Edition, published 2011 by Elsevier Ltd. [ISBN-978-0-08-096634-2], which are both incorporated in its entirety for all purposes as if fully set forth herein Appliance. Home appliances are electrical and mechanical devices using technology for household use, such as food handling, cleaning, clothes handling, or environmental control. Appliances are commonly used in household, institutional, commercial or industrial setting, for accomplishing routine housekeeping tasks, and are typically electrically powered. The appliance may be a major appliance, also known as "White Goods", which is commonly large, difficult to move, and generally to some extent fixed in place (usually on the floor or mounted on a wall or ceiling), and is electrically powered from the AC power (mains) grid. Non-limiting examples of major appliances are washing machines, clothes dryers, dehumidifiers, conventional ovens, stoves, refrigerators, freezers, air-conditioners, trash compactors, furnaces, dishwasher, water heaters, microwave ovens, and induction cookers. The appliance may be a small appliance, also known as "Brown Goods", which is commonly a small home appliance that is portable or semi-portable, and is typically a tabletop or a countertop type. Examples of small appliances are television sets, CD and DVD players, HiFi and home cinema systems, telephone sets and answering machines, and beverage making devices such as coffee-makers and iced-tea makers.

Some appliances' main function is food storage, commonly refrigeration related appliances such as refrigerators and freezers. Other appliances' main function is food preparation, such as conventional ovens (stoves) or microwave ovens, electric mixers, food processors, and electric food blenders, as well as beverage makers such as coffee-makers and iced-tea makers. Few food-related appliances, commonly found in a home kitchen, are illustrated in FIG. 4, showing a dishwasher 41, a food processor 42, a refrigerator 43, an oven 44, a mixer 45, and a microwave oven 46. Some appliances' main function relates to cleaning, such as clothes cleaning. Clothes cleaning appliances examples are washing/laundry machines and clothes dryers. A vacuum cleaner is an appliance used to suck up dust and dirt, usually from floors and other surfaces. Few cleaning-related appliances are illustrated in FIG. 4*a*, showing a vacuum cleaner 47, a cloth dryer 48, and a washing machine 49, as well as a still digital camera 51 and a digital video camera 52. Some appliances' main function relates to temperature control, such as heating and cooling. Air conditioners and heaters, as well as HVAC (Heating, Ventilation and Air Conditioning) systems, are commonly used for climate control, usually for thermal comfort for occupants of buildings or other enclosures. Similarly, water heaters are used for heating water.

Building automation. Building automation is the automatic centralized control of a building's system, such as a HVAC (Heating, Ventilation and Air Conditioning), electrical, lighting, shading, access control, security system, and any other interrelated systems through a Building Management System (BMS) or a Building Automation System (BAS). The objectives of building automation are improved occupant comfort, efficient operation of building systems, reduction in energy consumption, reduced operating and maintaining costs, increased security, historical performance documentation, remote access/control/operation, and improved life cycle of equipment and related utilities. Building automation is an example of a distributed control system—the computer networking of electronic devices designed to monitor and control the systems in a building. BAS core functionality keeps building climate within a specified range, provides light to rooms based on an occupancy schedule (in the absence of overt switches to the contrary), monitors performance and device failures in all systems, provides malfunction alarms to building maintenance staff, or any combination thereof. A BAS should reduce building energy and maintenance costs compared to a non-controlled building, and may further support diverse purposes, such as quality of service and failover to appropriately support human health and safety. Accordingly, commercial, industrial, military, and other institutional users use systems that differ from home systems mostly in scale.

Home automation. Home automation (or domotics) refers to is building automation for a home, called a 'smart home' or 'smart house'. A home automation system typically monitors and/or control home attributes such as lighting, climate, entertainment systems, and appliances, and may further include home security, such as access control and alarm systems. When connected with the Internet, home devices are an important constituent of the Internet of Things ("IoT"). A home automation system typically connects controlled devices to a central smart home hub (sometimes called a "gateway"). The user interface for control of the system uses either wall-mounted terminals, tablet, or desktop computers, a mobile phone application, or a Web interface that may also be accessible off-site through the Internet.

Home automation is prevalent in a variety of different realms, such as Heating, Ventilation and Air Conditioning (HVAC), for providing remote control of all home energy and monitoring over the Internet by a simple and friendly user interface; Lighting control system that incorporates communication between various lighting system inputs and outputs, using one or more central computing devices; Occupancy-aware control system, used for sensing the occupancy of the home using smart meters; environmental sensors like CO2 sensors that can be integrated into the building automation system to trigger automatic responses for energy efficiency and building comfort applications; and home robots and security that can provide additional services such as remote surveillance of security cameras over the Internet, or access control and central locking of all perimeter doors and windows. Other devices, applications or services may be part of a home automation, and may include leak detection, using smoke and CO detectors, laundry-folding machine, self-making bed, Indoor Positioning Systems (IPS), home automation for the elderly and disabled, pet and baby care, for example tracking the pets and babies' movements and controlling pet access rights, and air quality control (inside and outside).

Other home and building automation systems and applications are described in U.S. Patent Application Publication No. 2013/0201316 to Binder et al., entitled: "System and Method for Server Based Control", which is incorporated in its entirety for all purposes as if fully set forth herein, that discloses various home and building automation systems in a building or vehicle for an actuator operation in response to a sensor according to a control logic. The system comprises a router or a gateway communicating with a device associated with the sensor and a device associated with the actuator over in-building or in-vehicle networks, and an external Internet-connected control server associated with the control logic implementing a PID closed linear control loop and communicating with the router over external network for controlling the in-building or in-vehicle phenomenon. The sensor may be a microphone or a camera, and the system may include voice or image processing as part of the control logic. A redundancy is used by using multiple sensors or actuators, or by using multiple data paths over the building or vehicle internal or external communication. The networks may be wired or wireless, and may be BAN, PAN, LAN, WAN, or home networks.

Systems and methods for management of a premises are disclosed in U.S. Pat. No. 11,343,380 to Dawes entitled: "Premises system automation", which is incorporated in its entirety for all purposes as if fully set forth herein. One or more premises devices may be located at a premises. A computing device located at the premises may be in communication with the one or more premises devices. The computing device may also be in communication with an external network. The computing device may process data associated with the one or more premises devices using one or more automation rules.

Sensor. Any element capable of measuring or responding to a physical phenomenon may be used as a sensor. An appropriate sensor may be adapted for a specific physical phenomenon, such as a sensor responsive to temperature, humidity, pressure, audio, vibration, light, motion, sound, proximity, flow rate, electrical voltage, and electrical current. A sensor may be an analog sensor having an analog signal output such as analog voltage or current, or may have continuously variable impedance. Alternatively on in addition, a sensor may have a digital signal output. A sensor may serve as a detector, notifying only the presence of a phenomenon, such as by a switch, and may use a fixed or settable threshold level. A sensor may measure time-dependent or space-dependent parameters of a phenomenon. A sensor may measure time-dependencies or a phenomenon such as the rate of change, time-integrated or time-average, duty-cycle, frequency or time period between events. A sensor may be a passive sensor, or an active sensor requiring an external source of excitation. A sensor may be semiconductor-based, and may be based on MEMS technology.

A sensor may measure the amount of a property or of a physical quantity or the magnitude relating to a physical phenomenon, body or substance. Alternatively or in addition, a sensor may be used to measure the time derivative thereof, such as the rate of change of the amount, the quantity or the magnitude. In the case of space related quantity or magnitude, a sensor may measure the linear density, surface density, or volume density, relating to the amount of property per volume. Alternatively or in addition, a sensor may measure the flux (or flow) of a property through a cross-section or surface boundary, the flux density, or the current. In the case of a scalar field, a sensor may measure the quantity gradient. A sensor may measure the amount of property per unit mass or per mole of substance. A single sensor may be used to measure two or more phenomena.

A sensor may provide an electrical output signal in response to a physical, chemical, biological or any other phenomenon, serving as a stimulus to the sensor. A sensor may serve as, or be, a detector, for detecting the presence of the phenomenon. Alternatively or in addition, a sensor may measure (or respond to) a parameter of a phenomenon or a magnitude of the physical quantity thereof. For example, a sensor may be a thermistor or a platinum resistance temperature detector, a light sensor, a pH probe, a microphone for audio receiving, or a piezoelectric bridge. Similarly, a sensor may be used to measure pressure, flow, force or other mechanical quantities. A sensor output may be amplified by an amplifier connected to the sensor output. Other signal conditioning may also be applied in order to improve the handling of the sensor output or adapting it to the next stage or manipulating, such as attenuation, delay, current or voltage limiting, level translation, galvanic isolation, impedance transformation, linearization, calibration, filtering, amplifying, digitizing, integration, derivation, and any other signal manipulation. Some sensors conditioning involves connecting them in a bridge circuit. In the case of conditioning, the conditioning circuit may added to manipulate the sensor output, such as filter or equalizer for frequency related manipulation such as filtering, spectrum analysis or noise removal, smoothing or de-blurring in case of image enhancement, a compressor (or de-compressor) or coder (or decoder) in the case of a compression or a coding/decoding schemes, modulator or demodulator in case of modulation, and extractor for extracting or detecting a feature or parameter such as pattern recognition or correlation analysis. In case of filtering, passive, active or adaptive (such as Wiener or Kalman) filters may be used. The conditioning circuits may apply linear or non-linear manipulations. Further, the manipulation may be time-related such as analog or digital delay-lines, integrators, or rate-based manipulation. A sensor may have analog output, requiring an A/D to be connected thereto, or may have digital output. Further, the conditioning may be based on the book entitled: "*Practical Design Techniques for Sensor Signal Conditioning*", by Analog Devices, Inc., 1999 (ISBN-0-916550-20-6), which is incorporated in its entirety for all purposes as if fully set forth herein.

Alternatively or in addition, any sensor herein, any sensor technology herein, any sensor conditioning herein or handling circuits, or any sensor application herein, may be according to the book entitled: "*Sensors and Control Systems in manufacturing*", Second Edition 2010, by Sabrie Soloman, The McGraw-Hill Companies, ISBN: 978-0-07-160573-1, according to the book entitled: "*Fundamentals of Industrial Instrumentation and Process Control*", by William C. Dunn, 2005, The McGraw-Hill Companies, ISBN: 0-07-145735-6, or according to the book entitled: "*Sensor technology Handbook*", Edited by Jon Wilson, by Newnes-Elsevier 2005, ISBN:0-7506-7729-5, which are all incorporated in their entirety for all purposes as if fully set forth herein. Further, a sensor may be any sensor described in U.S. Patent Application Publication No. 2013/0201316 to Binder et al., entitled: "*System and Method for Server Based Control*", which is incorporated in its entirety for all purposes as if fully set forth herein.

A sensor may directly or indirectly measure the rate of change of the physical quantity (gradient) versus the direction around a particular location, or between different locations. For example, a temperature gradient may describe the differences in the temperature between different locations. Further, a sensor may measure time-dependent or time-manipulated values of the phenomenon, such as time-integrated, average or Root Mean Square (RMS or rms), relating to the square root of the mean of the squares of a series of discrete values (or the equivalent square root of the integral in a continuously varying value). Further, a parameter relating to the time dependency of a repeating phenomenon may be measured, such as the duty-cycle, the frequency (commonly measured in Hertz—Hz) or the period. A sensor may be based on the Micro Electro-Mechanical Systems—MEMS (a.k.a. Micro-mechanical electrical systems) technology. A sensor may respond to environmental conditions such as temperature, humidity, noise, vibration, fumes, odors, toxic conditions, dust, and ventilation.

A sensor may be an active sensor, requiring an external source of excitation. For example, resistor-based sensors such as thermistors and strain gages are active sensors, requiring a current to pass through them in order to determine the resistance value, corresponding to the measured phenomenon. Similarly, a bridge circuit based sensors are active sensors depending or external electrical circuit for their operation. Alternatively or in addition, a sensor may be a passive sensor, generating an electrical output without requiring any external circuit or any external voltage or current. Thermocouples and photodiodes are examples or passive sensors.

A sensor may measure the amount of a property or of a physical quantity or the magnitude relating to a physical phenomenon, body or substance. Alternatively or in addition, a sensor may be used to measure the time derivative thereof, such as the rate of change of the amount, the quantity or the magnitude. In the case of space related quantity or magnitude, a sensor may measure the linear density, relating to the amount of property per length, a sensor may measure the surface density, relating to the amount of property per area, or a sensor may measure the volume density, relating to the amount of property per volume. Alternatively or in addition, a sensor may measure the amount of property per unit mass or per mole of substance. In the case of a scalar field, a sensor may further measure the quantity gradient, relating to the rate of change of property with respect to position. Alternatively or in addition, a sensor may measure the flux (or flow) of a property through a cross-section or surface boundary. Alternatively or in addition, a sensor may measure the flux density, relating to the flow of property through a cross-section per unit of the cross-section, or through a surface boundary per unit of the surface area. Alternatively or in addition, a sensor may measure the current, relating to the rate of flow of property through a cross-section or a surface boundary, or the current density, relating to the rate of flow of property per unit through a cross-section or a surface boundary. A sensor may include or consists of a transducer, defined herein as a device for converting energy from one form to another for the purpose of measurement of a physical quantity or for information transfer. Further, a single sensor may be used to measure two or more phenomena. For example, two characteristics of the same element may be measured, each characteristic corresponding to a different phenomenon.

A sensor output may have multiple states, where the sensor state is depending upon the measured parameter of the sensed phenomenon. A sensor may be based on a two-state output (such as '0' or '1', or 'true' and 'false'), such as an electric switch having two contacts, where the contacts can be in one of two states: either "closed" meaning the contacts are touching and electricity can flow between them, or "open", meaning the contacts are separated and the switch is non-conducting. A sensor may be a threshold switch, where the switch changes its state upon sensing that the magnitude of the measured parameter of a phenomenon exceeds a certain threshold. For example, a sensor may be a thermostat is a temperature-operated switch used to control a heating process. Another example is a voice operated switch (a.k.a. VOX), which is a switch that operates when sound over a certain threshold is detected. It is usually used to turn on a transmitter or recorder when someone speaks and turn it off when they stop speaking. Another example is a mercury switch (also known as a mercury tilt switch), which is a switch whose purpose is to allow or interrupt the flow of electric current in an electrical circuit in a manner that is dependent on the switch's physical position or alignment relative to the direction of the "pull" of earth's gravity, or other inertia. The threshold of a threshold-based switch may be fixed or settable. Further, an actuator may be used in order to locally or remotely set the threshold level.

In some cases, a sensor operation may be based on generating a stimulus or an excitation to generate influence or create a phenomenon. The entire or part of the generating or stimulating mechanism may be in this case an integral part of the sensor, or may be regarded as independent actuators, and thus may be controlled by the controller. Further, a sensor and an actuator, independent or integrated, may be cooperatively operating as a set, for improving the sensing or the actuating functionality. For example, a light source, treated as an independent actuator, may be used to illuminate a location, in order to allow an image sensor to faithfully and properly capture an image of that location. In another example, where a bridge is used to measure impedance, the excitation voltage of the bridge may be supplied from a power supply treated and acting as an actuator.

A sensor may be a piezoelectric sensor, where the piezoelectric effect is used to measure pressure, acceleration, strain or force. Depending on how the piezoelectric material is cut, there are three main modes of operation: transverse longitudinal and shear. In the transverse effect mode, a force applied along an axis generates charges in a direction perpendicular to the line of force, and in the longitudinal effect mode, the amount of charge produced is proportional to the applied force and is independent of size and shape of the piezoelectric element. When using as a pressure sensor, commonly a thin membrane is used to transfer the force to the piezoelectric element, while in accelerometer use, a mass is attached to the element, and the load of the mass is measured. A piezoelectric sensor element material may be a piezoelectric ceramics (such as PZT ceramic) or a single crystal material. A single crystal material may be gallium phosphate, quartz, tourmaline, or Lead Magnesium Niobate-Lead Titanate (PMN-PT).

A sensor may be a solid-state sensor, which is typically a semiconductor device and which have no mobile parts, and commonly enclosed as a chip. The sensor may be according to, or based on, the sensor described in U.S. Pat. No. 5,511,547 to Markle, entitled: “Solid State Sensors”, in U.S. Pat. No. 6,747,258 to Benz et al., entitled: “Intensified Hybrid Solid-State Sensor with an Insulating Layer”, in U.S. Pat. No. 5,105,087 to Jagielinski, entitled: “Large Solid State Sensor Assembly Formed from Smaller Sensors”, or in U.S. Pat. No. 4,243,631 to Ryerson, entitled: “Solid State Sensor”, which are all incorporated in their entirety for all purposes as if fully set forth herein.

A sensor may be a nanosensor, which is a biological, chemical or physical sensor constructed using nanoscale components, usually microscopic or submicroscopic in size. A nanosensor may be according to, or based on, the sensor described in U.S. Pat. No. 7,256,466 to Lieber et al., entitled: “Nanosensors”, in U.S. Patent Application Publication No. 2007/0264623 to Wang et al., entitled: “Nanosensors”, in U.S. Patent Application Publication No. 2011/0045523 to Strano et al., entitled: “Optical Nenosensors Comprising Photoluminescent Nanostructures”, or in U.S. Patent Application Publication No. 2011/0275544 to Zhou et al., entitled: “Microfluidic Integration with Nanosensor Platform”, which are all incorporated in their entirety for all purposes as if fully set forth herein.

A sensor may include one or more sensors, each providing an electrical output signal (such as voltage or current), or changing a characteristic (such as resistance or impedance) in response to a measured or detected phenomenon. The sensors may be identical, similar or different from each other, and may measure or detect the same or different phenomena. Two or more sensors may be connected in series or in parallel. In the case of a changing characteristic sensor or in the case of an active sensor, the unit may include an excitation or measuring circuits (such as a bridge) to generate the sensor electrical signal. The sensor output signal may be conditioned by a signal conditioning circuit. The signal conditioner may involve time, frequency, or magnitude related manipulations. The signal conditioner may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog sensor, an analog to digital (A/D) converter may be used to convert the conditioned sensor output signal to a digital sensor data. The unit may include a computer for controlling and managing the unit operation, processing the digital sensor data and handling the unit communication. The unit may include a modem or transceiver coupled to a network port (such as a connector or antenna), for interfacing and communicating over a network.

Vehicle. A vehicle is a mobile machine that transports people or cargo. Most often, vehicles are manufactured, such as wagons, bicycles, motor vehicles (motorcycles, cars, trucks, buses), railed vehicles (trains, trams), watercraft (ships, boats), aircraft and spacecraft. The vehicle may be designed for use on land, in fluids, or be airborne, such as bicycle, car, automobile, motorcycle, train, ship, boat, submarine, airplane, scooter, bus, subway, train, or spacecraft. A vehicle may consist of, or may comprise, a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. Further, a vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane.

A vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically, automobiles use four wheels, and are constructed to principally transport of people and/or goods.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

Aircraft. An aircraft is a machine that is able to fly by gaining support from the air. It counters the force of gravity by using either static lift or by using the dynamic lift of an airfoil, or in a few cases, the downward thrust from jet engines. The human activity that surrounds aircraft is called aviation. Crewed aircraft are flown by an onboard pilot, but unmanned aerial vehicles may be remotely controlled or self-controlled by onboard computers. Aircraft may be classified by different criteria, such as lift type, aircraft propulsion, usage and others.

Aerostats are lighter than air aircrafts that use buoyancy to float in the air in much the same way that ships float on the water. They are characterized by one or more large gasbags or canopies filled with a relatively low-density gas such as helium, hydrogen, or hot air, which is less dense than the surrounding air. When the weight of this is added to the weight of the aircraft structure, it adds up to the same weight as the air that the craft displaces. Heavier-than-air aircraft, such as airplanes, must find some way to push air or gas downwards, so that a reaction occurs (by Newton's laws of motion) to push the aircraft upwards. This dynamic movement through the air is the origin of the term aerodyne. There are two ways to produce dynamic upthrust: aerodynamic lift and powered lift in the form of engine thrust.

Aerodynamic lift involving wings is the most common, with fixed-wing aircraft being kept in the air by the forward movement of wings, and rotorcraft by spinning wing-shaped rotors sometimes called rotary wings. A wing is a flat, horizontal surface, usually shaped in cross-section as an aerofoil. To fly, air must flow over the wing and generate lift. A flexible wing is a wing made of fabric or thin sheet material, often stretched over a rigid frame. A kite is tethered to the ground and relies on the speed of the wind over its wings, which may be flexible or rigid, fixed, or rotary.

Gliders are heavier-than-air aircraft that do not employ propulsion once airborne. Take-off may be by launching forward and downward from a high location, or by pulling into the air on a tow-line, either by a ground-based winch or vehicle, or by a powered "tug" aircraft. For a glider to maintain its forward air speed and lift, it must descend in relation to the air (but not necessarily in relation to the ground). Many gliders can 'soar'—gain height from updrafts such as thermal currents. Common examples of gliders are sailplanes, hang gliders and paragliders. Powered aircraft have one or more onboard sources of mechanical power, typically aircraft engines although rubber and man-power have also been used. Most aircraft engines are either lightweight piston engines or gas turbines. Engine fuel is stored in tanks, usually in the wings but larger aircraft also have additional fuel tanks in the fuselage.

A propeller aircraft use one or more propellers (airscrews) to create thrust in a forward direction. The propeller is usually mounted in front of the power source in tractor configuration but can be mounted behind in pusher configuration. Variations of propeller layout include contra-rotating propellers and ducted fans. A Jet aircraft use airbreathing jet engines, which take in air, burn fuel with it in a combustion chamber, and accelerate the exhaust rearwards to provide thrust. Turbojet and turbofan engines use a spinning turbine to drive one or more fans, which provide additional thrust. An afterburner may be used to inject extra fuel into the hot exhaust, especially on military "fast jets". Use of a turbine is not absolutely necessary: other designs include the pulse jet and ramjet. These mechanically simple designs cannot work when stationary, so the aircraft must be launched to flying speed by some other method. Some rotorcrafts, such as helicopters, have a powered rotary wing or rotor, where the rotor disc can be angled slightly forward so that a proportion of its lift is directed forwards. The rotor may, similar to a propeller, be powered by a variety of methods such as a piston engine or turbine. Experiments have also used jet nozzles at the rotor blade tips.

A vehicle may include a hood (a.k.a. bonnet), which is the hinged cover over the engine of motor vehicles that allows access to the engine compartment (or trunk on rear-engine and some mid-engine vehicles) for maintenance and repair. A vehicle may include a bumper, which is a structure attached, or integrated to, the front and rear of an automobile to absorb impact in a minor collision, ideally minimizing repair costs. Bumpers also have two safety functions: minimizing height mismatches between vehicles and protecting pedestrians from injury. A vehicle may include a cowling, which is the covering of a vehicle's engine, most often found on automobiles and aircraft. A vehicle may include a dashboard (also called dash, instrument panel, or fascia), which is a control panel placed in front of the driver of an automobile, housing instrumentation and controls for operation of the vehicle. A vehicle may include a fender that frames a wheel well (the fender underside). Its primary purpose is to prevent sand, mud, rocks, liquids, and other road spray from being thrown into the air by the rotating tire. Fenders are typically rigid and can be damaged by contact with the road surface. Instead, flexible mud flaps are used close to the ground where contact may be possible. A vehicle may include a quarter panel (a.k.a. rear wing), which is the body panel (exterior surface) of an automobile between a rear door (or only door on each side for two-door models) and the trunk (boot) and typically wraps around the wheel well. Quarter panels are typically made of sheet metal, but are sometimes made of fiberglass, carbon fiber, or fiber-reinforced plastic. A vehicle may include a rocker, which is the body section below the base of the door openings. A vehicle may include a spoiler, which is an automotive aerodynamic device whose intended design function is to 'spoil' unfavorable air movement across a body of a vehicle in motion, usually described as turbulence or drag. Spoilers on the front of a vehicle are often called air dams. Spoilers are often fitted to race and high-performance sports cars, although they have become common on passenger vehicles as well. Some spoilers are added to cars primarily for styling purposes and have either little aerodynamic benefit or even make the aerodynamics worse. The trunk (a.k.a. boot) of a car is the vehicle's main storage compartment. A vehicle door is a type of door, typically hinged, but sometimes attached by other mechanisms such as tracks, in front of an opening, which is used for entering and exiting a vehicle. A vehicle door can be opened to provide access to the opening, or closed to secure it. These doors can be opened manually, or powered electronically. Powered doors are usually found on minivans, high-end cars, or modified cars. Car glass includes windscreens, side and rear windows, and glass panel roofs on a vehicle. Side windows can be either fixed or be raised and lowered by depressing a button (power window) or switch or using a hand-turned crank.

Autonomous car. An autonomous car (also known as a driverless car, self-driving car, or robotic car) is a vehicle that is capable of sensing its environment and navigating without human input. Autonomous cars use a variety of techniques to detect their surroundings, such as radar, laser light, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination. Among the potential benefits of autonomous cars is a significant reduction in traffic collisions; the resulting injuries; and related costs, including a lower need for insurance. Autonomous cars are also predicted to offer major increases in traffic flow; enhanced mobility for children, the elderly, disabled and poor people; the relief of travelers from driving and navigation chores; lower fuel consumption; significantly reduced needs for parking space in cities; a reduction in crime; and the facilitation of different business models for mobility as a service, especially those involved in the sharing economy.

Modern self-driving cars generally use Bayesian Simultaneous Localization And Mapping (SLAM) algorithms, which fuse data from multiple sensors and an off-line map into current location estimates and map updates. SLAM with Detection and Tracking of other Moving Objects (DATMO), which also handles things such as cars and pedestrians, is a variant being developed by research at Google. Simpler systems may use roadside Real-Time Locating System (RTLS) beacon systems to aid localization. Typical sensors include LIDAR and stereo vision, GPS and IMU. Visual object recognition uses machine vision including neural networks.

The term 'Dynamic driving task' includes the operational (steering, braking, accelerating, monitoring the vehicle and roadway) and tactical (responding to events, determining when to change lanes, turn, use signals, etc.) aspects of the driving task, but not the strategic (determining destinations and waypoints) aspect of the driving task. The term 'Driving mode' refers to a type of driving scenario with characteristic dynamic driving task requirements (e.g., expressway merging, high speed, cruising, low speed traffic jam, closed-campus operations, etc.). The term 'Request to intervene' refers to notification by the automated driving system to a human driver that s/he should promptly begin or resume performance of the dynamic driving task.

The SAE International standard J3016, entitled: "*Taxonomy and Definitions for Terms Related to On-Road Motor Vehicle Automated Driving Systems*" [Revised 2016 September], which is incorporated in its entirety for all purposes as if fully set forth herein, describes six different levels (ranging from none to fully automated systems), based on the amount of driver intervention and attentiveness required, rather than the vehicle capabilities. The levels are further described in a table 330*a* in FIG. 33*a*. Level 0 refers to automated system issues warnings but has no vehicle control, while Level 1 (also referred to as an "hands-on") refers to driver and automated system that shares control over the vehicle. An example would be Adaptive Cruise Control (ACC) where the driver controls steering and the automated system controls speed. Using Parking Assistance, steering is automated while speed is manual. The driver must be ready to retake full control at any time. Lane Keeping Assistance (LKA) Type II is a further example of level 1 self-driving.

In Level 2 (also referred to as an "hands-off"), the automated system takes full control of the vehicle (accelerating, braking, and steering). The driver must monitor the driving and be prepared to immediately intervene at any time if the automated system fails to respond properly. In Level 3 (also referred to as "eyes-off"), the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. A key distinction is between level 2, where the human driver performs part of the dynamic driving task, and level 3, where the automated driving system performs the entire dynamic driving task. Level 4 (also referred to as "mind-off") is similar to level 3, but no driver attention is ever required for safety, i.e., the driver may safely go to sleep or leave the driver's seat. Self-driving is supported only in limited areas (geofenced) or under special circumstances, such as traffic jams. Outside of these areas or circumstances, the vehicle must be able to safely abort the trip, i.e., park the car, if the driver does not retake control. In Level 5 (also referred to as a "wheel optional"), no human intervention is required. An example would be a robotic taxi.

An autonomous vehicle and systems having an interface for payloads that allows integration of various payloads with relative case are disclosed in U.S. Patent Application Publication No. 2007/0198144 to Norris et al. entitled: "Networked multi-role robotic vehicle", which is incorporated in its entirety for all purposes as if fully set forth herein. There is a vehicle control system for controlling an autonomous vehicle, receiving data, and transmitting a control signal on at least one network. A payload is adapted to detachably connect to the autonomous vehicle, the payload comprising a network interface configured to receive the control signal from the vehicle control system over the at least one network. The vehicle control system may encapsulate payload data and transmit the payload data over the at least one network, including Ethernet or CAN networks. The payload may be a laser scanner, a radio, a chemical detection system, or a Global Positioning System unit. In certain embodiments, the payload is a camera mast unit, where the camera communicates with the autonomous vehicle control system to detect and avoid obstacles. The camera mast unit may be interchangeable, and may include structures for receiving additional payload components.

UAV. An Unmanned Aerial Vehicle (UAV) (commonly known as a 'drone') is an aircraft without a human pilot on board and a type of unmanned vehicle. UAVs are a component of an Unmanned Aircraft System (UAS), which includes a UAV, a ground-based controller, and a system of communications between the two. The flight of UAVs may operate with various degrees of autonomy: either under remote control by a human operator, autonomously by onboard computers, or piloted by an autonomous robot.

Automotive electronics. Automotive electronics involves any electrically-generated systems used in vehicles, such as ground vehicles. Automotive electronics commonly involves multiple modular ECUs (Electronic Control Unit) connected over a network such as Engine Control Modules (ECM) or Transmission Control Modules (TCM). Automotive electronics or automotive embedded systems are distributed systems, and according to different domains in the automotive field, they can be classified into Engine electronics, Transmission electronics, Chassis electronics, Active safety, Driver assistance, Passenger comfort, and Entertainment (or infotainment) systems.

One of the most demanding electronic parts of an automobile is the Engine Control Unit. Engine controls demand one of the highest real time deadlines, as the engine itself is a very fast and complex part of the automobile. The computing power of the engine control unit is commonly the highest, typically a 32-bit processor, that typically controls in real-time in a diesel engine the Fuel injection rate, Emission control, NOx control, Regeneration of oxidation catalytic converter, Turbocharger control, Throttle control, and Cooling system control. In a gasoline engine, the engine control typically involves Lambda control, OBD (On-Board Diagnostics), Cooling system control, Ignition system control, Lubrication system control, Fuel injection rate control, and Throttle control.

An engine ECU typically connects to, or includes, sensors that actively monitor in real-time engine parameters such as pressure, temperature, flow, engine speed, oxygen level and NOx level, plus other parameters at different points within the engine. All these sensor signals are analyzed by the ECU, which has the logic circuits to do the actual controlling. The ECU output is commonly connected to different actuators for the throttle valve, EGR valve, rack (in VGTs), fuel injector (using a pulse-width modulated signal), dosing injector, and more.

Transmission electronics involves control of the transmission system, mainly the shifting of the gears for better shift comfort and to lower torque interrupt while shifting. Automatic transmissions use controls for their operation, and many semi-automatic transmissions having a fully automatic clutch or a semi-auto clutch (declutching only). The engine control unit and the transmission control typically exchange messages, sensor signals and control signals for their operation. Chassis electronics typically includes many sub-systems that monitor various parameters and are actively controlled, such as ABS—Anti-lock Braking System, TCS—Traction Control System, EBD—Electronic Brake Distribution, and ESP—Electronic Stability Program. Active safety systems involve modules that are ready-to-act when there is a collision in progress, or used to prevent it when it senses a dangerous situation, such as Air bags, Hill descent control, and Emergency brake assist system. Passenger comfort systems involve, for example, Automatic climate control, Electronic seat adjustment with memory, Automatic wipers, Automatic headlamps—adjusts beam automatically, and Automatic cooling—temperature adjustment. Infotainment systems include systems such as Navigation system, Vehicle audio, and Information access.

Automotive electric and electronic technologies and systems are described in a book published by Robert Bosch GmbH ($5^{th}$ Edition, July 2007) entitled: "*Bosch Automotive Electric and Automotive Electronics*" [ISBN-978-3-658-01783-5], which is incorporated in its entirety for all purposes as if fully set forth herein.

ECU. In automotive electronics, an Electronic Control Unit (ECU) is a generic term for any embedded system that controls one or more of the electrical system or subsystems in a vehicle such as a motor vehicle. Types of ECU include Electronic/engine Control Module (ECM) (sometimes referred to as Engine Control Unit—ECU, which is distinct from the generic ECU—Electronic Control Unit), Airbag Control Unit (ACU), Powertrain Control Module (PCM), Transmission Control Module (TCM), Central Control Module (CCM), Central Timing Module (CTM), Convenience Control Unit (CCU), General Electronic Module (GEM), Body Control Module (BCM), Suspension Control Module (SCM), Door Control Unit (DCU), Powertrain Control Module (PCM), Electric Power Steering Control Unit (PSCU), Seat Control Unit, Speed Control Unit (SCU), Suspension Control Module (SCM), Telematic Control Unit (TCU), Telephone Control Unit (TCU), Transmission Control Unit (TCU), Brake Control Module (BCM or EBCM; such as ABS or ESC), Battery management system, control unit, or control module.

A microprocessor or a microcontroller serves as a core of an ECU, and uses a memory such as SRAM, EEPROM, and Flash. An ECU is power fed by a supply voltage, and includes or connects to sensors using analog and digital inputs. In addition to a communication interface, an ECU typically includes a relay, H-Bridge, injector, or logic drivers, or outputs for connecting to various actuators.

ECU technology and applications is described in the M. Tech. Project first stage report (EE696) by Vineet P. Aras of the Department of Electrical Engineering, Indian Institute of Technology Bombay, dated July 2004, entitled: "*Design of Electronic Control Unit* (*ECU*) *for Automobiles Electronic Engine Management system*", and in National Instruments paper published Nov. 7, 2009 entitled: "*ECU Designing and Testing using National Instruments Products*", which are both incorporated in their entirety for all purposes as if fully set forth herein. ECU examples are described in a brochure by Sensor-Technik Wiedemann Gmbh (headquartered in Kaufbeuren, Germany) dated 20110304 GB entitled "*Control System Electronics*", which is incorporated in its entirety for all purposes as if fully set forth herein. An ECU or an interface to a vehicle bus may use a processor such as the MPC5748G controller available from Freescale Semiconductor, Inc. (headquartered in Tokyo, Japan, and described in a data sheet Document Number MPC5748G Rev. 2, May 2014 entitled: "*MPC*5748 *Microcontroller Datasheet*", which is incorporated in its entirety for all purposes as if fully set forth herein.

Vehicle bus. A vehicle bus is a specialized internal (in-vehicle) communications network that interconnects components inside a vehicle (e.g., automobile, bus, train, industrial or agricultural vehicle, ship, or aircraft). Special requirements for vehicle control such as assurance of message delivery, of non-conflicting messages, of minimum time of delivery, of low cost, and of EMF noise resilience, as well as redundant routing and other characteristics mandate the use of less common networking protocols. A vehicle bus typically connects the various ECUs in the vehicle. Common protocols include Controller Area Network (CAN), Local Interconnect Network (LIN) and others. Conventional computer networking technologies (such as Ethernet and TCP/IP) may as well be used.

Any in-vehicle internal network that interconnect the various devices and components inside the vehicle may use any of the technologies and protocols described herein. Common protocols used by vehicle buses include a Control Area Network (CAN), FlexRay, and a Local Interconnect Network (LIN). Other protocols used for in-vehicle are optimized for multimedia networking such as MOST (Media Oriented Systems Transport). The CAN is described in the Texas Instrument Application Report No. SLOA101A entitled: "*Introduction to the Controller Area Network* (*CAN*)", and may be based on, may be compatible with, or may be according to, ISO 11898 standards, ISO 11992-1 standard, SAE J1939 or SAE J2411 standards, which are all incorporated in their entirety for all purposes as if fully set forth herein. The LIN communication may be based on, may be compatible with, or according to, ISO 9141, and is described in "*LIN Specification Package—Revision* 2.2*A*" by the LIN Consortium, which are all incorporated in their entirety for all purposes as if fully set forth herein. In one example, the DC power lines in the vehicle may also be used as the communication medium, as described for example in U.S. Pat. No. 7,010,050 to Maryanka, entitled: "Signaling over Noisy Channels", which is incorporated in its entirety for all purposes as if fully set forth herein.

CAN. A controller area network (CAN bus) is a vehicle bus standard designed to allow microcontrollers and devices to communicate with each other in applications without a host computer. It is a message-based protocol, designed originally for multiplex electrical wiring within automobiles, but is also used in many other contexts. CAN bus is one of five protocols used in the on-board diagnostics (OBD)-II vehicle diagnostics standard. CAN is a multi-master serial bus standard for connecting Electronic Control Units [ECUs] also known as nodes. Two or more nodes are required on the CAN network to communicate. The complexity of the node can range from a simple I/O device up to an embedded computer with a CAN interface and sophisticated software. The node may also be a gateway allowing a standard computer to communicate over a USB or Ethernet port to the devices on a CAN network. All nodes are connected to each other through a two-wire bus. The wires are 120Ω nominal twisted pair. Implementing CAN is described in an Application Note (AN10035-0-2/12(0) Rev. 0) published 2012 by Analog Devices, Inc. entitled: "*Controller Area Network* (*CAN*) *Implementation Guide—by Dr. Conal Watterson*", which is incorporated in its entirety for all purposes as if fully set forth herein.

CAN transceiver is defined by ISO 11898-2/3 Medium Access Unit [MAU] standards, and in receiving, converts the levels of the data stream received from the CAN bus to levels that the CAN controller uses. It usually has protective circuitry to protect the CAN controller, and in transmitting state converts the data stream from the CAN controller to CAN bus compliant levels. An example of a CAN transceiver is model TJA 1055 or model TJA 1044 both available from NXP Semiconductors N.V. headquartered in Eindhoven, Netherlands, respectively described in Product data sheets (document Identifier TJA1055, date of release: 6 Dec. 2013) entitled: "*TJA*1055 *Enhanced fault-tolerant CAN transceiver Rev.* 5-6 *Dec.* 2013 *Product data sheet*", and Product data sheets (document Identifier TJA1055, date of release: 6 Dec. 2013) entitled: "*TJA*1044 *High-speed CAN transceiver with Standby mode* 1 *Rev.* 4-10 *Jul.* 2015 *Product data sheet*", which are both incorporated in their entirety for all purposes as if fully set forth herein.

Each node is able to send and receive messages, but not simultaneously. A message or Frame consists primarily of the ID (identifier), which represents the priority of the message, and up to eight data bytes. A CRC, acknowledge slot [ACK] and other overhead are also part of the message. The improved CAN FD extends the length of the data section to up to 64 bytes per frame. The message is transmitted serially onto the bus using a non-return-to-zero (NRZ) format and may be received by all nodes. The devices that are connected by a CAN network are typically sensors, actuators, and other control devices. These devices are connected to the bus through a host processor, a CAN controller, and a CAN transceiver. A terminating bias circuit is power and ground provided together with the data signaling in order to provide electrical bias and termination at each end of each bus segment to suppress reflections.

CAN data transmission uses a lossless bit-wise arbitration method of contention resolution. This arbitration method requires all nodes on the CAN network to be synchronized to sample every bit on the CAN network at the same time. While some call CAN synchronous, the data is transmitted without a clock signal in an asynchronous format. The CAN specifications use the terms "dominant" bits and "recessive" bits where dominant is a logical '0' (actively driven to a voltage by the transmitter) and recessive is a logical '1' (passively returned to a voltage by a resistor). The idle state is represented by the recessive level (Logical 1). If one node transmits a dominant bit and another node transmits a recessive bit, then there is a collision and the dominant bit "wins". This means there is no delay to the higher-priority message, and the node transmitting the lower priority message automatically attempts to re-transmit six bit clocks after the end of the dominant message. This makes CAN very suitable as a real time prioritized communications system.

The exact voltages for a logical level '0' or '1' depend on the physical layer used, but the basic principle of CAN requires that each node listen to the data on the CAN network including the data that the transmitting node is transmitting. If a logical 1 is transmitted by all transmitting nodes at the same time, then a logical 1 is seen by all of the nodes, including both the transmitting node(s) and receiving node(s). If a logical 0 is transmitted by all transmitting node(s) at the same time, then a logical 0 is seen by all nodes. If a logical 0 is being transmitted by one or more nodes, and a logical 1 is being transmitted by one or more nodes, then a logical 0 is seen by all nodes including the node(s) transmitting the logical 1. When a node transmits a logical 1 but sees a logical 0, it realizes that there is a contention and it quits transmitting. By using this process, any node that transmits a logical 1 when another node transmits a logical 0 "drops out" or loses the arbitration. A node that loses arbitration re-queues its message for later transmission and the CAN frame bit-stream continues without error until only one node is left transmitting. This means that the node that transmits the first 1, loses arbitration. Since the 11 (or 29 for CAN 2.0B) bit identifier is transmitted by all nodes at the start of the CAN frame, the node with the lowest identifier transmits more zeros at the start of the frame, and that is the node that wins the arbitration or has the highest priority.

The CAN protocol, like many networking protocols, can be decomposed into the following abstraction layers—Application layer, Object layer (including Message filtering and Message and status handling), and Transfer layer. Most of the CAN standard applies to the transfer layer. The transfer layer receives messages from the physical layer and transmits those messages to the object layer. The transfer layer is responsible for bit timing and synchronization, message framing, arbitration, acknowledgement, error detection and signaling, and fault confinement. It performs Fault Confinement, Error Detection, Message Validation, Acknowledgement, Arbitration, Message Framing, Transfer Rate and Timing, and Information Routing.

The mechanical aspects of the physical layer (connector type and number, colors, labels, pin-outs) are not specified. As a result, an automotive ECU will typically have a particular-often custom-connector with various sorts of cables, of which two are the CAN bus lines. Nonetheless, several de facto standards for mechanical implementation have emerged, the most common being the 9-pin D-sub type male connector with the following pin-out: pin 2: CAN-Low (CAN−); pin 3: GND (Ground); pin 7: CAN-High (CAN+); and pin 9: CAN V+ (Power). This de facto mechanical standard for CAN could be implemented with the node having both male and female 9-pin D-sub connectors electrically wired to each other in parallel within the node. Bus power is fed to a node's male connector and the bus draws power from the node's female connector. This follows the electrical engineering convention that power sources are terminated at female connectors. Adoption of this standard avoids the need to fabricate custom splitters to connect two sets of bus wires to a single D connector at each node. Such nonstandard (custom) wire harnesses (splitters) that join conductors outside the node, reduce bus reliability, eliminate cable interchangeability, reduce compatibility of wiring harnesses, and increase cost.

Noise immunity on ISO 11898-2:2003 is achieved by maintaining the differential impedance of the bus at a low level with low-value resistors (120 ohms) at each end of the bus. However, when dormant, a low-impedance bus such as CAN draws more current (and power) than other voltage-based signaling buses. On CAN bus systems, balanced line operation, where current in one signal line is exactly balanced by current in the opposite direction in the other signal provides an independent, stable 0 V reference for the receivers. Best practice determines that CAN bus balanced pair signals be carried in twisted pair wires in a shielded cable to minimize RF emission and reduce interference susceptibility in the already noisy RF environment of an automobile. ISO 11898-2 provides some immunity to common mode voltage between transmitter and receiver by having a '0' V rail running along the bus to maintain a high degree of voltage association between the nodes. Also, in the de facto mechanical configuration mentioned above, a supply rail is included to distribute power to each of the transceiver nodes. The design provides a common supply for all the transceivers. The actual voltage to be applied by the bus and which nodes apply to it are application-specific and not formally specified. Common practice node design provides each node with transceivers which are optically isolated from their node host and derive a 5 V linearly regulated supply voltage for the transceivers from the universal supply rail provided by the bus. This usually allows operating margin on the supply rail sufficient to allow interoperability across many node types. Typical values of supply voltage on such networks are 7 to 30 V. However, the lack of a formal standard means that system designers are responsible for supply rail compatibility.

ISO 11898-2 describes the electrical implementation formed from a multi-dropped single-ended balanced line configuration with resistor termination at each end of the bus. In this configuration, a dominant state is asserted by one or more transmitters switching the CAN- to supply 0 V and (simultaneously) switching CAN+ to the +5 V bus voltage thereby forming a current path through the resistors that terminate the bus. As such, the terminating resistors form an essential component of the signaling system and are included not just to limit wave reflection at high frequency. During a recessive state, the signal lines and resistor(s) remain in a high impedances state with respect to both rails. Voltages on both CAN+ and CAN− tend (weakly) towards ½ rail voltage. A recessive state is only present on the bus when none of the transmitters on the bus is asserting a dominant state. During a dominant state the signal lines and resistor(s) move to a low impedance state with respect to the rails so that current flows through the resistor. CAN+ voltage tends to +5 V and CAN− tends to 0 V. Irrespective of signal state the signal lines are always in low impedance state with respect to one another by virtue of the terminating resistors at the end of the bus. Multiple access on CAN bus is achieved by the electrical logic of the system supporting just two states that are conceptually analogous to a 'wired OR' network.

The CAN is standardized in a standards set ISO 11898 entitled: "*Road vehicles—Controller area network* (*CAN*)" that specifies physical and datalink layer (levels 1 and 2 of the ISO/OSI model) of serial communication technology called Controller Area Network that supports distributed real-time control and multiplexing for use within road vehicles.

The standard ISO 11898-1:2015 entitled: "*Part* 1*: Data link layer and physical signalling*" specifies the characteristics of setting up an interchange of digital information between modules implementing the CAN data link layer. Controller area network is a serial communication protocol, which supports distributed real-time control and multiplexing for use within road vehicles and other control applications. The ISO 11898-1:2015 specifies the Classical CAN frame format and the newly introduced CAN Flexible Data Rate Frame format. The Classical CAN frame format allows bit rates up to 1 Mbit/s and payloads up to 8 byte per frame. The Flexible Data Rate frame format allows bit rates higher than 1 Mbit/s and payloads longer than 8 byte per frame. ISO 11898-1:2015 describes the general architecture of CAN in terms of hierarchical layers according to the ISO reference model for open systems interconnection (OSI) according to ISO/IEC 7498-1. The CAN data link layer is specified according to ISO/IEC 8802-2 and ISO/IEC 8802-3. ISO 11898-1:2015 contains detailed specifications of the following: logical link control sub-layer; medium access control sub-layer; and physical coding sub-layer.

The standard ISO 11898-2:2003 entitled: "*Part* 2*: High-speed medium access unit*" specifies the high-speed (transmission rates of up to 1 Mbit/s) medium access unit (MAU), and some medium dependent interface (MDI) features (according to ISO 8802-3), which comprise the physical layer of the controller area network (CAN): a serial communication protocol that supports distributed real-time control and multiplexing for use within road vehicles. The standard ISO 11898-3:2006 entitled: "*Part* 3*: Low-speed, fault-tolerant, medium-dependent interface*" specifies characteristics of setting up an interchange of digital information between electronic control units of road vehicles equipped with the controller area network (CAN) at transmission rates above 40 kBit/s up to 125 kBit/s. The standard ISO 11898-4:2004 entitled: "*Part* 4*: Time-triggered communication*" specifies time-triggered communication in the controller area network (CAN): a serial communication protocol that supports distributed real-time control and multiplexing for use within road vehicles. It is applicable to setting up a time-triggered interchange of digital information between electronic control units (ECU) of road vehicles equipped with CAN, and specifies the frame synchronization entity that coordinates the operation of both logical link and media access controls in accordance with ISO 11898-1, to provide the time-triggered communication schedule.

The standard ISO 11898-5:2007 entitled: "*Part* 5*: High-speed medium access unit with low-power mode*" specifies the CAN physical layer for transmission rates up to 1 Mbit/s for use within road vehicles. It describes the medium access unit functions as well as some medium dependent interface features according to ISO 8802-2. ISO 11898-5:2007 represents an extension of ISO 11898-2, dealing with new functionality for systems requiring low-power consumption features while there is no active bus communication. Physical layer implementations according to ISO 11898-5:2007 are compliant with all parameters of ISO 11898-2, but are defined differently within ISO 11898-5:2007. Implementations according to ISO 11898-5:2007 and ISO 11898-2 are interoperable and can be used at the same time within one network. The standard ISO 11898-6:2013 entitled: "*Part* 6*: High-speed medium access unit with selective wake-up functionality*" specifies the controller area network (CAN) physical layer for transmission rates up to 1 Mbit/s. It describes the medium access unit (MAU) functions. ISO 11898-6:2013 represents an extension of ISO 11898-2 and ISO 11898-5, specifying a selective wake-up mechanism using configurable CAN frames. Physical layer implementations according to ISO 11898-6:2013 are compliant with all parameters of ISO 11898-2 and ISO 11898-5. Implementations according to ISO 11898-6:2013, ISO 11898-2 and ISO 11898-5 are interoperable and can be used at the same time within one network.

The standard ISO 11992-1:2003 entitled: "*Road vehicles—Interchange of digital information on electrical connections between towing and towed vehicles—Part* 1*: Physical and data-link layers*" specifies the interchange of digital information between road vehicles with a maximum authorized total mass greater than 3 500 kg, and towed vehicles, including communication between towed vehicles in terms of parameters and requirements of the physical and data link layer of the electrical connection used to connect the electrical and electronic systems. It also includes conformance tests of the physical layer.

The standard ISO 11783-2:2012 entitled: "*Tractors and machinery for agriculture and forestry—Serial control and communications data network—Part 2: Physical layer*" specifies a serial data network for control and communications on forestry or agricultural tractors and mounted, semi-mounted, towed or self-propelled implements. Its purpose is to standardize the method and format of transfer of data between sensors, actuators, control elements and information storage and display units, whether mounted on, or part of, the tractor or implement, and to provide an open interconnect system for electronic systems used by agricultural and forestry equipment. ISO 11783-2:2012 defines and describes the network's 250 kbit/s, twisted, non-shielded, quad-cable physical layer. ISO 11783-2 uses four unshielded twisted wires; two for CAN and two for terminating bias circuit (TBC) power and ground. This bus is used on agricultural tractors. It is intended to provide interconnectivity between the tractor and any agricultural implement adhering to the standard.

The standard J1939/11_201209 entitled: "*Physical Layer, 250 Kbps, Twisted Shielded Pair*" defines a physical layer having a robust immunity to EMI and physical properties suitable for harsh environments. These SAE Recommended Practices are intended for light- and heavy-duty vehicles on- or off-road as well as appropriate stationary applications which use vehicle derived components (e.g., generator sets). Vehicles of interest include but are not limited to: on- and off-highway trucks and their trailers; construction equipment; and agricultural equipment and implements.

The standard SAE J1939/15_201508 entitled: "*Physical Layer, 250 Kbps, Un-Shielded Twisted Pair (UTP)*" describes a physical layer utilizing Unshielded Twisted Pair (UTP) cable with extended stub lengths for flexibility in ECU placement and network topology. CAN controllers are now available which support the newly introduced CAN Flexible Data Rate Frame format (known as "CAN FD"). These controllers, when used on SAE J1939-15 networks, must be restricted to use only the Classical Frame format compliant to ISO 11898-1 (2003).

The standard SAE J2411_200002 entitled: "*Single Wire Can Network for Vehicle Applications*" defines the Physical Layer and portions of the Data Link Layer of the OSI model for data communications. In particular, this document specifies the physical layer requirements for any Carrier Sense Multiple Access/Collision Resolution (CSMA/CR) data link which operates on a single wire medium to communicate among Electronic Control Units (ECU) on road vehicles. Requirements stated in this document will provide a minimum standard level of performance to which all compatible ECUs and media shall be designed. This will assure full serial data communication among all connected devices regardless of the supplier. This document is to be referenced by the particular vehicle OEM Component Technical Specification which describes any given ECU, in which the single wire data link controller and physical layer interface is located. Primarily, the performance of the physical layer is specified in this document.

A specification for CAN FD (CAN with Flexible Data-Rate) version 1.0 was released on Apr. 17, 2012 by Robert Bosch GmbH entitled: CAN with Flexible Data-Rate Specification Version 1.0), and is incorporated in its entirety for all purposes as if fully set forth herein. This specification uses a different frame format that allows a different data length as well as optionally switching to a faster bit rate after the arbitration is decided. CAN FD is compatible with existing CAN 2.0 networks so new CAN FD devices can coexist on the same network with existing CAN devices. CAN FD is further described in iCC 2013 CAN in Automation articles by Florian Hatwich entitled: "*Bit Time Requirements for CAN FD*" and "*Can with Flexible Data-Rate*", and in National Instruments article published Aug. 1, 2014 entitled: "*Understanding CAN with Flexible Data-Rate (CAN FD)*", which are all incorporated in their entirety for all purposes as if fully set forth herein. In one example, the CAN FD interface is based on, compatible with, or uses, the SPC57EM80 controller device available from STMicroelectronics described in an Application Note AN4389 (document number DocD025493 Rev 2) published 2014 entitled: "*SPC57472/SPC57EM80 Getting Started*", which is incorporated in its entirety for all purposes as if fully set forth herein. Further, a CAN FD transceiver may be based on, compatible with, or use, transceiver model MCP2561/2FD available from Microchip Technology Inc., described in a data sheet DS20005284A published 2014 [ISBN-978-1-63276-020-3] entitled: "*MCP2561/2FD—High-Speed CAN Flexible Data Rate Transceiver*", which is incorporated in its entirety for all purposes as if fully set forth herein.

LIN. LIN (Local Interconnect Network) is a serial network protocol used for communication between components in vehicles. The LIN communication may be based on, compatible with, or is according to, ISO 9141, and is described in "LIN Specification Package Revision 2.2A" by the LIN Consortium (dated Dec. 31, 2010), which is incorporated in its entirety for all purposes as if fully set forth herein. The LIN standard is further standardized as part of ISO 17987-1 to 17987-7 standards. LIN may be used also over the vehicle's battery power-line with a special DC-LIN transceiver. LIN is a broadcast serial network comprising 16 nodes (one master and typically up to 15 slaves). All messages are initiated by the master with at most one slave replying to a given message identifier. The master node can also act as a slave by replying to its own messages, and since all communications are initiated by the master it is not necessary to implement a collision detection. The master and slaves are typically microcontrollers, but may be implemented in specialized hardware or ASICs in order to save cost, space, or power. Current uses combine the low-cost efficiency of LIN and simple sensors to create small networks that can be connected by a backbone network. (i.e., CAN in cars). LIN is further described in U.S. Pat. No. 7,091,876 to Steger entitled: "Method for Addressing the Users of a Bus System by Means of Identification Flows", which is incorporated in its entirety for all purposes as if fully set forth herein.

The LIN specification was designed to allow very cheap hardware-nodes being used within a network. The LIN specification is based on ISO 9141:1989 standard entitled: "*Road vehicles—Diagnostic systems—Requirements for interchange of digital information*" that Specifies the requirements for setting up the interchange of digital information between on-board Electronic Control Units (ECUs) of road vehicles and suitable diagnostic testers. This communication is established in order to facilitate inspection, test diagnosis and adjustment of vehicles, systems and ECUs. Does not apply when system-specific diagnostic test equipment is used. The LIN specification is further based on ISO 9141-2:1994 standard entitled: "*Road vehicles—Diagnostic systems—Part 2: CARB requirements for interchange of digital information*" that involves vehicles with nominal 12 V supply voltage, describes a subset of ISO 9141:1989, and specifies the requirements for setting-up the interchange of digital information between on-board emission-related electronic control units of road vehicles and the SAE OBD II scan tool as specified in SAE J1978. It is a low-cost, single-wire network, where microcontrollers with either UART capability or dedicated LIN hardware are used. The microcontroller generates all needed LIN data by software and is connected to the LIN network via a LIN transceiver (simply speaking, a level shifter with some add-ons). Working as a LIN node is only part of the possible functionality. The LIN hardware may include this transceiver and works as a pure LIN node without added functionality. As LIN Slave nodes should be as cheap as possible, they may generate their internal clocks by using RC oscillators instead of crystal oscillators (quartz or a ceramic). To ensure the baud rate-stability within one LIN frame, the SYNC field within the header is used. An example of a LIN transceiver is IC Model No. 33689D available from Freescale Semiconductor, Inc. described in a data-sheet Document Number MC33689 Rev. 8.0 (dated September 2012) entitled: "*System Basis Chip with LIN Transceiver*", which is incorporated in its entirety for all purposes as if fully set forth herein.

MOST. MOST (Media Oriented Systems Transport) is a high-speed multimedia network technology optimized for use in an automotive applications, and may be used for applications inside or outside the car. The serial MOST bus uses a ring topology and synchronous data communication to transport audio, video, voice and data signals via plastic optical fiber (POF) (MOST25, MOST150) or electrical conductor (MOST50, MOST150) physical layers. The MOST specification defines the physical and the data link layer as well as all seven layers of the ISO/OSI-Model of data communication. Standardized interfaces simplify the MOST protocol integration in multimedia devices. For the system developer, MOST is primarily a protocol definition. It provides the user with a standardized interface (API) to access device functionality, and the communication functionality is provided by driver software known as MOST Network Services. MOST Network Services include Basic Layer System Services (Layer 3, 4, 5) and Application Socket Services (Layer 6). They process the MOST protocol between a MOST Network Interface Controller (NIC), which is based on the physical layer, and the API (Layer 7).

A MOST network is able to manage up to 64 MOST devices in a ring configuration. Plug and play functionality allows MOST devices to be easily attached and removed. MOST networks can also be set up in virtual star network or other topologies. Safety critical applications use redundant double ring configurations. In a MOST network, one device is designated the timing master, used to continuously supply the ring with MOST frames. A preamble is sent at the beginning of the frame transfer. The other devices, known as timing followers, use the preamble for synchronization. Encoding based on synchronous transfer allows constant post-sync for the timing followers.

MOST25 provides a bandwidth of approximately 23 megabaud for streaming (synchronous) as well as package (asynchronous) data transfer over an optical physical layer. It is separated into 60 physical channels. The user can select and configure the channels into groups of four bytes each. MOST25 provides many services and methods for the allocation (and deallocation) of physical channels. MOST25 supports up to 15 uncompressed stereo audio channels with CD-quality sound or up to 15 MPEG-1 channels for audio/video transfer, each of which uses four Bytes (four physical channels). MOST also provides a channel for transferring control information. The system frequency of 44.1 kHz allows a bandwidth of 705.6 kbit/s, enabling 2670 control messages per second to be transferred. Control messages are used to configure MOST devices and configure synchronous and asynchronous data transfer. The system frequency closely follows the CD standard. Reference data can also be transferred via the control channel. Some limitations restrict MOST25's effective data transfer rate to about 10 KB/s. Because of the protocol overhead, the application can use only 11 of 32 bytes at segmented transfer and a MOST node can only use one third of the control channel bandwidth at any time.

MOST50 doubles the bandwidth of a MOST25 system and increases the frame length to 1024 bits. The three established channels (control message channel, streaming data channel, packet data channel) of MOST25 remain the same, but the length of the control channel and the sectioning between the synchronous and asynchronous channels are flexible. Although MOST50 is specified to support both optical and electrical physical layers, the available MOST50 Intelligent Network Interface Controllers (INICs) only support electrical data transfer via Unshielded Twisted Pair (UTP).

MOST150 was introduced in October 2007 and provides a physical layer to implement Ethernet in automobiles. It increases the frame length up to 3072 bits, which is about 6 times the bandwidth of MOST25. It also integrates an Ethernet channel with adjustable bandwidth in addition to the three established channels (control message channel, streaming data channel, packet data channel) of the other grades of MOST. MOST150 also permits isochronous transfer on the synchronous channel. Although the transfer of synchronous data requires a frequency other than the one specified by the MOST frame rate, it is also possible with MOST150. MOST150's advanced functions and enhanced bandwidth will enable a multiplex network infrastructure capable of transmitting all forms of infotainment data, including video, throughout an automobile. The optical transmission layer uses Plastic Optical Fibers (POF) with a core diameter of 1 mm as transmission medium, in combination with light emitting diodes (LEDs) in the red wavelength range as transmitters. MOST25 only uses an optical Physical Layer. MOST50 and MOST150 support both optical and electrical Physical Layers.

The MOST protocol is described in a book published 2011 by Franzis Verlag Gmbh [ISBN-978-3-645-65061-8] edited by Prof. Dr. Ing. Andreas Grzemba entitled: "*MOST—The Automotive Multimedia Network From MOST25 to MOST* 150", in MOST Dynamic Specification by MOST Cooperation Rev. 3.0.2 dated October 2012 entitled: "*MOST—Multimedia and Control Networking Technology*", and in MOST Specification Rev. 3.0 E2 dated July 2010 by MOST Cooperation, which are all incorporated in their entirety for all purposes as if fully set forth herein.

FlexRay. FlexRay™ is an automotive network communications protocol developed by the FlexRay Consortium to govern on-board automotive computing. The FlexRay consortium disbanded in 2009, but the FlexRay standard is described in a set of ISO standards, ISO 17458 entitled: "*Road vehicles—FlexRay communications system*", including ISO 17458-1:2013 standard entitled: "*Part* 1*: General information and use case definition*", ISO 17458-2:2013 standard entitled: "*Part* 2*: Data link layer specification*", ISO 17458-3:2013 standard entitled: "*Part* 3*: Data link layer conformance test specification*", ISO 17458-4:2013 standard entitled: "*Part* 4*: Electrical physical layer specification*", and ISO 17458-5:2013 standard entitled: "*Part* 5*: Electrical physical layer conformance test specification*".

FlexRay supports high data rates, up to 10 Mbit/s, explicitly supports both star and "party line" bus topologies, and can have two independent data channels for fault-tolerance (communication can continue with reduced bandwidth if one channel is inoperative). The bus operates on a time cycle, divided into two parts: the static segment and the dynamic segment. The static segment is preallocated into slices for individual communication types, providing a stronger real-time guarantee than its predecessor CAN. The dynamic segment operates more like CAN, with nodes taking control of the bus as available, allowing event-triggered behavior. FlexRay specification Version 3.0.1 is described in FlexRay consortium October 2010 publication entitled: "*FlexRay Communications System—Protocol Specification Version* 3.0.1", which is incorporated in its entirety for all purposes as if fully set forth herein. The FlexRay physical layer is described in Carl Hanser Verlag Gmbh 2010 publication (Automotive 2010) by Lorenz, Steffen entitled: "The FlexRay Electrical Physical Layer Evolution", and in National Instruments Corporation Technical Overview Publication (Aug. 21, 2009) entitled: "*FlexRay Automotive Communication Bus Overview*", which are both incorporated in their entirety for all purposes as if fully set forth herein.

OBD. On-Board Diagnostics (OBD) refers to a vehicle's self-diagnostic and reporting capability. OBD systems give the vehicle owner or repair technician access to the status of the various vehicle subsystems. Modern OBD implementations use a standardized digital communications port to provide real-time data in addition to a standardized series of diagnostic trouble codes, or DTCs, which allow one to rapidly identify and remedy malfunctions within the vehicle. Keyword Protocol 2000, abbreviated KWP2000, is a communications protocol used for on-board vehicle diagnostics systems (OBD). This protocol covers the application layer in the OSI model of computer networking. KWP2000 also covers the session layer in the OSI model, in terms of starting, maintaining and terminating a communications session, and the protocol is standardized by International Organization for Standardization as ISO 14230.

One underlying physical layer used for KWP2000 is identical to ISO 9141, with bidirectional serial communication on a single line called the K-line. In addition, there is an optional L-line for wakeup. The data rate is between 1.2 and 10.4 kilobaud, and a message may contain up to 255 bytes in the data field. When implemented on a K-line physical layer, KWP2000 requires special wakeup sequences: 5-baud wakeup and fast-initialization. Both of these wakeup methods require timing critical manipulation of the K-line signal, and are therefore not easy to reproduce without custom software. KWP2000 is also compatible on ISO 11898 (Controller Area Network) supporting higher data rates of up to 1 Mbit/s. CAN is becoming an increasingly popular alternative to K-line because the CAN bus is usually present in modern-day vehicles and thus removing the need to install an additional physical cable. Using KWP2000 on CAN with ISO 15765 Transport/Network layers is most common. Also using KWP2000 on CAN does not require the special wakeup functionality.

KWP2000 can be implemented on CAN using just the service layer and session layer (no header specifying length, source and target addresses is used and no checksum is used); or using all layers (header and checksum are encapsulated within a CAN frame). However using all layers is overkill, as ISO 15765 provides its own Transport/Network layers.

ISO 14230-1:2012 entitled: "*Road vehicles—Diagnostic communication over K-Line* (*DoK-Line*)—*Part* 1*: Physical layer*", which is incorporated in its entirety for all purposes as if fully set forth herein, specifies the physical layer, based on ISO 9141, on which the diagnostic services will be implemented. It is based on the physical layer described in ISO 9141-2, but expanded to allow for road vehicles with either 12 V DC or 24 V DC voltage supply.

ISO 14230-2:2013 entitled: "*Road vehicles—Diagnostic communication over K-Line* (*DoK-Line*)—*Part* 2*: Data link layer*", which is incorporated in its entirety for all purposes as if fully set forth herein, specifies data link layer services tailored to meet the requirements of UART-based vehicle communication systems on K-Line as specified in ISO 14230-1. It has been defined in accordance with the diagnostic services established in ISO 14229-1 and ISO 15031-5, but is not limited to use with them, and is also compatible with most other communication needs for in-vehicle networks. The protocol specifies an unconfirmed communication. The diagnostic communication over K-Line (DoK-Line) protocol supports the standardized service primitive interface as specified in ISO 14229-2. ISO 14230-2:2013 provides the data link layer services to support different application layer implementations like: enhanced vehicle diagnostics (emissions-related system diagnostics beyond legislated functionality, non-emissions-related system diagnostics); emissions-related OBD as specified in ISO 15031, SAE J1979-DA, and SAE J2012-DA. In addition, ISO 14230-2:2013 clarifies the differences in initialization for K-line protocols defined in ISO 9141 and ISO 14230. This is important since a server supports only one of the protocols mentioned above and the client has to handle the coexistence of all protocols during the protocol-determination procedure.

The application layer is described in ISO 14230-3:1999 entitled: "*Road vehicles—Diagnostic systems—Keyword Protocol* 2000—*Part* 3*: Application layer*", and the requirements for emission-related systems are described in ISO 14230-4:2000 entitled: "*Road vehicles—Diagnostic systems—Keyword Protocol* 2000—*Part* 4*: Requirements for emission-related systems*", which are both incorporated in their entirety for all purposes as if fully set forth herein. Fleetwide vehicle telematics systems and methods that includes receiving and managing fleetwide vehicle state data are described in U.S. Patent Application Publication No. 2016/0086391 to Ricci entitled: "Fleetwide vehicle telematics systems and methods", which is incorporated in its entirety for all purposes as if fully set forth herein. The fleetwide vehicle state data may be fused or compared with customer enterprise data to monitor conformance with customer requirements and thresholds. The fleetwide vehicle state data may also be analyzed to identify trends and correlations of interest to the customer enterprise.

DSRC. Dedicated Short-Range Communication (DSRC) is a one-way or two-way short-range to medium-range wireless communication channels specifically designed for automotive use and a corresponding set of protocols and standards. DSRC is a two-way short-to-medium range wireless communications capability that permits very high data transmission critical in communications-based active safety applications. In Report and Order FCC-03-324, the Federal Communications Commission (FCC) allocated 75 MHz of spectrum in the 5.9 GHz band for use by intelligent transportations systems (ITS) vehicle safety and mobility applications. DSRC serves a short to medium range (1000 meters) communications service and supports both public safety and private operations in roadside-to-vehicle and vehicle-to-vehicle communication environments by providing very high data transfer rates where minimizing latency in the communication link and isolating relatively small communication zones is important. DSRC transportation applications for Public Safety and Traffic Management include Blind spot warnings, Forward collision warnings, Sudden braking ahead warnings, Do not pass warnings, Intersection collision avoidance and movement assistance, Approaching emergency vehicle warning, Vehicle safety inspection, Transit or emergency vehicle signal priority, Electronic parking and toll payments, Commercial vehicle clearance and safety inspections, In-vehicle signing, Rollover warning, and Traffic and travel condition data to improve traveler information and maintenance services.

The European standardization organization European Committee for Standardization (CEN), sometimes in co-operation with the International Organization for Standardization (ISO) developed some DSRC standards: EN 12253: 2004 Dedicated Short-Range Communication—Physical layer using microwave at 5.8 GHZ (review), EN 12795:2002 Dedicated Short-Range Communication (DSRC)—DSRC Data link layer: Medium Access and Logical Link Control (review), EN 12834:2002 Dedicated Short-Range Communication—Application layer (review), EN 13372:2004 Dedicated Short-Range Communication (DSRC)—DSRC profiles for RTTT applications (review), and EN ISO 14906: 2004 Electronic Fee Collection—Application interface. An overview of the DSRC/WAVE technologies is described in a paper by Yunxin (Jeff) Li (Eveleigh, NSW 2015, Australia) downloaded from the Internet on July 2017, entitled: "An Overview of the DSRC/WAVE Technology", and the DSRC is further standardized as ARIB STD—T75 VERSION 1.0, published September 2001 by Association of Radio Industries and Businesses Kasumigaseki, Chiyoda-ku, Tokyo 100-0013, Japan, entitled: "*DEDICATED SHORT-RANGE COMMUNICATION SYSTEM—ARIB STANDARD Version* 1.0", which are both incorporated in their entirety for all purposes as if fully set forth herein.

IEEE 802.11p. The IEEE 802.11p standard is an example of DSRC and is a published standard entitled: "Part 11: Wireless LAN Medium Access Control (MAC) and Physical Layer (PHY) Specifications Amendment 6: Wireless Access in Vehicular Environments", that adds wireless access in vehicular environments (WAVE), a vehicular communication system, for supporting Intelligent Transportation Systems (ITS) applications. It includes data exchange between high-speed vehicles and between the vehicles and the roadside infrastructure, so called V2X communication, in the licensed ITS band of 5.9 GHZ (5.85-5.925 GHZ). IEEE 1609 is a higher layer standard based on the IEEE 802.11p, and is also the base of a European standard for vehicular communication known as ETSI ITS-G5.2. The Wireless Access in Vehicular Environments (WAVE/DSRC) architecture and services necessary for multi-channel DSRC/WAVE devices to communicate in a mobile vehicular environment is described in the family of IEEE 1609 standards, such as IEEE 1609.1-2006 Resource Manager, IEEE Std 1609.2 Security Services for Applications and Management Messages, IEEE Std 1609.3 Networking Services, IEEE Std 1609.4 Multi-Channel Operation IEEE Std 1609.5 Communications Manager, as well as IEEE P802.11p Amendment: "*Wireless Access in Vehicular Environments*".

As the communication link between the vehicles and the roadside infrastructure might exist for only a short amount of time, the IEEE 802.11p amendment defines a way to exchange data through that link without the need to establish a Basic Service Set (BSS), and thus, without the need to wait for the association and authentication procedures to complete before exchanging data. For that purpose, IEEE 802.11p enabled stations use the wildcard BSSID (a value of all 1s) in the header of the frames they exchange, and may start sending and receiving data frames as soon as they arrive on the communication channel. Because such stations are neither associated nor authenticated, the authentication and data confidentiality mechanisms provided by the IEEE 802.11 standard (and its amendments) cannot be used. These kinds of functionality must then be provided by higher network layers. IEEE 802.11p standard uses channels within the 75 MHZ bandwidth in the 5.9 GHz band (5.850-5.925 GHZ). This is half the bandwidth, or double the transmission time for a specific data symbol, as used in 802.11a. This allows the receiver to better cope with the characteristics of the radio channel in vehicular communications environments, e.g., the signal echoes reflected from other cars or houses.

Wearables. As used herein, the term "wearable device" (or "wearable") includes a body-borne device (or item) designed or intended to be worn by a human. Such devices are typically comfortably worn on, and are carried or transported by, the human body, and are commonly used to create constant, convenient, seamless, portable, and mostly hands-free access to electronics and computers. The wearable devices may be in direct contact with the human body (such as by touching, or attaching to, the body skin), or may be releasably attachable to clothes or other items intended or designed to be worn on the human body. In general, the goal of wearable technologies is to smoothly incorporate functional, portable electronics and computers into individuals' daily lives. Wearable devices may be releasably attached to the human body using attaching means such as straps, buckles, belts, or clasps. Alternatively or in addition, wearable devices may be shaped, structured, or having a form factor to be body releasably mountable or attachable, such as using eye-glass frames or headphones. Further, wearable devices may be worn under, with, or on top of, clothing.

Wearable devices may interact as sensors or actuators with an organ or part of the human body, such as a head mounted wearable device may include a screen suspended in front of a user's eye, without providing any aid to the user's vision. Examples of wearable devices include watches, glasses, contact lenses, pedometers, chest straps, wristbands, head bands, arm bands, belt, head wear, hats, glasses, watches, sneakers, clothing, pads, e-textiles and smart fabrics, headbands, beanies, and caps, as well as jewelry such as rings, bracelets, and hearing aid-like devices that are designed to look like earrings. A wearable device may be structured, designed, or have a form factor that is identical to, substantially similar to, or is at least in part substitute to, a traditional wearable item.

A wearable device may be a headwear that may be structured, designed, or have a form factor that is identical to, substantially similar to, or is at least in part substitute to, any headwear item. The headwear may be attached to, or be in contact with, a head part, such as a face, nose, right nostril, left nostril, right cheek, left check, right eye, left eye, right car, or left ear, nose, mouth, lip, forehead, or chin. A wearable device may be structured, designed, or have a form factor that is identical to, substantially similar to, or is at least in part substitute to, a bonnet, a cap, a crown, a fillet, a hair cover, a hat, a helmet, a hood, a mask, a turban, a veil, or a wig.

A headwear device may be an eyewear that may be structured, designed, or have a form factor that is identical to, substantially similar to, or is at least in part substitute to, any eyewear item, such as glasses, sunglasses, a contact lens, a blindfold, or a goggle. A headwear device may be an earpiece that may be structured, designed, or have a form factor that is identical to, substantially similar to, or is at least in part substitute to, any earpiece item, such as a hearing aid, a headphone, a headset, or an earplug.

A wearable device may be releasably or permanently attached to, or be part of, a clothing article such as a tie, sweater, jacket, or hat. The attachment may use taping, gluing, pinning, enclosing, encapsulating, or any other method of attachment or integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, or cords.

A wearable device may be releasably or permanently attached to, or be part of, a top underwear such as a bra, camisole, or undershirt, a bottom underwear such as a diaper, panties, plastic pants, slip, thong, underpants, boxer briefs, boxer shorts, or briefs, or a full-body underwear such as bodysuit, long underwear, playsuit, or teddy. Similarly, a wearable device may be releasably or permanently attach to, or be part of, a headwear such as a Baseball cap, Beret, Cap, Fedora, hat, helmet, hood, knit cap, toque, turban, or veil. Similarly, a wearable device may be releasably or permanently attach to, or be part of, a footwear such as an athletic shoe, boot, court shoe, dress shoe, flip-flops, hosiery, sandal, shoe, spats, slipper, sock, or stocking. Further, a wearable device may be releasably or permanently attach to, or be part of, an accessory such as a bandana, belt, bow tie, coin purse, cufflink, cummerbund, gaiters, glasses, gloves, headband, handbag, handkerchief, jewellery, muff, necktie, pocket protector, pocketwatch, sash, scarf, sunglasses, suspenders, umbrella, wallet, or wristwatch.

A wearable device may be releasably or permanently attached to, or be part of, an outwear such as an apron, blazer, British warm, cagoule, cape, chesterfield, coat, covert coat, cut-off, duffle coat, flight jacket, gilet, goggle jacket, guards coat, Harrington jacket, hoodie, jacket, leather jacket, mess jacket, opera coat, overcoat, parka, paletot, pea coat, poncho, raincoat, robe, safari jacket, shawl, shrug, ski suit, sleeved blanket, smoking jacket, sport coat, trench coat, ulster coat, waistcoat, or windbreaker. Similarly, the wearable device may be releasably or permanently attached to, or be part of, a suit (or uniform) such as an academic dress, ball dress, black tie, boilersuit, cleanroom suit, clerical clothing, court dress, gymslip, jumpsuit, kasaya, lab coat, military uniform, morning dress, onesie, pantsuit, red sea rig, romper suit, school uniform, scrubs, stroller, tuxedo, or white tie. Further, a wearable device may be releasably or permanently attach to, or be part of, a dress such as a ball gown, bouffant gown, coatdress, cocktail dress, debutante dress, formal wear, frock, evening gown, gown, house dress, jumper, little black dress, princess line, sheath dress, shirtdress, slip dress, strapless dress, sundress, wedding dress, or wrap dress. Furthermore, a wearable device may be releasably or permanently attach to, or be part of, a skirt such as an A-line skirt, ballerina skirt, denim skirt, men's skirts, miniskirt, pencil skirt, prairie skirt, rah-rah skirt, sarong, Skort, tutu, or wrap. In one example, a wearable device may be releasably or permanently attach to, or be part of, a trousers (or shorts) such as bell-bottoms, bermuda shorts, bondage pants, capri pants, cargo pants, chaps, cycling shorts, dress pants, high water pants, lowrise pants, Jeans, jodhpurs, leggings, overall, Palazzo pants, parachute pants, pedal pushers, phat pants, shorts, slim-fit pants, sweatpants, windpants, or yoga pants. In one example, a wearable device may be releasably or permanently attached to, or be part of, a top such as a blouse, crop top, dress shirt, guayabera, guernsey, halterneck, henley shirt, hoodie, jersey, polo shirt, shirt, sleeveless shirt, sweater, sweater vest, t-shirt, tube top, turtleneck, or twinset.

A wearable device may be structured, designed, or have a form factor that is identical to, substantially similar to, or is at least in part substitute to, a fashion accessory. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. For example, the wearable devices may also be incorporated into pockets, steering wheels, keyboards, pens, and bicycle handles.

In one example, the wearable device may be shaped as, or integrated with, a device that includes an annular member defining an aperture therethrough that is sized for receipt therein of a human body part. The body part may be part of a human hand such as upper arm, elbow, forearm, wrist (such as a wrist-band), or a finger (such as a ring). Alternatively or in addition, the body part may be part of a human head or neck, such as a forehead, ear, skull, or face. Alternatively or in addition, the body part may be part of a human thorax or abdomen, such as the waist or hip. Alternatively or in addition, the body part may be part of a human leg or foot, such as thigh, calf, ankle, instep, knee, or toe.

In one example, the wearable device may be shaped as, or integrated with, a ring. The ring may comprise, consist essentially of or consist of a shank, which is the location that provides an opening for a finger, and a head, which comprises, consists essentially or consists of ornamental features of the ring and in some embodiments houses the signaling assembly of the present device. The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or any combination thereof, or it may be an irregular shape. Further, the head may comprise an upper face that contains and is configured to show one or more jewels and/or ornamental designs.

A mobile communication device that is configured to be worn on an index finger of a user's hand is described in U.S. Patent Application Publication No. 2015/0373443 to Carroll entitled: "Finger-wearable mobile communication device", which is incorporated in its entirety for all purposes as if fully set forth herein. The device includes a case, a microphone, a switch, and a power source. The microphone and the switch are strategically located along with a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions and to provide more private audio input.

A user controls an external electronic device with a finger-ring-mounted touchscreen is described in U.S. Patent Application Publication No. 2015/0277559 to Vescovi et al. entitled: "Devices and Methods for a Ring Computing Device", which is incorporated in its entirety for all purposes as if fully set forth herein. The device includes a computer processor, wireless transceiver, and rechargeable power source; the ring is worn on a first finger receives an input from a second finger, selects one of a plurality of touch events associated with the input, and wirelessly transmits a command associated with the touch event to the external electronic device.

A mobile communication device that comprises a fashion accessory and a signaling assembly is described in U.S. Patent Application Publication No. 2015/0349556 to Mercando et al. entitled: "Mobile Communication Devices", which is incorporated in its entirety for all purposes as if fully set forth herein. The signaling assembly may be configured to provide sensory stimuli such as a flashing LED light and a vibration. These stimuli may vary depending on the signal received from a remote communication device or from gestures made by a user or from information stored in the mobile communication device.

A wearable fitness-monitoring device is described in U.S. Pat. No. 8,948,832 to Hong et al. entitled: "Wearable Heart Rate Monitor", which is incorporated in its entirety for all purposes as if fully set forth herein. The device includes a motion sensor and a photoplethysmographic (PPG) sensor. The PPG sensor includes (i) a periodic light source, (ii) a photo detector, and (iii) circuitry determining a user's heart rate from an output of the photo detector. Some embodiments provide methods for operating a heart rate monitor of a wearable fitness-monitoring device to measure one or more characteristics of a heartbeat waveform. Some embodiments provide methods for operating the wearable fitness monitoring device in a low power state when the device determines that the device is not worn by a user. Some embodiments provide methods for operating the wearable fitness-monitoring device in a normal power state when the device determines that the device is worn by a user.

A wearable device and method for processing mages to prolong battery life are described in U.S. Pat. No. 8,957,988 to Wexler et al. entitled: "Apparatus for processing images to prolong battery life", which is incorporated in its entirety for all purposes as if fully set forth herein. In one implementation, a wearable apparatus may include a wearable image sensor configured to capture a plurality of images from an environment of a user. The wearable apparatus may also include at least one processing device configured to, in a first processing-mode, process representations of the plurality of images to determine a value of at least one capturing parameter for use in capturing at least one subsequent image, and in a second processing-mode, process the representations of the plurality of images to extract information. In addition, the at least one processing device may operate in the first processing-mode when the wearable apparatus is powered by a mobile power source included in the wearable apparatus and may operate in the second processing-mode when the wearable apparatus is powered by an external power source.

A wearable device may be used for notifying a person, such as by using tactile, visual, or audible stimulus, as described for example in U.S. Patent Application No. 2015/0341901 to RYU et al. entitled: "Method and apparatus for providing notification", which is incorporated in its entirety for all purposes as if fully set forth herein, describing an electronic device that includes: a transceiver configured to communicate with at least one wearable device and receive, from the at least one wearable device, status information indicating whether the at least one wearable device is currently being worn; and a processor configured to determine whether to send a notification request to the at least one wearable device based on the status information received by the transceiver.

A communication device, system and method are described for example in U.S. Patent Application No. 2007/0052672 to Ritter et al. entitled: "Communication device, system and method", which is incorporated in its entirety for all purposes as if fully set forth herein. The device comprises a Virtual Retinal Display (VRD) in form of glasses (1), at least one haptic sensor (12) mounted on the frame of the glasses or connected by a short-range communication interface (13) to the glasses (1), wherein it is possible to navigate by means of a cursor through an image displayed by the Virtual Retinal Display (VRD) with the at least one haptic sensor (12). A central control unit controls (11) the Virtual Retinal Display (VRD) and the at least one haptic sensor (12). When the Virtual Retinal Display (VRD) is connected to an external device (2, 9) by a short-range communication interface (13), the user can navigate through the content of the external device (2, 9) by the easy use of the haptic sensor (12).

Wearable communication devices, e.g. implemented in a watch, using short range communication to a cell phone, and facilitating natural and intuitive user interface with low-power implementation are described for example in U.S. Patent Application No. 2014/0045547 to Singamsetty et al. entitled: "Wearable Communication Device and User Interface", which is incorporated in its entirety for all purposes as if fully set forth herein. The devices allow a user to easily access all features of the phone, all while a phone is nearby but not visible. Notification is performed with vibration, an LED light and OLED text display of incoming calls, texts, and calendar events. It allows for hands-free communicating. This allows using the communication device as "remote control" for home devices, etc. via voice and buttons. The device comprises interfaces motion sensors such as accelerometers, magnetometers, and gyroscope, infrared proximity sensors, vibrator motor, and/or voice recognition. Low power consumption is achieved by dynamic configuration of sensor parameters to support only the necessary sensor functions at any given state of the device.

A wearable electronic device that is configured to control and command a variety of wireless devices within its proximity is described in U.S. Pat. No. 7,605,714 to Thompson et al. entitled: "System and method for command and control of wireless devices using a wearable device", which is incorporated in its entirety for all purposes as if fully set forth herein. The wearable device dynamically generates a user interface corresponding to the services of a particular wireless device. Through the user interface, the wireless device surface content to a user and allows a user to select interactions with the wireless devices using the wearable device.

An apparatus and method for the remote control and/or interaction-with electronic-devices such as computers; home-entertainment-systems; media-centers; televisions; DVD-players; VCR-players; music systems; appliances; security systems; toys/games; and/or displays are described in U.S. Pat. No. 8,508,472 to Wieder entitled: "Wearable remote control with a single control button", which is incorporated in its entirety for all purposes as if fully set forth herein. A user may orient a pointer (e.g., laser pointer) to place a pointer-spot on/near object(s) on an active-display(s); and/or a fixed-display(s); and/or on real-world object(s) within a display region or pointer-spot detection-region. Detectors, imager(s) and/or camera(s) may be connected/attached to the display region and/or a structure that is connected/attached to display region. When the user initiates a "select", the detectors/cameras may detect the location of the pointer-spot within the display region. Corresponding to the user's selection(s); control action(s) may be performed on the device(s) being controlled/interacted-with and additional selection-menus may be optionally presented on an active-display.

A hand-worn controller consisting of a housing having a central opening sized to permit the controller to be worn as ring on the index finger of a human hand is described in U.S. Patent Application Publication No. 2006/0164383 to Machin et al. entitled: "Remote controller ring for user interaction", which is incorporated in its entirety for all purposes as if fully set forth herein. A joystick lever projects outwardly from the housing and is positioned to be manipulated by the user's thumb. The joystick operates on or more control devices, such as switches or potentiometers, that produce control signals. A wireless communications device, such as a Bluetooth module, mounted in the housing transmits command signals to a remote utilization device, which are indicative of the motion or position of the joystick lever.

A wearable augmented reality computing apparatus with a display screen, a reflective device, a computing device and a head mounted harness to contain these components is described in U.S. Patent Application Publication No. 2012/0050144 to Morlock entitled: "Wearable augmented reality computing apparatus", which is incorporated in its entirety for all purposes as if fully set forth herein. The display device and reflective device are configured such that a user can see the reflection from the display device superimposed on the view of reality. An embodiment uses a switchable mirror as the reflective device. One usage of the apparatus is for vehicle or pedestrian navigation. The portable display and general-purpose computing device can be combined in a device such as a smartphone. Additional components consist of orientation sensors and non-handheld input devices.

In one example, a wearable device may use, or may be based on, a processor or a microcontroller that is designed for wearable applications, such as the CC2650 SimpleLink™ Multistandard Wireless MCU available from Texas Instruments Incorporated (headquartered in Dallas, Texas, U.S.A.) and described in a Texas Instrument 2015 publication #SWRT022 entitled: "*SimpleLink™ Ultra-Low Power—Wireless Microcontroller Platform*", and in a Texas Instrument 2015 datasheet #SWRS158A (published February 2015, Revised October 2015) entitled: "*CC2650 SimpleLink™ Multistandard Wireless MCU*", which are both incorporated in their entirety for all purposes as if fully set forth herein.

An example of a personal multimedia electronic device, and more particularly to a head-worn device such as an eyeglass frame, is described in U.S. Patent Application No. 2010/0110368 to Chaum entitled: "System and apparatus for eyeglass appliance platform", which is incorporated in its entirety for all purposes as if fully set forth herein. The device is having a plurality of interactive electrical/optical components. In one embodiment, a personal multimedia electronic device includes an eyeglass frame having a side arm and an optic frame; an output device for delivering an output to the wearer; an input device for obtaining an input; and a processor comprising a set of programming instructions for controlling the input device and the output device. The output device is supported by the eyeglass frame and is selected from the group consisting of a speaker, a bone conduction transmitter, an image projector, and a tactile actuator. The input device is supported by the eyeglass frame and is selected from the group consisting of an audio sensor, a tactile sensor, a bone conduction sensor, an image sensor, a body sensor, an environmental sensor, a global positioning system receiver, and an eye tracker. In one embodiment, the processor applies a user interface logic that determines a state of the eyeglass device and determines the output in response to the input and the state.

An example of an eyewear for a user is described in U.S. Patent Application No. 2012/0050668 Howell et al. entitled: "Eyewear with touch-sensitive input surface", which is incorporated in its entirety for all purposes as if fully set forth herein. The eyewear includes an eyewear frame, electrical circuitry at least partially in the eyewear frame, and a touch sensitive input surface on the eyewear frame configured to provide an input to the electrical circuitry to perform a function via touching the touch sensitive input surface. In another embodiment, the eyewear includes a switch with at least two operational states. The operational states of the switch can be configured to be changed by sliding a finger across the touch sensitive input surface of the frame.

An example of a wearable computing device is described in U.S. Patent Application No. 2013/0169513 to Heinrich et al. entitled: "Wearable computing device", which is incorporated in its entirety for all purposes as if fully set forth herein. The device includes a bone conduction transducer, an extension arm, a light pass hole, and a flexible touch pad input circuit. When a user wears the device, the transducer contacts the user's head. A display is attached to a free end of an extension arm. The extension arm is pivotable such that a distance between the display and the user's eye is adjustable to provide the display at an optimum position. The light pass hole may include a light emitting diode and a flash. The touch pad input circuit may be adhered to at least one side arm, such that parting lines are not provided between edges of the circuit and the side arm.

A method for fetching a content from a web server to a client device is disclosed, using tunnel devices serving as intermediate devices is described in U.S. Pat. No. 9,241,044 to Shribman et al. entitled: "System and method for improving internet communication by using intermediate nodes", which is incorporated in its entirety for all purposes as if fully set forth herein (hereinafter—"the '044 patent"). The client device accesses an acceleration server to receive a list of available tunnel devices. The requested content is partitioned into slices, and the client device sends a request for the slices to the available tunnel devices. The tunnel devices in turn fetch the slices from the data server, and send the slices to the client device, where the content is reconstructed from the received slices. The client device may also serve as a tunnel device, serving as an intermediate device to other client devices. Similarly, a tunnel device may also serve as a client device for fetching content from a data server. The selection of tunnel devices to be used by a client device may be in the acceleration server, in the client device, or in both. The partition into slices may be overlapping or non-overlapping, and the same slice (or the whole content) may be fetched via multiple tunnel devices.

In one example, the '044 patent describes an accessing to a data server is improved by using an intermediate device referred to as a 'tunnel' device that is executing a 'tunnel' flowchart. FIG. 5 shows a system 50 including two client devices, a client device #1 31*a* and a client device #2 31*b*, that may access the web servers (data servers) 22*a* and 22*b* using one or more of a tunnel device #1 33*a*, a tunnel device #2 33*b*, and a tunnel device #3 33*c*, under the management and control of an acceleration server 32. These network elements communicate with each other using the Internet 113.

A schematic messaging flow diagram 60 according to the '044 patent describing the client device #1 31*a* related 'content fetch' flowchart and the tunnel device #1 33*a* related flowchart is shown in FIG. 6. A 'Content Request' message 61*a* is first sent from the client device #1 31*a* to the selected tunnel device #1 33*a*, which responds by forwarding the request to the data server #1 22*a* using a 'Content Request' message 61*b*. In turn the data server #1 22*a* replies and sends the content in a 'Send Content' message 61*c* to the requesting tunnel device #1 33*a*, which in turn forward the fetched content to the asking client device #1 31*a* using a 'Send Content' message 61*d*.

While accessing the data server #1 22*a* was exampled above using the tunnel device #1 33*a* as an intermediary device, the system and the client #1 31*a* may use multiple tunnel devices in order to fetch the content from the same data server #1 22*a*. Two, three, four, or any other number of tunnel devices, serving as intermediary devices having the same or similar role as the tunnel device #1 33*a*, may be equally used. In one example, three tunnel devices may be used, such as adding the tunnel device #2 33*b* and the tunnel device #3 33*c*, shown in system 50 in FIG. 5.

In one example, three distinct data paths may be involved in the content fetching. In addition to the messaging data path 60, a messaging flow 60*a* that is shown in FIG. 6*a*, describes the usage of the tunnel device #2 33*b* as an intermediary device, relating to the client device #1 31*a* 'content fetch' related flowchart and the tunnel device #2 33*b* related flowchart. A 'Content Request' message 62*a* is first sent from the client device #1 31*a* to the selected tunnel device #2 33*b*, which responds by forwarding the request to the data server #1 22*a* using a 'Content Request' message 62*b*. In turn the data server #1 22*a* replies and sends the content in a 'Send Content' message 62*c* to the requesting tunnel device #2 33*b*, which in turn forward the fetched content to the asking client device #1 31*a* using a 'Send Content' message 62*d*. Similarly, a messaging flow 60*b* that is shown in FIG. 6*b*, describes the usage of the tunnel device #3 33*c* as an intermediary device, relating to the client device #1 31*a* associated with 'content fetch' in the respective flowchart and with the tunnel device #3 33*c* in the flowchart. The 'Content Request' message 65*a* is first sent from the client device #1 31*a* to the selected tunnel device #3 33*c*, which responds by forwarding the request to the data server #1 22*a* using the 'Content Request' message 65*b*. In turn the data server #1 22*a* replies and sends the content in the 'Send Content' message 65*c* to the requesting tunnel device #3 33*c*, which in turn forward the fetched content to the asking client device #1 31*a* using the 'Send Content' message 65*d*.

A method for fetching a content from a web server to a client device using tunnel devices serving as intermediate devices is disclosed in U.S. Pat. No. 10,880,266 to Shribman et al., entitled: "System and Method for Improving Content Fetching by Selecting Tunnel Devices", which is incorporated in its entirety for all purposes as if fully set forth herein. The tunnel device is selected based on an attribute, such as IP Geolocation. A tunnel bank server stores a list of available tunnels that may be used, associated with values of various attribute types. The tunnel devices initiate communication with the tunnel bank server, and stays connected to it, for allowing a communication session initiated by the tunnel bank server. Upon receiving a request from a client to a content and for specific attribute types and values, a tunnel is selected by the tunnel bank server, and is used as a tunnel for retrieving the required content from the web server, using a standard protocol such as SOCKS, Web Socket or HTTP Proxy. The client only communicates with a super proxy server that manages the content fetching scheme.

A method for providing and managing non-direct URL fetching service for retrieving a content from a web server to a client device, such as for overcoming geo-blocking or a Man-In-The-Middle (MITM) attack, is disclosed in U.S. Patent Application Publication No. 2022/0103525 to Shribman et al., entitled: "System and Method for Managing Non-Direct URL Fetching Service", which is incorporated in its entirety for all purposes as if fully set forth herein. The non-direct fetching method may use intermediate devices, such as proxy server, Data-Center proxy server, tunnel devices, or any combination thereof. A URL request may be sent in parallel using both direct and non-direct fetching schemes, in order to verify the need for using the non-direct fetching service. Direct or non-direct fetching scheme may be selected by using a file that associates a fetching scheme to the requested URL. The selection of the fetching mechanism may use dynamically in real-time updating of a Proxy Auto-Configuration (PAC) file. As part of an accounting scheme, quotas may be applied to a cumulative received data or a time duration of using a non-direct fetching service.

A method for overcoming intermittent, temporary, or other fetching failures by using multiple attempts for retrieving a content from a web server to a client device, is disclosed in U.S. Pat. No. 10,963,531 to Shribman et al. entitled: "System and Method for URL Fetching Retry Mechanism", which is incorporated in its entirety for all purposes as if fully set forth herein. The URL fetching may use direct or non-direct fetching schemes, or a combination thereof. The non-direct fetching method may use intermediate devices, such as proxy server, Data-Center proxy server, tunnel devices, or any combination thereof. Upon sensing a failure of a fetching action, the action is repeated using the same or different parameters or attributes, such as by using different intermediate devices, selected based on different parameters or attributes, such as different countries. The repetitions are limited to a pre-defined maximum number or attempts. The fetching attempts may be performed by the client device, by an intermediate device in a non-direct fetching scheme, or a combination thereof. Various fetching schemes may be used sequentially until the content is retrieved.

An aggregation or combination of Content or Application Delivery Networks is described in U.S. Pat. No. 9,378,473 to Wolfe entitled: "Content and application delivery network aggregation", which is incorporated in its entirety for all purposes as if fully set forth herein. The aggregation or combination is used to improve the quality of service, including the delivery of content and media on a city, state, country and international basis. The aggregation is formed by combining multiple CDNs or ADNs so that a larger server and network footprint is created. The benefits of each CDN or ADN are aggregated to produce a better CDN/ADN service to the customer and end users.

Systems and techniques for transparently intercepting and optimizing resource requests are described in U.S. Patent Application Publication No. 2015/0163087 to Conner et al. entitled: "Transparently intercepting and optimizing resource requests", which is incorporated in its entirety for all purposes as if fully set forth herein. Some embodiments can send a request to a server. In response to the request, the embodiments can receive a first script and at least a second script from the server, wherein the first script includes instructions for intercepting invocations to a set of functions, and wherein the second script includes at least one invocation to at least one function in the set of functions. The first script can then be executed, thereby causing subsequent invocations to each function in the set of functions to be intercepted by a corresponding resource optimization handler. Next, the second script can be executed. When the executing second script invokes a function in the set of functions, the invocation of the function can be intercepted, and a resource optimization handler corresponding to the function can be invoked instead of invoking the function.

A system and method of relaying all requests of a session through a single exit node or proxy server are disclosed in U.S. Pat. No. 10,972,436 to Simanel et al entitled: "System and method for session affinity in proxy media routing", which is incorporated in its entirety for all purposes as if fully set forth herein. The method comprises several steps, such as relaying a request through a dedicated proxy media streaming server, hashing session identifier value, and transmitting it across different protocols. The system assigns a unique identifier to a session. The unique identifier is inserted in various protocols and communicated to a proxy server provider. All subsequent requests are serviced through the same last-mile proxy server or exit node.

A method and apparatus for establishing a trust relationship between users are disclosed in U.S. Patent Application Publication No. 2021/0226933 to PUZERIS et al. entitled: "Sharing encrypted items with participants verification", which is incorporated in its entirety for all purposes as if fully set forth herein. The apparatus includes at least two user devices containing the Application, a service provider server (SPS) comprising an Application Programming Interface (API), a network communicably coupling the sender device, the receiver device and the SPS, and an out-of-band (OOB) channel, separate from the network, communicably coupling the sender device and the receiver device. The method includes obtaining a receiver's Public Key provided by an Application Programming Interface (API) on a service provider server, encrypting a verification message with the Receiver's Public key and the Sender's Private Key, sending the encrypted verification message from the Sender's device to the Receiver's device through the out-of-band channel, decrypting the encrypted verification message using Receiver's Private Key and Sender's Public Key, and communicating decrypted verification message via out-of-band channel.

A method for improving VPN service transmission quality where end-to-end TCP connections, occurring over a VPN tunnel, are terminated at the VPN concentrator and converted into multi-part TCP connections with MSS parameter set independently for each part of the connectivity, is disclosed in U.S. Pat. No. 11,050,587 to Norbutas et al. entitled: "Multi-part TCP connection over VPN", which is incorporated in its entirety for all purposes as if fully set forth herein. To facilitate the termination and multi-part connection management a packet processing software may be implemented as part of the VPN concentrator functionality or as an independent component.

Systems and methods for effectively managing security and privacy measures during a user's connectivity session with a VPN service are disclosed in U.S. Patent Application Publication No. 2021/0392112 to NAGROCKAS et al. entitled: "Enhanced privacy-preserving access to a vpn service", which is incorporated in its entirety for all purposes as if fully set forth herein. The systems and methods use a computer program that introduces a double-NAT feature at the network layer and a temporary hash table containing the minimally necessary temporary data to link two NAT sessions together in a secure manner. The systems and methods avoid including the dynamic management of IP addresses or requiring each client to have an IP address assigned beforehand to avoid compromising the user's identity by hard linking the session traces with the client Systems and methods for blurring connection information in virtual private networks are disclosed in U.S. Pat. No. 11,196,719 to Nedzinskas entitled: "System and method for blurring connection information in virtual private networks", which is incorporated in its entirety for all purposes as if fully set forth herein. In some embodiments, a method of blurring VPN connection metadata may comprise: receiving, by a VPN service provider infrastructure, a request from a user device to establish a VPN connection with one or more VPN servers, wherein the VPN service provider infrastructure includes a logic engine configured to perform statistical blurring of VPN connection metadata; establishing a connection between the user device and one or more target sites during a VPN session; receiving, from the one or more VPN servers, VPN connection metadata associated with the user's VPN connections and a user identifier associated with the user; performing statistical blurring of VPN connection metadata by modifying the VPN connection metadata using an unknown random value to create blurred connection metadata; and storing the blurred connection metadata in association with the user identifier received.

A computer having a processor configured to execute a set of instructions to render a customized version of a document object model with part of the content rendered being User Interface elements is disclosed in U.S. Patent Application Publication No. 2022/0043546 to GLEZERIS et al. entitled: "Selective server-side rendering of scripted web page interactivity elements", which is incorporated in its entirety for all purposes as if fully set forth herein. A scripted UI element in a document object model is identified and at least one rule associated with the UI elements is accessed. At least one rule is applied to the scripted UI element to generate a modified document object model which is then rendered server-side. The present application relates to server-side rendering techniques in Web content delivery; content filtering based on user-specific and context-based requirements; and efficiency techniques.

Embodiment that relates to a method and a system for dynamically identifying the optimal servers from among a plurality of VPN servers, are disclosed in U.S. Pat. No. 11,245,670 to Celiesius et al. entitled: "Dynamic system and method for identifying optimal servers in a virtual private network", which is incorporated in its entirety for all purposes as if fully set forth herein. The method and system to score or rank the plurality of VPN servers through mathematical operations to produce a scored list of servers. The servers are dynamically scored based on several server conditions including but not limited to server location, server hub score, server creation time, server load, and other like information. The method and system further calculate server penalty scores for a plurality of VPN servers and dynamically identifies optimal servers based on the least server penalty score. Further, the method and system provide means for the VPN service provider to direct their users to connect with the optimal servers consistently.

The task, logic of HTTP/HTTPS session statistics interception and collection is moved to the client side instead of the proxy layer, is disclosed in U.S. Pat. No. 10,637,956 to Juravicius et al. entitled "Smart proxy rotator", which is incorporated in its entirety for all purposes as if fully set forth herein. An encrypted HTTPS tunnel is terminated at the client end, making the actual content or data in transit invisible to both proxies and the smart proxy rotator (SPR). The client's scraping software has a plug-in installed that expands its functionality. HTTP/HTTPS session quality metrics are intercepted and collected at the client side, then sent to the SPR. A proxy usage mark "can be used" is obtained from the SPR for the currently analyzed proxy, based on the results of metrics analysis.

Systems and methods of task implementation that are extended as provided herein and target the web crawling process through a step of submitting a request by a customer to a web crawler are disclosed in U.S. Pat. No. 10,965,770 to Vilcinskas et al. entitled: "Dynamic optimization of request parameters for proxy server", which is incorporated in its entirety for all purposes as if fully set forth herein. The systems and methods allow a more complex request for a web crawler to be defined in order to receive more specific data. In one aspect, a method for data extraction and gathering from a Network by a Service provider infrastructure include the following steps: checking the parameters of a request received from a User's Device, adjusting the request parameters according to pre-established Scraping logic, selecting a Proxy according to the criteria of the pre-established Scraping logic, sending the adjusted request to the Target through the selected Proxy, checking metadata received from the Target, and forwarding the data to the User's device.

Embodiments that disclose a system that allows for the improved generation of web requests for scraping are disclosed in U.S. Pat. No. 11,204,971 to Vilcinskas et al. entitled: "Token-based authentication for a proxy web scraping service", which is incorporated in its entirety for all purposes as if fully set forth herein. Because of the nature of the requests and time and manner they are sent out, appear more organic, as in human generated, than conventional automated scraping systems. The system then manages how a client request to scrape a target website is made to the site, masking the request in a manner that makes it appear to the Web server as if the request is not generated by an automated system. In this way, by appearing more organic, Web servers may be less likely to block requests from the disclosed system or may take longer to block requests from the disclosed system. By avoiding Web servers blocking requests and extending the lifetime of IP proxies before they are blocked, embodiments can use a limited IP proxy address space more efficiently.

Web page scripts that are managed in a network using a network appliance are disclosed in U.S. Pat. No. 9,503,498 to Burckart et al. entitled: "Web page script management", which is incorporated in its entirety for all purposes as if fully set forth herein. The network appliance intercepts a web page sent from a server and addressed to a client browser; modifies the web page by removing an embedded script from the web page; executes the removed embedded script; and sends the modified web page from the network appliance to the client browser.

Systems and methods for effectively managing exit nodes are provided in U.S. Pat. No. 10,873,647 to Pilkauskas et al. entitled: "Exit node benchmark feature", which is incorporated in its entirety for all purposes as if fully set forth herein. The exemplary systems and methods use a Supernode to examine an Exit Node through sending and receiving a request to a Target. Information about the exit node is then stored into the Supernode. According to the information provided from the Supernode, the Exit Nodes Database systemizes the proxies according to availability and provides available exit nodes to a User Device.

Empirical data of exit nodes are continuously monitored and each exit node's overall performance and available capacity are calculated, as described in U.S. Pat. No. 11,184,458 to Suckel entitled: "Proxy selection by monitoring quality and available capacity", which is incorporated in its entirety for all purposes as if fully set forth herein. The empirical data can include monitoring the number of concurrent requests currently being executed by each exit node and the disconnection chronology of each exit node. Further, each exit node is tested by benchmark requests and ping messages and each exit node's quality rate is calculated. Additionally, systems and methods are provided to select an exit node with the highest quality and available capacity value, from a particular pool to route the user request.

System and method for efficiently implementing scalable, highly efficient decentralized proxy services through proxy infrastructures situated in different geo-locations are disclosed in U.S. Pat. No. 11,212,354 to Pilkauskas et al. entitled: "Methods and systems for implementing a regionally contiguous proxy service", which is incorporated in its entirety for all purposes as if fully set forth herein. In one aspect, the systems and methods enable users from any geographical location to send requests to the geographically closest proxy infrastructure. One exemplary method described allows proxy infrastructures to gather, classify, and store metadata of exit nodes in its internal database. In another aspect, systems and methods described herein enable proxy infrastructures to select metadata of exit nodes from its internal database and forward requests from a user device to respective proxy servers or proxy supernodes to which the selected exit nodes are connected.

A method and a system that detect if proxies are used by a user from a web server's side are disclosed in U.S. Pat. No. 11,196,712 to Norbutas entitled: "Proxy scraper detector", which is incorporated in its entirety for all purposes as if fully set forth herein. The method and system use HTTP/2 and HTTP/3 protocols and, more precisely, the ping frames to test the round-trip time of messages between a web server and a user. At the same time, a web server uses an Internet Control Message Protocol echo requests to measure the round-trip time to an IP address. A web server can then compare, aggregate, and analyze different round trip times and determine if they are coming from different sources, i.e., if a user is using a proxy server. A web server can make decisions based on the comparison of round-trip times. For example, a difference in a single user's round-trip times may trigger a restrictive user policy at the web server's end and a web server can decide to return the requested content, return an error message, or ban them and similarly limit services.

Systems and methods of web crawling/scraping process implementation that are extended and target the web crawling process by submitting a request by a last-mile proxy to a web target, are disclosed in U.S. Pat. No. 11,196,833 to Norbutas entitled: "Proxy server synchronizer", which is incorporated in its entirety for all purposes as if fully set forth herein. The systems and methods allow a request for a web crawler to be directed toward the target content platform through a proxy, or a plurality of proxies, for the purpose of optimizing the processing of the request. In at least one aspect, the systems and methods disclosed mitigate the potential for a negative evaluation of the requests by the content platform targeted through introducing the transfer of the execution of the steps within a scraping flow within the last-mile proxy system, thus aligning both network and application layer responses to the tests described.

A system and method of forming proxy server pools are disclosed in U.S. Patent Application Publication No. 2022/0070271 to Vasiliauskas et al. entitled: "Curating proxy server pools", which is incorporated in its entirety for all purposes as if fully set forth herein. The method comprises several steps, such as requesting a pool to execute the user's request and retrieving an initial group. The system checks the service history of an initial group, including whether any of the proxy servers in an initial group are exclusive to existing pools. The exclusive proxy servers in an initial group with eligible proxy servers are replaced when needed and new proxy server pools are formed. The system also records the service history of proxy servers and pools before and after the pools are created. The method can also involve predicting the pool health in relation with the thresholds foreseen and replacing the proxy servers below the threshold.

A System that provides a secured connection between servers on the LAN and clients on the WAN that comprises the LAN (which includes LAN Server and LAN Controller) and the DMZ (which includes DMZ Server and DMZ Stack Pool Service), is disclosed in U.S. Pat. No. 9,935,958 to Mizhar entitled: "Reverse access method for securing front-end applications and others", which is incorporated in its entirety for all purposes as if fully set forth herein. Wherein the Client Request reaches the DMZ Server it stores it in the DMZ Stack Pool Service and the LAN Controller establishes outbound TCP based connection to the DMZ Stack Pool Service that passes the Client Connection Information to the LAN Server via the LAN Controller. Then the LAN Server then generates a connection between the Service and DMZ Server.

A business action fraud detection system for a website that includes a business action classifier to classify a series of operations from a single web session as a business action is disclosed in U.S. Patent Application Publication No. 2015/0363791 to RAZ et al. entitled: "Business action based fraud detection system and method", which is incorporated in its entirety for all purposes as if fully set forth herein. The system also includes a fraud detection processor to determine a score for each operation from the statistical comparison of the data of each request forming part of the operation against statistical models generated from data received in a training phase and the score combining probabilities that the transmission and navigation activity of a session are those expected of a normal user.

A system called Crowds for protecting users' anonymity on the world-wide-web. Crowds, named for the notion of "blending into a crowd," operates by grouping users into a large and geographically diverse group (crowd) that collectively issues requests on behalf of its members, and is described in an article entitled: "*Crowds: anonymity for Web transactions*" by Michael K. Reiter and Aviel D. Rubin, published in 'ACM Transactions on Information and System Security Volume 1 Issue 1' [November 1998, pp 66-92—doi.org/10.1145/290163.290168], which is incorporated in its entirety for all purposes as if fully set forth herein. Web servers are unable to learn the true source of a request because it is equally likely to have originated from any member of the crowd, and even collaborating crowd members cannot distinguish the originator of a request from a member who is merely forwarding the request on behalf of another. The design, implementation, security, performance, and scalability of the system is described. The security analysis introduces degrees of anonymity as an important tool for describing and proving anonymity properties.

Proxy servers are critical to the success of virtually every large Web and intranet site. The technology in depth and how to optimize any proxy server in any environment are described in a book entitled: "*Web Proxy Servers*" by Ari Luotonen, published 1998 by Prentice Hall PTR, which is incorporated in its entirety for all purposes as if fully set forth herein. The book provides understanding of the basic architecture of proxy servers, and compares firewall proxy servers, departmental, personal and specialized proxies. The book explains how proxy servers handle every major Internet protocol, including HTTP, FTP, Gopher, News, SSL, WAIS, Telnet and LDAP, and further explains how to implement filtering by URLs or PICS content ratings. The book further reviews proxy server caching in unprecedented depth, including: guaranteeing the freshness of cached documents measuring and optimizing cache "hit ratios" on-demand and on-command caching Web-based advertising.

Proxychain is an open-source software application on the Linux operating system (such as a web browser) and Unix-like operating systems to communicate with a target server (such as a web server) through a proxy or a chain of proxies. The Proxychain publicly available source code version 1.8 was released at least as early as Oct. 20, 2004, which is incorporated in its entirety for all purposes as if fully set forth herein, shows the implementation of proxy tunneling functionality, as well as client's ability to select proxies from a list by IP address. The Proxychain software application redirects a user's TCP clients to communicate through a designated proxy or chain of proxies, and includes the steps of identifying, selecting, sending, and receiving.

Proxifier is software for Microsoft Windows and OSX (later known as MacOS) that provides functionality similar to Proxychains, is described in a web-site proxifier.com published February 2008, which is incorporated in its entirety for all purposes as if fully set forth herein. The Proxifier software application redirects a computer's networking connection through a proxy or chain of proxies.

Using the Internet is not anonymous, since the Internet is a packet-switching network, every IP packet must carry the IP addresses of both communication endpoints. Consequently, anyone capable of observing at least one packet of a communication relationship can tell who is communicating with whom. The problem with this lack of anonymity is that it limits the privacy protection of Internet users. Privacy issues in the Internet are usually addressed by legislations that require operators of servers to clearly state their privacy practices and by encrypting the application data exchanged between two communicating parties. In general, privacy practices are difficult to enforce and encrypting the application data does not hide the IP addresses in the IP packets. However, learning the endpoints of communications relationships often reveals a lot of information about individual Internet users' preferences, habits, and problems; for instance, when accessing web sites that provide medical information, religious sites, or the web site of a credit institution. These privacy issues can only be solved by enabling anonymous Internet communication.

A doctoral thesis entitled: "*MorphMix: a peer-to-peer-based system for anonymous internet access*" by Rennhard, Marc published 2004 [ISBN: 3-8322-2651-6], which is incorporated in its entirety for all purposes as if fully set forth herein, describes the problem of achieving anonymous Internet access for low-latency applications such as web browsing. With anonymous Internet access, a client can connect to and communicate with a server such that the server does not learn the client's IP address, and an attacker interested in learning who is communicating with whom cannot find out the IP addresses of both client and server. Unlike encryption, anonymity cannot be "produced" by the communication endpoints themselves, but must be provided by a third-party infrastructure. The concept of mix networks is widely considered to be the most promising approach for such an infrastructure, and consequently, the thesis focuses on mix networks. The main contribution of the thesis is MorphMix, which fulfils the principal goal of this thesis: to develop a practical mix network that enables anonymous low-latency Internet access for a large number of users. Practically, it means that (1) everybody owning a state-of-the-art computer connected to the Internet can use the system, (2) the performance it offers is good enough such that users won't turn away from it, (3) it provides good protection from attacks by a realistic adversary, and (4) it scales well and can handle a large number of users.

The thesis analyses traditional mix networks that strictly separate between the mix network infrastructure and clients that access servers through the mix network. The conclusion is that traditional mix networks are not well suited to achieve our principal goal for various reasons. To overcome their limitations, MorphMix is proposed, which presents a novel way of operating and organising a mix network. In contrast to traditional mix networks, MorphMix does no longer distinguish between clients and the mix network. Rather, the clients themselves build the mix network infrastructure in a peer-to-peer fashion. After describing the basic functionality of MorphMix, we give detailed analyses to show that MorphMix scales very well and provides good protection from a realistic adversary. To analyse the performance MorphMix offers to its users, a simulator is implemented. The simulation results show that the expected performance of MorphMix is indeed good enough to attract users, and that the requirements to use MorphMix are modest. the complete MorphMix protocol is also specified and a prototype was implemented.

The application of ICPv2 (Internet Cache Protocol version 2, RFC2186) to Web caching and various issues of ICP deployment, efficiency, security, and interaction with other aspects of Web traffic behavior, are described in IETF RFC 2187 entitled: "*Application of Internet Cache Protocol* (*ICP*), *version* 2" to K. Claffy, dated September 1997, which is incorporated in its entirety for all purposes as if fully set forth herein. ICPv2 is a lightweight message format used for communication among Web caches. Several independent caching implementations now use ICP, making it important to codify the existing practical uses of ICP for those trying to implement, deploy, and extend its use. ICP queries and replies refer to the existence of URLs (or objects) in neighbor caches. Caches exchange ICP messages and use the gathered information to select the most appropriate location from which to retrieve an object. A companion document (RFC2186) describes the format and syntax of the protocol itself.

IETF RFC 1738 entitled: "*Uniform Resource Locators* (*URL*)" to T. Berners-Lee et al. dated December 1994, which is incorporated in its entirety for all purposes as if fully set forth herein, specifies a Uniform Resource Locator (URL), the syntax and semantics of formalized information for location and access of resources via the Internet.

IETF RFC 1918 entitled: "*Address Allocation for Private Internets*" to B. Moskowitz et al. dated February 1996, which is incorporated in its entirety for all purposes as if fully set forth herein, describes address allocation for private internets. The allocation permits full network layer connectivity among all hosts inside an enterprise as well as among all public hosts of different enterprises. The cost of using private internet address space is the potentially costly effort to renumber hosts and networks between public and private.

IETF RFC 2817 is a memo entitled: "*Upgrading to TLS Within HTTP*/1.1" to R. Khare et al. dated May 2000, and is incorporated in its entirety for all purposes as if fully set forth herein, describes address allocation for private internets. This memo explains how to use the Upgrade mechanism in HTTP/1.1 to initiate Transport Layer Security (TLS) over an existing TCP connection. This allows unsecured and secured HTTP traffic to share the same well-known port (in this case, http: at 80 rather than https: at 443). It also enables "virtual hosting", so a single HTTP+TLS server can disambiguate traffic intended for several hostnames at a single IP address. Since HTTP/1.1 defines Upgrade as a hop-by-hop mechanism, this memo also documents the HTTP CONNECT method for establishing end-to-end tunnels across HTTP proxies. Finally, this memo establishes new IANA registries for public HTTP status codes, as well as public or private upgrade product tokens.

A method and apparatus for dynamic proxy insertion in network traffic path is described in U.S. Pat. No. 6,701,374 to Gupta et al. entitled: "Method and apparatus for dynamic proxy insertion in network traffic flow", which is incorporated in its entirety for all purposes as if fully set forth herein. According to one or more embodiments of the invention, a request and/or response message may be modified to include one or more thru-proxy tags to identify a network (or traffic) node (e.g., a proxy, server, or intermediary). For example, a request directed to a server or a response directed to a client may be altered to insert a plurality of intermediate or final destination designations. In so doing, a path of a request or response may be altered dynamically. A thru-proxy tag in a response may be inserted in a related request to identify a destination or node such that the request is sent to the destination in the thru-proxy tag before being sent to an origin server. Thru-proxy tags may be used to identify multiple and/or alternate destinations.

A system having a server, a client and plural proxy servers is described in U.S. Pat. No. 6,513,061 to Ebata et al. entitled: "Proxy server selecting server and proxy server", which is incorporated in its entirety for all purposes as if fully set forth herein. In an internet having a server for providing service, a client for receiving the service, plural proxy servers for standing proxy for an access to the server done by the client, and a proxy server selecting a server for noticing an IP (Internet Protocol) corresponding to a domain name of the client in response to an inquiry with the domain name added thereon, the proxy sever selecting server receives a request message with the domain name of the server for providing the target service from the client. Then, the proxy server selecting server notifies the client of the IP address of the most approximate server to the client in place of the IP address of the server, based on the physical/logical location information, and if necessary, the periodically obtained load information of the proxy servers. The client recognizes the proxy server of the IP address given thereto as the server for providing the target service and then makes access to the proxy server.

A system for protecting identify of network devices (102, 104, and 106) in a network environment is disclosed in U.S. Patent Application Publication No. 2008/0196098 to Cottrell et al. entitled: "System For Protecting Identity in a Network Environment", which is incorporated in its entirety for all purposes as if fully set forth herein. The system includes an apparatus having an interface to the network for completing connections to destination devices (152, 154, and 156) on the public side of the network. The apparatus includes a masking element (140) for associating at least one masking identifier with a communication from the network device and masking the identifier of the network device from the destination device.

A system and method for evaluating the effectiveness of data encryption for hiding the identity of the source of Web traffic are disclosed in U.S. Patent Application Publication No. 2006/0059091 to Wang et al. entitled: "System and method for evaluating and enhancing source anonymity for encrypted web traffic", which is incorporated in its entirety for all purposes as if fully set forth herein. A signature is constructed from encrypted Web traffic for a Web page sent by a target Web site, and the signature is compared with archived traffic signatures obtained by accessing various Web pages of interest in advance. If the signature of the detected encrypted Web traffic matches a stored traffic signature beyond a pre-set statistical threshold, a positive match is found, and the source of the traffic is identified. Countermeasures for reducing the reliability of source identification based on traffic signature matching are provided.

Processing a browser request that specifies a destination network resource is disclosed in U.S. Pat. No. 7,401,115 to Arsenault entitled: "Processing selected browser requests", which is incorporated in its entirety for all purposes as if fully set forth herein. The processing generally includes intercepting a browser request that specifies a selected destination network resource and redirecting the browser request to a network server that differs from the destination resource specified by the browser request. Processing a browser request also may include intercepting a browser request received from a client computer at a proxy server when the browser request specifies a selected destination network resource and performing instructions associated with and in addition to instructions performed to download the selected destination network resource.

A system and method for communication in a wide area network comprises a client, first proxy, second proxy, and one or more server computers each having a data processing means, data storing means, and operating system and all interconnected via a wide area network such as the Internet, is disclosed in U.S. Patent Application Publication No. 2003/0149720 to Goldstein entitled: "System and method for accelerating internet access", which is incorporated in its entirety for all purposes as if fully set forth herein. The first proxy computer is enabled for communication with the server computer using an application layer protocol. The second proxy computer is placed local to the client computer and is enabled by a special optimizing protocol for communication with the first proxy computer. The second proxy computer is enabled for communication with the client computer using the application layer protocol.

A method for routing content information to a mobile user or client application is disclosed in U.S. Patent Application Publication No. 2006/0206586 to Ling et al. entitled: "Method, apparatus and system for a location-based uniform resource locator", which is incorporated in its entirety for all purposes as if fully set forth herein. The method preferably comprises re-directing a user request to one or more gateway servers provided via an overlay network. In another aspect, the present invention is an apparatus that includes a proxy service that intercepts content information requests to the Internet and re-directs the content requests to an overlay. Another aspect of the present invention comprises a location-based Uniform Resource Locator that includes a protocol semantic portion and a location-based resolver address portion that identifies one or more resources on a network based on the geographical location of the resources.

A cellular telephone for use with a cellular telephone network includes a GPS receiver section is disclosed in U.S. Patent Application Publication No. 2006/0293052 to Orler et al. entitled: "Method and apparatus for transmitting position data using control channels in wireless networks", which is incorporated in its entirety for all purposes as if fully set forth herein. Position determination related information is transmitted to and from the cellular telephone using a control channel.

Methods and apparatuses are provided for facilitating interaction with touch screen apparatuses are disclosed in U.S. Patent Application Publication No. 2010/0105443 to Vaisanen et al. entitled: "Methods and apparatuses for facilitating interaction with touch screen apparatuses", which is incorporated in its entirety for all purposes as if fully set forth herein. The method may include detecting a touch interaction with a touch screen display, and may further include identifying the touch interaction as comprising a trigger touch interaction. The trigger touch interaction may include sliding an input object along a path from a point of origin outside of an active region of the touch screen display to a point within the active region. The method may further include determining, based at least in part upon the trigger touch interaction, a function associated with the trigger touch interaction. The method may additionally include executing the determined function. Corresponding apparatuses are also provided.

A variety of techniques for accelerating and optimizing network traffic, such as HTTP based network traffic, are disclosed in U.S. Patent Application Publication No. 2008/0228938 to Plamondon entitled: "Systems and methods for prefetching objects for caching using qos", which is incorporated in its entirety for all purposes as if fully set forth herein. The solution described herein provides techniques in the areas of proxy caching, protocol acceleration, domain name resolution acceleration as well as compression improvements. In some cases, the present solution provides various prefetching and/or pre-freshening techniques to improve intermediary or proxy caching, such as HTTP proxy caching. In other cases, the present solution provides techniques for accelerating a protocol by improving the efficiency of obtaining and servicing data from an originating server to server to clients. In another cases, the present solution accelerates domain name resolution more quickly. As every HTTP access starts with a URL that includes a hostname that must be resolved via domain name resolution into an IP address, the present solution helps accelerate HTTP access. In some cases, the present solution improves compression techniques by prefetching non-cacheable and cacheable content to use for compressing network traffic, such as HTTP. The acceleration and optimization techniques described herein may be deployed on the client as a client agent or as part of a browser, as well as on any type and form of intermediary device, such as an appliance, proxying device or any type of interception caching and/or proxying device.

A system, method and apparatus for media streaming are disclosed in in U.S. Patent Application Publication No. 2009/0055471 to Kozat et al. entitled: "Media streaming with online caching and peer-to-peer forwarding", which is incorporated in its entirety for all purposes as if fully set forth herein. In one embodiment, the system comprises one or more media servers to serve media content and a plurality of peers communicably coupled to one or more other peers of the plurality of peers and at least one of the one or more media servers to receive segments of media content, where at least one of peers allocates a set of resources for serving the segments of media content including cache memory to store the segments and media files and uplink bandwidth to send the segments of media content to the one or more peers to which the one peer is communicably coupled. The system also includes a first control server to track media content demand and the allocated resources of the plurality of peers to determine which peer should cache which segment of the media file and to return peer location information specifying the one or more peer locations from which each peer is to receive each segment of each media content requested. The control server is operable to send the location information to each peer. In one embodiment, the one control server is also operable to calculate a utility of each caching option and enforce it by sending triggers to the peers to initiate the caching at those peers.

A computer-implemented method for using tunnels with security as a service is disclosed in U.S. Patent Application Publication No. 2016/0352628 to Reddy et al. entitled: "Differentiated quality of service using tunnels with security as a service", which is incorporated in its entirety for all purposes as if fully set forth herein. The method includes sending a first request message to a first server associated with a first access network indicative of a request for an indication of whether the first server is configured to support prioritization of tunneled traffic, receiving a first response message from the first server indicative of whether the first server is configured to support prioritization of tunneled traffic, establishing one or more first tunnels with a security service when the first response message is indicative that the first server is configured to support prioritization of tunneled traffic, sending first flow characteristics and a first tunnel identifier to the first server; and receiving the first flow characteristics for each first tunnel from the first server at a first network controller. The first network controller is configured to apply a quality-of-service policy within the first access network for each tunnel in accordance with the flow characteristics.

A method and apparatus for peer-to-peer services are disclosed in U.S. Patent Application Publication No. 2003/0009518 to Harrow et al. entitled: "Method and apparatus for peer-to-peer services", which is incorporated in its entirety for all purposes as if fully set forth herein. The invention provides a capability whereby network traffic may be shifted to another network may allow more efficient transfer of information, data, etc. One such example of shifting network traffic may be shifting WAN traffic to LAN peer-to-peer traffic.

A routing mechanism, service or system operable in a distributed networking environment, is disclosed in U.S. Patent Application Publication No. 2008/0008089 to Bornstein et al. entitled: "Optimal route selection in a content delivery network", which is incorporated in its entirety for all purposes as if fully set forth herein. One preferred environment is a content delivery network (CDN) wherein the present invention provides improved connectivity back to an origin server, especially for HTTP traffic. In a CDN, edge servers are typically organized into regions, with each region comprising a set of content servers that preferably operate in a peer-to-peer manner and share data across a common backbone such as a local area network (LAN). The inventive routing technique enables an edge server operating within a given CDN region to retrieve content (cacheable, non-cacheable and the like) from an origin server more efficiently by selectively routing through the CDN's own nodes, thereby avoiding network congestion and hot spots. The invention enables an edge server to fetch content from an origin server through an intermediate CDN server or, more generally, enables an edge server within a given first region to fetch content from the origin server through an intermediate CDN region.

A method and system for augmenting conventional search engine results with peer-to-peer search results are disclosed in U.S. Patent Application Publication No. 2002/0073075 to Dutta et al. entitled: "Method and system for augmenting web-indexed search engine results with peer-to-peer search results", which is incorporated in its entirety for all purposes as if fully set forth herein. Rather than relying solely on an index search in a database that has only indexed a minor portion of the entire World Wide Web, a server-based, peer-to-peer search is initiated in conjunction with the index search. The results from both search processes can be combined so that the user receives an augmented search result with more information than a search result from either process by itself. The entities that are involved in the search can also establish financially rewarding relationships. The server operator agrees to share a percentage of its revenue with peer-to-peer nodes as an incentive to join its registered set of root nodes and expand its peer-to-peer connections. The identified sources of information that provided the search hits can be used by the operator of the search engine in a compensation transaction. While these compensation transactions may be monetary in nature, other compensation schemes may be used, such as reward program points, coupons, micropayments, cashbacks, rebates, frequent flyer miles, etc. The registered operator/owner can supply an indication as to the preferred type of compensation. In addition, information such as a bank account number, reward program account number, etc., may be needed to complete the compensation transaction.

A system, method, and computer-readable medium for request routing based on client location information are disclosed in U.S. Patent Application Publication No. 2010/0125673 to Richardson entitled: "Request routing utilizing client location information", which is incorporated in its entirety for all purposes as if fully set forth herein. A content delivery network service provider receives a DNS query from a client computing device. The DNS query corresponds to a resource identifier for requested content from the client computing device. The content delivery network service provider transmits an alternative resource identifier in response to the client computing device DNS query. The alternative resource identifier is selected as a function of client location information. The client location information is obtained from information corresponding to a mapping of at least partial IP addresses to known locations. The client computing device then issues a second DNS query to the same content delivery network service provider. The content delivery network service provider can then either resolve the second DNS query with an IP address of a cache component or transmit another alternative resource identifier that will resolve to the content delivery network service provider. The process can repeat with the content delivery network service provider's network until a DNS server resolves a DNS query from the client computing device.

Methods and systems for routing packets in a vpn-client-to-vpn-client connection is disclosed in U.S. Patent Application Publication No. 2008/0034416 to Kumar et al. entitled: "Methods and systems for routing packets in a vpn-client-to-vpn-client connection via an ssl/vpn network appliance", which is incorporated in its entirety for all purposes as if fully set forth herein. In the method and the system for routing packets between clients, a packet is received from a first client connected to a secure sockets layer virtual private network (an SSL/VPN) network appliance. An identification is made, responsive to an inspection of the received packet, of i) a type of connection required for transmission of the received packet to a destination address identified by the received packet and ii) a second client connected via an SSL/VPN connection to the SSL/VPN network appliance and associated with the identified destination address. A request is made for establishment by the second client of a connection of the identified type within the SSL/VPN connection. The received packet is transmitted to the second client via the established connection of the identified type.

Methods and apparatus for establishing internet communication from a user to a server through a plurality of proxy servers are disclosed in U.S. Pat. No. 6,785,705 to Kocherlakota entitled: "Method and apparatus for proxy chaining", which is incorporated in its entirety for all purposes as if fully set forth herein. The proxy servers are "chained" by establishing sessions among themselves and the user so that the benefits of more than one plural proxy server can be obtained by the user.

In order to transparently redirect an HTTP connection request that is directed to an origin server (107) to a proxy cache (110-1), a proxy redirector (104) that translates the destination address of packets directed to the origin server to the address of the proxy is disclosed in U.S. Pat. No. 6,389,462 to Cohen et al. entitled: "Method and apparatus for transparently directing requests for web objects to proxy caches", which is incorporated in its entirety for all purposes as if fully set forth herein. During a handshaking procedure, a TCP connection is transparently established between the client (110-1) and the proxy cache. When the client transmits a GET request to what it thinks is the origin server, which request specifies the complete address of an object at that origin server that it wants a copy of, the proxy redirector modifies the complete address specified in that GET request before it is sent to the proxy cache. Specifically, the IP address of the origin server found in the destination field in the IP header of the one or more packets from the client containing the GET request is added by the proxy redirector as a prefix to the complete URL in the GET request to form an absolute URL. The proxy cache determines from that absolute URL whether it has the requested object stored in its cache. If it does, it sends the object back to the proxy redirector, which masquerades those packets as coming from the origin server by translating their destination address to the address of the client and their source address to that of the origin server. If the proxy does not have the requested object, a separate TCP connection is established between the proxy and the origin server from where the object is retrieved and then forwarded over the TCP connection between the client and the proxy. In order to account for the additional number of bytes in the GET request, an acknowledgement sequence number in packets returned from the proxy that logically follow receipt of the GET request are decremented by that number by the proxy redirector before being forwarded to the client. Similarly, a sequence number in packets transmitted by the client subsequent to the GET request are incremented by that number before being forwarded by the proxy redirector to the proxy cache.

A hybrid peer-to-peer network that lowers proxy bandwidth utilization is disclosed in U.S. Patent Application Publication No. 2007/0073878 to Issa entitled: "System and method for lowering proxy bandwidth utilization", which is incorporated in its entirety for all purposes as if fully set forth herein. The peer-to-peer network includes peer nodes, a proxy server, and one or more guest nodes. To initiate a transfer of digital content residing on a peer node, a requesting node, which may be another peer node or a guest node, sends an HTTP request to the proxy server. The proxy server determines whether the requested digital content is bandwidth rich content such as digital images, video, or audio. If so, the proxy server generates a URL for the digital content and sends an HTTP redirect message. The requesting node then generates a second HTTP request based on the HTTP redirect message and sends the second HTTP request to the peer node. In response, the peer node generates an HTTP response including the requested digital content and sends the HTTP response to the requesting node.

A method, a device, a server and a system for peer to peer transfer of content is disclosed in U.S. Pat. No. 7,574,515 to Fontijn et al. entitled: "Peer to peer transfer of content", which is incorporated in its entirety for all purposes as if fully set forth herein. The method includes the steps of receiving and transmitting, from a first device (11), a first request with a first selection criterion for a first content to a server (18) or to a second device (12); transferring the first content satisfying said first selection criterion to said first device from the server, when said server previously has acknowledged said first device as a legal recipient of said first content and in case said first content is available only on said server, and noting that said first device subsequently has the requested first content available for other devices (14, 15, 16, 17); or re-directing said first request to a third device (13) on which the server knows that the requested first content is still available and transferring said first content satisfying said first selection criterion to said first device from the third device; or transferring the first content satisfying said first selection criterion to said first device from the second device, when said first content is available on said second device, and informing the server that said first content has been transferred to said first device from said second device; and rewarding the one of said second or third device from which said first content was transferred to said first device, when content was transferred from one of these; and charging said first device for reception of said first content. This enables for download, upload and sharing of legally protected paid-for content.

In order to provide an IP address converter that can transmits reversely a communication text to a destination that has transmitted the text via a proxy server, a proxy server 2 is provided with an IP address cross reference management table 10, as described in Japan Patent Application Publication No. JPH11355302A to Yokoi entitled: "IP address converter and its conversion method", which is incorporated in its entirety for all purposes as if fully set forth herein. The proxy server selects a virtual IP address as a tentative address for an IP address of a communication terminal in response to a 1st connection request signal addressed to a server from the communication terminal and stores the IP address of the communication terminal and the virtual IP address in cross reference and with an IP address conversion means 20 that sends the virtual IP address to the server with the 1st connection request signal in place of the IP address of the communication terminal, references the IP address cross reference management table 10 in response to a 2nd connection request signal to the virtual IP address from the server so as to acquire the IP address corresponding to the virtual IP address and conversely sends the 2nd connection request signal to the communication terminal.

Centralized video on demand (VOD) systems offer limited content and limited archival ability. Peer-to-peer networks allow users to share a wide selection of content directly among peers, but connections between peers may have limited uplink bandwidth and may be unreliable. Systems and methods for high quality and resilient transmission of streaming data from one or more sources within a heterogeneous peer-to-peer network to address these and other problems are disclosed in U.S. Patent Application Publication No 2008/0134258 to Goose et al. entitled: "Multi-Source and Resilient Video on Demand Streaming System for a Peer-to-Peer Subscriber Community", which is incorporated in its entirety for all purposes as if fully set forth herein.

A pervasive service that provides device specific updates and a proxy device that receives an update request from a user device located proximate to the proxy device are disclosed in U.S. Pat. No. 9,122,554 to Callaghan et al. entitled: "Pervasive service providing device-specific updates", which is incorporated in its entirety for all purposes as if fully set forth herein. The update request includes at least a user device identifier and a user device state. Update data associated with the user device identifier and the user device state is accessed. The proxy device transmits the device-specific update data to the user device. In some embodiments, the proxy device is a mobile device that detects or otherwise encounters a plurality of the user devices and provides device-specific updates thereto.

A congestion control and avoidance method is disclosed in U.S. Pat. No. 7,860,988 to Aoki et al. entitled: "Congestion control and avoidance method in a data processing system", which is incorporated in its entirety for all purposes as if fully set forth herein. The method including a method check step of determining whether the request contents is cacheable or uncacheable on the basis of the request inputted from the client terminal, a first Uniform Resource Identifier (URI) check step of, when it is determined that the request contents is cacheable in the method check step, checking a URI included in the request from the client terminal to determine whether the request contents is cacheable or uncacheable, a first URI hash search step of, when it is determined that the request contents is cacheable based on determination of the first URI check step, searching a URI hash to determine to execute any of regular caching, priority caching and access limitationing operation, and a step of executing any of the regular caching, priority caching and access limitationing operation according to determination in the first URI hash search step.

A method of downloading or uploading data via a client-server communications network is disclosed in U.S. Pat. No. 7,099,927 to Cudd et al. entitled: "Downloading and uploading data in information networks using proxy server clients", which is incorporated in its entirety for all purposes as if fully set forth herein. The network comprises a plurality of clients (A, B, 8, 9, 10) each having a local cache storing data downloaded via the network. The method comprises responding to a data request made to the network by a first client (A, 8) by uploading data from the cache of a second client (B, 9, 10) and transmitting that data across the network to the first client (A, 8). Also disclosed are client-server networks operating in accordance with the method and to the related servers (3), client terminals (A, B, 8, 9, 10), browsers loaded on client terminals, and plug-ins for such terminals and browsers.

A method and apparatus for selectively using an anonymous proxy is disclosed in U.S. Patent Application Publication No. 2008/0235385 to Li entitled: "Selective use of anonymous proxies", which is incorporated in its entirety for all purposes as if fully set forth herein. A user request for content is received. A determination is made as to whether the user request satisfies context criteria. When the user request satisfies the context criteria, the user request is forwarded to an anonymous proxy. When the user request does not satisfy the context criteria, the request is sent directly to a content provider.

An application that is directed towards systems and methods for using equal cost multi-path routing for traffic distribution in a cluster environment is disclosed in U.S. Pat. No. 8,972,602 to Mithyantha entitled: "Systems and methods for using ECMP routes for traffic distribution", which is incorporated in its entirety for all purposes as if fully set forth herein. Each intermediary device of a cluster may advertise, via a routing protocol to a router, a corresponding internet protocol (IP) address of a virtual server and one or more connection metrics having predetermined values. Upon determining that another intermediary device of the cluster is unavailable, each active device may re-advertise the IP address of the virtual server executing on the intermediary device and the one or more connection metrics with the previously advertised value reduced by a predetermined amount. In some embodiments, each active device may wait a predetermined time period, such as a time period for expiration of routing protocol tables, and then re-advertise the IP address of the virtual server executing on the intermediary device and the one or more connection metrics with the predetermined values.

Applying network policy at a network device is discussed, among other things, in U.S. Patent Application Publication No. 2009/0037977 to Gai et al. entitled: "Apparatus and method for applying network policy at a network device", which is incorporated in its entirety for all purposes as if fully set forth herein. In an example embodiment fibre channel hard zoning information may be received that indicates whether a fibre channel frame is permitted to be communicated between two fibre channel ports. Some example embodiments include identifying a media access control addresses associated with the fibre channel ports. An example embodiment may include generating one or more access control entries based on the fibre channel identifications of the fibre channel ports and the zoning information. The access control entries may be distributed to an Ethernet port to be inserted into an existing access control list and used to enforce a zoning policy upon fibre channel over Ethernet frames.

A method that includes receiving an event indicating an action associated with a first file has been performed by a user using a first client is disclosed in U.S. Patent Application Publication No. 2007/0174246 to Sigurdsson et al. entitled: "Multiple client search method and system", which is incorporated in its entirety for all purposes as if fully set forth herein. The action is unrelated to transmitting the first file to another client. The method also includes automatically extracting content from the first file in response to the event using the first client and generating metadata to associate with the content, and transmitting, using the first client, the content and the metadata to a peer client if the peer client and the first client are currently operating and visible to each other on a network. The timing of the transmission is determined automatically after the event is received.

An invention that is directed towards systems and methods for providing Quality of Service (QOS) via a flow controlled tunnel is disclosed in U.S. Patent Application Publication No. 2013/0304796 to Jackowski et al. entitled: "Systems and methods for providing quality of service via a flow controlled tunnel", which is incorporated in its entirety for all purposes as if fully set forth herein. Traffic from a plurality of applications may be directed into a single connection or flow-controlled tunnel and QoS policies may be applied across the plurality of applications without configuration of individual link speeds, enabling QoS scheduling to dynamically adjust traffic transmission and reception rates to ensure priority management of applications regardless of a final endpoint of the application communications. Accordingly, traffic of different types, including VPN, HTTP, Voice-over-IP (VOIP), remote desktop protocol traffic, or other traffic may be easily balanced and prioritized. In many embodiments, the tunnel may be transparent to applications, such that without any application configuration, application traffic may still be prioritized by QoS requirements.

A way for managing the use of a mobile wireless device in a tethering configuration is described in U.S. Patent Application Publication No. 2013/0171964 to Bhatia et al. entitled: "System And Method For Network Assisted Control And Monetization Of Tethering To Mobile Wireless Devices", which is incorporated in its entirety for all purposes as if fully set forth herein. The disclosed mobile wireless system is configured to receive a message packet issued from a device tethered to the mobile wireless device. The system determines whether the mobile wireless device is permitted to pass messages on behalf of tethered devices by referencing a profile with which the mobile device is associated. The mobile wireless system discards the received message packet in response to determining from the profile that the mobile wireless device is not permitted to pass messages on behalf of tethered devices. Moreover, a number of ways for monetizing the supported tethering mode are described such that a service provider is adequately compensated for the increased demand on the mobile wireless network resources arising from support for the tethering mode of operation for a mobile wireless device.

Systems and methods for discovery and classification of denial of service attacks in a distributed computing system that may employ local agents on nodes thereof to detect resource-related events are disclosed in U.S. Patent Application Publication No. 2010/0082513 to Liu entitled: "System and Method for Distributed Denial of Service Identification and Prevention", which is incorporated in its entirety for all purposes as if fully set forth herein. An information later agent may determine if events indicate attacks, perform clustering analysis to determine if they represent known or unknown attack patterns, classify the attacks, and initiate appropriate responses to prevent and/or mitigate the attack, including sending warnings and/or modifying resource pool(s). The information layer agent may consult a knowledge base comprising information associated with known attack patterns, including state-action mappings. An attack tree model and an overlay network (over which detection and/or response messages may be sent) may be constructed for the distributed system. They may be dynamically modified in response to changes in system configuration, state, and/or workload. Reinforcement learning may be applied to the tuning of attack detection and classification techniques and to the identification of appropriate responses.

Methods and systems for managing the connections between a client, an intermediary appliance and a server, so that asynchronous messages can be transmitted over HTTP from the server to a client, are disclosed in U.S. Patent Application Publication No. 2010/0262650 to Chauhan et al. entitled: "Systems and methods for connection management for asynchronous messaging over http", which is incorporated in its entirety for all purposes as if fully set forth herein. When a connection is established between a client and an intermediary, and the intermediary and a server to establish a logical client-server connection, that logical client-server connection is labeled and not maintained, while the connection between the client and the intermediary is maintained. Messages generated by the server and destined for the client are transmitted to the intermediary along with the connection label. The intermediary can then use the connection label to determine which client should receive the message.

Web page. A web page (a.k.a. webpage) is a document that acts as a web resource on the World Wide Web (WWW). A web browser is typically used to retrieve and display web pages from the Internet, such as from a remote web server, by using Hypertext Transfer Protocol (HTTP) to make such requests to the web server. Typical web-pages are hypertext documents that contain hyperlinks for browsing to other web pages. While the term web page usually refers to what is visible, but may also refer to the contents of the source code itself, which is usually a text file containing hypertext written in HTML or a comparable markup language. Most desktop web browsers include the ability to view the source code, but this ability may be missing or hidden on mobile browsers. Web browsers will frequently have to access multiple web resource elements, such as style sheets, scripts, and images, while presenting each web page.

A website will typically contain a group of web pages that are linked together, or have some other coherent method of navigation. The most important web page on a website is the index page. Depending on the web server settings, the index page can have any name, but the most common names are index.html and index.php. When a browser visits the homepage of a website or any URL pointing to a directory rather than a specific file, the web server serves the index page. A static web page is delivered exactly as stored, as HTML-formatted web content in the web server's file system. In contrast, a dynamic web page is generated by a web application, driven by server-side software, running on the client-side (on the web browser), or both. Dynamic web pages help the browser (the client) to enhance the web page through user input to the server.

As an information set, a web page typically contains numerous types of information that may be visible, heard, or interacted with, by the end user. Such perceived information may include textual information (with diverse rendering variations), as well as non-textual information. Non-textual information may include static images (such as raster graphics, typically JPEG, GIF, or PNG; or vector formats such as SVG or Flash), animated images (typically Animated GIF and SVG, but also Flash, Shockwave, or Java applet), audio (typically MP3, Ogg or various proprietary formats), and video (such as in WMV (Windows), RM (RealMedia), FLV (Flash Video), MPG, or MOV (QuickTime) formats). Interactive information may include Interactive text (such as DHTML), interactive illustrations (that may range from "click to play" images to games, typically using script orchestration, Flash, Java applets, SVG, or Shockwave). Other interactive information may include buttons, which are forms providing an alternative interface, typically for use with script orchestration and DHTML, Hyperlinks, and forms. Internal, typically hidden, information may include Linked Files through Hyperlink (such as DOC, XLS, PDF, etc.), metadata (such as semantic meta-information, Charset information, or Document Type Definition (DTD), Diagrammatic and style information (such as information about rendered items (like image size attributes) and visual specifications, as Cascading Style Sheets (CSS), and Scripts (usually JavaScript, complement interactivity, and functionality).

A static web page (sometimes called a flat page or a stationary page) is a web page that is delivered to the user's web browser exactly as stored in the web servers filesystem. Dynamic web pages are generated by a web application, typically drawing from a database to fill out a web template, then delivering the constructed page to the user's browser. A server-side dynamic web page is a web page whose construction is controlled by an application server processing server-side scripts. In server-side scripting, parameters determine how the assembly of every new web page proceeds, including the setting up of more client-side processing. A client-side dynamic web page processes the web page using HTML scripting running in the browser as it loads. JavaScript and other scripting languages determine the way the HTML in the received page is parsed into the Document Object Model (DOM), which represents the loaded web page. The same client-side techniques can then dynamically update or change the DOM in the same way.

A dynamic web page is reloaded by the user or by a computer program to change some variable content. The updating information could come from the server, or from changes made to that page's DOM. This may or may not truncate the browsing history or create a saved version to go back to, but a dynamic web page update using Ajax technologies will neither create a page to go back to, nor truncate the web browsing history forward of the displayed page. Using Ajax technologies the end user gets one dynamic page managed as a single page in the web browser while the actual web content rendered on that page can vary. The Ajax engine sits only on the browser requesting parts of its DOM, the DOM, for its client, from an application server.

Geolocation. IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Timezone. Deeper data sets can determine other parameters such as domain name, connection speed, ISP, language, proxies, company name, US DMA/MSA, NAICS codes, and home/business classification. The geolocation is further described in the publication entitled: "*Towards Street-Level Client-Independent IP Geolocation*" by Yong Wang et al., downloaded from the Internet on July 2014, and in an Information Systems Audit and Control Association (ISACA) 2011 white-paper entitled: "*Geolocation: Risk, Issues and Strategies*", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating website http://ipinfodb.com, and by Max Mind, Inc., based in Waltham, Massachusetts, U.S.A, operating the web-site https://www.maxmind.com/en/home. Determining the geographic location of Internet hosts is described in an article published in January 2007 by Doxa Chatzopoulou and Marios Kokkodis, both of the Computer Science and Engineering Department, UC Riverside, entitled: "*IP Geolocation*", which is incorporated in its entirety for all purposes as if fully set forth herein. Various techniques of IP geolocation are described in an article (ISSN:0975-9646, downloaded from the Internet August 2017) by Jayaprabha Bendale and Prof. J. Ratanaraj Kumar, both of G.S. Moze College of Engineering, Balewadi, Pune-45, University Of Pune, Pune, India, published in (IJCSIT) International Journal of Computer Science and Information Technologies, Vol. 5 (1), 2014, 436-440 and entitled: "*Review of Different IP Geolocation Methods and Concepts*", which is incorporated in its entirety for all purposes as if fully set forth herein.

Further, the W3C Geolocation API is an effort by the World Wide Web Consortium (W3C) to standardize an interface to retrieve the geographical location information for a client-side device. It defines a set of objects, ECMA Script standard compliant, that executing in the client application gives the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024. Geolocation-based addressing is described in U.S. Pat. No. 7,929,535 to Chen et al., entitled: "Geolocation-based Addressing Method for IPv6 Addresses", and in U.S. Pat. No. 6,236,652 to Preston et al., entitled: "Geospacial Internet Protocol Addressing", and in U.S. Patent Application Publication No. 2005/0018645 to Mustonen et al., entitled: "Utilization of Geographic Location Information in IP Addressing", which are all incorporated in their entirety for all purposes as if fully set forth herein.

A method for adding simple geographic position or region information to HTTP transactions using extension headers is described in a draft authored by Andrew Daviel et al. entitled: "*Geographic extensions for HTTP transactions*", published by Internet Engineering Task Force (IETF) Internet-Draft, Dec. 7, 2007, (publicly available Feb. 2, 2008), which is incorporated in its entirety for all purposes as if fully set forth herein. The method allows location-based services on the World Wide Web, without the additional overhead of geographical query requests and possibly graphical input. Extension headers transmit predefined or detected position information to reflect a location that the requesting agent is interested in. This information may be used by a server to present appropriate position-dependent responses, such as search engine results or weather maps.

Methods and systems for geolocation routing and simulation of network conditions are disclosed in U.S. Pat. No. 9,660,895 Bennett entitled: "Geolocation routing and simulation of network conditions", which is incorporated in its entirety for all purposes as if fully set forth herein. A network traffic profile is determined for a client device. A network access server selects an endpoint server based on the location of the selected endpoint server. The network access server routes traffic from the client device to an external server through the selected endpoint server. The network traffic from the client device to the external server appears to originate from a network address of the selected endpoint server. Network conditions for the network traffic are simulated based on the network traffic profile.

Techniques for anonymous Internet access are presented in U.S. Pat. No. 8,302,161 to Burch et al. entitled: "Techniques for anonymous internet access", which is incorporated in its entirety for all purposes as if fully set forth herein. Internet requests are intercepted within a firewalled environment before being routed over the Internet to destination sites. Each Internet request is evaluated in view of policy and one or more anonymizers are selected in response to that evaluation. The Internet requests are then routed through the appropriate anonymizers for processing to the destination sites. A relationship between an Internet Protocol (IP) address associated with the firewalled environment and IP addresses of the destination sites is masked and hidden via the anonymizers from Internet observers. Moreover, a secure communication between the firewalled environment and the anonymizers is maintained.

For use with a network having server sites capable of being browsed by users based on identifiers received into the server sites and personal to the users, alternative proxy systems for providing substitute identifiers to the server sites that allow the users to browse the server sites anonymously via the proxy system, are presented in U.S. Pat. No. 5,961,593 to Gabber et al. entitled: "System and method for providing anonymous personalized browsing by a proxy system in a network", which is incorporated in its entirety for all purposes as if fully set forth herein. A central proxy system includes computer-executable routines that process site-specific substitute identifiers constructed from data specific to the users, that transmits the substitute identifiers to the server sites, that retransmits browsing commands received from the users to the server sites, and that removes portions of the browsing commands that would identify the users to the server sites. The foregoing functionality is performed consistently by the central proxy system during subsequent visits to a given server site as the same site-specific substitute identifiers are reused. Consistent use of the site-specific substitute identifiers enables the server site to recognize a returning user and, possibly, provide personalized service.

A device that receives, from a client device, a request for a resource, where the request provides an identifier of the client device, is presented in U.S. Pat. No. 8,504,723 to Kohli entitled: "Routing proxy for resource requests and resources", which is incorporated in its entirety for all purposes as if fully set forth herein. The device selects a target device for the resource, connects with the selected target device, and provides a proxy of the request to the selected target device, where the proxy of the request hides the identifier of the client device. The device receives the resource from the selected target device, where the resource provides an identifier of the target device. The device provides a proxy of the resource to the client device, where the proxy of the resource hides the identifier of the target device.

A content distributing device that receives a request message to request to transmit content is disclosed in U.S. Patent Application Publication No. 2013/0117413 to Kaneko et al. entitled: "Content distribution device, content playback device, content distribution system, method for controlling a content distribution device, control program, and recording medium", which is incorporated in its entirety for all purposes as if fully set forth herein. Then, in a case where a device transmitted the request message is a relaying device for receiving the content thus requested and possessing and transferring the content to another device, the content distributing device transmits the content thus requested to the relaying device, or, in a case where a device transmitted the request message is a content playing device for playing the content thus requested, the content distributing device transmits, to the content playing device, an instruction to acquire the content from a relaying device which has transmitted before the content thus requested.

Various information object repository selection procedures for determining which of a number of information object repositories should service a request for the information object are described in U.S. Pat. No. 7,565,450 to Garcia-Luna-Aceves et al. entitled: "System and method for using a mapping between client addresses and addresses of caches to support content delivery", which is incorporated in its entirety for all purposes as if fully set forth herein. The selection procedures include a direct cache selection process, a redirect cache selection process, a remote DNS cache selection process, or a local DNS cache selection process. Different combinations of these procedures may also be used. For example, different combinations may be used depending on the type of content being requested. The direct cache selection process may be used for information objects that will be immediately loaded without user action, while any of the redirect cache selection process, the remote DNS cache selection process and/or the local DNS cache selection process may be used for information objects that will be loaded only after some user action.

A client device that establishes a first tunnel connection or tunnel is described in U.S. Pat. No. 7,673,048 to O'toole et al. entitled: "Methods and apparatus for establishing a computerized device tunnel connection", which is incorporated in its entirety for all purposes as if fully set forth herein. The client device establishes the first tunnel connection or tunnel through a public network, with a first gateway of a private network and establishes, through the tunnel connection, a data connection with a destination device within the private network. The first gateway monitors or analyzes the geographic locations of the gateways associated with the private network relative to geographic location of the destination device associated with the data connection. Based upon such the monitoring, the first gateway transmits information to the client device relating to establishment of a second tunnel connection or tunnel with a second gateway of the private network. The client device establishes the second tunnel connection with the second gateway and establishes a data connection with the destination device through the second gateway. By establishing the second tunnel connection with the second gateway, the client device utilizes the bandwidth of the public network to exchange data with the destination device, thereby decreasing data transmission costs to the private network and decreasing private network latency.

Embodiments of a peer-to-peer-based content sharing/distribution network (CDN) are described in U.S. Pat. No. 7,783,777 to Pabla et al. entitled: "Peer-to-peer content sharing/distribution networks", which is incorporated in its entirety for all purposes as if fully set forth herein. In the embodiments, some peers are content publishers while other peers are content consumers. When a consumer peer gets content from a content publisher, the consumer peer may become a content publisher that may be accessed by other peers. If a peer desires a particular content, the peer may get the content from a nearby content publisher, saving access to a central server. The more a content is in demand, the more likely it is to be replicated, and hence more likely to be found by consumer peers on nearby content publisher peers. If a content publisher peer does not have all of a requested content, the requesting peer may be redirected to another content publisher peer to obtain the missing content. Embodiments may be implemented in peer-to-peer networks implemented according to a peer-to-peer platform.

A method of discovering a community relay node within a network community is described in U.S. Pat. No. 7,788,378 to Rao et al. entitled: "Apparatus and method for community relay node discovery", which is incorporated in its entirety for all purposes as if fully set forth herein. In the method, the community relay node is operatively coupled to an access-protected client and adapted to facilitate communication between the access-protected client and a requesting client, includes receiving a request message from a requesting client relating to a request for a community relay node, associating the request message with a serverless name resolution protocol name, selecting a community relay node from among a list of community relay nodes based on the serverless name resolution protocol name, wherein the list of community relay nodes comprises at least one internet protocol address associated with a community relay node, and returning an internet protocol address of the selected community relay node to the requesting client.

A method for reconstructing torrent content metadata, i.e., a torrent identifier, a segment length, and an amount of segments of a torrent content file, without access to the torrent content metafile, is described in U.S. Pat. No. 8,719,430 to Van Ackere et al. entitled: "Method and device for reconstructing torrent content metadata", which is incorporated in its entirety for all purposes as if fully set forth herein. The method comprises the steps of: A. obtaining the torrent content identifier from torrent signaling from a client; B. obtaining a torrent content file size from the torrent signaling from the client; C. obtaining a tracker address from the torrent signaling from the client: D. obtaining a peer address from a tracker; E. contacting a peer via the peer address; F. downloading sequential minimum size blocks of a full size segment from the peer in order to determine the segment length; G. calculating the amount of segments from the torrent content file size and the segment length.

A peer-to-peer communication system, in which a peer communicating with a tracker node on a local torrent can locate and download files that are not currently available from other peers communicating on the local torrent, is described in U.S. Pat. No. 8,838,811 to Chen et al. entitled: "Method and system for scalable content storage and delivery", which is incorporated in its entirety for all purposes as if fully set forth herein. To enable this, the tracker node maintains collaboration information for a list of files. The collaboration information includes, for each file, a list of locations at which a full copy of the file may be located. The list of locations may include active peers, dormant peers, and remote tracker nodes. The collaboration information may be obtained from each peer when it joins a local torrent. Upon joining the torrent, the peer may provide the local tracker node with a list of files that it is willing to serve.

Methods and systems for providing items of content over a peer-to-peer system are described in U.S. Pat. No. 8,639,630 to Fomenko et al. entitled: "Distribution of digital content", which is incorporated in its entirety for all purposes as if fully set forth herein. Items of content are requested from a central server by a downloading peer, and the central server determines uploading peers from whom the downloading peer may request parts of the content item.

A server application that is interconnected with a number of client/peer terminals, as part of an IMS network, is described in U.S. Patent Application Publication No. 2008/0109446 to Wang entitled: "Peer-to-peer file download system for IMS network", which is incorporated in its entirety for all purposes as if fully set forth herein. For peer-to-peer transfer of a selected data file, a client terminal establishes and accesses a secure account on the server application. From the server application, the client terminal obtains the network locations of one or more peer terminals having sections/pieces of the data file stored thereon. The client terminal contacts the peer terminals for obtaining the data file sections there from over the IMS network. The client terminal and/or peer terminals transmit accounting data to the server application through secure accounts. The accounting data relates to the amount of data transferred and/or to the data transfer rate, and may be used for billing purposes A method for directing a client to a content server containing desired content by providing the client with an address shared by a plurality of content servers, each of which has a copy of the desired content, is described in U.S. Patent Application Publication No. 2002/0091760 to Rozen entitled: "Distributed selection of a content server", which is incorporated in its entirety for all purposes as if fully set forth herein. The client is then served from an optimal, or closest available content server selected from the plurality of content servers. This optimal content server is selected on the basis of an optimal path from the client to the shared address.

A computer program product includes instructions that when executed by a processor perform a method for providing content in a network is described in U.S. Patent Application Publication No. 2009/0248793 to Jacobsson et al. entitled: "Providing Content In a Network", which is incorporated in its entirety for all purposes as if fully set forth herein. The method includes receiving an identifier that is forwarded from a device in a network and associated with content divided into content portions that are to be delivered to the device. The method includes selecting a content source in the network for each of the respective content portions, wherein for at least one of the content portions the content source is selected among multiple content sources associated with the respective content portion using recorded information about the multiple content sources. The method includes forwarding, in response to the identifier, source information to the device that identifies each selected content source and is configured for use by the device in requesting at least one of the multiple content portions from each selected content source.

Methods and apparatus for cooperative file distribution system employing one or more storage proxies to allow an offline receiver to obtain files or pieces thereof when the receiver comes online are provided in U.S. Patent Application Publication No. 2006/0224687 to Popkin et al. entitled: "Method and apparatus for offline cooperative file distribution using cache nodes", which is incorporated in its entirety for all purposes as if fully set forth herein. A central tracker receives an indication from the sender that the sender has the file; determines if the receiver is online; and initiates a storage of the file on one or more storage proxies if the receiver is not online. A proxy service can identify one or more potential storage proxies that can store the file and that each satisfy one or more predefined resource criteria. The sender can send a request to one or more of the storage proxies from the list of storage proxies to act as a storage proxy for the communication between the sender and the receiver. The potential storage proxies compare one or more resource measures to predefined criteria; and provide an acceptance if the one or more resource measures satisfy the predefined criteria.

Computer-based methods and apparatuses, including computer program products, for policy-based content insertion are described in U.S. Patent Application Publication No. 2009/0182843 to Hluchyj et al. entitled: "Policy-Based Content Insertion", which is incorporated in its entirety for all purposes as if fully set forth herein. A client device transmits to a content server a request for the delivery of content. The content server modifies the request based on an ingress policy. The content server transmits the modified request to a second server where the second server processes the request. The second server transmits a reply to the modified request to the content server. The reply includes a content insertion instruction. The content server transmits the content to the client device based on the content insertion instruction and/or one or more egress policies.

A system and method for efficient and private peer-to-peer file sharing consists of ascribing a uniquely identified and anonymous link (an "edgelink") to any file or set of files on a peer computer, are described in U.S. Patent Application Publication No. 2011/0035503 to Zaid et al. entitled: "System and Method for Anonymous Addressing of Content on Network Peers and for Private Peer-to-Peer File Sharing", which is incorporated in its entirety for all purposes as if fully set forth herein. The link is registered with a publishing server along with continuously updated connectivity information about the peer without registering any identifying information about the file. A peer recipient is able to access the link, receive connectivity information about the publishing peer from the server, and then receive the file from the publishing peer without file content passing through the server, mediating any intermediary NAT devices without requiring any manual or automatic device reconfiguration.

A method, system and corresponding device for load balancing are described in U.S. Patent Application Publication No. 2013/0007253 to Li et al. entitled: "Method, system and corresponding device for load balancing", which is incorporated in its entirety for all purposes as if fully set forth herein. The present invention involves in a computer application, and solves the technical problems due to the introduction of more mechanism in the prior art. The method of the present invention mainly includes acquiring by a peer address information of at least one SN from a BSSN, both the BSSN and SN belong to an overlay network; if the peer is a server, saving by the server the address information and reporting by the server server information to a SN corresponding to one of the address information, and spreading by the SN the server information to other SNs; if the peer is a client, saving by the client the address information and acquiring by the client the server information from a SN corresponding to the one of the address information and saving the server information.

Techniques for obtaining and providing a portion of content include receiving a request for the portion of the content, requesting and receiving one or more data chunks, processing the one or more data chunks, and providing one or more data blocks as the requested portion of the content, are described in U.S. Patent Application Publication No. 2013/0064370 to Gouge et al. entitled: "Distribution of portions of content", which is incorporated in its entirety for all purposes as if fully set forth herein. The processing may include validating, decrypting, and/or decompressing the one or more data chunks to create the one or more data blocks. Techniques for providing metadata and one or more data chunks may include receiving content and dividing the content into data blocks. Processing may then be performed on the data blocks to create data chunks, and the metadata may be generated from the processing. The metadata and one or more of the data chunks may be provided to a device.

A method for providing content to a remotely located electronic device is described in U.S. Patent Application Publication No. 2007/0142036 to Wikman et al. entitled: "Provision of content in mobile environments", which is incorporated in its entirety for all purposes as if fully set forth herein. The device may be connectable to the Internet, and may be accessing content on a device (e.g., an Internet server) located near a mobile intermediate device by using the mobile intermediate device (another Internet server) as a "through conduit". The intermediate device detects other devices in its proximity, lists the detected devices, detects a request to access at least one of the listed Internet servers, and forwards the access request to the listed Internet servers to be accessed. The remote device does not need to know the original content address.

Communicating in a peer-to-peer computer environment is described in U.S. Patent Application Publication No. 2011/0066924 to DORSO et al. entitled: "Communicating in a computer environment", which is incorporated in its entirety for all purposes as if fully set forth herein. A tracker peer is contacted and a list of peer nodes are obtained at a user device. A subset of peer nodes are selected from the list of peer nodes to act as relay nodes for a communication. An appropriate compression scheme is selected for the communication at the user device. Data is transmitted to at least one relay node for the at least one relay node to forward to at least one other user device, wherein the relay node is one of the subset of the peer nodes. Data is received at the user device from the at least one relay node forwarded from the at least one other user.

Dynamic Adaptive Streaming over HTTP (DASH) is intended to support a media-streaming model for delivery of media content in which control lies exclusively with the client. Clients may request data using the HTTP protocol from standard web servers that have no DASH-specific capabilities. Consequently, this standard focuses not on client or server procedures but on the data formats used to provide a DASH Media Presentation. ISO/IEC 23009-1: 2012(E), MPEG-DASH standard, Jan. 5, 2012, entitled: "*Information technology—Dynamic adaptive streaming over HTTP* (*DASH*)*—Part* 1*: Media presentation description and segment formats*", which is incorporated in its entirety for all purposes as if fully set forth herein, primarily specifies formats for the Media Presentation Description and Segments for dynamic adaptive streaming delivery of MPEG media over HTTP, and is applicable to streaming services over the Internet.

Standard terminology and the taxonomy of web replication and caching infrastructure as deployed is disclosed in IETF RFC 3040 entitled: "*Internet Web Replication and Caching Taxonomy*" to Cooper et al. (January 2001), which is incorporated in its entirety for all purposes as if fully set forth herein. IETF RFC 3040 introduces standard concepts, and protocols used today within this application domain. Currently deployed solutions employing these technologies are presented to establish a standard taxonomy. This document presents open protocols and points to published material for each protocol.

An address of an information object repository that should service a client request for an information object and is returned in response to a request therefor is described in U.S. Pat. No. 7,162,539 to Garcia-Luna-Aceves et al. entitled: "System and method for discovering information objects and information object repositories in computer networks", which is incorporated in its entirety for all purposes as if fully set forth herein. The address of the information object repository that is returned is selected according to specified performance metrics regardless of whether or not the information object repository maintains a local copy of the information object that is the client request. In some cases, the address of the information object repository is further selected according to an address of a client making the client request. Further, the address of the information object repository is selected from a number of addresses of information object repositories. The specified performance metrics may include one or more of an average delay from the information object repository to the client, average processing delays at the information object repository, reliability of a path from the information object repository to the client, available bandwidth in the path, and loads on the information object repository. In some cases, the information object repository may be instructed to obtain a copy of the information object after the address of the information object repository is returned in response to the request therefore.

A method and system for accelerating downloading and displaying of content in web pages in a peer-to-peer network is described in U.S. Patent Application Publication No. 2006/0212584 to Yu et al. entitled: "Method and system for accelerating downloading of web page content by a peer-to-peer network", which is incorporated in its entirety for all purposes as if fully set forth herein. A peer-to-peer network client captures a download request from a web browser, and submits a query that includes an identifier of the file to an indexing server. The peer-to-peer network client receives a peer list including connectivity information of a peer node that has stored at least a portion of the file content. The peer-to-peer network client then connects with the peer node, and downloads the portion from the peer node. The peer-to-peer client conveys the downloaded portion to the web browser.

A system and a method for automatically collecting content, is described in U.S. Patent Application Publication No. 2015/0206176 to Toval et al. entitled: "Behavioral content discovery", which is incorporated in its entirety for all purposes as if fully set forth herein. The method comprising the steps of: defining a plurality of content sites, creating a collection of virtual agents data including user characteristic data and user behavioral data, presenting the collection of virtual agents to the plurality of content sites; receiving content from the visited internet site; and storing the received content or presenting it to a user.

A method and a system for monitoring an advertisement presented within a mobile application is described in U.S. Patent Application Publication No. 2017/0221092 to Toval et al. entitled: "System and a method for surveying advertisements in mobile applications", which is incorporated in its entirety for all purposes as if fully set forth herein. The method including tracing in real-time executable code of the mobile application that processes an advertisement. Where this traced process of advertisement performs: negotiating advertisement display, communicating an advertisement, and displaying an advertisement. The system then detects within the process of advertisement an advertisement processed by the executable code. The system then records the advertisement as displayed, and the parameters associated with the advertisement.

Facilitating browser access to cached content available from a peer to peer network is described in U.S. Patent Application Publication No. 2013/0191456 to Ting et al. entitled: "Peer to peer browser content caching", which is incorporated in its entirety for all purposes as if fully set forth herein. The facilitating comprises receiving a request for content from a content server, receiving from the content server content metadata indicating that the requested content is available from at least one alternative user computing device via a peer to peer network, instantiating on the user computing device a browser helper application which facilitates access to the peer to peer network, and receiving from the content server a lookup table comprising a list of alternative user computing devices from which the requested content is available. The lookup table can be parsed to select an alternative user computing device from which the content, or portions thereof, is requested. The received content can then be stored for later use or presented to the user via the browser.

A method and apparatus for peer-to-peer services are described in U.S. Pat. No. 7,440,994 to Harrow et al. entitled: "Method and apparatus for peer-to-peer services to shift network traffic to allow for an efficient transfer of information between devices via prioritized list", which is incorporated in its entirety for all purposes as if fully set forth herein.

A method and apparatus for peer-to-peer services are described in U.S. Pat. No. 7,562,112 to Harrow et al. entitled: "Method and apparatus for peer-to-peer services for efficient transfer of information between networks", which is incorporated in its entirety for all purposes as if fully set forth herein. In one embodiment, a request for data is received from a first local device. A determination of a second local device having the data is made. The first local device is directed to the second local device to directly obtain the data from the second local device. A direct transfer of the data from the second local device to the first local device is performed.

A communication system for retrieving web content is disclosed in U.S. Pat. No. 6,795,848 to Border et al. entitled: "System and method of reading ahead of objects for delivery to an HTTP proxy server", which is incorporated in its entirety for all purposes as if fully set forth herein. A downstream proxy server receives a URL request message from a web browser, in which the URL request message specifies a URL content that has an embedded object. An upstream proxy server receives the URL request message from the downstream proxy server. The upstream proxy server selectively forwards the URL request message to a web server and receives the URL content from the web server, wherein the upstream proxy server forwards the URL content to the downstream proxy server and parses the URL content to obtain the embedded object prior to receiving a corresponding embedded object request message initiated by the web browser.

U.S. Pat. No. 9,516,091 to Burckart et al. entitled: "Web page script management", which is incorporated in its entirety for all purposes as if fully set forth herein, discloses web page scripts that are managed in a network using a network appliance that intercepts a web page sent from a server and addressed to a client browser; modifies the web page by removing an embedded script from the web page; executes the removed embedded script; and sends the modified web page from the network appliance to the client browser.

An example of an arrangement 70 for retrieving content by the requesting client device 31*a* from the web server 22*b* is shown in FIG. 7. Multiple Internet-connected devices may serve as tunnel devices, such as a tunnel #1 laptop device 33*a*, a tunnel #2 smartphone device 33*b*, a tunnel #3 laptop device 33*c*, a tunnel #4 desktop device 33*d*, and a tunnel #5 'Smart TV' device 33*e*. The content fetching may be handled, managed, and aided by using a Super-Proxy (SP) server 72 and a Tunnel Bank (TB) server 71.

The TB server 71 is used for storing a list of the available tunnel devices, such as their IP addresses together with attribute values that corresponds to one or more attribute types. The available tunnels list is stored in a memory 73 that is part of, integrated with, connected to, or in communication with, the TB server 71. The SP server 72 receives the content request from the requesting client 31*a*, and manages the content fetching using the TB server 71. The TB server 71 and the SP server 72 may be separated devices located at different geographic locations, as shown in the arrangement 70, may be located in a single location, or may be integrated into a single device or server that combines the functionalities of both servers.

Any device that is available for communicating over the Internet 113 may serve as a tunnel device. Any tunnel device may consist of, include, be part of, or be based on, a part of, or the whole of, the computer 11 or the system 10 shown in FIG. 1. Any tunnel device may be any computer system, either stationary (such as the desktop 33*d*) or portable (such as the laptop 33*c*). Further, any tunnel device may be a smartphone (such as the smartphone 33*b*), or may be an appliance, such as the television set 33*e*. Further, any tunnel device herein may comprise, consist of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven, and induction cooker. The appliance may similarly be a 'small' appliance such as TV set, CD or DVD player, camcorder, still camera, clock, alarm clock, video game console, HiFi or home cinema, telephone or answering machine Furthermore, a tunnel device may be integrated with an appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwasher, a food blender, a beverage maker, a coffeemaker, or an iced-tea maker. Further, the appliance primary function may be associated with environmental control such as temperature control, and the appliance may consist of, or may be part of, an HVAC system, an air conditioner or a heater. Furthermore, the appliance primary function may be associated with cleaning, such as a washing machine, a clothes dryer for cleaning clothes, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

While 5 tunnel devices are shown in the example of the arrangement 70, any number of tunnels may be equally used. Preferably, the number of tunnel devices that are used may be above 5,000, 10,000, 20,000, 50,000, 100,000, 200,000, 500,000, 1,000,000, 2,000,000, 5,000,000, or 10,000,000.

A tunnel device may connect to the Internet 113 directly, such as the tunnel #1 33*a* and tunnel #2 33*b* shown to directly connect to the Internet 113 as part of the arrangement 70 shown in FIG. 7. Direct connection herein refers to the ability of any Internet connected device or server, such as the TB server 71 and the SP server 72, to communicate, or too initiate a communication session, with the Internet-connected device. Alternatively, a tunnel device may be connected to the Internet via a filtering device, such as a router, gateway, or a firewall. For example, the tunnel #3 33*c* is shown connected to the Internet 113 via a router device (or functionality) 74, and the tunnel #4 33*d* is shown connected to the Internet 113 via a firewall device (or functionality) 75. Such filtering devices are typically used for data security, and may filter communication to, or from, the Internet relating to a connected device. In one example, only pre-approved IP addresses may initiate a communication session over the Internet with a device connected via such filtering mechanism. For example, the TB server 71 or the SP server 72 may not initiate a communication with the tunnel #3 33*c* or with the tunnel #4 33*d* since such communication may be blocked by the respective router device 74 or firewall device 75.

In one example, the two servers cooperatively used for assisting in the content fetching, namely the SP server 72 and the TB server 71, are owned, operated, managed, or controlled by a same entity 76, as shown in an arrangement 70*a* shown in FIG. 7*a*. In such a case, the entity 76 may provide the service of fetching content from the web server 22*b* via the various tunnels as a service, which may be a paid service.

Any content herein may consist of, or may comprise, data such as files, text, numbers, audio, voice, multimedia, video, images, music, computer programs or any other sequence of instructions, as well as any other form of information represented as a string of bits, bytes, or characters. In one example, the content may include, be a part of, or a whole of, a URL or a website page.

Each of the tunnel devices may be associated with one or more attribute values corresponding to one or more attribute types. A table 100 shown in FIG. 10 describes an example of various attributes types and values or various (available for use) tunnel devices. A top row 101 names the attribute type of other tunnel related information, and each of the other rows may correspond to a single tunnel device. For example, a first content row 101*a* may correspond to the tunnel #1 33*a*, a second row 101*b* may correspond to the tunnel #2 33*b*, a third row 101*c* may correspond to the tunnel #3 33*c*, a fourth row 101*d* may correspond to the tunnel #4 33*d*, a fifth row 101*e* may correspond to the tunnel #5 33*e*, a sixth row 101*f* may correspond to a sixth tunnel, and a seventh row 101*g* may correspond to a seventh tunnel.

The attribute type may relate to a timing of an operation or activity by a tunnel device. A first column 102*a*, named 'Date-Time', may correspond to a timing on an event relating to the respective tunnel operation, such as a last time when the tunnel device connected to the Internet, or when the tunnel device connected to a specific entity, such as to the TB server 71 or the SP server 72. In the examples shown in the table 100, a relating timing information relating the first tunnel corresponding to the first row 101*a* is shown as a date March 5 and a time 19:35, a relating timing information relating the second tunnel corresponding to the second row 101*b* is shown as a date March 5 and a time 19:38, a relating timing information relating the third tunnel corresponding to the third row 101*c* is shown as a date March 5 and a time 00:05, a relating timing information relating the fourth tunnel corresponding to the fourth row 101*d* is shown as a date November 5 and a time 00:07, a relating timing information relating the fifth tunnel corresponding to the fifth row 101*e* is shown as a date December 5 and a time 00:15, a relating timing information relating the sixth tunnel corresponding to the sixth row 101*f* is shown as a date December 5 and a time 05:38, and a relating timing information relating the seventh tunnel corresponding to the seventh row 101*g* is shown as a date December 5 and a time 22:13.

Alternatively or in addition, the attribute type may be associated with the communication link involving the connecting of a tunnel device to the Internet 113. For example, the type of connection of the device may be used as an attribute type, such as being a wired or a wireless connection. Further, the related attribute type may include the protocol or technology used for connecting the respective tunnel to the Internet 113, as exampled in a column 'Connection Type' 102*e* in the table 100. In the examples shown in the table 100, a relating communication protocol information relating the first tunnel corresponding to the first row 101*a* is shown as a value of Very High Speed Subscriber Line (VDSL) technology, a relating communication protocol information relating the second tunnel corresponding to the second row 101*b* is shown as a value of Third Generation (3G), a relating communication protocol information relating the third tunnel corresponding to the third row 101*c* is shown as a value of Data Over Cable Service Interface Specification (DOCSIS), a relating communication protocol information relating the fourth tunnel corresponding to the fourth row 101*d* is shown as a value of Asymmetric Digital Subscriber Line (ADSL), a relating communication protocol information relating the fifth tunnel corresponding to the fifth row 101*e* is shown as a value of WiFi, a relating communication protocol information relating the sixth tunnel corresponding to the sixth row 101*f* is shown as a value of 4G.LTE, and a relating communication protocol information relating the seventh tunnel corresponding to the seventh row 101*g* is shown as a value of ADSL.

Alternatively or in addition, the attribute type may be associated with the communication link involving the communication of a tunnel device with another entity over the Internet 113, such as communication with the TB server 71, the SP server 72, or the web server 22*b*. For example, the bandwidth (BW) or the RTT of such communication of the device may be used as an attribute type, as exampled in columns 'BW' 102*g* and 'RTT' 102*h* in the table 100. In the examples shown in the table 100, a relating communication metrics information relating the first tunnel corresponding to the first row 101*a* is shown as a BW value of 1000 (Kb/s) and a RTT value of 30 (ms), a relating communication metrics information relating the second tunnel corresponding to the second row 101*b* is shown as a BW value of 350 (Kb/s) and a RTT value of 70 (ms), a relating communication metrics information relating the third tunnel corresponding to the third row 101*c* is shown as a BW value of 2500 (Kb/s) and a RTT value of 540 (ms), a relating communication metrics information relating the fourth tunnel corresponding to the fourth row 101*d* is shown as a BW value of 1400 (Kb/s) and a RTT value of 170 (ms), a relating communication metrics information relating the fifth tunnel corresponding to the fifth row 101*e* is shown as a BW value of 1200 (Kb/s) and a RTT value of 120 (ms), a relating communication metrics information relating the sixth tunnel corresponding to the sixth row 101*f* is shown as a BW value of 2100 (Kb/s) and a RTT value of 230 (ms), and a relating communication metrics information relating the seventh tunnel corresponding to the seventh row 101*g* is shown as a BW value of 800 (Kb/s) and a RTT value of 310 (ms).

Alternatively or in addition, the attribute type may be associated with the tunnel connection scheme to the Internet, such as identification of the ISP or the associated ASN relating to the ISP, to the tunnel device, or to the Internet connection scheme. In the examples shown in the table 100, a column named 'ASN' 102*d* may be used, a value of the ASN corresponding to the first row 101*a* is shown as 3215 (corresponding to Orange France), a value of the ASN corresponding to the second row 101*b* is shown as 3209 (corresponding to Vodafone Germany), a value of the ASN corresponding to the third row 101*c* is shown as 12079 (corresponding to Verizon Wireless USA), a value of the ASN corresponding to the fourth row 101*d* is shown as 16345 (corresponding to Beeline Russia), a value of the ASN corresponding to the fifth row 101*e* is shown as 30148 (corresponding to Zain Saudi-Arabia), a value of the ASN corresponding to the sixth row 101*f* is shown as 9498 (corresponding to Bharti Airtel India), and a value of the ASN corresponding to the seventh row 101*g* is shown as 11419 (corresponding to Telefonica Brazil).

Alternatively or in addition, the attribute type may be associated with the tunnel device itself, such as its location. The location may be based on an actual physical geographical location or an IP geolocation. In the examples shown in the table 100, a column named 'Geographical Location' 102*c* may be used. A value of the location corresponding to the first row 101*a* is shown as 'Paris, France', a value of the location corresponding to the second row 101*b* is shown as 'Munich, Germany', a value of the location corresponding to the third row 101*c* is shown as 'Boston, MA, USA', a value of the location corresponding to the fourth row 101*d* is shown as 'Moskow, Russia', a value of the location corresponding to the fifth row 101*e* is shown as 'Riad, Saudi-Arabia', a value of the location corresponding to the sixth row 101*f* is shown as 'Mumbai, India', and a value of the location corresponding to the seventh row 101*g* is shown as 'San-Paulo, Brazil'.

Alternatively or in addition, the attribute type may be associated with the tunnel device itself, such as its structure, functionalities, or features. The attribute type may relate to hardware, software, or any combination thereof. For example, the type of the tunnel device may be used, such as being stationary or portable. Further, the processing power or the processor type may be used. For example, the type, make, or version of any software may be used, such as the operating system, as exampled in an 'Operating System' column 102*f* in the table 100. In the examples shown in the table 100, a relating operating system relating to the first tunnel corresponding to the first row 101*a* is shown as 'Chrome 2.0', a relating operating system relating to the second tunnel corresponding to the second row 101*b* is shown as 'iOS 3.0', a relating operating system that corresponds to the third tunnel corresponding to the third row 101*c* is shown as 'Windows 10', a relating operating system relating the fourth tunnel corresponding to the fourth row 101*d* is shown as 'Windows 7', a relating operating system relating the fifth tunnel corresponding to the fifth row 101*e* is shown as 'Android 2.0', a relating operating system relating the sixth tunnel corresponding to the sixth row 101*f* is shown as 'iOS 4.0', and a relating operating system relating the seventh tunnel corresponding to the seventh row 101*g* is shown as 'Chrome 3.0'.

The tunnels devices may primarily be identified by their corresponding IP address, as exampled in a 'Tunnel IP Address' column 102*b* in the table 100. In the examples shown in the table 100, an IP address of the first tunnel corresponding to the first row 101*a* is shown as 80.12.105.150, an IP address of the second tunnel corresponding to the second row 101*b* is shown as 176.94.1.17, an IP address of the third tunnel corresponding to the third row 101*c* is shown as 162.115.192.24, an IP address of relating the fourth tunnel corresponding to the fourth row 101*d* is shown as 83.220.232.67, an IP address of the fifth tunnel corresponding to the fifth row 101*e* is shown as 185.93.228.98, an IP address of the sixth tunnel corresponding to the sixth row 101*f* is shown as 59.144.192.23, and an IP address of the seventh tunnel corresponding to the seventh row 101*g* is shown as 200.196.224.89.

The general flow of the system operation for fetching content (such as URL) to the requesting client 31*a* from the web server 22*b* using tunnels based on the arrangement 70 shown in FIG. 7, is described in a flow chart 80 in FIG. 8. A "Registration and Connection" step 81 is continuously executed, in which devices that are available to serve as tunnels are initiating communication with the TB server 71. During this initial communication session, the tunnel device registers with the TB server 71, and provides one or more attributes values associated with various attributes types. Alternatively or in addition, the attributes values are estimated, calculated, or otherwise obtained based on the communication link with the tunnel device. As part of the registration process, a record that includes the IP address of the registering tunnel device is added to the tunnels list 73 stored with the TB server 71. In one example, the records are stored as the table 100 shown in FIG. 10, where a row represents a record of a single tunnel device. In addition to registration by adding a record to the tunnels list 73, the tunnel device opens a lasting connection via the Internet with the TB server 71. Such connection preferably allows the TB server 71 to initiate communication with the registering tunnel device even after the registration phase is over and as long as the connection is sustained, such as by using TCP keepalive mechanism. The open connection, preferably a TCP connection, allows the TB server 71 to initiate communication with the connected tunnel device even through any intermediary blocking or filtering apparatus, such as the router 74 or the firewall device 75. The connection may be terminated upon the tunnel device closing the connection, such as when powering off or disconnecting from the Internet. Upon disconnecting from a tunnel device, the respective record in the tunnels list 73 in the TB server 71 is erased, notifying that this tunnel device is no more available to be used as a tunnel device.

The connection process may involve establishing a connection (directly or via a server) between the registering tunnel device and the TB server 71. The handshaking between the two devices involves forming the connection by exchanging communication-related information. The formed connection may be used later for efficiently exchange data between the devices. In one example, the communication between the devices uses TCP, and the pre-connection is used for establishing a connection by forming the 'passive open', involving exchanging SYN, SYN-ACK, and ACK messages. In another example, a VPN is formed between the devices, and the tunneling or the VPN establishment is performed as part of the pre-connection phase. The tunnel endpoints are authenticated before secure VPN tunnels can be established. User-created remote-access VPNs may use passwords, biometrics, two-factor authentication, or any other cryptographic methods. Network-to-network tunnels often use passwords or digital certificates, and permanently store the key in order to allow a tunnel to establish automatically, without intervention from a user.

In one example, the number of tunnel devices that have been registered with the TB server 71 (or the number of IP addresses) and are available to be used as tunnel device is above 10,000, 20,000, 50,000, 100,000, 200,000, 500,000, 1,000,000, 2,000,000, 5,000,000, or 10,000,000.

The content fetching scheme starts in a "Content Request" step 82, where the requesting client sends a request message to the SP server 72. The request message preferably includes the requested content, such as a URL (and/or identification of the web server 22*b*). The client device 31*a* may also include (as part of, or appended to, the request message) criteria for selecting tunnel devices to be used for fetching the requested content from the web server 22*b*, as part of a "Tunnel Selection" step 83. For example, the request message may include identification of an attribute type, and associated values for tunnels selection. The client device 31*a* may use a single value, so that only tunnel devices associated with this single value will be used. Alternatively or in addition, the client device 31*a* may use multiple values, so that only tunnel devices associated with one of these values will be used. Alternatively or in addition, the client device 31*a* may use a range of values, so that only tunnel devices associated with one of the values in the range will be used. For example, the client device 31*a* may define a minimum value (selecting only tunnel devices associated with values at or above the minimum value), may define a maximum value (selecting only tunnel devices associated with values at or below the maximum value), or may define both minimum and maximum values (selecting only tunnel devices associated with values at or above the minimum value and at or below the maximum value).

For example, in a case where the attribute value is a location, the request message may define a location of Munich, Germany. Assuming that the available tunnel devices are detailed in the table 100 in FIG. 10, only the tunnel device (such as the tunnel #2 33*b*) associated with the second row 101*b* may be selected. Alternatively or in addition, the request message may define a location of Europe. In such a case, the tunnel device (such as the tunnel #2 33*b*) associated with the second row 101*b*, or the tunnel device (such as the tunnel #1 33*a*) associated with the first row 101*a*, may be selected, since both location values are in Europe. While the location values are exampled in table 100 as cities, any location may be used as IP geolocation or physical geographical location, such as country, state or province, city, street address, or ZIP code). In one example, a tunnel device location may be obtained using its built-in Global Positioning System (GPS), and may include the latitude, longitude, and timezone of the device location.

Similarly, in a case where the attribute value is an RTT, the request message may define a RTT over 300 ms (300 ms minimum), so that either the tunnel device (such as the tunnel #3 33*c*) associated with the third row 101*c* (having 540 ms), or the tunnel device associated with the seventh row 101*g* (having 310 ms), may be selected. Similarly, in a case where the attribute value is an RTT, the request message may define a RTT below 80 ms (maximum), so that either the tunnel device (such as the tunnel #1 33*a*) that is associated with the first row 101*a* (having 30 ms), or the tunnel device (such as the tunnel #2 33*b*) that is associated with the second row 101*b* (having 70 ms), may be selected. Similarly, in a case where the attribute value is an BW, the request message may define a BW below 2200 Kb/s and above 2000 Kb/s, the tunnel device associated with the sixth row 101*f* (having 2100 Kb/s), may be selected.

In the "Tunnel Selection" step 83, the TB server 71 selects a tunnel device for use from the tunnel list stored in the storage 73, according to the criteria received from the requesting client as part of the "Content Request" step 82. It is noted that some requests may not include any criteria, and in such a case any available tunnel device may be selected by the TB server 71.

Once a tunnel device is selected by the TB server 71, the request for content is routed, by the TB server 71, the SP server 72, or any cooperation thereof, to the selected tunnel device. In turn, the tunnel device forwards the request for content, using tunneling or proxy scheme, to the web server 22*b*, as part of a "Using Tunnel" step 84. It is noted that such tunneling provides anonymity and untraceability, where the web server 22*b* is only aware of the request from the selected tunnel device, and is ignorant to the identity of the origin of the request, namely the requesting client 31*a*, which is not exposed to the web server 22*b*. For example, in case where the requesting client 31*a* is in a location A, and the selected tunnel device that is used is in a location B, the web server 22*b* may only be aware (such as by using IP geolocation) to the request arrival from the location B.

The requested content is then sent to the selected tunnel device, which in turn submits the fetched content to the requesting client 31*a* as part of a "Content Fetching" step 85, thus completing the cycle of request-response from the point-of-view of the client device 31*a*, and ending in an "END" step 86. Hence, the 'Content Fetch' cycle, that may be a 'URL Fetch' flow-chart 87 in the case where the content is a single URL, may be defined, starting from the requesting client device 31*a* issuing a content request to the SP server 72, until the fetched content is received by the requesting client device 31*a* as part of the "Content Fetching" step 85. The fetched content may be stored in the client device in any volatile or non-volatile memory, or may be stored in a local cache as described in U.S. Pat. No. 8,135,912 to the Shribman et al. entitled: "System and Method of Increasing Cache Size", which is incorporated in its entirety for all purposes as if fully set forth herein. The content is stored with its related metadata or any other identifiers, so it can be easily detected and fetched when later required.

While retrieving a single URL (or other content) is exampled in the flow chart 80, any number of URLs may be equally retrieved by the requesting client 31*a*. Each URL fetching may be according to, or based on, the flow chart 87 shown as part of the flow chart 80 in FIG. 8. For example, the requesting client 31*a* may request multiple web-pages of the same web site. Assuming fetching of N web-pages (or any other N URLs), the first URL may be fetched by executing "URL #1 Fetch" flow chart 87*a*, the second URL may be fetched by executing a "URL #2 Fetch" flow chart 87*b*, the third URL may be fetched by executing a "URL #3 Fetch" flow chart 87*c*, and so on, until the N-th URL may be fetched by executing a "URL #N Fetch" flow chart 87*n*, where each of the URL fetching scheme may be according to, or based on, the flow chart 87 shown as part of the flow chart 80 in FIG. 8. The various fetching schemes may be executed in parallel, starting in a "START" step 91 and ending in an "END" step 92, as shown in the flow chart 90*a* in FIG. 9*a*. Alternatively or in addition, the various fetching schemes may be executed in series, starting in the "START" step 91 and ending in the "END" step 92, as shown in the flow chart 90*b* in FIG. 9*b*.

In one example, the same tunnel device is selected in two, or in all, of fetching activities named "URL #1 Fetch" flow chart 87*a* to the "URL #N Fetch" flow chart 87*n*. Alternatively or in addition, a different tunnel device is selected for each of fetching activities named "URL #1 Fetch" flow chart 87*a* to the "URL #N Fetch" flow chart 87*n*, which is preferred from anonymity point of view.

A schematic messaging flow diagram 110 describing the registration phase as part of the "Registration and Connection" phase 81 is shown in FIG. 11. Each of the tunnel devices initiates a communication with the TB server 71, notifying its availability to serve as a tunnel device. As part of the communication, each of the tunnel devices may transmit one or attribute values pertaining to one or more attribute types. As part of the registration phase 81, the TB server 71 adds a record (row) for each available tunnel device to the tunnels list or table in memory 73, such as adding a row for each new available tunnel device to table 100 shown in FIG. 10. In the example of the arrangement 70, the tunnel #1 33*a* connects via a data path 111*a*, the tunnel #2 33*b* connects via a data path 111*b*, the tunnel #3 33*c* connects via a data path 111*c*, the tunnel #4 33*d* connects via a data path 111*d*, and the tunnel #5 33*e* connects via a data path 111*e*.

As part of the "Registration and Connection" phase 81, a sustained connection is established between the registered tunnel devices and the TB server 71, such as by using TCP keepalive mechanism. Shown pictorially in an arrangement 110*a* shown in FIG. 11*a* relating to the example of the arrangement 70, the tunnel #1 33*a* connection is shown as a dashed line 112*a*, the tunnel #2 33*b* connection is shown as a dashed line 112*b*, the tunnel #3 33*c* connection is shown as a dashed line 112*c*, the tunnel #4 33*d* connection is shown as a dashed line 112*d*, and the tunnel #5 33*e* connection is shown as a dashed line 112*e*. Such sustained connection (such as by using TCP keepalive mechanism) allows the TB server 71 to initiate connection with any of the registered and available tunnel devices, even in the case when a filtering apparatus, such as a router (for example the router 74) or a gateway (for example the gateway 75), is connected between a tunnel device and the Internet 113.

The connection process involves establishing a connection (directly or via a server), where the handshaking between the TB server 71 and each of tunnel devices involves forming the connection by exchanging communication-related information. The formed connection may be used later for efficiently exchange data between the devices. In one example, the communication between the devices uses TCP, and the pre-connection is used for establishing a connection by forming the 'passive open', involving exchanging SYN, SYN-ACK, and ACK messages. In another example, a VPN is formed between the devices, and the tunneling or the VPN establishment is performed as part of the pre-connection phase. The tunnel endpoints are authenticated before secure VPN tunnels can be established. User-created remote-access VPNs may use passwords, biometrics, two-factor authentication, or any other cryptographic methods. Network-to-network tunnels often use passwords or digital certificates, and permanently store the key in order to allow a tunnel to establish automatically, without intervention from a user.

The process of fetching content, corresponding to the "Content Request" step 82 that is part of the 'URL Fetch' flow chart 87, starts with the requesting client 31*a* send a request for content to the SP server 72, as shown in a message path 121*a* shown as part of a messaging chart 120 shown in FIG. 12. In one example, such request only comprises an identification (such as a URL) of the requested content. Preferably, the request includes a guidance regarding selection of a tunnel device that will be used for fetching the requested content. In one example, the request includes, either as integral part of the request, as an appended message, or as a separate message, the attribute type and an attribute value, to be used for selecting the tunnel device to be used. In another example, multiple values, or a range of values are defined for the attribute type that serves as a criterion. Further, multiple attributes types may be used, each associated with a value or with multiple values.

The content request message, as well as the attributes types and values information, may be sent over the message path 121*a* using a proprietary protocol, agreed upon between the two communicating nodes. Preferably, the SOCKS, WebSocket (ws), which may be WebSocket Secure (wss), or HTTP Proxy protocol may be used, where the client device 31*a* executes a client-side protocol, and the SP server 72 executes a server-side protocol.

In response to receiving the content request over the message path 121*a*, the SP server 72 forward the content request, along with the tunnel selection criteria, to the TB server 71, shown as a message path 131*a* in the messaging chart 120*a* shown in FIG. 12*a*. The message sent over the message path 131*a* may use a proprietary protocol, agreed upon between the two communicating nodes. Preferably, the HTTP, HTTPS, Socket Secure (SOCKS), WebSocket (ws), which may be WebSocket Secure (wss), or HTTP Proxy protocol may be used, where the SP server 72 executes a client-side protocol, and the TB server 71 executers a server-side protocol. Alternatively or in addition, the SP server 72 may execute the server-side protocol, and the TB server 71 may executer the client-side protocol.

As part of the "Tunnel Selection" phase 83, according to a pre-set of criteria, according to the attributes type and values that were received from the client device 31*a* as part of the message path 121*a*, or according to any combination thereof, the TB server 71 uses the tunnels list stored in the memory 73, which may include the table 100, for selecting a tunnel device to be used. In one example, the attribute type is location and the value is Moskow, Russia, hence the tunnel #4 33*d*, which record is included in the fourth row 101*d* of the table 100, is suitable to be selected, and is selected by the TB server 71 to serve the specific content request from the client device 31*a*.

In one example, the tunnel device to be used may be randomly selected, allowing, for example, for load balancing. In one example, by randomly selecting different tunnel devices for multiple content pieces of content (such as multiple web pages of the same web site) from the same content source, the web server 22*b* senses distributed requesting schemes, and further cannot attribute the requests to the client device 31*a*, further providing anonymity and untraceability.

In a case where no criteria for selecting is directed by the requesting client 31*a*, the TB server 71 may randomly select a tunnel device from the group or list of all currently available tunnel devices. Similarly, in a case where there are multiple tunnel devices that are available and all of them satisfy the criteria set (such as all of them are associated with a defined value, or are within the range of defined values, relating to a specific attribute type), the TB server 71 may randomly select a tunnel device from the group or list of all currently available tunnel devices that also satisfy the defined criteria.

Upon completing the selection of the tunnel #4 33*d*, the TB server 71 forwards the requested content identification to the selected tunnel #4 33*d*, shown as a message path 131*b* in the messaging chart 120*b* shown in FIG. 12*b*. Such communication uses the established connection 111*d* (such as the TCP connection) that was established during the "Registration and Connection" phase 81, allowing for communication via the firewall 75. The message sent over the message path 131*b* may use a proprietary protocol, agreed upon between the two communicating nodes. Preferably, the HTTP, HTTPS, Socket Secure (SOCKS), WebSocket (ws), which may be WebSocket Secure (wss), or HTTP Proxy protocol may be used, where the TB server 71 executes a server-side protocol, and the tunnel #4 33*d* executes a client-side protocol. Alternatively or in addition, the TB server 71 may execute a client-side protocol, and the tunnel #4 33*d* may execute the server-side protocol.

In response to the request message 131*b*, the selected tunnel #4 33*d* sends a request for the identified content to the appropriate server that stores the required content, exampled to be the web server 22*b*, shown as a message path 131*c* in a messaging chart 120*b* in FIG. 12*b*. Thus, the "Using Tunnel" phase 84 is completed where the request arrives at the content source, namely the web server 22*b*. The message sent over the message path 131*c* may use a proprietary protocol, agreed upon between the two communicating nodes. Preferably, the HTTP or HTTPS protocol may be used, where the web server 22*b* executes the server-side protocol, and the tunnel #4 33*d* executes the client-side protocol. Further, any tunneling protocol or mechanism may be used where the selected tunnel, which is the tunnel #4 33*d* in the example herein, serves as a tunnel between the TB server 71 and the web server 22*b*.

The requested content is then fetched from the web server 22*b* to the requesting client 31*a*, as part of the "Content Fetching" phase 85, along the 'opposite' route of the request flow. As shown in a messaging chart 130 shown in FIG. 13, the content is first sent from the web server 22*b* to the selected tunnel #4 33*d* along a message path 131*d*, which in turn sends it to the TB server 71 along a message path 131*e*, which in turn sends it to the SP server 72 along a message path 131*f*, arriving at the requesting client 31*a* along a message path 131*g*, completing the request/response cycle from the client device 31*a* point of view. The same protocol or protocols used for forwarding the request from the client device 31*a* to the web server 22*b* may be equally used for any portion of the 'return' path of the requested content from the web server 22*b* to the client device 31*a*. Alternatively or in addition, the return path may use different protocol or protocols than the ones used in the requesting path.

The TB server 71 generally executes a flowchart 140 shown in FIG. 14. The TB server 71 generally executes in parallel at least a "Connection Handler" flow chart 140*a* and a "Request Handler" flow chart 140*b*. The "Connection Handler" flow chart 140*a* involves identifying a device that is available to server as a tunnel device. For each such device, a record of the device and its associated various attributes values is formed, stored and maintained, together with establishing a continuous connection with the tunnel device, corresponding to the "Registration and Connection" phase 81 and the messaging charts 110 and 110*a* respectively shown in FIGS. 11 and 11*a*. The TB server 71 continuously listens and waits for tunnel devices to initiate a communication. Upon receiving a communication request from a potential tunnel device, such as from the tunnel #2 33*b* shown as message path 111*b* in the chart 110, the TB server 71 accepts the communication from the tunnel device, as part of an "Accept and Open Connection" step 141. In addition to the tunnel device IP address, information regarding the connection timing, the tunnel device type, connection functionalities, operating system, processing power, and other values relating to various attribute types are obtained (such as from the tunnel device itself, from the connection, or otherwise), and stored as a record in the tunnels list 73, which may be in a form of a row in the table 100 shown in FIG. 10, as part of an "Add to Table" step 142. The tunnel device is then available for being selected for use in a fetching content operation, and the selection may be based on the respective information in the record in the table 100. In order to allow for the TB server 71 to initiate communication with this available tunnel device, a continuous connection is established as part of an "Establish Connection" step 143. For example, a TCP connection 112*b* (using TCP keepalive mechanism) may be used as shown in the chart 110*a* shown in FIG. 11*a*. Upon sensing that there is no response from this tunnel device as part of a "Detect Disconnection" step 143*a*, such as not receiving a keepalive message reply after a set interval, the TB server 71 assumes that this tunnel device is no longer available to be used as a tunnel device for content fetching operation, and the respective record is deleted from the table 100 as part of a "Remove from table" step 144. The "Connection Handler" flow chart 140*a* is repeated for every tunnel device, so that a large number of such instances are performed simultaneously and independently.

The "Request Handler" flow chart 140*b* involves selecting a tunnel device from the available ones based on a request from the SP server 72, and using the selected tunnel device for fetching the requested content. The "Request Handler" flow chart 140*b* is repeated for each content (such as URL) request from the client device 31*a* conveyed to it from the SP server 72, so that a large number of such instances of this operation are performed simultaneously and independently. First, a content request is received from the SP server 72 as part of a "Receive Request from SP" step 145, corresponding to the message path 131*a* shown in the messaging chart 120*b* shown in FIG. 12*b*. In general, the request includes a replica of the content request received from the requesting client 31*a*. Based on pre-set criteria and criteria that is part of the received request, the TB server 71 selects the tunnel device from the available ones, as part of a "Select Tunnel" step 146, which correspond to the "Tunnel Selection" phase 83. As part of a "Send Request to Tunnel" step 147, which corresponds to the message path 131*b* shown in the messaging chart 120*b* and performed as part of the "Using Tunnel" phase 84, the identification of the requested content of forwarded to the selected tunnel device, exampled as the tunnel #4 33*d* in the example herein. After the content is fetched by the selected tunnel device #4 33*d* from the web server 22*b*, it is forwarded and received by the TB server 71 as part of a "Receive Content from Tunnel" step 148, which corresponds to the message path 131*e* shown in the messaging chart 130 (shown in FIG. 13) and performed as part of the "Content Fetching" phase 85. The handling of the content requested is completed by sending the fetched content as a response to the SP server 72 request as part of a "Send Content to SP" step 149, which corresponds to the message path 131*f* shown in the messaging chart 130 and performed as part of the "Content Fetching" phase 85.

The SP server 72 generally executes a flowchart 150 shown in FIG. 15 for each piece of information or content (such as a single URL) requested by the client device 31*a*. The operation starts when a content request is received from the client device 31*a* as part of a "Receive Request from Client" step 151, which corresponds to the message path 121*a* shown in the messaging chart 120 (shown in FIG. 12) and performed as part of the "Content Request" phase 82 (shown in FIG. 8). The request is forwarded by the SP server 72 to the TB server 71 as part of a "Send Request to TB" step 152, which corresponds to the message path 131*a* shown in the messaging chart 120*a*, and received by the TB server 71 as part of the "Receive Request from SP" step 145 (shown in FIG. 14). Upon the content arriving to the TB server 71, it is forwarded by the TB server 71 to the requesting SP server 72 as part of the "Send Content to SP" step 149, and received as part of a "Receive Content from TB" step 153, which corresponds to the message path 131*f* shown in the messaging chart 130 (shown in FIG. 13) and performed as part of the "Content Fetching" phase 85. The received content is then sent to the requesting client 31*a* as part of a "Send Content to Client" step 154, which corresponds to the message path 131*g* shown in the messaging chart 130 and performed as part of the "Content Fetching" phase 85 (shown in FIG. 8).

SSL Sniffing. SSL (Secure Sockets Layer) certificates are used to secure online communication and transactions with encryption. The SSL encryption technology creates encrypted connections between a user/web browser and website/web-server. The SSL certificate makes sure that all communication that gets transmitted through a browser/website/server is encrypted and decrypted in such a manner that only the sender and the recipient would be able to see it in the decrypted form. The SSL sniffing refers to the intercepting and reading of SSL encrypted traffic using an MITM (Man in the Middle) proxy.

SSL sniffing works in different ways. In some SSL implementations, the MITM proxy is used to redirect the end user in a communication to a non-HTTPS website and then sniff the non-encrypted traffic in that site. At the same time, requests would be relayed to and from the HTTPS site via a proxy. The man in the middle can alternatively grab the HTTPS traffic and present a valid HTTPS certificate to the end user. The certificate would need to be trusted on the end user machine. Thus, the end user machine would need to be compromised or a trusted certificate has to be obtained. The man in the middle would then relay traffic to the actual HTTPS site and at the same time look at the unencrypted traffic, sitting in the middle of it all. There is another option too—grabbing the encrypted traffic and recording it, in the hope that in future, technology would help decrypt the data. An implementation example of SSL Sniffing, which extracts hostname from SSL by parsing TLC/SNI record (sni.js), is described in the web-page by 'Marek's—totally not insane—idea of the day' (dated Jun. 16, 2012) entitled: "*Dissecting SSL handshake*", which is incorporated in its entirety for all purposes as if fully set forth herein. SSL Sniffing is further described in Netronome Systems, Inc. white-paper published 2010 (February 2010) entitled: "*Examining SSL-encrypted Communications*", which is incorporated in its entirety for all purposes as if fully set forth herein.

A system, method and computer program product for guaranteeing a data transaction over a network using SSL sniffing are disclosed in U.S. Pat. No. 7,853,795 to Dick et al. entitled: "System, method and computer program product for guaranteeing electronic transactions", which is incorporated in its entirety for all purposes as if fully set forth herein. When a data transaction between at least a server and a client is detected on a network, data transmitted via the network between the server and client during the data transaction is captured. At least one identifier is associated with the captured data. A timestamp is also generated for the captured data. The timestamp includes information therein identifying at least a portion of the identifier(s). The captured data, the identifier(s), and the timestamp are stored in one or more data stores. The identifier(s) associated with the stored captured data is also mapped to an entry in an index to permit retrieval of the stored data from the data store via the index.

In one example, the message received by the SP server 72 from the client device 31*a* as part of the "Receive Request from Client" step 151 is according to HTTPS protocol, where part or all of the message is encrypted using TLS or SSL. In such a case, the SP server 72 (or the TB server 71), may use SSL Sniffing for extracting the content identifier (such as the requested URL), for extracting any attribute values included in the message, for extracting any other information that is included in the message and is required for system operation. The SP server 72 may use SSL Sniffing that includes parsing the SSL handshake, such as parsing the ClientHello and ServerHello parts of the CONNECT request in the TLS handshaking. In an example where the client device 31*a* sends an HTTPS request that includes 'CONNECT amazon.com', the SP server 72 replies with a message consisting of: 'HTTP/1.1 200 OK', and continues to apply pkg/util/tls.js Handshake:extract_sni to all following messages from the client device 31*a*. If a message contains SNI and it is amazon.com, or the message does not contain SNI—the SP server 72 sends the ClientHello to the Amazon web server (which may be the web server 22*b*), and start listening for the ServerHello while applying the Handshake: extract_cert_names to all received messages therefrom, until the certificate part is being received and parsed. If the received server certificate is for amazon.com and not a different/blocked host, the SP server 72 sends a response back to the client device 31*a* and begins tunneling data without parsing.

For each piece of information or content (such as a single URL) requested by a client device, such as the exampled client device 31*a*, generally executes a flowchart 160 shown in FIG. 16. It is noted that multiple content fetching operations may be performed in parallel or in series, as described regarding the flow charts 90*a* (shown in FIGS. 9*a*) and 90*b* (shown in FIG. 9*b*) above. Any content fetching operation starts by sending a content request to the SP server 72 as part of a "Send Request to SP" step 161, and the request is received by the SP server 72 as part of the "Receive Request from Client" step 151 (shown in FIG. 15). This action corresponds to the message path 121*a* shown in the messaging chart 120 (shown in FIG. 12) and performed as part of the "Content Request" phase 82 (shown in FIG. 8). Upon availability of the requested content at the SP server 72, the content is sent to the client device 31*a* as part of the "Send Content to Client" step 154, and is received by the client device 31*a* as part of a "Receive Content from SP" step 162, which corresponds to the message path 131g shown in the messaging chart 130 (shown in FIG. 13) and performed as part of the "Content Fetching" phase 85. In one example, the client device 31*a* need only to know the IP address of the SP server 72, and need only to identify the requested content and the criteria (if any) for selecting a tunnel for fetching this content. The request message sent to the SP server 72 may include identification of the requested content, such as a URL.

In one example, the client device 31*a* does not impose any limitations or does not provide any criteria or limitations for selecting a tunnel device for a specific requested content. In such a case, the tunnel selection by the TB server 71 as part of the "Select Tunnel" step 146 (shown in FIG. 14) is not limited by the client, and any internal selection rules or mechanisms may be used. Alternatively or in addition, the client device 31*a* defines specific limitations or criteria for selecting a tunnel device for a specific requested content. Such criteria may involve defining attributes types, and a value of values relating to each attribute values. In such a case, the tunnel selection by the TB server 71 as part of the "Select Tunnel" step 146 is limited by the client, and the client set limitations will apply in addition to any internal selection rules or mechanisms that may be used. Alternatively or in addition, the client device 31*a* may define a specific tunnel device, for example identified by a specific IP address, to be used for the specific requested content. For example, the web server 22*b* may differently respond to a content requesting device, based on past interactions with that device. In such a case, the client device 31*a* may execute a flow chart 160*a* shown in FIG. 16*a*. In such a case, an identification of the tunnel device that was selected as used for fetching the specific content is also sent from SP server 72 to the client device 31*a*, in addition to sending the fetched content from the SP server 72 as part of the "Send Content to Client" step 154, receiving it by the client device 31*a* as part of a "Receive Content from SP" step 162. The tunnel identification is stored by the client device 31*a* as part of a "Save Tunnel IP" step 162*a*. In a next content fetching cycle initiated by the client device 31*a*, such as when the content is to be fetched from the same web server 22*b*, the content request as part of the "Send Request to SP" step 161 is appended to further include the specific tunnel device IP address to be used, retrieved after being stored in prior operation as part of the "Save Tunnel IP" step 162*a*, as part of a "Send Tunnel IP to SP" step 161*a*. The request for a specific tunnel device is then forwarded by the SP server 72 to the TB server 71 as part of the message path 131*a* (shown in FIG. 12*a*), and then the TB server 71 selects the requested tunnel device for fetching the content, as part of the "Select Tunnel" step 146 (shown in FIG. 14).

Each of the tunnel devices, such as the tunnel #1 33*a*, the tunnel #2 33*b*, the tunnel #3 33*c*, the tunnel #4 33*d*, and the tunnel #5 33*e*, generally executes a flowchart 170 shown in FIG. 17. Upon connecting to the Internet, upon deciding to serve as a tunnel server, or upon having the ability to serve as a tunnel device, the tunnel device initiates a connection to the TB server 71, as part of an "Initiate TB Connection" step 171, respectively corresponding to the message paths 111*a*, 111*b*, 111*c*, 111*d*, and 111*e* (shown in FIG. 11). The connection initiation as part of the "Initiate TB Connection" step 171 is responded by the TB server 71 as part of the "Accept and Open Connection" step 141 in the flow chart 140*a* (shown in FIG. 14), and is performed as part of the "Registration and Connection" phase 81 (shown in FIG. 8). In an arrangement where a tunnel selection is based on attribute values, the tunnel device sends the corresponding values, such as the operating system type and version (corresponding to the column 102*f* in the table 100), and any other value relating to any other attribute type, as part of a "Send Attribute Value" step 172, so the value (associated with the tunnel device IP address, for example) may be added to the tunnel registry as part of the tunnels list memory 73, such as adding a row to the table 100 (shown in FIG. 10) by the TB server 71 as part of the "Add to Table" step 142 (shown in FIG. 14). After initializing the communication, the tunnel device and the TB server 71 sustain a connection, such as a TCP connection using the TCP keepalive mechanism, as part of an "Establish Connection" step 173 and the "Establish Connection" step 143, respectively illustrated in the messaging chart 110*a* as message dashed lines 112*a*, 112*b*, 112*c*, 112*d*, and 112*e* (shown in FIG. 11*a*). The establishing of the sustained connection between the tunnel device and the TB server 71 completes the "Registration and Connection" phase 81 in the flow chart 80 (shown in FIG. 8).

In a case where a tunnel device is selected by the TB server 71 as part of the "Select Tunnel" step 146 (shown in FIG. 14), the TB server 71 sends to the selected tunnel device as part of the "Send Request to Tunnel" step 147 the content request, which is received as part of a "Receive Request from TB" step 174, corresponding to the message path 131*b* shown in the example of selecting the tunnel #4 33*d* in the messaging chart 120*b* (shown in FIG. 12*b*). In response, the selected tunnel device #4 33*d* forwards the request to the relevant web server, such as the web server 22*b*, as part of a "Send Request to Web Server" step 175, corresponding to the message path 131*c* shown in the example of selecting the tunnel #4 33*d* in the messaging chart 120*b*, thus completing the "Using Tunnel" phase 84 in the flow chart 80 shown in FIG. 8.

As part of the "Content fetching" phase 85, the content retrieved from the web server 22*b* (as a response to the request) is received by the selected tunnel device as part of a "Receive Content from Web Server" step 176 (corresponding to message path 131*d* in the messaging chart 130, shown in FIG. 13), and is then forwarded (or 'tunneled') to the TB server 71 as part of a "Send Content to TB" step 177, to be received by the TB server 71 as part of the "Receive Content from Tunnel" step 148 shown in FIG. 14, corresponding to message path 131*e* in the messaging chart 130.

The operation from "Receive Request from TB" step 174 to the "Send Content to TB" step 177 may be repeated each time the tunnel is selected. The connection established in the "Establish Connection" step 173 is sustained after each such content tunneling operation, allowing for additional tunneling operations to be performed using the same tunnel. The same tunnel may be selected for the same web server 22*b*, such as for different URLs of the same web page stored in the web server 22*b*. Alternatively or in addition, the same tunnel may be used for different web servers, such as for retrieving different web pages or web sites associated with different web servers.

In one example, one or more of the tunnel devices are used primarily for purposes other than serving as tunnel devices. In such a case, the tunnel functionality or operation, such as executing the flow chart 170 shown in FIG. 17, is executed in the background or when the device is idling from other activities, preferably with the knowledge of the tunnel device owner and user, and preferably with minimum interference or interaction with other processes, operations, or activities of the tunnel device.

While the system operation was exampled above where each tunnel device is associated with a single IP address, multiple IP addresses may be equally associated with any tunnel device. In one example, the tunnel device 33*a* shown as part of the arrangement 180 shown in FIG. 18 may be addressed using multiple IP addresses, such as by using multihoming. The tunnel device 33*a* (or any tunnel device) may execute the tunnelling process 170 for each of the IP addresses, either in parallel or sequentially (or a combination thereof), thus allowing the savings resulting by using a single hardware device with a single Internet connection executing multiple tunnel functionalities. Alternatively, multiple Internet connections may be used, where one or more IP addresses are associated with each Internet connection. Dedicated tunnels may be implemented as client devices, or preferably as server, such as located as part of data centers. Preferably, the dedicated tunnels, either as client devices or as servers in data centers, are installed in many locations around the world, allowing for better load balancing due to the widespread distribution, as well as providing large variety of potential locations or IP geolocations that may be selected as location attribute values by client devices. A dedicated tunnel device may be associated with more than 1,000, 2,000, 5,000, 10,000, 20,000, 50,000 or 100,000 distinct IP addresses.

In general, the tasks performed by the TB server 71, as part of the operation of the flow chart 140 shown in FIG. 14, may be partitioned into two main objectives: Selecting a tunnel device, such as the "Select Tunnel" step 146, and being in the 'tunneling' path of fetching the content, such as the "Receive Content from Tunnel" step 148 and the "Send Content to SP" step 149. In one exemplary arrangement, the TB server 71 is focused only on the tunnel selecting operation and is not taking part in the "Content Fetching" phase 85.

A messaging chart arrangement 190 that supports the obviating of the TB server from being part of the content fetching path is shown in FIG. 19. In response to the tunnel #4 33*d* exampled as being selected and communicated by the TB server 71 over the message path 131*b* described above, the selected tunnel #4 33*d* initiates a communication with the SP server 72 over a message path 191. Any technique or technology may be used for directing the selected tunnel #4 33*d* to connect to the SP server 72, preferably a NAT traversal-based technique. Preferably, after the initial communication between the selected tunnel #4 33*d* and the SP server 72 is made, the connection (shown as a dashed line 192) is sustained, such as by using TCP keepalive and part of a TCP Connect scheme, similar to, or different from, the connection 111*d* that is established between the tunnel #4 33*d* and the TB server 71. Once the connection 192 is established and sustained, the SP server 72 may initiate communication with the selected tunnel #4 33*d*. In one example, the SP server 72 sends the identification of the requested content (such as a URL) to the selected tunnel #4 33*d*, shown as a message path 193 in a messaging chart 190*a* in FIG. 19*a*. Similar to the example shown in FIG. 13 above and the related description, the selected tunnel #4 33*d* performs the tunneling functionality by forwarding the content request to the web server 22*b* over the message path 131*c*, and receiving the requested content over the message path 131*d* shown in FIG. 19*b*. However, the requested content is then forwarded to the requesting device, namely the SP server 72, over a message path 194 illustrated as part of a messaging chart 190*b* in FIG. 19*b*, rather than being forwarded to the TB server 71 over the message path 131*e* as described above. In turn, the received content from the selected tunnel #4 33*d* is forwarded by the SP server 72 to the requesting client 31*a* over the message path 131*g* as described above.

The mechanism of the "Content Fetching" phase 85 that is described in the messaging chart 190*b* involves the selected tunnel #4 33*d* receiving the content from the web server 22*d* over the message path 131*d*, forwarding the content from the selected tunnel #4 33*d* over the message path 194 to the SP server 72, which in turn send the fetched content as a response to the requesting client 31*a* over the message path 131*g*. Such content path is preferred since the 'tunneling' via the TB server 71 using the message paths 131*e* and 131*f* is obviated, providing one less hop of carrying information from the web server 22*b* to the client device 31*a*, thus providing less latency, higher reliability, and less costs associated with the additional traffic, hardware and processing power required for handling the unnecessary tunneling via the TB server 71. Further, such scheme allows to optimize the structure and functionalities of the TB server 71 for tunnel selection activities.

In the alternative arrangement described in FIGS. 19-19*b*, the TB server 71 generally executes a flowchart 200 shown in FIG. 20, which is based on the flowchart 140 shown in FIG. 14. The TB server 71 generally executes in parallel at least the unchanged "Connection Handler" flow chart 140*a* and a "Selection Handler" flow chart 201, which may replace the "Request Handler" flow chart 140*b*, which is direct to selecting a tunnel device according to criteria.

As part of processing a content request from the client device 31*a*, the TB server 71 receives from the SP server 72, over the message path 131*a* shown in the messaging chart 190, criteria (or a criterion) for selecting a tunnel device to be used for delivering the requested content, as part of a "Receive Criteria from SP" step 202. While as a part of the "Receive Request from SP" step 145 that is part of the flow chart 140*b* the TB server 71 was also notified of the identification of the requested content, such identification is not required in this alternative scheme, since the TB server 71 is no longer part of the actual content request and fetching data paths. In one example, the same message, including also the content identification is sent from the SP server 72 to the TB server 71 over the message path 131*a*, so that the "Receive Criteria from SP" step 202 may be rendered to be the same as the "Receive Request from SP" step 145 described above. After the tunnel device is selected as part of the "Select Tunnel" step 146, the TB server 71 sends a message to the selected tunnel #4 33*d* over the message path 131*b*, directing it to initiate communication (such as by using NAT traversal) with the SP server 72, as part of the "Connect and Direct Tunnel" step 203. In the scheme shown in FIG. 19, the tunnel selection phase 83 is completed, and the involvement of the TB server 71 in the fetching process ends after directing the selected tunnel #4 33*d* in the "Connect and Direct Tunnel" step 203.

In the alternative arrangement described in FIGS. 19-19*b*, the SP server 72 generally executes a flowchart 210 shown in FIG. 21, which is based on the flowchart 150 shown in FIG. 15. The SP server 72 generally executes the flowchart 210 shown in FIG. 21 for each piece of information or content (such as a single URL) requested by the client device 31*a*. The operation starts when a content request is received from the client device 31*a* as part of the "Receive Request from Client" step 151, which corresponds to the message path 121*a* shown in the messaging chart 120 shown in FIG. 12 and performed as part of the "Content Request" phase 82 shown in FIG. 8. A request from the client device 31*a* may include both identification of the requested content and criteria for selecting a tunnel device, such as the attribute type to use and the associated attribute value or values. As part of a "Send Criteria to TB" step 212, the criteria set by the client device 31*a* for the selection of the tunnel device, as part of the request, is sent to the TB server 71, without the content identification part, over the message path 131*a*, to be received by the TB server 71 as part of the "Receive Criteria from SP" step 202 shown in FIG. 20. Alternatively, the message sent includes the whole content request information, similar to, or identical to, the "Send Request to TB" step 152 in the flow chart 150 (FIG. 15), which corresponds to the message path 131*a* shown in the messaging chart 120*a* (FIG. 12*a*), and received by the TB server 71 as part of the "Receive Request from SP" step 145 shown in FIG. 14. As part of an "Accept and Open Connection" step 213, the SP server 72 receives a communication initiated by the selected tunnel #4 33*d*, shown as a message path 191, and the connection between the SP server 72 and the selected tunnel #4 33*d* is sustained as part of an "Establish Connection" step 214. The sustained connection is illustrated as a message path 192, and may be based on the TCP connection that uses the TCP keepalive mechanism, similar to the connection 111*d* between the selected tunnel #4 33*d* and the TB server 71. The sustained connection allows the SP server 72 to initiate communication with the tunnel #4 33*d*, even in the presence of a filtering device such as a router or the firewall 75.

Using the established connection 192, the SP server 72 forwards the content identification to the selected tunnel #4 33*d* as part of a "Send Request to Tunnel" step 215, illustrated as message path 193 in a messaging chart 190*a* shown in FIG. 19*a*, and in response the selected tunnel #4 33*d* provides 'tunneling' by forwarding the request to the web server 22*b* over the message path 131*c*, as part of the "Using Tunnel" phase 84. The content fetched by the selected tunnel #4 33*d* is in turn sent to the SP server 72, and received over the message path 194 illustrated in a messaging chart 190*b* shown in FIG. 19*b*, as part of a "Receive Content from Tunnel" step 216. Similar to the flow chart 150 above, the SP server 72 then forwards the fetched content as a response to the client device 31*a* request over the message path 131*g* as part of the "Send Content to Client" step 154, completing the "Content Fetching" phase 85 shown in FIG. 8.

In the alternative arrangement described in FIGS. 19-19*b*, the selected tunnel device, such as the exampled tunnel device #4 33*d*, generally executes a flowchart 220 shown in FIG. 22, which is based on the flowchart 170 shown in FIG. 17. The selected tunnel device generally executes the flowchart 220 shown in FIG. 22 each time it is selected as a tunnel device by the TB server 71. Using the established connection 111*d*, the tunnel #4 33*d* receives an instruction from the TB server 71 (that is sent as part of the "Connect and Direct Tunnel" step 203 of the flow chart 201) to connect to the SP server 72, as part of a "Receive Direct from TB" step 221 over the message path 131*b*. In response, as part of an "Initiate SP Connection" step 222, the tunnel device #4 33*d* connects to the SP server 72, and then a sustained connection, shown as the message path 192, is formed as part of a "Establish Connection" step 223, corresponding to the "Establish Connection" step 214 in the flow chart 210. A content request sent by the SP server 72 as part of the "Send Request to Tunnel" step 215 (in the flow chart 210) is received by the selected tunnel #4 33*d* as part of a "Receive Request from SP" step 224, illustrated as the message path 193 in the messaging chart 190*a* shown in FIG. 19*a*. Similar to the flow chart 170 above, the selected tunnel device forward the request to the relevant web server, such as the web server 22*b*, as part of the "Send Request to Web Server" step 175, corresponding to the message path 131*c* shown in the example of selecting the tunnel #4 33*d* in the messaging chart 190*a*, thus completing the "Using Tunnel" phase 84 in the flow chart 80 shown in FIG. 8.

As part of the "Content fetching" phase 85, the content retrieved from the web server 22*b* (as a response to the request) is received by the selected tunnel device as part of the "Receive Content from Web Server" step 176 (corresponding to the message path 131*d* in the messaging chart 130 of FIG. 13), and is then forwarded (or 'tunneled') to the SP server 71 as part of a "Send Content to SP" step 225, and received by the SP server 72 as part of the "Receive Content from Tunnel" step 216, corresponding to message path 194 in the messaging chart 190*b*.

Any of the steps or the flow charts to be executed by the tunnel device, may be included as a Software Development Kit (SDK) that is provided as a non-transitory computer readable medium containing computer instructions. The SDK may be installed in a respective tunnel device, to be executed by a processor in that device, or appended to another software program or application installed on the tunnel device.

An attribute type is used herein to include any characteristic, feature, aspect, property, or any other piece of information where one tunnel device is different from another tunnel device. The attribute type may be associated with the tunnel device itself, such as its hardware, software, or any combination thereof, the tunnel device environment, such as its location, or a connectivity related feature or capability, such as relating to Internet connectivity. Each available tunnel device may be associated with a value (or multiple value, such as a range) for each attribute type. The attribute values may be stored in the tunnels list memory 73 that is part of, or connected to, the TB server 71, that may be, for example, in the form of the table 100 shown in FIG. 10.

The table 100 examples in the "Geographic Location" column 102*c* an attribute type relating to the location of tunnel devices, which may be actual geographical location or may be based on IP Geolocation. In the example of the "Geographic Location" column 102*c*, the attributes values are in the form of cities, such as the city of Munich, Germany in the second row 101*b* that corresponds to a tunnel device having an IP address of 176.94.1.17, and the city of Mumbai, India in the sixth row 101*f* that corresponds to a tunnel device having an IP address of 59.144.192.23. While cities are exampled as values, any other physical geographical location or region may be used, such as country, state or province, city, street address, ZIP code, or any combination thereof. Similarly, an attribute type may correspond to the Internet connection of a tunnel device, as the table 100 examples in the "ASN" column 102*d* relating to the ASN (or ISP name or any other identification). In the example of the "ASN" column 102*d*, the attributes values are in the form of digits that represent the ASN (or ISP), such as the ASN 3215 in the first row 101*a* that corresponds to a tunnel device having an IP address of 80.12.105.150, and the ASN 11419 in the seventh row 101*g* that corresponds to a tunnel device having an IP address of 200.196.224.89. Any other identification of ASN, ISP, or any other Internet connection relating mechanism or identity may be equally used.

Another attribute type that may correspond to the technology used for interconnecting a tunnel device to the Internet, as the table 100 examples in the "Connection Type" column 102*e* relating to the technology or connection scheme. Similarly, the attribute type may correspond to a tunnel device hardware or software, type, version, or any combination thereof, such as the table 100 examples in the "Operating System" column 102*f*. Alternatively or in addition, an attribute type may correspond to estimated or measured communication related features, such as the bandwidth as exampled in the "BW" column 102*g* or the "RTT" column 102*h*. The BW or RTT may relate to the tunnel estimated or measured communication properties (such as parameters measured in previous transactions) with the web server 22*b* (such as over the message paths 131*c* or 131*d*), with the TB server 71 (such as over the message paths 131*b* and 131*e*), or with the SP server 72 (such as over the message paths 191 and 194).

In one example, a single attribute type is used for distinguishing between the various available tunnel devices. In this case, the client device 31*a*, as part of the "Send Request to SP" step 161, sends to the SP server 72 over the message path 121*a* a value (or multiple values, such as a range) requested for the selected tunnel that is to be used in fetching the requested content. The value (or multiple values, such as a range) is received by the SP server 72 as part of the "Receive Request from Client" step 151, and forwarded to the TB server 71 over the message path 131*a* as part of "Send request to TB" step 152. The value (or multiple values, such as a range) is received by the TB server 71 as part of the "Receive Request from SP" 145, and is used as a criterion for selecting a tunnel device for this content fetching transaction as part of the "Select Tunnel" step 146. In one example, a single value is requested, and the TB server 71 thus selects a tunnel device having a value that is identical to the requested value from the client device 31*a*.

For example, assuming an attribute type of operating system and a value of "Window 7", since there is only a single tunnel, being the tunnel represented in the fourth row 101*d* having an IP address of 83.220.232.67, this tunnel is selected. In a case where multiple available tunnel devices in the table 100 are associated with the requested value, one of these available tunnels is selected, such as using random selection. In another example, few values are requested. For example, assuming an attribute type of 'connection type' and values of "ADSL or VDSL", there are three tunnel devices that may be selected, namely the first row 101*a* (a tunnel device having an IP address of 80.12.105.150), the fourth row 101*d* (a tunnel device having an IP address of 83.220.232.67), and the seventh row 101*g* (a tunnel device having an IP address of 200.196.224.89). Any one of these tunnel devices may be selected, such as using random selection. Similarly, the client device 31*a* may define a range of values, typically where numeral values are involved, such as in the attribute type relating to column "BW" 102*g* or the "RTT" column 102*h*. For example, the client device 31*a* may define a "RTT" attribute type having a range between 200 ms (minimum value) and 400 ms (maximum value), directing the selection of the tunnel device represented in the six row 101*f* (a tunnel device having an IP address of 59.144.192.23) or the tunnel device represented in the seventh row 101*g* (a tunnel device having an IP address of 200.196.224.89), in the example of the table 100. Similarly, the client device 31*a* may define only a minimum value, or only a maximum value. For example, a maximum RTT value of 100 ms results in the first row 101*a* and second row 101*b*.

Alternatively or in addition, the selection of the tunnel device to be used (as part of the "Select Tunnel" step 146), or the priorities assigned to them, may be based on the available communication attributes or their history. For example, based on the costs associated with the usage of a network, the higher cost network may have lower priority and be less used than lower cost or free network. In another example, a high-quality network, such as having a higher available bandwidth or throughput, lower communication errors or packet loss, lower hops to destination, or lower transfer delay time, is having higher priority that a lower quality network. The system may use Bit Error Rate (BER), Received Signal Strength Indicator (RSSI), Packet Loss Ratio (PLR), Cyclic Redundancy Check (CRC), and other indicators or measures associated with the communication channel associated with a network interface, and may be based on, use, or include the methodology and schemes described in RFC 2544 entitled: "*Benchmarking Methodology for Network Interconnect Devices*", and ITU-T Y.1564 entitled: "*Ethernet Service Activation Test Methodology*", which are both incorporated in their entirety for all purposes as if fully set forth herein. The network quality grade may be affected by the history of using such a network, for example during a pre-set period before the process of selection of a network interface. In one example, the network interface where the last proper packet was received from may be selected as the interface to be used for the next packet to be transmitted. The system may further use, or be based on, the schemes and technologies described in U.S. Pat. No. 7,027,418 to Gan et al. entitled: "Approach for Selecting Communications Channels Based on Performance", which is incorporated in its entirety for all purposes as if fully set forth herein.

Hence, for any value or range of value defined, a tunnel device to be used may be selected from a set of available tunnel devices, which is a subset of all available tunnel devices that match the requested value or range of values. In one example, the client device 31*a* may use two attributes types, and a value (or a group of values) associated with each attribute type. In such a case, two subsets are formed, one for each attribute, which each subset includes of all available tunnel devices that match the respective requested value (or range of values) for each attribute types. The client device 31*a* may further define a subset that is resulted by an operation on the two subsets. For example, the client device 31*a* may define to select a tunnel from a set that is a union of the two subsets (an 'or' operation), where the union (denoted by ∪) of a collection of sets is the set of all elements in the collection, an intersection of the two sets (an 'and' operation), where the intersection A∩B of two sets A and B is the set that contains all elements of A that also belong to B (or equivalently, all elements of B that also belong to A), but no other elements, a set difference or complement operation (where the complement of a set A refers to elements not in A), an asymmetric difference operation, or a symmetric difference, also known as the disjunctive union, which is the set of elements which are in either of the sets and not in their intersection. For example, in a case of defining a value of BW equal or above 1500 Kb/s 'and' an RTT below 300 ms, the resulted intersection subset includes only the tunnel device represented in the sixth row 101*f*, while in a case of a value of BW equal or above 1500 Kb/s 'or' an RTT below 300 ms, the resulted union subset includes all rows except the seventh row 101*g*. Similarly, three or more attributes values may be defined relating to three of more attribute types.

In one example, the entity 76 or 76*a* forms a system that may be used to provide a service to client devices. The service allows the client device (such as the client device 31*a*) to quickly and anonymously fetch content from a web server, such as the web server 22*b*. The service level may be measured, or the service may be billed for, if applicable, for example, using the following parameters (individually or combined):

Content amount. In this example, the amount of data relating to the content fetched from a data server (such as the web server 22*b*) is measured and logged, by the SP server 72 or the TB server 71. Alternatively or in addition, the client device 31*a* may log or send the amount of content fetched. Number of tunnels: The number of tunnel devices that were available to a client device, or the number of tunnel devices that were actually used, may be used as an indication to the service level. Location: The service level may be measured or billed based on the country of the data server, from which the content is fetched, is located. Similarly, the service level may be measured or billed based the country the client device, to which the content is fetched, is located.

In the messaging chart 190*b* shown in FIG. 19*b*, and in the messaging chart 130 shown in FIG. 13, a single TB server 71 is used. However, multiple TB servers may equally be used, such as for load balancing or for performance optimization. In one example, the tunnel list 73, such as in the form of a table 100 shown in FIG. 10, is split among multiple databases stored in, or connected to, multiple servers using database sharding. Such an arrangement is shown in a messaging chart 230 shown in FIG. 23, which is based on the corresponding messaging chart 130. In addition to the TB server 71, a TB server 71*a* and a TB server 71*b* are connected to the Internet and may be used. While three TB servers are exampled in FIG. 23, two, four, five, or any other number of TB servers may equally be used. The messaging chart 230 examples the SP server 72 selecting the TB server 71*a*, rather than using the TB server 71 as shown in the messaging chart 130. Similar to the former described operation, the SP server 72 forwards a request to the TB server 71*a* over a message path 131*a*1, and the TB server 71*a* may in turn select the tunnel device #4 33*d*, and send a message to it over a message path 131*b*1, followed by establishing of the connection 111*d*1. Similarly, an arrangement employing multiple TB servers is shown in a messaging chart 230*a* shown in FIG. 23*a*, which is based on the corresponding messaging chart 190*b*, where the TB server 71*a* is used instead of the TB server 71.

Each of the TB servers may execute the flow chart 140 shown in FIG. 14 or the flow chart 200 shown in FIG. 20, and may store a table including tunnel devices, in the form, of the table 100. Preferably, load balancing is achieved where the total available tunnel devices (or IP addresses) are split, such as evenly, between the available TB servers. For example, one third of the available tunnel devices may be associated with the TB server 71, another third with the TB server 71*a*, and the rest third with the TB server 71*b*. Preferably, the allocation of tunnel devices (or IP addresses) between the available TB servers may be based on an attribute type, such as the attribute types described associated with the different tunnel devices. In one example, a geographical location may be used. The various TB servers may be located geographically distributed around the world, and tunnel devices are allocated based on their perspective geographical location, either actual location or IP location. For example, the tunnel devices may be allocated to respective TB servers based on their continent, country, region or state, or city. For example, one TB server, such as the TB server 71, may be located in Europe, handling all tunnel devices having an actual geographical location, or IP geolocation, within Europe, such as in Germany or France, a second TB server, such as the TB server 71*a*, may be located in North America, handling all tunnel devices having an actual geographical location, or IP geolocation, within North America, such as in U.S.A. or Canada, and a third TB server, such as the TB server 71*b*, may be located in Asia, handling all tunnel devices having an actual geographical location, or IP geolocation, within Asia such as in China or Thailand. In such a case, the SP server 72 may select the appropriate TB server to use based on the attribute value received from the requesting client 31*a* over the message path 121*a*, as part of the "Receive Request from Client" step 151, as shown in FIG. 15 and FIG. 21.

An SP server 72 operation in the case of multiple TB servers arrangement is described in a flow chart 240 shown in FIG. 24, which is based on the corresponding flow chart 150 shown in FIG. 15. As part of a "Select TB" step 241, a specific TB server, such as the TB server 71*a* in the example of the messaging chart 230, is selected, and the operation continues with working with this selected TB server, such as in a "Send Request to Selected TB" step 242. Similarly, an SP server 72 operation in the case of multiple TB servers arrangement is described in a flow chart 240*a* shown in FIG. 24*a*, which is based on the corresponding flow chart 210 shown in FIG. 21. As part of the "Select TB" step 241, a specific TB server, such as the TB server 71*a* in the example of the messaging chart 230, is selected, and the operation continues with working with this selected TB server, such as in the "Send Request to Selected TB" step 242. The TB server may be randomly selected, as part of the "Select TB" step 241, or may be based on an attribute value received from the client device 31*a*, such as geographical location.

A tunnel device operation, such as the elected tunnel device #4 33*d*, in the case of multiple TB servers' arrangement is described in a flow chart 240*b* shown in FIG. 24*b*, which is based on the corresponding flow chart 170 shown in FIG. 17. As part of a "Select TB" step 241, a specific TB server, such as the TB server 71*a* in the example of the messaging chart 230, is selected, and the operation continues with working with this selected TB server, such as in an "Initiate TB Connection" step 171. Similarly, a tunnel device operation in the case of multiple TB servers arrangement is described in a flow chart 240*c* shown in FIG. 24*c*, which is based on the corresponding flow chart 220 shown in FIG. 22. As part of the "Select TB" step 241, a specific TB server, such as the TB server 71*a* in the example of the messaging chart 230, is selected, and the operation continues with working with this selected TB server, such as in the "Initiate TB Connection" step 171. The TB server may be randomly selected, as part of the "Select TB" step 241, or may be based on an attribute value received from the client device 31*a*, such as geographical location.

In one example, a DNS resolution is required for fetching the content from the web server 22*b*. In one example, the DNS resolution is performed by the requesting client 31*a*, as illustrated in a messaging chart 250 shown in FIG. 25. Before requesting the content from the SP server 72, the client device 31*a* uses a DNS server 251 for a DNS resolution, shown as a message path 252*a*. Then, the request sent to the SP server 72 over the message path 121*a* includes the resolution result, so there is no need for any DNS activity afterwards. Any DNS server may be used as the DNS server 251 by the client device 31*a*. In one example, a specific DNS server 251 is used, which is operated, controlled, or managed by an entity 76*b* as illustrated in a messaging chart 250*a* shown in FIG. 25*a*, which also operates, controls, or manage the TB server 71 and the SP server 72. This entity 76*b* may be the same entity as the entity 76*a* (or 76) described above. The client device 31*a* operation, including a "DNS Resolution" step 261 is described in a flow chart 260 shown in FIG. 26, which is based on the corresponding flow chart 160 shown in FIG. 16.

Alternatively or in addition, the DNS resolution may be performed by the SP server 72, as illustrated in a messaging chart 270 shown in FIG. 27. Before requesting for a tunnel device allocation or the content from the TB server 71, the SP server 72 use the DNS server 251 for a DNS resolution, shown as a message path 252*b*. Then, the request that is sent to the selected tunnel device includes the resolution result, so there is no need for any DNS activity afterward. The SP server 72 operation, including a "DNS Resolution" step 261 is described in a flow chart 280 shown in FIG. 28, which is based on the corresponding flow chart 150 shown in FIG. 15. Alternatively or in addition, the SP server 72 operation, including a "DNS Resolution" step 261 may be as described in a flow chart 280*a* shown in FIG. 28*a*, which is based on the corresponding flow chart 240 shown in FIG. 24.

Alternatively or in addition, the DNS resolution may be performed by the selected tunnel device, such as the tunnel device #4 33*d*, as illustrated in a messaging chart 290 shown in FIG. 29. Before requesting the content from the web server 22*b*, the tunnel device #4 33*d* uses a DNS server 251 for a DNS resolution, shown as a message path 252*c*. Then, the request that is sent to the web server 22*b* includes the resolution result. The tunnel device #4 33*d* operation, including a "DNS Resolution" step 261 is described in a flow chart 300 shown in FIG. 30, which is based on the corresponding flow chart 170 shown in FIG. 17. Alternatively or in addition, the tunnel device #4 33*d* operation, including a "DNS Resolution" step 261 may be as described in a flow chart 300*a* shown in FIG. 30*a*, which is based on the corresponding flow chart 220 shown in FIG. 22.

In the example of the messaging chart 180 shown in FIG. 18 above, the tunnel #1 33*a* was described as a dedicated device, which is primarily installed and used to serve as a tunnel device, or as concurrent multiple tunnel devices, each associated with a different IP address. However, one or more of the tunnel devices may be non-dedicated ones, where their primary functionality or use is other than serving as a tunnel device. For example, the device may be intended to be owned, controlled, or used by a human operator, for various functionalities. In one example, the main functionality may be to serve as a smartphone, such as for making telephone call over a cellular network, as exampled in the tunnel #2 33*b*. In such a case, the tunnel functionality is associated with lower priority compared to other tasks or functionalities performed by the device. Furthermore, it is preferred that the tunnel functionality does not affect in any way, the primary functions of the device, and will not interfere or degrade any other task of functionality provided by the device. Preferably, the tunnel related functionality will be operated only when the device is idling, such as not providing any current service or performing any task of interaction with the human user, preferably so the effect of performing any tunnel functionality is hardly or not noticed in any way by the human operator.

As used herein, the term "idle state" is used to refer to a state in which a device and/or one or more resources of the device are not being used to perform operations considered to be of a sufficiently high priority, or device resources are not being used at a level of intensity, that the operations should not be interrupted or competed with by, or such resources should not be diverted to any extent to, one or more relatively lower priority operations. In one example, 'idle state' refers to a state where the human user is not interacting with the device, and hence is not aware of any interfering with any process or task performed. The term "idle condition" is used in connection with some embodiments to refer to a condition that indicates whether and/or an extent to which the device has entered and/or exited such an idle state. Preferably, a tunnel device performs its tunnel related tasks only when in the idle state, so that the human user or operator is not affected by, or aware of, the tunnel related activity.

An example of a state diagram 310 of a tunnel device, such as the tunnel #2 33*b*, the tunnel #3 33*c*, the tunnel #4 33*d*, or the tunnel #5 33*e*, is shown in FIG. 31. Upon powering the device, a POWER-UP state 311 is established, during which the computerized system is initialized, such as by booting the operating system and connecting to the Internet. Upon completing the POWER-UP 311 sequence, when normal, operative, runtime environment is attained, and the device may provide its primary functions or functionalities, the device shifts (shown as a line 315*a*) to an 'ACTIVE' state 312, and stays in this state as long as the primarily functions or tasks are used. During the 'ACTIVE' state 312, an idle condition is continuously monitored, and when such idle condition is detected (shown as an 'IDLE' Detect line 315*b*), the device sends a message to the TB server 71 regarding entering an 'IDLE' state 313 in the "Notify TB" step 314*a*, such as by using the established connection 111*d*, which is followed (shown as a line 315*c*) by entering the 'IDLE' state 313. Preferably, the tunnel device is selected by the TB server 71 (as part of the "Select Tunnel" step 146) during the 'IDLE' state 313, allowing for minimum intervention or interfering with the primary tasks and functionalities of the tunnel device.

In one example, the tunnel device connects to the TB server 71 as part of the "Initiate TB Connection" step 171, sends the attribute value as part of the "Send Attribute Value" step 172, and establishes the TCP connection as part of the "Establish Connection" step 173 immediately after completing the POWER-UP state 311, as part of the shift to the ACTIVE state 312 shown as the shift line 315*a*. However, in such a case, the tunnel device may not be selected by the TB server 71 as part of the "Select Tunnel" step 146 as long as the tunnel device has not notified the TB server 71 in the "Notify TB" step 314*a* that is in the IDLE state 313. In such a case, the status of the available tunnel devices is stored in the TB server 71, in a form of table 330 shown in FIG. 33, which is based on the table 100 shown in FIG. 10. An 'IDLE' column 102*i* id added, denoting by 'Y' if the respective tunnel device is in the 'IDLE' state 313, and 'N' if the respective tunnel device is not in the 'IDLE' state 313, such as in the 'ACTIVE' state 312. Upon receiving a message of shifting to IDLE state 313 by the "Notify TB" step 314*a*, the TB server 71 changes the respective value in the IDLE column 102*i* to 'Y'. Preferably, the TB server 71 selects a tunnel that is in the 'IDLE' state 313, as noted by the respective value 'Y' in the IDLE column 102*i*, such as from the tunnel devices associated with the first row 101*a*, the fourth row 101*d*, the fifth row 101*e*, and the seventh row 101*g* in the example of the modified table 330.

During the 'IDLE' state 313, an idle condition is continuously monitored, and when such idle condition is not met (shown as an 'ACTIVE' Detect line 315*d*), the device sends a message to the TB server 71 regarding entering an 'ACTIVE' state 312 in the "Notify TB" step 314*b*, such as by using the established connection 111*d*, which is followed (shown as a line 315*e*) by re-entering the 'ACTIVE' state 312. Upon receiving a message of shifting to ACTIVE state 312 by the "Notify TB" step 314*b*, the TB server 71 changes the respective value in the IDLE column 102*i* to 'N'. Preferably, the TB server 71 does not selects a tunnel that is in the 'IDLE' state 313, as noted by the respective value 'N' in the IDLE column 102*i*, such as from the tunnel devices associated with the second row 101*b*, the third row 101*c*, and the sixth row 101*f* in the example of the modified table 330.

A flow chart 320 of a tunnel device that may be used only when idling is shown in FIG. 32, corresponding to the flow chart 170 shown in FIG. 17. After establishing a connection as part of the "Establish Connection" step 173, the tunnel device checks, as part of the "IDLE?" step 321 if it is in the IDLE state 313. In a case where the tunnel device is not in the IDLE state 313, such as if it is in the ACTIVE state 312, a message notifying the unavailability of the tunnel device to serve as a tunnel is sent to the TB server 71 as part of a "Send Status to TB" step 322*b*, which may correspond to the "Notify TB" step 314*b*. In a case where the tunnel device is in, or entering, the IDLE state 313, a message notifying the availability of the tunnel device to serve as a tunnel is sent to the TB server 71 as part of a "Send Status to TB" step 322*a*, which may correspond to the "Notify TB" step 314*a*. Upon receiving such a notification, the TB server 71 may select the tunnel device as part of the "Select Tunnel" step 146, and the selected tunnel is contacted as part of the "Receive Request from TB" step 174. Similarly, a flow chart 320*a* of a tunnel device that may be used only when idling is shown in FIG. 32*a*, corresponding to the flow chart 220 shown in FIG. 22.

Alternatively or in addition, the tunnel device connects to the TB server 71 or any other selected TB server in case of multiple ones), as part the "Initiate TB Connection" step 171, when entering the IDLE state 313. For example, the "Notify TB" step 314*a* may correspond to the "Initiate TB Connection" step 171, so the TB server 71 may be aware of the tunnel device availability only when such a device is in the IDLE state 313. In such a case, upon the sensing of the 'ACTIVE' detect 315*d*, as part of the "Notify TB" step 314*b*, the established connection 111*d* with the selected tunnel device is disconnected, such as by stopping the TCP keepalive mechanism, so that the TB server 71 is notified that the selected tunnel device is no long available to serve as a tunnel device.

Idle detection techniques are disclosed in U.S. Pat. No. 9,244,682 to Rowles et al. entitled: "Idle detection", which is incorporated in its entirety for all purposes as if fully set forth herein. A set of idle conditions that includes one or more conditions not comprising or triggered by an absence of user input is monitored. The device is determined to be idle based at least in part on results of the monitoring. The device may be determined not to be idle even in the absence of recent user input. Any of the idle detection techniques that are disclosed in the U.S. Pat. No. 9,244,682 to Rowles et al. may equally be used herein. Further, in some embodiments, a user or administrator configurable set of idle detection conditions applicable to the particular device and/or desired by the user or administrator are used.

In one example, the idle condition will be based on, or use, services or tasks provided by the operating system or other software applications that are concurrently executed in the tunnel device with the tunnel related flow chart or functionalities. For example, the most operating systems will display an idle task, which is a special task loaded by the OS scheduler only when there is nothing for the computer to do. The idle task can be hard-coded into the scheduler, or it can be implemented as a separate task with the lowest possible priority. An advantage of the latter approach is that programs monitoring the system status can see the idle task along with all other tasks; an example is Windows NT's System Idle Process.

A screensaver (or screen saver) is a computer program that blanks the screen or fills it with moving images or patterns when the computer is not in use, and is typically a computer program that displays aesthetic patterns or images when the computer is not being used, originally intended to prevent screen burn. While the original purpose of screensavers was to prevent phosphor burn-in on CRT and plasma computer monitors (hence the name), though modern monitors are not susceptible to this issue, screensavers are still used for other purposes. Screensavers are often set up to offer a basic layer of security, by requiring a password to re-access the device. Some screensavers use the otherwise unused computer resources to do useful work, such as processing for distributed computing projects. The screensaver typically terminates after receiving a message from the operating system that a key has been pressed or the mouse has been moved. In one example, upon executing an idle process or thread (by the operating system or any other software application), or when a screensaver application is operated, the idle condition is considered to be met, and respectively upon terminating an idle process or the screen-saver operation, the idle condition is considered not to be met.

In one example, the idle condition is not met when any application other than the screen saver is running in "full screen" mode (e.g., movies or video games often run in this mode), relating to a display which covers the full screen without the operating system's typical window-framing interface, or a window occupying all the available display surface of a screen. Conversely, a screen may not be powered or may be blanked, suggesting that is not visualized by a human user. In one example, upon displaying a full screen by a software application the idle condition is considered not to be met, since it is assumed that the human user is watching that screen. However, upon a blanked display or a closed (such as non-powered) displaying, the idle condition is considered to be met, since it is assumed that the human user is not watching in front of the screen.

An input device, such as the input device 18 as part of the computer system 10 shown in FIG. 1, is a piece of computer hardware equipment used to provide data and control signals to an information processing system such as a computer or information appliance. Such input device may be an integrated or a peripheral input device (e.g., hard/soft keyboard, mouse, resistive or capacitive touch display, etc.). Examples of the input devices include keyboards, mouse, scanners, digital cameras and joysticks. Input devices can be categorized based on the modality of input (e.g., mechanical motion, audio, visual, etc.), whether the input is discrete (e.g. pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input devices used to specify a position in space, can further be classified according to whether the input is direct or indirect. With direct input, the input space coincides with the display space, i.e., pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). The direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned.

In one example, the idle detection is based on receiving any input (or change of an input) from an input device. For example, a pre-defined time interval may be used, measured by a dedicated timer or counter or used as a service of the operating system. In case of no input sensed from one or more input devices during the pre-defined time interval, the idle condition is considered to be met. Further, the idle condition is considered not to be met upon receiving any input from one or more of the input devices. Examples include, without limitation, detecting receipt of a user input, e.g., via mouse movement, touch screen interaction, button clicks, or keyboard keystrokes. Such idle-detection methods can detect if a human-interaction device such as a mouse, keyboard, or touch-screen has not been used for a certain amount of time.

When portable or handheld devices are involved, the idle condition may be considered to be met when no motion or acceleration (or a motion or an acceleration below a set threshold) is sensed for a pre-defined time interval, using an accelerometer, a motion sensor, or a GPS. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., quartz, tourmaline). Piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor may be based on the Micro Electro-Mechanical Systems (MEMS, a.k.a. Micro-mechanical Electrical Systems) technology. A MEMS based motion sensor is disclosed in U.S. Pat. No. 7,617,729 to Axelrod et al. entitled: "Accelerometer", U.S. Pat. No. 6,670,212 to McNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Data-sheet LIS302DL STMicroelectronics NV, '*MEMS motion sensor* 3-*axis*—±2 *g*/±8 *g smart digital output "piccolo" accelerometer*', Rev. 4, October 2008, which is incorporated in its entirety for all purposes as if fully set forth herein.

Alternatively or in addition, the motion sensor may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, NH, USA, described in the data-sheet '*DATASHEET SQ-SEN*-200 *Omnidirectional Tilt and Vibration Sensor*' Updated 2009 Aug. 3, which is incorporated in its entirety for all purposes as if fully set forth herein. Other types of motion sensors may be equally used, such as devices based on piezoelectric, piezoresistive and capacitive components to convert the mechanical motion into an electrical signal. Using an accelerometer to control is disclosed in U.S. Pat. No. 7,774,155 to Sato et al. entitled: "Accelerometer-Based Controller", which is incorporated in its entirety for all purposes as if fully set forth herein.

The Global Positioning System (GPS) is a space-based radio navigation system owned by the United States government and operated by the United States Air Force. It is a global navigation satellite system that provides geolocation and time information to a GPS receiver anywhere on or near the Earth where there is an unobstructed line of sight to four or more GPS satellites. The GPS system does not require the user to transmit any data, and it operates independently of any telephonic or internet reception, though these technologies can enhance the usefulness of the GPS positioning information. The GPS system provides critical positioning capabilities to military, civil, and commercial users around the world. The United States government created the system, maintains it, and makes it freely accessible to anyone with a GPS receiver. In addition to GPS, other systems are in use or under development, mainly because of a potential denial of access by the US government. The Russian Global Navigation Satellite System (GLONASS) was developed contemporaneously with GPS, but suffered from incomplete coverage of the globe until the mid-2000s. GLONASS can be added to the GPS devices, making more satellites available and enabling positions to be fixed more quickly and accurately, to within two meters. There are also the European Union Galileo positioning system, China's BeiDou Navigation Satellite System and India's NAVIC.

The GPS concept is based on time and the known position of specialized satellites, which carry very stable atomic clocks that are synchronized with one another and to ground clocks, and any drift from true time maintained on the ground is corrected daily. The satellite locations are known with great precision. The GPS receivers have clocks as well; however, they are usually not synchronized with true time, and are less stable. The GPS satellites continuously transmit their current time and position, and a GPS receiver monitors multiple satellites and solves equations to determine the precise position of the receiver and its deviation from true time. At a minimum, four satellites must be in view of the receiver for it to compute four unknown quantities (three position coordinates and clock deviation from satellite time).

Each GPS satellite continually broadcasts a signal (carrier wave with modulation) that includes: (a) A pseudorandom code (sequence of ones and zeros) that is known to the receiver. By time-aligning a receiver-generated version and the receiver-measured version of the code, the Time-of-Arrival (TOA) of a defined point in the code sequence, called an epoch, can be found in the receiver clock time scale. (b) A message that includes the Time-of-Transmission (TOT) of the code epoch (in GPS system time scale) and the satellite position at that time. Conceptually, the receiver measures the TOAs (according to its own clock) of four satellite signals. From the TOAs and the TOTs, the receiver forms four Time-Of-Flight (TOF) values, which are (given the speed of light) approximately equivalent to receiver-satellite range differences. The receiver then computes its three-dimensional position and clock deviation from the four TOFs. In practice, the receiver position (in three dimensional Cartesian coordinates with origin at the Earth's center) and the offset of the receiver clock relative to the GPS time are computed simultaneously, using the navigation equations to process the TOFs. The receiver's Earth-centered solution location is usually converted to latitude, longitude and height relative to an ellipsoidal Earth model. The height may then be further converted to a height relative to the geoid (e.g., EGM96) (essentially, mean sea level). These coordinates may be displayed, e.g., on a moving map display, and/or recorded and/or used by some other system (e.g., a vehicle guidance system).

In one example, the idle condition may be considered to be met when the communication traffic through a network interface, such as over a PAN, LAN, WLAN, WAN, or WWAN, is below a threshold.

Portable or handheld devices, such as tablets, laptops, and smartphones, typically use a rechargeable smart battery. A smart battery or a smart battery pack is a rechargeable battery pack with a built-in Battery Management System (BMS), usually designed for use in a portable computer such as a laptop. Besides the usual plus and minus terminals, it also has two or more terminals to connect to the BMS; typically minus is also used as BMS "ground". BMS interface examples are SMBus, PMBus, EIA-232, EIA-485, MIPI BIF and Local Interconnect Network. The smarter battery can internally measure voltage and current, and deduce charge level and SoH (State of Health) parameters, indicating the state of the cells. Externally the smart battery can communicate with a smart battery charger and a "smart energy user" via the bus interface. The smart battery can demand that the charging stops, ask for charging, or demand that the smart energy user stop using power from this battery. There are standard specifications for smart batteries: Smart Battery System and many ad-hoc specifications.

A Battery Management System (BMS) is any electronic system that manages a rechargeable battery (cell or battery pack), such as by protecting the battery from operating outside its Safe Operating Area, monitoring its state, calculating secondary data, reporting that data, controlling its environment, authenticating it and/or balancing it. The battery pack built together with the battery management system with an external communication data bus is a smart battery pack. The smart battery pack must be charged by a smart battery charger. The BMS may monitor the state of the battery as represented by various items, such as: Voltage: total voltage, voltages of individual cells, minimum and maximum cell voltage or voltage of periodic taps; Temperature: average temperature, coolant intake temperature, coolant output temperature, or temperatures of individual cells; State of Charge (SOC) or Depth of Discharge (DOD), to indicate the charge level of the battery; State of Health (SOH), a variously-defined measurement of the overall condition of the battery; Coolant flow: for air or fluid cooled batteries; and Current: current in or out of the battery.

In one example, the idle condition may be considered to be met when, based on the BMS output, the battery capacity is above a minimum threshold. For example, the idle condition may be considered to be met when the current capacity of the battery is above 40%, 50%, 60%, 70%, 80%, or 90%. In the case where the capacity is estimated or measured to be below the set threshold, the idle condition may be considered not to be met. Such a threshold provides for not draining the battery by using the tunnel functionalities, rendering the device useless or powerless when the human user may want to use it after being used for tunneling.

Any of the methods described herein may provide fast, powerful, and high-speed anonymity, in particular IP anonymization when fetching resources (such as web pages) from a web server. Such anonymization may be used for anonymous tracking of an activity of competitors for obtaining competitive intelligence, for obtaining pricing intelligence by tracking competitor prices, for collecting data needed to make calculated investment decisions, for identifying key changes in businesses and markets for risk management, for preventing fraud by analyzing suspicious activities, or for web-site scrapping.

As described herein, a web browser executed in a client device, such as in the client device #1 31*a*, may initiate a request for a content (such as a web page identified by a URL) that is stored in a web server, such as the data server #1 22*a*. The request may be received, intercepted, or identified, and direct or non-direct fetching schemes may be used. As used herein, the term 'direct fetching' refers to any fetching of the requested content, where the web server is aware of the identity (such as the IP address), of the requesting client device. Typically, in such an arrangement, such as exampled in the arrangement 50*a* shown in FIG. 5*a*, the request message sent by the client device (such as HTTP request) reaches the web server unchanged, so that the web server can identify the IP address of the client device in the 'Source IP Address' field 16*d* of the packets that form the request message. Typically, other than the routers and gateways that form the Internet 113, no intermediate devices, such as another server or another client device, are used for, or are aware of, the content fetching process.

As used herein, the term 'non-direct fetching' refers to any fetching of the requested content, where the web server is not aware of the identity (such as the IP address), of the requesting client device. Typically, in such an arrangement, the request message sent by the client device (such as HTTP request) reaches one or more intermediate devices, that sends the request to the web server using IP address other than those of the requesting client device, so that the web server cannot identify the IP address of the client device. The intermediate device may be a server, such as the proxy server 53 shown as part of the arrangement 50*b* shown in FIG. 5*b*, the DC proxy server 56 shown as part of the arrangement 50*c* shown in FIG. 5*c*, or the tunnel #4 33*d* shown as part of the arrangement 130 shown in FIG. 13. Alternatively or in addition, the intermediate device may be another client device, such as the tunnel #1 33*a* shown a part of the arrangement 60 in FIG. 6, or the tunnel #2 33*b* shown a part of the arrangement 60*a* in FIG. 6*a*.

Any non-direct fetching scheme herein may comprise, may be based on, or may be according to, the example of using a proxy server as shown in the arrangement 50*b* shown in FIG. 5*b*, the example of using a DC proxy server as shown in the arrangement 50*c* shown in FIG. 5*c*, the example of using a tunnel as shown in the arrangement 60 shown in FIG. 6, the examples shown in the '604 patent', the examples shown in Patent Cooperation Treaty (PCT) Publication WO 2019/043687, the examples shown in U.S. Pat. No. 9,241,044, or any combination thereof. Any proxy server herein, such as the proxy server 53 or the proxy server 56, may consist of, may include, may be part of, or may be integrated with, any other server described herein.

In one example, multiple proxy servers, such as the proxy server 53 shown in FIG. 5*b*, may be available for a specific non-direct fetching scheme. Similarly, multiple DC proxy servers, such as the DC proxy server 56 shown in FIG. 5*c*, may be available for a specific non-direct fetching scheme. In such a case, the non-direct fetching scheme is preceded by the selecting a single server that is used for the fetching. Such server selection may be based on, or may use, random, quazi-random, or deterministic selection. Using random selection allows for load balancing, preferably by equally distributing the workload across the elements, which may optimize resource use, maximize throughput, minimize response time, and avoid overload of any single resource. The randomness may be based on using a random signal generator. The random signal generator may be based on a digital random signal generator having a digital output. Alternatively, the random signal generator may be based on an analog random signal generator having an analog output. The analog random signal generator may use a digital random signal generator whose output is converted to analog using an analog-to-digital converter, or can use a repetitive analog signal generator (substantially not synchronized to any other timing in the system) whose output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers that approximate the properties of random numbers.

Alternatively or in addition, the selection of a server may be deterministic based. In one example, the elements to select from are listed in an orderly fashion, such as according to a feature, attribute, or a characteristic, using their associated numerical value (e.g., IP address value), according to their alphanumeric identifier (e.g., host name or location name in ASCII value), according to the order that joined the collection or group, or according to the order they were formerly selected from the group or collection. In such a case, the servers are sequentially selected according to the list order. In one example, a LIFO (last in first out) like scheme may be used, where the lastly selected server is re-selected, and upon its unavailability, the one server that was selected before the last is selected. Alternatively or in addition, a FIFO (first in first out) like scheme is used, where the oldest formerly selected server selected.

In one example, the selection of an IP address from the list 59 to be used by the DC Proxy Server 56 as shown in FIG. 5*c*, for use in a specific non-direct fetching scheme may be based on, or may use, random, quazi-random, or deterministic selection. Alternatively or in addition to using randomness, the selection of a server, such as the selection of the proxy server 53 shown in FIG. 5*b*, or the DC proxy server 56 shown in FIG. 5*c*, may be based on geographical location. Such geographical location may be determined by using geolocation. For example, an element, such as a proxy server or a DC proxy server, or an IP address from any IP addresses list, may be selected based on the location of the requesting client, such as the client device #1 31*a*, the web server, such as the data server #1 22*a*, or any other device. For example, an element may be selected as being in the area as the requesting client device, or as the web server, such as being in the same continent, country, state, region, city, postal/zip code, latitude, longitude, or Timezone. Similarly, an element may be selected as estimated to being the geographically closest to the requesting client device or to the web server.

Alternatively or in addition, an element may be manually selected by a user. For example, a list of the available alternatives may be displayed to the user, such as the user of the client device #1 31*a*, and the user selects the elements from the list of the available alternatives. Further, an element may be selected based on former performance relating to former non-direct fetching actions.

General fetching of content over the Internet typically involves sending a content request (such as URL) by a requesting device to a content storing device (or to a device that in turn fetch the content), and in response receiving the requested content (such as web-page or web-site content) over the Internet from the content storing device to the requesting device. In the example of direct fetching shown as the arrangement 50*a* shown in FIG. 5*a*, the content request is sent from the client device #1 31*a* over the Internet, shown as the path 55*a*, to the web server 22*a*, which in return response by sending the requested content to the requesting client device #1 31*a* over the Internet, shown as the path 55*b*.

In an example of a non-direct fetching scheme, such as by using the proxy server 53 as shown as the arrangement 50*b* shown in FIG. 5*b*, there are two fetching actions involved. First, the content request is sent from the client device #1 31*a* over the Internet, shown as the path 54*a*, to the proxy server 53, which in turn fetches the content, and responds by sending the fetched requested content to the requesting client device #1 31*a* over the Internet, shown as the path 54*d*. The proxy server 53 fetches the content requested by the client device 31*a* by sending the received content request over the Internet, shown as the path 54*b*, to the data server #1 22*a* (typically a web server), which responds by sending the requested content to the proxy server 53 over the Internet, shown as the path 54*c*. Similarly, the DC Proxy server 56 serves as an intermediate device for fetching content from the data server #1 22*a* to the requesting client device #1 31*a* in the example of a non-direct fetching scheme using the DC proxy server, as shown as the arrangement 50*c* shown in FIG. 5*c*. Similarly, a client device may serve as an intermediate device for fetching content from the data server #2 22*b* to the requesting client device #1 31*a* in the example of a non-direct fetching scheme using an SP server 72 or a TB server 71, as shown as the arrangement 130 shown in FIG. 13. Similarly, non-direct fetching may be based on the '604 patent that uses an acceleration server 32 for managing the traffic in the network, may be based on the examples shown in Patent Cooperation Treaty (PCT) Publication WO 2019/043687, or the examples shown in U.S. Pat. No. 9,241,044, or any combination thereof.

The IPV6 global Internet as of today uses a lot of tunnels over the existing IPv4 infrastructure. Those tunnels are difficult to configure and maintain in a large-scale environment. The 6bone has proven that large sites and Internet Service Providers (ISPs) can do it, but this 5hprocess is too complex for the isolated end user who already has an IPV4 connection and would like to enter the IPV6 world. A tunnel broker model is described in IETF Network Working Group Request for Comments (RFC) 3053 by A. Durand et al. dated January 2001 entitled: "*IPv6 Tunnel Broker*", which is incorporated in its entirety for all purposes as if fully set forth herein. The motivation for the development of the tunnel broker model is to help early IPv6 adopters to hook up to an existing IPv6 network (e.g., the 6bone) and to get stable, permanent IPv6 addresses and DNS names.

A method of establishing a connection in a peer-to-peer network is described in U.S. Patent Application Publication No. 2009/0216887 to Hertle et al. entitled: "Method of establishing a connection", which is incorporated in its entirety for all purposes as if fully set forth herein. The method involves establishing a connection in a peer-to-peer network (160), and a peer, a telecommunication infrastructure comprising the peer-to-peer network (160), and a computer program product to execute said method. The connection is established between a first peer (61) in a first address realm of the peer-to-peer network (160) and a second peer (62) in a second address realm of the peer-to-peer network (160). In the peer-to-peer network (160), a network address translation is discovered which prevents a direct connection between the first peer (61) and the second peer (62). A third peer of the peer-to-peer network (160) is determined as a relay peer (R). The relay peer (R) relays the connection between the first peer (61) and the second peer (62).

The tunneling functionality may be used to overcome blocking or banning, by an ISP or a web server, of a requesting device, for example for the purposes of automatic collection of a statistical data or automatic configuration of thresholds, without any need for human intervention or supervision. Further, in addition to performing proxy function of transparently forwarding requests from a client device to a web server, such as for providing a high level of privacy, a tunneling functionality may provide additional functions to increase data security and network performance. Further, the tunneling functionality may act as a firewall and/or as a web filter, may provide shared network connections, or may cache data to speed up common or forecasted requests. For example, a tunneling functionality may change the IP address and other identifying information the web request contains (e.g., so that the destination web server is not capable of identifying which client device made the original content request), and may further be used to control Internet usage of employees and children, as well as improving browsing speeds and save bandwidth by caching that involves saving a copy of the appropriate website data locally, and when a request is made, to send the saved copy to the requesting client.

In consideration of the foregoing, it would be an advancement in the art to provide improved tunneling functionality method, device, and system, that improve privacy, anonymity, and untraceability, in particular when fetching content by a client device from a web server over the Internet, and may further provide simple, secure, cost-effective, load balanced, redundant, optimized, reliable, provide lower CPU and/or memory usage, enable pipelining of requests and responses, reduce network congestion, easy to use, reduce latency, faster, has a minimum part count, minimum hardware, and/or uses existing and available components, protocols, programs and applications, for providing a better quality of service, improved scalability, improved browsing speed, saving bandwidth, overload avoidance, better or optimal resources allocation and using, better communication and additional functionalities, provides a better user experience, or any combination thereof. Using an intermediate device that serves as a proxy may further be used for web scraping, data mining, and other similar tasks, and may be used to bypass certain Internet restrictions, such as firewalls, geo-IP based content restrictions, or blocking based on identifying the requesting device.

SUMMARY

A device may be used for serving as an intermediate device between a first server and web servers for fetching multiple pieces of content, such as web-pages or parts thereof, that may be identified by respective multiple Uniform Resource Locators (URLs) and may be stored in respective multiple web servers. The device may further be used with an Internet-connected managing server that may be connected to, or may comprises, a database. Any device herein may be configured to be in distinct activation, operation, and non-operation states, and may comprise, or be encased in, a single enclosure, and in the single enclosure may comprise no more than one communication port for connecting to a communication medium; no more than one transceiver or modem coupled to the communication port for transmitting to, and receiving from, the communication medium, for communication over the Internet via the communication medium; a processor; and a non-transitory computer readable medium having computer executable instructions stored thereon.

When the instructions are executed by the processor, the device in the operation state may be configured to execute steps of receiving, over the Internet by the communication port from the first server, the multiple URLs; for each of the multiple URLs, sending, over the Internet by the communication port to the respective web server that stores the respective web-page identified by the URL, the received URL; for each of the URLs, receiving, over the Internet by the communication port from the respective web server, the respective web-page; and for each of the URLs, sending, over the Internet by the communication port to the first server, the received respective web-page. The primary or exclusive function of any device herein may be to execute the steps, or the exclusive function of the device may be to execute the steps.

Any server herein, such as the first server or the managing server, may be a cloud-based server that may be implemented as an Infrastructure as a Service (IaaS) or as a Software as a Service (SaaS) by a public cloud-based service, that may be provided, for example, by Amazon Web Services® (AWS®), Microsoft® Azure™, or Google® Compute Engine™ (GCP).

Any device herein may be further configured for Operations, Administration, registration, or Management (OA&M) functions that may be exclusively or primarily associated with executing the steps, and wherein the OA&M functions may comprise registration, operation, monitoring, maintenance, support, collecting performance data, collecting accounting data, or any combination thereof. All of the hardware elements in the single enclosure may be primary or exclusively for executing the steps, and all the instructions or steps stored in the non-transitory computer readable medium may be primary or exclusively for executing the steps. At least part of any computer instructions herein may be integrated or included in a Software Development Kit (SDK). The first server and the managing server may be distinct servers, or may be the same server. Any device herein may further comprise a visual indicator that may be coupled to the processor for indicating in response to the device status, and any visual indicator herein may comprise a Light Emitting Diode (LED).

Any communication medium herein may be or comprise a Local Area Network (LAN) cable, any communication port herein may be or comprise a LAN connector, and any transceiver herein may be a LAN transceiver. For example, the communication medium may be a LAN cable and the communication port may be a LAN connector. Any LAN herein may be a wired LAN that may be according to, may be compatible with, or may be based on, IEEE 802.3-2008 standard, and may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T. Any LAN connector herein may comprise a RJ-45 type connector. Alternatively or in addition, any LAN herein may be a fiber-optics medium LAN that may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and any LAN connector herein may comprise a fiber-optic connector. Alternatively or in addition, any LAN cable herein may comprises a single wire-pair, a two wire-pairs, or four wire-pairs, and may comprises at least one Shielded Twisted Pair (STP) or an Unshielded Twisted Pair (UTP) that is based on, or substantially according to, EIT/TIA-568 or EIA/TIA-570 standards.

Any device herein may further comprise a non-volatile memory that may store an identifier for uniquely identifying the device over the communication medium, in a LAN, in a WLAN, or over the Internet, and any identifier herein may comprise a Media Access Control (MAC) address that may be MAC-48, Extended Unique Identifier (EUI) EUI-48, or EUI-64 address type, an Internet Protocol (IP) address that may be IPv4 or IPv6 type address, or a hostname.

Alternatively or in addition, any communication medium herein may comprise or be over-the-air wireless network, any communication port herein may comprise or be one or more antennas for transmitting and receiving Radio-Frequency (RF) signals over the air, and any transceiver herein may comprise or be a wireless transceiver. For example, the communication medium may be an over-the-air wireless network, the communication port may be one or more RF antennas, and the transceiver may be a wireless transceiver. Any wireless network herein may be a Wireless Wide Area Network (WWAN), such as a wireless broadband network, any wireless transceiver herein may be a WWAN transceiver, and any antenna herein may be a WWAN antenna. Any wireless network herein may be a WiMAX network, any antenna herein may be a WiMAX antenna, any wireless transceiver herein may be a WiMAX modem, and any WiMAX network herein may be according to, may be compatible with, or may be based on, IEEE 802.16-2009.

Any wireless network herein may be a cellular telephone network, that may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution, or any cellular telephone network herein may use a protocol selected from the group consisting of a Fifth Generation (5G) or a Fourth Generation (4G) network that may use HSPA+, Mobile WiMAX, LTE, LTE-Advanced, MBWA, or may be based on IEEE 802.20-2008, any antenna herein may be a cellular antenna, and any wireless transceiver herein may be a cellular modem.

Any wireless network herein may be a Wireless Personal Area Network (WPAN), that may be according to, may be compatible with, or may be based on, Bluetooth™, Bluetooth Low Energy (BLE), or IEEE 802.15.1-2005 standards, or any WPAN herein may be a wireless control network that may be according to, or may be based on, Zigbee™, IEEE 802.15.4-2003, or Z-Wave™ standards, any wireless transceiver herein may be a WPAN transceiver, and any antenna herein may be a WPAN antenna.

Any wireless network herein may be a Wireless Local Area Network (WLAN), that may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac, any wireless transceiver herein may be a WLAN transceiver, and any antenna herein may be a WLAN antenna. Alternatively or in addition, any wireless network herein may be over a licensed or unlicensed radio frequency band, and any wireless network herein may be over the unlicensed radio frequency band that may be an Industrial, Scientific and Medical (ISM) radio band.

The device herein may further comprise in the single enclosure a primary or rechargeable battery for powering the device, or alternatively or in addition may comprise in the single enclosure a single power connector for connecting to an Alternating Current (AC) power source or to a Direct Current (DC) power source for powering the device. Any AC power source herein may comprise mains AC power, and the single power connector may comprise an AC power connector for connecting to an AC mains power outlet.

Any device herein may be used with an industry standard bus that may define a point-to-point serial communication over a cable between any host computer herein and any peripheral herein, that may be according to, or may be based on, a Universal Standard Bus (USB), that may be according to, or may be based on, USB 2.0 or USB 3.0, the power connector comprises a USB connector, the cable may carry DC power, and the power connector may comprise a bus connector for connecting to the bus cable to be powered from the power.

Any communication medium herein may be connectable to simultaneously carry a DC or AC power signal and a communication signal, and any device herein may be configured to be powered by the respective DC or AC power signal via the communication port. Alternatively or in addition, any communication port herein may comprise or be a LAN connector, any communication medium herein may comprise or be a LAN cable that may be connectable to simultaneously carry a DC or AC power signal and a communication signal, and any device herein may be configured to be powered by the respective DC or AC power signal via the LAN connector.

Any device herein may further comprise a non-volatile memory that may store an identifier for uniquely identifying the device over the communication medium, in a LAN, in a WLAN, or over the Internet, and any identifier herein may comprise a Media Access Control (MAC) address that may be MAC-48, Extended Unique Identifier (EUI) EUI-48, or EUI-64 address type, an Internet Protocol (IP) address that may be IPv4 or IPv6 type address, or a hostname. Any device herein may further store an identifier for uniquely identifying the device over the communication medium, in a LAN, in a WLAN, or over the Internet. Any identifier herein may be stored in the non-transitory computer readable storage medium, or in an additional non-volatile memory, and may comprise a Media Access Control (MAC) address that may be MAC-48, Extended Unique Identifier (EUI) EUI-48, or EUI-64 address type, an Internet Protocol (IP) address that may be IPv4 or IPv6 type address, or a hostname.

Any power signal herein may be carried over dedicated power wires in the LAN cable, and the power wires may be distinct from the wires in the cable carrying the LAN communication signal. Alternatively or in addition, any power signal herein and any LAN communication signal herein may be concurrently carried over same wires in the cable, and any device herein may further comprise in the single enclosure a power/data splitter arrangement connected between the LAN transceiver or modem and the LAN connector for separating the signals.

Any power and LAN communication signals herein may be carried using Frequency Division Multiplexing (FDM), the power signal may be carried over a power signal frequency or a power frequency band, and the communication signal may be carried over a frequency band above and distinct from the power signal frequency or the power frequency band. Any power/data splitter herein may comprise an HPF between the first and second ports and a LPF between the first and third ports, or any power/data splitter herein may comprise a transformer and a capacitor connected to the transformer windings. Any power and digital data signals herein may be carried using a phantom scheme, and any power/data splitter herein may comprise at least two transformers having a center-tap connection. Alternatively or in addition, any power and LAN communication signals herein may be carried based on, or may be according to, Power-over-Ethernet (POE) standard where the device serves as a powered device (PD) and the router serves as a Power Sourcing Equipment (PSE). Any Power-over-Ethernet (POE) standard herein may be based on, or may be according to, IEEE 802.3af-2003, IEEE 802.3at-2009, IEEE 802.3-2012, IEEE 802.3bu-2016, IEEE 802.3bt-2018 standard, Alternative A, Alternative B, 4PPOE, 100BASE-T1, 1000BASE-T1, or any combination thereof.

Any device herein may be used with a user that may operate a user computer, for receiving, by the user computer, OA&M data, or sending, by the user computer, OA&M data, and may be used with an industry standard bus that may define a point-to-point serial communication over a cable between any host computer and any peripheral. Any device herein may comprise in the single enclosure no more than one bus connector for connecting to the user computer over the bus. Any industry standard bus herein may be according to, or may be based on, a Universal Standard Bus (USB) that may be according to, or may be based on, USB 2.0 or USB 3.0, and any bus connector herein may comprise a USB connector.

Any device herein may be in combination with the managing server, may further comprise a memory that stores an IP address or hostname of the managing server, and may be configured to shifting to, or staying in, the activation state in response to being powered up. Any device herein may be configured for, when in the activation state: connecting, by the device to the Internet, via the communication port using the transceiver; sending, by the device to the managing server over the Internet, in response to connecting to the Internet, the identifier, using the stored IP address or hostname of the managing server; receiving, by the managing server from the device over the Internet, the sent identifier; adding, by the managing server to the database, the identifier of the device; adding, by the managing server to the database, the stored device identifier with the IP address of the device; sending, by the manager server to the device over the Internet, an activation message; receiving, by the device from the managing server over the Internet, the activation message; and shifting, by the device, to the operation state, in response to the receiving of the activation message. Any device or method herein may be configured for adding and associating, by the managing server in the database, in response to the receiving of the sent identifier, a time associated with the receiving by the managing server, of the sent identifier, and associating the time with the device identifier in the database.

A system may comprise any device herein, the managing server, and a user computer operated by a user, and the device may be further configured for notifying the user by sending a notification message to the user computer in response to the receiving of the sent identifier. Any notifying herein may comprise sending over the Internet by the transceiver via the communication port over the communication medium, or may comprise sending over the Internet via a wireless network to the user's computer using a peer-to-peer scheme. Any notifying herein may comprise sending over the Internet to an Instant Messaging (IM) server for being sent to the user's computer as part of an IM service. Any communication herein with the IM server may use, may be compatible with, or may be based on, a protocol selected from the group consisting of SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), and Hypertext Transfer Protocol (HTTP).

Any notification message herein may be a text-based message and the IM service may be a text messaging service. Alternatively or in addition, any notification message herein may be according to, or may be based on, a message selected from the group consisting of a Short Message Service (SMS) message and the IM service may be a SMS service, an electronic-mail (e-mail) message and the IM service may be an e-mail service, a WhatsApp message and the IM service may be a WhatsApp service, a Twitter message and the IM service may be a Twitter service, and a Viber message and the IM service may be a Viber service. Alternatively or in addition, any notification message herein may be according to, or may be based on, a Multimedia Messaging Service (MMS) or an Enhanced Messaging Service (EMS) message that may include audio or video, and the IM service may be an NMS or EMS service.

Any device herein may further comprise a first list of servers that may include the managing server, stored in the computer readable medium, and any device herein may be configured for communicating, when in the activation state, only with a server in the first list. Any device herein may be configured for selecting the managing server from the first list, that may comprise IP addresses of the servers, when in the activation state. The first list may comprise domain names of the servers, and any device herein may further be configured for accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers.

Any device herein may comprise a first list of servers that may include the first server stored in the computer readable medium, the list may comprise IP addresses of the servers or domain names of the servers, and any device herein may further be configured for receiving, when in operation state, the URLs only from the first server. Any device herein may further be configured for accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers. Any device herein may be configured for receiving from the managing server when in the activation state the first list to be stored therein.

A system may comprise multiple devices, each according to any of the devices herein, and multiple routers, and the number of devices may be at least 1, 2, 5, 10, 12, 15, 20, 25, 30, 50, 80, 100, 120, 150, 200, 500, 1,000, 2,000, 5,000, 10,000, 20,000, 50,000, 100,000, 200,000, 500,000 or 1,000, 000, or wherein the number of devices may be at most 2, 5, 10, 12, 15, 20, 25, 30, 50, 80, 100, 120, 150, 200, 500, 1,000, 2,000, 5,000, 10,000, 20,000, 50,000, 100,000, 200,000, 500,000 1,000,000, or 2,000,000. Two or more devices may be connected to the same router.

Any device herein may be mountable in a vehicle or may be configured to be used in a vehicle, and any vehicle, such as a ground vehicle adapted to travel on land, a buoyant or submerged watercraft adapted to travel on or in water, an aircraft adapted to fly in air, or any combination thereof, may comprise any device herein. Any device herein may be used with a vehicle bus, any communication port herein may comprise a vehicle bus connector, any transceiver herein may comprise a vehicle bus transceiver, and any communication medium herein may comprise a vehicle bus medium. Any vehicle bus herein may use, or may be compatible with, a multi-master, serial protocol using acknowledgement, arbitration, and error-detection schemes, and may further employ, use, may be based on, or may be compatible with, a synchronous and frame-based protocol. Alternatively or in addition, any vehicle bus herein may consist of, may employ, may use, may be based on, or may be compatible with, a Controller Area Network (CAN), a Flexible Data-Rate (CAN FD) protocol, a Local Interconnect Network (LIN), a FlexRay protocol, or a Media Oriented Systems Transport (MOST) protocol.

Any CAN herein may be according to, may be based on, may use, or may be compatible with, a standard selected from the group consisting of ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), and SAE J2411_200002. Any LIN herein may be according to, may be based on, may use, or may be compatible with, a standard selected from a group consisting of ISO 9141-2:1994, ISO 9141: 1989, ISO 17987-1, ISO 17987-2, ISO 17987-3, ISO 17987-4, ISO 17987-5, ISO 17987-6, and ISO 17987-7. Any FlexRay protocol herein may be according to, may be based on, may use, or may be compatible with, a standard selected from a group consisting of ISO 17458-1:2013, ISO 17458-2:2013, ISO 17458-3:2013, ISO 17458-4:2013, or ISO 17458-5:2013. Any MOST protocol herein may be according to, may be based on, may use, or may be compatible with, a standard selected from a group consisting of MOST25, MOST50, and MOST150. Any device herein may comprise, may be part of, or may be integrated with, an Electronic Control Unit (ECU), that may be selected from the group consisting of Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, and a control module.

Any device herein may further be used with an Internet-connected service server, and may further comprise in the single enclosure a sensor that may output sensor data that is in response to a physical phenomenon. Any device herein may be further configured to send, to the service server over the Internet via the communication port using the transceiver or modem, a massage, that may comprise the sensor data or a function thereof, in response to any sensor reading or to any read sensor data may be the same server or may be integrated into a single server. Any reading herein of any sensor data may be periodically or continuously, and any time period of the periodic readings is at least 1, 2, 5, 8, 10, 12, 15, 20, 25, 30, 50, 80, 100, 120, 150, 200, 500, 1,000, 2,000, 5,000, or 10,000 milliseconds, seconds, minutes, or hours, or wherein the time period is less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, or hours. Any device herein, or any server herein, such as the service server, may be further configured to store at least part of sensor data readings.

Any device or server herein may be configured to compare the sensor data to a threshold, and any comparing herein may be by the device or by the service server. Any device or server herein may be configured to perform an action in response to the sensor data being above the threshold or being below the threshold. Any action herein may comprise notifying the user by sending a notification message to the user computer, any action herein may comprise notifying an entity other than the user by sending a notification message to a computer, any action herein may comprise activating an actuator, such as to affect or change the physical phenomenon, or any combination thereof.

Any sensor herein may comprise, may be part of, or may be based on, a piezoelectric sensor that may include single crystal material or a piezoelectric-ceramics and may use a transverse, longitudinal, or shear effect mode of the piezoelectric effect. Alternatively or in addition, any sensor herein may comprise, may be part of, or may be based on, a nano-sensor, a crystal, a semiconductor, or any combination thereof. Any device herein may comprise multiple sensors, that may include the sensor, arranged as a directional sensor array operative to estimate the number, magnitude, frequency, Direction-Of-Arrival (DOA), distance, or speed of the phenomenon impinging the sensor array. Alternatively or in addition, any sensor herein may comprise, may be part of, or may be based on, a thermoelectric sensor that may respond to a temperature or to a temperature gradient of an object using conduction, convection, or radiation, and any thermoelectric sensor herein may consist of, may be based on, or may comprise, a Positive Temperature Coefficient (PTC) thermistor, a Negative Temperature Coefficient (NTC) thermistor, a thermocouple, a quartz crystal, a Resistance Temperature Detector (RTD), or a combination thereof. Alternatively or in addition, any sensor herein may comprise, may be part of, or may be based on, an ultrasonic-based sensor, an eddy-current sensor, a proximity sensor, a bulk acoustic sensor, a surface acoustic sensor, an atmospheric sensor, an environmental sensor, or any combination thereof. Alternatively or in addition, any sensor herein may comprise, may be part of, or may be based on, a radiation sensor that may respond to radioactivity, nuclear radiation, alpha particles, beta particles, gamma rays, gas ionization, or any combination thereof.

Alternatively or in addition, any sensor herein may comprise, may be part of, or may be based on, a photoelectric sensor that may respond to a visible or an invisible light, and any invisible light herein may comprise, or may consists of, infrared, ultraviolet, X-rays, or gamma rays. Alternatively or in addition, any sensor herein may comprise, or may be based on, a semiconductor component, that may comprise, or may be based on, a photodiode, a phototransistor, or a solar cell. Any photoelectric sensor herein may comprise, may be part of or may be based on, Charge-Coupled Device (CCD) or Complementary Metal-Oxide Semiconductor (CMOS) element. Alternatively or in addition, any sensor herein may comprise, may be part of or may be based on, a still or video camera. Alternatively or in addition, any sensor herein may comprise, may be part of, or may be based on, a photosensitive image sensor array that may comprise multiple photoelectric sensors and may be used for capturing an image and producing electronic image information representing the image. Any camera herein may comprise, or may be based on, one or more optical lens for focusing the received light and to guide the image, and any image sensor herein may be disposed approximately at an image focal point plane of the one or more optical lens for properly capturing the image.

Alternatively or in addition, any device herein may further comprise, or may be based on, an image processor that may be coupled to the image sensor and may be used for providing a digital data video according to a digital video format. Any digital video format herein may be compatible with, or may be based on, a format or standard that may be Tagged Image File Format (TIFF), RAW, Audio Video Interleave (AVI), Digital Video (DV), MOV, Windows Media Video (WMV), MPEG-4 Part 14 (MP4), Design Rule for Camera Format (DCF), ITU-T H.261, ITU-T H.263, ITU-T H.264, ITU-T CCIR 601, Advanced Systems Format (ASF), Exchangeable Image File Format (Exif), Digital Print Order Format (DPOF), or any combination thereof. Any device herein may further comprise, or may be based on, an intraframe or interframe compression by a video compressor, and may be coupled to the image sensor for lossy or non-lossy compressing of any digital data video. Any compression herein may use, may be compatible with, or may be based on, a standard compression algorithm that may comprise, or may be compatible with, Joint Photographic Experts Group (JPEG), Moving Picture Experts Group (MPEG), ITU-T H.261, ITU-T H.263, ITU-T H.264, ITU-T CCIR 601, or any combination thereof.

Alternatively or in addition, any sensor herein may comprise, may be part of, or may be based on, an electrochemical sensor that may respond to an object chemical structure, properties, composition, or reactions. Any electrochemical sensor herein may comprise, or may be based on, a pH meter or a gas sensor that may respond to a presence of radon, hydrogen, oxygen, or Carbon-Monoxide (CO), or may use optical detection or on ionization for a detecting of smoke, a flame, or a fire detector, or may be responsive to combustible, flammable, or toxic gas.

Alternatively or in addition, any sensor herein may comprise, may be part of, or may be based on, a physiological sensor that may respond to parameters associated with a live body, and may be external to the sensed body, implanted inside the sensed body, attached to the sensed body, or wearable on the sensed body. Any physiological sensor herein may be configured to respond to body electrical signals and may be an EEG Electroencephalography (EEG) or an Electrocardiography (ECG) sensor. Alternatively or in addition, any physiological sensor herein may respond to oxygen saturation, gas saturation, or a blood pressure, in any body.

Alternatively or in addition, any sensor herein may comprise, may be part of, or may be based on, an electroacoustic sensor that responds to an audible or inaudible sound, that may be an omnidirectional, unidirectional, or bidirectional microphone, and may be based on the sensing the incident sound based on a motion of a diaphragm or a ribbon. Any microphone herein may consist of, may comprise, or may be based on, a condenser microphone, an electret microphone, a dynamic microphone, a ribbon microphone, a carbon microphone, a piezoelectric microphone, or any combination thereof.

Alternatively or in addition, any sensor herein may comprise, may be part of, or may be based on, a contact or non-contact, AC or DC, current or voltage sensor, that may comprise an ampermeter, a galvanometer, a hot-wire ampermeter, a current clamp, a current probe, a current transformer, or uses a 'Hall effect', or any combination thereof. Alternatively or in addition, any sensor herein may comprise, may be part of, or may be based on, a contact or non-contact, AC or DC, wattmeter, that may be connected for measuring the magnitude of the active AC power or the electrical energy consumed by any unit or any device herein. Any wattmeter herein may comprise, or may be based on, a single or multi-phase AC power or energy meter, a bolometer, and may accumulates or averages readings, or wherein the wattmeter or may use a multiplying of any measured voltage and any measured current. Alternatively or in addition, any sensor herein may comprise, may be part of, or may be based on, a contact or non-contact, AC or DC, voltmeter or voltage sensor that may be used for measuring a potential difference between two points, and may comprise, or may be based on, a measuring of current passing through a resistor using the Ohm's law, a potentiometer, a bridge circuit, or any combination thereof.

Alternatively or in addition, any sensor herein may comprise, may be part of, or may be based on, a relative displacement, or an incremental position sensor, that may be configured to respond to a linear or angular position or motion, of a sensed element. Any position sensor herein may comprise, or may be based on, an optical type or a magnetic type angular position sensor, that may be configured to respond to an angular position or the rotation of a shaft, an axle, or a disk. Alternatively or in addition, any position sensor herein may comprise, or may be based on, a linear position sensor that may be configured to respond to a linear displacement or position along a line. Alternatively or in addition, any sensor herein may comprise, may be part of, or may be based on, a motion detector that may be configured to respond to a motion of an element.

Alternatively or in addition, any sensor herein may comprise, may be part of, or may be based on, an occupancy sensor that may configured for detecting occupancy of a space by a human body, and may output data in response to detecting a presence of a human body by using electric effect, inductive coupling, capacitive coupling, triboelectric effect, piezoelectric effect, fiber optic transmission, radar intrusion sensing, or any combination thereof. Any occupancy sensor herein may consist of, may comprise, or may be based on, an acoustic sensor, opacity, geomagnetism, magnetic sensors, magnetometer, reflection of transmitted energy, infrared laser radar, microwave radar, electromagnetic induction, vibration, or any combination thereof. Alternatively or in addition, any occupancy sensor herein may consist of, may comprise, or may be based on, a motion sensor, that may comprise, or may based on, a mechanically actuated sensor, passive or active electronic sensor, ultrasonic sensor, microwave sensor, tomographic detector, passive infrared (PIR) sensor, laser optical detector, acoustical detector, or any combination thereof.

Any method, device, or system herein, such as any server (such as the service server) or any sensor, may be part of, or integrated with, a home or building automation service system, that may be configured to control indoor or outdoor lighting fixtures, fans, sprinklers, pool/spa heaters and pumps, electronic drapes, windoware units, fireplaces, garage doors openers, electronic door locks, hot water heaters, fire detection and monitoring equipment, electronic gates, digital security cameras, motion sensors, flood monitors, humidifiers, home theater units, phone PBX, voice mail, intercom, door phone, aquarium sensors and heaters, sidewalk and driveway heaters, sprinklers, dampers, doorbells, or any combination thereof.

A device may be used for Layer-3 (IP) networking between first and second networks and may be used for serving as an intermediate device between a first server and web servers for fetching multiple web-pages identified by respective multiple Uniform Resource Locators (URLs) and stored in respective multiple web servers. The device may further be used with an Internet-connected managing server that may be connected to, or may comprise, a database. Any device herein may be configured to be in distinct activation, operation, and non-operation states. Any device herein may comprise a single enclosure that may house: a first port for coupling to the first network; a first transceiver coupled to the first port for transmitting to, and receiving from, the Internet over the first network; a second port for coupling to the second network; a second transceiver coupled to the second port for transmitting to, and receiving from, the second network in a building; a processor; a non-transitory computer readable medium having computer executable instructions stored thereon, so that when the instructions are executed by the processor, the device in the operation state may be configured to execute steps of: forwarding data packets between the first and second ports based on respective network address information in each packet header and based on a routing table or a routing policy; receiving, over the Internet by the first port from the first server, the multiple URLs; for each of the multiple URLs, sending, over the Internet via the first port to the respective web server that stores the respective web-page identified by the URL, the received URL; and the multiple URLs may be sent by the first port without having been forwarded to the second network through the second port, for each of the URLs, receiving, over the Internet via the first port from the respective web server, the respective web-page; and for each of the URLs, sending, over the Internet via the first port to the first server, the received respective web-page, and the multiple web-pages may be sent by the first port without having been forwarded to the second network through the second port.

Any device herein may comprise, may be integrated with, or may be part of, a router, a gateway, a residential gateway, a firewall, or any combination thereof, and may be further configured for Operations, Administration, registration, or Management (OA&M) functions that may be exclusively or primarily associated with executing any steps herein, and any OA&M functions herein may comprise registration, operation, monitoring, maintenance, support, collecting performance data, collecting accounting data, or any combination thereof.

Any two servers herein, such as the first server and the managing server, may be distinct servers, may be integrated, or may be the same server. Any device herein may further comprise a visual indicator, such as a Light Emitting Diode (LED), that may be coupled to the processor for indicating in response to the device status. At least part of any computer instructions herein may be included in a Software Development Kit (SDK).

Any server herein, such as the first server or the managing server, may be a cloud-based server that may be implemented as an Infrastructure as a Service (IaaS) or as a Software as a Service (Saas) by a public cloud-based service, such as Amazon Web Services® (AWS®), Microsoft® Azure™, or Google® Compute Engine™ (GCP).

Any network or communication herein, such as the first network, may be a first wired network, any port herein, such as the first port, may comprise a first connector, any transceiver herein, such as the first transceiver, may comprise a first wired transceiver. Alternatively or in addition, any network or communication herein, such as the second network, may be a second wired network, the second port may comprise a second connector, and the second transceiver may comprise a second wired transceiver. Alternatively or in addition, the first network may be a first wired network, the first port may comprise a first connector, the first transceiver may comprise a first wired transceiver, the second network may be a wireless network, the second port may comprise an antenna, and the second transceiver may comprise a wireless transceiver, Alternatively or in addition, the first network may be a first wireless network, the first port may comprise a first antenna, the first transceiver may comprise a first wireless transceiver, the second network may be a wired network, the second port may comprise a connector, and the second transceiver may comprises a wired transceiver. Alternatively or in addition, the first network may be a first wireless network, the first port may comprise a first antenna, the first transceiver may comprise a first wireless transceiver, the second network may be a second wireless network, the second port may comprise a second connector, and the second transceiver may comprise a second wireless transceiver. Any network herein, such as the first network, may be a WAN or LAN network, and any network herein, such as the second network, may be a LAN or PAN network.

Any network herein may comprise a packet-based or a circuit-switched-based Wide Area Network (WAN), any port herein, such as the first port, may comprise a WAN port, and any transceiver or modem herein, such as the first transceiver, may comprise a WAN transceiver or a WAN modem. Any WAN herein may comprise a wired WAN that may use a wired WAN medium, any port herein may be a WAN port that comprises a WAN connector, any transceiver herein may comprise a WAN transceiver or a WAN modem, and any wired WAN medium herein may comprise a wiring primarily installed for carrying a service signal to the building.

Any wired WAN medium herein may comprise one or more telephone wire pairs primarily designed for carrying an analog telephone signal, any WAN connector herein may comprise a telephone connector, and any network herein, such as the first network, may use, or may be based on, Digital Subscriber Line/Loop (DSL). Any network herein, such as the first network, may use, or may be based on, Asymmetric Digital Subscriber Line (ADSL), ADSL2, or ADSL2+ that may be according to, or may be based on, ANSI T1.413, ITU-T Recommendation G.992.1, ITU-T Recommendation G.992.2, ITU-T Recommendation G.992.3, ITU-T Recommendation G.992.4, or ITU-T Recommendation G.992.5, or wherein the first network may use, or may be based on, Very-high-bit-rate Digital Subscriber Line (VDSL), that may be according to, or may be based on, ITU-T Recommendation G.993.1 or ITU-T Recommendation G.993.2.

Alternatively or in addition, any wired WAN medium herein may comprise AC power wires that may be primarily designed or installed for carrying an AC power signal to the building, any WAN connector herein may comprise an AC power plug, and any network herein, such as the first network may use, or may be based on, Broadband over Power Lines (BPL) according to, or based on, IEEE 1675-2008 or IEEE 1901-2010. Alternatively or in addition, any wired WAN medium herein may comprise a coaxial cable that may be primarily designed or installed for carrying a CATV to the building, any WAN connector herein may comprise a coaxial connector, and any network herein, such as the first network, may use, or may be based on, Data-Over-Cable Service Interface Specification (DOCSIS), according to, or based on, ITU-T Recommendation J.112, ITU-T Recommendation J.122, or ITU-T Recommendation J.222. Any wired WAN medium herein may comprise an optical fiber, any WAN connector herein may comprise a fiber-optic connector, and any WAN herein may use, or may be based on, Fiber-To-The-Home (FTTH), Fiber-To-The-Building (FTTB), Fiber-To-The-Premises (FTTP), Fiber-To-The-Curb (FTTC), or Fiber-To-The-Node (FTTN).

Any network herein, such as the first network, may comprise over-the-air wireless network, any port herein, such as the first port, may comprise an antenna for transmitting and receiving Radio-Frequency (RF) signals over the air, and any transceiver herein, such as the first transceiver, may comprise a wireless transceiver or modem. Any wireless network herein may comprise a Wireless Wide Area Network (WWAN) that may comprise, or may be based on, a wireless broadband network, any wireless transceiver herein may comprise a WWAN transceiver, and any antenna herein may comprise a WWAN antenna. Any WWAN herein may comprise, or may be based on, a WiMAX network, any antenna herein may comprise a WiMAX antenna, any wireless transceiver herein may comprise a WiMAX modem, and any WiMAX network herein may be according to, may be compatible with, or may be based on, Institute of Electrical and Electronics Engineers (IEEE) IEEE 802.16-2009.

Alternatively or in addition, any wireless network herein may comprise, or may be based on, a cellular telephone network, any antenna herein may comprise a cellular antenna, and any wireless transceiver herein may comprise a cellular modem. Any cellular telephone network herein may use, may comprise, or may be based on, a Third Generation (3G) network that may use, or may be based on, Universal Mobile Telecommunications System (UMTS), Wideband Code Division Multiple Access (W-CDMA) UMTS, High Speed Packet Access (HSPA), Time-Division Duplexing (TDD), CDMA2000 1×RTT, Evolution-Data Optimized (EV-DO), Global System for Mobile communications (GSM), Enhanced Data rates for GSM Evolution (EDGE) EDGE-Evolution, or any combination thereof. Alternatively or in addition, any cellular telephone network herein may use, may comprise, or may be based on, a Fifth Generation (5G) Fourth Generation (4G) network that may use, or may be based on, Evolved High Speed Packet Access (HSPA+), Mobile Worldwide Interoperability for Microwave Access (WiMAX), Long-Term Evolution (LTE), LTE-Advanced, Mobile Broadband Wireless Access (MBWA), IEEE 802.20-2008, or any combination thereof.

Alternatively or in addition, any wireless network herein may comprise, or may be based on, a Wireless Personal Area Network (WPAN), any wireless transceiver herein may comprise a WPAN transceiver, and any antenna herein may be a WPAN antenna. Any WPAN herein may be according to, may be compatible with, or may be based on, Bluetooth™, Bluetooth Low Energy (BLE), Institute of Electrical and Electronics Engineers (IEEE) IEEE 802.15.1-2005 standards, Zigbee™, IEEE 802.15.4-2003, Z-Wave™ standards, or any combination thereof. Alternatively or in addition, any wireless network herein may comprise, or may be based on, a Wireless Local Area Network (WLAN), any wireless transceiver herein may be a WLAN transceiver, and any antenna herein may be a WLAN antenna. Any WLAN herein may be according to, may be compatible with, or may be based on, Institute of Electrical and Electronics Engineers (IEEE) IEEE 802.11-2012, IEEE 802.11a, IEEE 802.11b, IEEE 802.11g, IEEE 802.11n, IEEE 802.11ac, or any combination thereof. Alternatively or in addition, any wireless network herein may use or be over a licensed or unlicensed radio frequency band, such as the unlicensed radio frequency band that may be an Industrial, Scientific and Medical (ISM) radio band.

Any device herein may further comprise a non-volatile memory that may store an identifier for uniquely identifying the device over any communication medium, in the first or second network, in a LAN, in a WLAN, or over the Internet, and any identifier herein may comprise a Media Access Control (MAC) address that may be MAC-48, Extended Unique Identifier (EUI) EUI-48, or EUI-64. Alternatively or in addition, any identifier herein may comprise an Internet Protocol (IP) address that may be IPv4 or IPv6 type address. Alternatively or in addition, any identifier herein may comprise a hostname.

Any network herein, such as the second network, may comprise a wired network that may use a wired medium, any port herein, such as the second port, may comprise a connector, and any transceiver herein, such as the second transceiver, may comprise a wired transceiver or modem. Any wired medium herein may comprise a wiring that may be primarily installed for carrying a service signal to the building. Any wired network herein may use, may comprise, or may be based on, a Personal Area Network (PAN), any connector herein may be a PAN connector, and any wired transceiver herein may be a PAN transceiver.

Alternatively or in addition, any wired medium herein may comprise a Local Area Network (LAN) cable, any connector herein may comprise a LAN connector, and any wired transceiver herein may comprise a LAN transceiver. Any LAN herein may be according to, may be compatible with, or may be based on, Ethernet or Institute of Electrical and Electronics Engineers (IEEE) IEEE 802.3-2008 standard. Any LAN herein may be a wired LAN that may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T, and Any LAN connector herein may comprise a RJ-45 type connector. Alternatively or in addition, any LAN herein may be a fiber-optics medium LAN that may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and any LAN connector herein may comprise a fiber-optic connector. Alternatively or in addition, any LAN cable herein may comprises a single wire-pair, a two wire-pairs, or four wire-pairs, and may comprises at least one Shielded Twisted Pair (STP) or an Unshielded Twisted Pair (UTP) that is based on, or substantially according to, EIT/TIA-568 or EIA/TIA-570 standards.

Alternatively or in addition, any wired network herein may comprise, or may be based on, a packet-based or a circuit-switched-based Home Network (HN) that may use, or may be based on, an in-wall wiring primarily installed for carrying a service signal and may be connected to by a wiring connector at a service outlet. Alternatively or in addition, any wiring herein may comprise a telephone wire pair, any service signal herein may comprise an analog telephone signal (POTS), any wiring connector herein may be a telephone connector, and any HN herein may be according to, or may be based on, HomePNA standard, ITU-T Recommendation G.9954, ITU-T Recommendation G.9960, ITU-T Recommendation G.9970, ITU-T Recommendation G.9961, or any combination thereof. Alternatively or in addition, any wiring herein may comprises coaxial cable, any service signal herein may comprise a Cable Television (CATV) signal, any wiring connector herein may comprise a coaxial connector, and any HN herein may be according to, or may be based on, HomePNA standard or Multimedia over Coax Alliance (MoCA) standard, that may be according to, or may be based on, ITU-T Recommendation G.9954, ITU-T Recommendation G.9960, ITU-T Recommendation G.9970, ITU-T Recommendation G.9961, or any combination thereof. Alternatively or in addition, any wiring herein may comprise an AC power wires, any service signal herein may comprise an AC power signal, any wiring connector herein may be an AC power connector, and any HN herein may be according to, or may be based on, HomePlug™ standard, HD-PLC standard, Universal Powerline Association (UPA) standard, Institute of Electrical and Electronics Engineers (IEEE) IEEE 1901-2010, ITU-T Recommendation G.9960, ITU-T Recommendation G.9961, ITU-T Recommendation G.9970, ITU-T Recommendation G.9972, or any combination thereof.

Any network herein, such as the second network, may comprise over-the-air wireless network, any port herein, such as the second port, may comprises an antenna for transmitting and receiving Radio-Frequency (RF) signals over the air, and any transceiver herein, such as the second transceiver, may comprise a wireless transceiver or modem. Alternatively or in addition, any wireless network herein may be a Wireless Personal Area Network (WPAN), any wireless transceiver herein may be a WPAN transceiver, and any antenna herein may be a WPAN antenna. Any WPAN herein may be according to, may be compatible with, or may be based on, Bluetooth™, Bluetooth Low Energy (BLE), or Institute of Electrical and Electronics Engineers (IEEE) IEEE 802.15.1-2005 standard, Zigbee™, IEEE 802.15.4-2003 standard, Z-Wave™ standard, or any combination thereof.

Alternatively or in addition, any wireless network herein may be a Wireless Local Area Network (WLAN), any wireless transceiver herein may be a WLAN transceiver, and any antenna herein may be a WLAN antenna. Any WLAN herein may be according to, may be compatible with, or may be based on, a standard selected from the group consisting of Institute of Electrical and Electronics Engineers (IEEE) IEEE 802.11-2012, IEEE 802.11a, IEEE 802.11b, IEEE 802.11g, IEEE 802.11n, and IEEE 802.11ac. Any wireless network herein may use or be over a licensed or unlicensed radio frequency band, and the unlicensed radio frequency band may be an Industrial, Scientific and Medical (ISM) radio band.

Any device herein may further comprise a non-volatile memory that may store an identifier for uniquely identifying the device over any communication medium, in the first or second network, in a LAN, in a WLAN, or over the Internet, and any identifier herein may comprise a Media Access Control (MAC) address that may be MAC-48, Extended Unique Identifier (EUI) EUI-48, or EUI-64. Alternatively or in addition, any identifier herein may comprise an Internet Protocol (IP) address that may be IPv4 or IPv6 type address.

Any device herein may further comprise in the single enclosure a primary or rechargeable battery for powering the device, or alternatively or in addition may comprise in the single enclosure a single power connector for connecting to an Alternating Current (AC) power source or to a Direct Current (DC) power source for powering the device. Any AC power source herein may comprise mains AC power, and the single power connector may comprise an AC power connector for connecting to an AC mains power outlet.

Any device herein may be used with an industry standard bus that may define a point-to-point serial communication over a cable between host computer and peripheral, that may be according to, or may be based on, a Universal Standard Bus (USB), that may be according to, or may be based on, USB 2.0 or USB 3.0, the power connector comprises a USB connector, the cable may carry DC power, and the power connector may comprise a bus connector for connecting to the bus cable to be powered from the power.

Any communication medium herein may be connectable to simultaneously carry a DC or AC power signal and a communication signal, and any device herein may be configured to be powered by the respective DC or AC power signal via the communication port. Alternatively or in addition, any communication port herein, such as the first or second port, may be or comprise a LAN connector, and any communication medium herein, such as a medium used by the first or second networks, may be or comprise a LAN cable that may be connectable to simultaneously carry a DC or AC power signal and a communication signal, and any device herein may be configured to be powered by the respective DC or AC power signal via the LAN connector.

Any power signal herein may be carried over dedicated power wires in the LAN cable, and the power wires may be distinct from the wires in the cable carrying the LAN communication signal. Alternatively or in addition, any power signal herein and any LAN communication signal herein may be concurrently carried over same wires in the cable, and any device herein may further comprise in the single enclosure a power/data splitter arrangement connected between any LAN transceiver or modem and any LAN connector for separating the signals.

Any power and LAN communication signals herein may be carried using Frequency Division Multiplexing (FDM), the power signal may be carried over a power signal frequency or a power frequency band, and the communication signal may be carried over a frequency band above and distinct from the power signal frequency or the power frequency band. Any power/data splitter herein may comprise an HPF between the first and second ports and a LPF between the first and third ports, or any power/data splitter herein may comprise a transformer and a capacitor connected to the transformer windings. Any power and digital data signals herein may be carried using a phantom scheme, and any power/data splitter herein may comprise at least two transformers having a center-tap connection. Alternatively or in addition, any power and LAN communication signals herein may be carried based on, or may be according to, Power-over-Ethernet (POE) standard where the device serves as a powered device (PD) and the router serves as a Power Sourcing Equipment (PSE). Any Power-over-Ethernet (POE) standard herein may be based on, or may be according to, IEEE 802.3af-2003, IEEE 802.3at-2009, IEEE 802.3-2012, IEEE 802.3bu-2016, IEEE 802.3bt-2018 standard, Alternative A, Alternative B, 4PPOE, 100BASE-T1, 1000BASE-T1, or any combination thereof.

Any device herein may be used with a user that may operate a user computer, for receiving, by the user computer, OA&M data, or sending, by the user computer, OA&M data, and may be used with an industry standard bus that may define a point-to-point serial communication over a cable between host computer and peripheral. Any device herein may comprise in the single enclosure no more than one bus connector for connecting to the user computer over the bus. Any industry standard bus herein may be according to, or may be based on, a Universal Standard Bus (USB) that may be according to, or may be based on, USB 2.0 or USB 3.0, and any bus connector herein may comprise a USB connector.

Any device herein may be in combination with the managing server, may further comprise a memory that stores an IP address or hostname of the managing server, and may be configured to shifting to, or staying in, the activation state in response to being powered. Any device herein may be configured for, when in the activation state: connecting, by the device to the Internet, via the port using the first transceiver; sending, by the device to the managing server over the Internet, in response to connecting to the Internet, the identifier, using the stored IP address or hostname of the managing server; receiving, by the managing server from the device over the Internet, the sent identifier; adding, by the managing server to the database, the identifier of the device; adding, by the managing server to the database, the stored device identifier with the IP address of the device; sending, by the manager server to the device over the Internet, an activation message; receiving, by the device from the managing server over the Internet, the activation message; and shifting, by the device, to the operation state, in response to the receiving of the activation message. Any device or method herein may be configured for adding and associating, by the managing server in the database, in response to the receiving by the managing server of the sent identifier, a time associated with the receiving of the sent identifier, and associating the time with the device identifier in the database.

A system may comprise any device herein, the managing server, and a user computer operated by a user, and the device may be further configured for notifying the user by sending a notification message to the user computer in response to the receiving of the sent identifier. Any notifying herein may comprise sending over the Internet, such as over the first or second network by a transceiver, such as the first or second transceiver, via a communication port, such as the first or second port, over the communication medium, or may comprise sending over the Internet via a wireless network to the user's computer using a peer-to-peer scheme. Any notifying herein may comprise sending over the Internet to an Instant Messaging (IM) server for being sent to the user's computer as part of an IM service. Any communication herein with the IM server may use, may be compatible with, or may be based on, a protocol selected from the group consisting of SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), and Hypertext Transfer Protocol (HTTP).

Any notification message herein may be a text-based message and the IM service may be a text messaging service. Alternatively or in addition, any notification message herein may be according to, or may be based on, message selected from the group consisting of a Short Message Service (SMS) message and the IM service may be a SMS service, an electronic-mail (e-mail) message and the IM service may be an e-mail service, a WhatsApp message and the IM service may be a WhatsApp service, a Twitter message and the IM service may be a Twitter service, and a Viber message and the IM service may be a Viber service. Alternatively or in addition, any notification message herein may be according to, or may be based on, a Multimedia Messaging Service (MMS) or an Enhanced Messaging Service (EMS) message that may include audio or video, and the IM service may be an NMS or EMS service.

Any device herein may further comprise a first list of servers that may include the managing server, stored in the computer readable medium, and any device herein may be configured for communicating, when in the activation state, only with a server in the first list. Any device herein may be configured for selecting the managing server from the first list, that may comprise IP addresses of the servers, when in the activation state. The first list may comprise domain names of the servers, and any device herein may further be configured for accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers.

Any device herein may comprise a first list of servers that may include the first server stored in the computer readable medium, the list may comprise IP addresses of the servers or domain names of the servers, and any device herein may further be configured for receiving, when in operation state, the URLs only from the first server or from the first list. Any device herein may further be configured for accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers. Any device herein may be configured for receiving from the managing server when in the activation state the first list to be stored therein.

A system may comprise multiple devices, each according to any of the devices herein, and multiple routers, and the number of devices may be at least 1, 2, 5, 10, 12, 15, 20, 25, 30, 50, 80, 100, 120, 150, 200, 500, 1,000, 2,000, 5,000, 10,000, 20,000, 50,000, 100,000, 200,000, 500,000 or 1,000,000, or wherein the number of devices may be at most 2, 5, 10, 12, 15, 20, 25, 30, 50, 80, 100, 120, 150, 200, 500, 1,000, 2,000, 5,000, 10,000, 20,000, 50,000, 100,000, 200,000, 500,000 1,000,000, or 2,000,000. Two or more devices may be connected to the same router.

Any device herein may be mountable in a vehicle or may be configured to be used in a vehicle, and any vehicle, such as a ground vehicle adapted to travel on land, a buoyant or submerged watercraft adapted to travel on or in water, an aircraft adapted to fly in air, or any combination thereof, may comprise any device herein. Any network herein, such as the first or second network, may use, may comprise, or may be based on, a vehicle bus. Any port herein, such as the first or second port, may comprise a vehicle bus connector. Any transceiver herein, such as the first or second transceiver, may comprise a vehicle bus transceiver. Any device herein may be used with a vehicle bus, any communication port herein may comprise a vehicle bus connector, any transceiver herein may comprise a vehicle bus transceiver, and any communication medium herein may comprise a vehicle bus medium. Any vehicle bus herein may use, or may be compatible with, a multi-master, serial protocol using acknowledgement, arbitration, and error-detection schemes, and may further employ, use, may be based on, or may be compatible with, a synchronous and frame-based protocol. Alternatively or in addition, any vehicle bus herein may consist of, may employ, may use, may be based on, or may be compatible with, a Controller Area Network (CAN), a Flexible Data-Rate (CAN FD) protocol, a Local Interconnect Network (LIN), a FlexRay protocol, or a Media Oriented Systems Transport (MOST) protocol.

Any CAN herein may be according to, may be based on, may use, or may be compatible with, a standard selected from the group consisting of ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), and SAE J2411_200002. Any LIN herein may be according to, may be based on, may use, or may be compatible with, a standard selected from a group consisting of ISO 9141-2:1994, ISO 9141: 1989, ISO 17987-1, ISO 17987-2, ISO 17987-3, ISO 17987-4, ISO 17987-5, ISO 17987-6, and ISO 17987-7. Any FlexRay protocol herein may be according to, may be based on, may use, or may be compatible with, a standard selected from a group consisting of ISO 17458-1:2013, ISO 17458-2:2013, ISO 17458-3:2013, ISO 17458-4:2013, or ISO 17458-5:2013. Any MOST protocol herein may be according to, may be based on, may use, or may be compatible with, a standard selected from a group consisting of MOST25, MOST50, and MOST150. Any device herein may comprise, may be part of, or may be integrated with, an Electronic Control Unit (ECU), that may be selected from the group consisting of Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, and a control module.

Any device herein may further be used with an Internet-connected service server, and may further comprise in the single enclosure a sensor that may output sensor data that is in response to a physical phenomenon. Any device herein may be further configured to send, to the service server over the Internet via the communication port using the transceiver or modem, a massage, that may comprise the sensor data or a function thereof, in response to any sensor reading or to any read sensor data may be the same server or may be integrated into a single server. Any reading herein of any sensor data may be periodically or continuously, and any time period of the periodic readings is at least 1, 2, 5, 8, 10, 12, 15, 20, 25, 30, 50, 80, 100, 120, 150, 200, 500, 1,000, 2,000, 5,000, or 10,000 milliseconds, seconds, minutes, or hours, or wherein the time period is less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, or hours. Any device herein, or any server herein, such as the service server, manager server may be further configured to store at least part of sensor data readings.

Any device or server herein may be configured to compare the sensor data to a threshold, and any comparing herein may be by the device or by the service server. Any device or server herein may be configured to perform an action in response to the sensor data being above the threshold or being below the threshold. Any action herein may comprise notifying the user by sending a notification message to the user computer, any action herein may comprise notifying an entity other than the user by sending a notification message to a computer, any action herein may comprise activating an actuator, such as to affect or change the physical phenomenon, or any combination thereof.

Any sensor herein may comprise, may be part of, or may be based on, a piezoelectric sensor that may include single crystal material or a piezoelectric-ceramics and may use a transverse, longitudinal, or shear effect mode of the piezoelectric effect. Alternatively or in addition, any sensor herein may comprise, may be part of, or may be based on, a nano-sensor, a crystal, a semiconductor, or any combination thereof. Any device herein may comprise multiple sensors, that may include the sensor, arranged as a directional sensor array operative to estimate the number, magnitude, frequency, Direction-Of-Arrival (DOA), distance, or speed of the phenomenon impinging the sensor array. Alternatively or in addition, any sensor herein may comprise, may be part of, or may be based on, a thermoelectric sensor that may respond to a temperature or to a temperature gradient of an object using conduction, convection, or radiation, and any thermoelectric sensor herein may consist of, may be based on, or may comprise, a Positive Temperature Coefficient (PTC) thermistor, a Negative Temperature Coefficient (NTC) thermistor, a thermocouple, a quartz crystal, a Resistance Temperature Detector (RTD), or a combination thereof. Alternatively or in addition, any sensor herein may comprise, may be part of, or may be based on, an ultrasonic-based sensor, an eddy-current sensor, a proximity sensor, a bulk acoustic sensor, a surface acoustic sensor, an atmospheric sensor, an environmental sensor, or any combination thereof. Alternatively or in addition, any sensor herein may comprise, may be part of, or may be based on, a radiation sensor that may respond to radioactivity, nuclear radiation, alpha particles, beta particles, gamma rays, gas ionization, or any combination thereof.

Alternatively or in addition, any sensor herein may comprise, may be part of, or may be based on, a photoelectric sensor that may respond to a visible or an invisible light, and any invisible light herein may comprise, or may consists of, infrared, ultraviolet, X-rays, or gamma rays. Alternatively or in addition, any sensor herein may comprise, or may be based on, a semiconductor component, that may comprise, or may be based on, a photodiode, a phototransistor, or a solar cell. Any photoelectric sensor herein may comprise, may be part of or may be based on, Charge-Coupled Device (CCD) or Complementary Metal-Oxide Semiconductor (CMOS) element. Alternatively or in addition, any sensor herein may comprise, may be part of or may be based on, a still or video camera. Alternatively or in addition, any sensor herein may comprise, may be part of, or may be based on, a photosensitive image sensor array that may comprise multiple photoelectric sensors and may be used for capturing an image and producing electronic image information representing the image. Any camera herein may comprise, or may be based on, one or more optical lens for focusing the received light and to guide the image, and any image sensor herein may be disposed approximately at an image focal point plane of the one or more optical lens for properly capturing the image.

Alternatively or in addition, any device herein may further comprise, or may be based on, an image processor that may be coupled to the image sensor and may be used for providing a digital data video according to a digital video format. Any digital video format herein may be compatible with, or may be based on, a format or standard that may be Tagged Image File Format (TIFF), RAW, Audio Video Interleave (AVI), Digital Video (DV), MOV, Windows Media Video (WMV), MPEG-4 Part 14 (MP4), Design Rule for Camera Format (DCF), ITU-T H.261, ITU-T H.263, ITU-T H.264, ITU-T CCIR 601, Advanced Systems Format (ASF), Exchangeable Image File Format (Exif), Digital Print Order Format (DPOF), or any combination thereof. Any device herein may further comprise, or may be based on, an intraframe or interframe compression by a video compressor, and may be coupled to the image sensor for lossy or non-lossy compressing of any digital data video. Any compression herein may use, may be compatible with, or may be based on, a standard compression algorithm that may comprise, or may be compatible with, Joint Photographic Experts Group (JPEG), Moving Picture Experts Group (MPEG), ITU-T H.261, ITU-T H.263, ITU-T H.264, ITU-T CCIR 601, or any combination thereof.

Alternatively or in addition, any sensor herein may comprise, may be part of, or may be based on, an electrochemical sensor that may respond to an object chemical structure, properties, composition, or reactions. Any electrochemical sensor herein may comprise, or may be based on, a pH meter or a gas sensor that may respond to a presence of radon, hydrogen, oxygen, or Carbon-Monoxide (CO), or may use optical detection or on ionization for a detecting of smoke, a flame, or a fire detector, or may be responsive to combustible, flammable, or toxic gas.

Alternatively or in addition, any sensor herein may comprise, may be part of, or may be based on, a physiological sensor that may respond to parameters associated with a live body, and may be external to the sensed body, implanted inside the sensed body, attached to the sensed body, or wearable on the sensed body. Any physiological sensor herein may be configured to respond to body electrical signals and may be an EEG Electroencephalography (EEG) or an Electrocardiography (ECG) sensor. Alternatively or in addition, any physiological sensor herein may respond to oxygen saturation, gas saturation, or a blood pressure, in any human or non-human body.

Alternatively or in addition, any sensor herein may comprise, may be part of, or may be based on, an electroacoustic sensor that responds to an audible or inaudible sound, that may be an omnidirectional, unidirectional, or bidirectional microphone, and may be based on the sensing the incident sound based on a motion of a diaphragm or a ribbon. Any microphone herein may consist of, may comprise, or may be based on, a condenser microphone, an electret microphone, a dynamic microphone, a ribbon microphone, a carbon microphone, a piezoelectric microphone, or any combination thereof.

Alternatively or in addition, any sensor herein may comprise, may be part of, or may be based on, a contact or non-contact, AC or DC, current or voltage sensor, that may comprise an ampermeter, a galvanometer, a hot-wire ampermeter, a current clamp, a current probe, a current transformer, or uses a 'Hall effect', or any combination thereof. Alternatively or in addition, any sensor herein may comprise, may be part of, or may be based on, a contact or non-contact, AC or DC, wattmeter, that may be connected for measuring the magnitude of the active AC power or the electrical energy consumed by any unit or any device herein. Any wattmeter herein may comprise, or may be based on, a single or multi-phase AC power or energy meter, a bolometer, and may accumulates or averages readings, or wherein the wattmeter or may use a multiplying of any measured voltage and any measured current. Alternatively or in addition, any sensor herein may comprise, may be part of, or may be based on, a contact or non-contact, AC or DC, voltmeter or voltage sensor that may be used for measuring a potential difference between two points, and may comprise, or may be based on, a measuring of current passing through a resistor using the Ohm's law, a potentiometer, a bridge circuit, or any combination thereof.

Alternatively or in addition, any sensor herein may comprise, may be part of, or may be based on, a relative displacement, or an incremental position sensor, that may be configured to respond to a linear or angular position or motion, of a sensed element. Any position sensor herein may comprise, or may be based on, an optical type or a magnetic type angular position sensor, that may be configured to respond to an angular position or the rotation of a shaft, an axle, or a disk. Alternatively or in addition, any position sensor herein may comprise, or may be based on, a linear position sensor that may be configured to respond to a linear displacement or position along a line. Alternatively or in addition, any sensor herein may comprise, may be part of, or may be based on, a motion detector that may be configured to respond to a motion of an element.

Alternatively or in addition, any sensor herein may comprise, may be part of, or may be based on, an occupancy sensor that may configured for detecting occupancy of a space by a human body, and may output data in response to detecting a presence of a human body by using electric effect, inductive coupling, capacitive coupling, triboelectric effect, piezoelectric effect, fiber optic transmission, radar intrusion sensing, or any combination thereof. Any occupancy sensor herein may consist of, may comprise, or may be based on, an acoustic sensor, opacity, geomagnetism, magnetic sensors, magnetometer, reflection of transmitted energy, infrared laser radar, microwave radar, electromagnetic induction, vibration, or any combination thereof. Alternatively or in addition, any occupancy sensor herein may consist of, may comprise, or may be based on, a motion sensor, that may comprise, or may based on, a mechanically actuated sensor, passive or active electronic sensor, ultrasonic sensor, microwave sensor, tomographic detector, passive infrared (PIR) sensor, laser optical detector, acoustical detector, or any combination thereof.

Any method, device, or system herein, such as any server (such as the service server) or any sensor, may be part of, or integrated with, a home or building automation service system, that may be configured to control indoor or outdoor lighting fixtures, fans, sprinklers, pool/spa heaters and pumps, electronic drapes, windoware units, fireplaces, garage doors openers, electronic door locks, hot water heaters, fire detection and monitoring equipment, electronic gates, digital security cameras, motion sensors, flood monitors, humidifiers, home theater units, phone PBX, voice mail, intercom, door phone, aquarium sensors and heaters, sidewalk and driveway heaters, sprinklers, dampers, doorbells, or any combination thereof.

A method may be used for fetching multiple web-pages identified by respective multiple Uniform Resource Locators (URLs) and stored in respective multiple web servers, and may be further used with a device that may serve as an intermediate device between a first server and the web servers and may comprise a single enclosure that may house no more than a one Local Area Network (LAN) connector and a LAN transceiver or modem for communication over the LAN. The device may be configured to be in distinct activation, operation, and non-operation states, may be used with an Internet-connected managing server that may comprise a database for Operations, Administration, registration, or Management (OA&M) functions associated with the device. Any method herein may be performed by any device herein and may comprise, only when in the operation state, receiving, over the Internet by the LAN connector from a first server, the multiple URLs; for each of the multiple URLs, sending, over the Internet by the LAN connector to the respective web server that stores the respective web-page identified by the URL, the received URL; for each of the URLs, receiving, over the Internet by the LAN connector from the respective web server, the respective web-page; and for each of the URLs, sending, over the Internet by the LAN connector to the first server, the received respective web-page. The primary or exclusive function of any device herein may be to execute any of the steps herein in the operation state. The exclusive function of any device herein may be to execute the part of, or whole of, any of the steps of methods herein.

Any server herein, such as the first server or the managing server, may be a cloud-based server that may be implemented as an Infrastructure as a Service (IaaS) or as a Software as a Service (SaaS) by a public cloud-based service, such as the one that may be provided by Amazon Web Services® (AWS®), Microsoft® Azure™, or Google® Compute Engine™ (GCP).

Any method herein may further comprise Operations, administration, registration, or management (OA&M) functions that may be exclusively or primarily associated with executing of the steps in the operation state, and any OA&M functions herein may comprise registration, operation, monitoring, maintenance, support, collecting performance data, collecting accounting data, or any combination thereof. All of the hardware elements in the single enclosure may be primary or exclusively for executing any of the steps herein in the operation state, and all the software modules stored in the device may be primary or exclusively for executing the steps in the operation state.

The first server and the managing server may be distinct servers or the same server. Any device herein may consist or, may comprise, or may be part of, a client device and may be in a client/server architecture with the managing server. Any device herein may comprise a non-transitory computer readable medium that may contain computer instructions that, when executed by a computer processor, may cause the processor to perform at least part of any steps herein. Any communication herein over the Internet with the managing server, may be based on, may use, or may be compatible with, Transmission Control Protocol over Internet Protocol (TCP/IP) protocol or connection. Alternatively or in addition, any communication herein over the Internet with the managing server, may be based on, may use, or may be compatible with, HTTP protocol or connection, and any HTTP herein may be based on, may comprises, or may consist of, HTTP/1.1, HTTPS, HTTP/2, HTTP/3, or any combination thereof, and any managing server herein may serve as an HTTP or HTTPS server and the device may serve as an HTTP or HTTPS client. Alternatively or in addition, any communication herein over the Internet with the managing server, may be based on, may use, or may be compatible with, Socket Secure (SOCKS) protocol or connection, where the managing server may serve as a SOCKS server and the device may serve as a SOCKS client. Any SOCKS protocol or connection herein may be according to, may be based on, or may be compatible with, SOCKS4, SOCKS4a, or SOCKS5, or may be according to, may be based on, or may be compatible with, IETF RFC 1928, IETF RFC 1929, IETF RFC 1961, or IETF RFC 3089.

Alternatively or in addition, any communication herein over the Internet with the managing server, may be based on, may use, or may be compatible with, HTTP Proxy protocol or connection, wherein the managing server may serve as an HTTP Proxy server and the device may serve as an HTTP Proxy client. Any method herein may further comprise establishing a connection with the managing server, and the established connection may be a TCP connection using 'Active OPEN', 'Passive OPEN', TCP keepalive mechanism, or may use, or may be based on, Virtual Private Network (VPN).

Any LAN herein may be according to, may be compatible with, or may be based on, IEEE 802.3-2008 standard. Further, any LAN herein may be a wired LAN that may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T. Any LAN connector herein may comprise a RJ-45 type connector. Alternatively or in addition, any LAN herein may be a fiber-optics medium LAN that may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and the LAN connector may comprise a fiber-optic connector.

Any device herein may further store an identifier for uniquely identifying the device in the LAN or over the Internet, and the identifier may comprise a Media Access Control (MAC) address, that may comprise a Media Access Control (MAC) address that may be MAC-48, Extended Unique Identifier (EUI) EUI-48, or EUI-64 address type, an Internet Protocol (IP) address that may comprise an Internet Protocol (IP) address that may be IPv4 or IPv6 type address, or a hostname.

Any device herein may store the IP address or hostname of the managing server, and any method herein may further comprise shifting to, or staying in, the activation state in response to a powering up of the device, and may further comprise, when in the activation state: connecting, by the device to the Internet, via the LAN connector using the LAN transceiver; sending, by the device to the managing server over the Internet, in response to connecting to the Internet, the identifier, using the stored IP address or hostname; receiving, by the managing server from the device over the Internet, the sent identifier; adding, by the managing server to the database, the identifier of the device; adding, by the managing server to the database, the stored device identifier with the IP address of the device; sending, by the managing server to the device over the Internet, an activation message; receiving, by the device from the managing server over the Internet, the activation message; and shifting, by the device, to the operation state, in response to the receiving of the activation message. Any method herein may further comprise adding and associating, by the managing server in the database, in response to the receiving of the sent identifier, a time that may be associated with the receiving of the sent identifier server by the managing, and may be associating the time with the device identifier in the database.

Any method herein may be used with a user that may operate a user computer, and may further comprise notifying, by the managing server, the user by sending a notification message to the user computer in response to the receiving of the sent identifier. The notifying may comprise sending over the Internet via a wireless network to the user computer using a peer-to-peer scheme, or may comprise sending over the Internet to an Instant Messaging (IM) server for being sent to the user computer as part of an IM service. The communication with the IM server may use, may be compatible with, or may be based on, a protocol selected from the group consisting of SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), and Hypertext Transfer Protocol (HTTP).

Any notification message herein may be a text-based message and the IM service may be a text messaging service. Alternatively or in addition, the notification message may be according to, or may be based on, a message selected from the group consisting of a Short Message Service (SMS) message, an electronic-mail (e-mail) message, a WhatsApp message, a Twitter message, a Viber message, or any combination thereof, and any IM service herein may be a SMS service, an e-mail service, a WhatsApp service, a Twitter service, and, a Viber service, or any combination herein. Alternatively or in addition, any notification message herein may be a Multimedia Messaging Service (MMS) or an Enhanced Messaging Service (EMS) message that may include audio or video, and any respective IM service may be an NMS or EMS service.

Any method herein may be used with a first list of servers that may include the managing server and may be stored in a memory in the device, and any method herein may further comprise communication, by the device when in the activation state, only with server in the first list, such as after selecting, by the device, the managing server from the first list when in the activation state. The first list may comprise IP addresses of the servers or domain names of the servers, and any method herein may comprise accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers.

Any method herein may be used with a first list of servers that may include the first server and may be stored in a memory in the device, and the method herein may further comprise receiving, by the device when in operation state, the URLs only from the first server or from the first list. The first list may comprise IP addresses of the servers, or domain names of the servers, and any method herein may comprise accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers. Any method herein may further comprise receiving, by the device from the managing server when in the activation state, the first list to be stored therein.

Any managing server herein may associate only one of the values of 'available' and 'unavailable' with any device status, and any device herein may store the IP address or hostname of the managing server. Any method herein may further comprise connecting, by the device to the Internet, via the LAN connector using the LAN transceiver; sending, by the device to the managing server over the Internet, in response to connecting to the Internet, the identifier, using the stored IP address or hostname; receiving, by the managing server from the device over the Internet, the sent identifier; and associating, by the managing server in response to the receiving of the sent identifier, the device status to 'available' in the database. Any method herein may further comprise periodically sending, by the device to the managing server over the Internet, when the device is in the operation state, a status message.

Any method herein may further comprise periodically sending, by the managing server to the device over the Internet, a status request message; and periodically checking for receiving, by the device to the managing server over the Internet, the status message, and the periodically sending of the status message by the device may be in response to the periodically receiving of the status message.

Any status message herein may be a Transmission Control Protocol (TCP) keep-alive message as part of a TCP keep-alive mechanism. Alternatively or in addition, any status message herein may be a 'ping' message as part of a pinging mechanism. Any time period herein of periodically sending of the status message may be at least 1, 2, 5, 8, 10, 12, 15, 20, 25, 30, 50, 80, 100, 120, 150, 200, 500, 1,000, 2,000, 5,000, or 10,000 milliseconds, seconds, minutes, or hours, or the time period of periodically sending of the status message may be less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, or hours.

Any method herein may further comprise responsive to not receiving one or more consecutive status messages, changing, by the managing server, the device status associated to the device to 'unavailable' in the database, and may further comprise, responsive to receiving one or more consecutive status messages, changing, by the managing server, the device status associated to the device to 'available' in the database, or responsive to associating the device status to 'unavailable' in the database, sending an update message, from the managing server to the first server, for notifying the first server to inhibit sending of URLs to the device. The update message may be sent by the managing server to the first server over the Internet.

Any method herein may be used with a user that may operate a user computer, and may further comprise notifying by the managing server, the user, responsive to associating the device status to 'unavailable' in the database, by sending an alert message to the user computer. Any notifying herein may comprise sending over the Internet via a wireless network to the user computer using a peer-to-peer scheme, or may comprise sending over the Internet to an Instant Messaging (IM) server for being sent to the user computer as part of an IM service.

Any method herein may be used with a user that may operate a user computer, and may further comprise notifying, by the managing server, the user by sending a notification message to the user computer in response to the receiving of the sent identifier. The notifying may comprise sending over the Internet via a wireless network to the user computer using a peer-to-peer scheme, or may comprise sending over the Internet to an Instant Messaging (IM) server for being sent to the user computer as part of an IM service. The communication with the IM server may use, may be compatible with, or may be based on, a protocol selected from the group consisting of SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), and Hypertext Transfer Protocol (HTTP).

Any notification message herein may be a text-based message and the IM service may be a text messaging service. Alternatively or in addition, the notification message may be according to, or may be based on, a message selected from the group consisting of a Short Message Service (SMS) message, an electronic-mail (e-mail) message, a WhatsApp message, a Twitter message, a Viber message, or any combination thereof, and any IM service herein may be a SMS service, an e-mail service, a WhatsApp service, a Twitter service, and, a Viber service, or any combination herein. Alternatively or in addition, any notification message herein may be a Multimedia Messaging Service (MMS) or an Enhanced Messaging Service (EMS) message that may include audio or video, and any respective IM service may be an NMS or EMS service.

Any method herein may further comprise estimating or calculating, using a timing counter in the managing server, the total time in a pre-defined time interval in which the device may be associated with 'available' status in the database, and may further comprise estimating or calculating, using a timing counter in the device, the total time in a pre-defined time interval in which the device may be properly connected to the Internet or may be in operation state. Any time interval herein may be at least 1, 2, 5, 8, 10, 12, 15, 20, 25, 30, 50, 80, 100, 120, 150, 200, 500, 1,000, 2,000, 5,000, or 10,000 hours or minutes, or may be less than 2, 3, 4, 5, 8, 10, 12, 15, 20, 25, 30, 50, 80, 100, 120, 150, 200, 500, 1,000, 2,000, 5,000, 10,000 or 20,000 hours or minutes. Alternatively or in addition, any time interval herein may be at least 1, 2, 5, 8, 10, 12, 15, 20, 25, 30, 50, 80, 100, 120, 150, 200, 500, 1,000, 2,000, 5,000, or 10,000 weeks or months, or may be less than 2, 3, 4, 5, 8, 10, 12, 15, 20, 25, 30, 50, 80, 100, 120, 150, 200, 500, 1,000, 2,000, 5,000, 10,000 or 20,000 weeks or months.

Any method herein may further be used with a user that may operate a user computer, and may comprise notifying the user, responsive to the end of the pre-defined time interval, by sending a timing message to the user computer that may be based on, or in response to, the estimated or calculated total time. Any notifying herein may comprise sending over the Internet via a wireless network to the user computer using a peer-to-peer scheme, or may comprise sending over the Internet to an Instant Messaging (IM) server for being sent to the user computer as part of an IM service.

Any method herein may be used with a user that may operate a user computer, and may further comprise notifying the user by sending a notification message to the user computer in response to the receiving of the sent identifier. The notifying may comprise sending over the Internet via a wireless network to the user computer using a peer-to-peer scheme, or may comprise sending over the Internet to an Instant Messaging (IM) server for being sent to the user computer as part of an IM service. The communication with the IM server may use, may be compatible with, or may be based on, a protocol selected from the group consisting of SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), and Hypertext Transfer Protocol (HTTP).

Any notification message herein may be a text-based message and the IM service may be a text messaging service. Alternatively or in addition, the notification message may be according to, or may be based on, a message selected from the group consisting of a Short Message Service (SMS) message, an electronic-mail (e-mail) message, a WhatsApp message, a Twitter message, a Viber message, or any combination thereof, and any IM service herein may be a SMS service, an e-mail service, a WhatsApp service, a Twitter service, and, a Viber service, or any combination herein. Alternatively or in addition, any notification message herein may be a Multimedia Messaging Service (MMS) or an Enhanced Messaging Service (EMS) message that may include audio or video, and any respective IM service may be an NMS or EMS service.

Any method herein may further comprise estimating or counting, by any device, the total amount of data in a pre-defined time interval transferred between the first server and the multiple web servers, received from the multiple web servers, sent to the first server, or any combination thereof, where the estimating or counting may be performed by the first server, by the device, or any combination thereof. Any method herein may further comprise sending the estimated or counted total amount of data to the managing server to be added to the database therein, and any time interval herein may be at least 1, 2, 5, 8, 10, 12, 15, 20, 25, 30, 50, 80, 100, 120, 150, 200, 500, 1,000, 2,000, 5,000, or 10,000 hours or minutes, or may be less than 2, 3, 4, 5, 8, 10, 12, 15, 20, 25, 30, 50, 80, 100, 120, 150, 200, 500, 1,000, 2,000, 5,000, 10,000 or 20,000 hours or minutes. Alternatively or in addition, any time interval herein may be at least 1, 2, 5, 8, 10, 12, 15, 20, 25, 30, 50, 80, 100, 120, 150, 200, 500, 1,000, 2,000, 5,000, or 10,000 weeks or months, or may be less than 2, 3, 4, 5, 8, 10, 12, 15, 20, 25, 30, 50, 80, 100, 120, 150, 200, 500, 1,000, 2,000, 5,000, 10,000 or 20,000 weeks or months.

Any method herein may be used with a list of domain names stored in a memory in the device, and may further comprise adding respective domain names of the received URLs to the list in response to the receiving of the URLs, or may further comprise adding respective domain names of the received web-pages to the list in response to the receiving of the web-pages. Any list herein may include at least 1, 2, 5, 8, 10, 12, 15, 20, 25, 30, 50, 80, 100, 120, 150, 200, 500, 1,000, 2,000, 5,000, or 10,000 last domain names, or may include less than 1, 2, 5, 8, 10, 12, 15, 20, 25, 30, 50, 80, 100, 120, 150, 200, 500, 1,000, 2,000, 5,000, or 10,000 last domain names. Any list herein may include the domain names in a pre-defined time interval. Any method herein may further comprise sending, by the device to the managing server, the stored list to be stored in the database.

Any method herein may further be used with a user that may operate a user computer, may further comprise receiving, by the user computer, OA&M data, or sending, by the user computer, OA&M data. Any user computer herein may be connected to the device over an industry standard bus that defines a point-to-point serial communication over a cable between host computer and peripheral, and the receiving or the sending of the OA&M data respectively may comprise receiving from the device over the bus or sending to the device over the bus. Any industry standard bus herein may be according to, or may be based on, a Universal Standard Bus (USB) that may be according to, or may be based on, USB 2.0 or USB 3.0. and the device may further comprise a USB connector.

Any receiving or the sending of the OA&M data respectively herein may comprise receiving from the device or sending to the device, and the user device may be connected to the router. Any user computer herein may be connected to the Internet, and the receiving or the sending of the OA&M data respectively may comprise receiving from the managing server over the Internet or sending to the managing server over the Internet. Alternatively or in addition, the user computer may be connected to the Internet, and the receiving or the sending of the OA&M data respectively may comprise receiving from the database in the managing server over the Internet or sending to be stored in the database in the managing server over the Internet, and the user device may be connected to the router.

Any device herein may further store a web browser, and any method herein may further comprise executing the stored web browser. Any sending of any URLs herein may comprise sending the URLs by the web browser for overcoming blocking by at least one of the multiple web servers that uses fingerprinting-based blocking scheme. Any web browser herein may be executed by the device in the operation state, and may be launched or initiated upon entering the operation state. Any web browser herein may be launched, executed or initiated in the activation state, in response to powering up of the device, in response to the connecting to the Internet, in response to the receiving of one or more URLs, or any combination thereof. Any web browser herein may consist of, may comprise of, or may be based on, headless browser, Microsoft Internet Explorer, Microsoft Edge, Google Chrome, Opera™, or Mozilla Firefox®. Alternatively or in addition, any web browser herein may be a mobile web browser that may be Safari, Opera Mini™, or Android web browser.

Any method herein may further comprise storing, operating, or using, by any device, a client operating system, that may consist of, may comprise, or may be based on, one out of Microsoft Windows 7, Microsoft Windows XP, Microsoft Windows 8, Microsoft Windows 8.1, Microsoft Windows 10, Microsoft Windows 11, Linux, and Google Chrome OS. Alternatively or in addition, any client operating system herein may be, or may comprise, a Real-Time Operating System (RTOS), such as FreeRTOS, SafeRTOS, QNX, VxWorks, or Micro-Controller Operating Systems (μC/OS). Alternatively or in addition, any client operating system herein may be, or may comprise, a mobile operating system, that may be based on, or may comprise, Android version 2.2 (Froyo), Android version 2.3 (Gingerbread), Android version 4.0 (Ice Cream Sandwich), Android Version 4.2 (Jelly Bean), Android version 4.4 (KitKat), Android Version 5.0 or 5.1 (Lollipop), Android Version 6.0 (Marshmallow), Android Version 7.0 or 7.1 (Nougat), Android Version 8.0 or 8.1 (Oreo), Android Version 9 (Pic), Android Version 10, Android Version 11, Android Version 12, Apple iOS version 3, Apple IOS version 4, Apple IOS version 5, Apple IOS version 6, Apple iOS version 7, Apple iOS version 8, Apple IOS version 9, Apple IOS version 10, Apple iOS version 11, Apple iOS version 12, Apple IOS or iPadOS version 13, Apple IOS or iPadOS version 14, Apple iOS or iPadOS version 15, Microsoft Windows® Phone version 7, Microsoft Windows® Phone version 8, Microsoft Windows® Phone version 9, Windows® 10 Mobile, or Blackberry® operating system.

Any method herein may comprise storing, operating, or using, by any server, such as the managing server, a server operating system, that may consist or, may comprise of, or may be based on, at least one out of Microsoft Windows Server®, Linux, UNIX, Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®.

Any method herein may be used use with an Internet-connected service server, and any device herein may further comprise in the single enclosure a sensor that may output sensor data in response to a physical phenomenon. Any method herein may further comprise sending, to the service server over the Internet via the communication port using the transceiver or modem, a massage, that may comprise the sensor data or a function thereof, in response to the reading or to the read sensor data. Any managing server herein and any service server herein may be distinct or different servers, may be the same server, or may be integrated into a single server. Any reading herein may comprise periodically or continuously reading the sensor data, such as where the time period of the periodically reading may be at least 1, 2, 5, 8, 10, 12, 15, 20, 25, 30, 50, 80, 100, 120, 150, 200, 500, 1,000, 2,000, 5,000, or 10,000 milliseconds, seconds, minutes, or hours, or may be less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, or hours.

Any method herein may comprise storing, by any device, by any server such as the service server, or any combination thereof, at least part of sensor data readings. Any method herein may further comprise comparing, by any device or by any server such as the service server, the sensor data to a threshold. Any method herein may further comprise performing, by any device or by any server such as the service server, an action in response to the sensor data being above the threshold or being below the threshold. Any action herein may comprise notifying the user by sending a notification message to the user computer, notifying an entity other than the user by sending a notification message to an entity computer, activating an actuator that may be configured to affect or change the physical phenomenon, or any combination thereof.

Any sensor herein may comprise, may be part of, or may be based on, a piezoelectric sensor that may include single crystal material or a piezoelectric-ceramics and may use a transverse, longitudinal, or shear effect mode of the piezoelectric effect. Alternatively or in addition, any sensor herein may comprise, may be part of, or may be based on, a nano-sensor, a crystal, a semiconductor, or any combination thereof. Any device herein may comprise multiple sensors, that may include the sensor, arranged as a directional sensor array operative to estimate the number, magnitude, frequency, Direction-Of-Arrival (DOA), distance, or speed of the phenomenon impinging the sensor array. Alternatively or in addition, any sensor herein may comprise, may be part of, or may be based on, a thermoelectric sensor that may respond to a temperature or to a temperature gradient of an object using conduction, convection, or radiation, and any thermoelectric sensor herein may consist of, may be based on, or may comprise, a Positive Temperature Coefficient (PTC) thermistor, a Negative Temperature Coefficient (NTC) thermistor, a thermocouple, a quartz crystal, a Resistance Temperature Detector (RTD), or a combination thereof. Alternatively or in addition, any sensor herein may comprise, may be part of, or may be based on, an ultrasonic-based sensor, an eddy-current sensor, a proximity sensor, a bulk acoustic sensor, a surface acoustic sensor, an atmospheric sensor, an environmental sensor, or any combination thereof. Alternatively or in addition, any sensor herein may comprise, may be part of, or may be based on, a radiation sensor that may respond to radioactivity, nuclear radiation, alpha particles, beta particles, gamma rays, gas ionization, or any combination thereof.

Alternatively or in addition, any sensor herein may comprise, may be part of, or may be based on, a photoelectric sensor that may respond to a visible or an invisible light, and any invisible light herein may comprise, or may consists of, infrared, ultraviolet, X-rays, or gamma rays. Alternatively or in addition, any sensor herein may comprise, or may be based on, a semiconductor component, that may comprise, or may be based on, a photodiode, a phototransistor, or a solar cell. Any photoelectric sensor herein may comprise, may be part of or may be based on, Charge-Coupled Device (CCD) or Complementary Metal-Oxide Semiconductor (CMOS) element. Alternatively or in addition, any sensor herein may comprise, may be part of or may be based on, a still or video camera. Alternatively or in addition, any sensor herein may comprise, may be part of, or may be based on, a photosensitive image sensor array that may comprise multiple photoelectric sensors and may be used for capturing an image and producing electronic image information representing the image. Any camera herein may comprise, or may be based on, one or more optical lens for focusing the received light and to guide the image, and any image sensor herein may be disposed approximately at an image focal point plane of the one or more optical lens for properly capturing the image.

Alternatively or in addition, any device herein may further comprise, or may be based on, an image processor that may be coupled to the image sensor and may be used for providing a digital data video according to a digital video format. Any digital video format herein may be compatible with, or may be based on, a format or standard that may be Tagged Image File Format (TIFF), RAW, Audio Video Interleave (AVI), Digital Video (DV), MOV, Windows Media Video (WMV), MPEG-4 Part 14 (MP4), Design Rule for Camera Format (DCF), ITU-T H.261, ITU-T H.263, ITU-T H.264, ITU-T CCIR 601, Advanced Systems Format (ASF), Exchangeable Image File Format (Exif), Digital Print Order Format (DPOF), or any combination thereof. Any device herein may further comprise, or may be based on, an intraframe or interframe compression by a video compressor, and may be coupled to the image sensor for lossy or non-lossy compressing of any digital data video. Any compression herein may use, may be compatible with, or may be based on, a standard compression algorithm that may comprise, or may be compatible with, Joint Photographic Experts Group (JPEG), Moving Picture Experts Group (MPEG), ITU-T H.261, ITU-T H.263, ITU-T H.264, ITU-T CCIR 601, or any combination thereof.

Alternatively or in addition, any sensor herein may comprise, may be part of, or may be based on, an electrochemical sensor that may respond to an object chemical structure, properties, composition, or reactions. Any electrochemical sensor herein may comprise, or may be based on, a pH meter or a gas sensor that may respond to a presence of radon, hydrogen, oxygen, or Carbon-Monoxide (CO), or may use optical detection or on ionization for a detecting of smoke, a flame, or a fire detector, or may be responsive to combustible, flammable, or toxic gas.

Alternatively or in addition, any sensor herein may comprise, may be part of, or may be based on, a physiological sensor that may respond to parameters associated with a live body, and may be external to the sensed body, implanted inside the sensed body, attached to the sensed body, or wearable on the sensed body. Any physiological sensor herein may be configured to respond to body electrical signals and may be an EEG Electroencephalography (EEG) or an Electrocardiography (ECG) sensor. Alternatively or in addition, any physiological sensor herein may respond to oxygen saturation, gas saturation, or a blood pressure, in any body.

Alternatively or in addition, any sensor herein may comprise, may be part of, or may be based on, an electroacoustic sensor that responds to an audible or inaudible sound, that may be an omnidirectional, unidirectional, or bidirectional microphone, and may be based on the sensing the incident sound based on a motion of a diaphragm or a ribbon. Any microphone herein may consist of, may comprise, or may be based on, a condenser microphone, an electret microphone, a dynamic microphone, a ribbon microphone, a carbon microphone, a piezoelectric microphone, or any combination thereof.

Alternatively or in addition, any sensor herein may comprise, may be part of, or may be based on, a contact or non-contact, AC or DC, current or voltage sensor, that may comprise an ampermeter, a galvanometer, a hot-wire ampermeter, a current clamp, a current probe, a current transformer, or uses a 'Hall effect', or any combination thereof. Alternatively or in addition, any sensor herein may comprise, may be part of, or may be based on, a contact or non-contact, AC or DC, wattmeter, that may be connected for measuring the magnitude of the active AC power or the electrical energy consumed by any unit or any device herein. Any wattmeter herein may comprise, or may be based on, a single or multi-phase AC power or energy meter, a bolometer, and may accumulates or averages readings, or wherein the wattmeter or may use a multiplying of any measured voltage and any measured current. Alternatively or in addition, any sensor herein may comprise, may be part of, or may be based on, a contact or non-contact, AC or DC, voltmeter or voltage sensor that may be used for measuring a potential difference between two points, and may comprise, or may be based on, a measuring of current passing through a resistor using the Ohm's law, a potentiometer, a bridge circuit, or any combination thereof.

Alternatively or in addition, any sensor herein may comprise, may be part of, or may be based on, a relative displacement, or an incremental position sensor, that may be configured to respond to a linear or angular position or motion, of a sensed element. Any position sensor herein may comprise, or may be based on, an optical type or a magnetic type angular position sensor, that may be configured to respond to an angular position or the rotation of a shaft, an axle, or a disk. Alternatively or in addition, any position sensor herein may comprise, or may be based on, a linear position sensor that may be configured to respond to a linear displacement or position along a line. Alternatively or in addition, any sensor herein may comprise, may be part of, or may be based on, a motion detector that may be configured to respond to a motion of an element.

Alternatively or in addition, any sensor herein may comprise, may be part of, or may be based on, an occupancy sensor that may configured for detecting occupancy of a space by a human body, and may output data in response to detecting a presence of a human body by using electric effect, inductive coupling, capacitive coupling, triboelectric effect, piezoelectric effect, fiber optic transmission, radar intrusion sensing, or any combination thereof. Any occupancy sensor herein may consist of, may comprise, or may be based on, an acoustic sensor, opacity, geomagnetism, magnetic sensors, magnetometer, reflection of transmitted energy, infrared laser radar, microwave radar, electromagnetic induction, vibration, or any combination thereof. Alternatively or in addition, any occupancy sensor herein may consist of, may comprise, or may be based on, a motion sensor, that may comprise, or may be based on, a mechanically actuated sensor, passive or active electronic sensor, ultrasonic sensor, microwave sensor, tomographic detector, passive infrared (PIR) sensor, laser optical detector, acoustical detector, or any combination thereof.

Any method, device, or system herein, such as any server (such as the service server) or any sensor, may be part of, or integrated with, a home or building automation service system, that may be configured to control indoor or outdoor lighting fixtures, fans, sprinklers, pool/spa heaters and pumps, electronic drapes, windoware units, fireplaces, garage doors openers, electronic door locks, hot water heaters, fire detection and monitoring equipment, electronic gates, digital security cameras, motion sensors, flood monitors, humidifiers, home theater units, phone PBX, voice mail, intercom, door phone, aquarium sensors and heaters, sidewalk and driveway heaters, sprinklers, dampers, doorbells, or any combination thereof.

A method herein may be used with a web server that stores a content identified by a Uniform Resource Locator (URL) and may execute a web tracker for blocking requests that satisfy a criterion. The method may comprise receiving, by a first device from a first client device over the Internet, a first request that includes the URL; extracting, by the first device, the URL from the first request; forming, by the first device, a second request that includes the URL, or modifying the first request to obtain the second request; sending, by the first device to the web server over the Internet, the second request; receiving, by the first device from the web server over the Internet, the content, in response to the sending of the second request; and sending, by the first device to the first client device over the Internet, the received content. The second request may be formed not to satisfy the criterion so that the second request may not be blocked by the web tracker in the web server.

Any web tracker herein may use, or may be based on, fingerprinting for identifying or re-identifying devices, users, user activities, software applications or instances, user agents, or any combination thereof. Any web-tracker herein may obtain a first fingerprint from any device. such as from the first device, may be used with a second fingerprint that may be different from the first fingerprint. Any method herein may further comprise modifying, by any device such as the first device, from the first fingerprint to the second fingerprint. Alternatively or in addition, any request herein, such as the second request, may be associated with, or may be based on, the second fingerprint.

Any method herein may be used with a group of entities that may comprise devices, users, user activities, software applications, user agents, or any combination thereof. Any web tracker herein may be configured to identify an entity associated with any device (such as by using fingerprinting), such as with the first device, any criterion herein may be satisfied if the identified entity associated with the first device is included in the group.

Any device herein, such as the first device, may comprise a non-transitory computer readable medium that contains computer instructions that, when executed by a computer processor, cause the processor to perform at least part of the steps herein. Further, at least part of any steps herein are may be included in a Software Development Kit (SDK) that may be provided as a non-transitory computer readable medium containing computer instructions, and any method herein may further comprise installing the SDK. Any content herein may comprise, or may consists of, a HyperText Markup Language (HTML) object, a web-page, a web-site, or any combination thereof, that may include, may consist of, or may comprise, a part or whole of a program or data file, text data, audio data, voice data, multimedia data, video data, an image, music data, or any combination thereof.

Any method herein may be used with a web server that may store a content identified by a Uniform Resource Locator (URL). Any method herein may comprise receiving, by a first client device from a first server over the Internet, a first request that includes the URL; extracting, by the first client device, the URL from the first request; forming, by the first client device, a second request that includes the URL, or modifying the first request to obtain the second request; sending, by the first client device to the second client device over the Internet, the second request; receiving, by the second client device from the first client device over the Internet, the second request; and sending, by the second client device to the web server over the Internet, the received second request. Any sending of any received request, such as the second request, to the web server may use an IP address of any device, such as the second client device, so that the IP address of the first client device may be unknown to the web server. Except for using the IP address of the second client device as the source address, the second client device may transparently pass messages between the first client device and the web server.

Any method herein may further comprise receiving, by the second client device from the web server over the Internet, the content, in response to the sending of the second request; sending, by the second client device to the first client device over the Internet, the received content; receiving, by the first client device from the second client device over the Internet, the received content; and sending, by the first client device to the first server over the Internet, the received content. Any web server herein may use or may execute a web tracker, that may be configured to identify or re-identify an entity using fingerprinting, for blocking requests that may satisfy a criterion, and any request herein, such as the second request, may be formed so that it may not satisfy any criterion, so that the second request may not be blocked by any web tracker in the web server. Any method herein may be used with a group of entities that comprise devices, users, user activities, software applications, and user agents, and any web tracker herein may be configured to identify an entity associated with the first client device Any criterion herein may be satisfied if the identified entity associated with the first client device is included in the group. Any method herein may be for overcoming the blocking of requests by the web server, or for improving anonymity or privacy of any client device, such as the first client device, a user of the first client device, the second client device, a user of the second client device, or any combination thereof.

Any web tracker herein may be based on, or may comprises, fingerprinting, and any method herein may further comprise modifying the second request from a first fingerprint to a second fingerprint that may be different from the first fingerprint, or the first device may be associated with the second fingerprint. Any forming herein of any request, such as the second request, or the sending of the second request, may be part of the modifying. Any fingerprint herein, such as the first fingerprint, may satisfy the criterion, and alternatively or in addition, any fingerprint herein, such as the second fingerprint, may not satisfy the criterion. For example, the first fingerprint may satisfy the criterion, and the second fingerprint may not satisfy the criterion. Any modifying herein may comprise Open Systems Interconnection (OSI) model Layer-2 modifying, OSI Layer-3 modifying, OSI Application Layer modifying, OSI Session Layer modifying, or any combination thereof. Any fingerprinting herein may comprise, or may be based on, device fingerprinting, that may comprise systematic gathering a set of information of a requesting client device for differentiating it, with the aim of identifying, monitoring, or blocking any requesting client activity or request.

Any fingerprinting herein may uniquely identify a device, such as the requesting client device, and may comprise, or may be based on, Web-based fingerprinting, which may comprise, or may be based on, a browser fingerprinting that may comprise retrieving information by interacting with a web browser that may be executed by the requesting client device that requests a content from the web server. Any browser fingerprinting herein may comprise, or may be based on, a single browser fingerprinting that may comprise, or may be based on, using javascript, Flash Plugin, Java Plugin, Java Virtual Machine (JVM), Cascading Style Sheets (CSS), or any combination thereof. Alternatively or in addition, any browser fingerprinting herein may comprise, or may be based on, cross-browser fingerprinting. Alternatively or in addition, any web browser herein may support HyperText Markup Language 5 (HTML5), and any browser fingerprinting herein may comprise, or may be based on, canvas fingerprinting that may comprise identifying and tracking requesting client devices that may use HyperText Markup Language 5 (HTML5) canvas elements.

Any web tracker herein may be based on, or may comprise, fingerprinting that may use at least one value that may be associated with a feature, property, characteristic, or attribute of any device, such as the first client device or of the first device, and any method herein may further comprise modifying or changing the value to form a second fingerprint data that is different from the first fingerprint. Any fingerprint herein, such as the first fingerprint, may satisfy the criterion, and any fingerprint herein, such as the second fingerprint, may not satisfy the criterion. Any fingerprinting herein, such as the first fingerprinting, may comprises browser fingerprinting, canvas fingerprinting, canvas font fingerprinting, webRTC fingerprinting, audiocontext fingerprinting, or any combination thereof.

Any value herein may be associated with a type, version, characteristics, or configuration of a software application that may be installed or may be used in any device, such as in the first client device or in the first device. Any software application herein may comprise a web browser, a graphic driver, an operating system, or any combination thereof. Alternatively or in addition, any value herein may comprise a vendor name or identifier of the software application. Alternatively or in addition, any value herein may comprise a list of plugins activated in a web-browser, whether cookies are enabled or not in a web-browser, Time-zone used by a web-browser, or any combination thereof. Alternatively or in addition, any value herein may be associated with a user configuration of hardware or software in a device, such as in the first client device or in the first device. Alternatively or in addition, any value herein may be associated with the amount of software applications installed, a language used, a time zone, an installation of an ad-blocker, fonts used, cached objects, a screen configuration, or any combination thereof. Alternatively or in addition, any value herein may be associated with an HTTP cache, browsing history, Local Shared Objects (Flash Cookies), Web Storage (HTML5 Cookies), or any combination thereof.

Alternatively or in addition, any value herein may be associated with a hardware component of any device, such as the first client device or of the first device, a hardware arrangement of any device such as the first client device or of the first device, or one or more components that may be connected to any device, such as the first client device or the first device. Alternatively or in addition, any value herein may be associated with an existence of, or with a property, configuration, characteristic, or attribute of, a graphic card, a memory, an accelerometer, a network interface, a touch-screen, a screen (such as a resolution of the screen or of the touch-screen), a battery, an audio codec, a video codec, a clock skew, or any combination thereof. Alternatively or in addition, any value herein may comprise a vendor name or identifier of the hardware component, a number of processors, an amount of free memory space, an amount of maximum available memory, an amount of total memory, or any combination thereof. Alternatively or in addition, any value herein may be associated with a value in a HTTP header field, such as User Agent, Accept Header, Accept-Charset Header, Accept-Encoding Header, Do-not-track Header, or any combination thereof.

Any fingerprinting herein may comprise, or may be based on, browser fingerprinting that may comprise retrieving information, that may be hardware, operating-system, or web-browser related, from a web browser executed by a requesting client device that fetches content from the web server. Any modifying herein from a first fingerprint to a second fingerprint may comprise modifying or forming a User-agent header, an Accept header, a Connection header, an Encoding header, a Language header, a list of plugins, a computing platform, a cookies preferences (e.g., allowed or not), a 'Do Not Track' preferences (e.g., yes, no or not communicated), a timezone, a screen resolution and its color depth, a use of local storage, a use of session storage, a picture rendered with the HTML Canvas element, a picture rendered with WebGL, a presence of AdBlock, a list of fonts, or any combination thereof. Alternatively or in addition, any modifying herein may comprise using or executing a web browser by any device, such as the first device.

Any information may be retrieved using a JavaScript script that may be executed by the web browser or by using an Application Programming Interface (API). Alternatively or in addition, any retrieved information herein may comprise List of Plugins, Cookies Enabled, Use of Local or Session Storage, Timezone, Screen Resolution and Color Depth, List of Fonts, Platform, 'Do-Not-Track' status, Canvas, WebGL Vendor, WebGL Renderer, Use of Ad Blocker, or any combination thereof.

Any device herein, such as any web server or the first device, may support HyperText Markup Language 5 (HTML 5), and any fingerprinting herein may comprise, or may be based on, canvas fingerprinting that may comprise identifying and tracking visitors using HTML5 canvas element. Any modifying herein from a first fingerprint to a second fingerprint may comprise modifying or forming UserAgent; Language; Color Depth; Screen Resolution; Timezone; having session storage or not; having local storage or not; having indexed DB, having IE specific 'AddBehavior', having open DB; CPU class; Platform; DoNotTrack or not; full list of installed fonts (maintaining their order, which increases the entropy), implemented with Flash; a list of installed fonts, detected with JS/CSS (side-channel technique); WebGL fingerprinting; Plugins (IE included); AdBlock installed or not; having the user tampered with its languages; having the user tampered with its screen resolution; having the user tampered with its OS; having the user tampered with its browser; touch screen detection and capabilities; Pixel Ratio; System's total number of logical processors available to the user agent; or any combination thereof. Further, any modifying herein may comprise using or executing a web browser by the first device.

Any request herein, such as the second request, may be formed or generated by modifying a header field in the first request. Further, any request herein, such as the first request, may comprises, or consists of, a Hypertext Transfer Protocol (HTTP) request or a Hypertext Transfer Protocol Secure (HTTPS) request, and any HTTP herein may be based on, may comprises, or may consist of, HTTP/1.1, HTTPS, HTTP/2, HTTP/3, or any combination thereof. Alternatively or in addition, any request herein, such as the second request, may comprise, or may consist of, a Hypertext Transfer Protocol (HTTP) request that may be formed or generated by modifying a header field in any received HTTP request. Alternatively or in addition, any request herein, such as the second request, may comprise, or may consist of, a Hypertext Transfer Protocol (HTTP) request, and wherein at least one header field is modified from the first to second HTTP requests, and any modified header field herein may comprise User-Agent field, Accept field, Content Encoding field, Content Language field, or any combination thereof.

Any device herein, such as the first device, may further store a first web browser, and any method herein may further comprise executing the stored first web browser. Any forming herein of any request, such as the second request, may use the first web browser, or may be performed as part of the executing of the stored first web browser. Any executing or launching herein of any stored first web browser may be in response to powering up of the first device, may be in response to the connecting to the Internet, may be in response to the receiving of the first request, or any combination thereof. Any web tracker herein may be based on, or may comprise, fingerprinting, and any method herein may further comprise modifying from the first fingerprint to a second fingerprint that may be different from the first fingerprint using, or as part of the executing, the first web browser. Any request such as the second request, and any device, such as the first device, may be associated with the second fingerprint, and any forming herein of the second request or any sending of the second request may be part of the modifying. Any web browser herein, such as the first web browser, may be exclusively used for the modifying from the first fingerprint to the second fingerprint. Any device herein, such as the first device, may further store an operation system, and the first web browser may be part of, or may be integrated with, the operating system.

Any method herein may be used with a second client device, and any sending herein, such as the sending of the second request, may comprises sending, by the first device to the second client device over the Internet, the second request; receiving, by the second client device from the first device over the Internet, the second request; and sending, by the second client device to the web server over the Internet, the received second request. Any sending of any received second request to any web server may use an IP address of the second client device, so that the IP address of the first device may be unknown to the web server. Any receiving herein of any content by any device, such as by the first device, from any device, such as from the web server over the Internet, may comprises sending, by the web server to the second client device over the Internet, the content; receiving, by the second client device from the web server over the Internet, the sent content; and sending, by the first device from the second client device over the Internet, the received content.

Any method herein may further comprise receiving, by the first device over the Internet, the IP address of the second client device, and any sending herein of the second request by the first device to the second client device may be in response to the receiving of the IP address of the second client device. Any method herein may further comprise sending, by the first device over the Internet, a request for the IP address of the second client device, and any receiving herein of the IP address of the second client device may be in response to the sending of the request for the IP address, and may be from the first client device or from a server device.

Any method herein may be used with a group of client devices that may include the second client device, and may further comprise selecting of the second client device from any group of client devices. The IP addresses of the client devices in any group may be stored in the first device, and any selecting herein may be by the first device. Any method herein may further comprise receiving and storing of the IP addresses of the client devices in any group, and any receiving of the IP addresses of the client devices in any group may be from the first client device or from a server device.

Alternatively or in addition, any IP addresses herein of any client devices in any group may be stored in a server device, and any selecting herein may be by the server device. Alternatively or in addition, any selecting herein may be in response to, or may use, any URL, any domain in the first request, any web-page in the first request, any web-site in the first request, or any combination thereof, or may be based on the time of the selecting or is time-based such as be based on a calendar time, that may be based on a calendar month, a week, a day of the week, an hour of a day, a minute in an hour, or any combination thereof. Alternatively or in addition, any selecting herein may use, or may be based on, an action or an event that may be external to, or may be sensed by, any device, such as the first device. Alternatively or in addition, any selecting herein may use, or may be based on, load balancing, random, quazi-random, or deterministic selection. Alternatively or in addition, any selecting herein may use, or may be based on, random selecting that uses one or more random numbers generated by a hardware-based or software-based random number generator. Alternatively or in addition, any IP addresses herein may be arranged in a sequence in the group, and any selecting herein may be based on, or may use, sequential selection, cyclic selection, Last-In-First-Out (LIFO), First-In-First-Out (FIFO) scheme, or any combination thereof.

Alternatively or in addition, any method herein may be used with a first attribute type, and any one of the tunnel devices in any group may be associated with a first value that may relate to the first attribute type, that may comprise a numeric value or an identifier of a feature, an attribute, a characteristic, or a property of the first attribute type. Any selection herein may comprise selecting based on the first value associated with the selected tunnel device.

Any attribute type herein, such as the first attribute, may comprise a geographical location, and any first value herein may comprise a name or an identifier of a continent, a country, a region, a city, a street, a ZIP code, a timezone, or any combination thereof. Any first value herein, such as any first value of each of the tunnel devices in any group, or each of the IP addresses herein, may be based on IP geolocation that may be based on W3C Geolocation API, or may be used with a database, that may be stored in a server, associating IP addresses to geographical locations. Any method herein may comprise receiving and storing, by any device, such as the server, the database, and estimating or associating the first value to each of the tunnel devices in any group by the database.

Any attribute herein, such as the first attribute, may comprise Internet Service Provider (ISP) or Autonomous System Number (ASN), and each of any values herein may respectively comprise a name or an identifier of the ISP or the ASN number. Any attribute herein, such as the first attribute, may correspond to a hardware of software of any of the tunnel devices, such as stationary or portable values, respectively based on the tunnel device being stationary or portable, or a software application installed, used, or operated, in a tunnel device, such as the type, make, model, or version of the software, or the operating system.

Any attribute herein, such as the first attribute, may correspond to a communication property or a feature of a communication link of any of the tunnel devices, such as to the respective connection to the Internet of any of the tunnel devices, or to a communication link of a tunnel device with the first device or with the web server. Any attribute herein, such as the first attribute, may correspond to a bandwidth (BW) or Round-Trip delay Time (RTT) of the communication link, and any first value herein may be the respective estimation or measurement of the BW or RTT. Any method herein may further comprise estimating or measuring, by any device, such as a server or by any tunnel device, the BW or RTT of the communication link. Alternatively or in addition, any attribute herein, such as the first attribute, may correspond to a technology or scheme used by any tunnel device for connecting to the Internet, such as wired or wireless values, respectively based on a tunnel device being connected to the Internet using wired or wireless connection.

Any method herein may be used with a group of profiles, where each of the profiles in the group may be associated with a distinct respective fingerprint data. Any web tracker herein may be based on, or may comprise, fingerprinting, and may be configured to obtain a first fingerprint of any device, such as the first device. Any method herein may further comprise selecting a profile from the group, and may further comprise using the fingerprint of the selected profile to be obtainable by the web tracker from any device, such as the first device. Any forming of the second request herein, or any sending of the second request herein, may use, or may be based on, the fingerprint of the selected profile. Any one of the profiles herein in the group may be associated with the first fingerprint, and the number of profiles in the group may be at least 2, 3, 4, 5, 6, 7, 8, 10, 12, 15, 20, 25, 30, 50, 80, 100, 120, 150, 200, 500, 1,000, 2,000, 5,000, or 10,000 profiles, or may be less than 3, 4, 5, 8, 10, 12, 15, 20, 25, 30, 50, 80, 100, 120, 150, 200, 500, 1,000, 2,000, 5,000, 10,000 or 20,000 profiles. At least one of the fingerprints of the group herein may be associated with a real time user that may be captured as part of normal operation of any device or any web browser. Further, most of, or all of, fingerprints of the group may be associated with real time users that may be captured as part of normal operation of one or more devices or web browsers.

Any pair of two fingerprints from the group, any two or more pairs of two fingerprints from the group, most of the pairs of two fingerprints from the group, or any one of the pairs of two fingerprints from the group, may be different by one or more features, properties, characteristics, or attributes of the fingerprints. Any one or more pairs of two fingerprints may be different by at least 2, 3, 4, 5, 6, 7, 8, 10, 12, 15, 20, 25, 30, 50, 80, 100, 120, 150, 200, 500, 1,000, 2,000, 5,000, or 10,000 features, properties, characteristics, or attributes of the fingerprints, or may be less than 3, 4, 5, 8, 10, 12, 15, 20, 25, 30, 50, 80, 100, 120, 150, 200, 500, 1,000, 2,000, 5,000, 10,000 or 20,000 features, properties, characteristics, or attributes of the fingerprints. Further, any one or more pairs of two fingerprints may be different in values that may be part of browser fingerprinting, canvas fingerprinting, canvas font fingerprinting, webRTC fingerprinting, audiocontext fingerprinting, cross-browser fingerprinting, or any combination thereof. Alternatively or in addition, any one or more pairs of two fingerprints may be different in values type, version, characteristics, or configuration, of a software application, of a hardware component, or of user configuration of the hardware component or the software application, that may be installed or used in the first device. Alternatively or in addition, any one or more pairs of two fingerprints may be different in passive fingerprinting, active fingerprinting, cookie-like fingerprinting, or any combination thereof. Alternatively or in addition, any modifying herein may comprise injecting a script into a network payload that may be directed to the client device, and any script herein may be overriding an application programming interface call that may be configured to collect fingerprinting information. Alternatively or in addition, any modifying herein may comprise modifying the intercepted network traffic by obfuscating a fingerprinting object that the client device may be attempting to upload to the browser fingerprinting service.

Alternatively or in addition, any one or more pairs of two fingerprints may be different in Open Systems Interconnection (OSI) model Layer-2 feature or property, OSI Layer-3 feature or property, OSI Application Layer feature or property, OSI Session Layer feature or property, or any combination thereof.

At least one of the profiles in the group may comprise a web browser. Further, the group of profiles may include at least 2, 3, 4, 5, 6, 7, 8, 10, 12, 15, 20, 25, 30, 50, 80, or 100 similar or different web browsers, or may include less than 3, 4, 5, 8, 10, 12, 15, 20, 25, 30, 50, 80, 100, 120, 150, or 200 similar or different web browsers. Alternatively or in addition, any two or more profiles may include the same web browser, or at least 2, 3, 4, 5, 6, 7, 8, 10, 12, 15, 20, 25, 30, 50, 80, or 100 profiles may include the same web browser, or wherein less than 3, 4, 5, 8, 10, 12, 15, 20, 25, 30, 50, 80, 100, 120, 150, or 200 profiles may include the same web browser. Any two profiles herein that include the same web browser may include different settings, different configurations, different user profiles, or different cookies or history, or any combination thereof. Alternatively or in addition, at least two of the profiles comprise two distinct web browsers, and any two web browsers herein may be of different types, may be from different vendors, may be different versions or updates of the same type and vendor, or any combination thereof.

Any selecting herein of any profile may be in response to the receiving of the first request, may be in response to the URL, a domain in the first request, a web-page in the first request, a web-site in the first request, or any combination thereof, or may be based on the time of the selecting or is time-based. Any method or selecting herein may further comprise periodically selecting a respective profile from any group, and may comprise using the fingerprint of the respectively selected profile to be obtainable by the web tracker from the first device. Any time period of the periodic selection may be at least 1, 2, 5, 8, 10, 12, 15, 20, 25, 30, 50, 80, 100, 120, 150, 200, 500, 1,000, 2,000, 5,000, or 10,000 milliseconds, seconds, minutes, or hours, or may be less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, or hours.

Alternatively or in addition, any selecting herein may be based on a calendar time, such as based on a calendar month, a week, a day of the week, an hour of a day, a minute in an hour, or any combination thereof. Alternatively or in addition, any selecting herein may use, or may be based on, an action or an event that may be external to, and sensed by, the first device. Alternatively or in addition, any selecting herein may use, or may be based on, load balancing, or wherein the selecting uses, or is based on, random, quazi-random, or deterministic selection. Alternatively or in addition, any selecting herein may use, or may be based on, random selecting that uses one or more random numbers generated by a random number generator. And any random number generator herein may be hardware-based that may use, or may be based on, thermal noise, shot noise, nuclear decaying radiation, photoelectric effect, or quantum phenomena. Alternatively or in addition, any random number generator may be software-based that may use, or may be based on, executing an algorithm for generating pseudo-random numbers. Any profiles herein may be arranged in a sequence in the group, and any selecting herein may be based on, or may use, sequential selection, cyclic selection, Last-In-First-Out (LIFO), First-In-First-Out (FIFO) scheme, or any combination thereof.

Any method herein may further comprise receiving, by any device, such as the first device, from any web server, a first response, that may be in response to the sending of the second request, and checking for determining whether the first response may be a proper response that may comprise the content; and responsive to determining that the first response may not be proper response, may comprise selecting and using a second profile from the group; and sending, by any device, such as the first device, to the web server, a third request that may include the URL and may use, or may be based on, a fingerprint that may be associated with the second profile. Any sending herein of any received content by the first device to the first client device may be in response to determining that the first response may be a proper response.

Any checking herein of any response, such as the first response, may comprise identifying and checking a HTTP status code that may be received in response to any sending of any request, such as the second request. Any response herein, such as the first response, may be determined as a proper response responsive to a status code of 2xx. Any response herein, such as the first response, may be determined as not being a proper response responsive to a status code of 4xx, 5xx, or a status code of HTTP 404 error message. Alternatively or in addition, any checking herein of any response, such as the first response, may comprises using a timeout mechanism, and any response herein, such as the first response, may be determined as not being a proper response in response to not receiving any response after elapsed defined time period after the sending of the second request. Alternatively or in addition, any checking herein of any response, such as the first response, may comprise checking if an URL redirection is identified in the response, and any response herein, such as the first response, may be determined as not being a proper response in response to the detecting of the URL redirection, such as by identifying by checking that the HTTP status code is 3xx Redirection.

Alternatively or in addition, any checking herein of any response, such as the first response, may comprise verifying if the content received in the first response satisfy the criterion. Any criterion herein may relate to a feature, characteristic, or type, of any content, or may comprise a value, and any response herein, such as the first response, may be determined as not being a proper response in response to comparing to the value a feature, characteristic, or type in the content received in the first response received. Alternatively or in addition, any criterion herein may comprise a value of a size of a file, and any response herein, such as the first response, may be determined as not being a proper response in response to comparing to the value the size of the received content in the first response.

Any method herein may further comprise downloading, from an application store, by a human user, the first web browser. Any web browser herein, such as the first web browser, may consists of, may comprise, or may be based on, a headless browser, Microsoft Internet Explorer, Microsoft Edge, Google Chrome, Opera™, Mozilla Firefox®, or any combination thereof. Alternatively or in addition, any web browser herein, such as the first web browser, may be a mobile web browser that consists of, comprises of, or is based on, Safari, Opera Mini™, Android web browser, or any combination thereof. Any device herein, such as the first device, may further store a second web browser that may be different from the first web browser, and any method herein may further comprise downloading, from an application store, by a human user, the second web browser, and initiating or executing the stored second web browser.

Any method herein may be used with a second client device, and any sending of the second request may comprise: sending, by the first device to the second client device over the Internet, the second request; receiving, by the second client device from the first device over the Internet, the second request; and sending, by the second client device to the web server over the Internet, the received second request. Any sending of the received second request to the web server may use an IP address of the second client device, so that the IP address of the first device may be unknown to the web server. Any receiving of the content by the first device from the web server over the Internet may comprise: sending, by the web server to the second client device over the Internet, the content; receiving, by the second client device from the web server over the Internet, the sent content; sending, by the second client device to the first device over the Internet, the received content, and receiving, by the first device from the second client device over the Internet, the received content.

Any device herein, such as the first device, may consist, or may comprise, or may be part of, a client device in a client/server architecture, and any method may further comprise storing, operating, or using an operating system, by the client device, that may be a mobile operating system that may be based on, or may comprise, Android version 2.2 (Froyo), Android version 2.3 (Gingerbread), Android version 4.0 (Ice Cream Sandwich), Android Version 4.2 (Jelly Bean), Android version 4.4 (KitKat), Android Version 5.0 or 5.1 (Lollipop), Android Version 6.0 (Marshmallow), Android Version 7.0 or 7.1 (Nougat), Android Version 8.0 or 8.1 (Oreo), Android Version 9 (Pie), Android Version 10, Android Version 11, Android Version 12, Apple iOS version 3, Apple iOS version 4, Apple IOS version 5, Apple iOS version 6, Apple iOS version 7, Apple iOS version 8, Apple iOS version 9, Apple iOS version 10, Apple iOS version 11, Apple iOS version 12, Apple iOS or iPadOS version 13, Apple iOS or iPadOS version 14, Apple IOS or iPadOS version 15, Microsoft Windows® Phone version 7, Microsoft Windows® Phone version 8, Microsoft Windows® Phone version 9, Windows® 10 Mobile, or Blackberry® operating system.

Each of the devices herein, such as any client device herein or any of the tunnel devices, may store, operate, or use, a client operating system, that may consist or, comprise of, or may be based on, Microsoft Windows 7, Microsoft Windows XP, Microsoft Windows 8, Microsoft Windows 8.1, Microsoft Windows 10, Microsoft Windows 11, Linux, or Google Chrome OS. The client operating system may be a mobile operating system, such as Android version 2.2 (Froyo), Android version 2.3 (Gingerbread), Android version 4.0 (Ice Cream Sandwich), Android Version 4.2 (Jelly Bean), Android version 4.4 (KitKat), Android Version 5.0 or 5.1 (Lollipop), Android Version 6.0 (Marshmallow), Android Version 7.0 or 7.1 (Nougat), Android Version 8.0 or 8.1 (Oreo), Android Version 9 (Pic), Android Version 10, Android Version 11, Android Version 12, Apple iOS version 3, Apple iOS version 4, Apple iOS version 5, Apple IOS version 6, Apple iOS version 7, Apple iOS version 8, Apple IOS version 9, Apple IOS version 10, Apple iOS version 11, Apple iOS version 12, Apple IOS or iPadOS version 13, Apple IOS or iPadOS version 14, Apple IOS or iPadOS version 15, Microsoft Windows® Phone version 7, Microsoft Windows® Phone version 8, Microsoft Windows® Phone version 9, Windows® 10 Mobile, or Blackberry® operating system. Any Operating System (OS) herein, such as any server or client operating system, may consist of, include, or be based on a real-time operating system (RTOS), such as FreeRTOS, SafeRTOS, QNX, VxWorks, or Micro-Controller Operating Systems (μC/OS).

Any device herein, such as any client device herein, may be housed in a single enclosure that may be a hand-held enclosure or a portable enclosure, and may consist of, may comprise, may be part of, or may be integrated with, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone. Any smartphone herein may comprise, or may be based on, an Apple iPhone (e.g., Apple iPhone 6, iPhone 6 Plus, iPhone 6S, iPhone 6S Plus, iPhone SE (any generation), iPhone 7, iPhone 7 Plus, iPhone 8, iPhone 8 Plus, iPhone X, iPhone XR, iPhone XS, iPhone XS Max, iPhone 11, iPhone 11Pro, iPhone 11 Pro Max, iPhone 12, iPhone 12 Mini, iPhone 12 Pro, iPhone 12 Pro Max, iPhone 13, iPhone 13 Mini, iPhone 13 Pro, iPhone 13 Pro Max) or a Samsung Galaxy (e.g., of the S, Z, A, M, F, or XCover series).

Any device here, such as the first device, may comprise, or may consist of, or may be integrated with, a server device, which may store, operate, or use, a server operating system that may be based on, comprise, or use, Microsoft Windows Server®, Linux, or UNIX, such as Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®. Alternatively or in addition, any server device herein may consist of, may include, may be part of, or is integrated with, a proxy server, which may consist of, may include, may be part of, or may be integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a SOCKS proxy server, a CGI web proxy server, a suffix proxy server, an I2P anonymous proxy server, a DNS proxy server, or any combination thereof.

Alternatively or in addition, any server device herein may be virtualized by virtualization executed as part of a Virtual Machine (VM), and may be used with a host computer that may implement the VM, and any method herein may further comprise executing, by the host computer, a hypervisor or a Virtual Machine Monitor (VMM). Any virtualization herein may include, may be based on, or may use, full virtualization, para-virtualization, or hardware assisted virtualization. Alternatively or in addition, any server device herein may be a cloud-based server that may be implemented as an Infrastructure as a Service (IaaS) or as a Software as a Service (SaaS) by a public cloud-based service, such as provided by Amazon Web Services® (AWS®), Microsoft® Azure™, or Google® Compute Engine™ (GCP).

Any device herein, such as the first device or any tunnel device herein, may be integrated in part or entirely in an appliance, and a primary function of the appliance may be associated with food storage, handling, or preparation. The primary function of the appliance may be heating food, and the appliance may be a microwave oven, an electric mixer, a stove, an oven, or an induction cooker. Alternatively or in addition, the appliance may be a refrigerator, a freezer, a food processor, a dishwasher, a food blender, a beverage maker, a coffeemaker, or an iced-tea maker. Further, the primary function of the appliance may be associated with environmental control, and the appliance may consist of, or may be part of, an HVAC system. Alternatively or in addition, the primary function of the appliance may be associated with temperature control, and the appliance may be an air conditioner or a heater. Further, the primary function of the appliance may be associated with cleaning, the primary function may be associated with clothes cleaning, and the appliance may be a washing machine or a clothes dryer, or the appliance may be a vacuum cleaner. Alternatively or in addition, the primary function of the appliance may be associated with water control or water heating. Further, the appliance may be an answering machine, a telephone set, a home cinema method, a HiFi method, a CD or DVD player, an electric furnace, a trash compactor, a smoke detector, a light fixture, or a dehumidifier. Alternatively or in addition, the appliance may be a battery-operated portable electronic device, such as a notebook, a laptop computer, a media player, a cellular phone, a Personal Digital Assistant (PDA), an image processing device, a digital camera, a video recorder, or a handheld computing device.

Any integration herein, such as with any appliance or any communication device (such as a router, a firewall, or a gateway), may involve sharing a component, such as housing in the same enclosure, sharing the same processor, or mounting onto the same surface. Further, any integration herein may involve sharing a same connector, such as a power connector for connecting to a power source, and the integration may involve sharing the same connector for being powered from the same power source, or the integration may involve sharing the same power supply.

Any apparatus or device herein, such as the first device, any one or more of the client devices, or any one of the tunnel devices, may consist of, may comprise, may be integrated with, or may be part of, a wearable device that may be wearable on a person. Any wearable device herein may be wearable on an organ of the person's head, such as an eye, ear, face, cheek, nose, mouth, lip, forehead, or chin. Alternatively or in addition, any wearable device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any wearable device herein may be shaped for permanently or releasably being attachable to, or be part of, a clothing piece of a person, and any attaching herein may use taping, gluing, pinning, enclosing, encapsulating, a pin, or a latch and hook clip. Any clothing piece herein may be a top, bottom, or full-body underwear, or a headwear, a footwear, an accessory, an outwear, a suit, a dress, a skirt, or a top. Alternatively or in addition, any wearable device herein may further comprises an annular member defining an aperture therethrough that is sized for receipt therein of a part of a human body. Any human body part herein may be any part of a human hand that consists of, or comprises, an upper arm, elbow, forearm, wrist, or a finger. Further, any human body part herein may be part of a human head or neck that may consist of, or may comprise, a forehead, ear, skull, or face. Alternatively or in addition, any human body part herein may be part of a human thorax or abdomen that may consist of, or may comprise, a waist or hip. Further, any human body part herein may be part of a human leg or foot that may consist of, or may comprise, a thigh, calf, ankle, instep, knee, or toe.

Any first device herein may be used for serving as an intermediate device between a first server and web servers for fetching multiple web-pages that may be identified by respective multiple Uniform Resource Locators (URLs) and may be stored in respective multiple web servers. The first device may further be used with an Internet-connected managing server that may be connected to, or may comprises, a database. Any first device herein may be configured to be in distinct activation, operation, and non-operation states and may comprise a single enclosure, and in the single enclosure may comprise no more than a one communication port for connecting to a communication medium; no more than one transceiver or modem coupled to the communication port for transmitting to, and receiving from, the communication medium, for communication over the Internet via the communication medium; a processor; and a non-transitory computer readable medium having computer executable instructions stored thereon.

When the instructions are executed by the processor, the first device in the operation state may be configured to execute steps of receiving, over the Internet by the communication port from the first server, the multiple URLs; for each of the multiple URLs, sending, over the Internet by the communication port to the respective web server that stores the respective web-page identified by the URL, the received URL; for each of the URLs, receiving, over the Internet by the communication port from the respective web server, the respective web-page; and for each of the URLs, sending, over the Internet by the communication port to the first server, the received respective web-page. The primary (or exclusive) function of any first device herein may be to execute the steps, or the exclusive function of the first device may be to execute the steps.

Any server herein, such as the first server or the managing server, may be a cloud-based server that may be implemented as an Infrastructure as a Service (IaaS) or as a Software as a Service (SaaS) by a public cloud-based service, such as those that may be provided by Amazon Web Services® (AWS®), Microsoft® Azure™, or Google® Compute Engine™ (GCP).

Any first device herein may be further configured for Operations, Administration, registration, or Management (OA&M) functions that may be exclusively or primarily associated with executing the steps, and any OA&M functions may comprise registration, operation, monitoring, maintenance, support, collecting performance data, collecting accounting data, or any combination thereof. All of the hardware elements in the single enclosure may be primary or exclusively for executing the steps, and all the steps or instructions stored in the non-transitory computer readable medium may be primary or exclusively for executing the steps. At least part of any computer instructions herein may be integrated or included in a Software Development Kit (SDK). The first server and the managing server may be distinct servers, or may be the same server. Any first device herein may further comprise a visual indicator that may be coupled to the processor for indicating in response to the first device status, and any visual indicator herein may comprise a Light Emitting Diode (LED).

Any communication medium herein may comprise a Local Area Network (LAN) cable, any communication port herein may comprise a LAN connector, and any transceiver herein may be a LAN transceiver. Any LAN herein may be a wired LAN that may be according to, may be compatible with, or may be based on, IEEE 802.3-2008 standard, and may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T. Any LAN connector herein may comprise a RJ-45 type connector. Alternatively or in addition, any LAN herein may be a fiber-optics medium LAN that may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and any LAN connector herein may comprise a fiber-optic connector.

Any first device herein may further comprise a non-volatile memory that may store an identifier for uniquely identifying the first device over the communication medium, in a LAN, in a WLAN, or over the Internet, and any identifier herein may comprise a Media Access Control (MAC) address that may be MAC-48, Extended Unique Identifier (EUI) EUI-48, or EUI-64 address type, an Internet Protocol (IP) address that may be IPv4 or IPv6 type address, or a hostname.

Alternatively or in addition, any communication medium herein may comprise over-the-air wireless network, any communication port herein may comprise one or more antennas for transmitting and receiving Radio-Frequency (RF) signals over the air, and any transceiver herein may comprise a wireless transceiver. Any wireless network herein may be a Wireless Wide Area Network (WWAN), such as a wireless broadband network, any wireless transceiver herein may be a WWAN transceiver, and any antenna herein may be a WWAN antenna. Any wireless network herein may be a WiMAX network, any antenna herein may be a WiMAX antenna, any wireless transceiver herein may be a WiMAX modem, and any WiMAX network herein may be according to, may be compatible with, or may be based on, IEEE 802.16-2009.

Any wireless network herein may be a cellular telephone network, that may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution, or any cellular telephone network herein may use a protocol selected from the group consisting of a Fourth Generation (4G) network that may use HSPA+, Mobile WiMAX, LTE, LTE-Advanced, MBWA, or may be based on IEEE 802.20-2008, any antenna herein may be a cellular antenna, and any wireless transceiver herein may be a cellular modem.

Any wireless network herein may be a Wireless Personal Area Network (WPAN), that may be according to, may be compatible with, or may be based on, Bluetooth™, Bluetooth Low Energy (BLE), or IEEE 802.15.1-2005 standards, or any WPAN herein may be a wireless control network that may be according to, or may be based on, Zigbee™, IEEE 802.15.4-2003, or Z-Wave™ standards, any wireless transceiver herein may be a WPAN transceiver, and any antenna herein may be a WPAN antenna.

Any wireless network herein may be a Wireless Local Area Network (WLAN), that may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.1 lac, any wireless transceiver herein may be a WLAN transceiver, and any antenna herein may be a WLAN antenna. Alternatively or in addition, any wireless network herein may be over a licensed or unlicensed radio frequency band, and any wireless network herein may be over the unlicensed radio frequency band that may be an Industrial, Scientific and Medical (ISM) radio band.

The first device herein may further comprise in the single enclosure a primary or rechargeable battery for powering the first device, or alternatively or in addition may comprise in the single enclosure a single power connector for connecting to an Alternating Current (AC) power source or to a Direct Current (DC) power source for powering the first device. Any AC power source herein may comprise mains AC power, and the single power connector may comprise an AC power connector for connecting to an AC mains power outlet.

Any first device herein may be used with an industry standard bus that may define a point-to-point serial communication over a cable between host computer and peripheral, that may be according to, or may be based on, a Universal Standard Bus (USB), that may be according to, or may be based on, USB 2.0 or USB 3.0, the power connector comprises a USB connector, the cable may carry DC power, and the power connector may comprise a bus connector for connecting to the bus cable to be powered from the power.

Any communication medium herein may be connectable to simultaneously carry a DC or AC power signal and a communication signal, and any first device herein may be configured to be powered by the respective DC or AC power signal via the communication port. Alternatively or in addition, any communication port herein may comprise a LAN connector, any communication medium herein may comprise a LAN cable that may be connectable to simultaneously carry a DC or AC power signal and a communication signal, and any first device herein may be configured to be powered by the respective DC or AC power signal via the LAN connector.

Any power signal herein may be carried over dedicated power wires in the LAN cable, and the power wires may be distinct from the wires in the cable carrying the LAN communication signal. Alternatively or in addition, any power signal herein and any LAN communication signal herein may be concurrently carried over same wires in the cable, and any first device herein may further comprise in the single enclosure a power/data splitter arrangement connected between the LAN transceiver or modem and the LAN connector for separating the signals.

Any power and LAN communication signals herein may be carried using Frequency Division Multiplexing (FDM), the power signal may be carried over a power signal frequency or a power frequency band, and the communication signal may be carried over a frequency band above and distinct from the power signal frequency or the power frequency band. Any power/data splitter herein may comprise an HPF between the first and second ports and a LPF between the first and third ports, or any power/data splitter herein may comprise a transformer and a capacitor connected to the transformer windings. Any power and digital data signals herein may be carried using a phantom scheme, and any power/data splitter herein may comprise at least two transformers having a center-tap connection. Alternatively or in addition, any power and LAN communication signals herein may be carried based on, or may be according to, Power-over-Ethernet (POE) standard where the first device serves as a powered device (PD) and the router serves as a Power Sourcing Equipment (PSE). Any Power-over-Ethernet (POE) standard herein may be based on, or may be according to, IEEE 802.3af-2003, IEEE 802.3at-2009, IEEE 802.3-2012, IEEE 802.3bu-2016, IEEE 802.3bt-2018 standard, Alternative A, Alternative B, 4PPoE, 100BASE-T1, 1000BASE-T1, or any combination thereof.

Any first device herein may be used with a user that may operate a user computer, for receiving, by the user computer, OA&M data, or sending, by the user computer, OA&M data, and may be used with an industry standard bus that may define a point-to-point serial communication over a cable between host computer and peripheral. Any first device herein may comprise in the single enclosure no more than one bus connector for connecting to the user computer over the bus. Any industry standard bus herein may be according to, or may be based on, a Universal Standard Bus (USB) that may be according to, or may be based on, USB 2.0 or USB 3.0, and any bus connector herein may comprise a USB connector.

Any first device herein may be in combination with the managing server, may further comprise a memory that stores an IP address or hostname of the managing server, and may be configured to shifting to, or staying in, the activation state in response to a powering up of the first device. Any first device herein may be configured for, when in the activation state: connecting, by the first device to the Internet, via the communication port using the transceiver; sending, by the first device to the managing server over the Internet, in response to connecting to the Internet, the identifier, using the stored IP address or hostname of the managing server; receiving, by the managing server from the first device over the Internet, the sent identifier; adding, by the managing server to the database, the identifier of the first device; adding, by the managing server to the database, the stored first device identifier with the IP address of the first device; sending, by the managing server to the first device over the Internet, an activation message; receiving, by the first device from the managing server over the Internet, the activation message; and shifting, by the first device, to the operation state, in response to the receiving of the activation message. Any first device or method herein may be configured for adding and associating, by the managing server in the database, in response to the receiving of the sent identifier, a time associated with the receiving of the sent identifier by the managing server, and associating the time with the first device identifier in the database.

A system may comprise any first device herein, the managing server, and a user computer operated by a user, and any device herein, such as the first device, may be further configured for notifying the user by sending a notification message to the user computer in response to the receiving of the sent identifier. Any notifying herein may comprise sending over the Internet by the transceiver via the communication port over the communication medium, or may comprise sending over the Internet via a wireless network to the user computer using a peer-to-peer scheme. Any notifying herein may comprise sending over the Internet to an Instant Messaging (IM) server for being sent to the user computer as part of an IM service. Any communication herein with the IM server may use, may be compatible with, or may be based on, a protocol selected from the group consisting of SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), and Hypertext Transfer Protocol (HTTP).

Any notification message herein may be a text-based message and the IM service may be a text messaging service. Alternatively or in addition, any notification message herein may be according to, or may be based on, message selected from the group consisting of a Short Message Service (SMS) message and the IM service may be a SMS service, an electronic-mail (e-mail) message and the IM service may be an e-mail service, a WhatsApp message and the IM service may be a WhatsApp service, a Twitter message and the IM service may be a Twitter service, and a Viber message and the IM service may be a Viber service. Alternatively or in addition, any notification message herein may be according to, or may be based on, a Multimedia Messaging Service (MMS) or an Enhanced Messaging Service (EMS) message that may include audio or video, and the IM service may be an NMS or EMS service.

Any first device herein may further comprise a first list of servers that may include the managing server, stored in the computer readable medium, and any first device herein may be configured for communicating, when in the activation state, only with a server in the first list. Any first device herein may be configured for selecting the managing server from the first list, that may comprise IP addresses of the servers, when in the activation state. The first list may comprise domain names of the servers, and any first device herein may further be configured for accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers.

Any first device herein may comprise a first list of servers, that may include the first server stored in the computer readable medium, the list may comprise IP addresses of the servers or domain names of the servers, and any first device herein may further be configured for receiving, when in operation state, the URLs only from the first server or only from the first list. Any first device herein may further be configured for accessing a Domain Name System (DNS) server for resolving one or more domain names from the first list to respective one or more IP addresses. The first list may comprise at least 1, 2, 3, 5, 10, 20, 30, 50, or 100 servers, or may comprise less than 2, 3, 5, 10, 20, 30, 50, 100, or 200 servers. Any first device herein may be configured for receiving from the managing server when in the activation state the first list to be stored therein.

A system may comprise multiple devices, each according to any of the first devices herein, and multiple routers, and the number of the first devices may be at least 1, 2, 5, 10, 12, 15, 20, 25, 30, 50, 80, 100, 120, 150, 200, 500, 1,000, 2,000, 5,000, 10,000, 20,000, 50,000, 100,000, 200,000, 500,000 or 1,000,000, or wherein the number of first devices may be at most 2, 5, 10, 12, 15, 20, 25, 30, 50, 80, 100, 120, 150, 200, 500, 1,000, 2,000, 5,000, 10,000, 20,000, 50,000, 100,000, 200,000, 500,000 1,000,000, or 2,000,000. Two or more first devices may be connected to the same router.

Alternatively or in addition, the communication over the Internet with any device herein, such as the first device, may be based on, may use, or may be compatible with, Socket Secure (SOCKS) protocol or connection, and any server herein may serve as an SOCKS server and the first device may serve as an SOCKS client. The SOCKS protocol or connection may be according to, may be based on, or may be compatible with, SOCKS4, SOCKS4a, SOCKS5, IETF RFC 1928, IETF RFC 1929, IETF RFC 1961, or IETF RFC 3089. Alternatively or in addition, any communication over the Internet with the first device, may be based on, may use, or may be compatible with, Socket Secure (SOCKS) or WebSocket (ws), which may be WebSocket Secure (wss), protocol or connection, and the second server may serve as an WebSocket server and the selected tunnel device may serve as an WebSocket client. Any WebSocket protocol or connection herein may be according to, may be based on, or may be compatible with, IETF RFC 6455. Alternatively or in addition, the communication over the Internet with the first or second server, may be based on, may use, or may be compatible with, HTTP Proxy protocol or connection, and any server herein may serve as an HTTP Proxy server and the first device may serve as an HTTP Proxy client.

Any communication herein, such as over the Internet between the client device and any other device, such as the first device, or between any devices herein, such as the first device and the web server, may be based on, may use, or may be compatible with, Hypertext Transfer Protocol (HTTP) or Hypertext Transfer Protocol Secure (HTTPS) protocol or connection, and any HTTP herein may be based on, may comprises, or may consist of, HTTP/1.1, HTTPS, HTTP/2, HTTP/3, or any combination thereof. Any client device herein may serve as an HTTP or HTTPS client, and any first device herein may serve as an HTTP or HTTPS client. Alternatively or in addition, any first device herein may serve as an HTTP or HTTPS server, and further any message herein, or any response herein, may be an HTTP or HTTPS message. Any content herein may comprise, or may consist of, a web-page or a web-site that may include, may consist of, or may comprise, a part or whole of files, text, numbers, audio, voice, multimedia, video, images, music, or computer program.

At least one of, or each one of, the devices in any group herein may be a client device. Any method herein may be used with a virtualization, and at least one of, or each one of, any devices herein, such as the devices in the group, may be a client device that may consist of, may comprise, may be part of, or may be integrated with, a server device that may virtualize a client device addressed by the selected IP address. Alternatively or in addition, at least one of, or each one of, the devices in any group herein may be a client device that may be housed in a single enclosure that may be a hand-held enclosure or a portable enclosure. Alternatively or in addition, at least one of, or each one of, the devices in any group herein may be a client device that may be integrated in part or entirely in an appliance. Alternatively or in addition, at least one of, or each one of, the devices in any group herein may consist of, may comprise, may be integrated with, or may be part of, a wearable device that may be wearable on a person. Alternatively or in addition, at least one of, or each one of, the devices in any group herein may be a client device that may consist of, may comprise, may be part of, or may be integrated with, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone. Alternatively or in addition, at least one of, or each one of, the devices in any group herein may consist of, may comprise, may be part of, or may be integrated with, a smartphone that may comprise, or may be based on, Apple iPhone (e.g., Apple iPhone 6, iPhone 6 Plus, iPhone 6S, iPhone 6S Plus, iPhone SE (any generation), iPhone 7, iPhone 7 Plus, iPhone 8, iPhone 8 Plus, iPhone X, iPhone XR, iPhone XS, iPhone XS Max, iPhone 11, iPhone 11Pro, iPhone 11 Pro Max, iPhone 12, iPhone 12 Mini, iPhone 12 Pro, iPhone 12 Pro Max, iPhone 13, iPhone 13 Mini, iPhone 13 Pro, iPhone 13 Pro Max) or a Samsung Galaxy (e.g., of the S, Z, A, M, F, or XCover series).

Alternatively or in addition, at least one of, or each one of, the devices in any group herein may be a client device, and any method herein may further comprise storing, operating, or using an operating system. Any operating system herein may be a mobile operating system that may be based on, or may comprise, Android version 2.2 (Froyo), Android version 2.3 (Gingerbread), Android version 4.0 (Ice Cream Sandwich), Android Version 4.2 (Jelly Bean), Android version 4.4 (KitKat), Android Version 5.0 or 5.1 (Lollipop), Android Version 6.0 (Marshmallow), Android Version 7.0 or 7.1 (Nougat), Android Version 8.0 or 8.1 (Oreo), Android Version 9 (Pie), Android Version 10, Android Version 11, Android Version 12, Apple IOS version 3, Apple iOS version 4, Apple IOS version 5, Apple iOS version 6, Apple iOS version 7, Apple iOS version 8, Apple iOS version 9, Apple iOS version 10, Apple iOS version 11, Apple iOS version 12, Apple IOS or iPadOS version 13, Apple iOS or iPadOS version 14, Apple IOS or iPadOS version 15, Microsoft Windows® Phone version 7, Microsoft Windows® Phone version 8, Microsoft Windows® Phone version 9, Windows® 10 Mobile, or Blackberry® operating system.

Any selection herein, such as selection of an IP address from a list or selecting a device from a group of devices, may be based on, or may use, load balancing or random selection. Any random selection herein may use, or may be based on, one or more random numbers generated by a random number generator. Any random number generator herein may be hardware based, and may be using thermal noise, shot noise, nuclear decaying radiation, photoelectric effect, or quantum phenomena. Alternatively or in addition, any random number generator herein may be software based, and may be based on executing an algorithm for generating pseudo-random numbers.

Any selection herein, such as selection of an IP address from any list herein or selecting of any device from any group of devices herein, may be based on, or may use, an estimated geographical location of any device, such as the client device or of the web server. Any method herein may further comprise estimating the geographical location of the client device or of the web server using geolocation, and any geolocation herein may be based on IP geolocation or on W3C Geolocation Application Programming Interface (API). Alternatively or in addition, any selection herein, such as selection of an IP address from a list or selecting a device from a group of devices, may be based on estimating as being associated to being in the same area as the client device or the web server, such as being in the same continent, country, state, region, city, postal/zip code, latitude, longitude, or Timezone as the client device or the web server. Alternatively or in addition, any selection herein, such as selection of an IP address from a list or selecting a device from a group of devices, may be based on being the recent one to be selected, or based on being the least recent to be selected, manually selected by a user.

Any device herein, such as the first device or the client device, may comprise, may be part of, or may consist of, a client device in a client/server architecture, and may be housed in a single enclosure that may be a hand-held enclosure or a portable enclosure. Alternatively or in addition, any device herein, such as the first device or the client device, may consist of, may comprise, may be part of, or may be integrated with, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone. Alternatively or in addition, any device herein, such as the first device or the client device, may consist of, may comprise, may be part of, or may be integrated with a smartphone that may comprise, or may be based on, an Apple iPhone 6 or a Samsung Galaxy S6. Any method herein may further comprise, by any device such as the first device, storing, operating, or using an operating system, that may be a mobile operating system, such as Android version 2.2 (Froyo), Android version 2.3 (Gingerbread), Android version 4.0 (Ice Cream Sandwich), Android Version 4.2 (Jelly Bean), Android version 4.4 (KitKat)), Android Version 5.0 or 5.1 (Lollipop), Android Version 6.0 (Marshmallow), Android Version 7.0 or 7.1 (Nougat), Android Version 8.0 or 8.1 (Oreo), Android Version 9 (Pic), Android Version 10, Android Version 11, Android Version 12, Apple iOS version 3, Apple IOS version 4, Apple iOS version 5, Apple IOS version 6, Apple IOS version 7, Apple iOS version 8, Apple iOS version 9, Apple IOS version 10, Apple iOS version 11, Apple IOS version 12, Apple IOS or iPadOS version 13, Apple IOS or iPadOS version 14, Apple iOS or iPadOS version 15, Microsoft Windows® Phone version 7, Microsoft Windows® Phone version 8, Microsoft Windows® Phone version 9, Windows® 10 Mobile, or Blackberry® operating system.

Any device herein, such as the first device or the client device, may be integrated in part or entirely in an appliance. A primary functionality of any appliance herein may be associated with food storage, handling, or preparation. A primary functionality of any appliance herein may be heating food, and any appliance herein may be a microwave oven, an electric mixer, a stove, an oven, or an induction cooker. Alternatively or in addition, any appliance herein may be a refrigerator, a freezer, a food processor, a dishwasher, a food blender, a beverage maker, a coffeemaker, or an iced-tea maker. Alternatively or in addition, a primary functionality of any appliance herein may be associated with environmental control, and any appliance herein may consist of, or may be part of, an HVAC system. Alternatively or in addition, a primary functionality of any appliance herein may be associated with temperature control, and any appliance herein may be an air conditioner or a heater. Alternatively or in addition, a primary functionality of any appliance herein may be associated with cleaning, such as clothes cleaning, and any appliance herein may be a washing machine, a clothes dryer, or a vacuum cleaner. Alternatively or in addition, a primary functionality of any appliance herein may be associated with water control or water heating. Alternatively or in addition, any appliance herein may be an answering machine, a telephone set, a home cinema method, a HiFi method, a CD or DVD player, an electric furnace, a trash compactor, a smoke detector, a light fixture, or a dehumidifier. Alternatively or in addition, any appliance herein may be a battery-operated portable electronic device, such as a notebook, a laptop computer, a media player, a cellular phone, a Personal Digital Assistant (PDA), an image processing device, a digital camera, a video recorder, or a handheld computing device.

Any integration herein may involve sharing a component, such as housing in same enclosure, sharing same processor, or mounting onto same surface. Any integration herein may involve sharing a same connector, and any connector herein may be a power connector for connecting to a power source, and any integration herein may involve sharing the same connector for being powered from same power source, or sharing same power supply.

Any method herein may further comprise, by any device such as the first device or the client device, storing, operating, or using, by, a client operating system that may consist of, may comprise, or may be based on, one out of Microsoft Windows 7, Microsoft Windows XP, Microsoft Windows 8, Microsoft Windows 8.1, Microsoft Windows 10, Microsoft Windows 11, Linux, and Google Chrome OS. Any client operating system herein may be a Real-Time Operating System (RTOS), such as FreeRTOS, SafeRTOS, QNX, VxWorks, or Micro-Controller Operating Systems (µC/OS).

Any device herein, such as the first device, may consist of, may comprise, may be part of, or may be integrated with, a server device, which may consist of, may include, may be part of, or may be integrated with, a proxy server. Any proxy server herein may consist of, may include, may be part of, or may be integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a SOCKS proxy server, a CGI web proxy server, a suffix proxy server, an I2P anonymous proxy server, a DNS proxy server, or any combination thereof.

Any method herein may be used use with a virtualization, and any device herein, such as the first device or the client device, may consist of, may comprise, may be part of, or may be integrated with, a server device that may virtualize any client device herein, such as addressed by any selected IP address. Any device virtualization herein, such as any client device virtualization, may be executed as part of a Virtual Machine (VM). Any method herein may be used with a host computer that may implement the VM, and any method herein may further comprise executing, by the host computer, a hypervisor or a Virtual Machine Monitor (VMM). Any virtualization herein may include, may be based on, or may use, full virtualization, para-virtualization, or hardware assisted virtualization.

Any communication over the Internet over any two devices herein, such as between the client device and the first device, or between the first device and the web server, may be based on, may use, or may be compatible with, Socket Secure (SOCKS) protocol or connection, and any device herein, such as any server, may serve as an SOCKS server and any other device herein, such as any selected device, may serve as an SOCKS client. Any SOCKS protocol or connection herein may be according to, may be based on, or may be compatible with, SOCKS4, SOCKS4a, or SOCKS5. Further any SOCKS protocol or connection herein may be according to, may be based on, or may be compatible with, IETF RFC 1928, IETF RFC 1929, IETF RFC 1961, or IETF RFC 3089. Alternatively or in addition, any communication over the Internet over any two devices herein, such as between the client device and the first device, or between the first device and the web server, may be based on, may use, or may be compatible with, WebSocket (ws) or WebSocket Secure (wss) protocol or connection.

Any method herein may be used with any web browser, and may further comprise identifying, in or by the client device, the URL request by the web browser; sending, by the client device to the first device, the URL request; and receiving, by the client device, the content or an error message from the first device. Further, any method herein may further comprise using, by the web server in the client device, the content in response to receiving of the content from the first device, and displaying, by the web server in the client device or in any other device herein, the content to a user. Any method herein may further comprise, by any device such as the client device, notifying to a user of the client device, or displaying a notification to the user, in response to receiving of the error message from any device, such as from the first device.

Any method herein may further comprise, by any device herein such as the client device or the first device, storing, operating, or using, a web browser. Any web browser herein may consist of, may comprise, or may be based on, Microsoft Internet Explorer, Microsoft Edge, Google Chrome, Opera™, or Mozilla Firefox®. Any web browser herein may consist of, may comprise, or may be based on, a mobile web browser, which may consist of, may comprise, or may be based on, Safari, Opera Mini™, or Android web browser.

Any step herein, such as any identifying herein, may be performed as part of a plug-in or an extension integrated with the web browser. At least one of the steps performed by any device herein, such as the client device, may be integrated with the web browser in a form of a plug-in or an extension. Any identifying herein, such as of the first URL request, may use a plug-in or an extension to the web browser. Any integration herein may be by hooking to the web browser, or any integration herein may in a filter driver form, or, any web browser herein and any steps herein may be communicating using an Inter-Process Communication (IPC). Any identifying herein, such as of the first URL request, may use hooking to the web browser, may be in a filter driver form, or may use an Inter-Process Communication (IPC), which may use a file sharing, a signal, a socket, a pipe, a message queue, a shared memory, a semaphore, memory mapped file, a clipboard, a Component Object Model (COM), a data copy, a DDE protocol, or mailslots.

Any client device herein, or at least one of, or each one of, any devices in the group, may consist of, may comprises, is integrated with, or may be part of, a wearable device that may be wearable on a person. Any wearable device herein may be wearable on an organ of the person head, and the organ may be an eye, car, face, check, nose, mouth, lip, forehead, or chin.

Any wearable device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Any wearable device herein may be shaped for permanently or releasably being attachable to, or be part of, a clothing piece of a person, and the attaching may use taping, gluing, pinning, enclosing, encapsulating, a pin, or a latch and hook clip. Any clothing piece herein may be a top, bottom, full-body underwear, a headwear, a footwear, an accessory, an outwear, a suit, a dress, a skirt, or a top. Any clothing piece herein may comprise an annular member defining an aperture therethrough that may be sized for receipt therein of a part of a human body.

Any method herein may further comprise storing, operating, or using, by the first device or by any one or more of any of the devices herein, a client operating system, that may consist of, may comprise, or may be based on, Microsoft Windows 7, Microsoft Windows XP, Microsoft Windows 8, Microsoft Windows 8.1, Microsoft Windows 10, Microsoft Windows 11, Linux, or Google Chrome OS. Any client operating system herein may be a Real-Time Operating System (RTOS), such as FreeRTOS, SafeRTOS, QNX, VxWorks, or Micro-Controller Operating Systems (µC/OS).

At least one of, or each one of, the devices in the group, may consist of, may comprise, may be part of, or may be integrated with, a server device in a server/architecture, and the server device may consist of, may include, may be part of, or may be integrated with, a proxy server. Any proxy server herein may consist of, may include, may be part of, or may be integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a SOCKS proxy server, a CGI web proxy server, a suffix proxy server, an I2P anonymous proxy server, a DNS proxy server, or any combination thereof.

Any selecting herein of any IP address from any list may comprise selecting a list from the multiple distinct lists; and selecting an IP address from the selected list. Any selecting of any IP address from any selected list may be based on load balancing, and may be based on, or may be using, random, quazi-random, or deterministic selection. Alternatively or in addition, any selecting of any list from any multiple distinct lists or any selecting of any IP address from any selected list, may be based on, or may use, random selecting, that may use one or more random numbers generated by a random number generator. Any random number generator herein may be hardware based, and may be using thermal noise, shot noise, nuclear decaying radiation, photoelectric effect, or quantum phenomena. Alternatively or in addition, any random number generator herein may be software based, and may be based on executing an algorithm for generating pseudo-random numbers. Further, any selecting of any list from any multiple distinct lists or any selecting of any IP address from any selected list may be based on, or may use, Last-In-First-Out (LIFO) or First-In-First-Out (FIFO) scheme. Alternatively or in addition, any selecting herein of any IP address from any selected list may be based on, or may be using, sequential or cyclic selection. Any message herein, such as the first message, may comprise a criterion, and any selecting herein of any list from any multiple distinct lists may be based on, may be using, or may be in response to, the criterion. Any selecting herein of any list from any multiple distinct lists may be based on load balancing. Alternatively or in addition, any selecting herein of any list from any multiple distinct lists may be based on, or may be using, random selection, sequential, or cyclic selection.

Any network data link layer or any physical layer signaling herein may be according to, may be based on, may be using, or may be compatible with, ISO 11898-1:2015 or On-Board Diagnostics (OBD) standard. Any network medium access herein may be according to, may be based on, may be using, or may be compatible with, ISO 11898-2:2003 or On-Board Diagnostics (OBD) standard. Any network herein may be in-vehicle network such as a vehicle bus, and may employ, may use, may be based on, or may be compatible with, a multi-master, serial protocol using acknowledgement, arbitration, and error-detection schemes. Any network or vehicle bus herein may employ, may use, may be based on, or may be compatible with, a synchronous and frame-based protocol, and may further consist of, may employ, may use, may be based on, or may be compatible with, a Controller Area Network (CAN), that may be according to, may be based on, may use, or may be compatible with, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), or SAE J2411_200002 standards. Any CAN herein may be according to, may be based on, may use, or may be compatible with, Flexible Data-Rate (CAN FD) protocol.

Alternatively or in addition, any network or vehicle bus herein may consist of, may employ, may use, may be based on, or may be compatible with, a Local Interconnect Network (LIN), which may be according to, may be based on, may use, or may be compatible with, ISO 9141-2:1994, ISO 9141:1989, ISO 17987-1, ISO 17987-2, ISO 17987-3, ISO 17987-4, ISO 17987-5, ISO 17987-6, or ISO 17987-7 standard. Alternatively or in addition, any network or vehicle bus herein may consist of, may employ, may use, may be based on, or may be compatible with, FlexRay protocol, which may be according to, may be based on, may use, or may be compatible with, ISO 17458-1:2013, ISO 17458-2:2013, ISO 17458-3:2013, ISO 17458-4:2013, or ISO 17458-5:2013 standard. Alternatively or in addition, any network or vehicle bus herein may consist of, may employ, may use, may be based on, or may be compatible with, Media Oriented Systems Transport (MOST) protocol, which may be according to, may be based on, may use, or may be compatible with, MOST25, MOST50, or MOST150.

Any vehicle herein may be a ground vehicle adapted to travel on land, such as a bicycle, a car, a motorcycle, a train, an electric scooter, a subway, a train, a trolleybus, and a tram. Alternatively or in addition, the vehicle may be a buoyant or submerged watercraft adapted to travel on or in water, and the watercraft may be a ship, a boat, a hovercraft, a sailboat, a yacht, or a submarine. Alternatively or in addition, the vehicle may be an aircraft adapted to fly in air, and the aircraft may be a fixed wing or a rotorcraft aircraft, such as an airplane, a spacecraft, a glider, a drone, or an Unmanned Aerial Vehicle (CAV). Any apparatus or device herein or any part thereof, may be mounted onto, may be attached to, may be part of, or may be integrated with, a rear or front view camera, chassis, lighting system, headlamp, door, car glass, windscreen, side or rear window, glass panel roof, hood, bumper, cowling, dashboard, fender, quarter panel, rocker, or a spoiler of a vehicle. Further, any vehicle herein may communicate using, compatible with, or based on, Dedicated Short-Range Communication (DSRC) or IEEE 802.11p standard.

Any apparatus or device herein may be operative to connected to, coupled to, communicating with, an automotive electronics in a vehicle, or may be part of, or may be integrated with, an automotive electronics in a vehicle. An Electronic Control Unit (ECU) may comprise, or may be part of, any apparatus or device herein. Alternatively or in addition, any apparatus or device herein may consist of, may be part of, may be integrated with, may be connectable to, or may be coupleable to, an Electronic Control Unit (ECU) in the vehicle, and the Electronic Control Unit (ECU) may be Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module. Alternatively or in addition, the Electronic Control Unit (ECU) may comprise, may use, may be based on, or may execute a software, an operating-system, or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard. Any software herein may comprise, may use, or may be based on, an operating-system or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard.

Any wired network or connection herein may be a vehicle network or a vehicle bus connectable to an Electronic Control Unit (ECU). Any ECU herein may be an Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module.

Any network herein may use a medium that may comprise a single wire or two wires, and may comprise a Shielded Twisted Pair (STP) or an Unshielded Twisted Pair (UTP). Alternatively or in addition, the network medium may comprise a LAN cable that may be based on, or may be substantially according to, EIT/TIA-568 or EIA/TIA-570 standard, and may comprise UTP or STP twisted-pairs, and the connector may be an RJ-45 type connector. Alternatively or in addition, the network medium may comprise an optical cable and the connector may be an optical connector, and the optical cable may comprises, may use, or may be based on, Plastic Optical Fibers (POF). Alternatively or in addition, the network medium may comprise or may use a DC power carrying wires connected to a vehicle battery.

Any client device herein may comprise, may consist of, or may be based on, a consumer computer that may be owned, operated, or used, by a user for a personal, social, family, or household use. Any server device herein may comprise, may consist of, or may be based on, a dedicated computer device that may manages network resources; may not be not a client device and may not be a consumer device; may be continuously online with greater availability and maximum up time to receive requests almost all of the time efficiently processes multiple requests from multiple client devices at the same time; may generate various logs associated with the client devices and traffic from/to the client devices; may primarily interface and respond to requests from client devices; may has greater fault tolerance and higher reliability with lower failure rates; may provide scalability for increasing resources to serve increasing client demands; or any combination thereof.

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 10 illustrates schematically a table of data relating to available tunnel devices and their attributes stored in the TB server;

FIG. 33 illustrates schematically a table of data relating to available tunnel devices associated with an idle state and their attributes stored in the TB server;

FIG. 33*a* illustrates a table of the various classification levels of autonomous car is according to the Society of Automotive Engineers (SAE) J3016 standard;

FIG. 36 illustrates schematically a table of data relating to multiple dedicated boxes stored in the database of the managing server;

DETAILED DESCRIPTION

Figure 1:
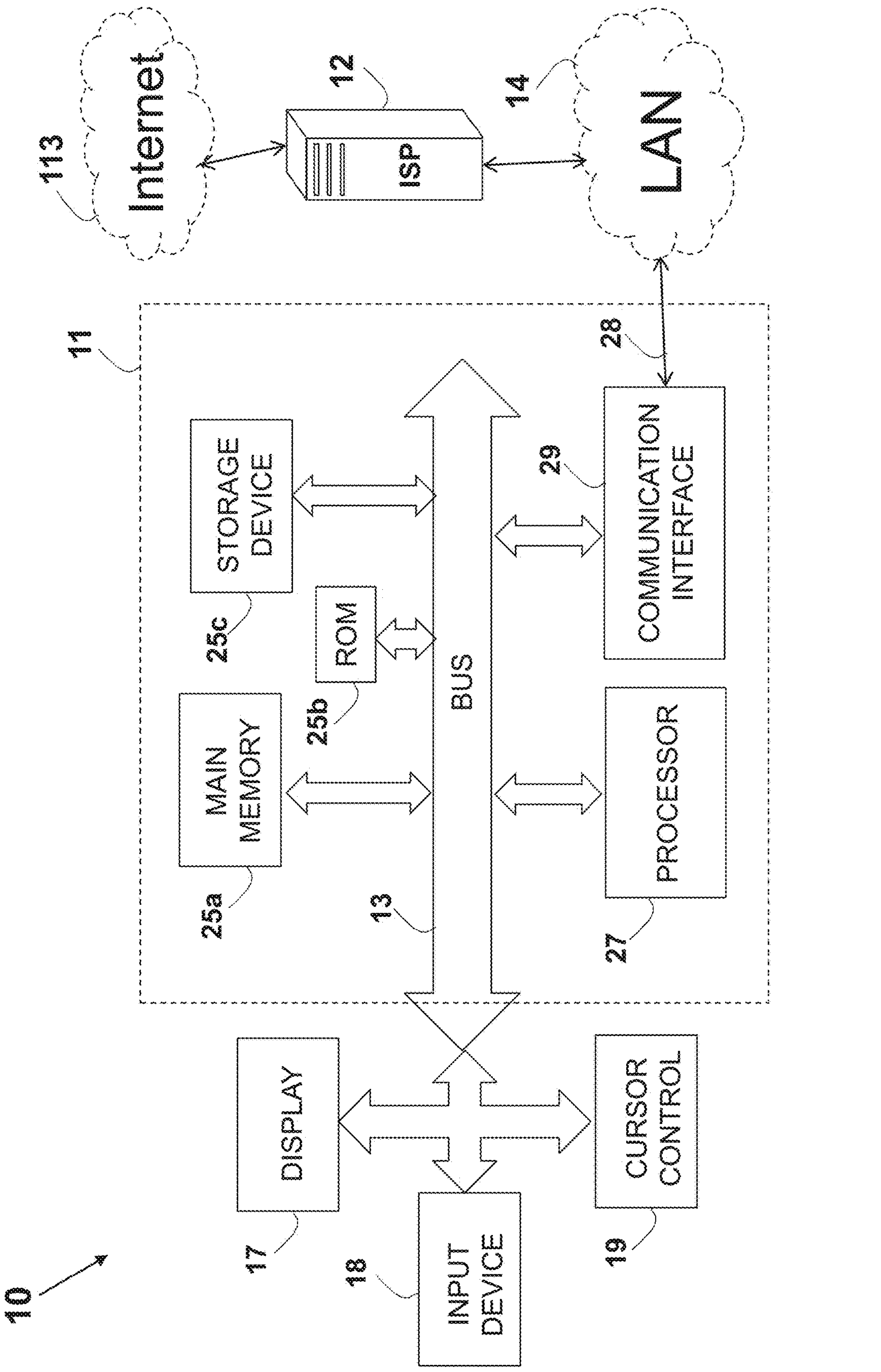
FIG. 1 (Prior Art)
FIG. 1 illustrates schematically a block diagram of a computer connected to the Internet.
Figure 2:
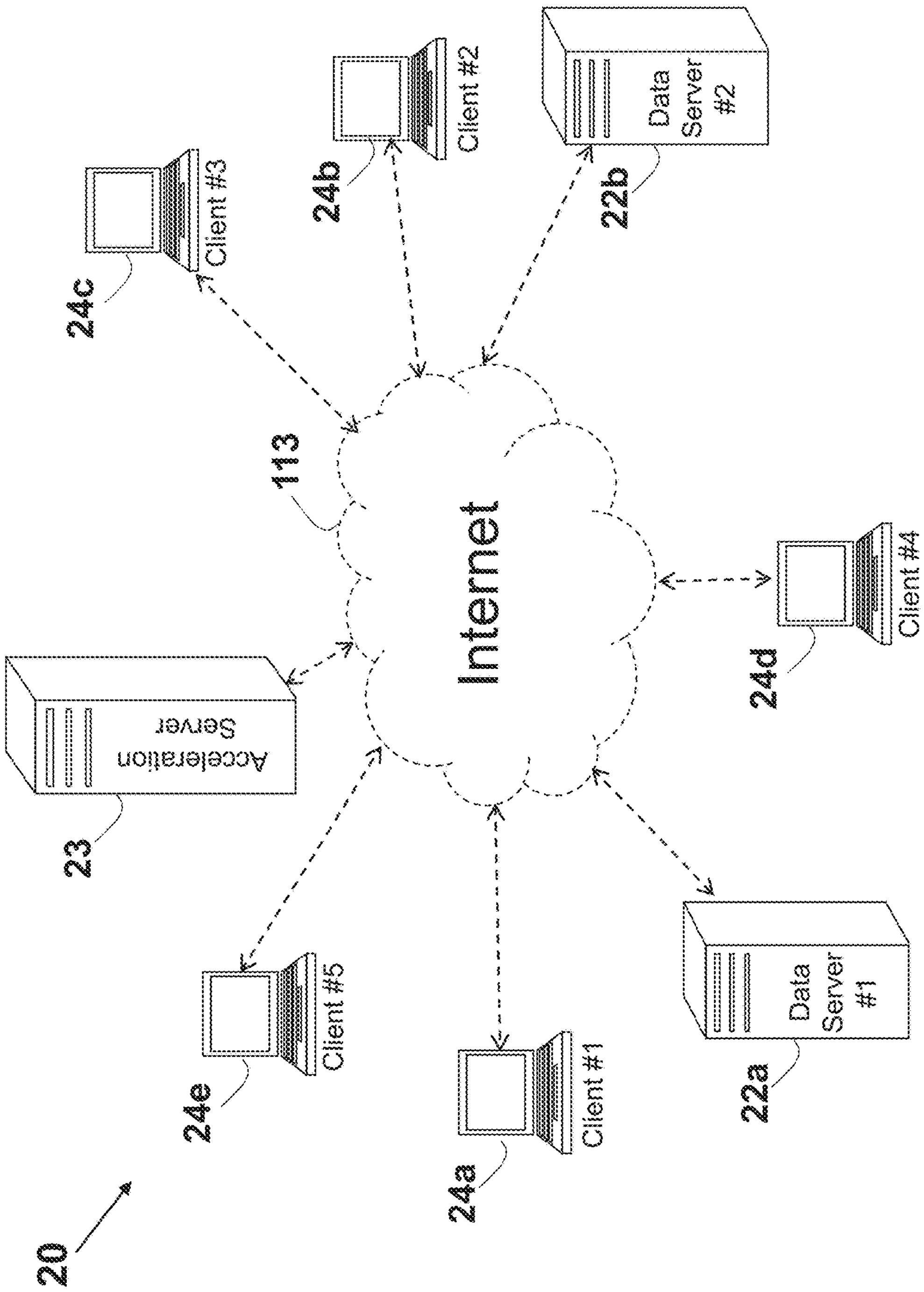
FIG. 2 (Prior Art)
FIG. 2 depicts schematically the Internet and computers connected to the Internet.
Figure 2A:
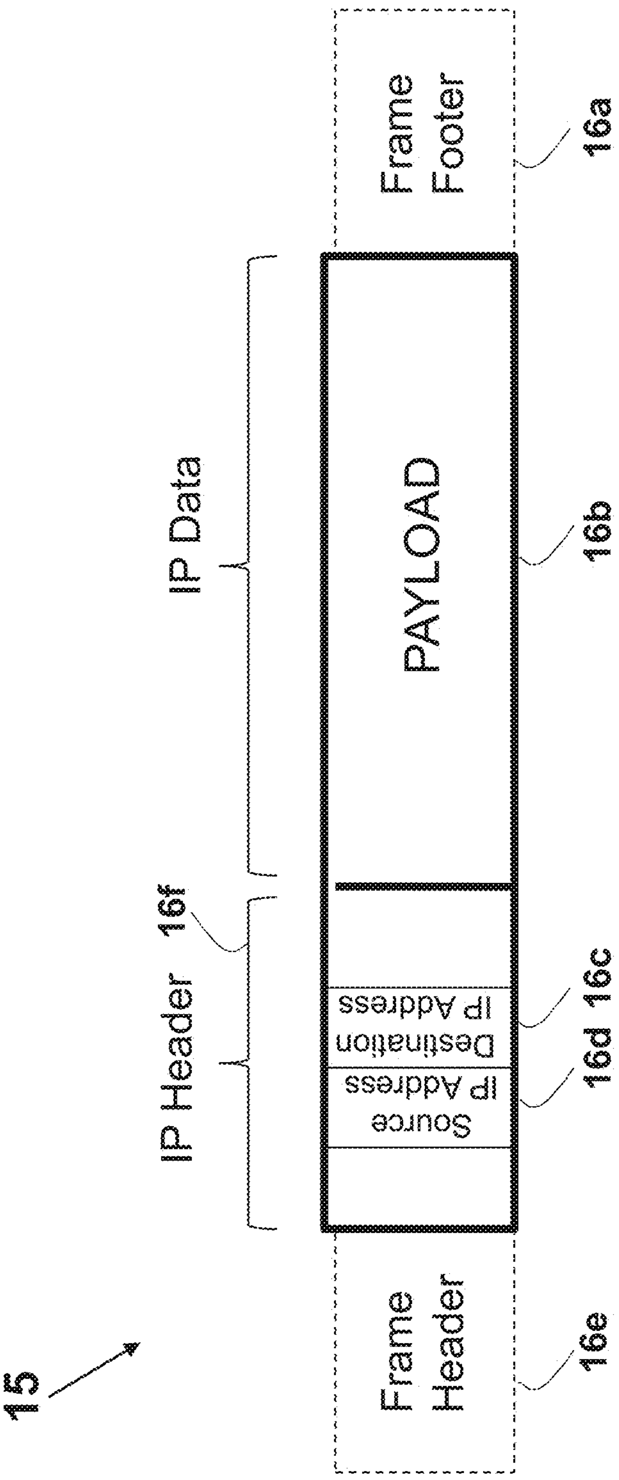
FIG. 2a (Prior Art)
FIG. 2*a* illustrates schematically a structure of an IP-based packet.
Figure 3:
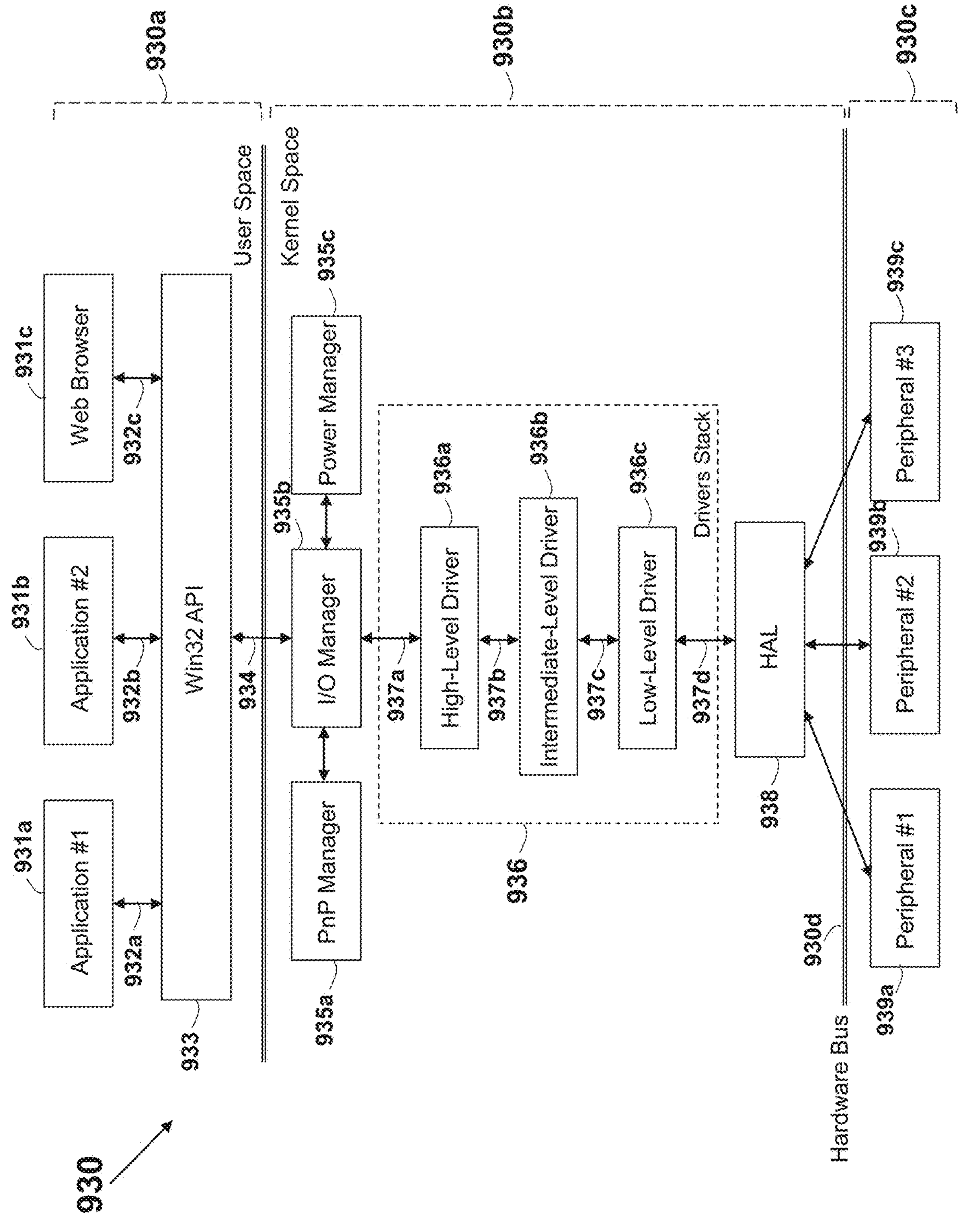
FIG. 3 (Prior Art)
FIG. 3 illustrates schematically a simplified flowchart in a WDM architecture.
Figure 3A:
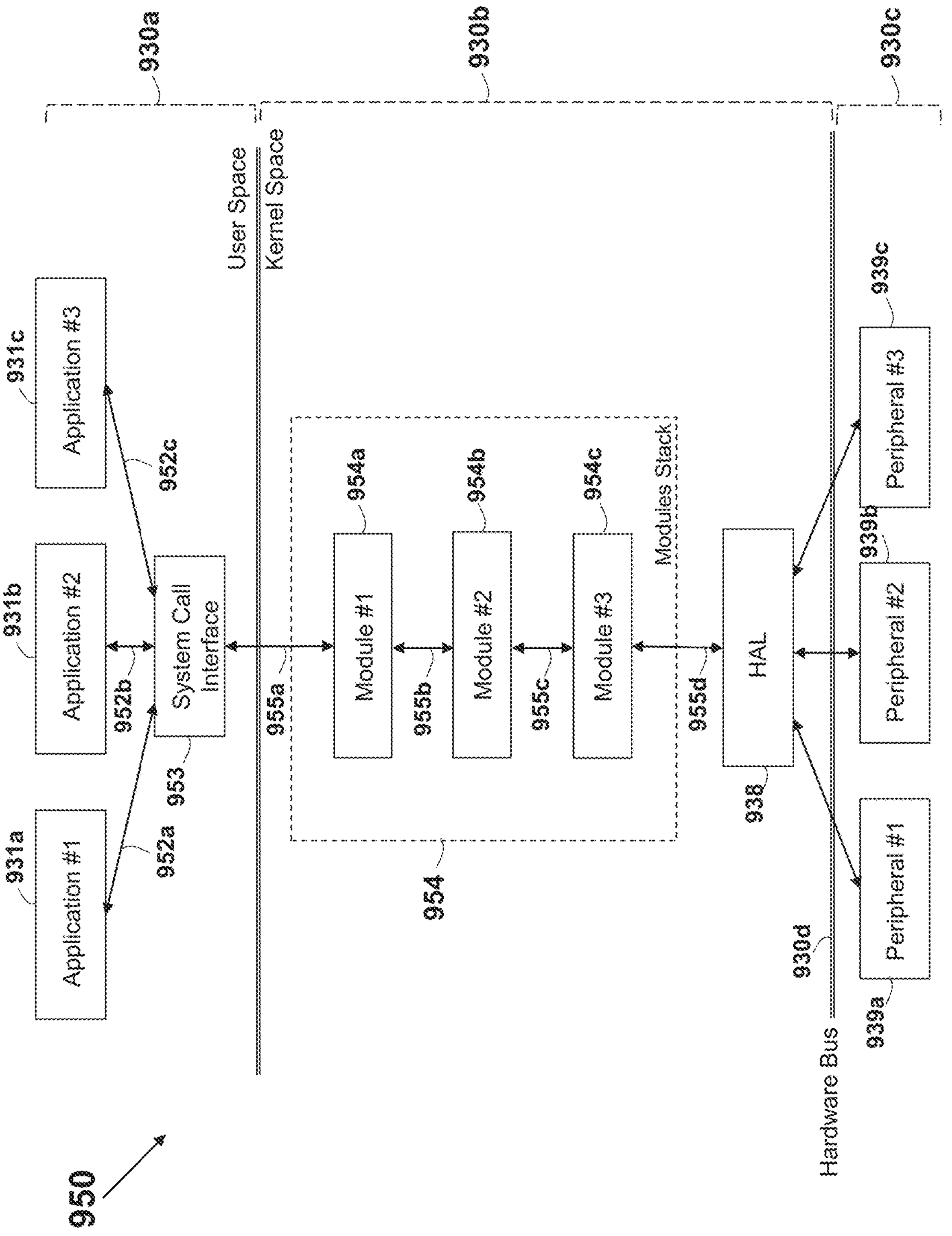
FIG. 3a (Prior Art)
FIG. 3*a* illustrates schematically a simplified flowchart in a Linux architecture.
Figure 3B:
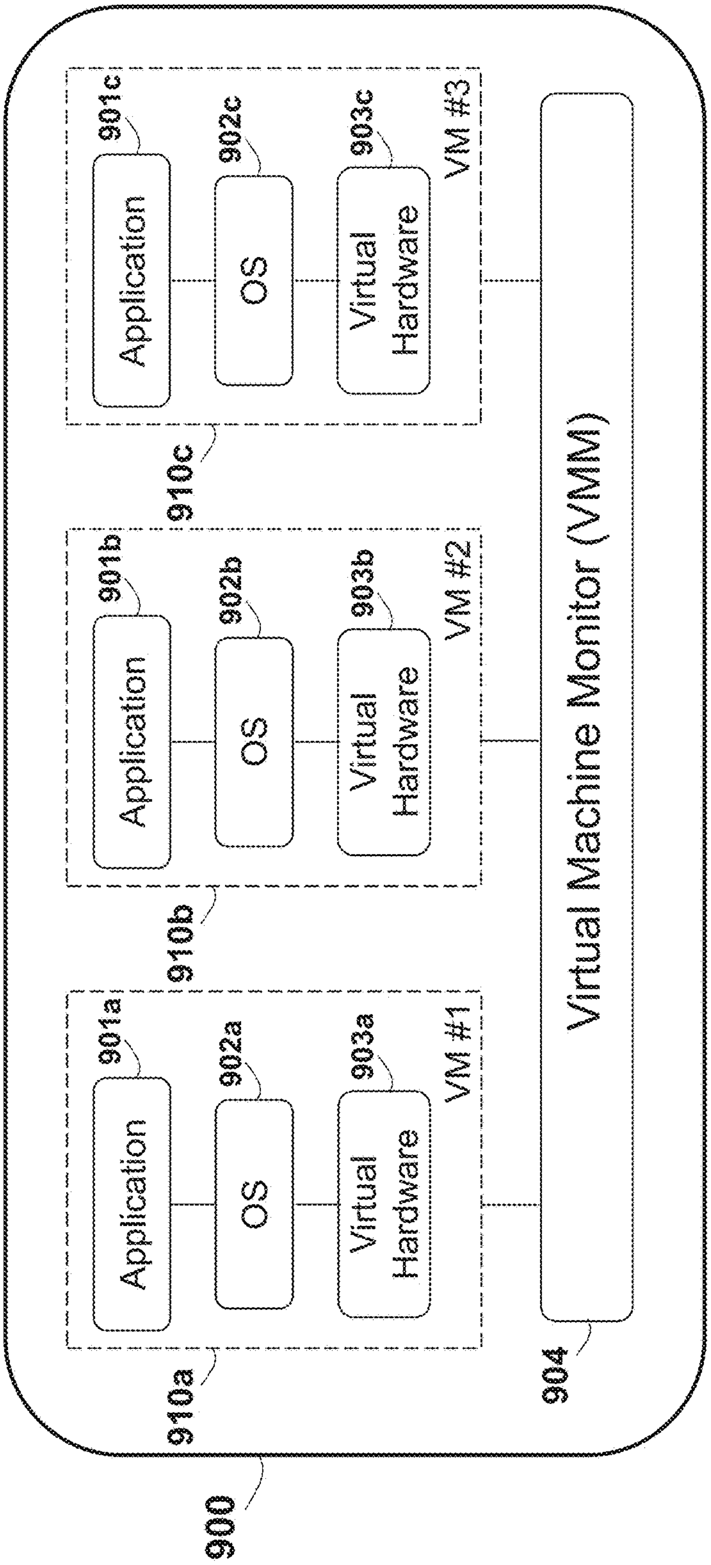
FIG. 3b (Prior Art)
FIG. 3*b* illustrates schematically a prior-art arrangement of virtualization.
Figure 3C:
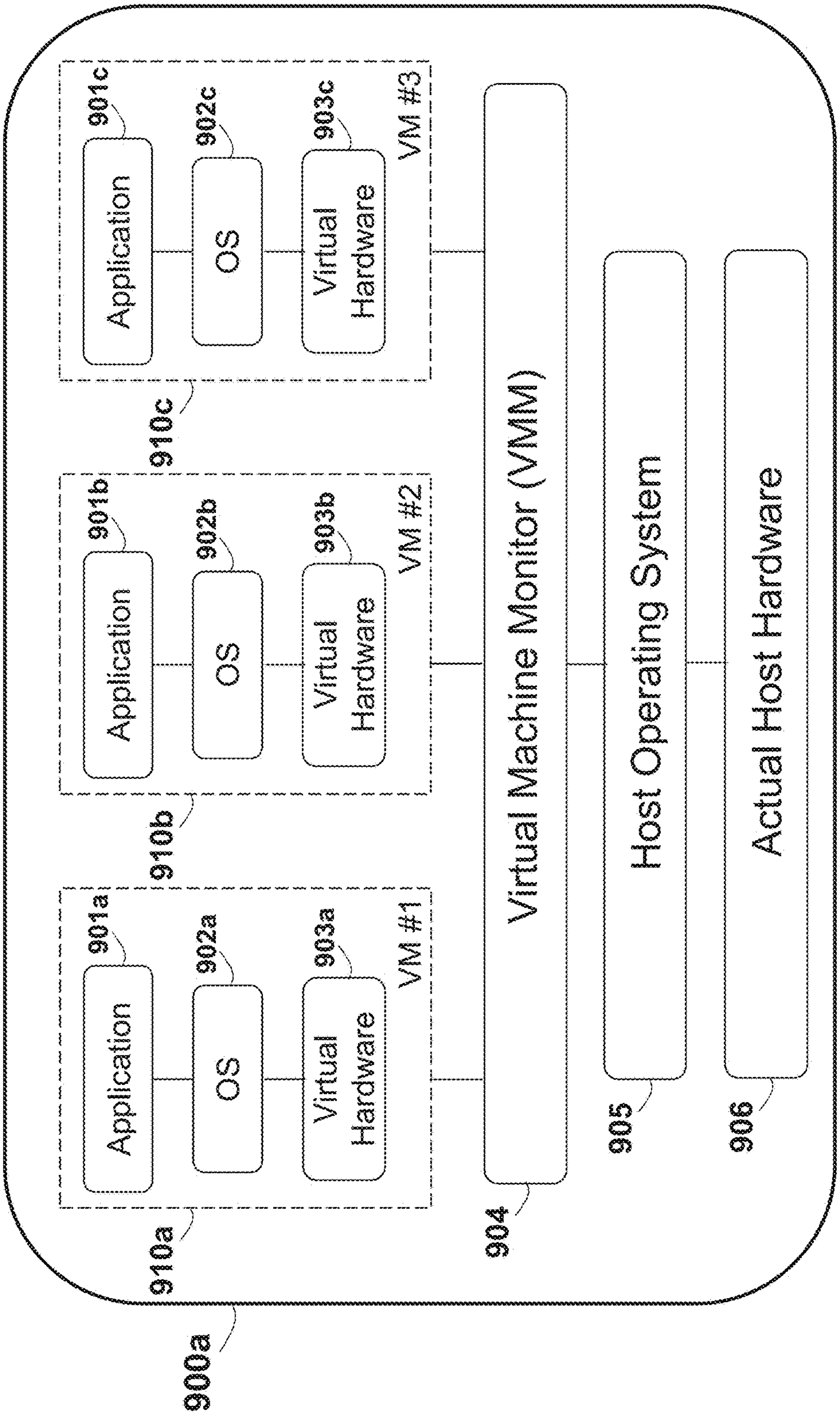
FIG. 3c (Prior Art)
FIG. 3*c* illustrates schematically a prior-art arrangement of hosted architecture of virtualization.
Figure 3D:
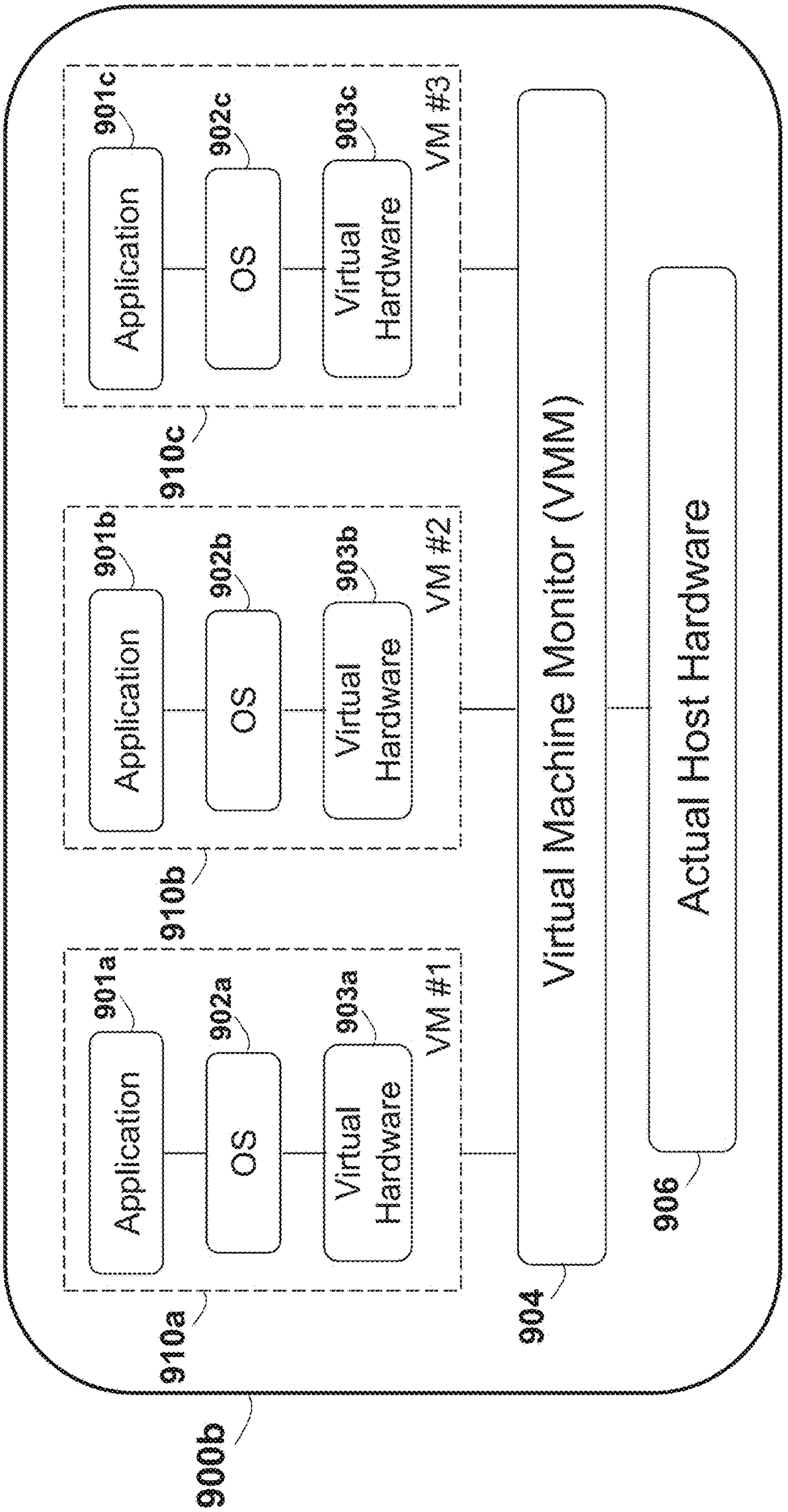
FIG. 3d (Prior Art)
FIG. 3*d* illustrates schematically a prior-art arrangement of bare-metal (hypervisor) architecture of virtualization.
Figure 3E:
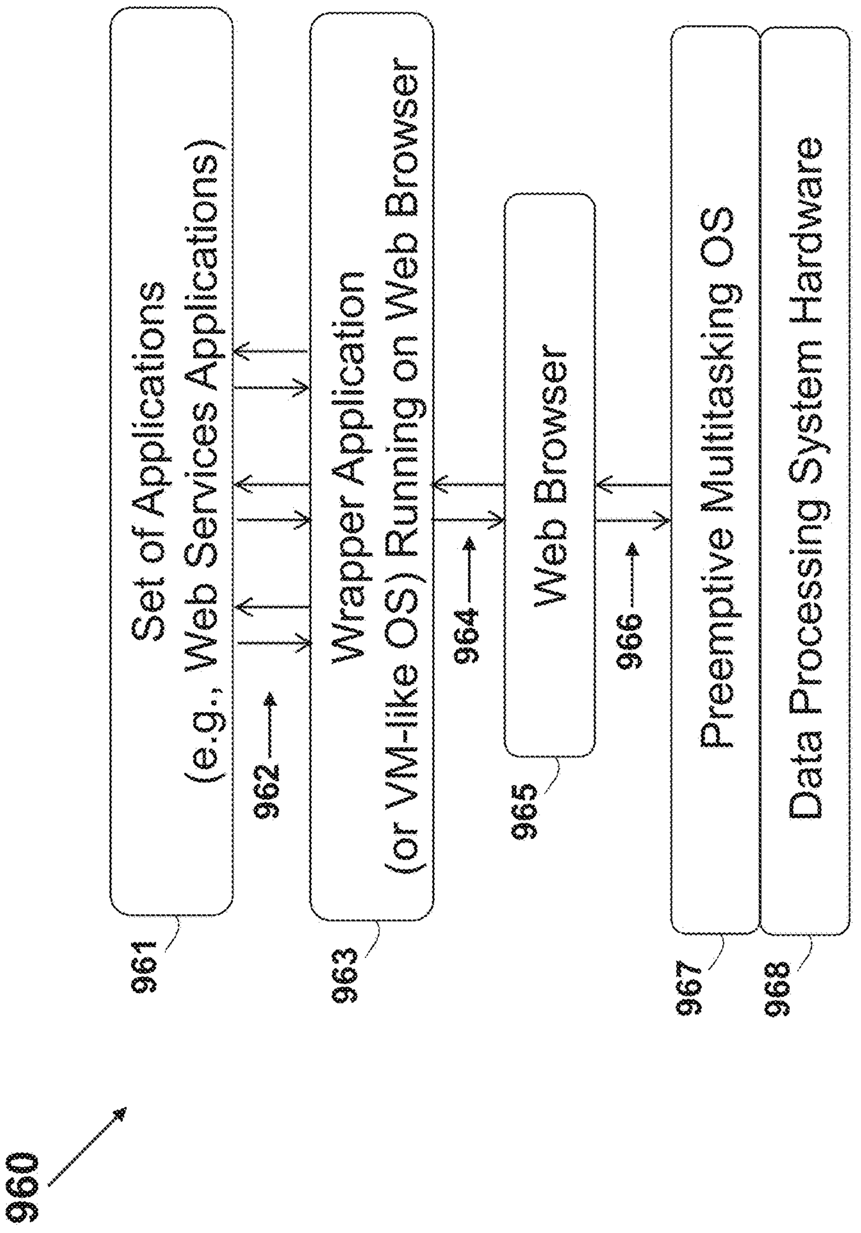
FIG. 3e (Prior Art)
FIG. 3*e* illustrates schematically a prior-art arrangement of a software architecture for web applications.
Figure 3F:
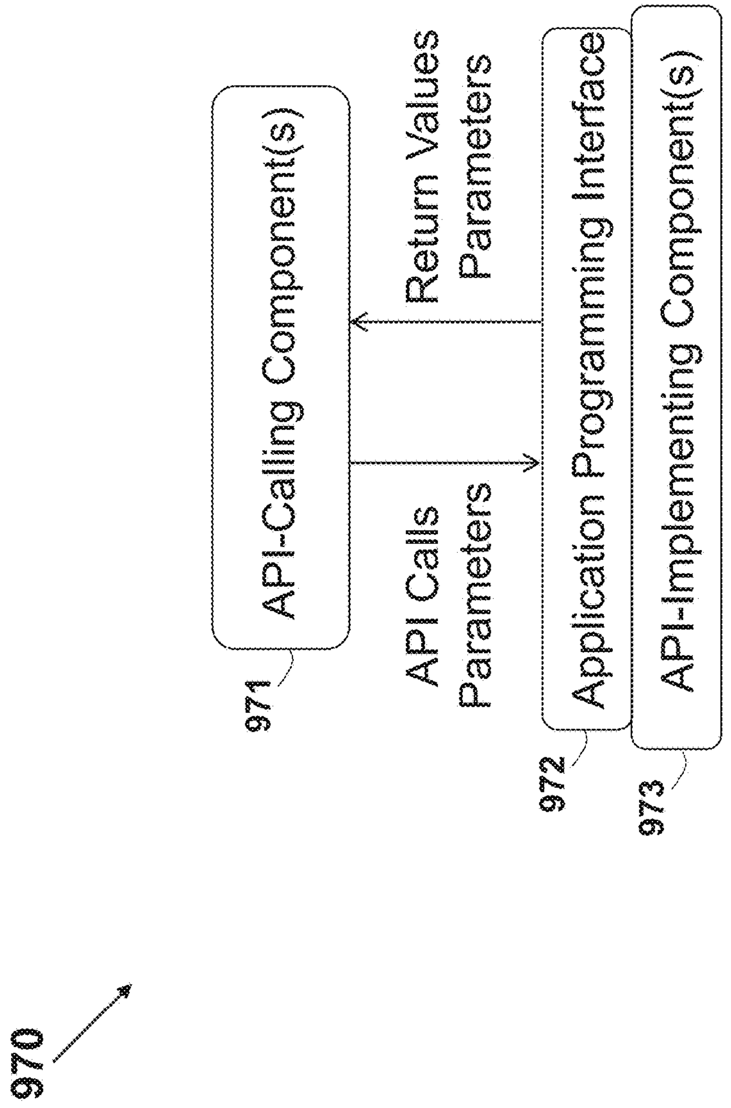
FIG. 3f (Prior Art)
FIG. 3*f* illustrates schematically a block diagram of an exemplary API architecture.
Figure 4:
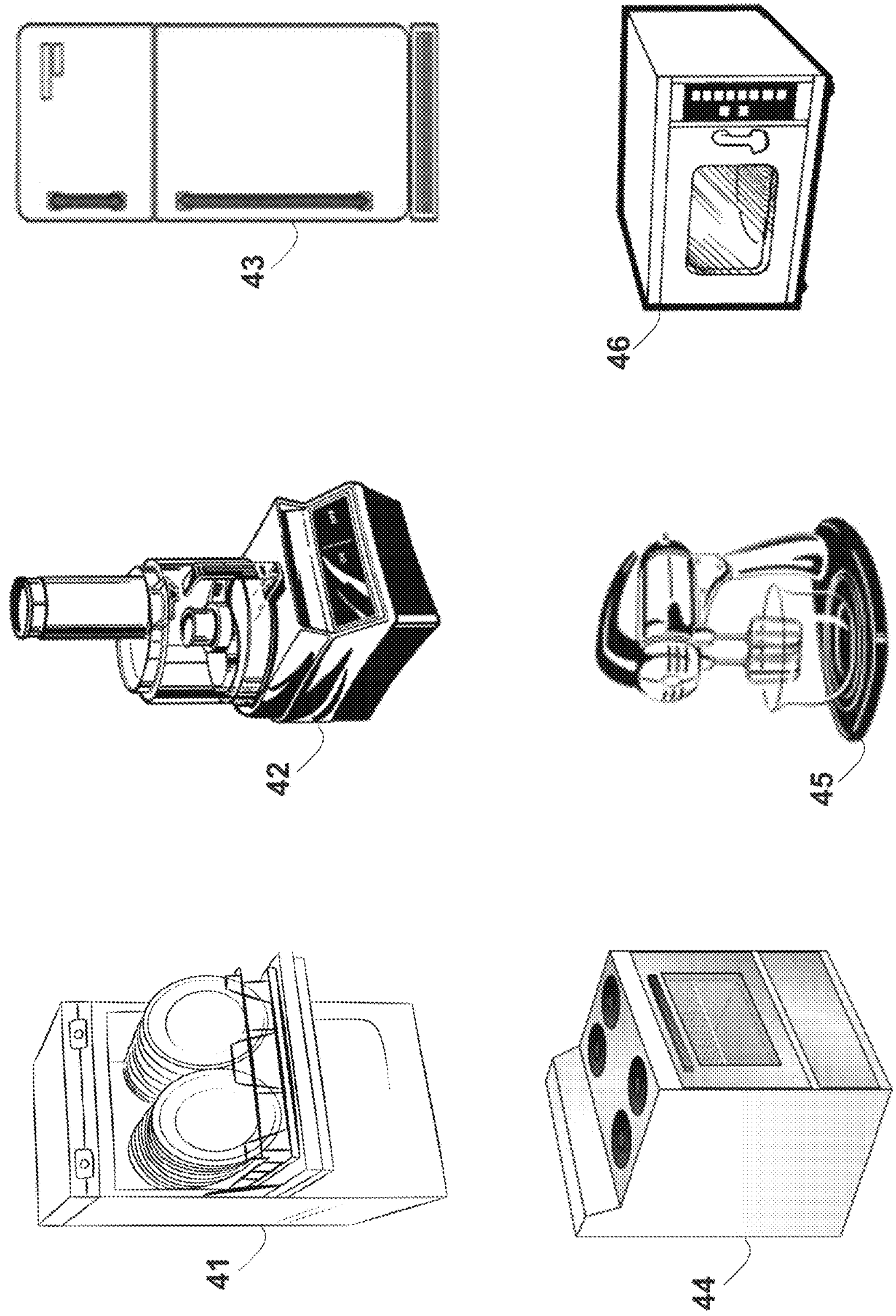
FIG. 4 (Prior Art)
FIG. 4 depicts schematically a few food-related home appliances.
Figure 4A:
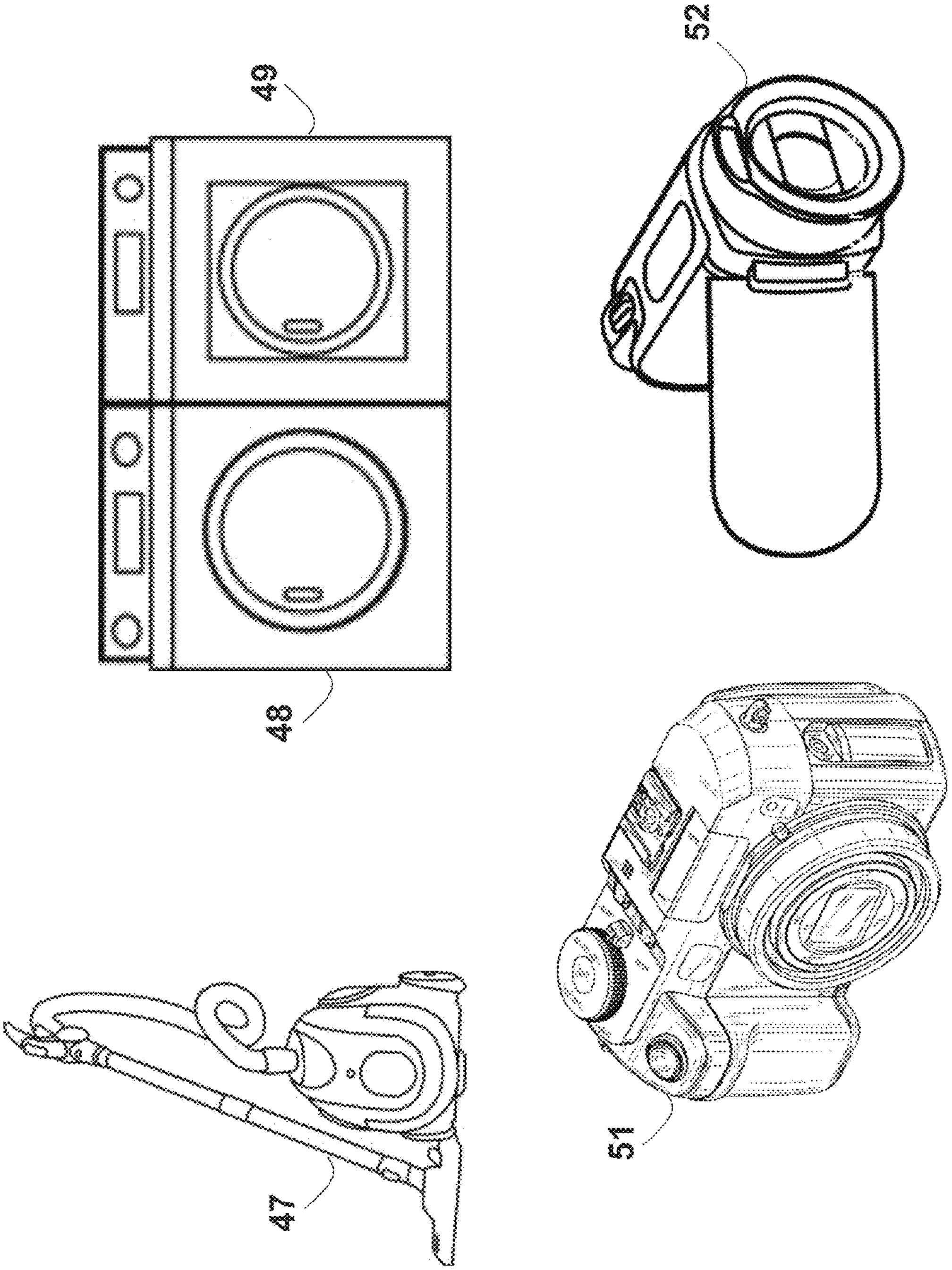
FIG. 4a (Prior Art)
FIG. 4*a* depicts schematically a few cleaning-related home appliances and digital cameras.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5*a*, 5*b* and 5*c*) refer to functions or actual devices that are either identical, substantially similar, similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

Any one of the devices herein may consist of, include, be part of, or be based on, a part of, or the whole of, the computer 11 or the system 10 shown in FIG. 1. Each of the servers herein may consist of, may include, or may be based on, a part or a whole of the functionalities or structure (such as software) of any server described in the '604 patent, such as the web server, the proxy server, or the acceleration server. Each of the clients or devices herein may consist of, may include, or may be based on, a part or a whole of the functionalities or structure (such as software) of any client or device described in the '604 patent, such as the peer, client, or agent devices.

Each of the servers herein may consist of, may include, or may be based on, a part or a whole of the functionalities or structure (such as software) of any server described in the '044 patent, such as the web server, the proxy server, or the acceleration server. Each of the clients or devices herein may consist of, may include, or may be based on, a part or a whole of the functionalities or structure (such as software) of any client or device described in the '044 patent, such as the peer, client, or agent devices. Each of the tunnel devices herein may consist of, may include, or may be based on, a part or a whole of the functionalities or structure (such as software) of any tunnel device described in the '044 patent, such as the peer, client, or agent devices.

Any of the steps or the flow charts described herein may be included as a Software development kit (SDK) that is provided as a non-transitory computer readable medium containing computer instructions. The SDK may be installed in a respective device, either client or a server, to be executed by a processor in that device.

A tunneling functionality, typically embedded in a 'tunnel device' is described in U.S. Pat. No. 10,880,266 to Shribman et al., entitled: "System and Method for Improving Content Fetching by Selecting Tunnel Devices", in U.S. Patent Application Publication No. 2022/0103525 to Shribman et al., entitled: "System and Method for Managing Non-Direct URL Fetching Service", in U.S. Pat. No. 10,963,531 to Shribman et al. entitled: "System and Method for URL Fetching Retry Mechanism", in U.S. Pat. No. 9,241,044 to Shribman et al. entitled: "System and method for improving internet communication by using intermediate nodes", or in any combination thereof. The described tunneling functionality allows for web browsing and content fetching in a private, anonymous, and untraceable manner, by using a tunnel device that is located along the content request path from a requesting client device to a web server, along the content providing path from the web server to the requesting client device, or both. Since a device, such as the tunnel device, that directly accesses the web server is not the requesting client device that originated the request, only the IP address of the tunnel device is available to the web server as a source address, and the IP address of the requesting client device is hidden from the web server. In such a way, the web server is not aware of the requesting client device, and thus blocking of a particular device is obviated. Further, using such an intermediate device circumvents any traffic monitoring.

Figure 34:
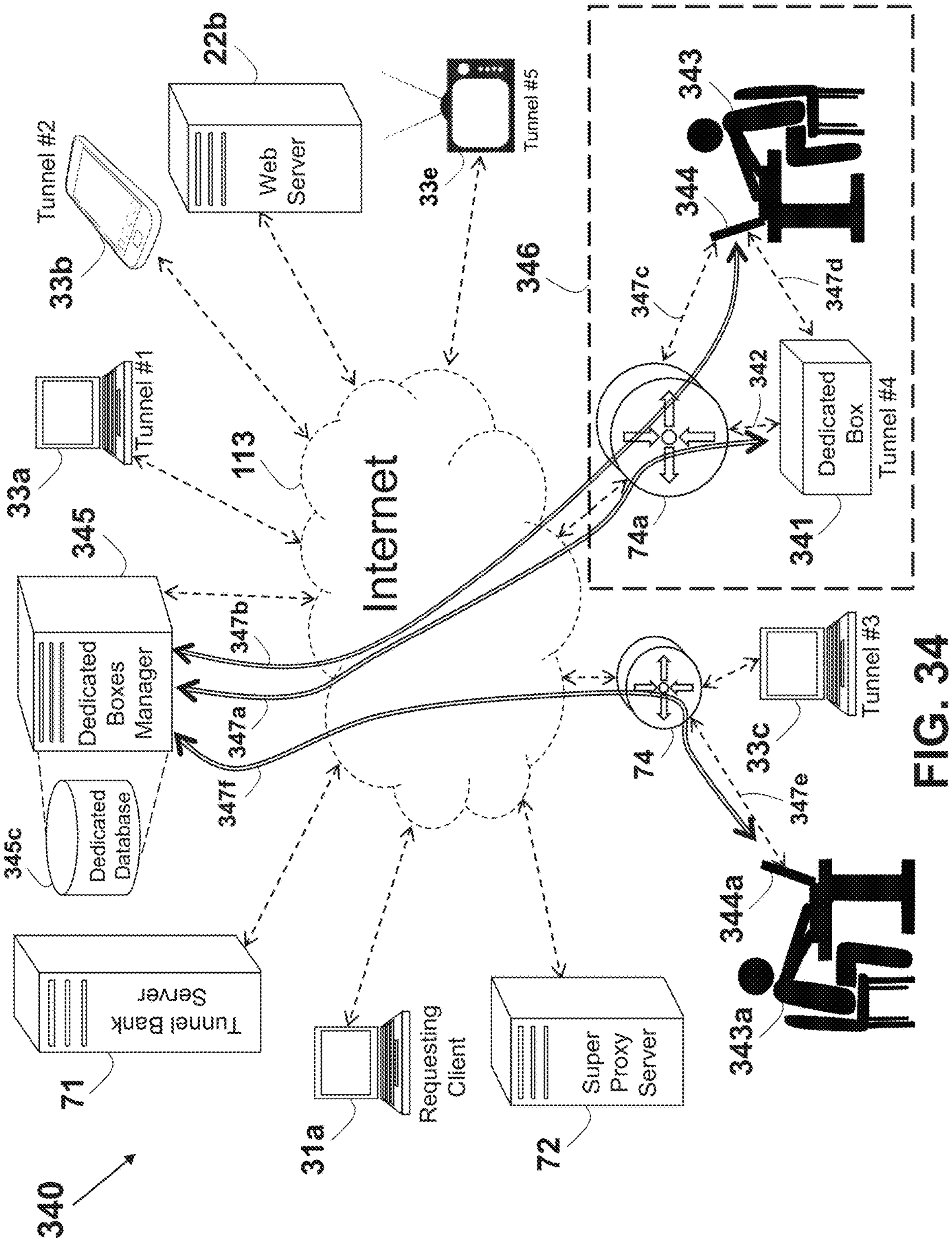
FIG. 34 depicts schematically messages exchanged over the Internet when using a dedicated box and a managing server.

As used herein, as well as in any of the documents in the background that are incorporated herein by reference, the term "tunnel device" is only an identifier for identifying any device that is located along the path between a requesting client, such as the client device 31*a*, and a web server, such as the web server 22*b* shown in FIG. 34. The term is not necessarily limited to any specific 'tunneling' functionality such as using any tunneling protocol. Typically, such a tunnel device is a client device, that may be a dedicated device for the tunneling functionality, or may be a device whose primary purpose is to provide other services, such as a smartphone, a laptop, an appliance, or any computerized device. As used herein, the term 'dedicated' refers to an entity that is exclusively allocated to, or primarily intended for, a particular service or purpose.

Figure 7:
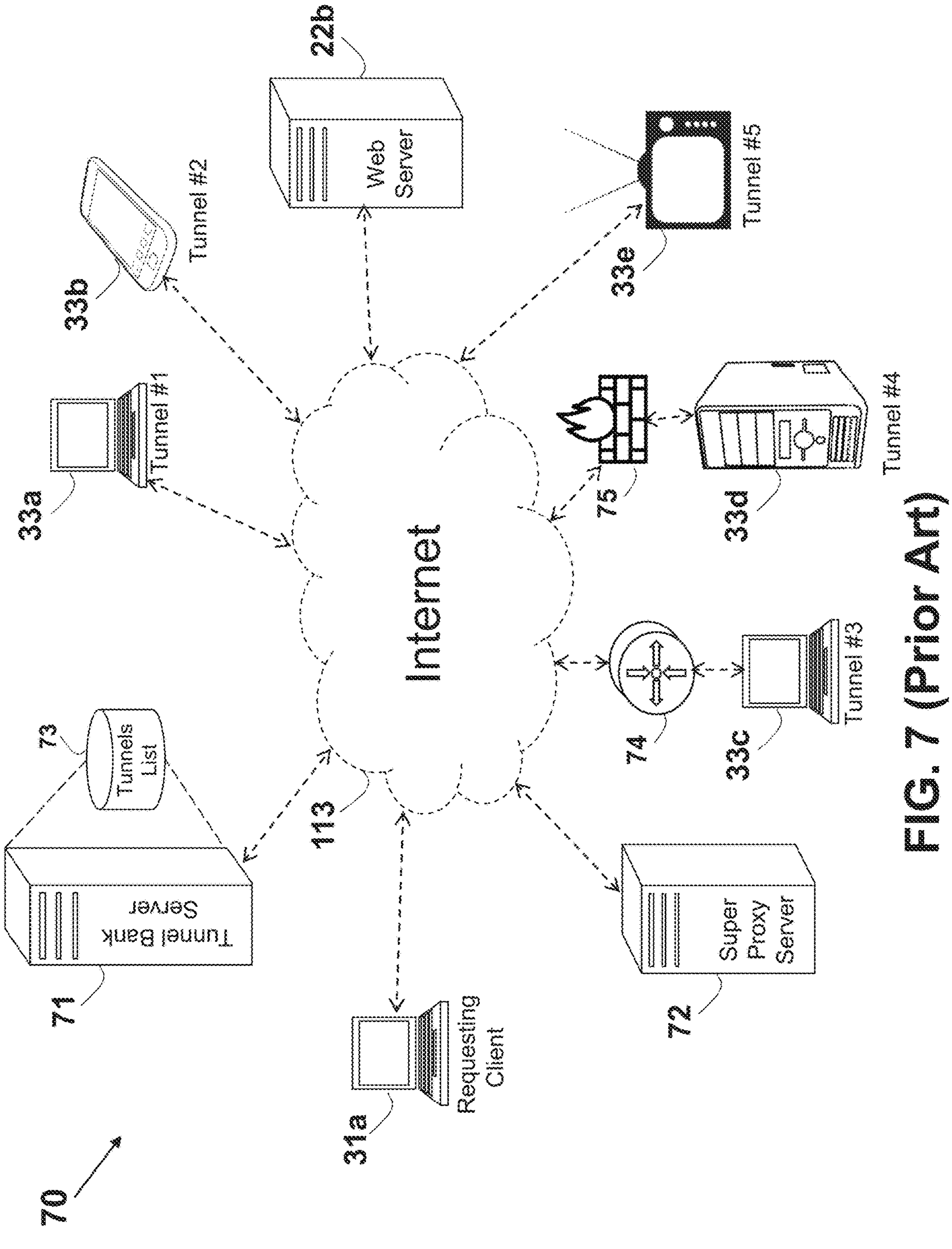
FIG. 7 (Prior Art)
FIGS. 7 and 7*a* depict schematically a client device, tunnel devices, and servers connected to the Internet.
Figure 7A:
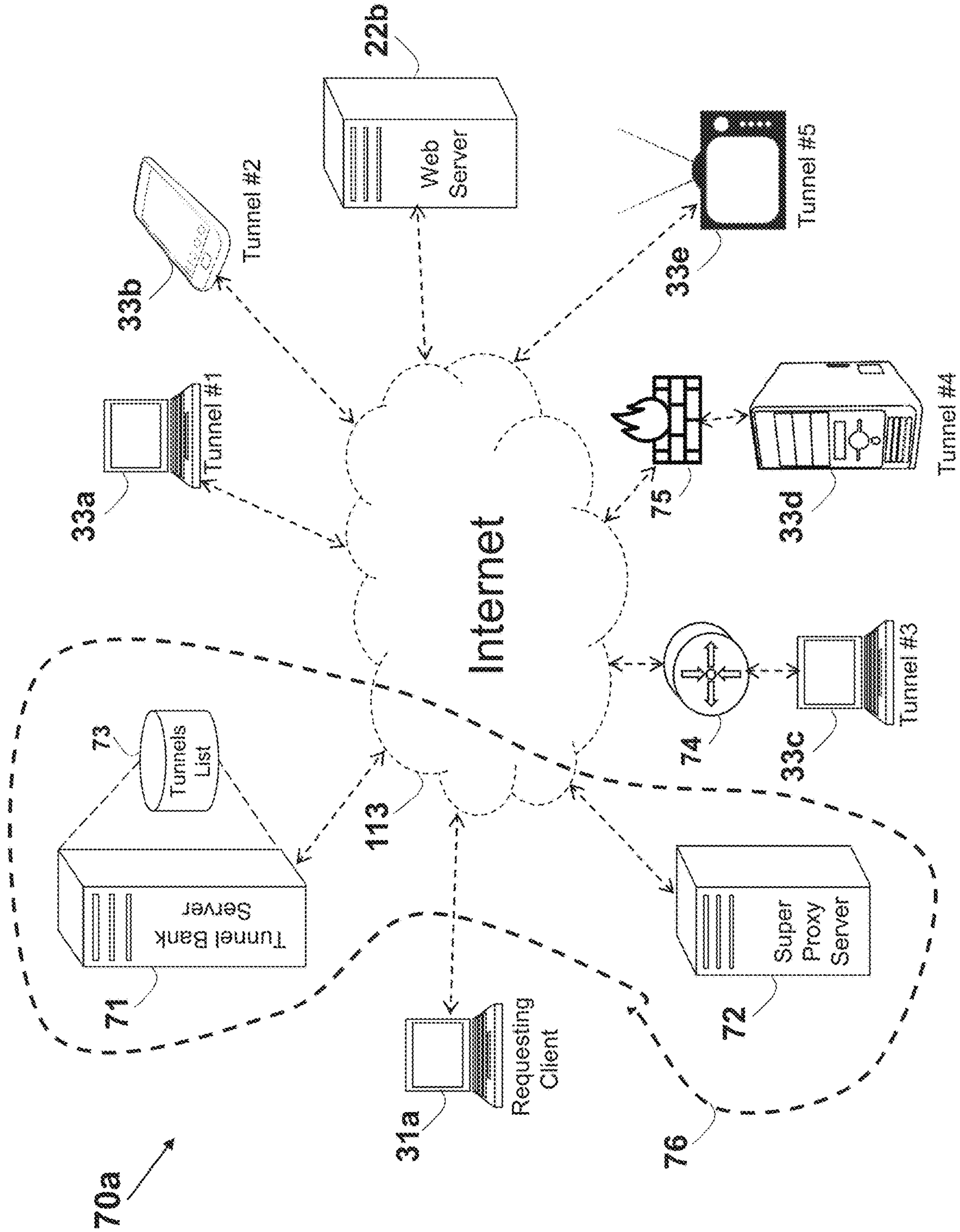
FIG. 7a (Prior Art)
Figure 8:
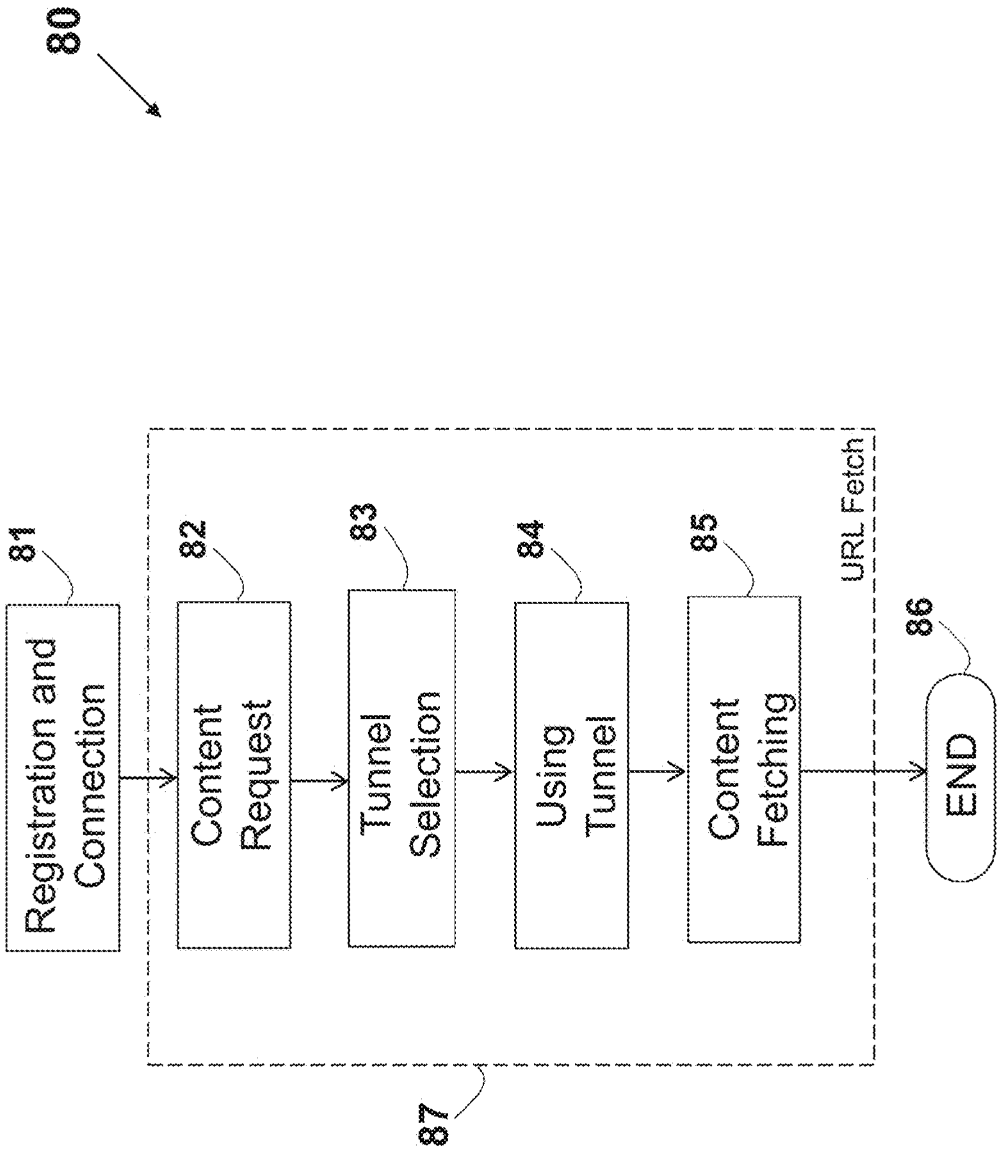
FIG. 8 (Prior Art)
FIG. 8 illustrates schematically a simplified flowchart of a method for selecting and using a tunnel device for fetching content.
Figure 9A:
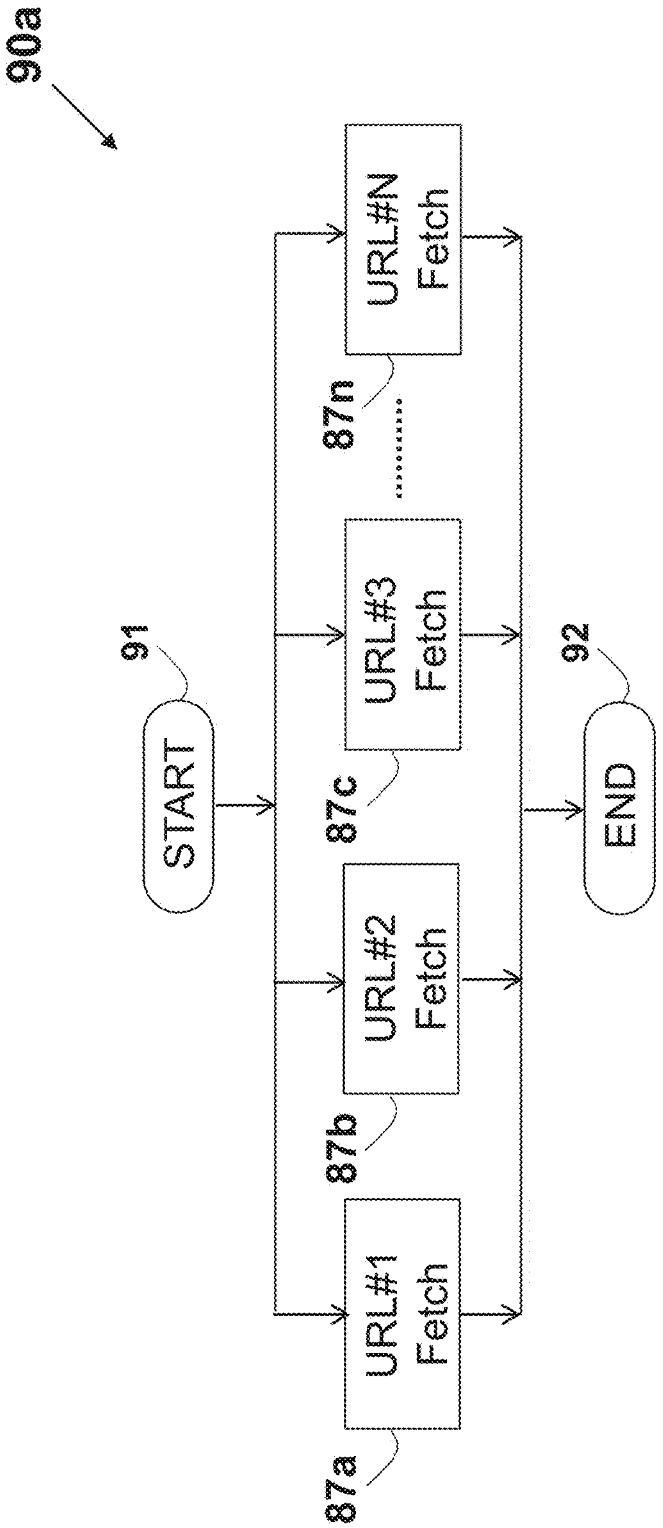
FIG. 9a (Prior Art)
FIG. 9*a* illustrates schematically a simplified flowchart of a method for selecting and using multiple tunnel devices for fetching multiple content in parallel.
Figure 9B:
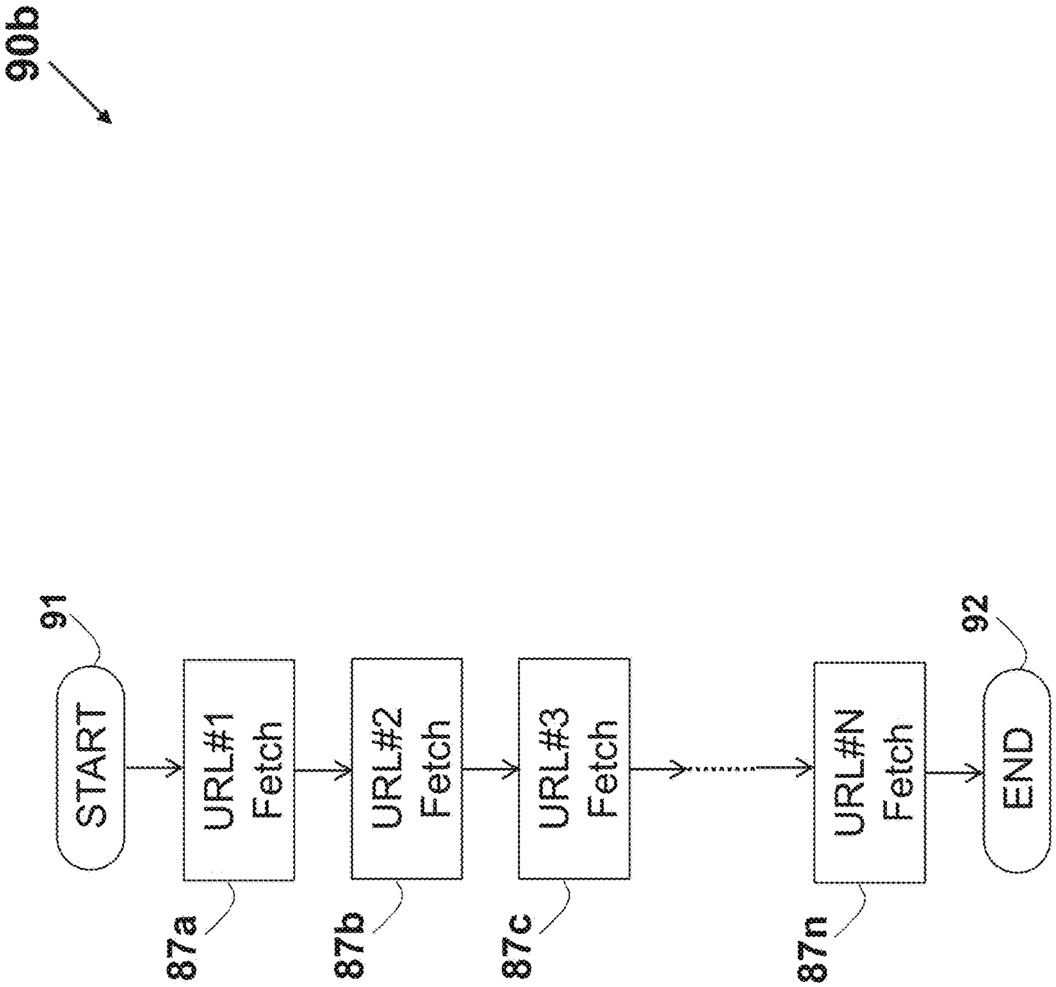
FIG. 9b (Prior Art)
FIG. 9*b* illustrates schematically a simplified flowchart of a method for selecting and using multiple tunnel devices for fetching multiple content in series.
Figure 11:
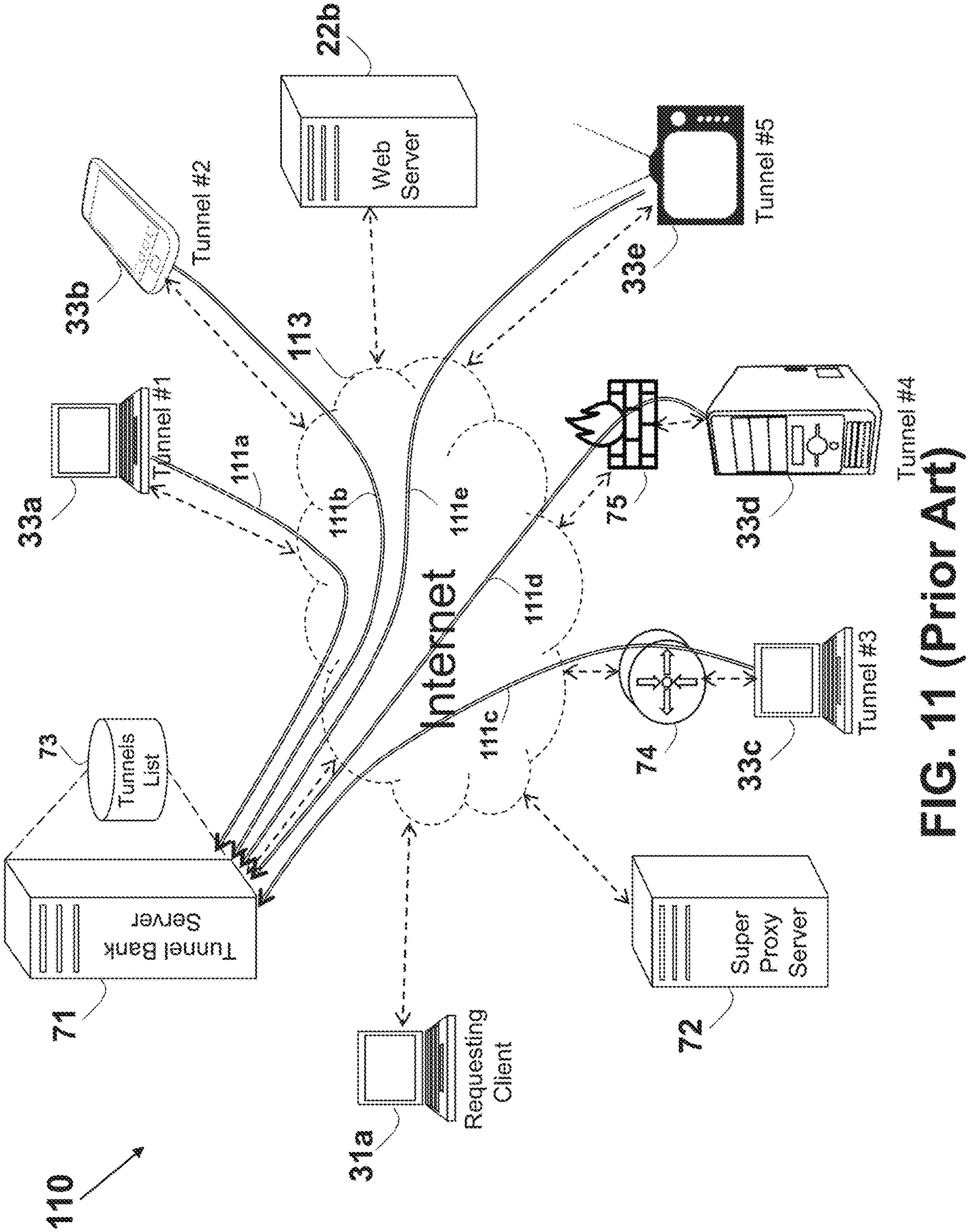
FIG. 11 (Prior Art)
FIG. 11 depicts schematically messages exchanged over the Internet between tunnel devices and the TB server as part of the registration phase.
Figure 11A:
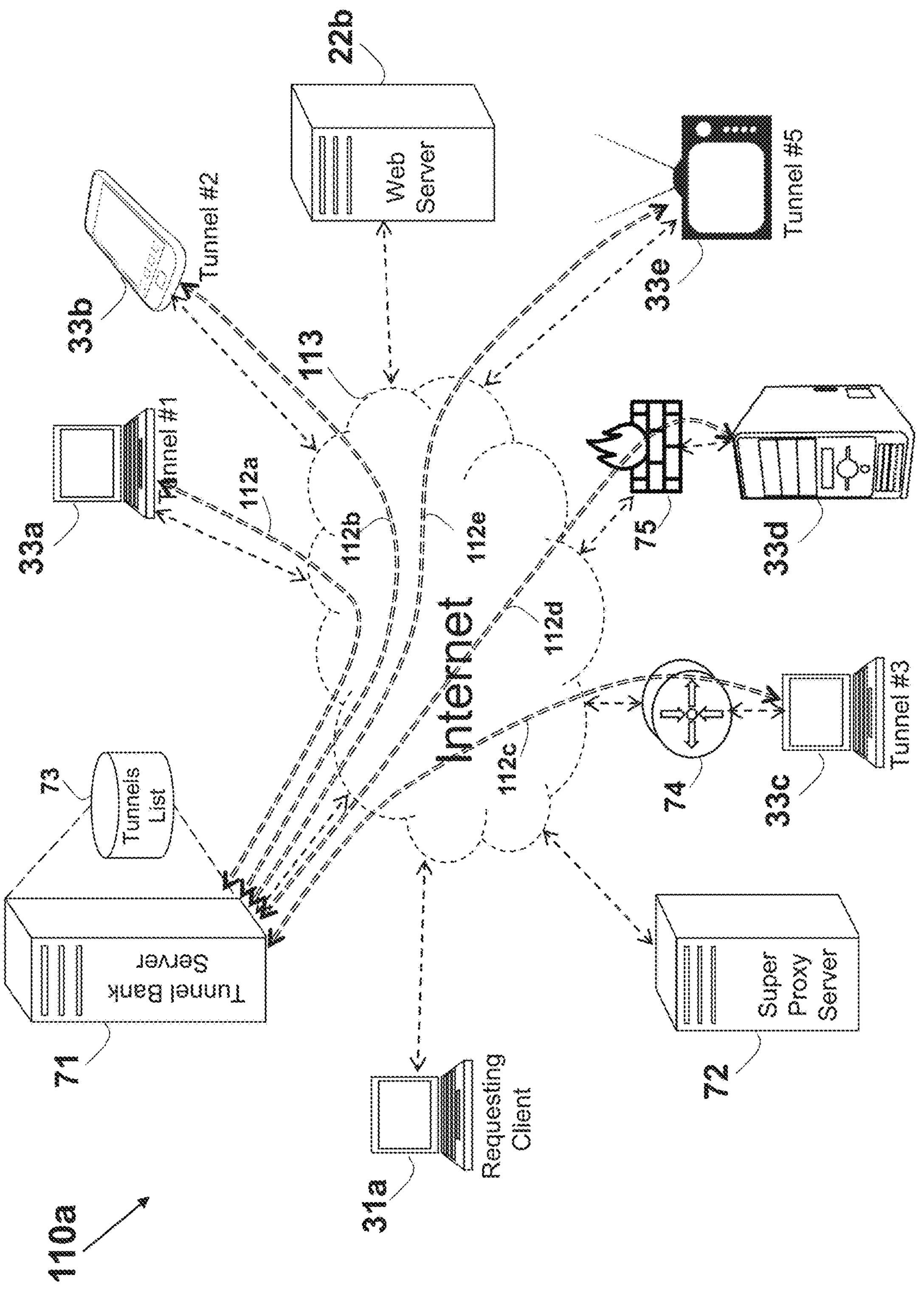
FIG. 11a (Prior Art)
FIG. 11*a* depicts schematically connections over the Internet between tunnel devices and the TB server after the registration phase.

In one example, a tunnel device, such as the tunnel device #4 33*d* that is part of the arrangement 70 shown in FIG. 7, is a dedicated device, such as dedicated device 341 in an arrangement 340 shown in FIG. 34, which is based on FIG. 7 and the other arrangements are shown above. The sole or primary purpose of the dedicated device 341, which is typically enclosed in a single enclosure or box, is to serve as a tunnel device, such as serving an intermediary device between a server or client devices requesting information from a web server 22*a*, and the web server 22*a* itself, and as such as being included in the Tunnels List 73 and to execute part or all of the steps of the tunnel related flow-chart 170 shown in FIG. 17, or the tunnel related flow-chart 220 shown in FIG. 22. The structure of such a dedicated device—shown as a Dedicated Box 341, such as the mechanics, hardware and software, are all exclusively directed to the purpose of serving as a tunnel device, or to support related support functionalities such as Operations, administration, registration, or management (OA&M) that include, or are, the processes, activities, tools, and standards involved with operating, administering, managing and maintaining the tunnel device related functionality. For example, operations may encompass automatic monitoring of the device, detecting and determining faults, and alerting admins. Administration typically involves collecting performance stats, accounting data for the purpose of billing, capacity planning using usage data, and maintaining system reliability, and may also involve maintaining the service databases which are used to determine periodic billing. Maintenance typically involves upgrades, fixes, new feature enablement, backing up and restoring data, and monitoring the device health.

The major task is diagnostics and troubleshooting. A provisioning is the setting up of the user accounts, devices, and services. An example of such dedicated device 341 is a device named "Piggy-Box" described in U.S. Provisional Application Ser. No. 63/318,788, which was filed on Mar. 11, 2022, which is incorporated in its entirety for all purposes as if fully set forth herein. In one example, the dedicated box 341 is identical to, or comprises, is part of, or whole of, the computer 11 shown in FIG. 1.

Any functionality, feature, structure, hardware, software, or steps or flow charts performed by any intermediary ('tunnel') device in the '044 patent', in the '604 patent', disclosed in U.S. Patent Application Publication No. 2016/0337426 to Shribman et al. entitled: "System and Method for Streaming Content from Multiple Servers", in U.S. Pat. No. 10,880,266 to Shribman et al., entitled: "System and Method for Improving Content Fetching by Selecting Tunnel Devices", in U.S. Patent Application Publication No. 2022/0103525 to Shribman et al., entitled: "System and Method for Managing Non-Direct URL Fetching Service", which is incorporated in its entirety for all purposes as if fully set forth herein. in U.S. Pat. No. 10,963,531 to Shribman et al. entitled: "System and Method for URL Fetching Retry Mechanism", or in any combination thereof, may equally apply to, and may be implemented by, the dedicated device 341.

As shown in the arrangement 340 in FIG. 34, the dedicated device 341 may be connected to the Internet 113 via a router 74*a*, using a connection 342 to connect to the router 74*a*. The router 74*a* may be identical to, similar to, or different from, the router 74. A Dedicated Boxes Manager server 345 may be used for various Operations, Administration, registration, or Management (OA&M) of the dedicated device 341, using a communication path 347*a* over the Internet 113 via the router 74*a*. The Dedicated Boxes Manager server 345 may include, or may be connected to, a Dedicated Database 345*c* that stores various OA&M data associated with the dedicated box 341.

The dedicated device 341 may be associated with a human user 343. For example, the user 343 may own the dedicated box 341, may own or use the router 74*a*, or may be co-located with the dedicated box 341, such as where the dedicated box 341 is located at the user 343 premises, such as in the same room, apartment, building, house, or office, as the user 343. Further, the user 343 may be the beneficiary of various benefits provided as compensation for providing the dedicated box 341 tunnel functionality. For example, the user 343 may receive weekly or monthly monetary benefits for allowing the use of the tunnel functionality of the dedicated box 341. In one example, the dedicated box 341 may be co-located with the user 343 premises or house, such as in a building 346 that is associated with the user 343, such as a building that is owned or used by the user 343. The term "building" herein includes any site, location, premises, or structure with a roof and walls, such as a house, school, store, or factory, including, without limitation, residential house, apartments, trailers, motor homes, offices, and businesses.

The user 343 may use a computer 344, which may be a personal computer, laptop, tablet, or a smartphone for performing OA&M functions relating to the dedicated box 341. In one example, the user computer 344 may be directly connected to the device 341 over a connection 347*d*. In one example, the dedicated box 341 serves as a peripheral, and any standard computer-peripheral connection may be used, such as a Universal Serial Bus (USB). Alternatively or in addition, the user computer 344 may be locally and directly connected to the device 341 via the router 74*a*, using a connection 347*c*. In this case, the same connection 342 used for connecting the dedicated box 341 to the Internet 113 may be also used for local connection for performing OA&M functions by the computer 344 via the connection 347*c*.

Alternatively or in addition, the user computer 344 may be indirectly connected to the device 341 over the Internet 113. For example, the user computer 344 may communicate with the server 345 over the communication link or path 347*b*, where the server 345 serves as an intermediary device for connecting to the dedicated box 341 via the communication link or path 347*a*. Further, part of, or whole of, the OA&M functions may be performed by the server 345 over the communication link or path 347*a*, where the user computer can get access to information relating to the dedicated device 341 that is available at the server 345 or is stored in the database 345*c*.

In the arrangement 340 is shown that the OA&M functions are accessed or performed by the user 343 via the user computer 344 that is co-located with the dedicated box 341. Alternatively or in addition, the user may be at a remote location, and may access or perform the OA&M function remotely. For example, a user 343*a* (that may be a different user or the same user 343 when located at another location) may operate a computer 344*a* (that may be a different computer or the same computer 344 when located at another location) to communicate with the server 345 over a communication link or path 347*f* via the local router 74 over the local connection 347*e*. The user 343*a* and the computer 344*a* may be internal to, or external to, the premises 346. It is noted that the computer 344*a* may be the same as, or may be integrated with, the Tunnel Device #3 33*c* shown to co-locate with the user 343*a*.

Figure 35:
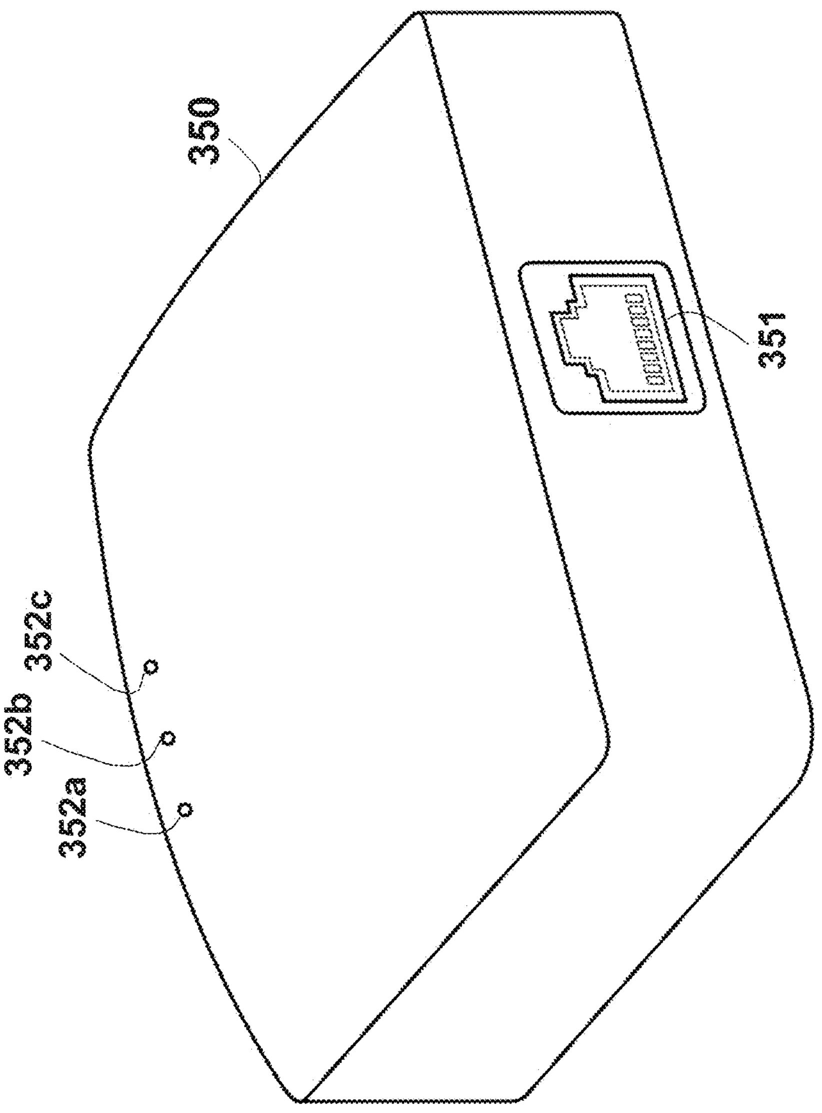
FIG. 35 depicts pictorially a perspective view of physical box of a dedicated box having a wired connection.

An example of a mechanical structure 350 of the dedicated device 341 is shown in FIG. 35. The box 350 includes a LAN connector RJ-45 351 for the connection 342 for connecting to the router 74*a*, and three visual indicators 352*a*, 352*b*, and 352*c*, which may be LEDs. For example, the visual indicator 352*a* may be used to indicate if the device is powered, the visual indicator 352*b* may be used to indicate if the device is properly connected to the Internet 113, and the visual indicator 352*c* may be used to indicate if the device is passing traffic as part of the tunnel device functionality. In one example, the interaction with the human operator or user 343 is only via visual indicators, such as the three visual indicators 352*a*, 352*b*, and 352*c*, and there is no display or screen, or any other visual notification means for indicating status or any other data to a human user by the dedicated box 350 itself. The control, configuration, status, and any other OA&M functions may be only supported by the local interface 347*d* to the user computer 344, or to the Internet 113 via the router connection 342. The dedicated box 350 itself does not include any local physical interactive interface (such as buttons or touch-screen) for being physically or manually configured or controlled by the user 343. Further, the communication link 342 is used only for carrying data as part of the tunneling functionality and for related OA&M functions.

While the arrangement 340 shown in FIG. 34 exampled the case of a single dedicated device 341, any number of dedicated devices may be equally used, and each may be similar to, or identical to, the dedicated device 341, and each may provide the tunnel functionality of any other tunnel device described herein or in any of the prior-art documents described herein above. The number of available, connected, or active dedicated devices may be equal or higher than 1, 2, 5, 10, 12, 15, 20, 30, 50, 80, 100, 120, 150, 200, 500, 1,000, 2,000, 5,000, 10,000, 20,000, 50,000, 100,000, 200,000, 500,000 or 1,000,000, or may be equal or less than 2, 5, 10, 12, 15, 20, 30, 50, 80, 100, 120, 150, 200, 500, 1,000, 2,000, 5,000, 10,000, 20,000, 50,000, 100,000, 200,000, 500,000 1,000,000, or 2,000,000. Further, the number of dedicated devices out of the total number of available, connected, or active tunnels may be equal or higher than 1%, 2%, 3%, 5%, 10%, 15%, 20%, 25%, 30%, 35%, 40%, 45%, 50%, 55%, 60%, 70%, 80%, or 90%, or may be equal or less than 2%, 3%, 5%, 10%, 15%, 20%, 25%, 30%, 35%, 40%, 45%, 50%, 55%, 60%, 70%, 80%, 90%, or 95%.

Similar to other tunnel devices, information associated with any of the dedicated devices may be collected and stored, as shown in the table 330 shown in FIG. 33 and in the table 100 shown in FIG. 10, and stored in the Tunnel List database 73 that is part of, or connected to, the Tunnel Bank Server 71. Alternatively or in addition, information related to, collected by, or applicable to dedicated devices may be stored in the Dedicated Database 345*c* that may be part of, or connected to, the server 345. An example of a table 360 that includes information regarding seven (7) dedicated devices is shown in FIG. 36.

A top row 361 names the attribute type of dedicated devices related information, and each of the other rows may correspond to a single dedicated box. For example, a first content row 361*a* may correspond to a first dedicated device, a second row 361*b* may correspond to a second dedicated device, a third row 361*c* may correspond to a third dedicated device, a fourth row 361*d* may correspond to a fourth dedicated device, a fifth row 361*e* may correspond to a fifth dedicated device, a sixth row 361*f* may correspond to a sixth dedicated device, and a seventh row 361*g* may correspond to a seventh dedicated device.

An attribute type may relate to a timing of a registration, a timing of a first connecting to the Internet, or a timing of first powering up by the user 343. A first column 362*a*, named ‘Registration Date-Time’, may correspond to such a timing on an event relating to the respective tunnel operation, such as the last time when the dedicated box (serving as a tunnel device) connected to the Internet, or when the dedicated box (serving as a tunnel device) connected to a specific entity, such as to the Dedicated Boxes manager server 345, to the TB server 71, or the SP server 72. In the examples shown in the table 360, a relating timing information relating the first dedicated box corresponding to the first row 361*a* is shown as a date August 3 and a time 17:23, a relating timing information relating the second dedicated box corresponding to the second row 361*b* is shown as a date April 6 and a time 18:23, a relating timing information relating the third dedicated box corresponding to the third row 361*c* is shown as a date February 2 and a time 01:25, a relating timing information relating the fourth dedicated box corresponding to the fourth row 361*d* is shown as a date December 6 and a time 00:55, a relating timing information relating the fifth dedicated box corresponding to the fifth row 361*e* is shown as a date October 3 and a time 02:18, a relating timing information relating the sixth dedicated box corresponding to the sixth row 361*f* is shown as a date October 6 and a time 04:39, and a relating timing information relating the seventh dedicated box corresponding to the seventh row 361*g* is shown as a date October 7 and a time 19:16.

Another attribute may be for uniquely identifying each of the physical dedicated boxes. In one example, an IP address may be used, which is identifying the corresponding dedicated box in the Internet 113. In one example, this identifier may be identical to the corresponding identifier shown in column 102*b* of the table 100. Alternatively or in addition, the attribute type may be associated with the communication link involving the connecting of a dedicated box to the Internet 113. A second column 362*b*, named ‘Dedicated Device IP Address’, may correspond to such identifier. In the examples shown in the table 360, a relating IP address associated with the first dedicated box corresponding to the first row 361*a* is shown as 79.13.104.151, a relating IP address associated with the second dedicated box corresponding to the second row 361*b* is shown as 177.93.11.18, a relating IP address associated with the third dedicated box corresponding to the third row 361*c* is shown as 160.117.190.26, a relating IP address associated with the fourth dedicated box corresponding to the fourth row 361*d* is shown as 80.223.229.63, a relating IP address associated with the fifth dedicated box corresponding to the fifth row 361*e* is shown as 189.89.232.94, a relating IP address associated with the sixth dedicated box corresponding to the sixth row 361*f* is shown as 64.139.197.18, and a relating IP address associated with the seventh dedicated box corresponding to the seventh row 361*g* is shown as 206.190.230.83. As an alternative or in addition to IP address, a MAC address or host name may be equally used for identifying the dedicated devices in the system.

Another attribute may be the geographic location of each of the physical dedicated boxes. In one example, this identifier may be identical to the corresponding identifier shown in column 102*c* of the table 100. Such location may be based on actual geographical location or on IP geolocation, such as by using W3C Geolocation API. Alternatively or in addition, the geographical location for a dedicated device, such as the dedicated device 341, may be entered by the respective user, such as the user 343 using the associated computer 344. A third column 362*c*, named ‘Device Geographic Location’, may correspond to such location. In the examples shown in the table 360, a relating location associated with the first dedicated box corresponding to the first row 361*a* is shown as ‘Bangkok, Thailand’, a relating location associated with the second dedicated box corresponding to the second row 361*b* is shown as ‘Tokyo, Japan’, a relating location associated with the third dedicated box corresponding to the third row 361*c* is shown as ‘Denver, CO, USA’, a relating location associated with the fourth dedicated box corresponding to the fourth row 361*d* is shown as ‘Kiev, Ukraine’, a relating location associated with the fifth dedicated box corresponding to the fifth row 361*e* is shown as ‘Tel Aviv, Israel’, a relating location associated with the sixth dedicated box corresponding to the sixth row 361*f* is shown as ‘London, UK’, and a relating location associated with the seventh dedicated box corresponding to the seventh row 361*g* is shown as ‘Taipei, Taiwan’. As an alternative or in addition to IP address, a MAC address or host name may be equally used for identifying the dedicated devices in the system. While the geographical locations in the ‘Device Geographic Location’ column 362*c* are cities, it is noted that any identification of a geographical location may be equally used, such as a continent, a country, a region, a city, a street, a ZIP code, or a timezone. Further, a specific building address (such as numbered address) or even a floor or an apartment number in a building may be used as part of the geographical location. In one example, the user, such as the user 343, defines the address to which a dedicated device, such as the dedicated box 341, is to be sent or provided, and this address is used as the device geographical location in the ‘Device Geographic Location’ column 362*c*.

As an alternative, or in addition, to the IP addresses of the dedicated devices shown in the column “Dedicated Device IP Address” 362*b*, the addresses of the dedicated devices may be uniquely assigned to a device by its manufacturer (such as programmed during manufacturing) or by its installer or user. The address may be a permanent and globally unique identification, and may be software-based or hardware-based. In one example, a Media Access Control address (MAC address) may be used, which is a unique identifier assigned to a Network Interface Controller (NIC) for use as a network address in communications within a network segment. Within the Open Systems Interconnection (OSI) network model, MAC addresses are used in the medium access control protocol sublayer of the data link layer. As typically represented, MAC addresses are recognizable as six groups of two hexadecimal digits, separated by hyphens, colons, or without a separator. The address may be layer 2 address such as MAC address (e.g., MAC-48, Extended Unique Identifier (EUI) EUI-48, or EUI-64). Typically, MAC addresses are assigned by device manufacturers, and are therefore often referred to as the burned-in address, or as an Ethernet hardware address, hardware address, or physical address. Each address can be stored in hardware, such as the card's read-only memory, or by a firmware mechanism. The address typically includes a manufacturer's Organizationally Unique Identifier (OUI). MAC addresses are typically formed according to the principles of two numbering spaces based on Extended Unique Identifiers (EUI) managed by the Institute of Electrical and Electronics Engineers (IEEE): EUI-48, which replaces the obsolete term MAC-48, and EUI-64.

A fourth column 362*d*, named "Device ID" may correspond to such memory based burned-in addresses of the dedicated devices. In the examples shown in the table 360, a relating ID (such as associated MAC address) associated with the first dedicated box corresponding to the first row 361*a* is shown as 'MAC #1', a relating ID associated with the second dedicated box corresponding to the second row 361*b* is shown as 'MAC #2', a relating ID associated with the third dedicated box corresponding to the third row 361*c* is shown as 'MAC #3', a relating ID associated with the fourth dedicated box corresponding to the fourth row 361*d* is shown as 'MAC #4', a relating ID associated with the fifth dedicated box corresponding to the fifth row 361*e* is shown as 'MAC #5', a relating ID associated with the sixth dedicated box corresponding to the sixth row 361*f* is shown as 'MAC #6', and a relating location associated with the seventh dedicated box corresponding to the seventh row 361*g* is shown as 'MAC #7'.

Using an internal timer, the duration of a dedicated device availability (such as the duration when the dedicated device is actually connected to the Internet 113) or the duration of actual usage of serving as a tunnel device may be metered. In one example, such availability duration may be used in order to compensate the respective user (such as the user 343) for the effort of obtaining and installing the respective dedicated box. A fifth column 362*e*, named "Operation Duration (Hours)" may correspond to the metered duration of operation in a specified time period, exampled in the column 362*e* as one (1) month, that may be a calendar month or a rolling month starting at the registration as recorded in the Column 362*a*. The duration associated with the first dedicated box corresponding to the first row 361*a* is shown as 720 hours, which corresponds to full continuous 30 days of operation during the specified month, and similarly the duration associated with the sixth dedicated box corresponding to the sixth row 361*f* is also shown as 720 hours, suggesting full month continuous operation. The duration associated with the third dedicated box corresponding to the third row 361*c* is shown as 360 hours, and similarly the duration associated with the fifth dedicated box corresponding to the fifth row 361*e* is shown as 360 hours, both correspond to operation around half of the time (15 days) out of the 30-days period of the specified month. The duration associated with the second dedicated box corresponding to the second row 361*b* is shown as 33 hours, the duration associated with the fourth dedicated box corresponding to the fourth row 361*d* is shown as 74 hours, and the duration associated with the seventh dedicated box corresponding to the seventh row 361*g* is shown as 108 hours.

The metering of the operational or availability durations may be performed by the dedicated boxes using an internal timing mechanism, such as by the dedicated box 341, and periodically or at the end of a specified time period sent to the server 345 for storing the duration information therein, such as in the dedicated database 345*c*, over the communication path 347*a*. Alternatively or in addition, the availability of the operational status of each of the dedicated box may be monitored by sending a periodic 'keep-alive', from the dedicated box to the server 345 over the communication path 347*a*. Alternatively or in addition, the server 345 may periodically send a periodic 'keep-alive' request to the dedicated boxes (such over the communication path 347*a* to the dedicated box 341), which in turn respond with a message proving that the dedicated device is operational and properly connected to the Internet 113.

As an alternative or in addition to the keep-alive scheme, a 'ping' mechanism may be used. Many software platforms provide a service called 'ping' that can be used to measure round-trip latency. Ping performs no packet processing; it merely sends a response back when it receives a packet (i.e., performs a no-op), thus it is a first rough way of measuring latency. Ping operates by sending Internet Control Message Protocol (ICMP) echo requesting packets to the target host, and waiting for an ICMP response. During this process, it measures the time from transmission to reception (round-trip time) and records any packet loss. The results of the test are printed in a form of a statistical summary of the response packets received, including the minimum, maximum, and the mean round-trip times, and sometimes the standard deviation of the mean.

While exampled above regarding metering availability or operationality during a time period on one (1) month, and other time period segments may be specified, such as hours, days, weeks, months, quarters, or years. For example, the time period may be at least 1, 2, 5, 8, 10, 12, 15, 20, 25, 30, 50, 80, 100, 120, 150, 200, 500, 1,000, 2,000, 5,000, or 10,000 hours or minutes, or may be less than 2, 3, 4, 5, 8, 10, 12, 15, 20, 25, 30, 50, 80, 100, 120, 150, 200, 500, 1,000, 2,000, 5,000, 10,000 or 20,000 hours or minutes. Further, the time period may be at least 1, 2, 5, 8, 10, 12, 15, 20, 30, 50, 80, 100, 120, 150, 200, 500, 1,000, 2,000, 5,000, or 10,000 days, or may be less than 2, 3, 4, 5, 8, 10, 12, 15, 20, 25, 30, 50, 80, 100, 120, 150, 200, 500, 1,000, 2,000, 5,000, 10,000 or 20,000 days. Alternatively, the time period may be at least 1, 2, 5, 8, 10, 12, 15, 20, 30, 50, 80, 100, 120, 150, 200, 500, 1,000, 2,000, 5,000, or 10,000 weeks or months, or may be less than 2, 3, 4, 5, 8, 10, 12, 15, 20, 25, 30, 50, 80, 100, 120, 150, 200, 500, 1,000, 2,000, 5,000, 10,000 or 20,000 weeks or months.

Figure 24:
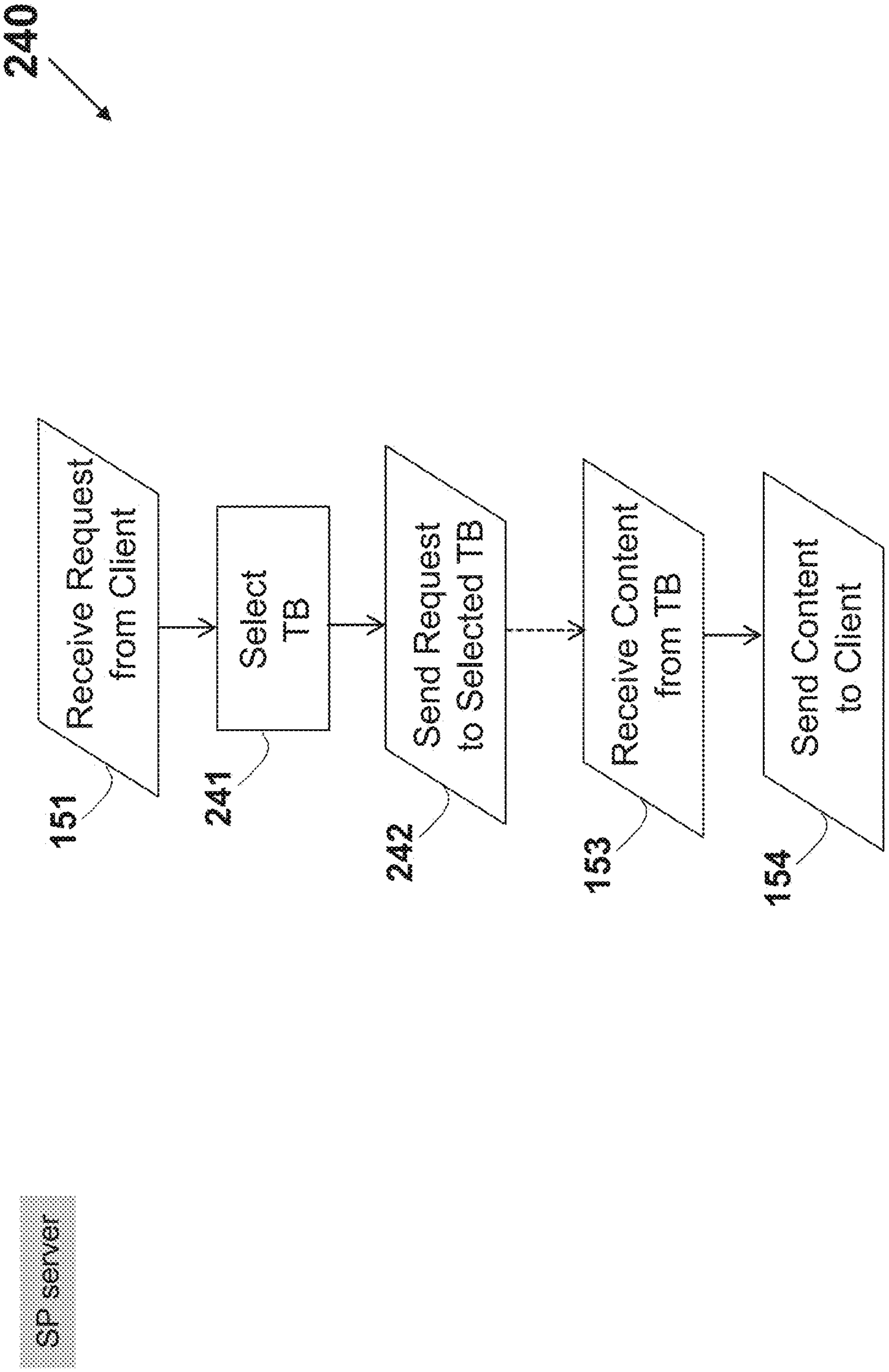
FIG. 24 (Prior Art)
FIGS. 24 and 24*a* illustrate schematically simplified flowcharts relating to a SP server using multiple TB servers.
Figure 24A:
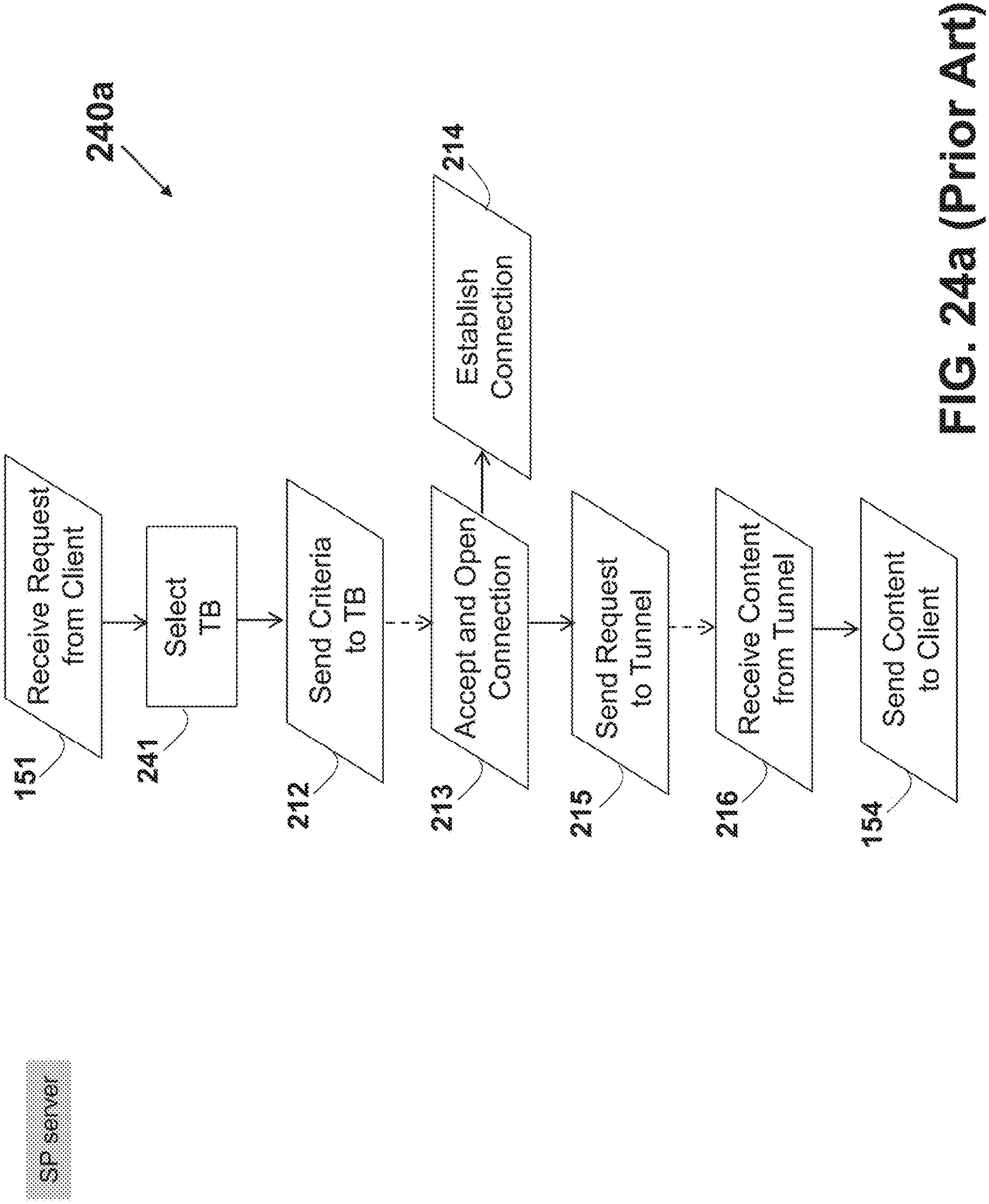
FIG. 24a (Prior Art)
Figure 24B:
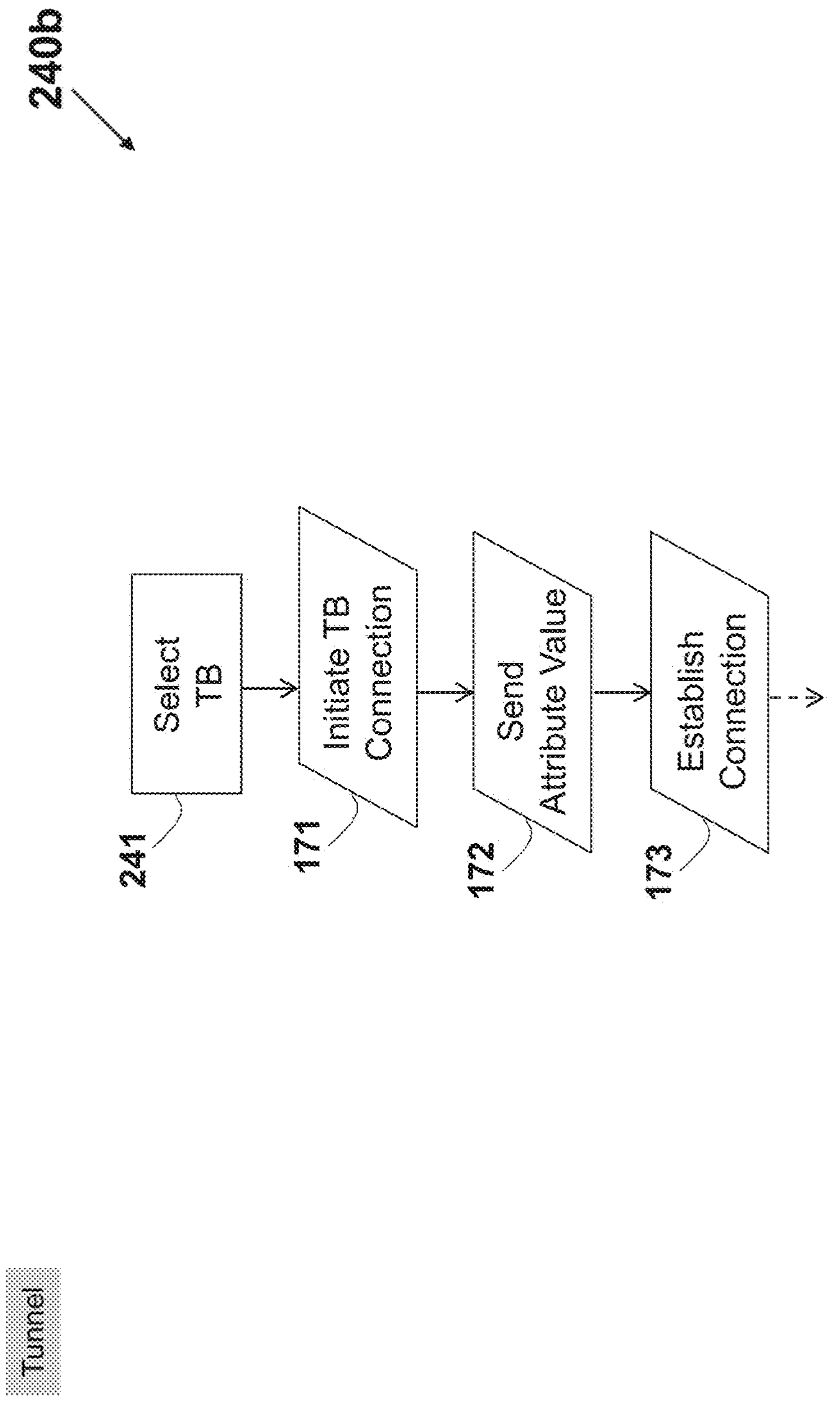
FIG. 24b (Prior Art)
FIGS. 24*b* and 24*c* illustrate schematically simplified flowcharts relating to a tunnel device using multiple TB servers.
Figure 24C:
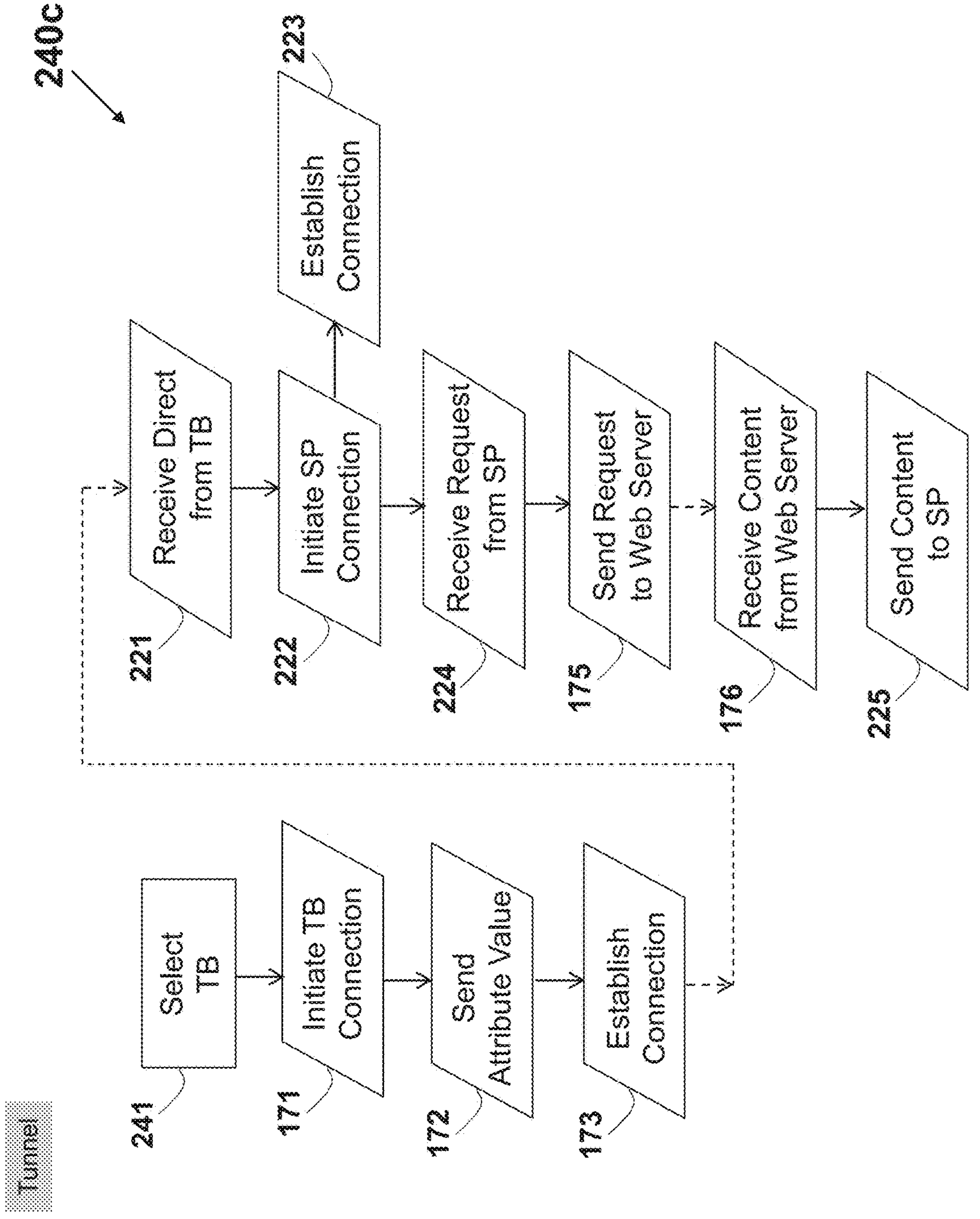
FIG. 24c (Prior Art)
Figure 25:
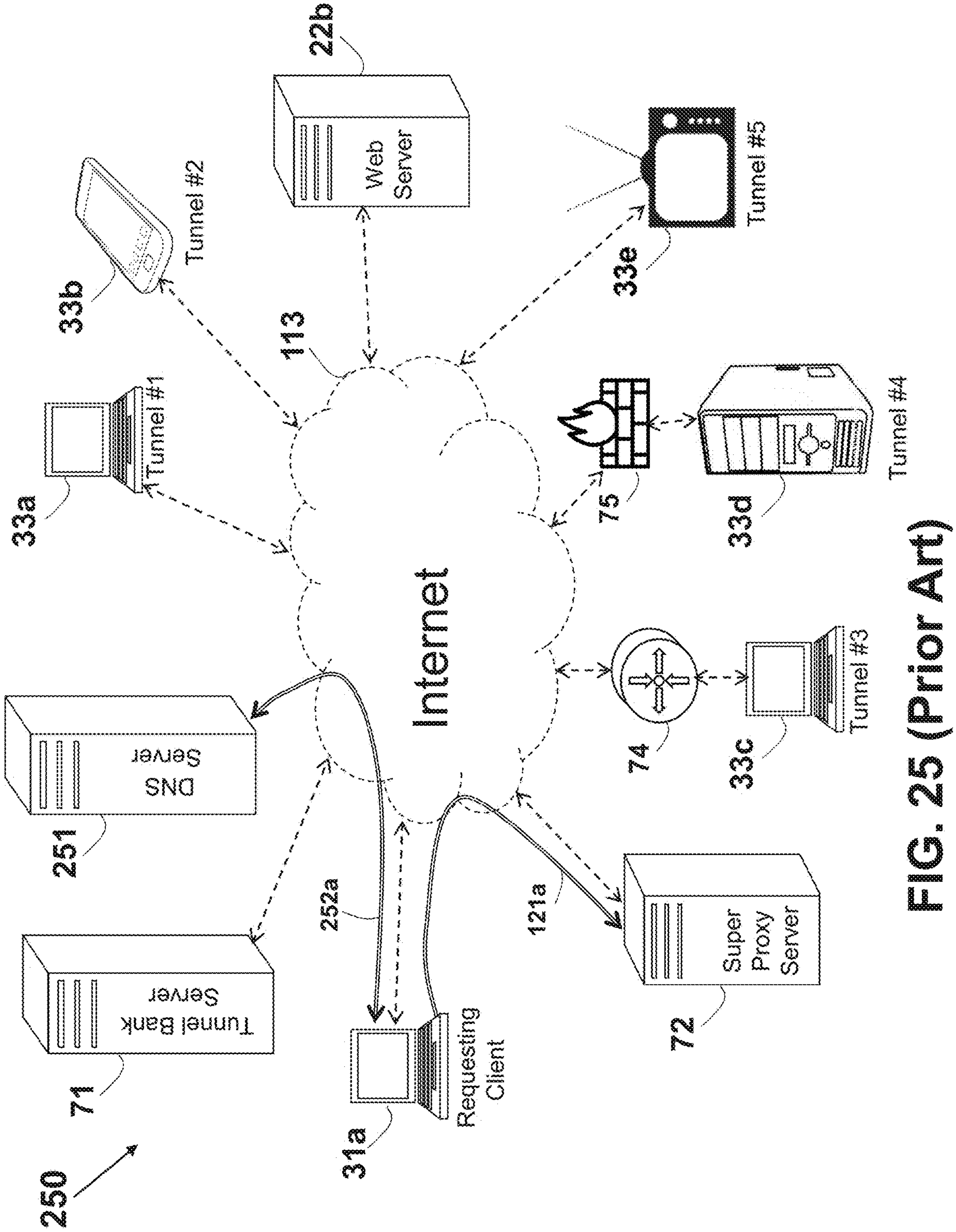
FIG. 25 (Prior Art)
FIGS. 25 and 25*a* depict schematically messages exchanged over the Internet including a DNS resolution by the client device.
Figure 25A:
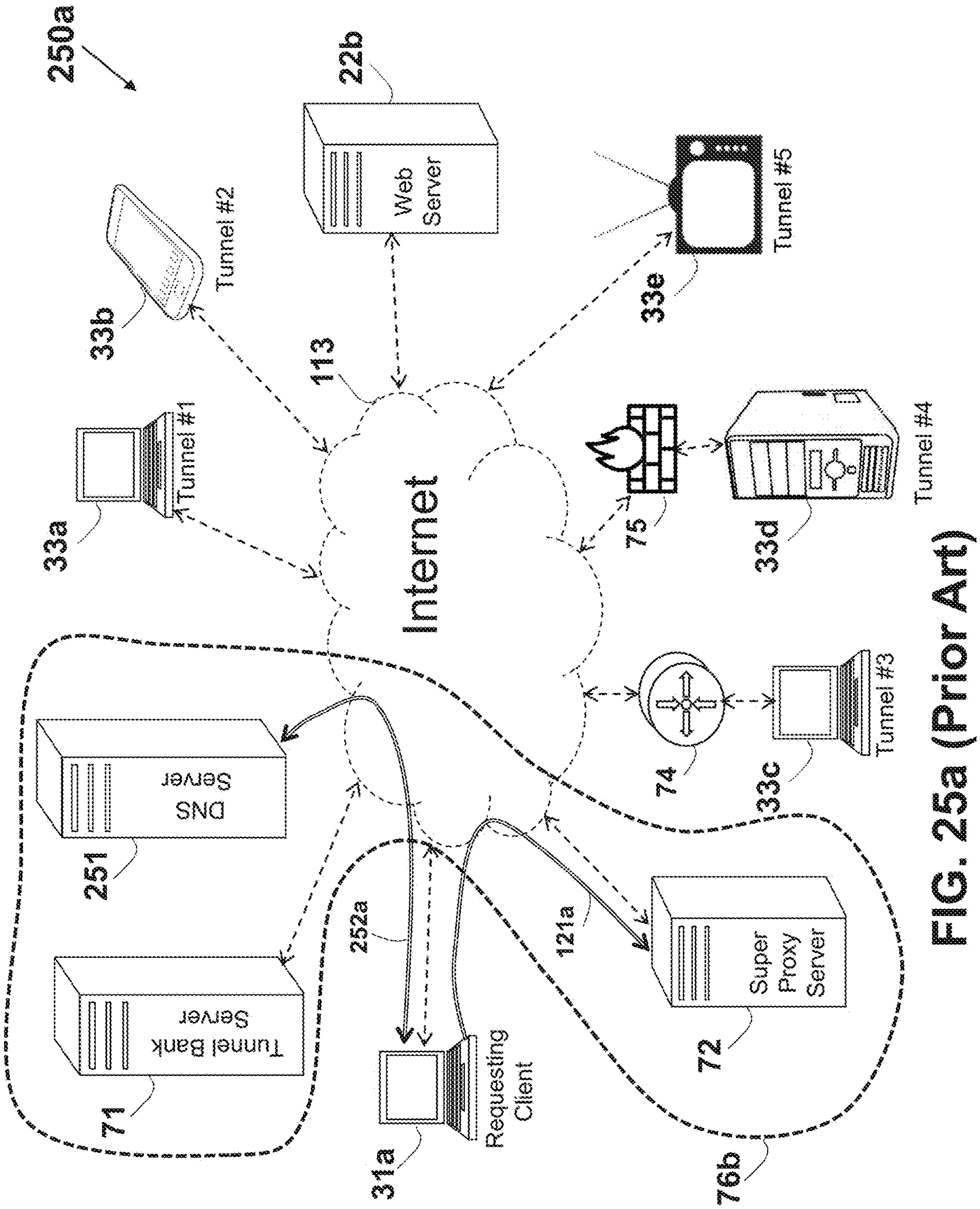
FIG. 25a (Prior Art)
Figure 26:
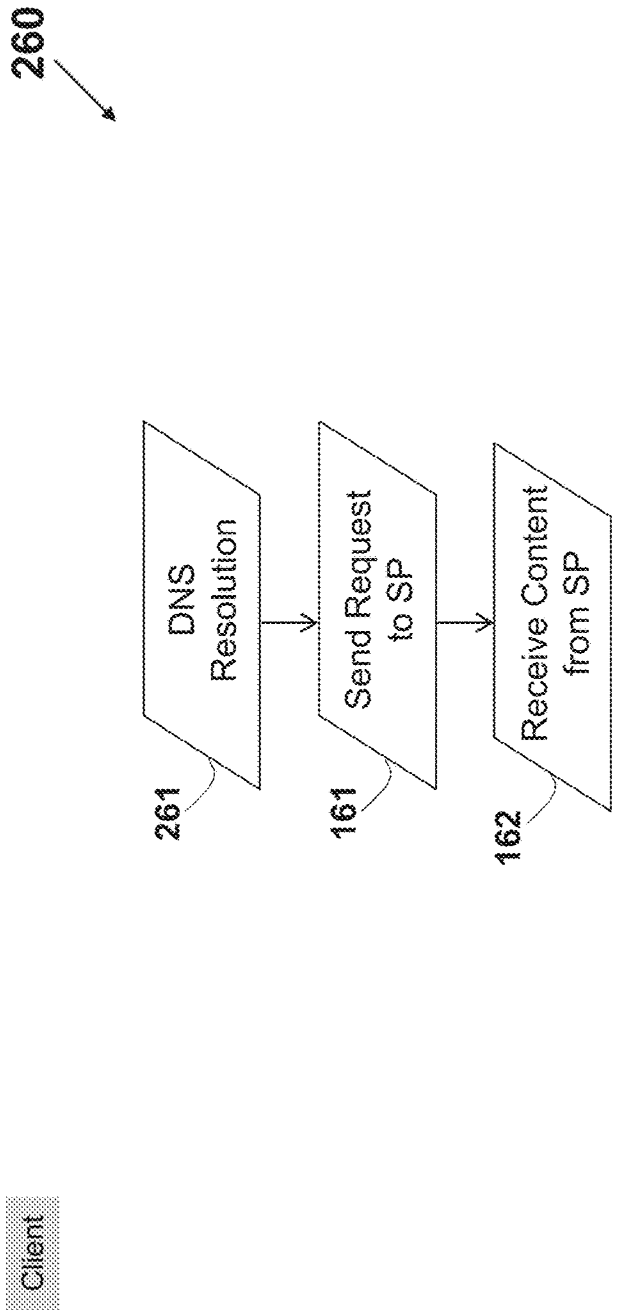
FIG. 26 (Prior Art)
FIG. 26 illustrates schematically a simplified flowchart relating to a client device that includes a DNS resolution.
Figure 27:
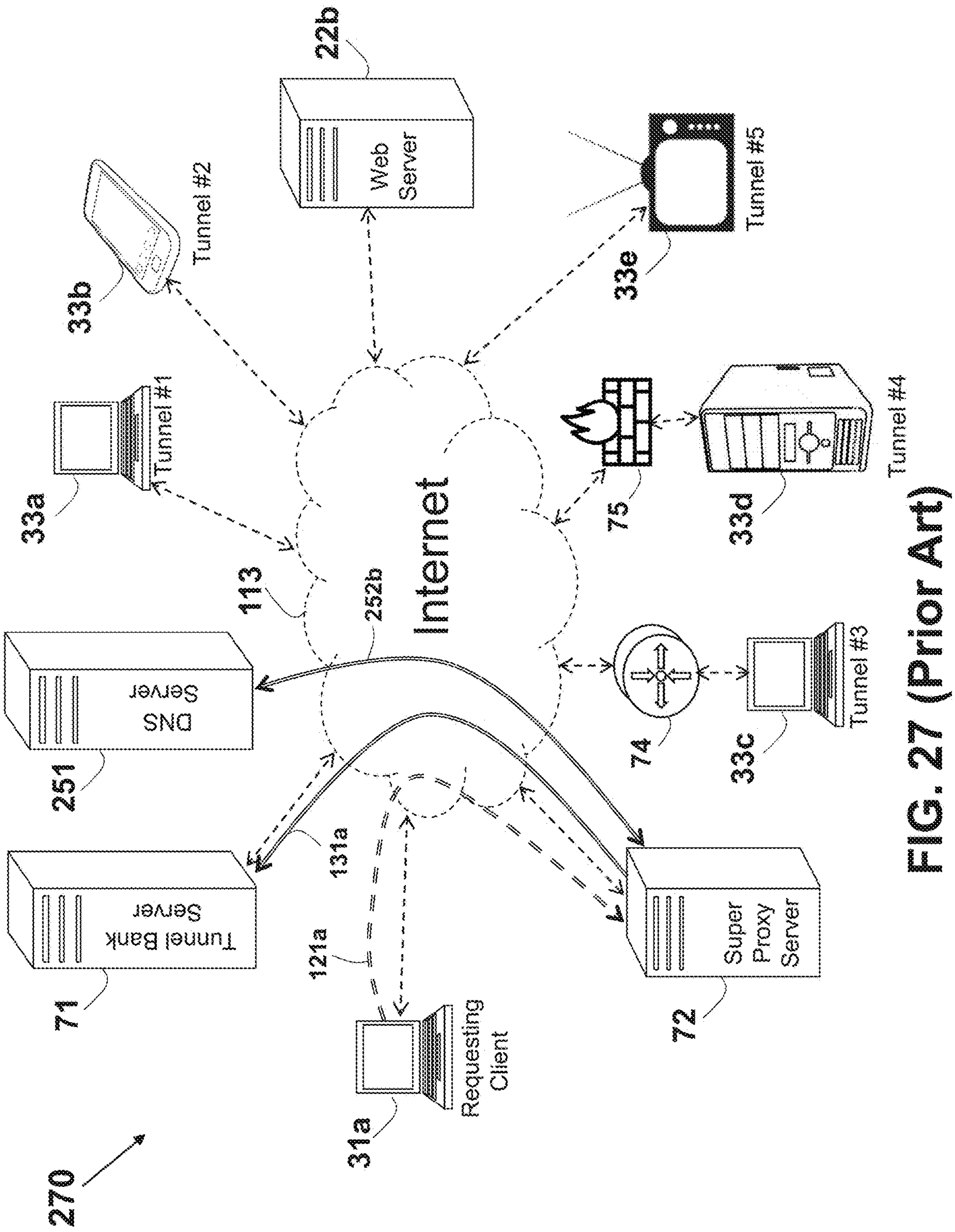
FIG. 27 (Prior Art)
FIG. 27 depicts schematically messages exchanged over the Internet including a DNS resolution by the SP server.
Figure 28:
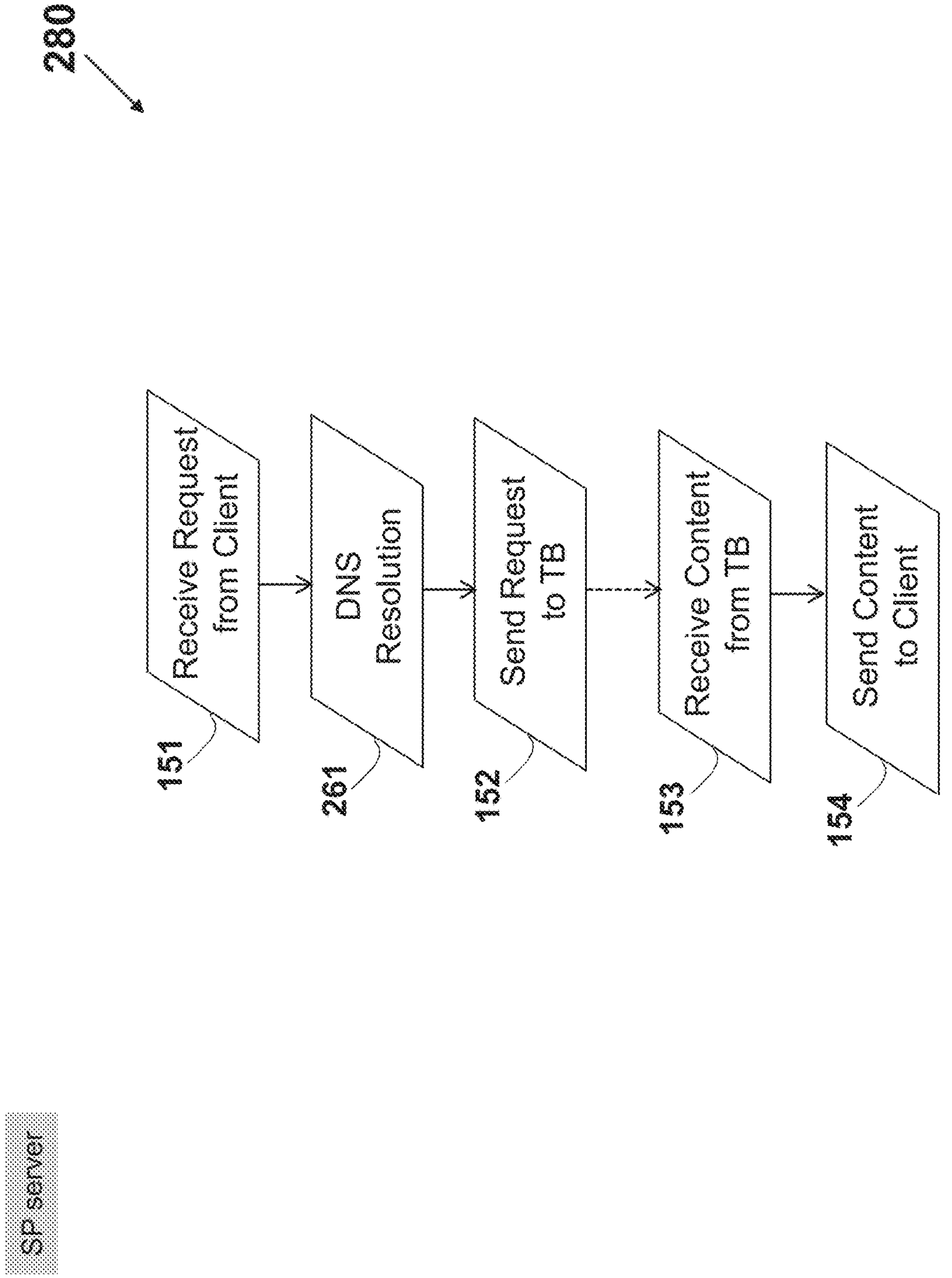
FIG. 28 (Prior Art)
FIGS. 28 and 28*a* illustrate schematically simplified flowcharts relating to the SP server that includes a DNS resolution.
Figure 28A:
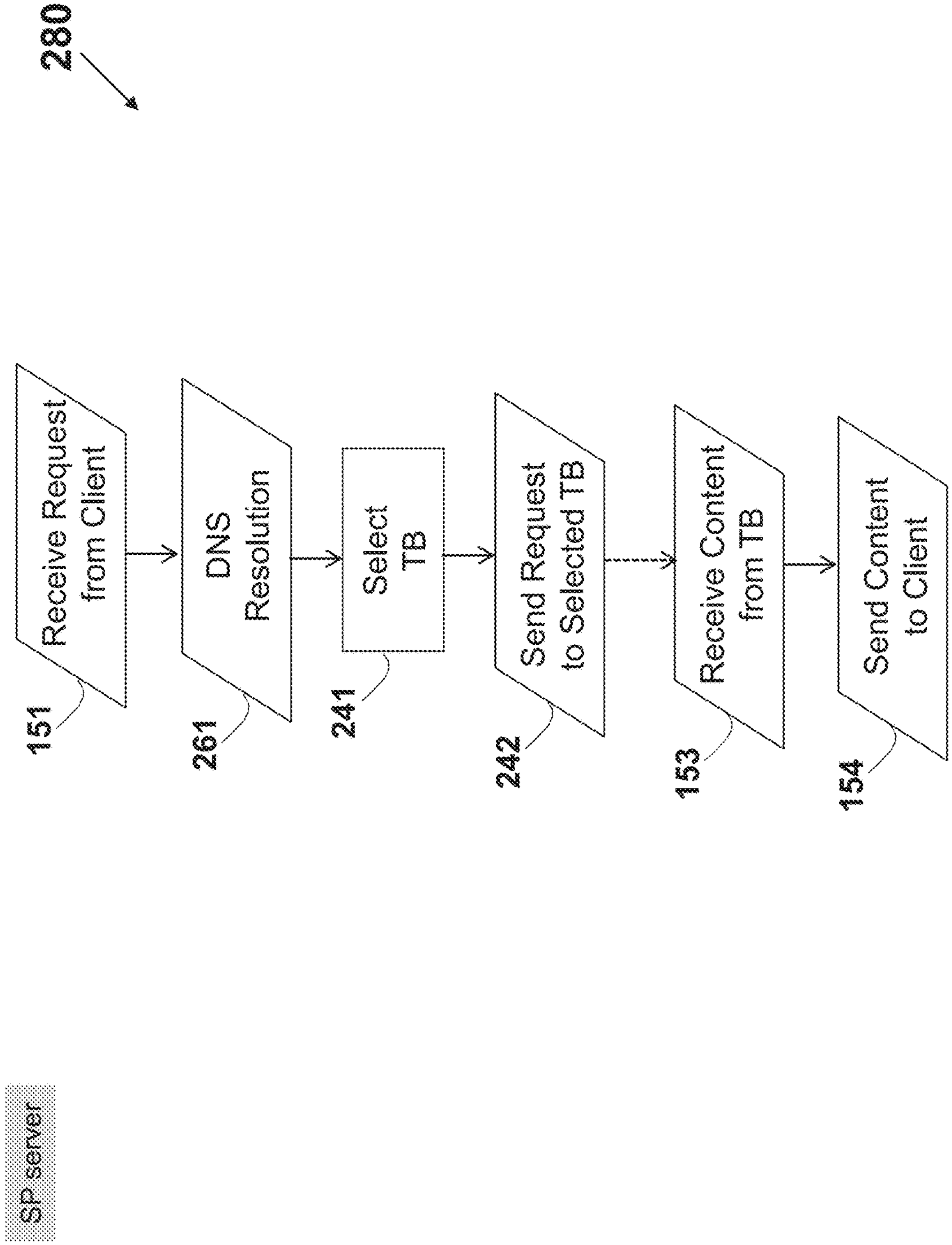
FIG. 28a (Prior Art)
Figure 29:
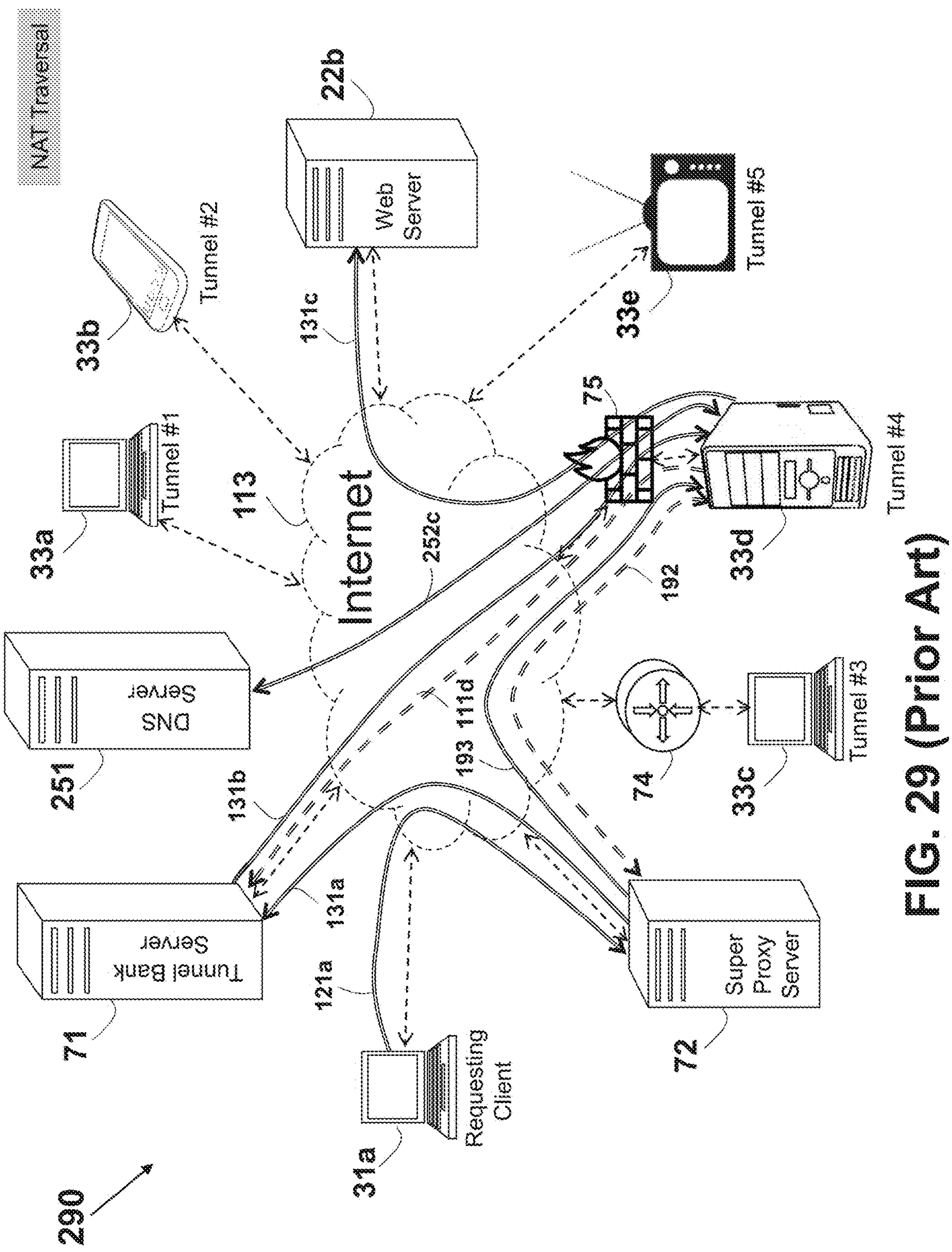
FIG. 29 (Prior Art)
FIG. 29 depicts schematically messages exchanged over the Internet including a DNS resolution by the selected tunnel device.
Figure 30:
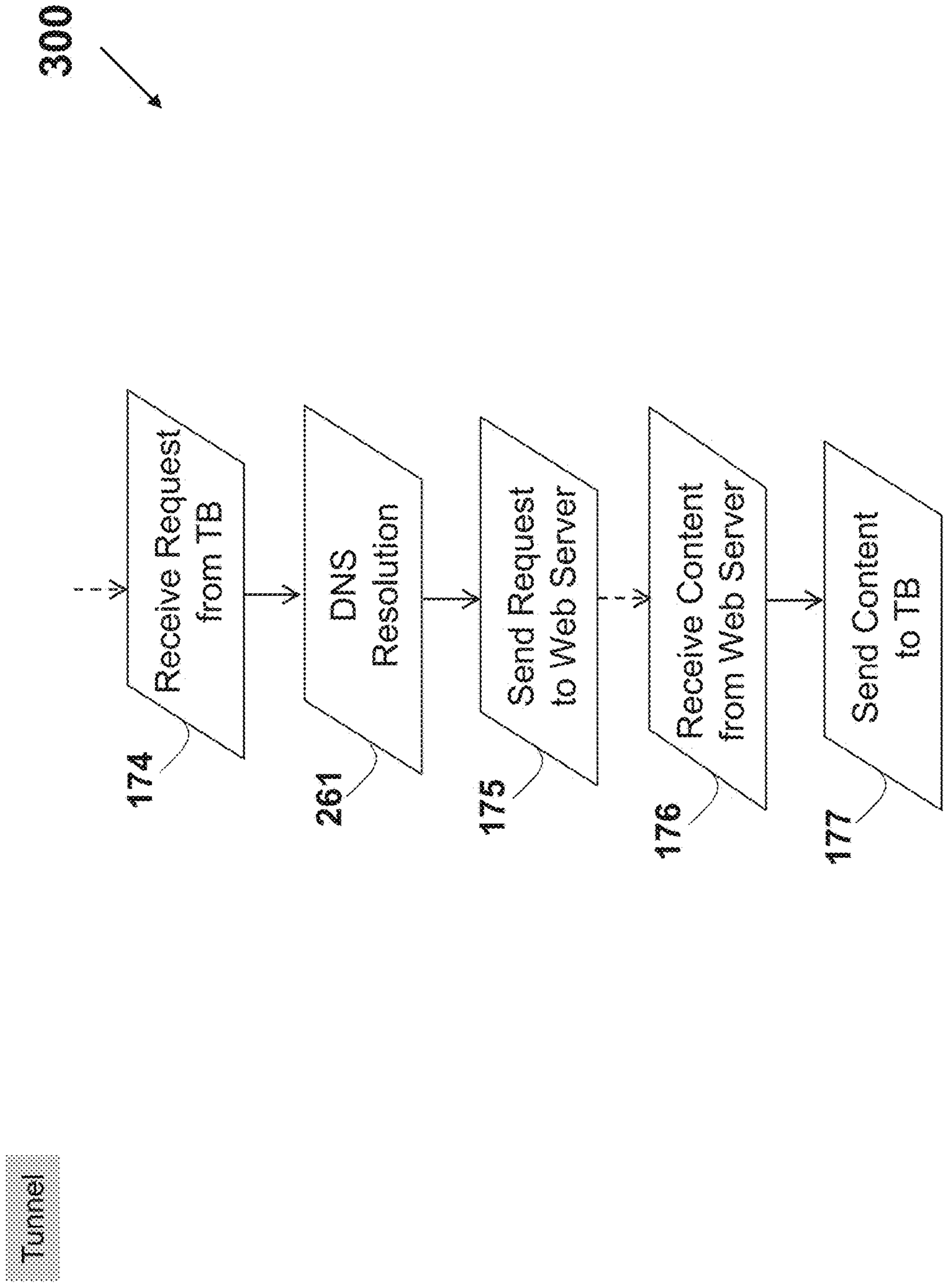
FIG. 30 (Prior Art)
FIGS. 30 and 30*a* illustrate schematically simplified flowcharts relating to the selected tunnel device that includes a DNS resolution.
Figure 30A:
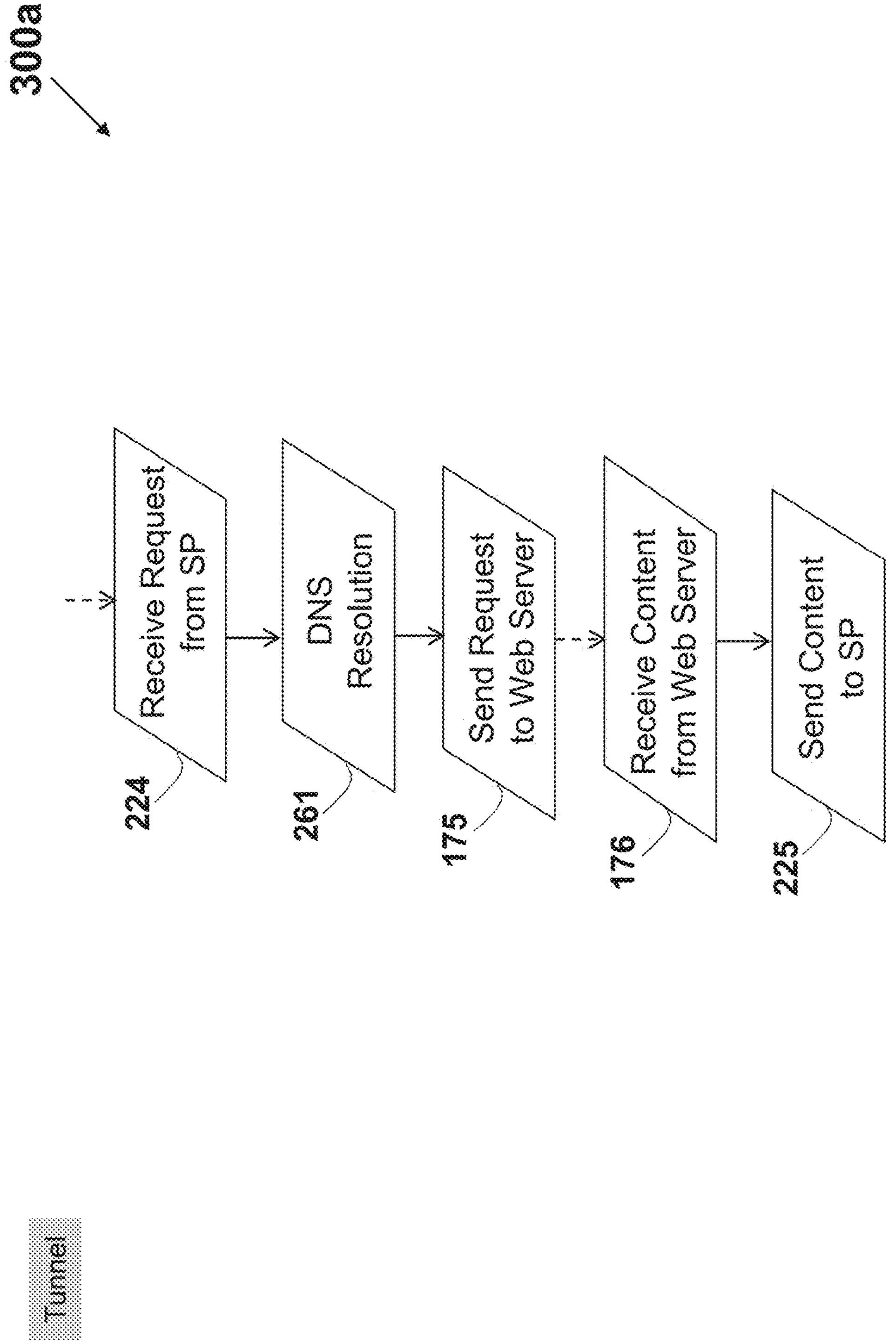
FIG. 30a (Prior Art)
Figure 32:
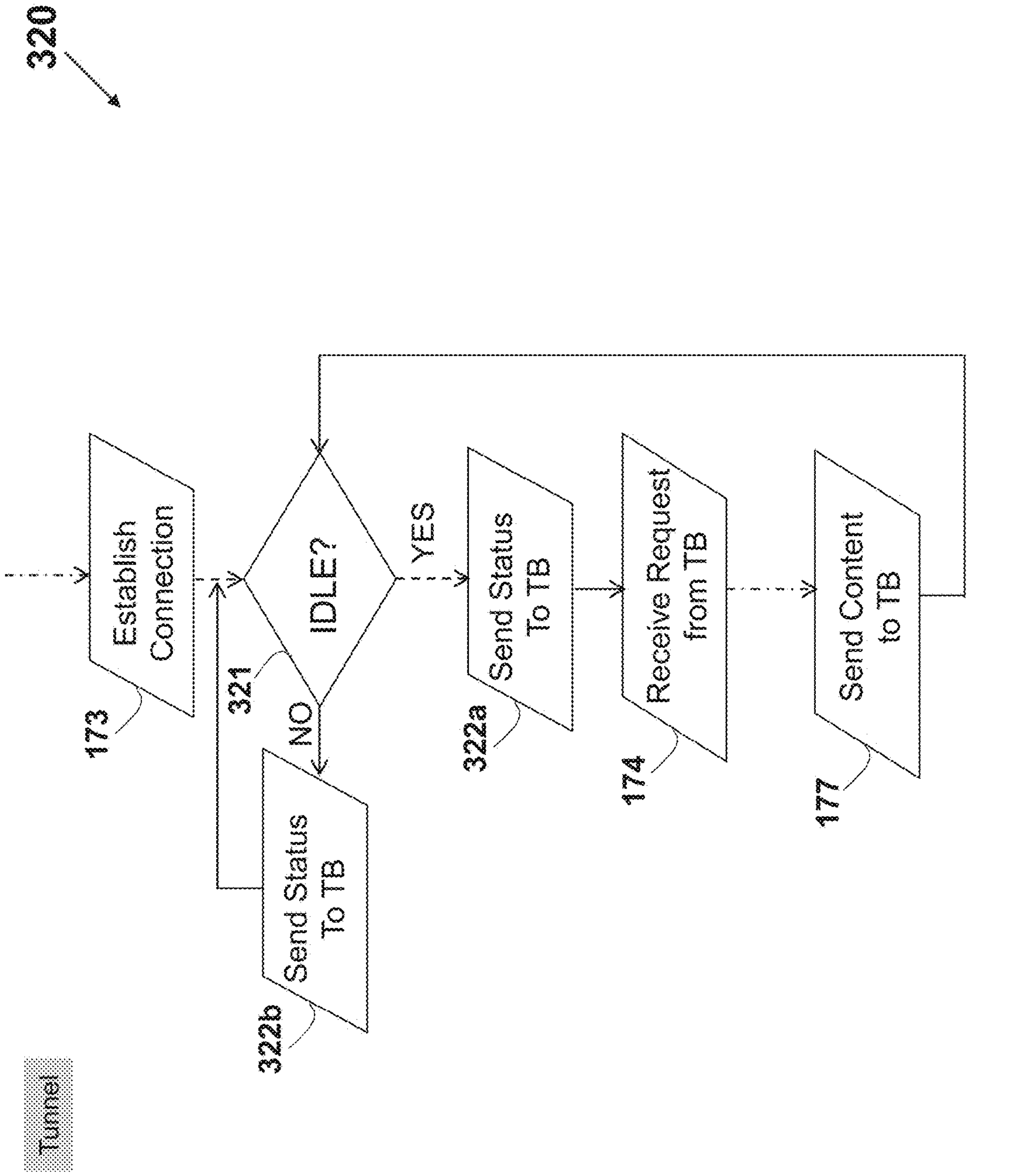
FIG. 32 (Prior Art)
FIGS. 32 and 32*a* illustrate schematically simplified flowcharts relating to a tunnel device associated with an idle state.
Figure 32A:
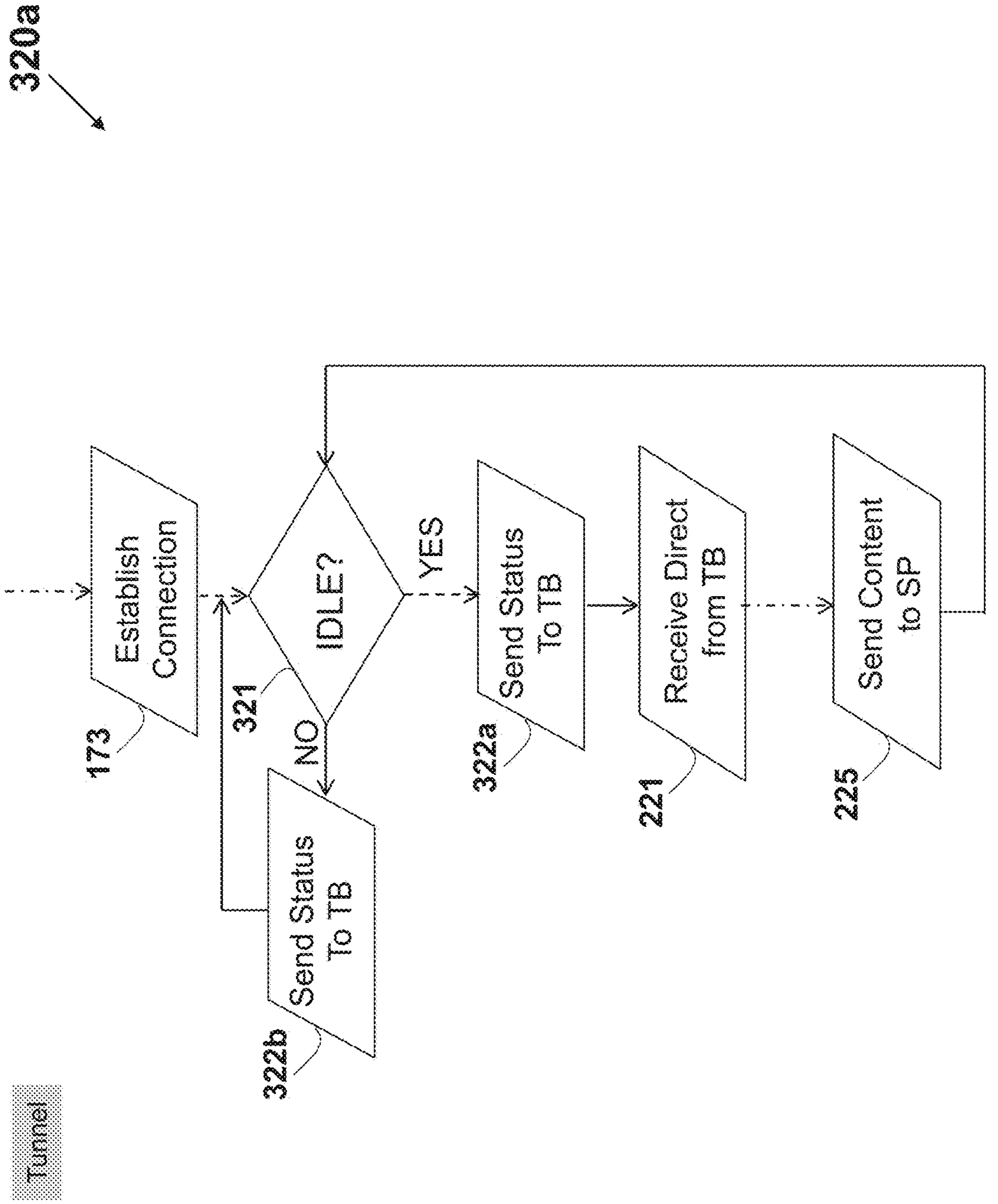
FIG. 32a (Prior Art)

The contribution of a dedicated device to the system by providing a tunnel device functionality may be metered by the duration of connection to the Internet of the dedicated box, as exampled regarding the Column "Operation Duration" 362*e*. Alternatively or in addition, the estimating of such contribution may be based on the actual traffic that flows via the dedicated device as part of the tunnel device functionality in a pre-specified time period. For example, the total size of data or content received from a web server 22*a*, such as in the "Receive Content from Web Server" step 176 in the flow chart 170 in FIG. 17, may be estimated or evaluated. Alternatively or in addition, the cumulative size of data or content sent to a server, such as in the "Send Content to TB" step 177 in the flow chart 170 in FIG. 17, may be estimated or evaluated. Similarly, the total size of data or content received from a web server 22*a*, such as in the "Receive Content from Web Server" step 176 in the flow chart 220 in FIG. 22, may be estimated or evaluated. Alternatively or in addition, the cumulative size of data or content sent to a server, such as in the "Send Content to SP" step 225 in the flow chart 220 in FIG. 22, may be estimated or evaluated. Clearly, the same applies to corresponding steps illustrated or implied in any one of the flow charts previously described (e.g., flow chart 240*c* in FIG. 24*c*, flow chart 300*a* in FIG. 30*a*, flow chart 320 in FIG. 32, flow chart 320*a* in FIG. 32*a*, etc.).

A sixth column 362*f*, named "Traffic Volume (GB)" may correspond to the metered volume of data or content when operating as tunnel in a specified time period, such as during one (1) month, that may be a calendar month or a rolling month starting at the registration as recorded in the Column 362*a*. The traffic volume associated with the first dedicated box corresponding to the first row 361*a* is shown as 100 Giga-Bytes (100 GB), and similarly the traffic volume associated with the sixth dedicated box corresponding to the sixth row 361*f* is also shown as 69 GB. The volume associated with the third dedicated box corresponding to the third row 361*c* is shown as 26 GB, and similarly the duration associated with the fifth dedicated box corresponding to the fifth row 361*e* is shown as 89 GB. The volume associated with the second dedicated box corresponding to the second row 361*b* is shown as 250 GB, the volume associated with the fourth dedicated box corresponding to the fourth row 361*d* is shown as 78 GB, and the volume associated with the seventh dedicated box corresponding to the seventh row 361*g* is shown as 53 Gb.

The metering of the traffic flowing via the dedicated device may be performed by the dedicated boxes using an internal counting mechanism, such as by the dedicated box 341, and periodically or at the end of a specified time period sent to the server 345 for storing the volume information therein, such as in the dedicated database 345*c*, over the communication path 347*a*. Alternatively or in addition, the traffic monitoring and counting may be performed by the TB server 71, the SP server 72, or any combination thereof. Further, any device or server that sends content (such as the web server 22*a*) to the dedicated device may monitor and count the flowing traffic therethrough. Alternatively or in addition, any device or server that receives content from the dedicated device may monitor and count the flowing traffic therethrough. The time period used for estimating or metering the total data or traffic through a dedicated box that is used for the "Traffic Volume (GB)" column 362*f*, may be the same as, similar to, or different from, the time period used for metering the duration of availability or operation used for the column "Operation Duration (Hours)" 362*e*.

While exampled above regarding metering of traffic or content via the dedicated boxes during a time period on one (1) month, any other time period segments may be specified, such as hours, days, weeks, months, quarters, or years. For example, the time period may be at least 1, 2, 5, 8, 10, 12, 15, 20, 25, 30, 50, 80, 100, 120, 150, 200, 500, 1,000, 2,000, 5,000, or 10,000 hours or minutes, or may be less than 2, 3, 4, 5, 8, 10, 12, 15, 20, 25, 30, 50, 80, 100, 120, 150, 200, 500, 1,000, 2,000, 5,000, 10,000 or 20,000 hours or minutes. Further, the time period may be at least 1, 2, 5, 8, 10, 12, 15, 20, 25, 30, 50, 80, 100, 120, 150, 200, 500, 1,000, 2,000, 5,000, or 10,000 days, or may be less than 2, 3, 4, 5, 8, 10, 12, 15, 20, 25, 30, 50, 80, 100, 120, 150, 200, 500, 1,000, 2,000, 5,000, 10,000 or 20,000 days. Alternatively, the time period may be at least 1, 2, 5, 8, 10, 12, 15, 20, 25, 30, 50, 80, 100, 120, 150, 200, 500, 1,000, 2,000, 5,000, or 10,000 weeks or months, or may be less than 2, 3, 4, 5, 8, 10, 12, 15, 20, 25, 30, 50, 80, 100, 120, 150, 200, 500, 1,000, 2,000, 5,000, 10,000 or 20,000 weeks or months.

In one example, a contact information for contacting and communicating a user, such as the user 343 associated with the dedicated box 341, may be stored for use by the system. For example, in case a dedicated box fails to provide the tunnel device service, such as due to not being powered, not connected to the router 74*a*, being faulty, or otherwise not being properly connected to the Internet 113 for any reason, a failure message may be sent for notifying the user of such failure. Similarly, in case of proper operation, a user, such as user 343, may be contacted for the purpose of delivering benefits, such as monetary benefits, as a compensation for the usage of the associated dedicated box. For example, the entity of the system metering the usage and/or the performance of the dedicated boxes (e.g., the managing server 345, the TB server 71, and/or the SP server 72) may initiate the notifying action. In addition to contact information, other relevant information regarding the user may be obtained and stored, such as user name, address, National ID number such as a Social Security Number (SSN), or any other information uniquely identifying the user. Further, a telephone number, such as the landline or smartphone number may be used as contact information.

A seventh column 362*g*, named "User Contact" may correspond to a contact information of the respective user of the relevant dedicated box. In one example, an electronic mail (email) address of a user may be used for contacting the user, such as by sending an email message to a respective user using the associated email address. The contact information associated with a user of the first dedicated box corresponding to the first row 361*a* is via email, shown as 'email #1', the contact information associated with a user of the fourth dedicated box corresponding to the fourth row 361*d* is via email as well, shown as 'email #2', and similarly the contact information associated with a user of the seventh dedicated box corresponding to the seventh row 361*d* is via email as well, shown as 'email #3'.

Alternatively or in addition, a physical or postal address of any respective user may be used for contacting the user, such as by sending a written message via a postal service ('snail' mail) or via a courier service. The contact information associated with a user of the second dedicated box corresponding to the second row 361*b* is via physical postal address, shown as 'Address #1', and the contact information associated with a user of the fifth dedicated box corresponding to the fifth row 361*e* is via physical or postal address as well, shown as 'Address #2'. Alternatively or in addition, a telephone number, such as a smartphone or cellular network number, may be used to contact a user, for example by using Short-Message-Service (SMS). The contact information associated with a user of the third dedicated box corresponding to the third row 361*c* is via a telephone number, shown as 'Number #1', and the contact information associated with a user of the sixth dedicated box corresponding to the sixth row 361*f* is via a telephone number, shown as 'Number #2'.

An eighth column 362*h*, named "Available" may correspond to the current availability of the dedicated box to serve as a tunnel device, where 'Y' refers to 'yes'—the respective dedicated box is available for use as a tunnel device, and 'N' refers to 'no'—the respective dedicated box is not currently available for use as a tunnel device. Since a dedicated box is not involved with anu other activities other than serving as a tunnel device, typically the mere connection to the Internet 113 renders such a dedicated box as available. As shown in the table 360, the first, fourth, fifth, and seventh dedicated devices are available ('Y'), while the second, third, and sixth dedicated devices are not available ('N'). This "Available" column 362*h* may be identical to, similar to, or different from the column 'IDLE' 102*i* of the table 330 shown in FIG. 33. This "Available" column 362*h* may be identical to, similar to, or different from the column 'IDLE' 102*i* of the table 330 shown in FIG. 33.

Figure 17:
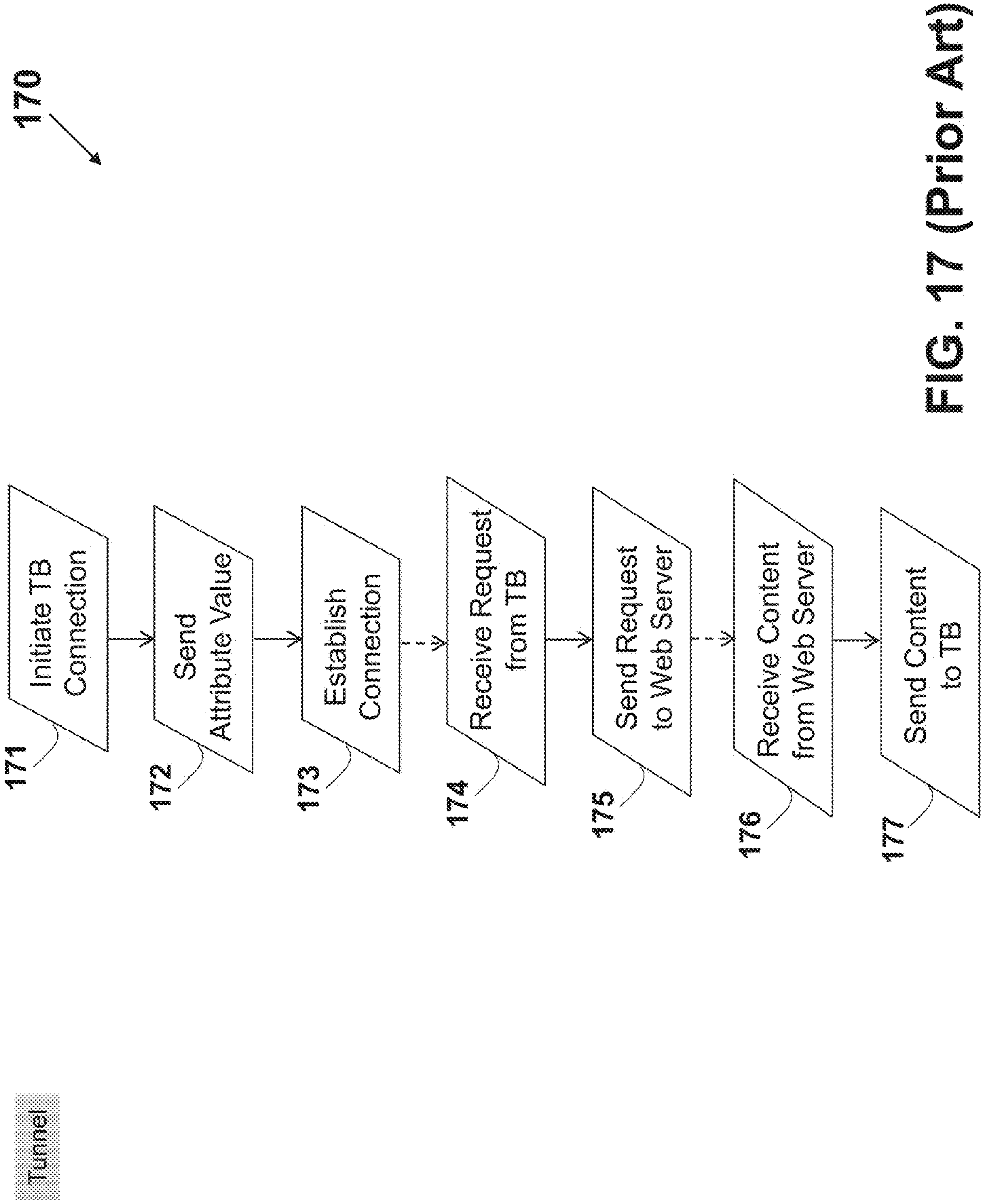
FIG. 17 (Prior Art)
FIG. 17 illustrates schematically a simplified flowchart relating to a tunnel device.
Figure 18:
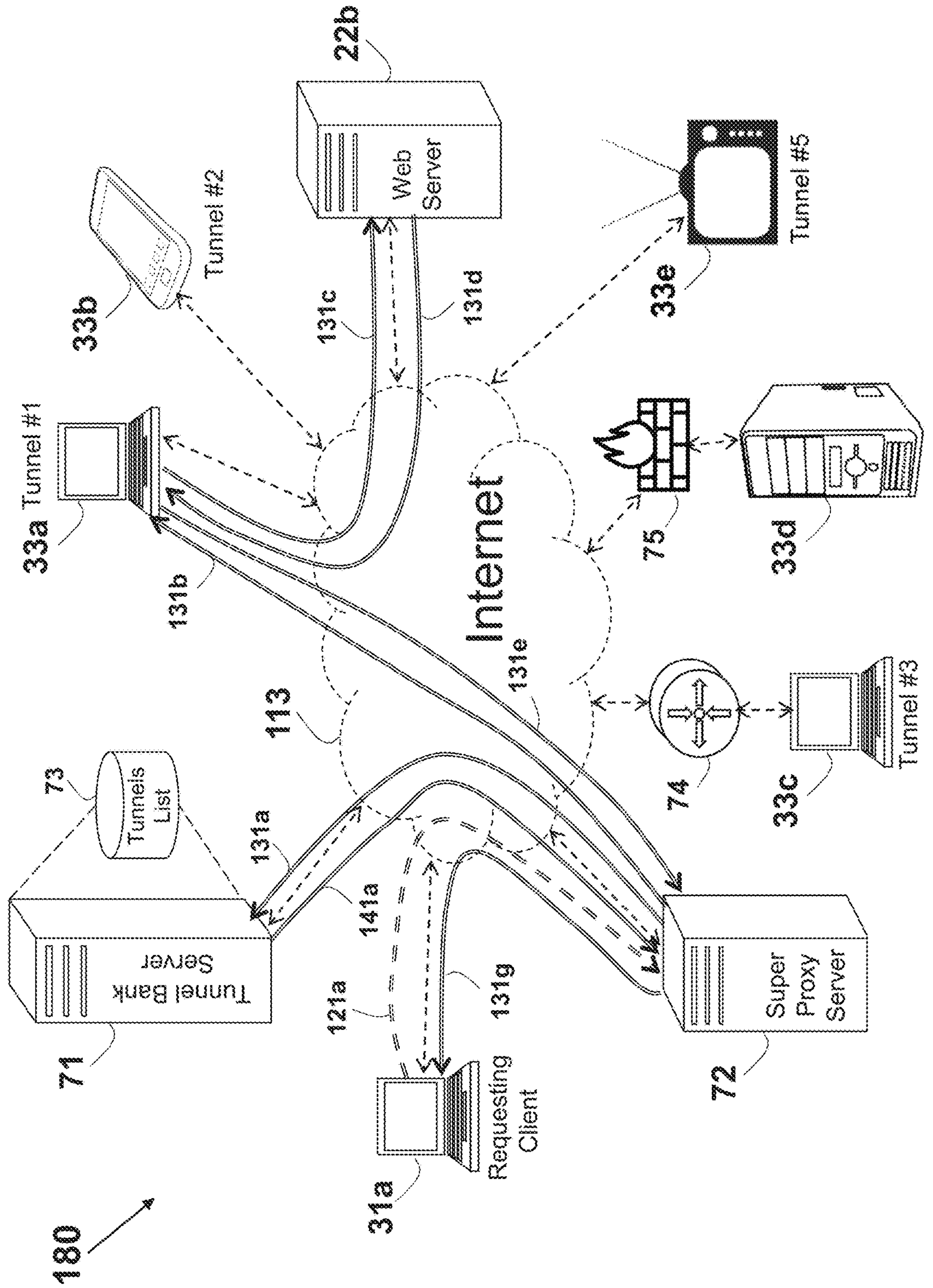
FIG. 18 (Prior Art)
FIGS. 18 and 18*a* depict schematically messages exchanged over the Internet for fetching content from the web server to the client device via a dedicated tunnel device, the TB server, and the SP server.
Figure 18A:
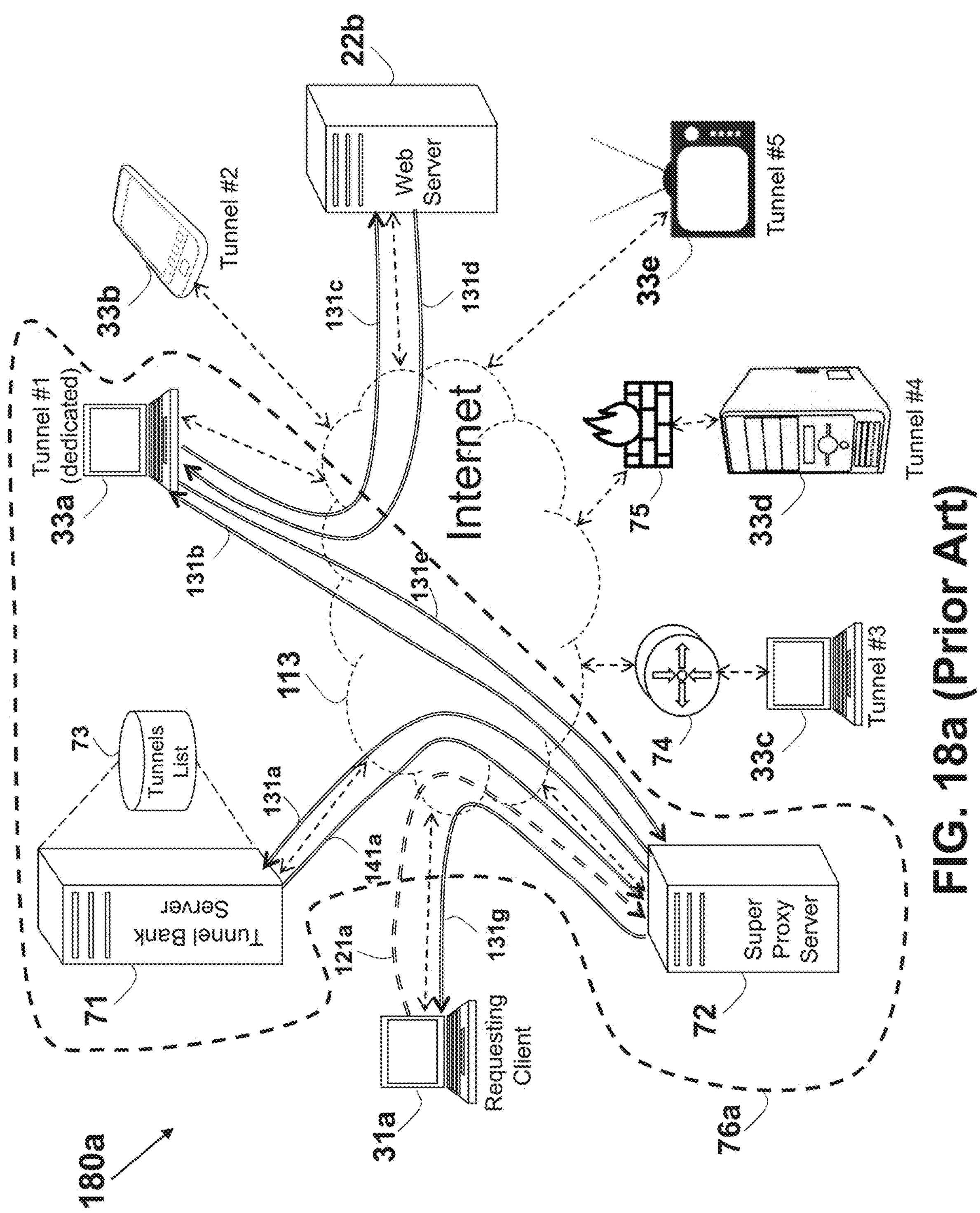
FIG. 18a (Prior Art)
Figure 19:
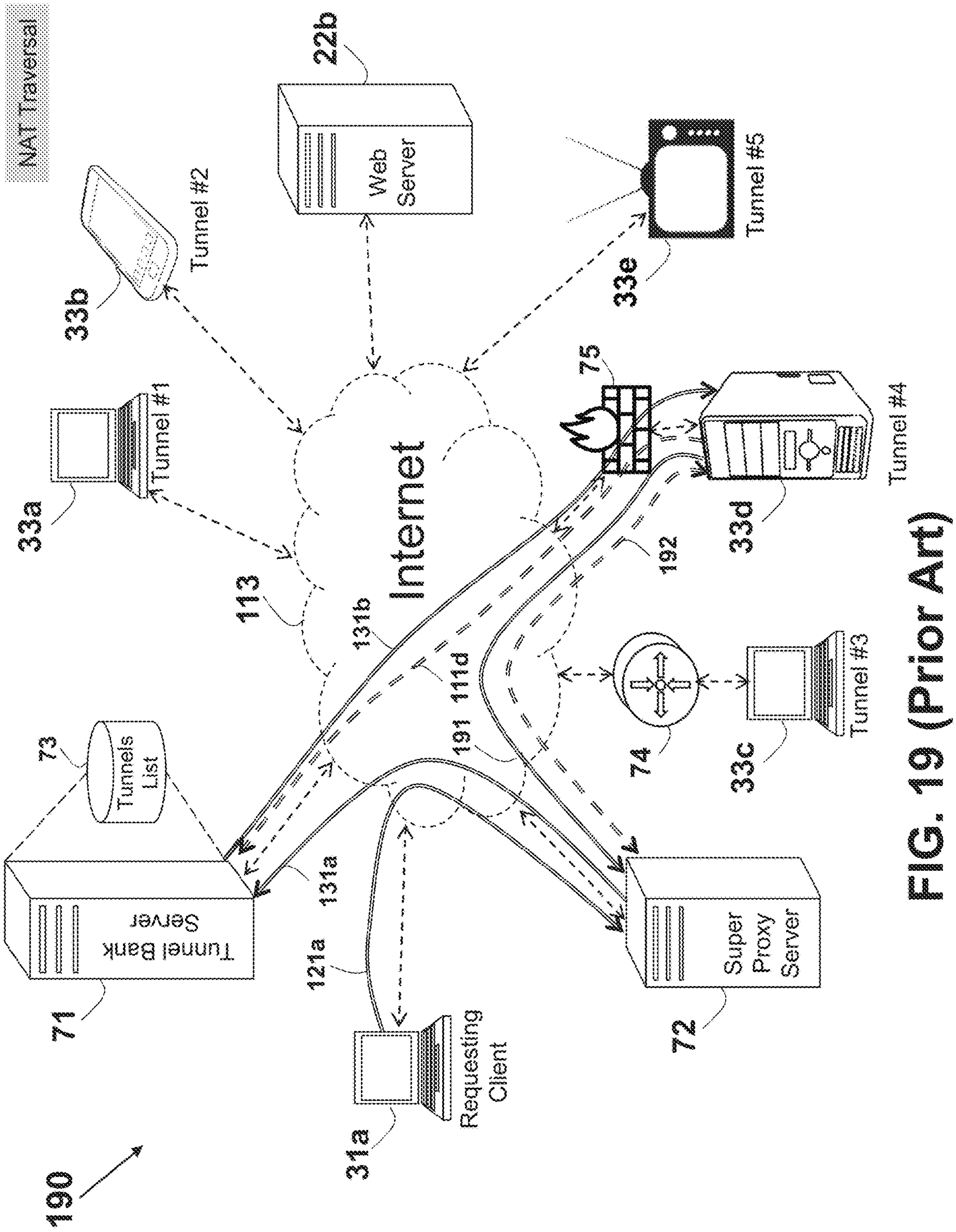
FIG. 19 (Prior Art)
FIGS. 19, 19*a*, and 19*b* depict schematically messages exchanged over the Internet in an alternative scheme for fetching content from the web server to the client device via a selected tunnel device, the TB server, and the SP server.
Figure 19A:
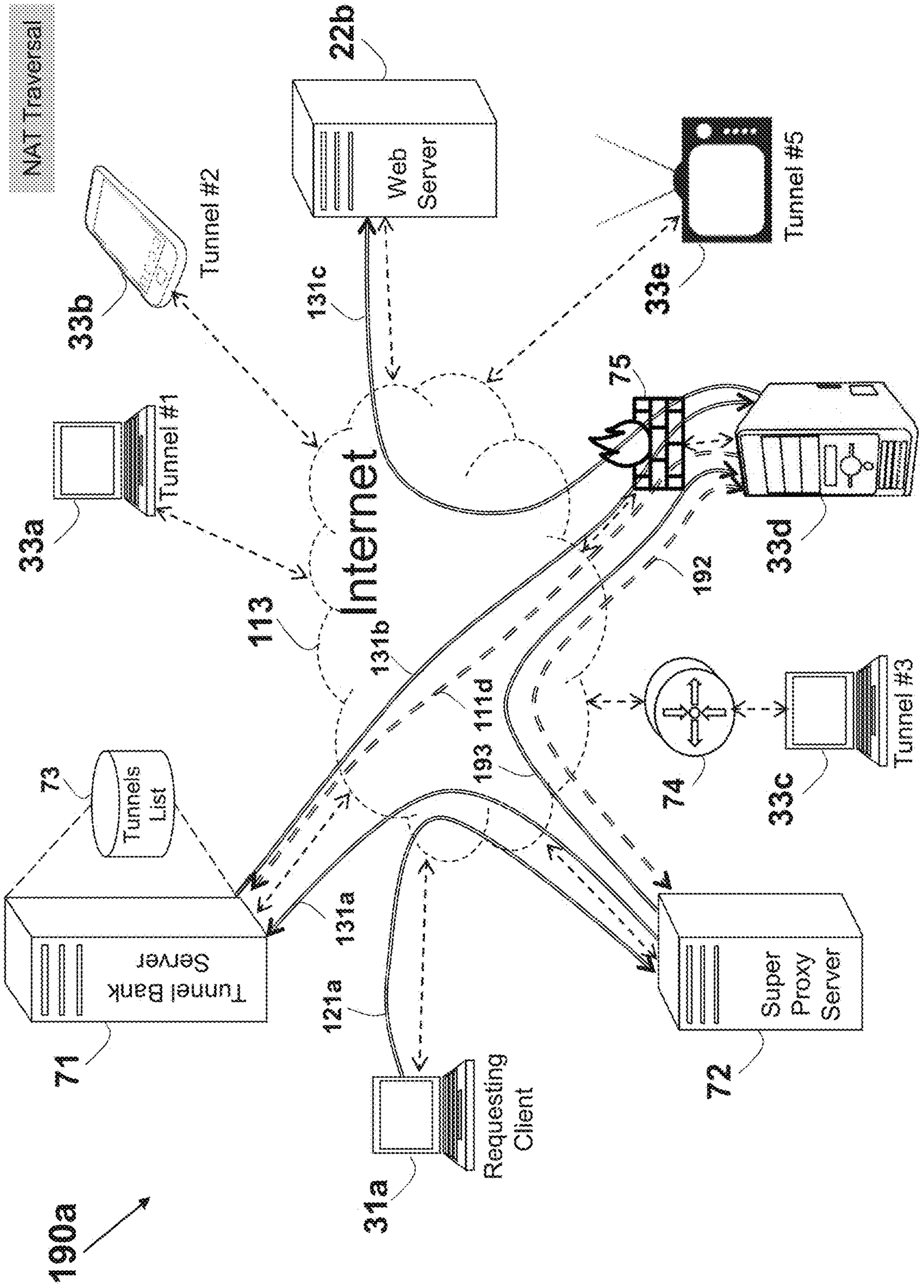
FIG. 19a (Prior Art)
Figure 19B:
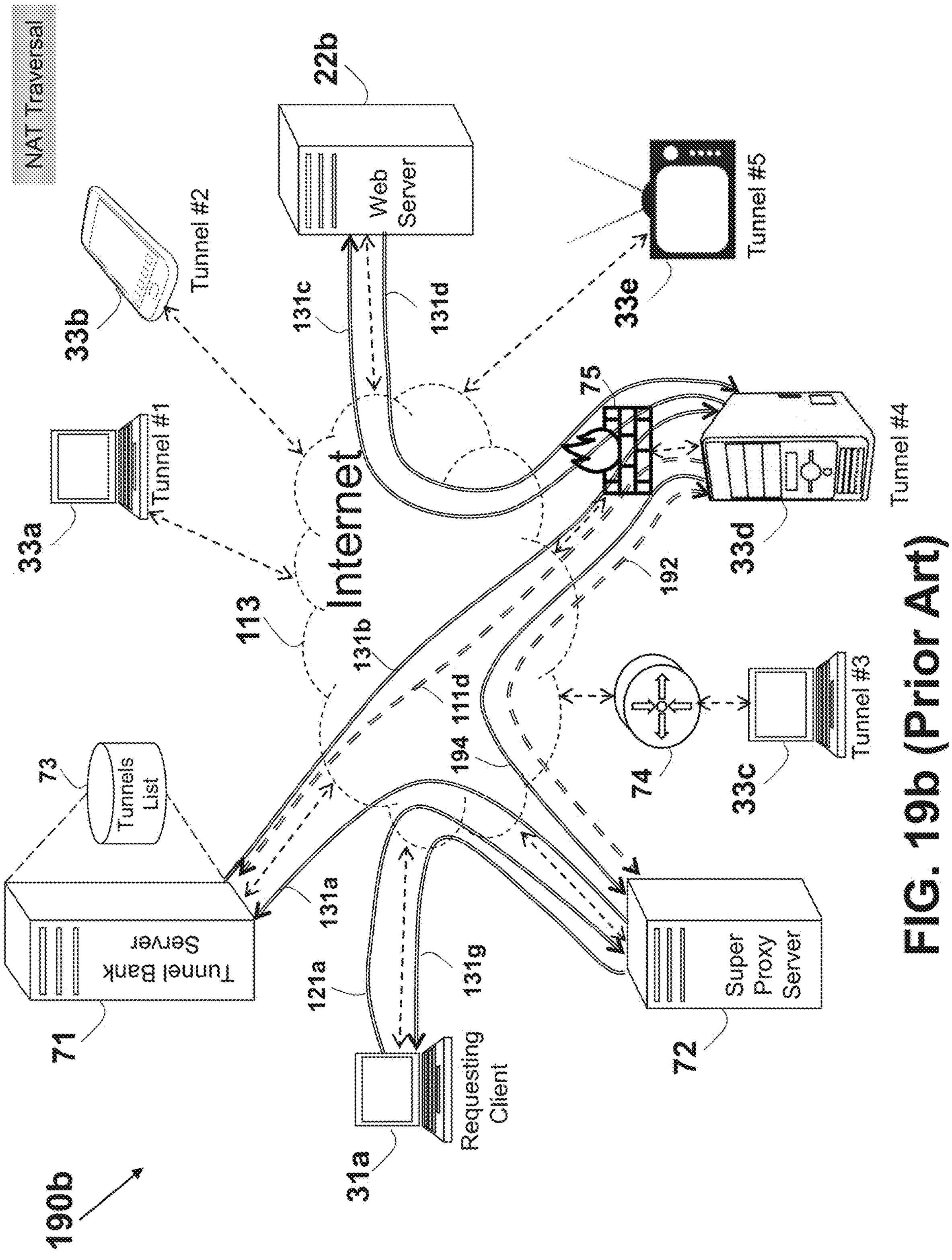
FIG. 19b (Prior Art)

The basic functionality of any dedicated box, as well as any tunnel device, is to send a request (such as URL) to a web server (such as the web server 22*a* or the web server 22*b*), typically as part of the "Send Request to Web Server" step 175 (e.g., in the flow-chart 170 shown in FIG. 17, and/or any other flow chart described herein), and to receive content therefrom as part of the "Receive Content from Web Server" step 176 (e.g., in the flow-chart 170 shown in FIG. 17, and/or any other flow chart described herein). As part of monitoring a dedicated device or any tunnel device operation, the identification of the request or the identification of the web server accessed may be recorded. For example, the requested URLs, the requested domains, or any web server identifications associated with the requests or with the content fetching may be stored, such as for future analysis. An example of storing domain names that are accessed via the fourth dedicated box is shown as a table 363 in FIG. 36, where five (5) domain names are recorded, namely Domain #1, Domain #2, Domain #3, Domain #4, and Domain #5 associated to the entry of the fourth dedicated box 361*d*.

In one example, the database 345*c* stores the identification of the last fetching actions, such as the last domains, URLs, or web-servers identifications used. For example, the number of the last domains (or URLs or servers IDs) stored may be at least 1, 2, 5, 8, 10, 12, 15, 20, 25, 30, 50, 80, 100, 120, 150, 200, 500, 1,000, 2,000, 5,000, or 10,000, or may be less than 2, 3, 4, 5, 8, 10, 12, 15, 20, 25, 30, 50, 80, 100, 120, 150, 200, 500, 1,000, 2,000, 5,000, 10,000 or 20,000 the last domains (or URLs or servers IDs). Alternatively or in addition, the database 345*c* stores the domains (or URLs or servers IDs) used during a specified time period. For example, the time period may be at least 1, 2, 5, 8, 10, 12, 15, 20, 25, 30, 50, 80, 100, 120, 150, 200, 500, 1,000, 2,000, 5,000, or 10,000 hours or minutes, or may be less than 2, 3, 4, 5, 8, 10, 12, 15, 20, 25, 30, 50, 80, 100, 120, 150, 200, 500, 1,000, 2,000, 5,000, 10,000 or 20,000 hours or minutes. Further, the time period may be at least 1, 2, 5, 8, 10, 12, 15, 20, 25, 30, 50, 80, 100, 120, 150, 200, 500, 1,000, 2,000, 5,000, or 10,000 days, or may be less than 2, 3, 4, 5, 8, 10, 12, 15, 20, 25, 30, 50, 80, 100, 120, 150, 200, 500, 1,000, 2,000, 5,000, 10,000 or 20,000 days. Alternatively, the time period may be at least 1, 2, 5, 8, 10, 12, 15, 20, 25, 30, 50, 80, 100, 120, 150, 200, 500, 1,000, 2,000, 5,000, or 10,000 weeks or months, or may be less than 2, 3, 4, 5, 8, 10, 12, 15, 20, 25, 30, 50, 80, 100, 120, 150, 200, 500, 1,000, 2,000, 5,000, 10,000 or 20,000 weeks or months.

The time period used for storing last domains used for the list 363, may be the same as, similar to, or different from, the time period used for metering the duration of availability or operation used for the column "Operation Duration (Hours)" 362*e*. Further, the time period used for storing last domains used for the list 363, may be the same as, similar to, or different from, the time period used for metering transferred traffic volume used for the column "Traffic Volume (GB)" 362*f*.

Figure 37:
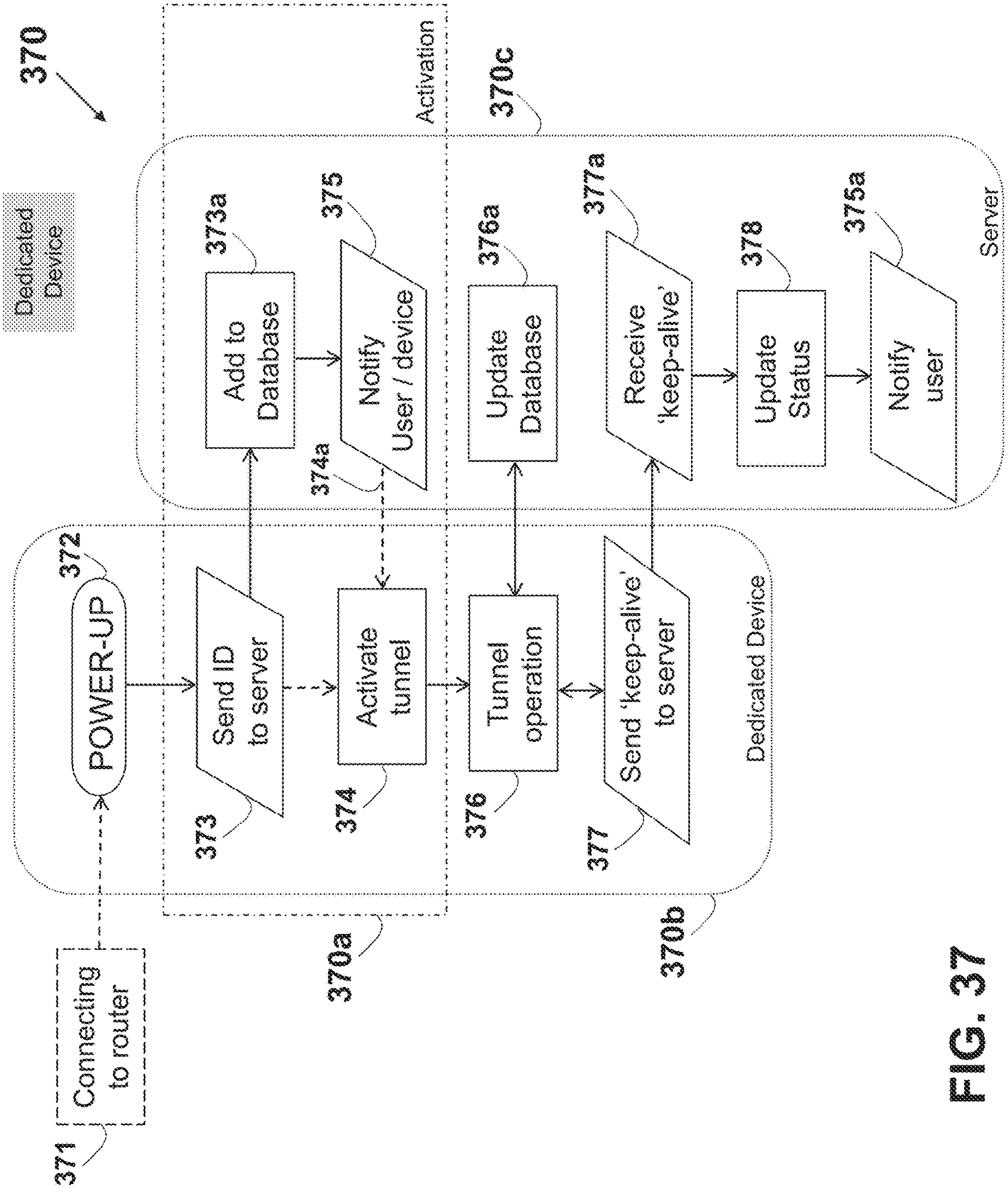
FIG. 37 illustrates schematically a simplified flowchart relating to activation and operation of a dedicated box and the related managing server.

A flow-chart 370 shown in FIG. 37 illustrates an example of steps performed by a dedicated box, such as the dedicated box 341 shown in the arrangement 340, and an example of steps performed by a server that manages the dedicated devices operation and OA&M, such as the Dedicated Boxes Manager server 345 shown in the arrangement 340 in FIG. 34. The flow-chart 370 is preceded by a "Connecting to router" step 371, that comprises the physical connecting, such as by the human user 343, of the dedicated box 341 to the router 74*a* (that is assumed to be connected to the Internet 113) over the connection 342, such as by connecting to the RJ-45 connector 351 in the box 350, in order to allow the dedicated box 341 to communicate over the Internet 113. As part of a "POWER-UP" step 372, the dedicated box 341 is powered and starts an initialization or activation process. In one example, this powering-up action is the first powering of the dedicated box 341 at the user 343 premises 346. The initial powering at the user 343 premises 346 may initiate a single-time activation flow-chart 370*a*, used for registration, setting, and other OA&M actions for allowing proper operation and management of the dedicated box 341 as a tunnel device after the activation flow-chart 370*a* is completed. A sub flow-chart 370*b* illustrates the steps performed by the dedicated box 341, and the sub flow-chart 370*c* illustrated the steps performed by the manager server 345.

In one example, the activation process 370*a*, starts when the dedicated box 341 notifies the system of its availability to serve as a tunnel device by sending a message to the managing server 345 over the communication path 347*a*. For example, the IP address, URL, or host name of the managing server 345 may be programmed or burned into the dedicated box 341, to be used when sending the message thereto as part of a "Send ID to server" step 373. The sent message may include an identification of the dedicated box 341, such as the associated MAC address or host name as described regarding the column "Device ID" 362*d*. Alternatively or in addition, the message may comprise a respective user 343 contact information, as described regarding the column "User Contact" 362*g*. Upon receiving the message that was sent as part of the "Send ID to server" step 373 over the communication path 347*a*, the managing server 345 adds a row associated with the dedicated box 341 to the table 360, and fills in the information for all respective columns, such as the IP address 362*b* and the geographical location 362*c*, as part of a "Add to Database" step 373*a*. In one example, the row may be already in the table 360 as a result of former actions or former registration. The respective 'Available' column 362*h* is set to 'Y' since the dedicated box 341 is assumed to be available for providing the tunnel functionality.

Upon completing the actions relating to adding the newly connected dedicated box 341 to the table 360 in the database 345*c*, and after further completing all other procedures and checks to verify that the new connected dedicated box 341 is legitimate and there is no obstacle to use it as a tunnel device, a respective registration time is recorded as part of the column 362*a*, and a respective message is sent to the user as part of a "Notify user/device" step 375. The message is used to notify the user that the associated dedicated box 341 is active and available in the system. The message may be sent using the information as part of the "User Contact" column 362*g*, such as by sending email, sending SMS, or mailing a letter. Alternatively or in addition, an activation message may be sent to the dedicated box 341 over the communication path 347a, for notifying the dedicated box 341 that it may start function as a tunnel device, shown as a dashed line 374a.

After sending a message to the managing server 345 as part of the "Send ID to server" step 373, the Dedicated Box 341 may determine that it starts to function as a tunnel device as part of an "Activate tunnel" step 374, which completes the activation process 370a. For example, a visual indicator, such as the visual indicator 352b of the box 350 in FIG. 35, may be used to indicate that the activation is completed and that the dedicated device 341 is available to serve as a tunnel device. Typically, this activation process 370a is performed once, and need not be repeated each time the dedicated device is powered or re-connected to the Internet. Upon any later powering or reconnecting to the Internet, the dedicated device 341 may shift directly to the "Activate tunnel" step 374 without repeating the activation process 370a.

Figure 22:
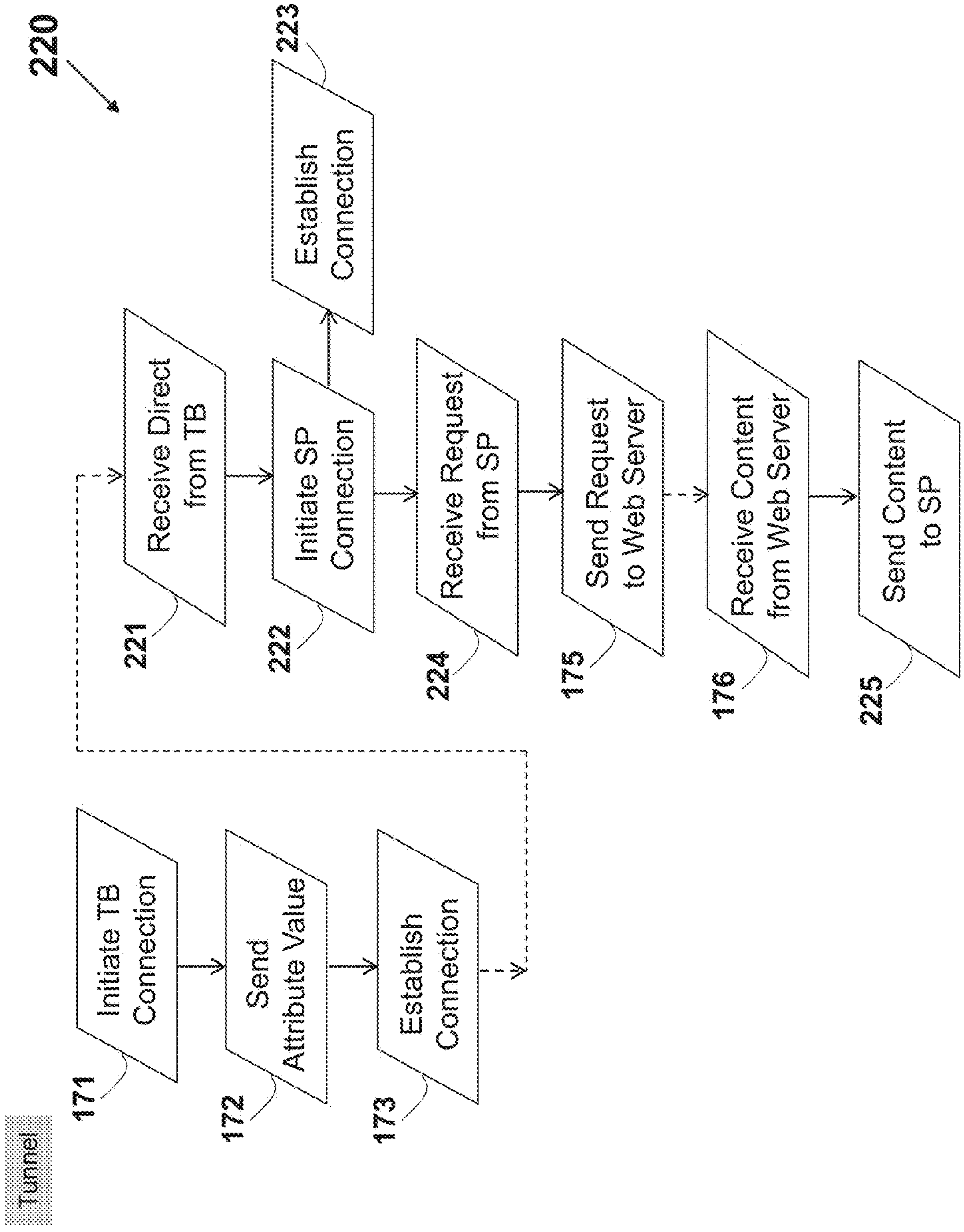
FIG. 22 (Prior Art)
FIG. 22 illustrates schematically another simplified flowchart relating to a tunnel device.
Figure 23:
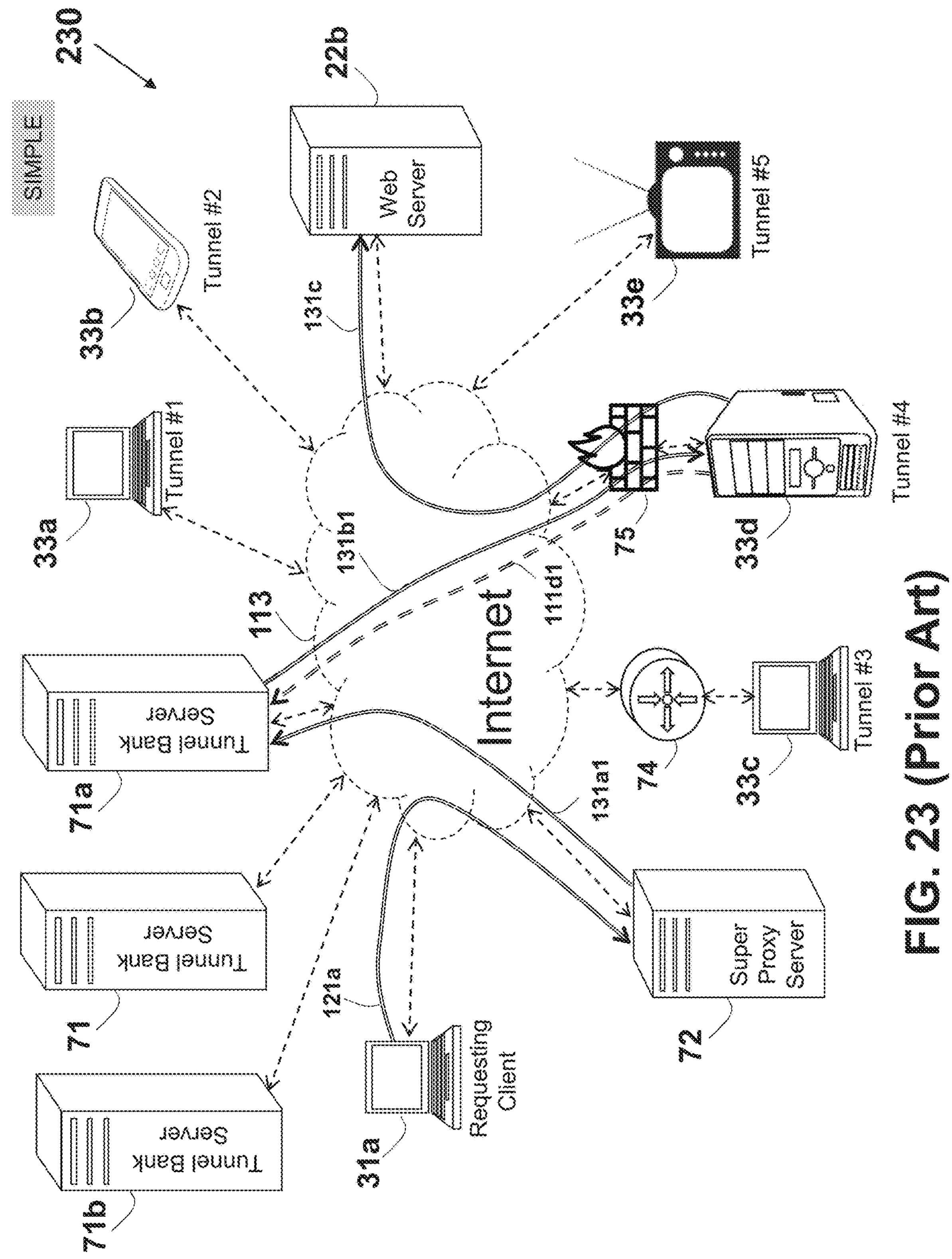
FIG. 23 (Prior Art)
FIGS. 23 and 23*a* depict schematically messages exchanged over the Internet for fetching content from the web server to the client device using multiple TB servers.
Figure 23A:
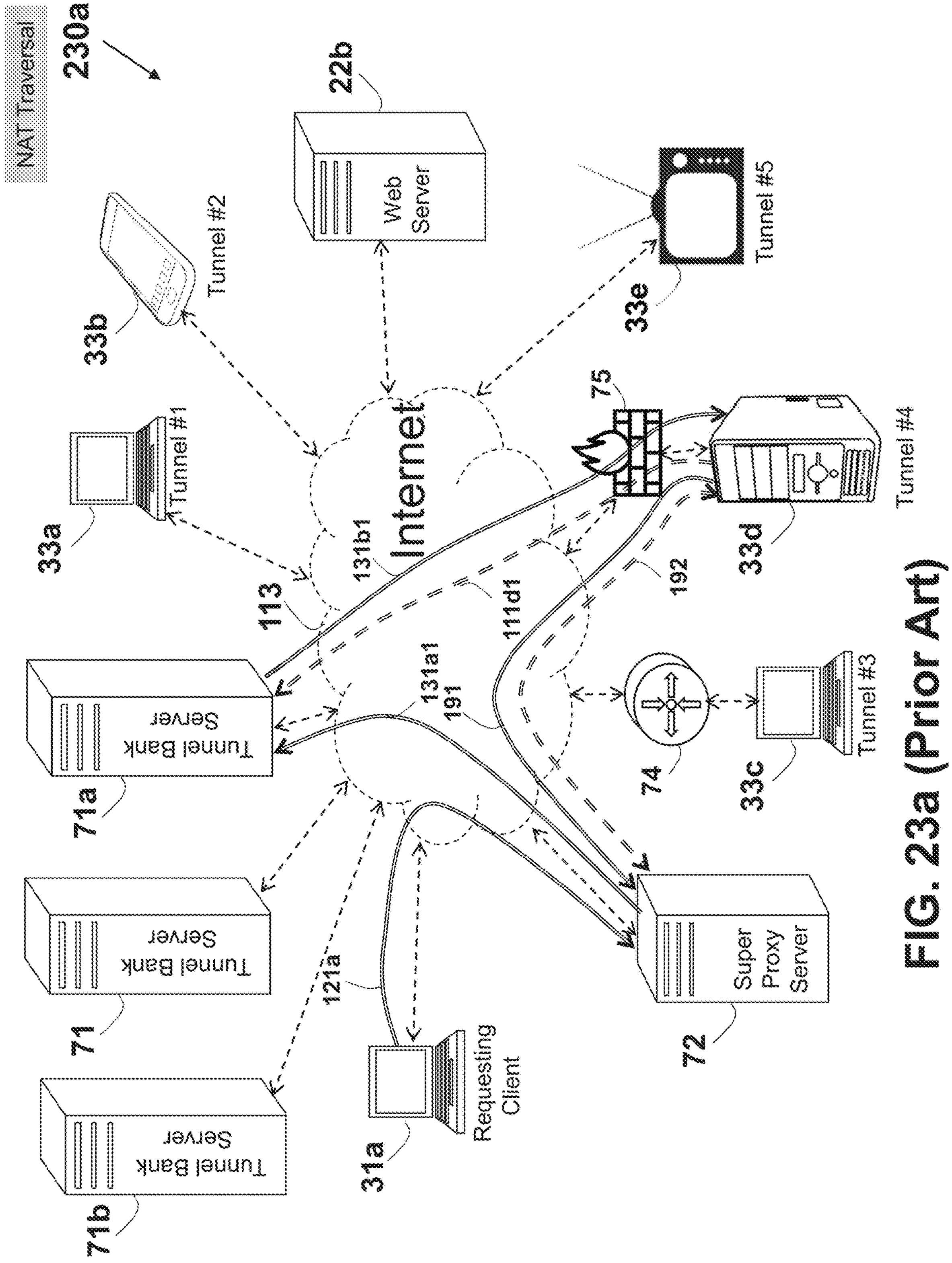
FIG. 23a (Prior Art)

As part of a "Tunnel operation" step 376, the dedicated box 341 properly functions as a tunnel device, and may execute any of the tunnel device related flow-charts herein, such part or all of the steps of the tunnel related flow-chart 170 shown in FIG. 17, or the tunnel related flow-chart 220 shown in FIG. 22, as well as any other flow-chart, functionality, feature, structure, hardware, software, or steps or flow charts performed by any intermediary or tunnel device as described here and/or in the '044 patent', in the '604 patent', disclosed in U.S. Patent Application Publication No. 2016/0337426 to Shribman et al. entitled: "System and Method for Streaming Content from Multiple Servers", in U.S. Pat. No. 10,880,266 to Shribman et al., entitled: "System and Method for Improving Content Fetching by Selecting Tunnel Devices", in U.S. Patent Application Publication No. 2022/0103525 to Shribman et al., entitled: "System and Method for Managing Non-Direct URL Fetching Service", which is incorporated in its entirety for all purposes as if fully set forth herein. in U.S. Pat. No. 10,963,531 to Shribman et al. entitled: Shribman et al., entitled: "System and Method for URL Fetching Retry Mechanism", or in any combination thereof. In one example, a traffic flow of content via the dedicated box 341 is visually indicated by a visual indicator, such as the visual indicator 352c of the box 350 shown in FIG. 35

When functioning as a tunnel device as part of the "Tunnel operation" step 376, the dedicated box 341 may further perform any OA&M functions, and may send OA&M information to the managing server 345 over the communication path 347a. Further, the dedicated box 341 may monitor its operation timings and durations, such as explained regarding to the column "Operation Duration (Hours)" 362e, and may as well monitor the volume of traffic therethrough, such as explained regarding to the column "Traffic Volume (GB)" 362f, and may further send the resulting monitoring or measuring to the manager server 345 over the communication path 347a to be stored in the related database 345c, as part of a "Update Database" step 376a. Further, as part of the "Tunnel operation" step 376, the dedicated box 341 may keep track and store the domains (or other content identifiers or characteristics) associated with the traffic flowing therethrough, as exampled regarding the list 363 in FIG. 36.

As explained regarding the "Available" column 362h, the managing server 345 monitors the current availability of each of the dedicated box to function as a tunnel device, such as by checking respective Internet connectivity. In one example, a 'keep-alive' mechanism is used for continuously monitoring the availability of a dedicated box. For example, the dedicated box 341 may periodically send to the managing server 345 over the communication path 347a a "keep-alive" message, as part of a "Send 'keep-alive' to server" step 377, which primary purpose is to notify the manager server 345 of the availability and Internet connectivity of the dedicated box 341. As long as the 'keep-alive' messages are received by the managing server 345, as part of a "Receive 'keep-alive'" step 377a, in the pre-specified frequency from the dedicated box 341, the dedicated box 341 is considered as available ('Y' in the "Available" column 362h), as part of a "Update Status" step 378. In case where periodic 'keep-alive' messages fail to arrive to the managing server 345, the dedicated box 341 is considered as non-available ('N' in the "Available" column 362h), as part of the "Update Status" step 378. In one example, upon detecting such non-availability of the dedicated box 341, the user 343 may be notified as part of "Notify user" step 375a, in order to allow the user 343 to take corrective actions, such as re-powering or re-connecting the dedicated box 341. The user 343 may be notified by a message sent from the manager server 345 over the communication path 347b to the computer 344 used by the co-located user 343, or alternatively or in addition over the communication path 347f to the computer 344a used by the remotely located user 343a. Further, the message may be sent using the information as part of the "User Contact" column 362g, such as by sending email, sending SMS, or mailing a letter. Alternatively or in addition, the 'keep-alive' messages may be periodically sent from the managing server 345 to the dedicated box 341, which will send a return message upon receiving it. Missing to timely reply to a sent 'keep-alive' message indicates non-availability of the dedicated box 341. Conversely, when the dedicated box 341 starts sending or responding again to the 'keep-alive' messages exchanged with the managing server 345, the formerly non-available status ('N' in the "Available" column 362h) may be updated as available ('Y' in the "Available" column 362h) as part of the "Update Status" step 378.

The time period between updating the database 345c as part of the "Update Database" step 376a may be at least 1, 2, 5, 8, 10, 12, 15, 20, 25, 30, 50, 80, 100, 120, 150, 200, 500, 1,000, 2,000, 5,000, or 10,000 milliseconds, seconds, minutes, hours or days, or may be less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, hours, or days. The time period between consecutive 'keep-alive' messages sent from the dedicated box 341 as part of the "Send 'keep-alive' to server" step 377, or between consecutive 'keep-alive' messages sent from the managing server 345 to the dedicated box 341, may be at least 1, 2, 5, 8, 10, 12, 15, 20, 25, 30, 50, 80, 100, 120, 150, 200, 500, 1,000, 2,000, 5,000, or 10,000 milliseconds, seconds, minutes, hours or days, or may be less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, hours, or days.

In one example, the Dedicated Boxes Manager server 345 is a dedicated server, which primary or exclusive function is to handle the dedicated boxes in the system, and to provide OA&M functions and support for the registration, operation, support, and any other use of the dedicated devices. Such dedicated server is separate and different from the TB sever 71 and from the SP server 72. Alternatively, the Dedicated Boxes Manager server 345 may comprise, is may be part of, or may be integrated with the TB server 71. Further, the Dedicated Boxes Manager server 345 may comprise, is may be part of, or may be integrated with the SP server 72.

Figure 38:
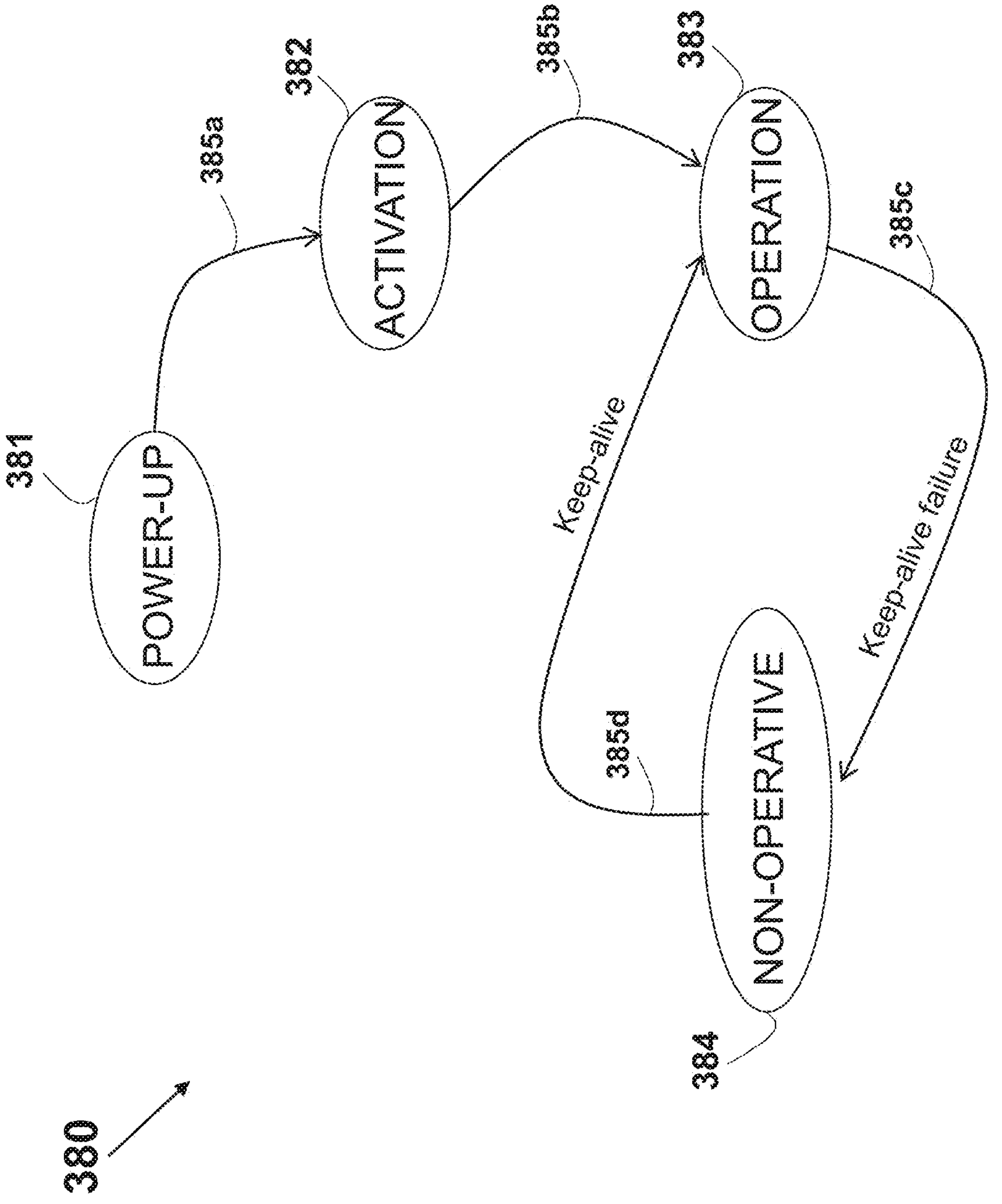
FIG. 38 depicts schematically a state diagram of an exemplary dedicated device.

An example of a state diagram 380 of a dedicated device, such as the dedicated device 341 is shown in FIG. 38. Upon first powering the device, such as after the dedicated device is received (e.g., to the user premises 346 by physical mail or courier) and connected to the router 74*a* using the LAN connection 342, a POWER-UP state 381 is established, during which the computerized system in the dedicated device 341 is initialized, such as by booting the operating system and connecting to the Internet. Upon completing the POWER-UP 381 sequence and connecting to the Internet 113 via the connection 342 and the router 74*a*, the dedicated device 341 shifts to an ACTIVATION state 382 (shown as a line 385*a*). During this state, the dedicated device 341 is executing the sub flow-chart 'activation' 370*a* in cooperation with the managing server 345, connected thereto via the communication path 347*a*. Upon successful completion of the activation process in the ACTIVATION state 382 (shown as a line 385*b*), such as described in the "Activate tunnel' step 374, the dedicated device 341 is ready and can serve as a tunnel device, as part of an OPERATION state 383, in which the 'Tunnel operation' step 376 in the flow-chart 370 is continuously executed. The Column 'Available" 362*h* in the table 360 is set to 'Y', noting availability and operability of the dedicated device 341 to perform tunnel functionality.

As long as the dedicated device 341 is properly connected to the Internet 113, as monitored by the managing server 345 by properly receiving keep-alive messages (or timely pings) as part of the "Receive 'keep-alive'" step 377*a*, the dedicated device 341 stays in the OPERATION state 383. In a case where the connection of the dedicated device 341 to the Internet 113 fails, such as by Internet problem, a failure in the dedicated device 341 or the router 74*a*, or in case of power loss to the dedicated device 341 or to the router 74*a*, this connectivity failure may be sensed by the dedicated device 341 itself, or may cause the 'keep-alive' messages fail to reach the managing server 345 (shown as a line 385*c*), and the dedicated device 341 cannot properly perform the tunnel device functionality, as part of a NON-OPERATIVE state 384. Respectively, the Column 'Available" 362*h* in the table 360 is set to 'N', noting the non-availability or non-operability of the dedicated device to perform tunnel functionality. For example, a message regarding this unavailability may be sent by the managing server 345 to the TB server 71 (or to the SP server 72), notifying it not to use or select the dedicated device 341 as a tunnel device during this state. Shifting back to normal operation in the OPERATION state 383 is caused upon resuming proper 'keep-alive' messages from the dedicated device 341, indicating proper re-connecting to the Internet 113 (shown as a line 385*d*).

While a single dedicated box 341 has been exampled herein to be associated with a single user 343, any number of dedicated devices, that may be co-located or located at different locations, and that may be connected to the same router, such as router 74*a*, or may be connected to multiple routers, may be equally employed.

The dedicated box 341 includes a single, and no more than one, communication connection. The single communication connection of the dedicated box 341 is used for connecting to the router 74*a* for connecting to the Internet 113. The tunnel functionality involved serving as a transparent intermediate device—'pipe', that receives requests via this single connection, such as URL, for example as part of the "Receive Request from TB" step 174, and outputting via the single connection for passing the request or URL to the web server 22*a*, for example as part of the "Send Request to Web Server" step 175. In response, a content, such as a web-page is received by the single connection, is received by the single connection from the web server 22*a*, for example as part of the "Receive Content from Web Server" step 176, followed by outputting via the single connection for passing the received content to a server, for example as part of the "Send Content to TB" step 177. As a device dedicated for serving as a tunnel device, any other data received or transmitted by the single connection is limited to data related to OA&M functions for supporting, controlling, monitoring, and managing the proper operation of the tunnel functionality.

In one example, the connection 342 between the dedicated box 341 and the router 74*a* is a wired LAN connection, and the single connection is based on LAN connectivity, such as using LAN connector, for example RJ-45 connector 351. The dedicated box 341 further comprises a LAN transceiver for sending and receiving data over the connection 342. The LAN connection may be Ethernet based connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ac-2002as standard), 40 Gigabit Ethernet (40 GbE), or 100 Gigabit Ethernet (100 GbE as per Ethernet standard IEEE P802.3ba). Further, the LAN may be according to, may be compatible with, or may be based on, IEEE 802.3-2008 standard. Alternatively or in addition, the LAN may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T; and the LAN connector may be an RJ-45 type connector. Alternatively or in addition, the LAN may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, the LAN connector may be a fiber-optic connector, and the LAN transceiver is a fiber-optic transceiver.

Any network medium for establishing the connection 342 herein may be, or may comprise, a single cable or two wires, and may comprise a Shielded Twisted Pair (STP) or an Unshielded Twisted Pair (UTP). Alternatively or in addition, the network medium may be, or may comprise, a LAN cable that may be based on, or may be substantially according to, EIT/TIA-568 or EIA/TIA-570 standard, and may comprise UTP or STP twisted-pairs, and the connector may be an RJ-45 type connector. Alternatively or in addition, the network medium may be, or may comprise, an optical cable and the connector may be an optical connector, and the optical cable may comprises, may use, or may be based on, Plastic Optical Fibers (POF).

The dedicated box 341 includes a single, and no more than one, power connector. The single power connector of the dedicated box 341 is used for receiving power for powering the electronic circuitry therein. In one example, the dedicated box 341 includes a battery for powering the device hardware. The battery may be a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the dedicated box 341 or be external to it, and connected to it via the single power connection. The battery may be a primary or a rechargeable (secondary) type, may include a single or few batteries, and may use various chemicals for the electro-chemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as “A”, “AA”, “B”, “C” sizes), and ‘coin’ type. In one embodiment, the battery (or batteries) is held in a battery holder or compartment, and thus can be easily replaced.

Alternatively or in addition, the dedicated device 341 may be powered from a power supply, that may be external to, or internally in, the dedicated box 341 enclosure. The power supply may contain a DC/DC converter. In another embodiment, the power supply is power fed from the AC power supply via a single power connector that comprises an AC plug and a cord, and thus may include an AC/DC converter, for converting the AC power (commonly 115 VAC/60 Hz or 220 VAC/50 Hz) into the required DC voltage or voltages. Such power supplies are known in the art and typically involve converting 120 or 240 volt AC supplied by a power utility company to a well-regulated lower voltage DC for electronic devices. Further, the power supply may include a boost converter, such as a buck boost converter, charge pump, inverter and regulators as known in the art, as required for conversion of one form of electrical power to another desired form and voltage. The power supply (either separated or integrated) may be an integral part and housed within the dedicated box 341 enclosure, or it may be enclosed as a separate housing connected via cable to the single power connector. For example, a small outlet plug-in step-down transformer shape can be used (also known as wall-wart, “power brick”, “plug pack”, “plug-in adapter”, “adapter block”, “domestic mains adapter”, “power adapter”, or AC adapter). Further, the power supply may be a linear or switching type.

Few industry-standard buses such as Universal Standard Bus (USB) version 2.0 or 3.0, use a single cable that carry both DC power and communication signals, either on the same wires or over separate wires. In one example, the single power connector is such a bus connector, such as a USB connector, for being powered from the DC power carried in the cable.

In one example, the data and power signals are carried in a cable over the same wires using Frequency Division Multiplexing (FDM), where each signal is using a different frequency band, and wherein the frequency bands are spaced in frequency. For example, the power signal can be a DC signal (0 Hz), while the data signal will be carried over a band excluding the DC frequency. Similarly, the power signal can be an AC power signal, using a frequency above the frequency band used by the data signal. Separation or combining the power and data signals makes use of filters, passing or stopping the respective bands.

In one example, the same single Ethernet or LAN connector, such as the RJ-45 connector 351, is used for both communication and powering, using a Power over Ethernet (POE) scheme. In such a case, the dedicated box 341 serves as a Powered Device (PD), and the router 74*a* serves as a Power Sourcing Equipment (PSE), in addition for providing the Internet connectivity. Such scheme may be based on, or according to, IEEE 802.3af, IEEE 802.3bt-2018, IEEE 802.3bu-2016, or IEEE 802.3at-2009 standard, as well as being based on, or according to, Alternative A, Alternative B, or 4PPoE scheme, and respectively use spare-pair (Alternative B), common-mode data pair power (Alternative A) or 4-pair transmission (4PPoE), Any user notification herein, such as notification that is part of the “Notify user/device” step 375 or the “Notify user” step 375*a* may include a message that may be sent over the Internet via the wireless network to a client device using a peer-to-peer scheme. Alternatively or in addition, the message may be sent over the Internet via the wireless network to an Instant Messaging (IM) server for being sent to a client device as part of an IM service. The message or the communication with the IM server may use, may be compatible with, or may be based on, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), or Hypertext Transfer Protocol (HTTP).

Alternatively or in addition, the message may be a text-based message and the IM service may be a text messaging service, and the message may be according to, may use, or may be based on, a Short Message Service (SMS) message, the IM service may be a SMS service, the message may be according to, or may be based on, an electronic-mail (e-mail) message and the IM service may be an e-mail service, the message may be according to, or may be based on, WhatsApp message and the IM service may be a WhatsApp service, the message may be according to, or may be based on, a Twitter message and the IM service may be a Twitter service, or the message may be according to, or may be based on, a Viber message and the IM service may be a Viber service. Alternatively or in addition, the message may be a Multimedia Messaging Service (MMS) or an Enhanced Messaging Service (EMS) message that may include audio or video, and the IM service may respectively be an NMS or EMS service.

Further, any user notification herein, such as notification that is part of the “Notify user/device” step 375 or the “Notify user” step 375*a* may include notification to the user device that may be text based, such as an electronic mail (e-mail), website content, fax, or a Short Message Service (SMS). Alternatively or in addition, the notification or alert to the user device may be voice based, such as a voicemail, a voice message to a telephone device. Alternatively or in addition, the notification or the alert to the user device may activate a vibrator, causing vibrations that are felt by human body touching, or may be based on, or may be compatible with a Multimedia Message Service (MMS) or Instant Messaging (IM). The messaging, alerting, and notifications may be based on, include part of, or may be according to U.S. Patent Application No. 2009/0024759 to Mckibben et al. entitled: “System and Method for Providing Alerting Services”, U.S. Pat. No. 7,653,573 to Hayes, Jr. et al. entitled: “Customer Messaging Service”, U.S. Pat. No. 6,694,316 to Langseth. et al. entitled: “System and Method for a Subject-Based Channel Distribution of Automatic, Real-Time Delivery of Personalized Informational and Transactional Data”, U.S. Pat. No. 7,334,001 to Eichstaedt et al. entitled: “Method and System for Data Collection for Alert Delivery”, U.S. Pat. No. 7,136,482 to Wille entitled: “Progressive Alert Indications in a Communication Device”, U.S. Patent Application No. 2007/0214095 to Adams et al. entitled: “Monitoring and Notification System and Method”, U.S. Patent Application No. 2008/0258913 to Busey entitled: "Electronic Personal Alert System", or U.S. Pat. No. 7,557,689 to Seddigh et al. entitled: "Customer Messaging Service", which are all incorporated in their entirety for all purposes as if fully set forth herein.

Some web servers use fingerprinting for detecting and blocking non legitimate users, such as bots or other non-human users. In order to overcome blocking by such a web server, the dedicated tunnel 341 may use a user emulator mechanism when in the OPERATION state 383, that mimics and emulates a human user operation, and thus not detected as non-legitimate user by the fingerprinting mechanism. Such user emulator mechanism may include executing a web browser as part of the 'Tunnel Operation' step 376 in the flow-chart 370. In one example, the web-browser software application is launched or initiated as part of the ACTIVATION state 382, such as upon powering up of the device in the 'POWER-UP' step 372, in response to the connecting to the Internet 113, or as part of the "Activate tunnel' step 374. Alternatively or in addition, the web-browser software application may be launched or initiated upon receiving a URL (such as the first URL received) or upon receiving any other content request, as part of the 'Tunnel operation' step 376, typically as part of the 'OPERATION' state 383. The web browser may consist of, may comprise of, or may be based on, a headless browser, Microsoft Internet Explorer, Microsoft Edge, Google Chrome, Opera™, or Mozilla Firefox®, or may consist of, may comprise of, or may be based on, a mobile web browser such as Safari, Opera Mini™, or Android web browser.

Figure 35A:
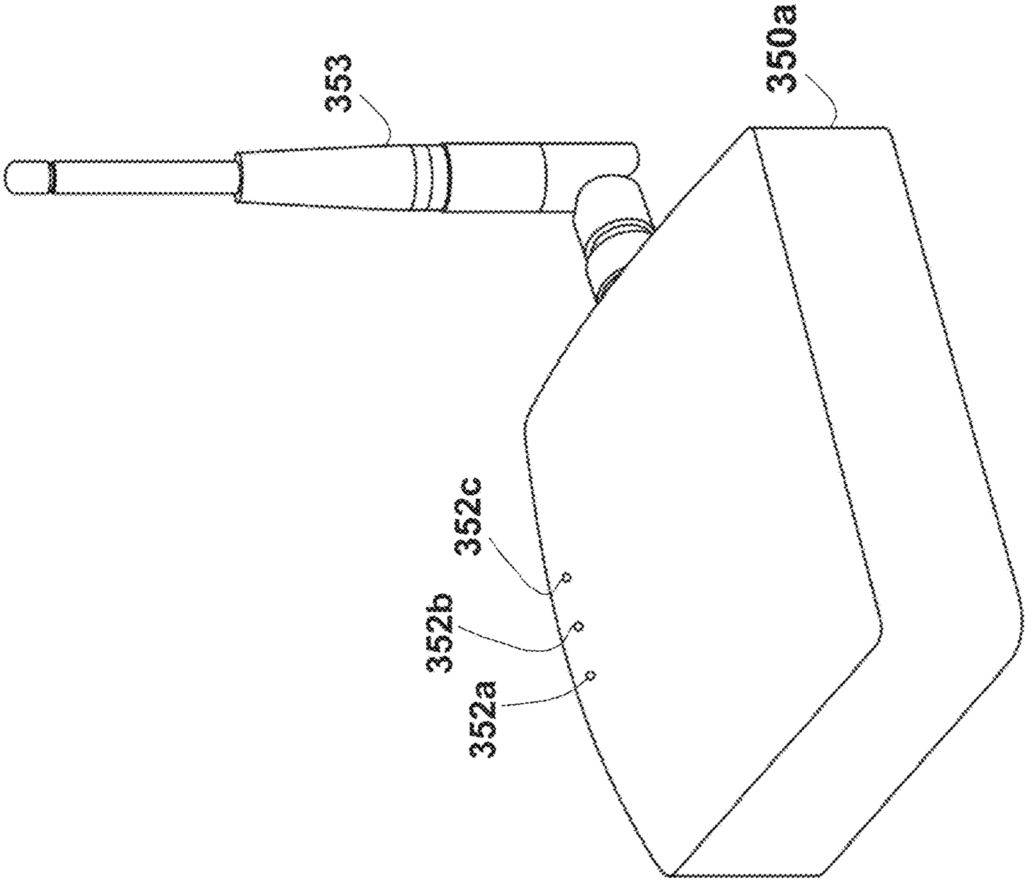
FIG. 35*a* depicts pictorially a perspective view of physical box of a dedicated box having a wireless connection.

The dedicated box 350 is shown in FIG. 35 as comprising a wired connection that is implemented by a connector RJ-45 351. Alternatively or in addition, a wireless connection may be used, using an antenna for transmitting and receiving first Radio-Frequency (RF) signals over the air; and a wireless transceiver coupled to the antenna for wirelessly transmitting and receiving data over the air using a wireless network, the wireless transceiver coupled to be controlled by a processor. Such a dedicated box 350*a* is shown in FIG. 35*a*, where the wired connector is substituted with an antenna 353, for communication over the Internet 113. In such a case, the communication with the router 74*a* over the link 342 is based on a wireless link. Alternatively or in addition, the wireless dedicated box 350*a* may directly communicate over the Internet without the local router 74*a*, such as over a mobile or cellular network. The transceiver in the wireless dedicated box 350*a* that connects to the antenna is respectively a wireless transceiver.

Any wireless network herein, such as the communication by the dedicated box 350*a* using the antenna 353 may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008. Alternatively or in addition, the wireless network may comprise, or may consist of, a Wireless Personal Area Network (WPAN), which may be according to, may be compatible with, or may be based on, Bluetooth™, Bluetooth Low Energy (BLE), or IEEE 802.15.1-2005 standards, or the WPAN may be a wireless control network that may be according to, or based on, Zigbee™, IEEE 802.15.4-2003, or Z-Wave™ standards. Alternatively or in addition, any wireless network herein may comprise, or may consist of, a Wireless Local Area Network (WLAN), which may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac.

In one example, the dedicated box 350 stores in a non-volatile memory a list of IP addresses that identify the Dedicated Boxes Manager 345 for communication over the communication link 347*a*, such as in the 'ACTIVATION' state 382, or for communication with the Dedicated Boxes Manager 345 for management as part of the 'OPERATION" state 383, such as for sending periodic massages as part of the "Send 'keep-alive' to server" step 377. The dedicated box 341 may use an IP address from the list to access the server 345 as part of the "Send ID to server" step 373. For example, there may be multiple such servers 345 for load balancing or in different locations. Further, in case of a failure of one of the servers 345, the dedicated box 341 may access the next one in the list. The IP addresses list of potential servers 345 may comprise at least 1, 2, 3, 5, 10, 20, 30, 50, or 100 IP addresses, or may comprise less than 2, 3, 5, 10, 20, 30, 50, 100, or 200 IP addresses. Alternatively or in addition, the list may include human-friendly domain names that are mapped to IP addresses by resolving using the Domain Name System (DNS) that is a hierarchical and decentralized naming system. The dedicated box 341 only accesses the servers in the list for any OA&M functions.

In one example, the dedicated box 350 stores in a non-volatile memory an additional list of IP addresses that identify the SP server 72 or the TB server 71 for receiving URLs and content requests only from them, when functioning as a tunnel device as a part of the 'OPERATION" state 383, such as a part of the 'Tunnel operation" step 376. For example, there may be multiple such SP servers 72 or multiple TB servers 71 for load balancing or in different locations. Further, in case of a failure of one of the servers, the dedicated box 341 may access the next one in the list. The IP addresses in the additional list of potential servers may comprise at least 1, 2, 3, 5, 10, 20, 30, 50, or 100 IP addresses, or may comprise less than 2, 3, 5, 10, 20, 30, 50, 100, or 200 IP addresses. Alternatively or in addition, the list may include human-friendly domain names that are mapped to IP addresses by resolving using the Domain Name System (DNS) that is a hierarchical and decentralized naming system. The dedicated box 341 only accesses the servers in the list for any tunnel related functionality. In one example, the dedicated box 341 receives and stores the additional list from the Dedicated Boxes Manager 345 as part of the "Activate tunnel" step 374.

Figure 34A:
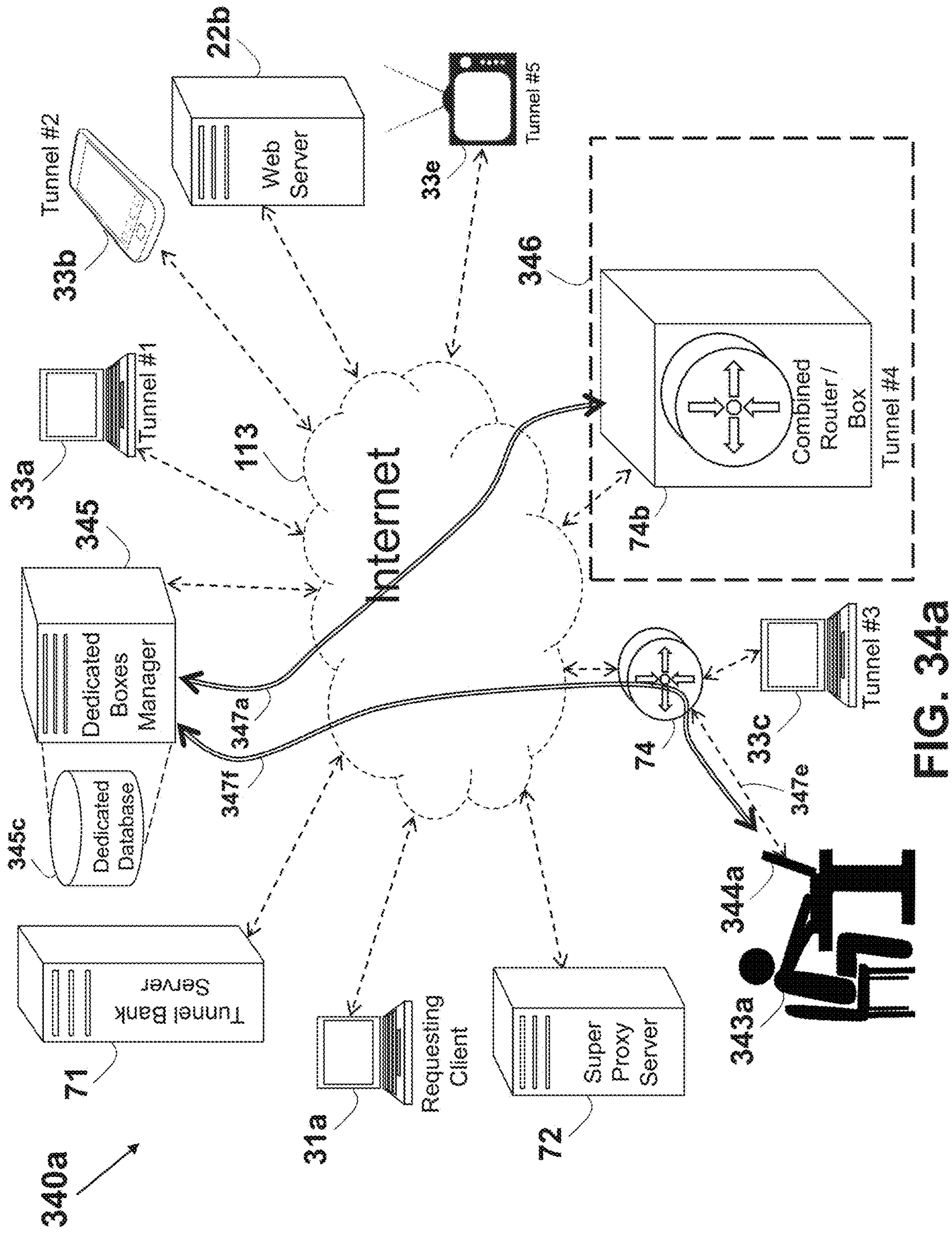
FIG. 34*a* depicts schematically messages exchanged over the Internet when using an integrated router device and tunnel device.

As an alternative to the wired dedicated box 350 shown in FIG. 35 or the wireless dedicated box 350*a* shown in FIG. 35*a*, the tunnel device functionality may be integrated with any Layer 3 (IP) communication device, such as a router, a gateway (that may be a residential gateway), or a firewall. In one example, the tunnel functionality may be integrated into any communication device in the premises 346, such as where the tunneling functionality may be integrated with the router 74*a*. An example of a router 74*b* that includes tunneling functionality is shown as part of an arrangement 340*a* in the FIG. 34*a*. Such integration may be based on, or may use, a software integration, such as integrating an SDK that includes the tunneling functionality in the software or firmware in the router 74*a*. Similarly, such integration may be based on, or may use, a hardware integration, or any combination of hardware and software integration.

The router 74*b* that includes the tunneling functionality may be used for connecting the premises 346 to the Internet 113, such as by connecting to a WAN or LAN, and may further allow connectivity between devices in the premises 346, for allowing these devices to connect to the Internet 113. Further, the router 74*b* may adapt between any wired and wireless networks. It should be noted that it is the router 74*b* itself, rather than (or in addition to) any device connected to it, which is capable of performing the tunnel functionality and, possibly, the associated ancillary functions (e.g., OA&M). Alternatively stated, when the router 74*b* itself acts as a tunnel, URL requests received over the Internet, e.g., from the TB server 71, the SP server 72, and/or other devices, etc.) may be directly forwarded to the next ring in the tunneling chain (e.g., the web server 22*b*, or another server and/or tunnel device) without being shared with the internal network of the premises 348. For example, the router 74*b* includes a first port connected to the Internet 113 and a second port connected to the internal network (e.g., the connection 347*c*) of the premises 348. When the router 74*b* acts itself as a tunnel, URL requests and content retrieved from the web server 22*b* may be received at the first port and sent via the first port to the next ring of the tunneling chain without being forwarded to the internal network via the second port. Clearly, when the user terminal 344 itself is performing tunneling functions, URLs and content received by the router 74*b* may be normally forwarded to the user terminal 344 via the second port.

Figure 34B:
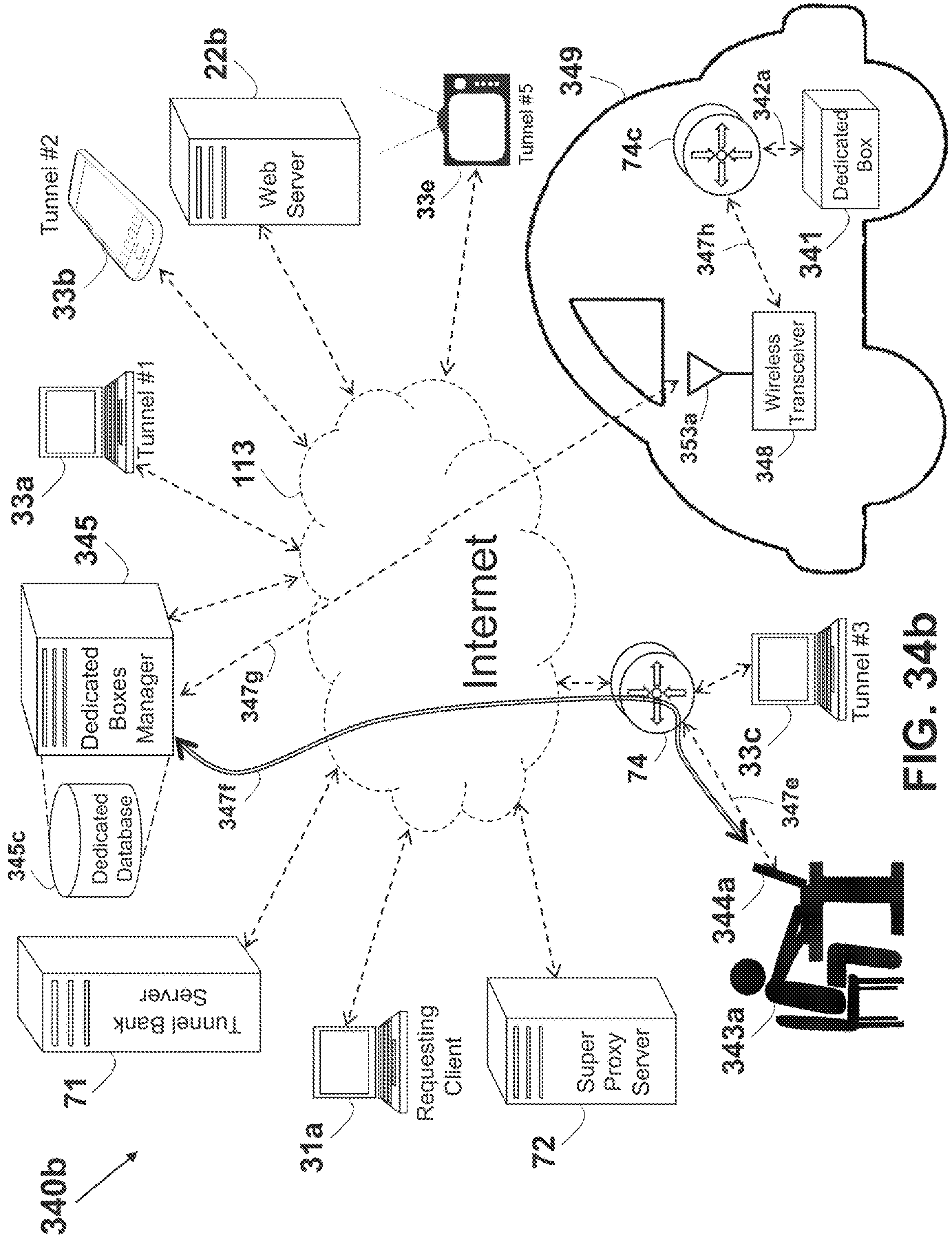
FIG. 34*b* depicts schematically messages exchanged over the Internet when using a dedicated box in a vehicle.

In the arrangement 340 shown in FIG. 34, the dedicated box 341 is shown located in a stationary location, such as the house or building 346. Alternatively or in addition, a dedicated box, such as the dedicated box 341, may equally be located in, mounted in, or part of, a non-stationary location, such as in a vehicle. Such an arrangement 340*b* is shown in FIG. 34*b*, illustrating a vehicle 349 that houses the dedicated box 341 or a tunneling functionality. A vehicle router 74*c* is used to connect the vehicle 349 to the Internet 113, using a wireless transceiver 348 and an antenna 353*a*, over a communication path 347*g*. The vehicle router 74*c* may be identical to, similar to, or different from, the in-house router 74*a*. Typically, the vehicle router 74*c* is designed or configured to adapt to vehicular environment. The dedicated box 341 connects to the vehicle router 74*c* over a communication path or a connection 342*a*, that may be identical to, similar to, or different from, the communication path 342*a*. In one example, the connection 342*a* is over a vehicle bus, such as CAN, LIN, or MOST. Similarly, the vehicle router 74*c* may be connected to the wireless transceiver 348 over a connection or a communication path 347*h* in the vehicle 349. Alternatively or in addition, the wireless transceiver 348 may be integrated with the vehicle router 74*c*, such as in the same enclosure. The antenna 353*a* may be identical to, similar to, or different from, the antenna 353 that is part of the wireless dedicated box 350*a*. Further, the dedicated box 341 may be integrated with the vehicle router 74*c*, such as being housed in the same enclosure, or any other hardware or software integration.

Each of the connection 342*a* between the dedicated box 341 and the vehicle router 74*c*, and the connection 347*h* between the vehicle router 74*c* and the wireless transceiver 348, may be a vehicle bus or any other in-vehicle network. A connected element comprises a transceiver for transmitting to, and receiving from, the network. The physical connection typically involves a connector coupled to the transceiver. Each of the connection 342*a* between the dedicated box 341 and the vehicle router 74*c*, and the connection 347*h* between the vehicle router 74*c* and the wireless transceiver 348, may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol.

The network data link and physical layer signaling may be according to, compatible with, based on, or use, ISO 11898-1:2015. The medium access may be according to, compatible with, based on, or use, ISO 11898-2:2003. The vehicle bus communication may further be according to, compatible with, based on, or use, any one of, or all of, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, or SAE J2411_200002 standards. The CAN bus may consist of, may be according to, compatible with, may be based on, compatible with, or may use a CAN with Flexible Data-Rate (CAN FD) protocol, specification, network, or system.

Alternatively or in addition, each of the connection 342*a* between the dedicated box 341 and the vehicle router 74*c*, and the connection 347*h* between the vehicle router 74*c* and the wireless transceiver 348, may consist of, may comprise, may be based on, may be compatible with, or may use a Local Interconnect Network (LIN) protocol, network, or system, and may be according to, may be compatible with, may be based on, or may use any one of, or all of, ISO 9141-2:1994, ISO 9141:1989, ISO 17987-1, ISO 17987-2, ISO 17987-3, ISO 17987-4, ISO 17987-5, ISO 17987-6, or ISO 17987-7 standards. The battery power-lines or a single wire may serve as the network medium, and may use a serial protocol where a single master controls the network, while all other connected elements serve as slaves.

Alternatively or in addition, each of the connection 342*a* between the dedicated box 341 and the vehicle router 74*c*, and the connection 347*h* between the vehicle router 74*c* and the wireless transceiver 348, may consist of, may comprise, may be compatible with, may be based on, or may use a FlexRay protocol, specification, network or system, and may be according to, may be compatible with, may be based on, or may use any one of, or all of, ISO 17458-1:2013, ISO 17458-2:2013, ISO 17458-3:2013, ISO 17458-4:2013, or ISO 17458-5:2013 standards. The vehicle bus may support a nominal data rate of 10 Mb/s, and may support two independent redundant data channels, as well as independent clock for each connected element.

Alternatively or in addition, each of the connection 342*a* between the dedicated box 341 and the vehicle router 74*c*, and the connection 347*h* between the vehicle router 74*c* and the wireless transceiver 348, may consist of, may comprise, may be based on, may be compatible with, or may use a Media Oriented Systems Transport (MOST) protocol, network or system, and may be according to, may be compatible with, may be based on, or may use any one of, or all of, MOST25, MOST50, or MOST150. The vehicle bus may employ a ring topology, where one connected element is the timing master that continuously transmit frames where each comprises a preamble used for synchronization of the other connected elements. The vehicle bus may support both synchronous streaming data as well as asynchronous data transfer. The network medium may be wires (such as UTP or STP), or may be an optical medium such as Plastic Optical Fibers (POF) connected via an optical connector.

Any of the functionalities, devices, systems, modules, or any apparatuses described herein may be used in a vehicle or in a vehicular environment, and may be part of, integrated with, or connect to, automotive electronics in the vehicle. The vehicle 349 may be any mobile unit that is designed or used to transport passengers or cargo between locations, such as bicycles, cars, motorcycles, trains, ships, aircrafts, boats, and spacecrafts. Further, vehicle 349 may be travelling on land, over or in liquid such as water, or may be airborne.

The vehicle 349 may be a land vehicle typically moving on the ground, using wheels, tracks, rails, or skies. Alternatively or in addition, the vehicle 349 may be locomotion-based where the vehicle is towed by another vehicle or an animal. Propellers (as well as screws, fans, nozzles, or rotors) are used to move on or through a fluid or air, such as in watercrafts and aircrafts. Any of the apparatuses described herein may be used to control, monitor or otherwise be part of, or communicate with, the vehicle motion system. Similarly, any apparatus described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle 349 may be an automobile, defined as a wheeled passenger vehicle that carries its own motor, and primarily designed to run on roads, and have seating for one to six people. Typically, automobiles have four wheels, and are constructed to principally transport people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle 349 may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

The dedicated box 341, the vehicle router 74*c*, or both, may consist of, may be integrated with, may be part of, may be connected to, or may be communicating with, an ECU, which may be an Electronic/engine Control Module (ECM) or Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed control unit (SCU), Telematic Control Unit (TCU), Transmission Control Unit (TCU), Brake Control Module (BCM; ABS or ESC), Battery management system, control unit, or control module. Any ECU herein may comprise a software, such as an operating system or middleware that may use, may comprise, or may be according to, a part or whole of the OSEK/VDX, ISO 17356-1, ISO 17356-2, ISO 17356-3, ISO 17356-4, ISO 17356-5, or AUTOSAR standards, or any combination thereof.

Figure 34C:
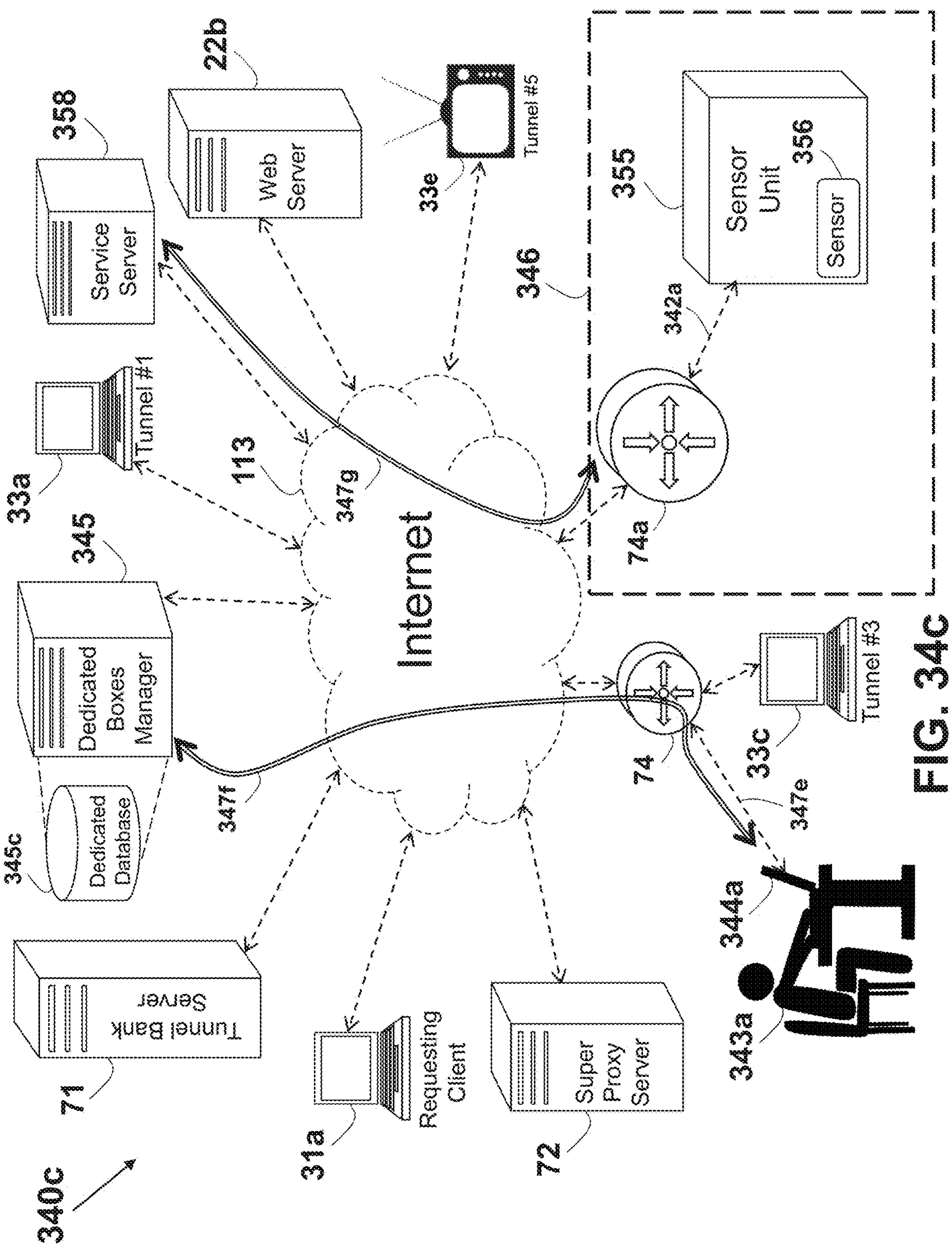
FIG. 34*c* depicts schematically messages exchanged over the Internet in home automation environment.

A simplified home automation architecture that involves a remote sensing of a physical phenomenon in a premises (such as the building 346) is exampled in an arrangement 340*c* shown in FIG. 34*c*. A sensor 356 for sensing a physical phenomenon in the building 346 (or external to it) is part of a sensor unit 355, that connects to the router 74*a* (that may include, or be part of, a gateway) over a connection 342*a*, that may include wired or wireless connection. The router 74*a* connects the building 346 to a service server 358 over the Internet 113. A value that relates to the physical phenomenon that is sensed by the sensor 356 is sent by the sensor unit 355 over the Internet 113 via the router 74*a* to the service server 358, which in turn reacts upon the sensing according to a pre-defined logic. In one example, the sensor unit 355 may corresponds to a sensor unit or to a field unit, and the service server 358 may correspond to any of the servers, described in U.S. Pat. No. 11,128,710 to Binder et al. entitled: "System and method for server-based control". The physical phenomenon sensed by the sensor 356 may be external or internal to the building 346. In one example, an action is taken by the service server 358 upon detecting that the value of the physical phenomenon sensed by the sensor 356 exceeds a pre-defined threshold, or is below a pre-defined threshold. The service server 358 is typically owned or operated by a service provider that provides a service to the building 346 using the sensor 356.

Figure 38A:
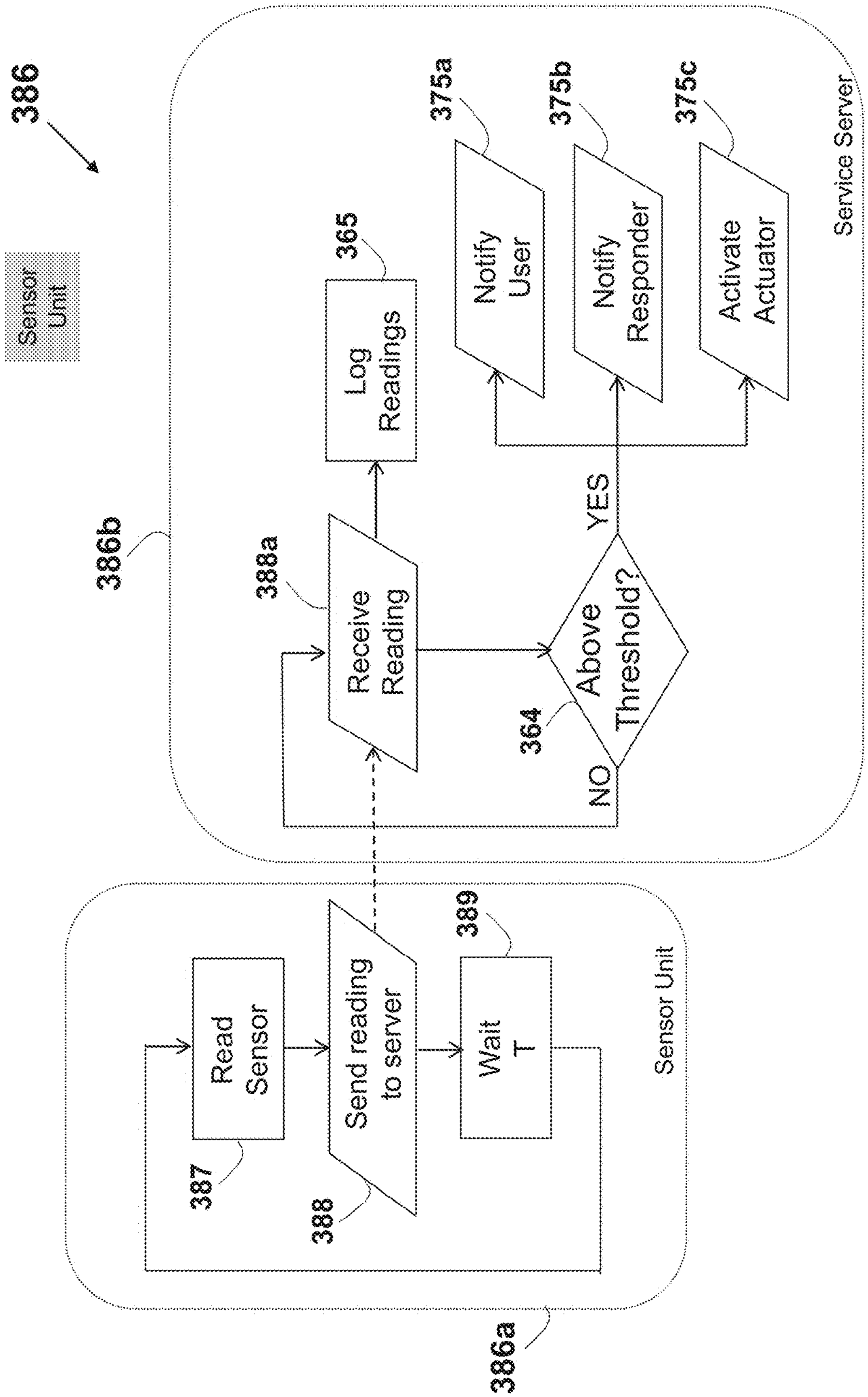
FIGS. 38*a* and 38*b* illustrate schematically simplified flowcharts relating to a home automation architecture.

In one example, as illustrated in a flow-chart 386 shown in FIG. 38*a*, the value of the physical phenomenon sensed by the sensor 356 is continuously or periodically sent to, and the value is checked versus the pre-defined threshold in, the service server 358. The continuous or periodic sensing and sending of the sensed value by the sensor unit 355 is illustrated in a flow-chart 386*a*, that is part of the flow-chart 386, as shown in FIG. 38*a*. The sensor unit 355 reads the value of the physical phenomenon by the sensor 356 output as part of a "Read Sensor" step 387. The read value in the "Read Sensor" step 387, or any function thereof, is sent to the service server 355, over the Internet 113 via the router 74*a*, as part of a "Send reading to server" step 388. Then the sensor unit 355 waits time 'T', which corresponds to the time period between some or any consecutive readings or sendings, as part of a "Wait T" step 389, after which time the process is repeated by reading a new value as part of the "Read Sensor" step 387.

The time period 'T' in the "Wait T" step 389 between consecutive sensor readings as part of the "Read Sensor" step 387, may be at least 1, 2, 5, 8, 10, 12, 15, 20, 25, 30, 50, 80, 100, 120, 150, 200, 500, 1,000, 2,000, 5,000, or 10,000 milliseconds, seconds, minutes, hours or days, or may be less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, hours, or days.

The continuous or periodic receiving of, and potentially responding to, the sensed value by the service server 358 is illustrated in a flow-chart 386*b*, that is part of the flow-chart 386, as shown in FIG. 38*a*. The sent reading (or the function thereof), sent as part of the "Send reading to server" step 388, is received at the service server 358 as part of a "Receive Reading" step 388*a*. Typically, some or all of the received readings are stored and logged as part of a "Log Readings" step 385. The received value (or the function thereof) is compared versus a pre-defined threshold as part of a "Above Threshold?" step 364. In the case the received value is below the set threshold, no action is deemed required, and the service server 358 waits for the receiving and analyzing the next reading of the physical phenomenon by the sensor 356 in the "Receive Reading" step 388*a*. In the case the received value is above the set threshold, an action is deemed required, and the service server 358 may notify the user as part of the "Notify User" step 375*a*, the service server 358 may notify a third party, such as a first responder as part of a "Notify Responder" step 375*b*, the service server 358 may activate an actuator, such as for handling the physical phenomenon, as part of a "Activate Actuator" step 375*c*, or any combination thereof. While the analysis of a received value is exampled in the "Above Threshold?" step 364 as responding and taking action in case of a received value is above a set threshold, the responding and taking action may be equally performed in case where the received value is below a set threshold. The "Notify User" step 375*a* as part of the flow-chart 386*b* may be the same as, similar to, or different from, the "Notify User" step 375*a* in the flow-chart 370*c* shown in FIG. 37.

Figure 38B:
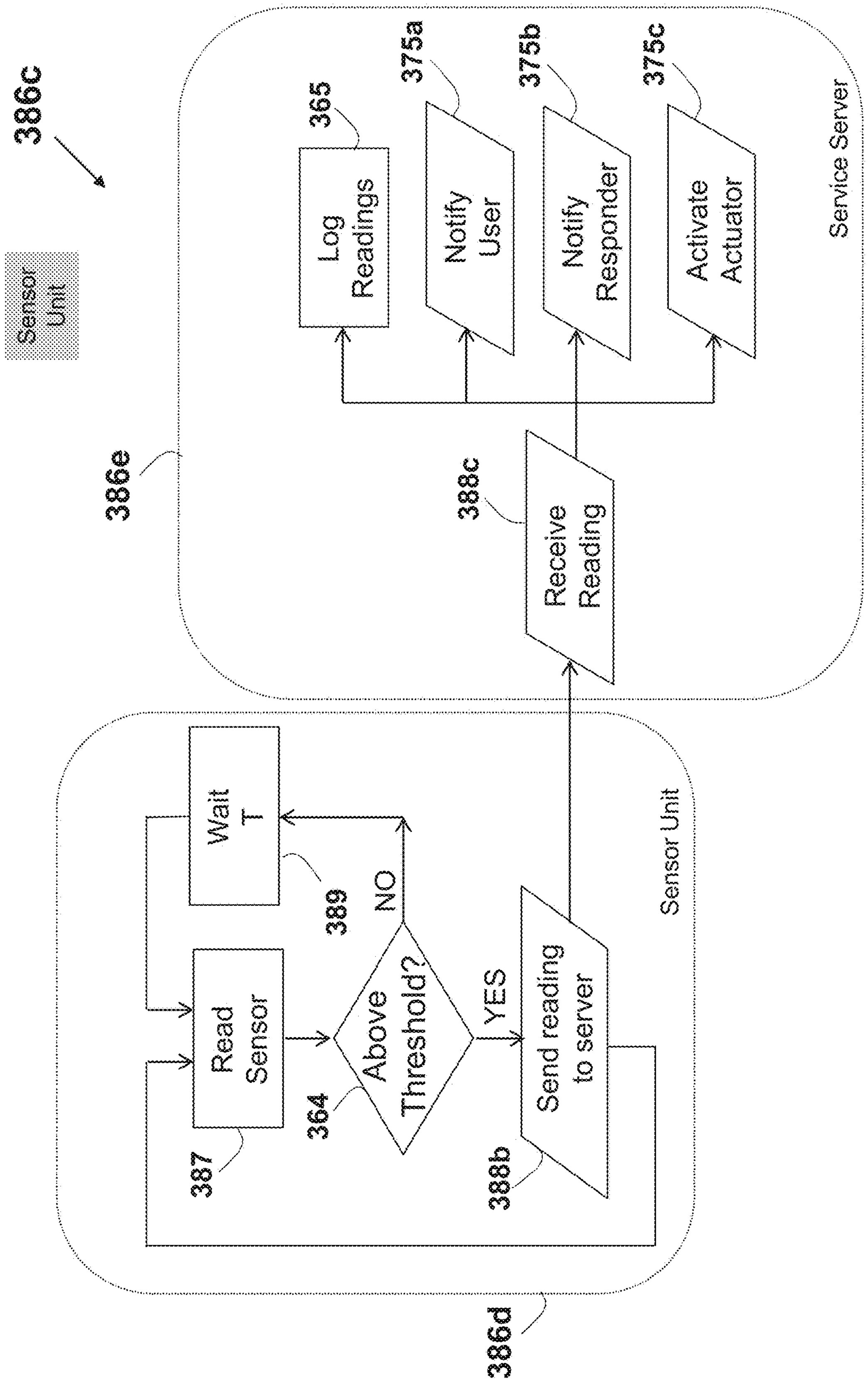

Alternatively or in addition, as illustrated in a flow-chart 386*c* shown in FIG. 38*b*, the value of the physical phenomenon sensed by the sensor 356 is continuously or periodically checked versus the pre-defined threshold in the sensor unit 355, and message is sent to the service server 358 only when an action is required. The sensor unit 355 continuously or periodically reads the value of the physical phenomenon by the sensor 356 output as part of the "Read Sensor" step 387, and the time period between consecutive such readings is 'T' as set in a "Wait T" step 389. The read value in the "Read Sensor" step 387, or any function thereof, is compared versus a pre-defined threshold as part of the "Above Threshold?" step 364 in the sensor unit 355. In the case the received value is below the set threshold, no action is deemed required, and the sensor unit 355 waits time 'T' for the next reading of the physical phenomenon by the sensor 356 in the "Read Sensor" step 387. Only in the case where the received value is above the set threshold and an action is deemed required, a message is sent to the service server 358 as part of a "Send reading to server" step 388*b*. The actions of the service server 358 are illustrated in a flow-chart 386*e*, that is part of the flow-chart 386*c*, as shown in FIG. 38*b*.

The reading is received by the service server 358 as part of a "Receive Reading" step 388*c*, and in response the service server 358 may notify the user as part of the "Notify User" step 375*a*, the service server 358 may notify a third party, such as a first responder as part of a "Notify Responder" step 375*b*, the service server 358 may activate an actuator, such as for handling the physical phenomenon, as part of a "Activate Actuator" step 375*c*, or any combination thereof.

For example, the sensor 356 may be a fire or temperature sensor. Upon sensing a fire or a high temperature in the "Above Threshold?" step 364, a fire alert message may be sent to a smartphone of the user as part of the "Notify User" step 375*a*, a fire alert message may be sent to nearest fire department as part of the "Notify Responder" step 375*a*, and sprinklers in the building 346 may be activated to suppress the fire, such as under control of the service server 358 over the Internet 113, as part of the "Activate Actuator" step 375*c*. The actuator activated as part of the Activate Actuator" step 375*c* may be any actuator that is described in U.S. Patent Application Publication No. 2013/0201316 to Binder et al. entitled: "System and Method for Server Based Control", which is incorporated in its entirety for all purposes as if fully set forth herein.

In one example, the sensor 356 may be part of a smart speaker that provides up-to-date information that is sent from the service server 358. Such system may be used to provide weather or traffic updates, as well as other selected specific subjects. Further, the sensor 356 may be a smart camera as part of enhancing physical security around the property 346. In one example, the sensor 356 may be a light sensor or detector that may be part of a smart lighting system, allowing for controlling of smart light bulbs (or other lighting fixtures) to be dimmer or brighter throughout the premises 346. In one example, the sensor 356 may be a camera as part of a smart doorbell system, that is installed near a door, such as in order to increase security in a front yard. In one example, the sensor 356 may be a carbon monoxide gas and smoke detector that is part of a smart smoke detector, for increasing safety in the premises 346. A security in the building 346 may be enhanced by using the sensor 356 as part of a smart lock system, as a replacement to a traditional cylinder lock. Further, the sensor 356 may be used to sense a garage door status as part of a smart garage door opener system.

In one example, the sensor 356 may be a temperature sensor that is used as part of a Heating, Ventilation and Air Conditioning (HVAC), where the service server 358 provides a remote control of all energy monitors over the Internet. For example, the sensor 356 may be a smart thermostat, that is used for strategically managing temperatures based on a schedule. Further, such system may monitor the temperatures in the surroundings of the building 346 to ensure that every space is adequately heated or cooled.

Alternatively or in addition, the sensor 356 may be a light sensor that is used as part of a lighting control system that: incorporates communication between various lighting system inputs and outputs, using the service server 358 as a central control device. Alternatively or in addition, the sensor 356 may be an environmental sensor such as a CO2 sensor or an occupancy sensor, that is integrated into an occupancy-aware control system as part of the building automation system, to trigger automatic responses for energy efficiency and building comfort applications.

The system may be used for lighting control, moisture control, freeze control, pet feeding, propane gauge, interior and exterior cameras, security, smoke alarms, or health monitoring. In one non-limiting example, a field unit may be integrated with a smoke detector assembly, which is typically housed in a disk-shaped plastic enclosure, which may be about 150 millimeters (6 inch) in diameter and 25 millimeters (1 inch) thick, and is commonly mounted on a ceiling or on a wall.

The system may further be used for building automation, or may be part of, integrated with, or coupled to a building automation system, such as the building automation system described in U.S. Pat. No. 6,967,565 to Lingemann entitled: "Building Automation System", which is incorporated in its entirety for all purposes as if fully set forth herein. A field unit, a sensor, or an actuator in the system or the device may be part of, integrated with, coupled to, or used to control indoor or outdoor lighting, fans, sprinklers, pool/spa heaters and pumps, electronic drapes, windoware units, fireplaces, garage doors openers, electronic door locks, hot water heaters, fire detection and monitoring equipment, electronic gates, digital security cameras, motion sensors, flood monitors, humidifiers, home theater units, phone PBX, voice mail, intercom, door phone, aquarium sensors and heaters, sidewalk and driveway heaters, sprinklers, dampers, doorbells, lighting fixtures and fans. The sensor unit 355 may be part of a system that may further support, be part of, or be integrated with, a Building Automation System (BAS) standard, and may further be in part or in full in accordance with Cisco Validated Design document entitled: "*Building Automation System over IP* (*BAS/IP*) *Design and Implementation Guide*" by Cisco Systems and Johnson Controls, which is incorporated in its entirety for all purposes as if fully set forth herein.

The sensor unit 355 may be used for Remote Patient Monitoring (RPM), enabling monitoring of patients outside of conventional clinical settings (e.g., in their home), which may increase access to care and decrease healthcare delivery costs. The monitoring and trend analysis of physiological parameters, enable early detection of deterioration; thereby, reducing number of emergency department visits, hospitalizations, and duration of hospital stays. Physiological data such as blood pressure and subjective patient data are collected by sensors on peripheral devices such as blood pressure cuff, pulse oximeter, and glucometer. The data is transmitted to healthcare providers or third parties via various networks, and may be evaluated for potential problems by a healthcare professional or via a clinical decision support algorithm, and patient, caregivers, and health providers are immediately alerted if a problem is detected. As a result, timely intervention ensures positive patient outcomes. Other applications may provide education, test, and medication reminder alert, and may include Telesurgery (remote surgery), enabling medical doctors to perform surgery on a patient being physically at another location, Teleaudiology for providing audiological services, Teledentistry for remote dental care, consultation, education, or awareness, Teledermatology for exchanging information concerning skin conditions or tumors of the skin, Telepathology fort practicing pathology at a distance, Teleradiology for imaging and sending radiographic images, and Telecardiology where ECGs are transmitted for remote evaluation.

The sensor unit 355 may be part of a security system, and may be according to, or based on, the system described in U.S. Pat. No. 6,934,426 to Rich et al., entitled: "Fiber Optic Security Sensor and System with Integrated Secure Data Transmission and Power Cables", in U.S. Pat. No. 7,843,336 to Kucharyson, entitled: "Self-Contained Wireless Security Sensor Collective System and Method", or in U.S. Patent Application Publication No. 2007/0164865 to Giasson et al., entitled: "Security Sensor System", which are all incorporated in their entirety for all purposes as if fully set forth herein. Further, The sensor unit 355 may be part of an environmental control system, and may be according to, or based on, the system described in U.S. Pat. No. 8,115,646 to Taniclian et al., entitled: "Environmental Sensor System", in U.S. Patent Application Publication No. 2010/0100327 to Jensen, entitled: "Environmental Sensing and Communication", in U.S. Patent Application Publication No. 2007/0004449 to Sham, entitled: "Mobile Communication Device with Environmental Sensors", or in U.S. Pat. No. 6,452,499 to Runge et al., entitled: "Wireless Environmental Sensor System", which are all incorporated in their entirety for all purposes as if fully set forth herein.

Figure 34D:
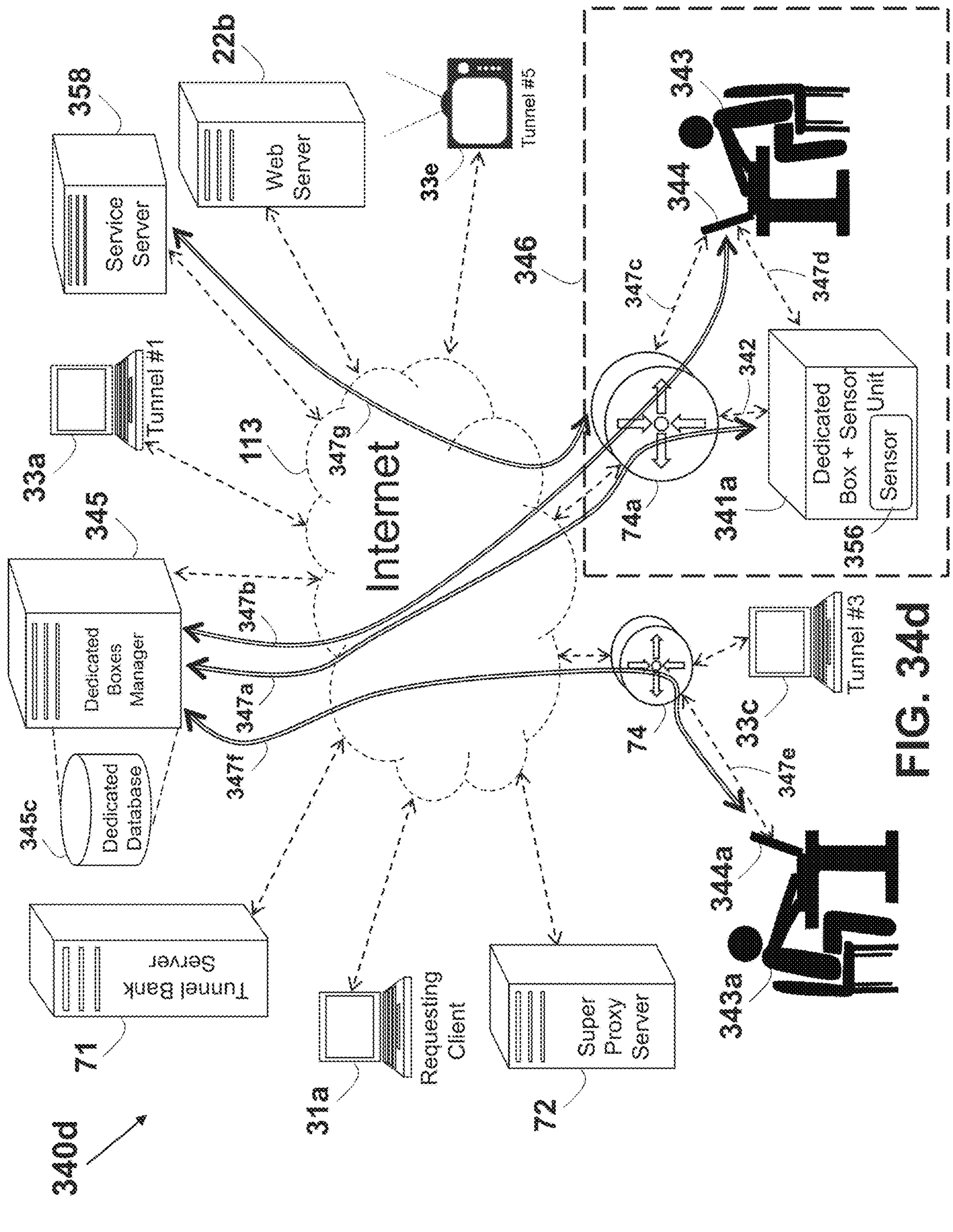
FIG. 34*d* depicts schematically messages exchanged over the Internet in home automation environment using an integrated dedicated box and sensor unit.
Figure 34E:
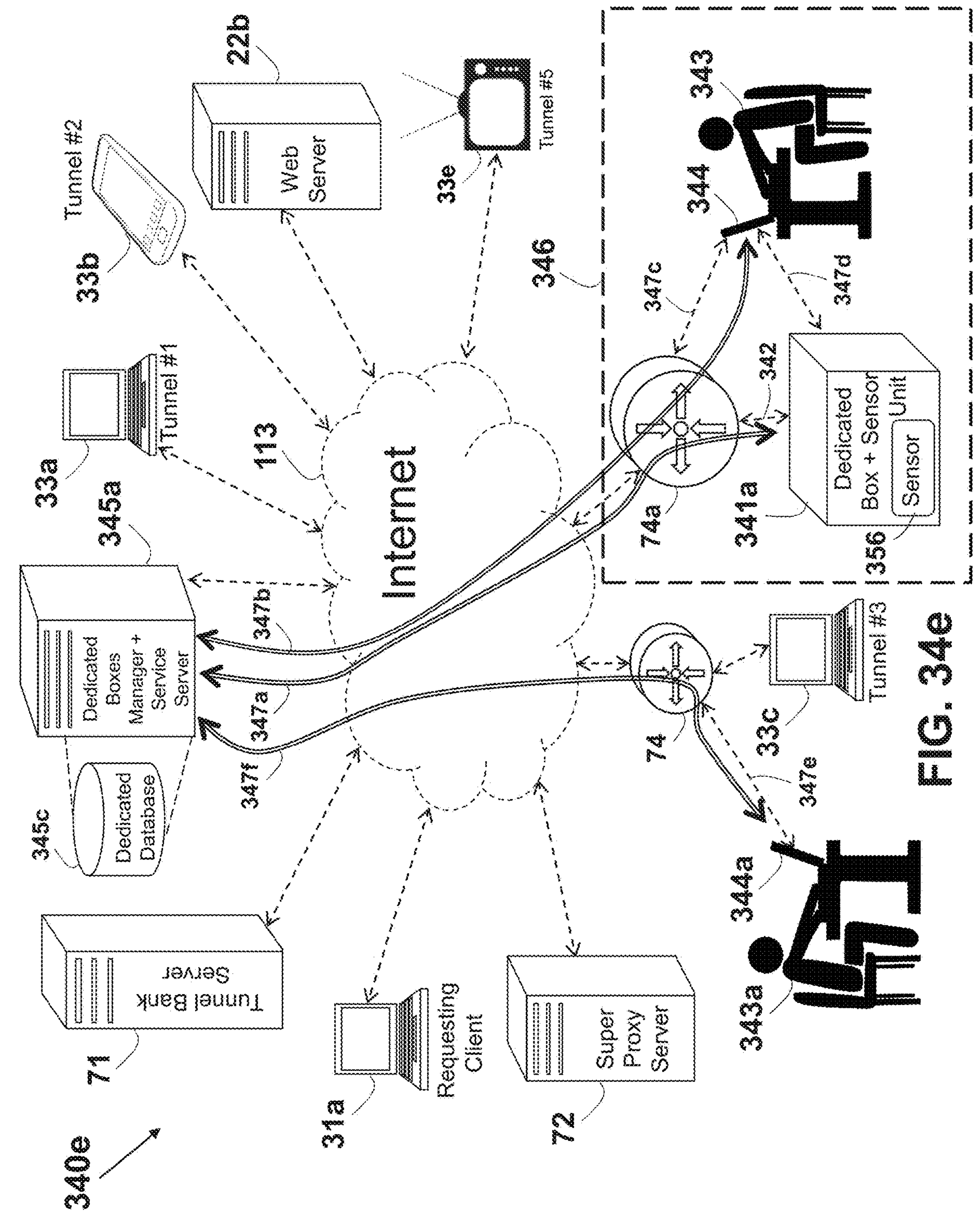
FIG. 34*e* depicts schematically messages exchanged over the Internet in home automation environment using an integrated dedicated box and sensor unit and an integrated dedicated boxes manager and service server.

The dedicated box 341 is exampled in the arrangement 340 shown in FIG. 34 as a stand-alone separate device, and the sensor unit 355 is exampled in the arrangement 340*c* shown in FIG. 34*c* as a stand-alone separate device. However, the two devices may be integrated, such as in a single enclosure, for case of installation and reducing the number of boxes and the related occupied space. Such an arrangement 340*d* is illustrated in FIG. 34*d*, where the dedicated box 341 and the sensor unit 355 are integrated into a single device "Dedicated Box+Sensor Unit" 341*a*. Further, the router 74*a* may as well be integrated with the combined functionalities single device "Dedicated Box+Sensor Unit" 341*a*. In addition, the Dedicated Boxes Manager server 345 is exampled in the arrangement 340 shown in FIG. 34 as a stand-alone separate device, and the Service Server 358 is exampled in the arrangement 340*c* shown in FIG. 34*c* as a stand-alone separate device. However, the two servers may be integrated, such as in a single enclosure or as a single integrated functionality operated and managed by a single entity, for case of service providing and case of using such a service. Such an arrangement 340*e* is illustrated in FIG. 34*c*, where the Service Server 358 and the Dedicated Boxes Manager server 345 are integrated with combined functionalities in a single combined entity or an integrated device such as a "Dedicated Boxes Manager Service Server" 345*a*.

The sensor 356 may be any sensor that is described in U.S. Patent Application Publication No. 2013/0201316 to Binder et al., entitled: "System and Method for Server Based Control", which is incorporated in its entirety for all purposes as if fully set forth herein. Any element capable of measuring or responding to a physical phenomenon may be used as a sensor. An appropriate sensor may be adapted for a specific physical phenomenon, such as a sensor responsive to temperature, humidity, pressure, audio, vibration, light, motion, sound, proximity, flow rate, electrical voltage, and electrical current. Further, the sensor 356 may provide a digital output, and the sensor output may include an electrical switch, and the electrical switch state may be responsive to the phenomenon magnitude measured versus a threshold. Alternatively or in addition, the sensor 356 may provide an analog output, and the sensor unit 355 may comprise an analog to digital converter coupled to the analog output, for converting the sensor output to a digital data. The sensor unit 355 may comprise a signal conditioning circuit coupled to the sensor output, and the signal conditioning circuit may comprise an amplifier, a voltage or current limiter, an attenuator, a delay line or circuit, a level translator, a galvanic isolator, an impedance transformer, a linearization circuit, a calibrator, a passive filter, an active filter, an adaptive filter, an integrator, a deviator, an equalizer, a spectrum analyzer, a compressor or a de-compressor, a coder, a decoder, a modulator, a demodulator, a pattern recognizer, a smoother, a noise remover, an average circuit, or an RMS circuit. Further, the sensor 356 may be operative to sense time-dependent characteristic of the sensed phenomenon, and may be operative to respond to a time-integrated, an average, an RMS (Root Mean Square) value, a frequency, a period, a duty-cycle, a time-integrated, or a time-derivative, of the sensed phenomenon. The sensor unit 355 or the service server 358 may be operative to calculate or provide a time-dependent characteristic such as time-integrated, an average, an RMS (Root Mean Square) value, a frequency, a period, a duty-cycle, a time-integrated, or a time-derivative, of the sensed phenomenon. Furthermore, the sensor 356 may be operative to sense space-dependent characteristic of the sensed phenomenon, such as to a pattern, a linear density, a surface density, a volume density, a flux density, a current, a direction, a rate of change in a direction, or a flow, of the sensed phenomenon. The sensor unit 355, the router 74*a*, or the service server 358 may be operative to calculate or provide a space-dependent characteristic of the sensed phenomenon, such as a pattern, a linear density, a surface density, a volume density, a flux density, a current, a direction, a rate of change in a direction, or a flow, of the sensed phenomenon.

The sensor 356 may comprise multiple sensors arranged as a directional sensor array, and the system or the device may be operative to estimate the number, magnitude, frequency, Direction-Of-Arrival (DOA), distance, or speed of the signal impinging the sensor array. A control logic may include processing of the sensor array outputs. A single component may consist of, or may be part of, the sensor. The sensor 356 may be a piezoelectric sensor that uses the transverse, longitudinal, or shear effect mode of the piezoelectric effect. Alternatively or in addition, the sensor 356 may be based on ultrasonic-waves propagation, sensing eddy-currents, based on proximity sensor. The sensor 356 may be a bulk or surface acoustic sensor, or may be an atmospheric or an environmental sensor.

The sensor 356 may be a thermoelectric sensor that senses or responds to a temperature or a temperature gradient of an object using conduction, convection, or radiation, and may consist of, or comprise, a Positive Temperature Coefficient (PTC) thermistor, a Negative Temperature Coefficient (NTC) thermistor, a thermocouple, a quartz crystal, or a Resistance Temperature Detector (RTD). Alternatively or in addition, the sensor 356 may be a radiation-based sensor that may respond to radioactivity, nuclear radiation, alpha particles, beta particles, or gamma rays, and may be based on gas ionization.

Alternatively or in addition, the sensor 356 may be a photoelectric sensor that responds to a visible or an invisible light or both, such as infrared, ultraviolet, X-rays, or gamma rays. Such photoelectric sensor may be based on the photoelectric or photovoltaic effect, and consists of, or comprises, a semiconductor component such as a photodiode, a phototransistor, or a solar cell. Further, the photoelectric sensor may be based on Charge-Coupled Device (CCD) or a Complementary Metal-Oxide Semiconductor (CMOS) element.

Alternatively or in addition, the sensor 356 may be a photosensitive image sensor array comprising multiple photoelectric sensors, and may be operative for capturing an image and producing an electronic image information representing the image, and may comprise one or more optical lens for focusing the received light and mechanically oriented to guide the image, and the image sensor may be disposed approximately at an image focal point plane of the one or more optical lens for properly capturing the image. An image processor may be coupled to the image sensor for providing a digital data video signal according to a digital video format, the digital video signal carrying digital data video based on the captured images, and the digital video format may be according to, or based on, one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format) and DPOF (Digital Print Order Format) standards. A video compressor may be coupled to the image sensor for lossy or non-lossy compressing of the digital data video, and may be based on a standard compression algorithm such as JPEG (Joint Photographic Experts Group) and MPEG (Moving Picture Experts Group), ITU-T H.261, ITU-T H.263, ITU-T H.264, or ITU-T CCIR 601.

Alternatively or in addition, the sensor 356 may be an electrochemical sensor and may respond to an object chemical structure, properties, composition, or reactions. Such electrochemical sensor may be a pH meter or may be a gas sensor responding to the presence of radon, hydrogen, oxygen, or Carbon-Monoxide (CO). Further, the electrochemical sensor may be a smoke, a flame, or a fire detector, and may be based on optical detection or on ionization for responding to combustible, flammable, or toxic gas.

Alternatively or in addition, the sensor 356 may be a physiological sensor and may respond to parameters associated with a live body, and may be external to the sensed body, implanted inside the sensed body, attached to the sensed body, or wearable on the sensed body. The physiological sensor may be responding to body electrical signals such as an EEG Electroencephalography (EEG) or an Electrocardiography (ECG) sensor, or may be responding to oxygen saturation, gas saturation, or blood pressure. Alternatively or in addition, the sensor 356 may be an electroacoustic sensor and may respond to a sound, such as inaudible or audible audio. Such electroacoustic sensor may be an omnidirectional, unidirectional, or bidirectional microphone, may be based on the sensing the incident sound-based motion of a diaphragm or a ribbon, and may consist of, or comprise, a condenser, an electret, a dynamic, a ribbon, a carbon, or a piezoelectric microphone.

Alternatively or in addition, the sensor 356 may be an electric sensor and may respond to or measure an electrical characteristics or electrical phenomenon quantity, and may be conductively, non-conductively, or non-contact couplable to the sensed element. The electrical sensor may be responsive to Alternating Current (AC) or Direct Current (DC), and may be an ampermeter and respond to an electrical current passing through a conductor or wire. The ampermeter may consist of, or comprises, a galvanometer, a hot-wire ampermeter, a current clamp, or a current probe. Alternatively or in addition, the electrical sensor may be a voltmeter and may respond to or measure an electrical voltage. The voltmeter may consist of, or comprise, an electrometer, a resistor, a potentiometer, or a bridge circuit. The electrical sensor may be a wattmeter such as an electricity meter that responds to electrical energy, and may measure or respond to active electrical power. The wattmeter may be based on induction, or may be based on multiplying measured voltage and current.

Further, the electrical sensor may be an impedance meter and may respond to the impedance of the sensed element such as bridge circuit or an ohmmeter, and may be based on supplying a current or a voltage and respectively measuring a voltage or a current. The impedance meter may be a capacitance or an inductance meter (or both) and may respond to the capacitance or the inductance of the sensed element, being measuring in a single frequency or in multiple frequencies. The electrical sensor may be a Time-Domain Reflectometer (TDR) and may respond to the impedance changes along a conductive transmission line, such as an optical TDR that may respond to the changes along an optical transmission line. Alternatively or in addition, the sensor 356 may be a magnetic sensor and may respond to an H or B magnetic field, and may consists of, or may be based on, a Hall effect sensor, a MEMS, a magneto-diode, a magneto-transistor, an AMR magnetometer, a GMR magnetometer, a magnetic tunnel junction magnetometer, a Nuclear precession magnetic field sensor, an optically pumped magnetic field sensor, a fluxgate magnetometer, a search coil magnetic field sensor, or a Superconducting Quantum Interference Device (SQUID) magnetometer. The magnetic sensor may be MEMS based, and may be a Lorentz force based MEMS sensor or may be an Electron Tunneling based MEMS.

Alternatively or in addition, the sensor 356 may be a tactile sensor and may respond to a human body touch, and may be based on a conductive rubber, a lead zirconate titanate (PZT) material, a polyvinylidene fluoride (PVDF) material, a metallic capacitive element, or any combination thereof. Alternatively or in addition, the sensor 356 may be a single-axis, 2-axis, or 3-axis motion sensor and may respond to the magnitude, direction, or both, of the sensor motion. Such motion sensor may be a piezoelectric, a piezoresistive, a capacitive, or a MEMS accelerometer and may respond to the absolute acceleration or the acceleration relative to freefall. The motion sensor may be an electromechanical switch and may consist of, or comprises, an electrical tilt, or a vibration switch. Alternatively or in addition, the sensor 356 may be a force sensor and may respond to the magnitude, direction, or both, of a force, and may be based on a spring extension, a strain gauge deformation, a piezoelectric effect, or a vibrating wire. The force sensor may be a dynamometer that responds to a torque or to a moment of the force.

Alternatively or in addition, the sensor 356 may be a pressure sensor and may respond to a pressure of a gas or a liquid, and may consist of, or comprise, an absolute pressure sensor, a gauge pressure sensor, a vacuum pressure sensor, a differential pressure sensor, or a sealed pressure sensor. Such pressure sensor may be based on a force collector, the piezoelectric effect, a capacitive sensor, an electromagnetic sensor, or a frequency resonator sensor. Alternatively or in addition, the sensor 356 may be an absolute, a relative displacement, or an incremental position sensor, and may respond to a linear or angular position, or motion, of a sensed element. Such position sensor may be an optical type or a magnetic type angular position sensor, and may respond to an angular position or the rotation of a shaft, an axle, or a disk. The angular position sensor may be based on a variable-reluctance (VR), an Eddy-current killed oscillator (ECKO), a Wiegand sensing, or a Hall-effect sensing, and may be transformer based such as an RVDT, a resolver or a synchro. The angular position sensor may be an electromechanical type such as an absolute or an incremental, mechanical or optical, rotary encoder. The angular position sensor may be an angular rate sensor and may respond to the angular rate, or the rotation speed, of a shaft, an axle, or a disc, and may consist of, or comprise, a gyroscope, a tachometer, a centrifugal switch, a Ring Laser Gyroscope (RLG), or a fiber-optic gyro. The position sensor may be a linear position sensor and may respond to a linear displacement or position along a line, and may consist of, or comprise, a transformer, an LVDT, a linear potentiometer, or an incremental or absolute linear encoder.

Alternatively or in addition, the sensor 356 may be a motion detector and may respond to a motion of an element, and may based on sound, geomagnetism, reflection of a transmitted energy, electromagnetic induction, or vibration. Such motion detector may consist of, or comprise, a mechanically-actuated switch. Alternatively or in addition, the sensor 356 may be a strain gauge and may respond to the deformation of an object, and may be based on a metallic foil, a semiconductor, an optical fiber, vibrating or resonating of a tensioned wire, or a capacitance meter. Alternatively or in addition, the sensor 356 may be a hygrometer and may respond to an absolute, relative, or specific humidity, and may be based on optically detecting condensation, or based on changing the capacitance, resistance, or thermal conductivity of materials subjected to the measured humidity. The sensor may be a clinometer and may respond to inclination or declination, and may be based on an accelerometer, a pendulum, a gas bubble in liquid, or a tilt switch.

Alternatively or in addition, the sensor 356 may be a flow sensor and may measure the volumetric or mass flow rate via a defined area, volume or surface. The flow sensor may be a liquid flow sensor and may be measuring the liquid flow in a pipe or in an open conduit. The liquid flow sensor may be a mechanical flow meter and may consist of, or comprise, a turbine flow meter, a Woltmann meter, a single jet meter, or a paddle wheel meter. The liquid flow sensor may be a pressure flow meter based on measuring an absolute pressure or a pressure differential. The flow sensor may be a gas or an air flow sensor such as anemometer for measuring wind or air speed, and may measure the flow through a surface, a tube, or a volume, and may be based on measuring the air volume passing in a time period. The anemometer may consist of, or comprise, cup anemometer, a windmill anemometer, a pressure anemometer, a hot-wire anemometer, or a sonic anemometer. Alternatively or in addition, the sensor 356 may be may be a gyroscope for measuring orientation in space, and may consist of, or comprise, a MEMS, a piezoelectric, a FOG, or a VSG gyroscope, and may be based on a conventional mechanical type, a nanosensor, a crystal, or a semiconductor.

Alternatively or in addition, the sensor 356 may be an image sensor for capturing an image or video, and the device or the system may include an image processor for recognition of a pattern, and the control logic may be operative to respond to the recognized pattern such as appearance-based analysis of hand posture or gesture recognition. The sensor unit 355 may further comprise an additional image sensor, and the control logic may be operative to respond to the additional image sensor such as to cooperatively capture a 3-D image and for identifying the gesture recognition from the 3-D image, based on volumetric or skeletal models, or a combination thereof.

Alternatively or in addition, the sensor 356 may be an image sensor for capturing still or video image, and the sensor 356, the sensor unit 355, or the service server 358, may comprise an image processor having an output for processing the captured image (still or video). Such image processor (hardware or software based, or a hardware/software combination) may be encased entirely or in part in the first device, the router, the control server, or any combination thereof, and the control logic may respond to the image processor output. The image sensor may be a digital video sensor for capturing digital video content, and the image processor may be operative for enhancing the video content such as by image stabilization, unsharp masking, or super-resolution, or for Video Content Analysis (VCA) such as Video Motion Detection (VMD), video tracking, egomotion estimation, identification, behavior analysis, situation awareness, dynamic masking, motion detection, object detection, face recognition, automatic number plate recognition, tamper detection, video tracking, or pattern recognition. The image processor may be operative for detecting a location of an element, and may be operative for detecting and counting the number of elements in the captured image, such as a human body parts (such as human face or a human hand) in the captured image.

Alternatively or in addition, the sensor 356 may be a photosensitive image sensor array comprising multiple photoelectric sensors, for capturing an image and producing electronic image information representing the image, and the apparatus may comprise an image processor coupled to the image sensor for providing a digital video data signal that may carry digital video data based on the captured images, and may use a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. The apparatus may comprise an intraframe or interframe compression based video compressor coupled to the image sensor for lossy or non-lossy compressing the digital video data, and the compression may be based on a standard compression algorithm which may be JPEG (Joint Photographic Experts Group) and MPEG (Moving Picture Experts Group), ITU-T H.261, ITU-T H.263, ITU-T H.264, or ITU-T CCIR 601. The sensor 356, the sensor unit 355, or the service server 358, may calculate or provide a space-dependent characteristic of the sensed condition, such as a pattern, a linear density, a surface density, a volume density, a flux density, a current, a direction, a rate of change in a direction, or a flow, of the condition.

Alternatively or in addition, the sensor 356 may be thermoelectric sensor, for measuring, sensing or detecting the temperature (or the temperature gradient) of an object, which may be solid, liquid or gas. Such sensor may be a thermistor (either PTC or NTC), a thermocouple, a quartz thermometer, or an RTD. The sensor may be based on a Geiger counter for detecting and measuring radioactivity or any other nuclear radiation. Light, photons, or other optical phenomena may be measured or detected by a photosensor or photodetector, used for measuring the intensity of visible or invisible light (such as infrared, ultraviolet, X-ray or gamma rays). A photosensor may be based on the photoelectric or the photovoltaic effect, such as a photodiode, a phototransistor, solar cell or a photomultiplier tube. A photosensor may be a photoresistor based on photoconductivity, or a CCD where a charge is affected by the light. The sensor may be an electrochemical sensor used to measure, sense or detect a matter structure, properties, composition, and reactions, such as pH meters, gas detector, or gas sensor. Using semiconductors, oxidation, catalytic, infrared or other sensing or detection mechanisms, gas detector may be used to detect the presence of a gas (or gases) such as hydrogen, oxygen or CO. The sensor may be a smoke detector for detecting smoke or fire, typically by an optical detection (photoelectric) or by a physical process (ionization).

In one example, the providing a tunneling functionality of serving as an intermediate device along the path of the content fetching by a client device from a web server using a separate, standalone enclosure, such as the wired dedicated box 350 or the wireless dedicated box 350*a*, allows an advantage of using such a device that is optimized for independently providing such functionality at a known fixed location continuously, and at any time and every day (24/7/365). Further, a proxy service provider may continually, securely, and independently access the device for OA&M functions at any time and every day (24/7/365). From the user 343 perspective, after quick and easy installation, that generally includes connecting the dedicated box (wiredly or wirelessly) to the router 74*a*, there is no interference or any deterioration in any activity, except for the minimum effect of low power consumption, using a connection in the router 74*a*, and sharing the Internet connection. The integrating of the tunneling functionality with the router 74*a* to form the Combined Router/Box 74*b*, further improves the installation process since no physical connection is required, and further allows to save the number of physical boxes devices that are used. Similarly, the integration of the tunneling functionality with the sensor unit 355 to form the Dedicated Box+Sensor unit 341*a*, allows for a single physical installation to be used for both purposes of home or building automation and the tunneling functionality, and further allows to save the number of physical boxes devices that are used.

Fingerprint. As used herein and defined in IETF RFC 6973, a fingerprint is a set of information elements that identifies a device or application instance, and fingerprinting is the process of an observer or attacker uniquely identifying (with a sufficiently high probability) a device or application instance based on multiple information elements communicated to the observer or attacker. In many cases, the specific ordering and/or occurrences of information elements (such as physical or logical features, attributes, or characteristics) in a protocol allow users, devices, or software using the protocol to be fingerprinted.

A fingerprint may be based on or may use, an IP address. Every device connected to the Internet is assigned a unique IP address, which is needed to enable devices to communicate with each other. With appropriate software on the host website, the IP address of visitors to the site can be logged and can also be used to determine the visitor's geographical location. Logging the IP address can, for example, monitor if a person voted more than once, as well as their viewing pattern. Knowing the visitor's location indicates, besides other things, the country. This may, for example, result in prices being quoted in the local currency, the price or the range of goods that are available, special conditions applying, and in some cases requests, from or responses to a certain country being blocked entirely. Internet users may circumvent censorship and geo-blocking and protect personal identity and location to stay anonymous on the internet using a VPN connection. A fingerprint may be based on or may use, an HTTP cookie. An HTTP cookie is a code and information embedded onto a user's device by a website when the user visits the website. The website might then retrieve the information on the cookie on subsequent visits to the website by the user. Cookies can be used to customize the user's browsing experience and to deliver targeted ads. Some browsing activities that cookies can store are pages and content a user browsed, what a user searched online, when a user clicked on an online advertisement, or what time a user visited a site.

A fingerprint may be based on, or may use, first- and third-party cookies. A first-party cookie is created by the website the user is visiting. These cookies are considered "good" since they help the user rather than spy on them. The main goal of first-party cookies is to recognize the user and their preferences so that their desired settings can be applied. A third-party cookie is created by websites other than the one a user visits. They insert additional tracking code that can record a user's online activity. On-site analytics refers to data collection on the current site. It is used to measure many aspects of user interactions including the number of times a user visits. Restrictions on third-party cookies introduced by web browsers are bypassed by some tracking companies using a technique called CNAME cloaking, where a third-party tracking service is assigned a DNS record in the first-party origin domain (usually CNAME) so that it's masqueraded as first-party even though it's a separate entity in legal and organizational terms. This technique is blocked by some browsers and ad blockers using block lists of known trackers.

A fingerprint may be based on, or may use, canvas fingerprinting that allows websites to identify and track users using HTML5 canvas elements instead of using a browser cookie. Similarly, a fingerprint may be based on, or may use, a cross-device tracking that is used by advertisers to help identify which channels are most successful in helping convert browsers into buyers. Further, a fingerprint may be based on, or may use, a click-through rate that is used by advertisers to measure the number of clicks they receive on their ads per number of impressions, or mouse tracking that collects the user's mouse cursor positions on the computer. Furthermore, a fingerprint may be based on, or may use, a browser fingerprinting that relies on your browser and is a way of identifying users every time they go online and track your activity. Through fingerprinting, websites can determine the user's operating system, language, time zone, and browser version without your permission.

Alternatively or in addition, a fingerprint may be based on, or may use, 'supercookies' or "evercookies" that can not only be used to track users across the web, but are also hard to detect and difficult to remove since they are stored in a different place than the standard cookies. Further, a fingerprint may be based on, or may use, a session replay script that allows the ability to replay a visitor's journey on a web-site or within a mobile application or web application. Similarly, web beacons are commonly used to check whether or not an individual who received an email actually read it, and favicons can be used to track users since they persist across browsing sessions.

Device fingerprinting. Device fingerprinting is the systematic gathering of information on a specific remote device with the aim of identifying, singling out and, thus being able to monitor its user's activity for the purpose of profiling. The concept of device fingerprinting is based on the assumption that each electronic device holds a unique set of physical and/or logical features that others can capture and use to differentiate it from the whole. Web-based fingerprinting, a particular case of device fingerprinting, allows website owners to differentiate the devices based on the set of information that browsers transmit. Depending on the techniques being used, a website can track a device based on its browser features (browser fingerprinting) or based on system settings (cross-browser fingerprinting). The latter allows identification of the device even when more than one browser is used. Device fingerprinting is based on the assumption that no two devices are exactly alike and that profiles can be created by capturing the emanation patterns sent or leaked from the devices, as long as these externalizations are repetitive through time. Small physical differences in the components of the devices, that were introduced during the manufacturing process, may result in slightly different behaviors and externalizations, which could be captured and used to create a fingerprint. Other examples of fingerprinting could be the tracking of clock deviation between the internal clock of a client's device and the clock of a server or the collection of the set of fonts and browser plugins installed on a system.

Various known web-based fingerprinting techniques, categorizing them as which ones are browser and which are cross-browser and showing real examples of the data that can be captured with each technique, are described in an article entitled: "*Web-based Fingerprinting Techniques*" by Bernardo, V. and Domingos, D., published 2016 In Proceedings of the 13th International Joint Conference on e-Business and Telecommunications (ICETE 2016)—Volume 4: SECRYPT, pages 271-282 [DOI: 10.5220/0005965602710282 ISBN: 978-989-758-196-0], which is incorporated in its entirety for all purposes as if fully set forth herein. The study is synthesized in a taxonomy, which provides a clear separation between techniques, making it easier to identify the threats to security and privacy inherent to each one.

A study entitled: "*Survey on Device Fingerprinting*" published 2019 by the 'Agencia Espanola Proteccion Datos', which is incorporated in its entirety for all purposes as if fully set forth herein, assesses an approximation of the digital fingerprint of the device; the techniques most used to obtain it; how they identify the device used by the user, some recommendations for users on how to protect their privacy through the uses of measures available to them and thus avoid the use of fingerprints for tracking and profiling purposes and, finally, recommendations for the industry.

A computer-implemented method for enhancing user privacy is disclosed in U.S. Pat. No. 11,140,136 to Li et al. entitled: "Systems and methods for enhancing user privacy", which is incorporated in its entirety for all purposes as if fully set forth herein. The method may include (i) intercepting, by a privacy-protecting network proxy, network traffic between a client device and a server device, the client device being protected by a network-based privacy solution that inhibits browser fingerprinting through the privacy-protecting network proxy, (ii) detecting, at the privacy-protecting network proxy, that the network traffic indicates an attempt by a browser fingerprinting service to perform browser fingerprinting on the client device, and (iii) modifying, at the privacy-protecting network proxy based on the detecting of the attempt to perform browser fingerprinting, the intercepted network traffic such that browser fingerprinting performed by the browser fingerprinting service is at least partially inhibited. Various other methods, systems, and computer-readable media are also disclosed.

A method of identifying a device includes receiving a device transaction request from a remote device, receiving a first device fingerprint of the remote device, and receiving a second device fingerprint of a known device is described in U.S. Pat. No. 9,984,365 to Desai et al. entitled: "Device identification based on deep fingerprint inspection", which is incorporated in its entirety for all purposes as if fully set forth herein. The first device fingerprint is compared with the second device fingerprint and a first metric indicative of a similarity of the first device fingerprint and the second device fingerprint is generated. A third device fingerprint corresponding to an expected current value of the second device fingerprint is generated, and the first device fingerprint is compared with the third device fingerprint to generate a second metric indicative of a similarity of the first device fingerprint and the third device fingerprint. A response to the transaction request is formulated based on the first metric and the second metric.

The concept of device fingerprinting is based in the assumption that each electronic device holds a unique set of physical and/or logical features that others can capture and use to differentiate it from the whole. Web-based fingerprinting, a particular case of device fingerprinting, allows website owners to differentiate devices based on the set of information that browsers transmit. Depending on the techniques being used, a website can track a device based on its browser features (browser fingerprinting) or based on system settings (cross-browser fingerprinting). The latter allows identification of the device even when more than one browser is used. A study entitled: "*Web-based Fingerprinting Techniques*" by Vitor Bernardo and Dulce Domingos, published 2016 In Proceedings of the 13th International Joint Conference on e-Business and Telecommunications (ICETE 2016)—Volume 4: SECRYPT, pages 271-282 [DOI: 10.5220/0005965602710282; ISBN: 978-989-758-196-0], which is incorporated in its entirety for all purposes as if fully set forth herein, identifies known web-based fingerprinting techniques, categorizing them as which ones are browser and which are cross-browser and showing real examples of the data that can be captured with each technique. The study is synthesized in a taxonomy, which provides a clear separation between techniques, making it easier to identify the threats to security and privacy inherent to each one.

Web-based fingerprinting. Web-based fingerprinting functionality involves allowing a website owner or operator to track devices' or user's accesses throughout time, in an almost invisible way. In fact, even if the user is aware of privacy issues and takes precautions, whether by actively deleting cookies, blocking all cookies or using a browser in "private mode", his device will still be finger-printable. This makes the use of web-based fingerprinting far more upsetting than simple cookies. In most cases, web-based fingerprinting is used to track users activity in sites and bind a device fingerprint to a user profile (together with its preferences, tastes, and interests). The interest of advertising companies in this kind of information is foreseeable, as it allows them to adjust the publicity to the user's interests.

Indeed, in 2014, the Article 29 Data Protection Working Party, a European Union advisor on data protection, stated that: "( . . . ) fingerprint provides the ability to distinguish one device from another and can be used as a covert alternative for cookies to track internet behavior over time. As a result, an individual may be associated, and therefore identified, or made identifiable, by that device fingerprint. ( . . . ) The data protection risks of device fingerprinting are increased by the fact that the unique set of information elements is not only available to the website publisher, but also to many other third parties." (Article 29 Data Protection Working Party, 2014) (p. 6). Web-based fingerprinting relies in capability to collect information about the device's Operating System (OS) properties, installed software, and other logical configurations to get a unique signature from the device—rather than trying to infer patterns from the behavior of the equipment, such as the "hardware based" device fingerprinting approach would.

Web-based fingerprinting does not require special equipment or a specific scenario to be put into practice. Two different approaches can be taken regarding the type of client-side features that will be processed to extract a signature: browser or cross-browser fingerprinting. Browser fingerprinting relies on the distinctive features of the client browser and/or OS and its purpose is to create a unique signature based on the information collected from the pair (browser, OS). Cross-browser fingerprinting, on the other hand, is based only in non-browser features, what makes it resilient to the use of multiple browsers by the same device. This approach requires system settings to be collected such as, OS version, CPU information, network interfaces information, number of processors, screen size, etc.

In a typical web-based fingerprinting scenario, the client's browser requests the webpage code to the server (through an HTTP request), in order to render it for the user. Within this request, some fingerprinting information from the user's system can already be collected, namely the information that is sent in the UserAgent—the HTTP header field that the most popular browsers use to indicate the browser and OS versions. In the HTTP response, the web server can include the client-side fingerprinting script. Most fingerprinting techniques are based in client-side code execution because this type of technology allows the browser to make direct calls to the OS or other machine configurations and to send that data back to the webserver asynchronously (without interfering with the display and behavior of the existing page). After the browser has processed the script and sent the result to the web server, the latter computes a unique identifier based on the information received and stores it in a database—this will be the fingerprint for this user's device. Although this identifier could be seen as a simple hash of the device's properties, this would soon prove to be a simplistic approach as it would render the fingerprint useless at the slightest change in the client's environment. A better approach would be to store an array of the device's properties. From this moment on, the website owner can track that device throughout the pages it visits, without the use of cookies, as long as they all contain the fingerprinting script.

Fingerprinting is more invasive than ordinary cookie-based tracking, as a digital fingerprint is created when a company makes a unique profile of a user based on the user's computer hardware, software, add-ons, and even preferences. Even the personal settings, such as the screen used, the fonts installed on the user's computer, and even the user's choice of a web browser can all be used to create a fingerprint.

Passive fingerprinting. Passive client fingerprinting refers to the passive collection of attributes from a network connecting a client device or a server device. Attributes may be collected from the transport, session, or application layer (e.g., TCP properties, TLS capabilities, or HTTP implementation characteristics), and can be used to deduce information about the client device, such as an operating system (type and version), a system up-time, or, in some cases, the browser type. In addition, a client's passive fingerprint can be used to add uniqueness/entropy to the client's online identity, specifically when using a multi-layered device fingerprinting approach. Passive fingerprinting includes browser fingerprinting that is based on characteristics observable in the contents of Web requests, typically without the use of any code executed on the client. Passive fingerprinting would trivially include cookies (often unique identifiers sent in HTTP requests), the set of HTTP request headers and the IP address and other network-level information. The User-Agent string [RFC7231], for example, is an HTTP request header that typically identifies the browser, renderer, version and operating system. In some cases, the User-Agent and IP address will often uniquely identify a particular user's browser.

Active fingerprinting. Active fingerprinting includes communication with the target machine, such as a client device, by sending packets to it, and checking what type of response is generated (or if no response is generated at all). Nmap is a popular active fingerprinting tool. It works by sending unusual or nonsensical data packets to the target machine. In one example, the way in which various operating system respond to these formed packets may provide an insight into the type, and some features, of the operating system the client device is running. Active fingerprinting includes techniques where a site or web-server runs JavaScript or other code on the requesting client device to observe any additional characteristics of the web browser, the user behavior, the device hardware or software, or any other available context. Techniques for active fingerprinting might include accessing the window size, enumerating fonts or plug-ins, evaluating performance characteristics, reading from device sensors, and rendering graphical patterns. Key to this distinction is that active fingerprinting takes place in a way that is potentially detectable on the client.

Cookie-like fingerprinting. Users, user agents, and general client devices may further be identified by a site or web server that first sets and later retrieves data or state that is stored by the user agent or the client device. This cookie-like fingerprinting allows re-identification of a user or inferences about a user in the same way that HTTP cookies allow state management for the stateless HTTP protocol [RFC6265]. Cookie-like fingerprinting may also circumvent user attempts to limit or clear cookies stored by the user agent, as demonstrated by the "evercookie" implementation. Where state is maintained across user agents (as in the case of common plugins with local storage), across devices (as in the case of certain browser syncing mechanisms) or across software upgrades, cookie-like fingerprinting can allow re-identification of users, user agents or devices where active and passive fingerprinting might not.

Browser fingerprinting. A browser fingerprint is a set of information related to a user's device from the hardware to the operating system to the browser and its configuration. Browser fingerprinting refers to the process of collecting information through a web browser to build a fingerprint of a device. Via a simple script running inside a browser, a server can collect a wide variety of information from public interfaces called Application Programming Interface (API) and HTTP headers. An API is an interface that provides an entry point to specific objects and functions. While some APIs require a permission to be accessed like the microphone or the camera, most of them are freely accessible from any JavaScript script rendering the information collection trivial. Contrarily to other identification techniques like cookies that rely on a unique identifier (ID) directly stored inside the browser, browser fingerprinting is qualified as completely stateless. It does not leave any trace as it does not require the storage of information inside the browser.

The web is a beautiful platform and browsers give us our entry point into it. With the introduction of HTML5 and CSS3, the web has become richer and more dynamic than ever and it has now the foundations to support an incredible ecosystem of diverse devices from laptops to smartphones and tablets. The diversity that is part of the modern web opened the door to device fingerprinting, a simple identification technique that can be used to collect a vast list of device characteristics on several layers of the system. As its foundations are rooted into the origin of the web, browser fingerprinting cannot be fixed with a simple patch. Clients and servers have been sharing device specific information since the beginning to improve user experience. The main concept behind browser fingerprinting is straight-forward: collecting device-specific information for purposes like identification or improved security. However, when this concept is implemented, its exact contours are constantly changing as its mechanisms are entirely defined by current web browser technologies.

In a paper entitled: "*Browser Fingerprinting: A survey*" by Pierre Laperdrix et al. published November 2019 in arXiv, Vol. 1, No. 1, [https://doi.org/10.48550/arXiv.1905.01051], which is incorporated in its entirety for all purposes as if fully set forth herein, a research performed in the domain of browser fingerprinting is described. The paper explains how this technique works and where it stems from, and analyzes the related work in detail to understand the composition of modern fingerprints and see how this technique is currently used online. Cross-browser device fingerprinting is also considered.

Two different approaches can be taken regarding the type of client-side features that will be processed to extract a signature: browser or cross-browser fingerprinting. Browser fingerprinting relies on the distinctive features of the client browser and/or OS and its purpose is to create a unique signature based on the information collected from the pair (browser, OS). Cross-browser fingerprinting, on the other hand, is based only in non-browser features, what makes it resilient to the use of multiple browsers by the same device. This approach requires system settings to be collected such as OS version, CPU information, network interfaces information, number of processors, or screen size.

A method for incrementally fingerprinting a computing device is described in U.S. Pat. No. 9,942,349 to Johannsen entitled: "Incremental browser-based device fingerprinting", which is incorporated in its entirety for all purposes as if fully set forth herein. The method includes steps for executing device-identification code programmed to retrieve a complete set of device configuration metrics from a web browser of the computing device, interrupting execution of the device-identification code after retrieval of a first subset of the device configuration metrics, generating a partial device fingerprint from the first subset, generating a temporary device identifier from the partial device fingerprint, and generating a subset indicator identifying the device configuration metrics that compose the first subset. Additional steps include writing the temporary device identifier and the subset indicator to browser-based storage of the computing device, resuming execution of the device-identification code, querying the browser-based storage for the presence of the temporary device identifier, and retrieving, responsive to detecting the temporary device identifier, a second subset of the device configuration metrics, the second subset comprising device configuration metrics not identified by the subset indicator.

Cross-browser fingerprinting. Cross-Browser Fingerprinting allows sites to track users across multiple browsers, and it is also more accurate than single-browser fingerprinting. Such mechanism may be beneficial, for example, a banking site could use it to determine that a person logging into an online account isn't using the computer that has been used on every previous visit, which could then raise a red flag security-wise. However, it may also be used to violate a user's privacy by being used to serve up customized ads across all of the browsers a user accesses.

A cross-browser fingerprinting technique that can track users not only within a single browser but also across different browsers on the same machine is described in an article entitled: "(*Cross-*)*Browser Fingerprinting via OS and Hardware Level Features*" by Yinzhi Cao Lehigh, Song Li Lehigh, and Erik Wijmans, published 2017 in NDSS '17, 26 Feb.-1 Mar. 2017, San Diego, CA, USA [ISBN 1-1891562-46-0; http://dx.doi.org/10.14722/ndss.2017.23152], which is incorporated in its entirety for all purposes as if fully set forth herein. The technique described utilizes many novel OS and hardware level features, such as those from graphics cards, CPU, and installed writing scripts. These features are extracted by asking browsers to perform tasks that rely on corresponding OS and hardware functionalities.

To fingerprint different browsers installed on the same machine, one simple approach is to use existing features that fingerprint single browser. Because many existing features are browser specific, the cross-browser stable ones are not unique enough even when combined together for fingerprinting. That is why the only cross-browser fingerprinting works and adopts IP address as a main feature. The paper proposes a (cross-)browser fingerprinting based on many novel OS and hardware level features, e.g., these from the graphics card, CPU, audio stack, and installed writing scripts. Specifically, because many of such OS and hardware level functions are exposed to JavaScript via browser APIs, features can be extracted when asking the browser to perform certain tasks through these APIs. The extracted features can be used for both single- and cross-browser fingerprinting.

Canvas fingerprinting. Canvas fingerprinting is one of a number of browser fingerprinting techniques for tracking online users that allow websites to identify and track visitors using the HTML5 canvas element instead of browser cookies or other similar means. When a user visits a page, the fingerprinting script first draws text with the font and size of its choice and adds background colors (1). Next, the script calls Canvas API's ToDataURL method to get the canvas pixel data in dataURL format (2), which is basically a Base64 encoded representation of the binary pixel data. Finally, the script takes the hash of the text-encoded pixel data (3), which serves as the fingerprint. Variations in which the Graphics Processing Unit (GPU), or the graphics driver, is installed may cause the fingerprint variation. The fingerprint can be stored and shared with advertising partners to identify users when they visit affiliated websites. A profile can be created from the user's browsing activity, allowing advertisers to target advertise to the user's inferred demographics and preferences. Since the fingerprint is primarily based on the browser, operating system, and installed graphics hardware, it does not uniquely identify users.

A large-scale study of three advanced web tracking mechanisms—canvas fingerprinting, evercookies, and use of "cookie syncing" in conjunction with evercookies, is an article entitled: "*The Web Never Forgets: Persistent Tracking Mechanisms in the Wild*" by Gunes Acar et al., presented at CCS'14, Nov. 3-7, 2014, Scottsdale, Arizona, USA, [ACM 978-1-4503-2957-6/14/11 . . . $15.00; http://dx-.doi.org/10.1145/2660267.2660347], which is incorporated in its entirety for all purposes as if fully set forth herein. Canvas fingerprinting, a recently developed form of browser fingerprinting, has not previously been reported in the wild; the reported results show that over 5% of the top 100,000 websites employ it. The article then presents the first automated study of evercookies and respawning and the discovery of a new evercookie vector, IndexedDB. Turning to cookie syncing, the article presents novel techniques for detection and analyzing ID flows and quantifies the amplification of privacy-intrusive tracking practices due to cookie syncing. The article evaluation of the defensive techniques used by privacy-aware users finds that there exist subtle pitfalls, such as failing to a clear state on multiple browsers at once, in which a single lapse in judgement can shatter privacy defenses. This suggests that even sophisticated users face great difficulties in evading tracking techniques.

Tying the browser more closely to operating system functionality and system hardware means that websites have more access to these resources, and that browser behavior varies depending on the behavior of these resources. A new system fingerprint which renders text and WebGL scenes to an element, and then examines the pixels produced, is described in an article entitled: "*Pixel Perfect: Fingerprinting Canvas in HTML5*" by Keaton Mowery and Hovav Shacham of the Department of Computer Science and Engineering University of California, San Diego La Jolla, California, USA, published In Proceedings of W2SP 2012 [IEEE Computer Society, May 2012], which is incorporated in its entirety for all purposes as if fully set forth herein. Such fingerprint is consistent, high-entropy, orthogonal to other fingerprints, transparent to the user, and readily obtainable. Browsers are becoming increasingly sophisticated application platforms, taking on more of the functionality traditionally provided by an operating system. Much of this increasing sophistication is driven by the HTML5 suite of specifications, which make provisions for a programmatic drawing surface, three-dimensional graphics (WebGL), a structured client-side datastore, geolocation services, the ability to manipulate browser history and the browser cache, audio and video playback, and more. The natural way for browsers to implement such features is to draw on the host operating system and hardware. Using the GPU for 3D graphics (and even for 2D graphics compositing) provides substantial performance improvements, as well as battery savings on mobile devices. And using the operating system's font-rendering code for text means that browsers automatically display text in a way that is optimized for the display and consistent with the user's expectations. This paper proceeds from the following simple observation: Tying the browser more closely to operating system functionality and system hardware means that websites have more access to these resources, and that browser behavior varies depending on the behavior of these resources. The first part of this observation has security implications: codebases not designed to handle adversarial input can now be exposed to it. The second part of the observation has privacy implications: different behavior can be used to distinguish systems, and thereby fingerprint the people using them.

Figure 5:
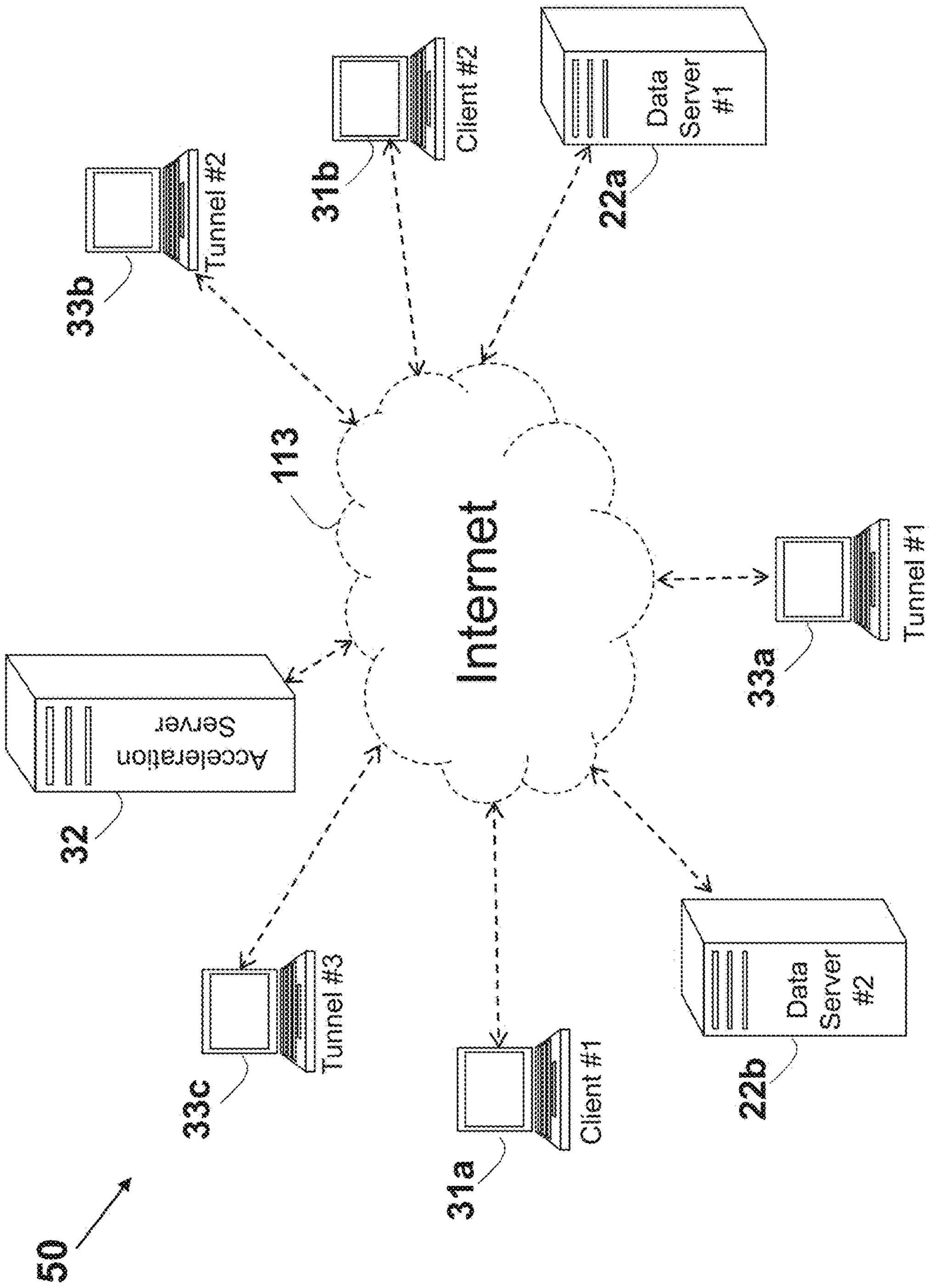
FIG. 5 (Prior Art)
FIG. 5 depicts schematically client devices, tunnel devices, and servers connected to the Internet.
Figure 5A:
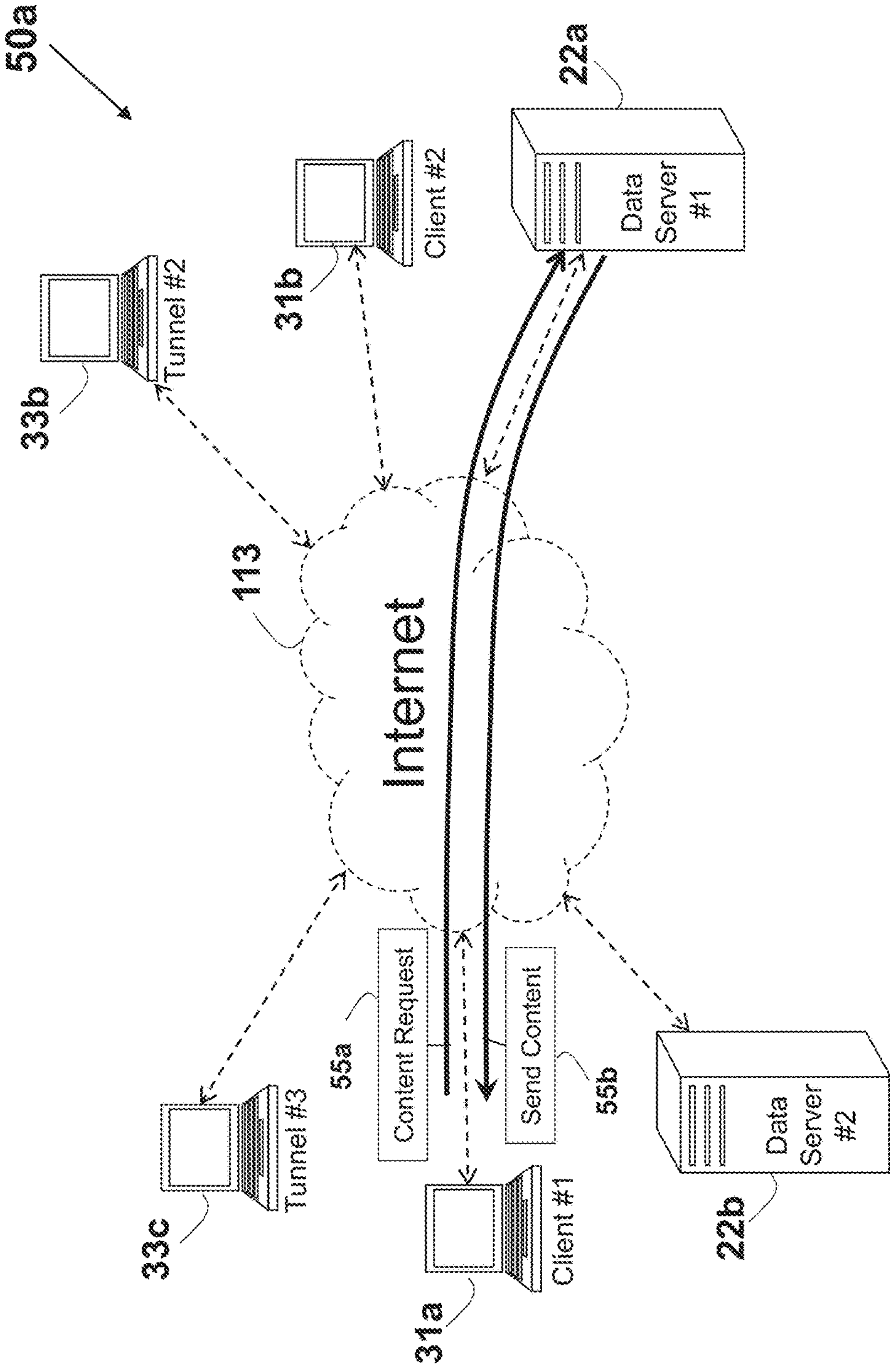
FIG. 5a (Prior Art)
FIG. 5*a* depicts schematically a direct fetching scheme over the Internet.
Figure 5C:
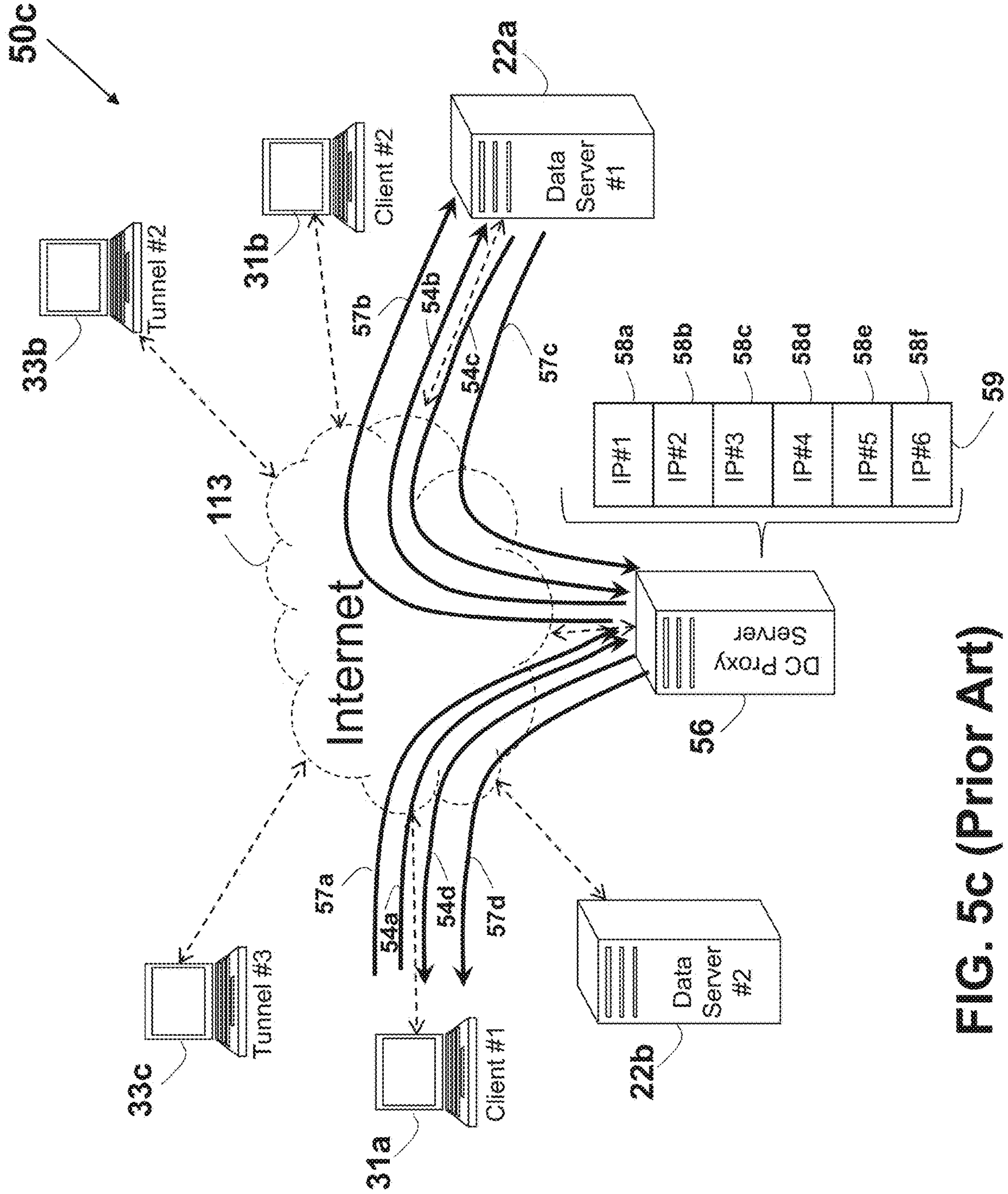
FIG. 5c (Prior Art)
FIG. 5*c* depicts schematically a non-direct fetching scheme over the Internet using a Data Center (DC) proxy server.
Figure 6:
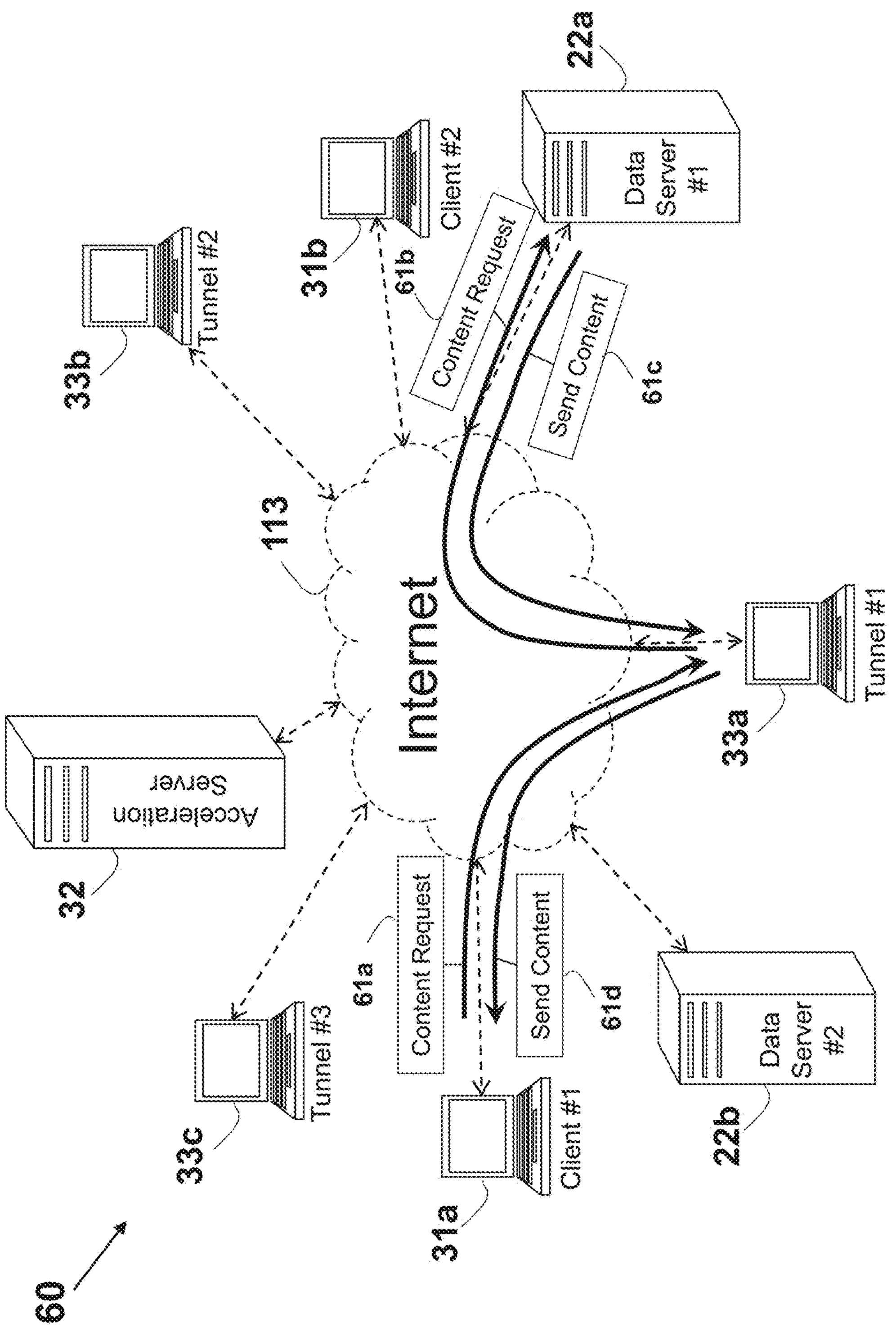
FIG. 6 (Prior Art)
FIGS. 6, 6*a*, and 6*b* depict schematically messages exchanged over the Internet between a client device and a data server, using different tunnel devices, according to '044 patent.
Figure 6A:
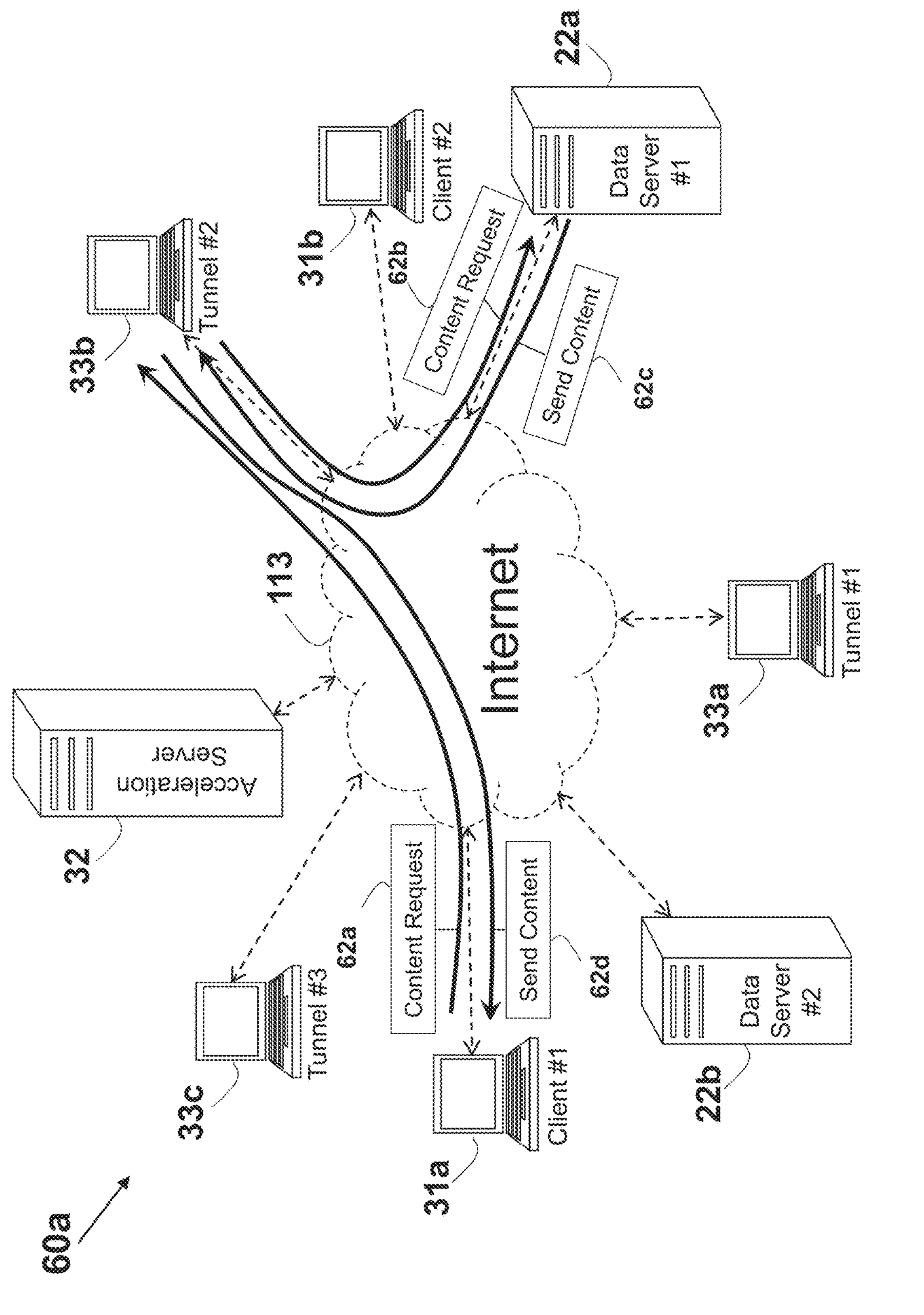
FIG. 6a (Prior Art)
Figure 6B:
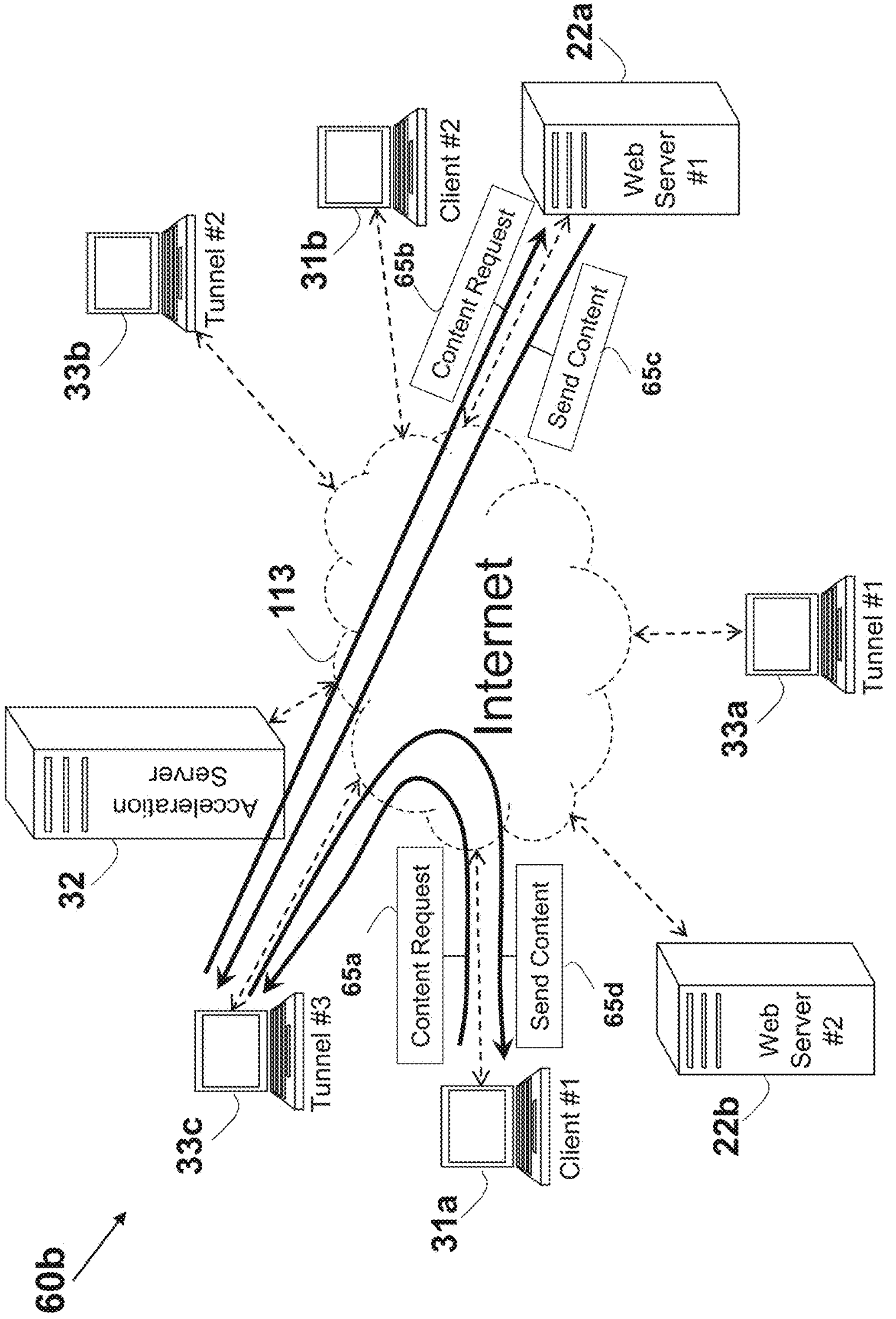
FIG. 6b (Prior Art)
Figure 12:
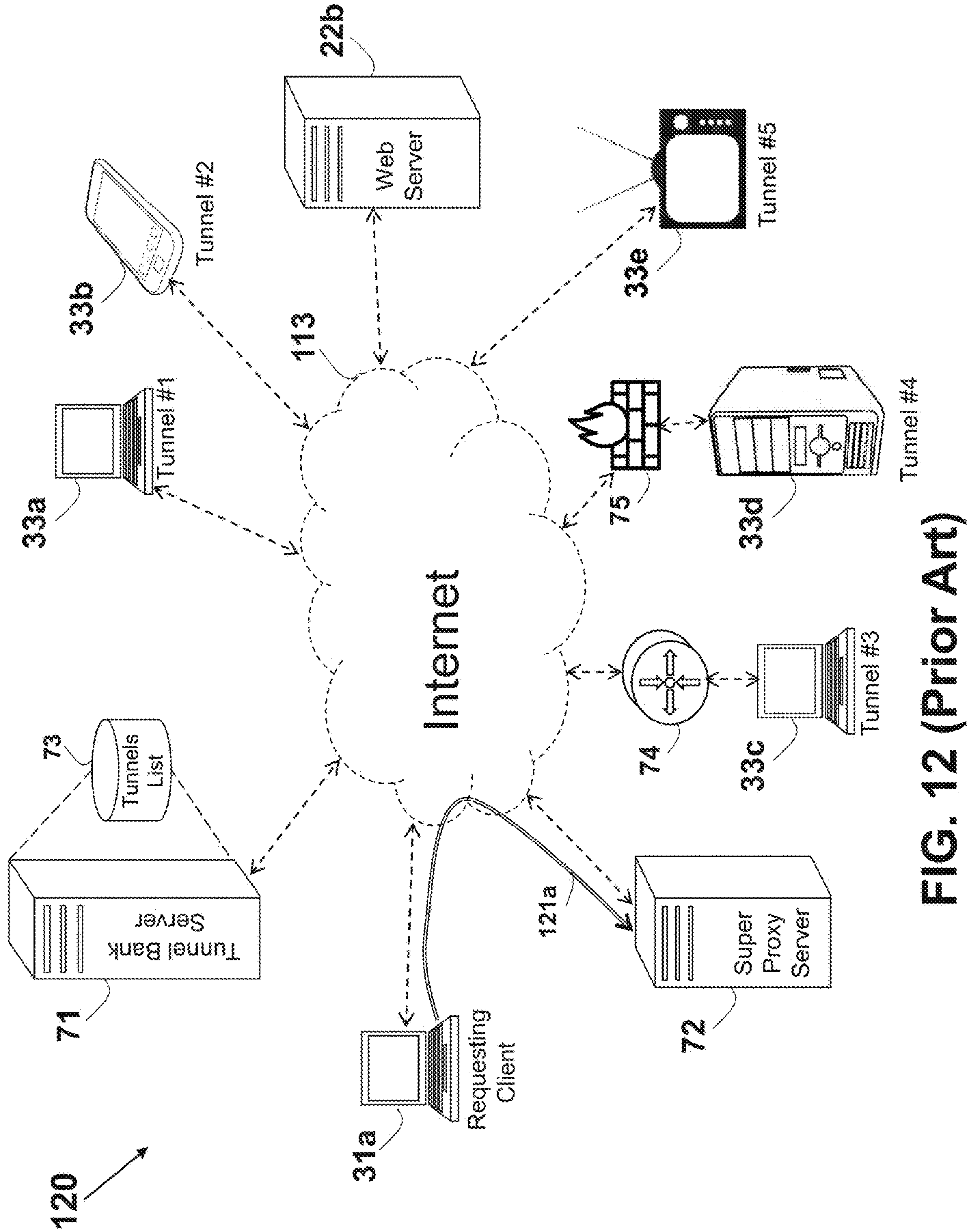
FIG. 12 (Prior Art)
FIG. 12 depicts schematically a message exchanged over the Internet between a client device and the SP server.
Figure 12A:
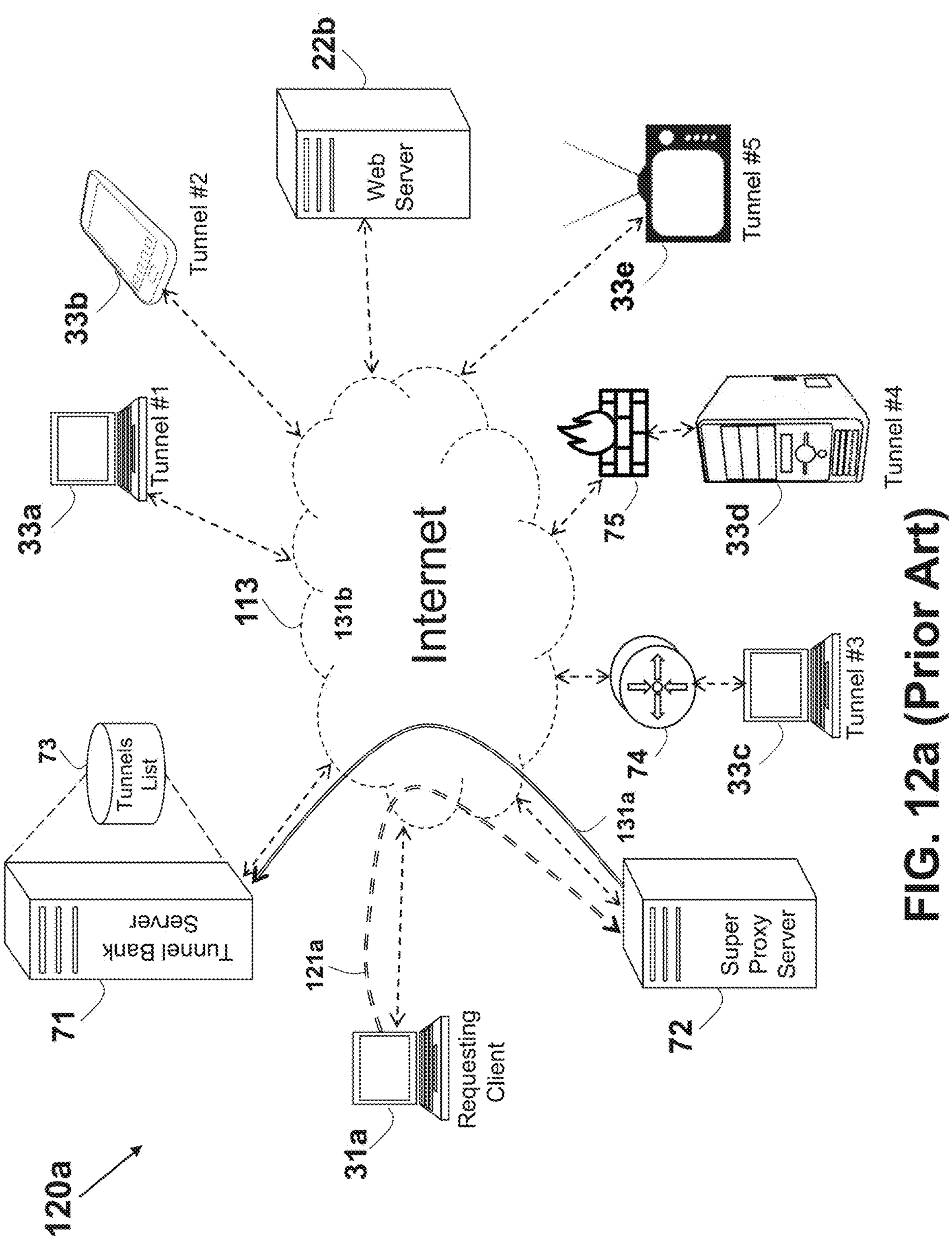
FIG. 12a (Prior Art)
FIG. 12*a* depicts schematically a message exchanged over the Internet between the SP server and the TB server.
Figure 12B:
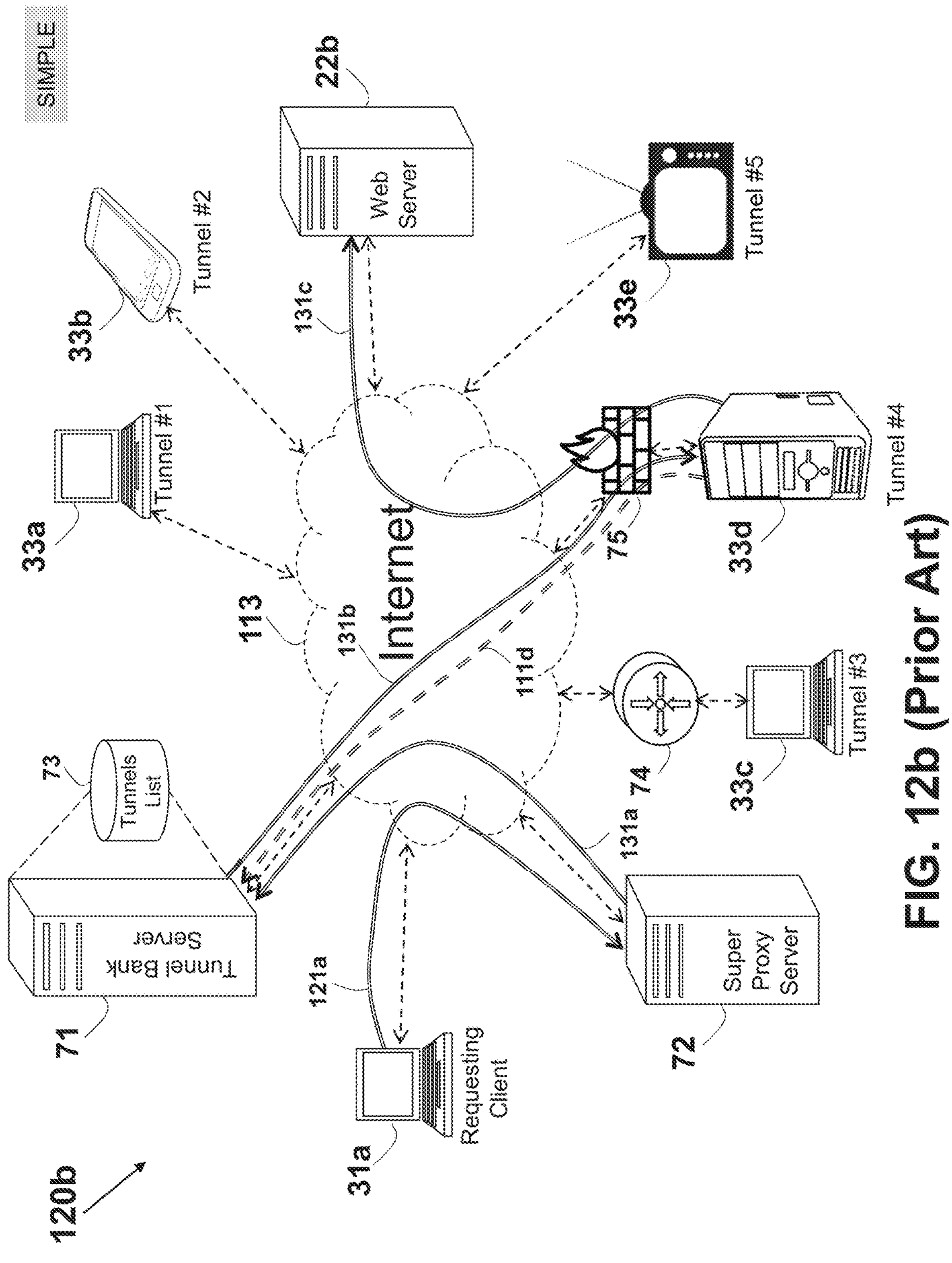
FIG. 12b (Prior Art)
FIG. 12*b* depicts schematically messages exchanged over the Internet between the TB server and the web server using a tunnel device.
Figure 39:
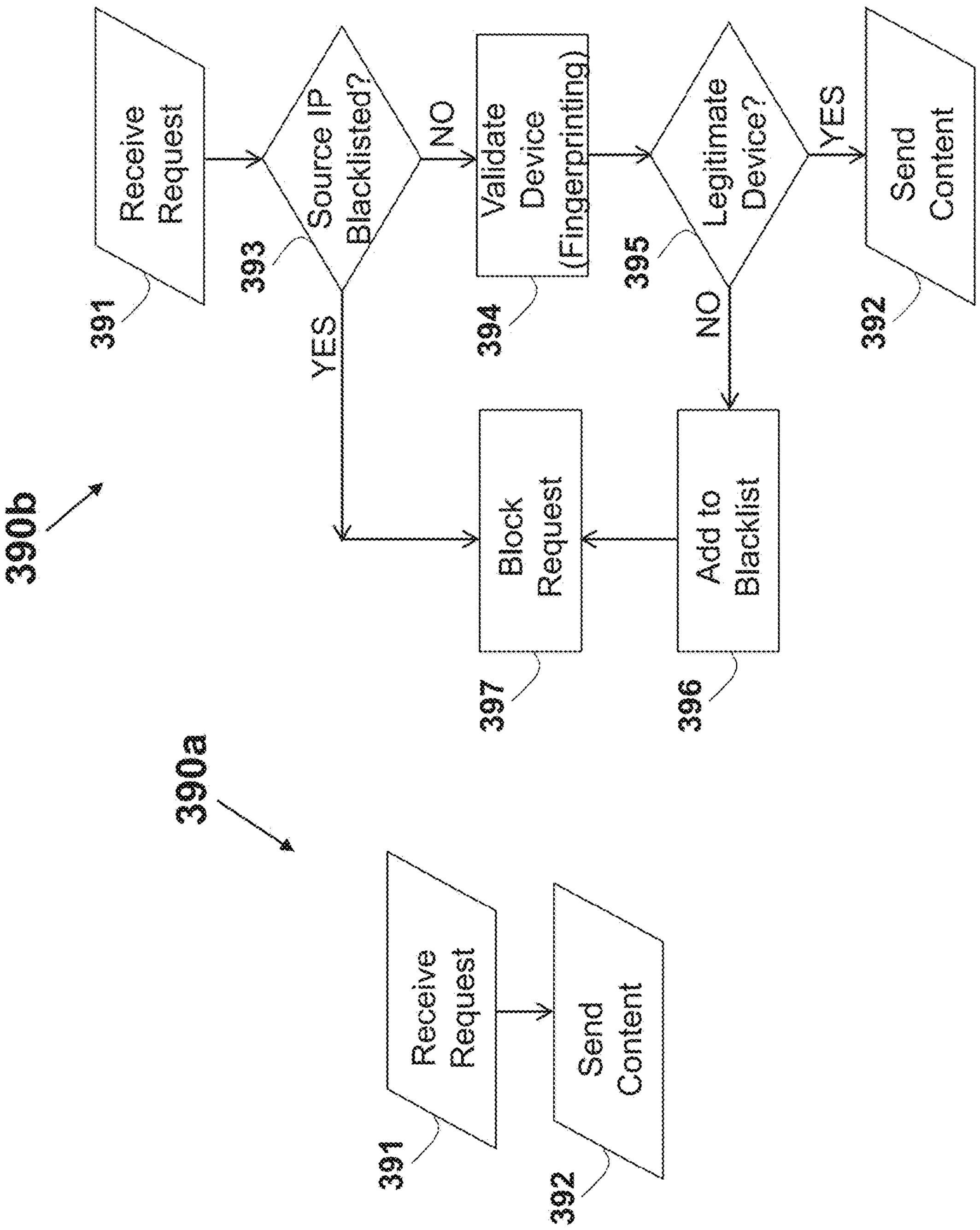
FIG. 39 illustrates schematically simplified flowcharts relating to non-limiting and limiting web servers.

A typical basic operation of a web server, such as the Data Server #1 22*a* or the Data Server #2 22*a*, is exampled in a flow-chart 390*a* shown in FIG. 39. A content request, such as HTTP or HTTPS request, that identifies the requested content (such as web-page or an object therein) by an identifier such as URL, is received as part of a "Receive Request" step 391. Such a request may be the same as, may be similar, or may be identical to the request paths 54*b* or 57*b* shown as part of the flow-chart 50*c* shown in FIG. 5*c*, or alternatively or in addition may be the same as, may be similar, or may be identical to the 'Content Request' path 61*b* shown as part of the flow-chart 60 shown in FIG. 6. Further, such a request may be the same as, may be similar, or may be identical to the 'Content Request' path 62*b* shown as part of the flow-chart 60*a* shown in FIG. 6*a*, or alternatively or in addition may be the same as, may be similar, or may be identical to the 'Content Request' path 65*b* shown as part of the flow-chart 60*b* shown in FIG. 6*b*. Furthermore, such a request may be the same as, may be similar, may be identical to the content request path 131*c* shown as part of the flow-chart 120*b* shown in FIG. 12*b*, or in any other Figure herein. Such a request may be the result of a device, such as a tunnel device or a proxy server (such as the DC proxy server 56) executing the "Send Request to Web Server" step 175 as part of the flow-chart 170 shown in FIG. 17, as part of the flow-chart 220 shown in FIG. 22, or in any other Figure herein.

In response to the receiving of the request, the web server prepares the requested content that is identified in the request, and typically sends the requested content to the IP source address of the received request, as part of the "Send Content" step 392. Such content sending may be the same as, may be similar, or may be identical to the content sending paths 54*c* or 57*c* shown as part of the flow-chart 50*c* shown in FIG. 5*c*, or alternatively or in addition may be the same as, may be similar, or may be identical to the 'Send Content' path 61*c* shown as part of the flow-chart 60 shown in FIG. 6. Further, such a content delivery may be the same as, may be similar, or may be identical to the 'Send Content' path 62*c* shown as part of the flow-chart 60*a* shown in FIG. 6*a*, or alternatively or in addition may be the same as, may be similar, or may be identical to the 'Send Content' path 65*c* shown as part of the flow-chart 60*b* shown in FIG. 6*b*. Furthermore, such a content providing may be the same as, may be similar, may be identical to the content delivery path 131*d* shown as part of the flow-chart 130 shown in FIG. 13, or in any other Figure herein. Such a content delivery may be received by the requesting device, such as any tunnel device or a proxy server (such as the DC proxy server 56)

executing the "Receive Content from Web Server" step 176 as part of the flow-chart 170 shown in FIG. 17, as part of the flow-chart 220 shown in FIG. 22, or in any other Figure herein.

Web tracking. Web tracking (such as fingerprinting) is the practice by which operators of websites and third parties collect, store, and share information about visitors' activities on the World Wide Web. Analysis of a user's behavior may be used to provide content that enables the operator to infer their preferences and may be of interest to various parties, such as advertisers. Web tracking can be part of visitor management. Advertising companies actively collect information about users and make profiles that are used to individualize advertisements. User activities include websites visited, watched videos, interactions on social networks, and online transactions. Websites like Netflix, YouTube collect information about what shows users watch, which helps them suggest more shows that they might like. Search engines like Google will keep a record of what users search for, which could help them suggest more relevant searches in the future.

Web browsing is linked to a user's personal information. Location, interests, purchases, and more can be revealed just by what page a user is visiting. This allows web tracking to draw conclusions about a user, and to analyze patterns of activity. Use of web tracking is controversial when applied in the context of a private individual.

Some web servers (referred to as 'limiting web servers' herein) may apply web tracking restrict content rendering to requests or users according to pre-defined criterions. For example, a web server may apply a mechanism for providing content only to requests that are believed, assumed, or analyzed to be originated by human users that execute web servers to submit the content requests. Any requests that are deemed not to being originated from a web-browser actually used by a human user may be blocked or serviced with lower-priority. Alternatively or in addition, web browser may apply a mechanism for blocking the rendering of content to requests that are deemed to be submitted or initiated by Internet bots. An Internet bot, (web robot, robot or simply bot) is a software application that runs automated tasks (scripts) over the Internet, usually with the intent to emulate human activity on the Internet, such as messaging, on a large scale. An Internet bot plays the client role in a client-server model whereas the server role is usually played by web servers. Internet bots are able to perform tasks, that are simple and repetitive, much faster than a person could ever do. The most extensive use of bots is for web crawling, in which an automated script fetches, analyzes, and files information from web servers.

Efforts by web servers to restrict bots vary. Some servers have a robots.txt file that contains the rules governing bot behavior on that server. Any bot that does not follow the rules could, in theory, be denied access to or removed from, the affected website. If the posted text file has no associated program/software/app, then adhering to the rules is entirely voluntary. There would be no way to enforce the rules or to ensure that a bot's creator or implementer reads or acknowledges the robots.txt file. Some bots are "good"—e.g., search engine spiders—while others are used to launch malicious attacks on, for example, political campaigns.

However, the basic principle of the Internet is that public data, such as content stored in a publicly available and publicly accessed web server, be available to every user, without any differentiation or discrimination. Under an "open Internet" system, the full resources of the Internet and means to operate on it should be easily accessible to all individuals, companies, and organizations. Applicable concepts of "open Internet" include: net neutrality, open standards, transparency, lack of Internet censorship, and low barriers to entry. The concept of the open Internet is sometimes expressed as an expectation of decentralized technological power, and is seen by some observers as closely related to open-source software, a type of software program whose maker allows users access to the code that runs the program, so that users can improve the software or fix bugs. Hence, there is a motivation to overcome any restriction imposed on a content that is expected to be publicly available by a web-server owner or operator.

An example of an operation of a limiting web server that uses web tracking (such as fingerprinting) is described in a flow-chart 390*b* shown in FIG. 39. As part of the web tracking functionality, the limiting web server typically stores a list ('Blacklist') of IP addresses that are to be restricted, for example of suspected IP addresses that are related to Internet bot entities. Upon identifying the IP source address of the received request as part of the "Receive Request" step 391, the limiting web server checks if the extracted IP source address is included in the Blacklist as part of a "Source IP Blacklisted?" step 393. In case the IP source address is indeed included in the Blacklist, shown as a 'YES' branch, the request is denied and blocked as part of a "Block Request" step 397. In case where the IP source address is found as not included in the Blacklist, shown as a 'NO' branch, the limiting web browser applies various rules and criterions to check the received request (or multiple requests as a group), as part of a "Validate Device (Fingerprinting)" step 394. For example, various rules, criterions, and mechanism may be used, such as a fingerprinting mechanism, in order to verify that the request originated from a legitimate user, such as a human user that operates a web browser. As part of a "Legitimate Device?" step 395, a determination whether the request or the source IP address are legitimate according to the set criterions and rules is made. In case the IP source address or the request are deemed as not legitimate, shown as a 'NO' branch, the source IP address is added to the Blacklist as part of a "Add to Blacklist" step 396, and the request is denied and blocked as part of the "Block Request" step 397. In case the IP source address or the request are deemed to be legitimate, shown as a 'YES' branch, the limiting web server provides the content as part of the "Send Content" step 392. The "Validate Device (Fingerprinting)" step 394 may include passive fingerprinting, active fingerprinting, cookie-like fingerprinting, or any combination thereof.

The flow-chart 390*b* was exampled regarding identifying a requesting device by an IP address, such as in the Blacklist. Alternatively or in addition, the identification may use a finger print data that is generated as part of the fingerprinting in the "Validate Device" step 394. In such a case, the Black includes a set of fingerprint data of the requesting client device, and as part of the "Legitimate Device?" step 395, the limiting web server checks if the fingerprint data obtained the "Validate Device" step 394 is included in the Blacklist, and as such should be blocked as part of the "Block Request" step 397. In one example, the fingerprinting (or the fingerprint data) as part of the "Validate Device" step 394 comprises, or is based on, analyzing communication features with a requesting client device, such as communication elements or features that are part of Open Systems Interconnection (OSI) model Layer-2, OSI Layer-3, OSI Application Layer, OSI Session Layer, or any combination thereof.

Alternatively or in addition, the fingerprinting comprises, or is based on, device fingerprinting, that comprises a systematic gathering a set of information of a requesting client device for differentiating it, or uniquely identifying it, for monitoring, or blocking the requesting client activity. The device fingerprinting may comprise, or may be based on, Web-based fingerprinting that may comprise, or may be based on, browser fingerprinting that may comprise retrieving information by interacting with a web browser that is executed by the requesting client device that requests a content from the web server. The browser fingerprinting may comprise, or may be based on, single browser fingerprinting, cross-browser fingerprinting, canvas fingerprinting (that may comprise identifying and tracking requesting client devices that use HyperText Markup Language 5 (HTML5) canvas elements), or any combination thereof.

Alternatively or in addition, the elements used as part of the fingerprint data or analyzed as part of the "Validate Device" step 394 may comprises, or may be based on, header field (such as in an HTTP request) that may be a User-agent header, an Accept header, a Connection header, an Encoding header, a Language header, a list of plugins, a computing platform, a cookies preferences (allowed or not), a 'Do Not Track' preferences (yes, no or not communicated), a timezone, a screen resolution and its color depth, a use of local storage, a use of session storage, a picture rendered with the HTML Canvas element, a picture rendered with WebGL, a presence of AdBlock, a list of fonts, or any combination thereof. Alternatively or in addition, the elements used as part of the fingerprint data or analyzed as part of the "Validate Device" step 394 may comprises, or may be based on, using or executing a web browser by a requesting client, or may comprises, or may be based on, using a JavaScript script executed by the web browser or by using the Application Programming Interface (API), that may comprise List of Plugins, Cookies Enabled, Use of Local or Session Storage, Time-zone, Screen Resolution and Color Depth, List of Fonts, Platform, 'Do-Not-Track' status, Canvas, WebGL Vendor, WebGL Renderer, Use of Ad Blocker, or any combination thereof.

Figure 5B:
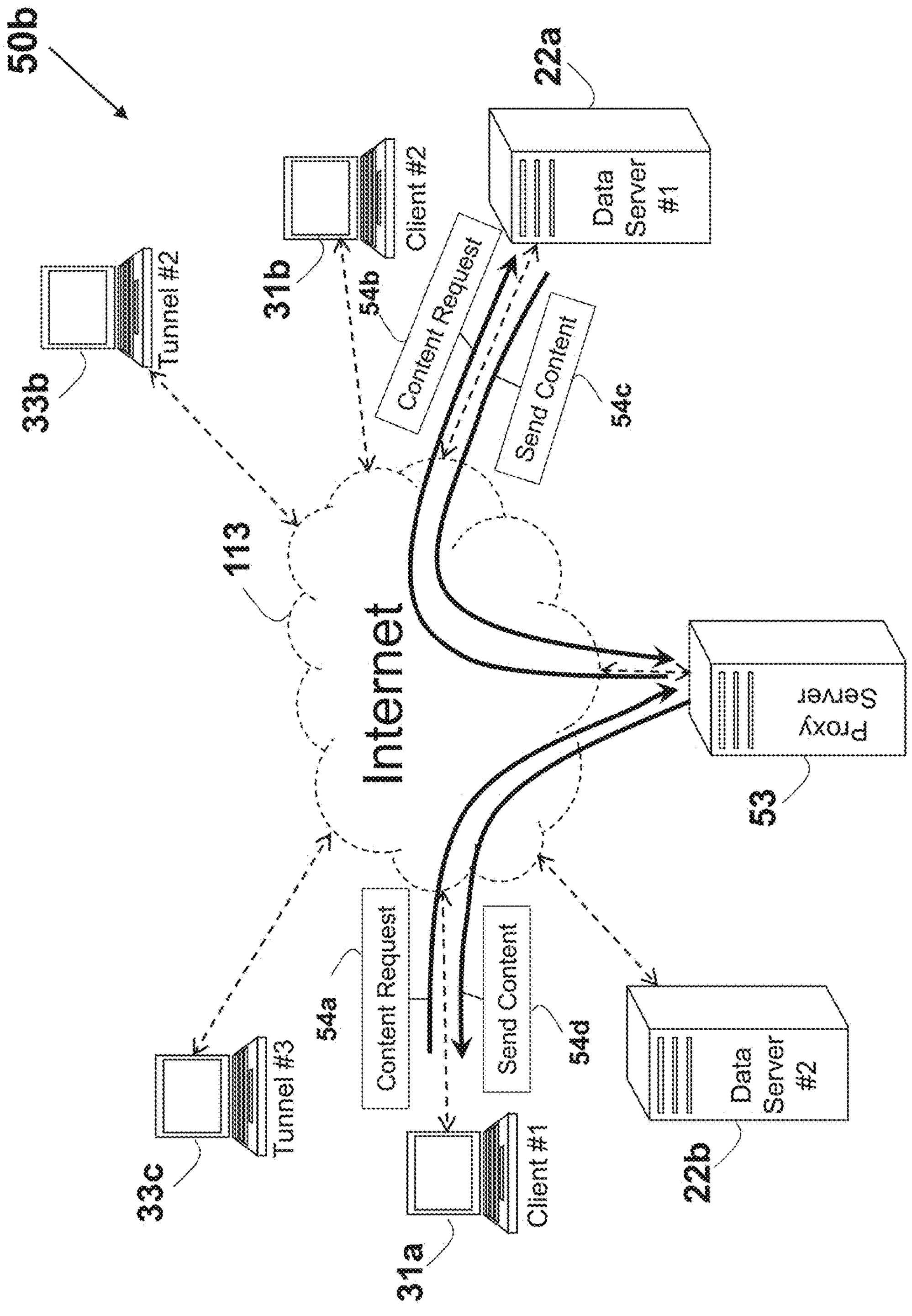
FIG. 5b (Prior Art)
FIG. 5*b* depicts schematically a non-direct fetching scheme over the Internet using a proxy server.
Figure 40:
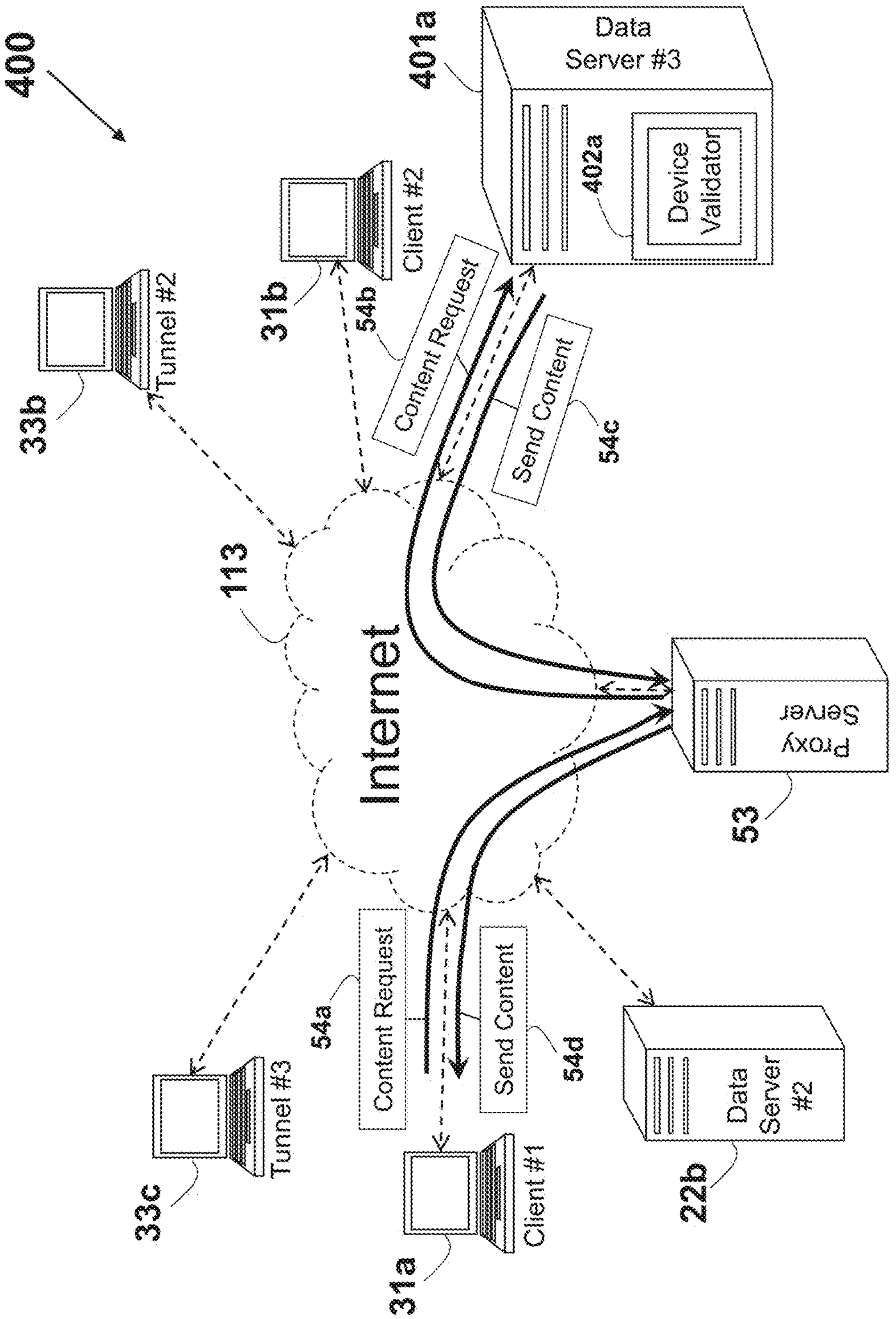
FIG. 40 depicts schematically messages exchanged over the Internet in a non-direct fetching scheme using a proxy server and a limiting web server.

Using a limiting web server is exampled in an arrangement 400 is shown in FIG. 40, which is based on the arrangement 50*b* shown in FIG. 5*b*. The Data Server #1 22*a* is replaced with a limiting web server, shown as a Data Server #3 401*a*, which includes a "Device Validator" functionality 402*a*, which is typically a software application that runs as part of the limiting web server 401*a* operation, and implements the web tracking function, such as fingerprinting, and functions to identify non-legitimate users or requests determined not to be served, for example by the limiting web server 401*a* owner or user, or determined by the stored requested content owner. For example, the "User Validation" functionality 402*a* may perform part of, or whole of, the flow-chart 390*b* shown in FIG. 39. With the exception of the additional "Device Validator" functionality 402*a*, the limiting web browser 401*a* may be identical to, similar to, or different from, the Data Server #1 22*a*.

Figure 40A:
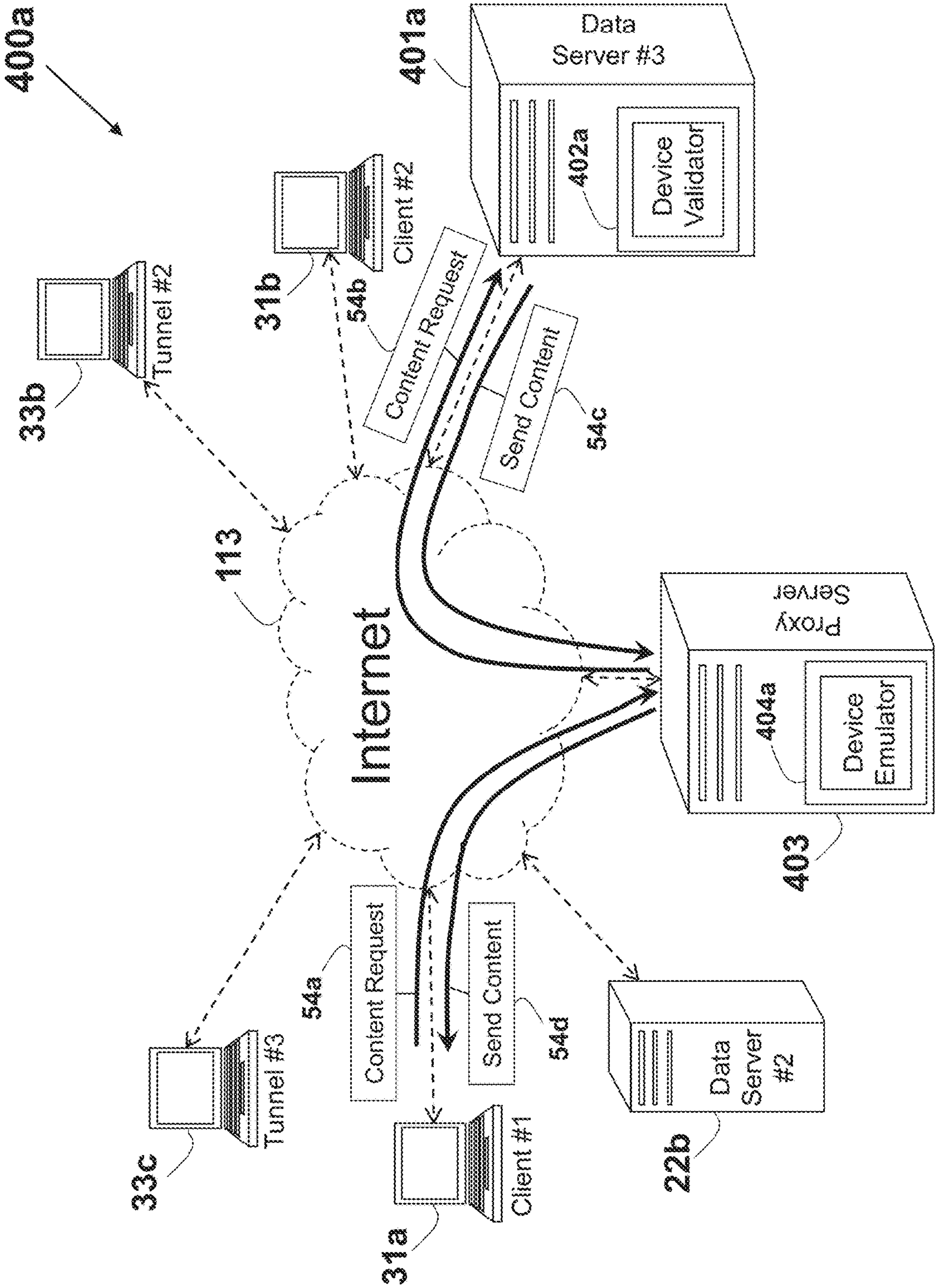
FIG. 40*a* depicts schematically messages exchanged over the Internet in a non-direct fetching scheme using a proxy server with Device Emulator functionality and a limiting web server.

Similarly, using a limiting web server is exampled in an arrangement 400*a* that is shown in FIG. 40*a*, which is based on the arrangement 50*b* shown in FIG. 5*b*. The Data Server #1 22*a* is replaced with a limiting web server, shown as the Data Server #3 401*a*, which includes the "Device Validator" functionality 402*a*, which is typically a software application that runs as part of the limiting web server 401*a* operation, and functions to identify non-legitimate users or requests determined not to be served, for example by the limiting web server 401*a* owner or user, or determined by the stored requested content owner. For example, the "Device Validator" functionality 402*a* may perform part of, or whole of, the flow-chart 390*b* shown in FIG. 39.

In one example, the client device #1 31*a* may not be considered, mistakenly or not, as a legitimate user or requested. Alternatively or in addition, the IP address Proxy Server 53 may not be considered, mistakenly or not, as associated with a legitimate requester. For example, the fingerprint collected by the device validator 402 from the request sent by the Proxy Server 53 may meet the criterion for exclusion. In such as case, the content request over the path "Content Request" 54*b* is considered in the "Legitimate Device?" step 395 as non-legitimate ('No' branch), and thus be blocked as part of the "Block Request" step 397. In order to overcome such blocking, the proxy server 53 may be updated or replaced with a Proxy Server 403 as part of an arrangement 400*a* shown in FIG. 40*a*. The Proxy Server 403 includes a "Device Emulator" functionality 404*a*, which is typically a software application that is executed as part of the software of the Proxy Server 403, with the purpose to overcome the web tracking functionality (such as fingerprinting) that is implemented at the "Device Validator" functionality 402*a* in the limiting Data Server #3 401*a*.

The "Device Emulator" functionality 404*a* role is to modify or replace the content request that is about to be sent to the limiting web server 401*a*, so that the content request is considered as legitimate by the "Device Validator" functionality 402*a*, and thus the requested content is properly fetched by the Proxy Server 403. For example, the "Device Emulator" functionality 404*a* may modify the HTTP request format, header, or content. Similarly, the OSI Layer 3 may be modified, such as the header, format, or payload of the IP packets. Further, OSI Layer 2 may be modified. Furthermore, the modification may be applied to multiple content requests, and may include changing the timing between consecutive packets or requests that are sent from the Proxy Server 403. In one example, the modifications made by the "Device Emulator" functionality 404*a* are intended or designed to mimic or emulate the operation of a human user that actually operates a web browser. The modification made by the "Device Emulator" functionality 404*a* are intended to satisfy the various rules and criterions applied as part of the "Validate Device (Fingerprinting)" step 394, so that the request is considered as legitimate (or originated from a legitimate user, such as a human user), when checked as part of the "Legitimate Device?" step 395 ('YES' branch), so that the requested content is rendered to the requester device as part of the "Send Content" step 392.

Figure 40B:
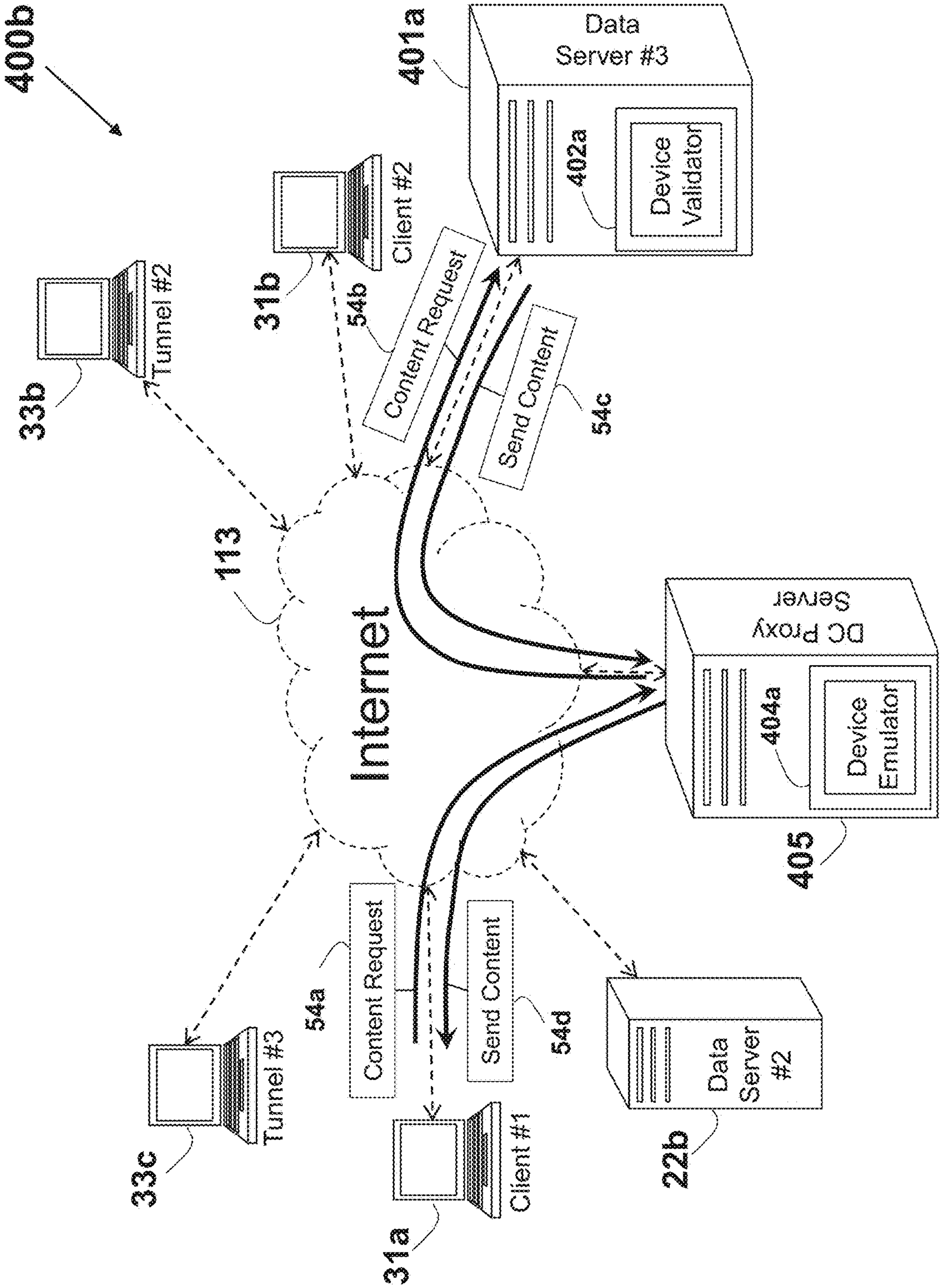
FIG. 40*b* depicts schematically messages exchanged over the Internet in a non-direct fetching scheme using a Data Center (DC) proxy server with Device Emulator functionality and a limiting web server.

While the "Device Emulator" functionality 404*a* is exampled in the arrangement 400*a* shown in FIG. 40*a* as part of the Proxy Server 403, such functionality may be equally used by or integrated in any device, that may be a server or client device, which sends requests to limiting web servers, such as to the limiting web server 401*a*. For example, using the "Device Emulator" functionality 404*a* in a DC Proxy Server 405 is exampled in an arrangement 400*b* that is shown in FIG. 40*b*, which is based on the arrangement 50*c* shown in FIG. 5*c*.

The Device Emulator functionality 404*a* is exampled as embedded in a client device. For example, the arrangement 420 shown in FIG. 42 exampled the case of embedding the Device Emulator functionality 404*a* in the requesting client device 421*a*, the arrangement 420*a* shown in FIG. 42*a* exampled the case of embedding the Device Emulator functionality 404*a* in the tunnel device 422*a*, and similarly the arrangement 430*a* shown in FIG. 43*a* exampled the case of embedding the Device Emulator functionality 404*a* in the dedicated box 431 that serves as a tunnel #4. However, alternatively or in addition, the Device Emulator functionality 404*a* may equally be embedded in any other device, such as a server device. Further, the Device Emulator functionality 404*a* may equally be embedded in any device other than client or server device, such as any communication device. For example, the Device Emulator functionality 404*a* may be added or embedded into any router, gateway, firewall, or any other communication device. Further, the Device Emulator functionality 404*a* may be embedded in any device that is located in the communication path that carry a content request from any content requesting client device to any web server (that may embed a Device Validator 402*a* functionality), or in any device that is located in the communication path that carry the requested fetched content from any web server to the content requesting client device. For example, the Device Emulator functionality 404*a* may be embedded in any device along the path from the requesting client device 31*a* and the data server #3 401*a*. An arrangement 460*a* shown in FIG. 46*a* examples the case where the Device Emulator functionality 404*a* is part of a SP server 72*a*, and an arrangement 460*b* shown in FIG. 46*b* examples the case where the Device Emulator functionality 404*a* is part of a TB server 71*a*.

Figure 41:
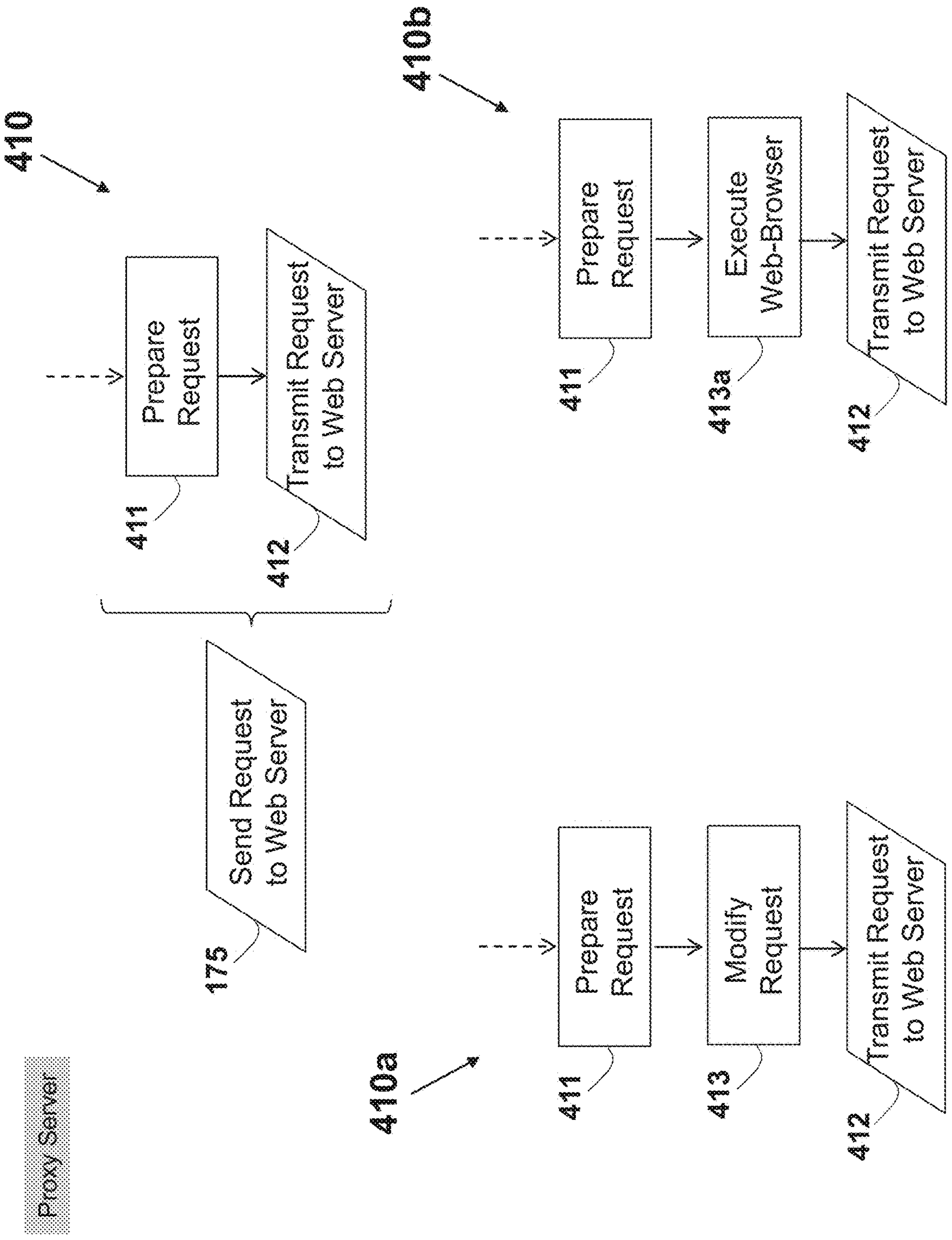
FIG. 41 illustrates schematically simplified flowcharts relating to a User Emulator functionality.

A common sending of a content request to a web server, such as in the "Send Request to Web Server" step 175, typically includes a "Prepare Request" step 411 where the request is identified or formed, and the actual transmission of the prepared or identified request to the web server, such as in a "Transmit Request to Web Server" step 412, as described in a flow-chart 410 shown in FIG. 41. As part of the Device Emulator functionality 404*a*, the identified or formed native request is modified before being transmitted to the limiting web-sever, such as in a "Modify Request" step 413, as shown in a flow-chart 410*a* shown in FIG. 41. The "Modify Request" step 413 may include overcoming may include passive fingerprinting, active fingerprinting, cookie-like fingerprinting, or any combination thereof. In one example, the "Modify Request" step 413 may include injecting a script into a network payload that is directed to the client device, where the script is overriding an application programming interface call that is configured to collect fingerprinting information. Alternatively or in addition, the "Modify Request" step 413 may include modifying the intercepted network traffic by obfuscating a fingerprinting object that the client device is attempting to upload to the browser fingerprinting service.

In one example, the Device Validator 402*a* is based on, or uses, browser fingerprinting, that may include retrieving information from the web browser that is executed by a requesting client device. As browsers become increasingly entwined with the operating system, many unique details and preferences can be exposed through the browser operation, that may be used as a unique "fingerprint" for tracking and identification purposes. In one example, such browser-related information used for the fingerprinting may be based on, or may include: A User-agent header, an Accept header, a Connection header, an Encoding header, a Language header, a list of plugins, a computing platform, a cookies preferences (e.g., allowed or not), a 'Do Not Track' preferences (e.g., yes, no or not communicated), a timezone, a screen resolution and its color depth, a use of local storage, a use of session storage, a picture rendered with the HTML Canvas element, a picture rendered with WebGL, a presence of AdBlock, a list of fonts, or any combination thereof. In order to limit such browser fingerprinting, a web-browser, in addition to the one executed as part of the operation of the requesting client #1 31*a*, may be used as part of the Device Emulator functionality 404*a*.

In one example, the Device Validator 402*a* is based on, or uses, canvas fingerprinting, which is a type of "browser fingerprinting" techniques of tracking online users that allow websites to uniquely identify and track visitors using HTML5 canvas element instead of browser cookies or other similar means. A "fingerprint" is primarily based on browser, operating system, and installed graphics hardware, so not sufficient to uniquely identify users by itself: therefore, this fingerprint could be combined with other sources of entropy to provide a unique identifier. Canvas fingerprinting works by exploiting the HTML5 canvas element: when a user visits a website their browser is instructed to "draw" a hidden line of text or 3D graphic that is then rendered into a single digital token, a potentially unique identifier to track users without any actual identifier persistence on the machine. An overall system performance may cause the variations in the rendered digital token. Generated token can be stored and shared with advertising partners to identify users when they visit affiliated website and can be used to create a profile in order to customize the advertising.

In one example, such browser-related information used for the canvas fingerprinting may be based on, or may include: UserAgent; Language; Color Depth; Screen Resolution; Timezone; having session storage or not; having local storage or not; having indexed DB, having IE specific 'AddBehavior', having open DB; CPU class; Platform; DoNotTrack or not; full list of installed fonts (maintaining their order, which increases the entropy), implemented with Flash; a list of installed fonts, detected with JS/CSS (side-channel technique); WebGL fingerprinting; Plugins (IE included); AdBlock installed or not; having the user tampered with its languages; having the user tampered with its screen resolution; having the user tampered with its OS; having the user tampered with its browser; touch screen detection and capabilities; Pixel Ratio; System's total number of logical processors available to the user agent; or any combination thereof.

In one example, the modifying of the request as part of the "Modify Request" step 413, includes, or is based on, executing a web browser application, such as in an "Execute Web-Browser" step 413*a* that re-form the content request, rather than transparently relaying it to the limiting web server, as exampled in a flow-chart 410*b* shown in FIG. 41. The web-browser application may be a native web-browser that may be part of an operating system in the device that employs the User Emulator 404*a* functionality, or may be a dedicated web-server primary or solely used in the "Execute Web-Browser" step 413*a* and is included as part of the "Device Emulator" functionality 404*a*. In any case, the web browser used in the "Execute Web-Browser" step 413*a* may be initiated and launched upon powering the device as part of an initialization scheme, and used when required as part of the flow-chart 410*b* shown in FIG. 41. Alternatively or in addition, the web-browser may be initiated and made available only when required by the "Execute Web-Browser" step 413*a*.

While the arrangement 400*a* in FIG. 40*a* exampled the employing of the User Emulator 404*a* in the Proxy Server 403 and the arrangement 400*b* in FIG. 40*b* exampled the employing of the User Emulator 404*a* in the DC Proxy Server 405, the Device Emulator functionality 404*a* may be equally employed or integrated in any server. Further, the Device Emulator functionality 404*a* may be equally employed or integrated in any device herein. In one example, the Device Emulator functionality 404*a* may be equally employed or integrated in a client device. Furthermore, while the arrangement 400*a* in FIG. 40*a* exampled the employing of the User Emulator 404*a* in the Proxy Server 403 that is located as an intermediary device between the requesting client device #1 31*a* and the Data Server #1 401*a*, and similarly the arrangement 400*b* in FIG. 40*b* exampled the employing of the User Emulator 404*a* in the DC Proxy Server 405 that is similarly located as an intermediary device in the path between the requesting client device #1 31*a* and the Data Server #1 401*a*, the Device Emulator functionality 404*a* may be equally employed or integrated in any device that serves as an intermediary device, or in any requesting client.

Figure 42:
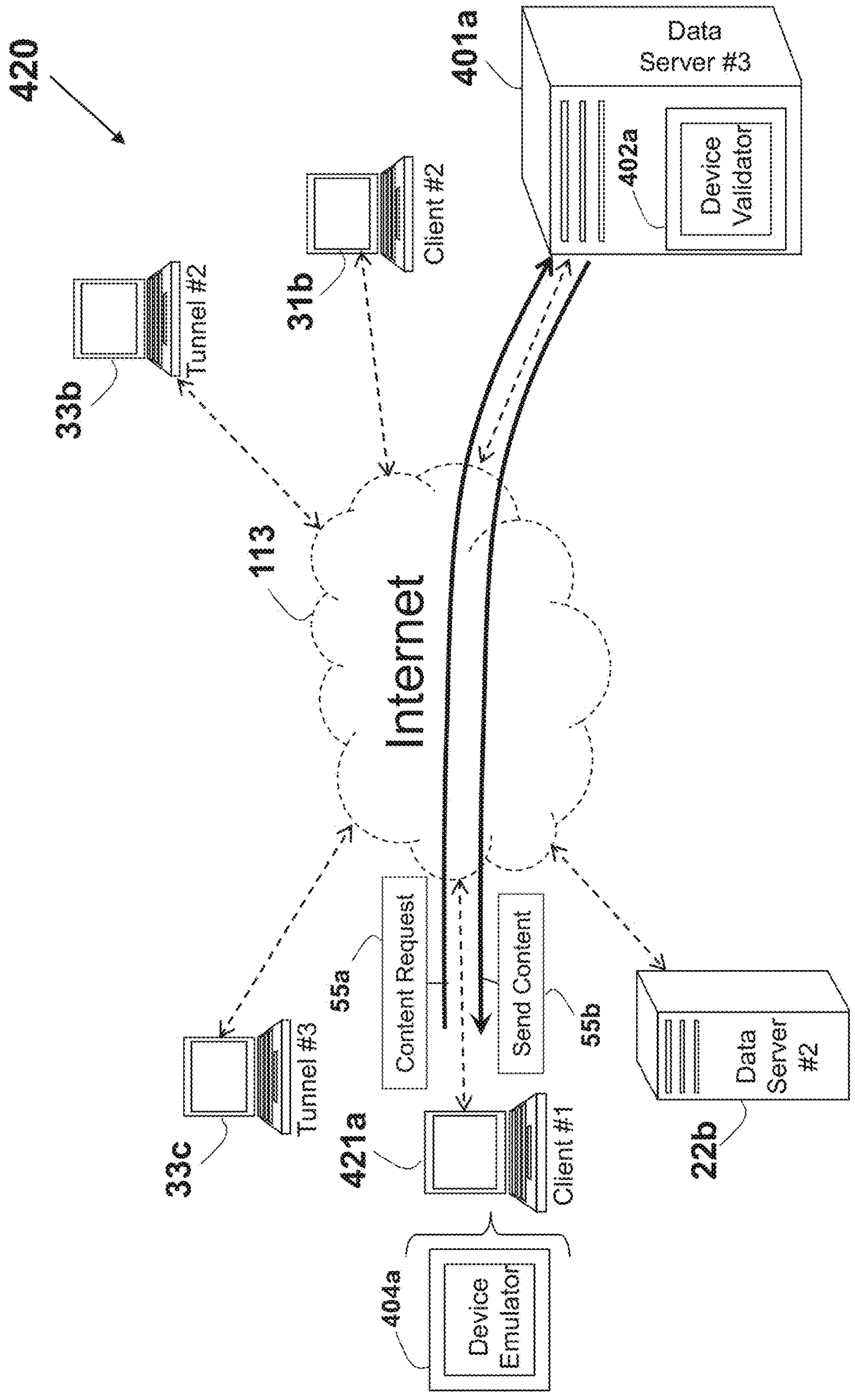
FIG. 42 depicts schematically messages exchanged over the Internet in a direct fetching scheme with a Device Emulator functionality in the requesting client device and a limiting web server.
Figure 42A:
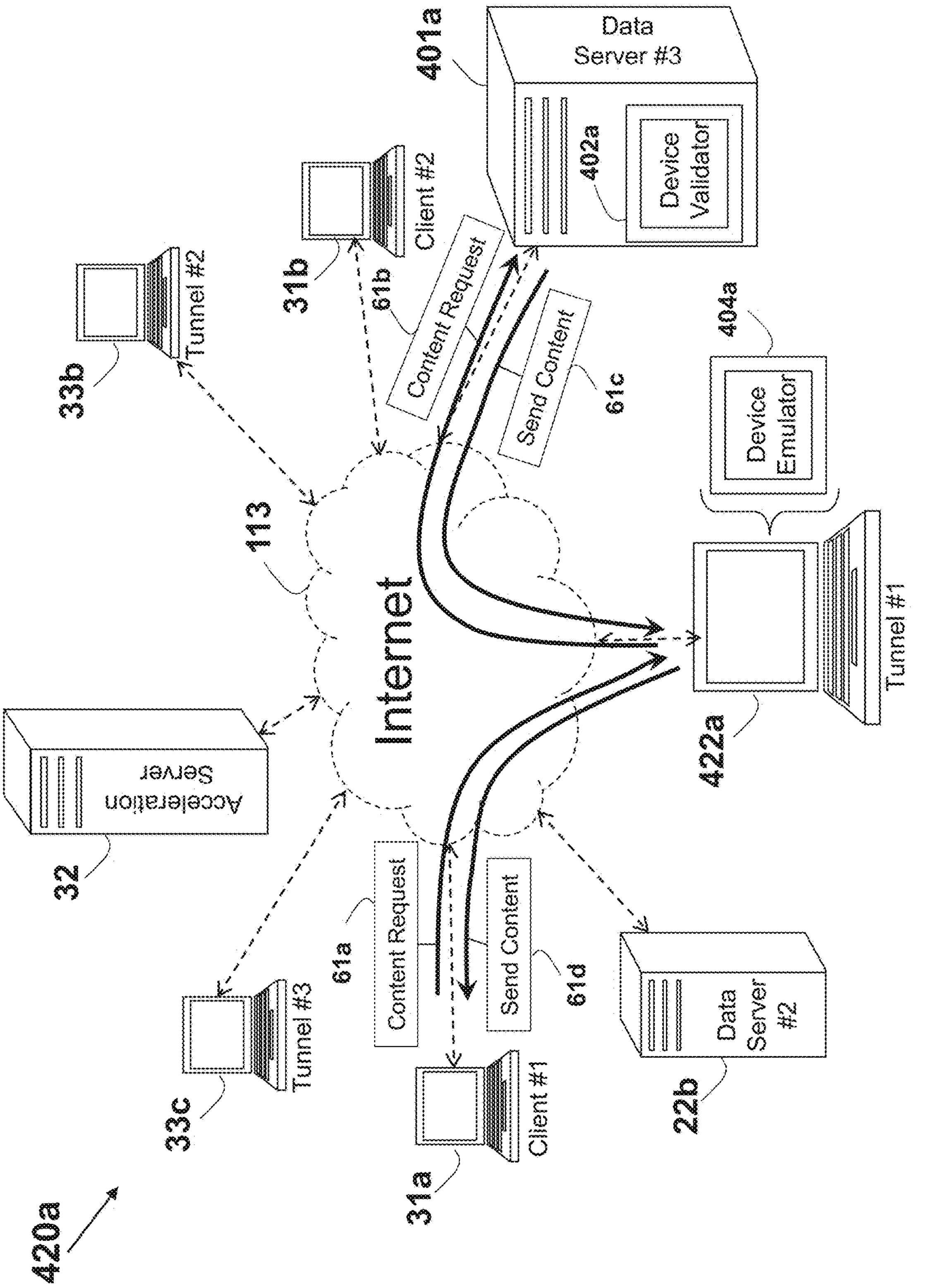
FIG. 42*a* depicts schematically messages exchanged over the Internet in a non-direct fetching scheme with a Device Emulator functionality in a tunnel device and a limiting web server.

An arrangement 420 shown in FIG. 42 is based on the direct fetching scheme of the arrangement 50*a* shown in FIG. 5*a*. The Data Server #1 22*a* is replaced with the limiting Data Server #3 401*a* that includes the Device Validator 402*a*, and respectively in order to accommodate or overcome this Device Validator 402*a* functionality, the client device #1 421 is used that includes the Device Emulator functionality 404*a*. The Device Emulator functionality 404*a* may be part of, integrated with, or added to, the native web browser that is used to form or send the request as part of the "Content Request" 55*a* and to responsively receive and use the content as part of the "Send Content" 55*b* shown in the arrangement 50*a* in FIG. 5*a*. Alternatively or in addition, as exampled in the flow chart 410*b*, another web browser may be used, which is different from the native web browser, and is dedicated (or primarily used) for the Device Emulator functionality 404*a*.

An example of modifying a requesting client device to include the Device Emulator functionality 404*a* is shown in the arrangement 420 in FIG. 42. Similarly, an example of modifying a tunnel device to include the Device Emulator functionality 404*a* is shown in the arrangement 420*a* in FIG. 42*a*, which is based on the arrangement 60 shown in FIG. 6. Such arrangement may be a peer-to-peer scheme, or may be a schematic example for any non-direct fetching scheme herein. The tunnel device #1 33*a* is modified to form a tunnel device #1 421*a*, shown in FIG. 45, that includes the Device Emulator functionality 404*a* for overcoming the Device validator functionality 402*a* in the limiting Data Server #1 401*a*. The Device Emulator functionality 404*a* in the tunnel device #1 422*b* may be based on, or may use, a web browser application software 404*b*, as exampled in an arrangement 420*b* in FIG. 42*b*. The web browser 404*b* may be the native web browser in the tunnel device #1 33*a*, or may be an additional web browser that is primary or exclusively for user emulating purposes of the Device Emulator functionality 404*a*.

Figure 13:
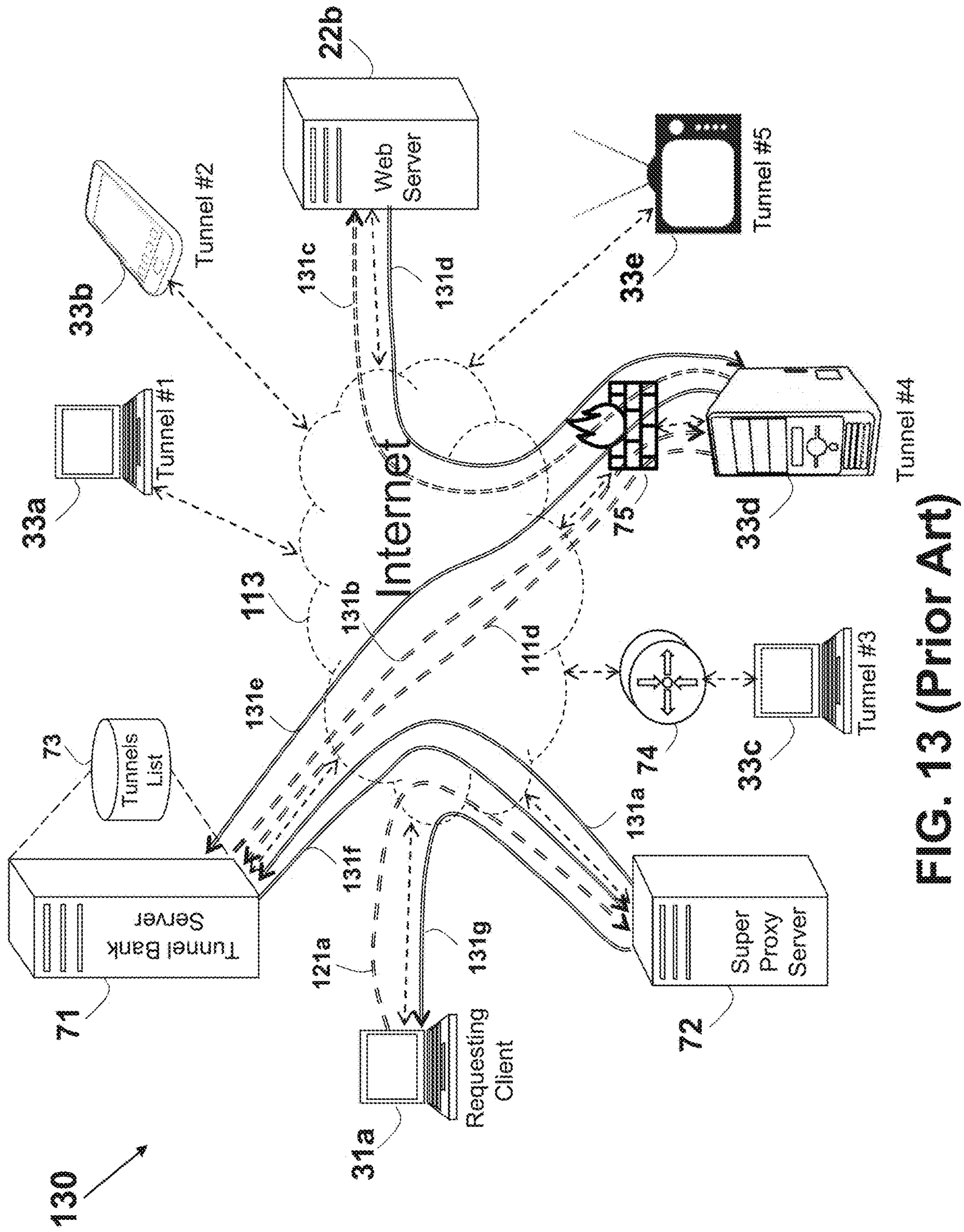
FIG. 13 (Prior Art)
FIG. 13 depicts schematically messages exchanged over the Internet for fetching content from the web server to the client device via the tunnel device, the TB server, and the SP server.
Figure 43:
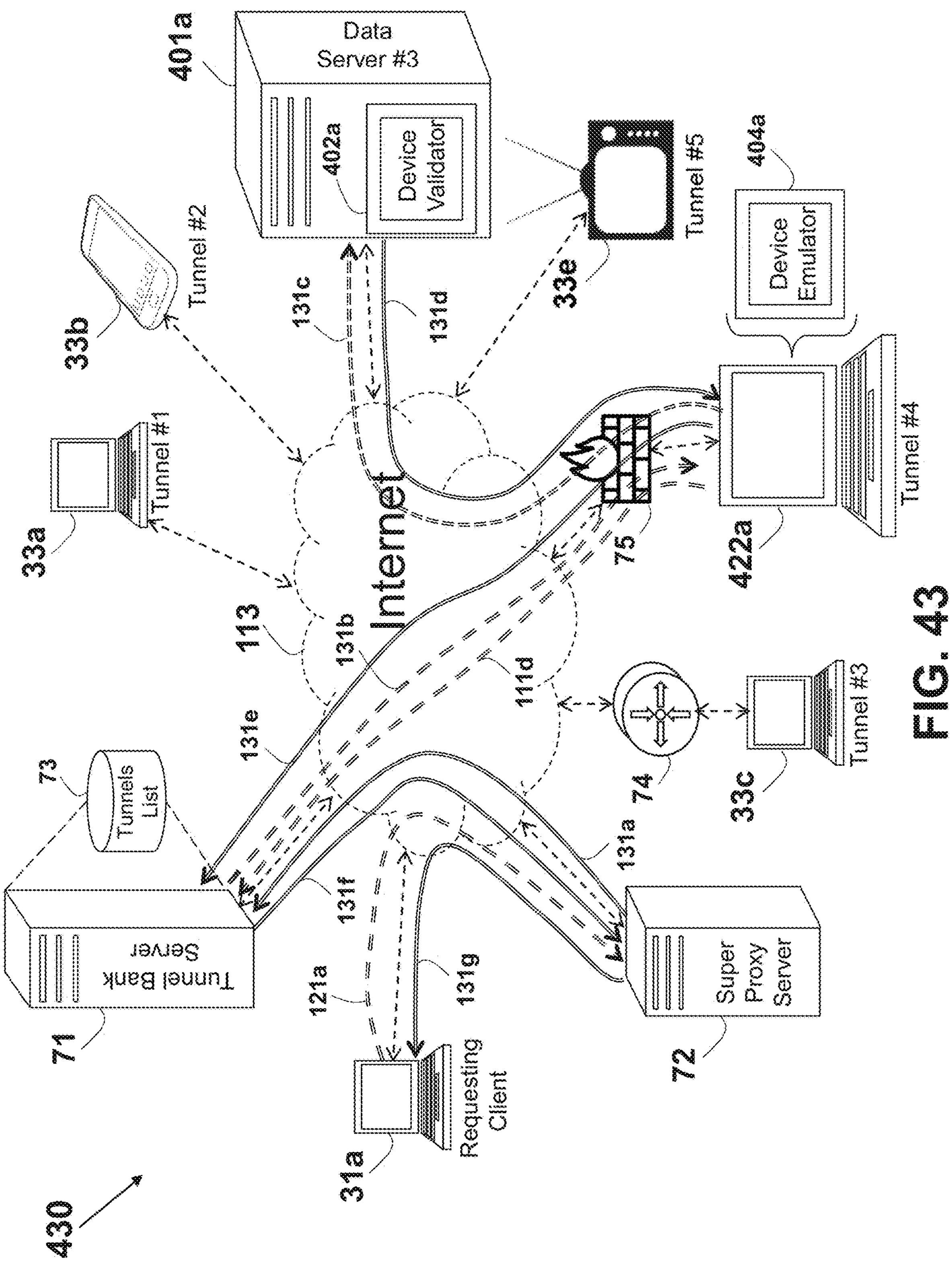
FIG. 43 depicts schematically messages exchanged over the Internet for fetching content from a limiting web server to the client device via the tunnel device that includes a User Emulator functionality.
Figure 43A:
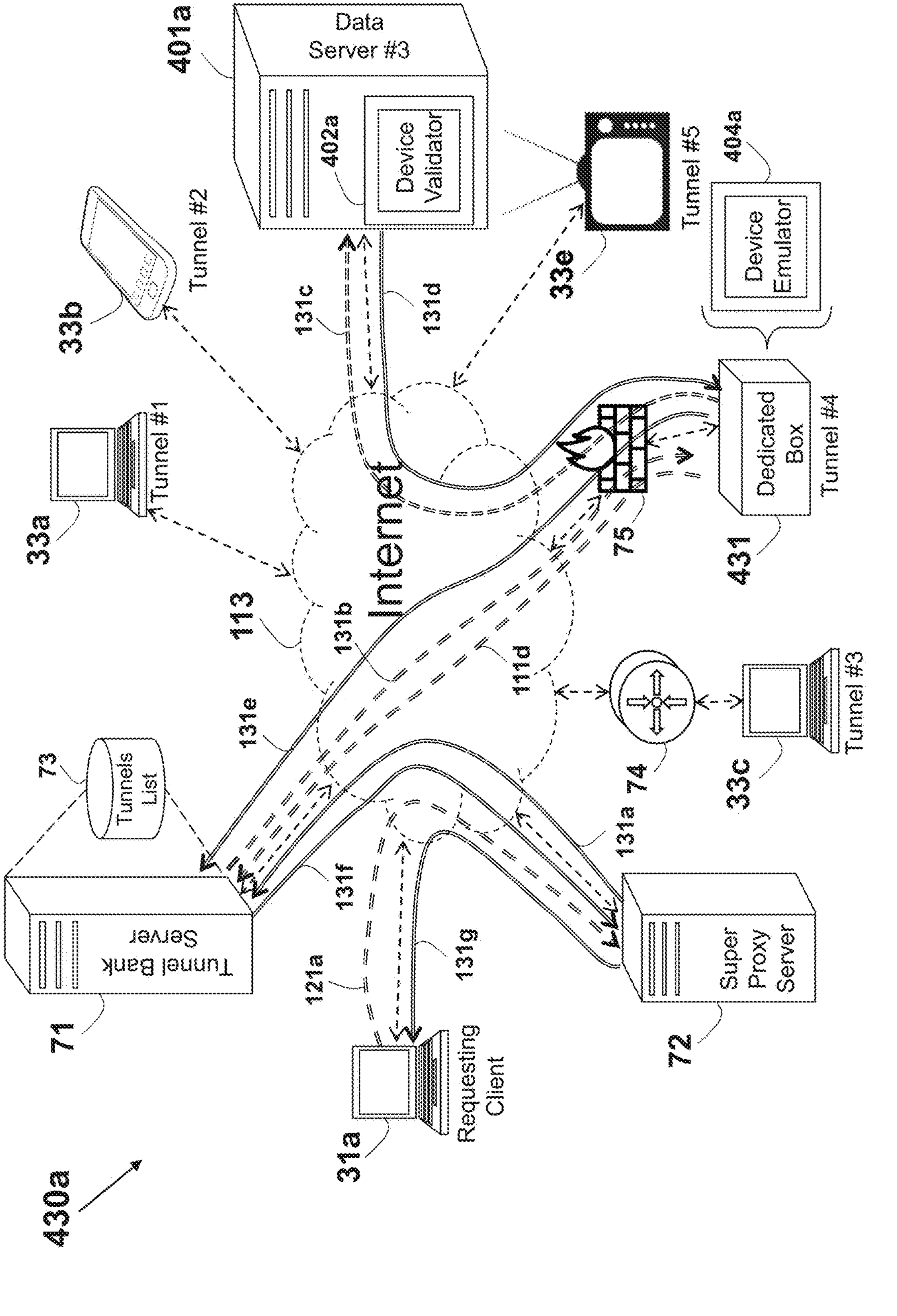
FIG. 43*a* depicts schematically messages exchanged over the Internet for fetching content from a limiting web server to the client device via the dedicated box that includes a User Emulator functionality.

Similarly, an example of modifying a tunnel device #4 33*d* to include the Device Emulator functionality 404*a* to become a tunnel device #4 422*a* is shown in the arrangement 430 in FIG. 43, which is based on the arrangement 130 shown in FIG. 13. Further, a dedicated box 431 (modified from the dedicated box 341 in the arrangement 340 shown in FIG. 34) may similarly include the Device Emulator functionality 404*a* and serves as tunnel device #4, as shown in an arrangement 430*a* shown in FIG. 43*a*.

Figure 44:
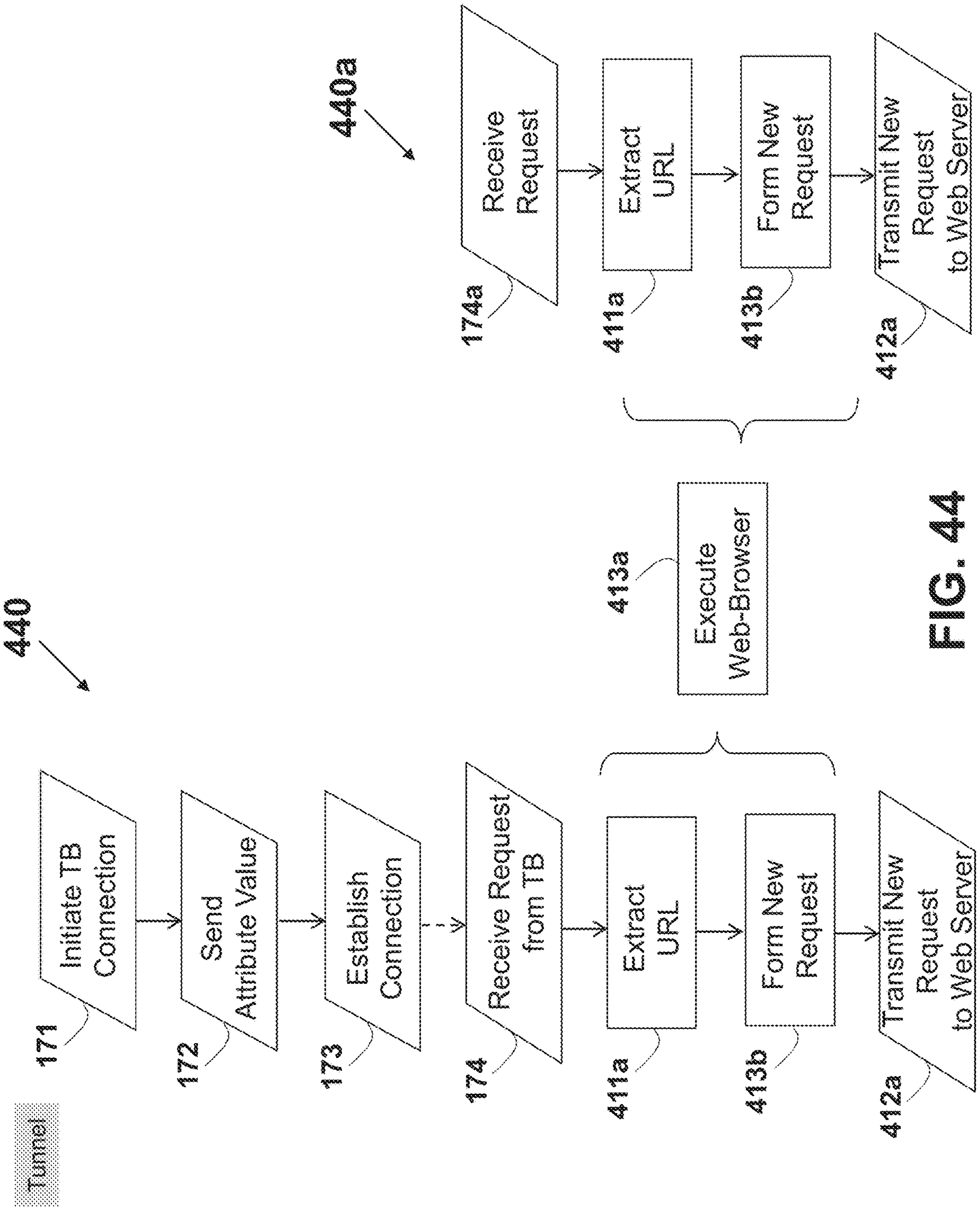
FIG. 44 illustrates schematically simplified flowcharts relating to implementing a User Emulator functionality.

A flow-chart 440 of a tunnel device, or any other intermediary device located along the request or response paths between a requesting client (such as requesting client 31*a*) and a limiting web server (such as Data server #3 401*a*), is shown in FIG. 44, which is based on the flow-chart 170 shown in FIG. 17. In this example, the Device Emulator functionality 404*a* is implemented by adding steps for modification the requests before being sent to a limiting web-server, similar to the flow-chart 410*a* shown in FIG. 41. Any received request for content (such as HTTP request), is analyzed and the URL in the received request is extracted and identified, as part of a "Extract URL" step 411*a*, that may correspond or include the "Prepare Request" step 411. As part of a "Form New Request" step 413*b*, that may correspond or include the "Modify Request" step 413, a new request for the extracted URL is prepared. The new request may be based on, or include, the received request modified as required to overcome the Device Validator functionality 402*a*, or a new request may be formed, that is similar, distinct, or different from the received request (except for relating to the same URL). The newly formed or modified new request is then sent to the limited web server as part of a "Transmit New Request to Web Server" step 412*a*, that may correspond to the "Transmit New Request to Web Server" step 412. In one example, the URL extracting or identifying as part of "Extract URL" step 411*a*, the forming of a new request or modifying the received one as part of the "Form New Request" step 413*b*, or any combination thereof, may be based on, or may use, a web server that is executed in the intermediate device, as exampled by a "Execute Web Browser" step 413*a*, which may correspond or include the "Execute Web Browser" step 413. A flow-chart 440*a* is more general where a request may be received generally from any device, being a server, a requesting client, or another tunnel, as part of a "Receive Request" step 174*a*.

In one example, a tunnel device is used as an intermediate device between a requesting client and a web-server to provide anonymity, where the web-server may only identify the IP address of the tunnel device from the IP source address field of the received packets that may be part of a HTTP request, rendering the IP address of the requesting client not known to the web-server. The arrangement 420*a* shown in FIG. 42*a*, as well as the arrangement 430 shown in FIG. 43, examples the case where both the IP anonymity and the user emulation (by the Device Emulator functionality 404*a*), are provided by the same device, namely the tunnel device #1 422*a* in the general arrangement 420*a*, or the tunnel device #4 422*a* in the arrangement 430. Alternatively or in addition, the two functionalities, IP address anonymity and user emulating, may be provided by different devices, as shown in an arrangement 450 shown in FIG. 45. The IP address anonymity is provided by the Tunnel Device #2 33*b* that connects directly to the limiting web server 401*a*, while the Device Emulator functionality 404*a* is provided by the Tunnel Device #1 421*a*.

A request for content is received by the tunnel device #4 421*a* from the requesting client device #1 31*a* over the "Content Request" path 61*a* as part of the "Receive Request" step 174*a*. The Device Emulator functionality 404*a* in the tunnel device #1 421*a* forms a new request, based on the received URL, such as by executing part of, or whole of, the flow-chart 440*a*, and transmits the newly formed request to the Tunnel Device #2 33*b*, over a communication path 451*a*. The Tunnel Device #2 33*b* executes a tunnel device functionality of transparently passing the request, serving as the source device and thus using its own IP address as the source address, to the limiting web server 401*a* over a communication path 451*b*. The request that is received by the Data Server #3 401*a* include the source IP address of the tunnel device #2 33*b*, but the format and structure prepared by the Device Emulator functionality 404*a* in the Tunnel device #1 421*a*, with the URL that is defined and requested by the requesting client 31*a*. The requested content, such as a web-page, an HTML object, or any part or combination thereof, is returned from the limiting web server 401*a* to the Tunnel Device #2 33*b* over the communication path 451*c*, which relays the received content to the tunnel device #1 421*a* over a communication path 451*d*, which in turn relays the content to the requesting client #1 31*a*.

Figure 46:
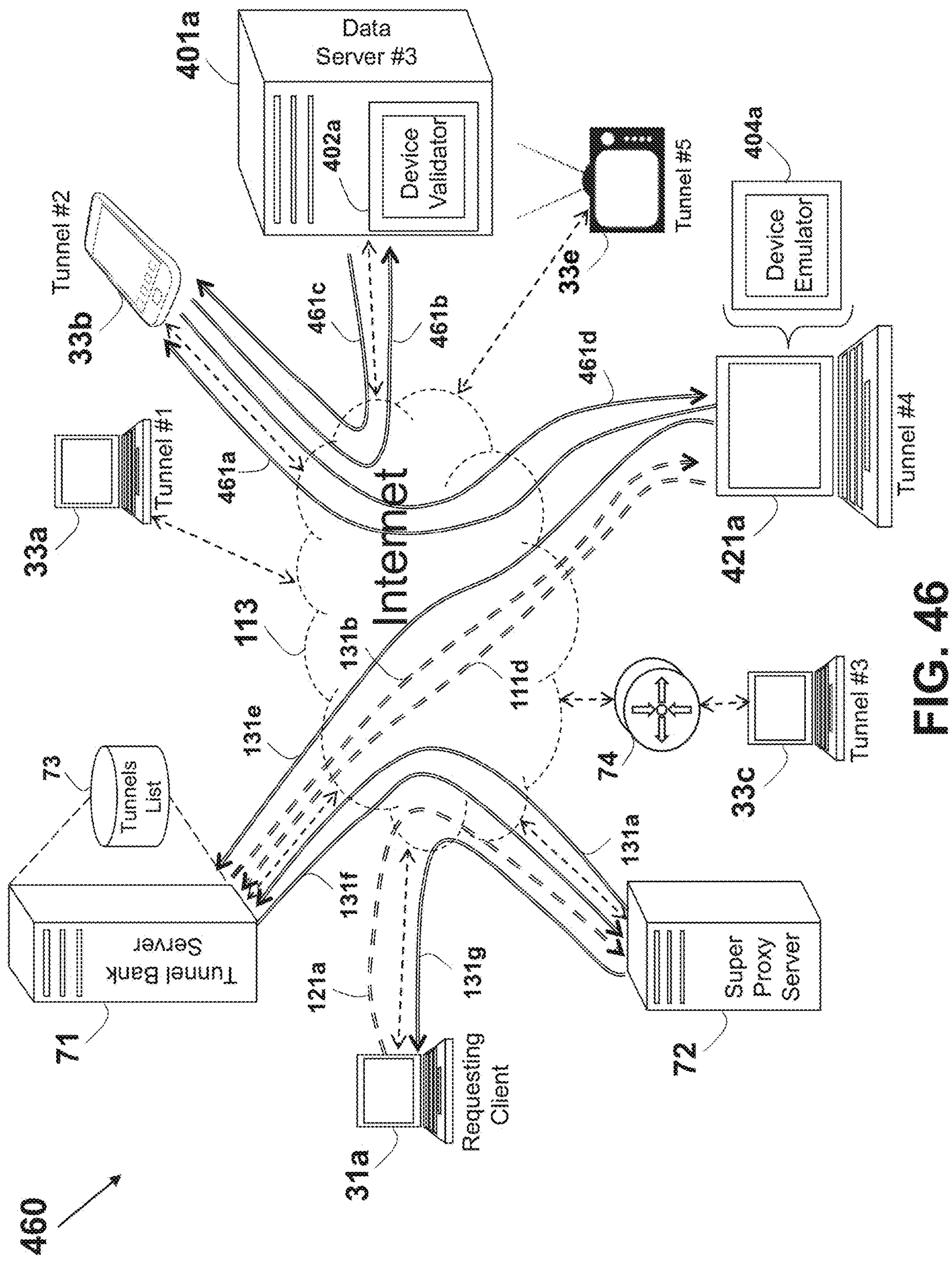
FIG. 46 depicts schematically messages exchanged over the Internet for fetching content from a limiting web server to the client device via the tunnel device that includes a Device Emulator functionality and an additional tunnel device.
Figure 46A:
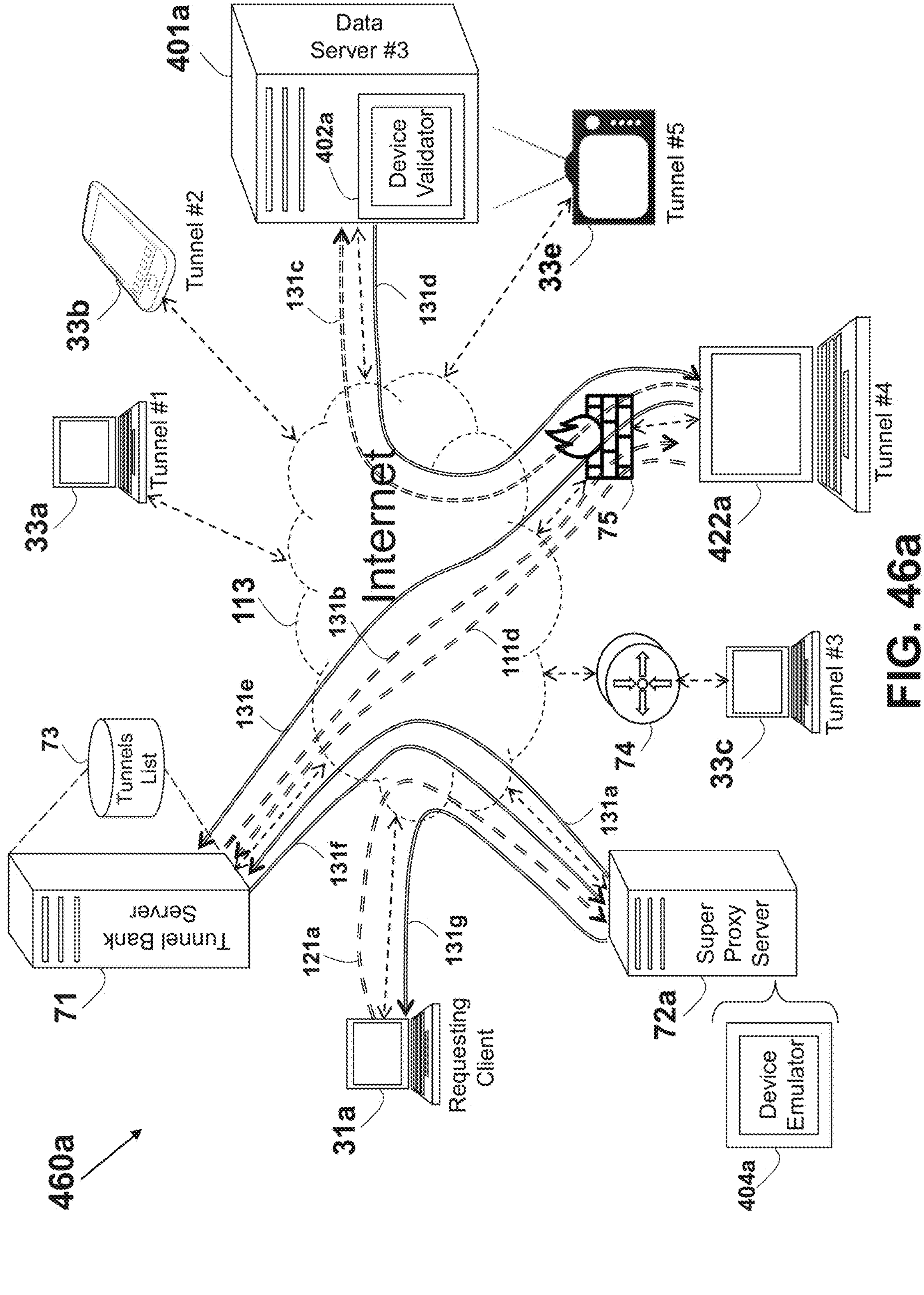
FIG. 46*a* depicts schematically messages exchanged over the Internet for fetching content from a limiting web server to the client device via a SP server that includes a Device Emulator functionality.
Figure 46B:
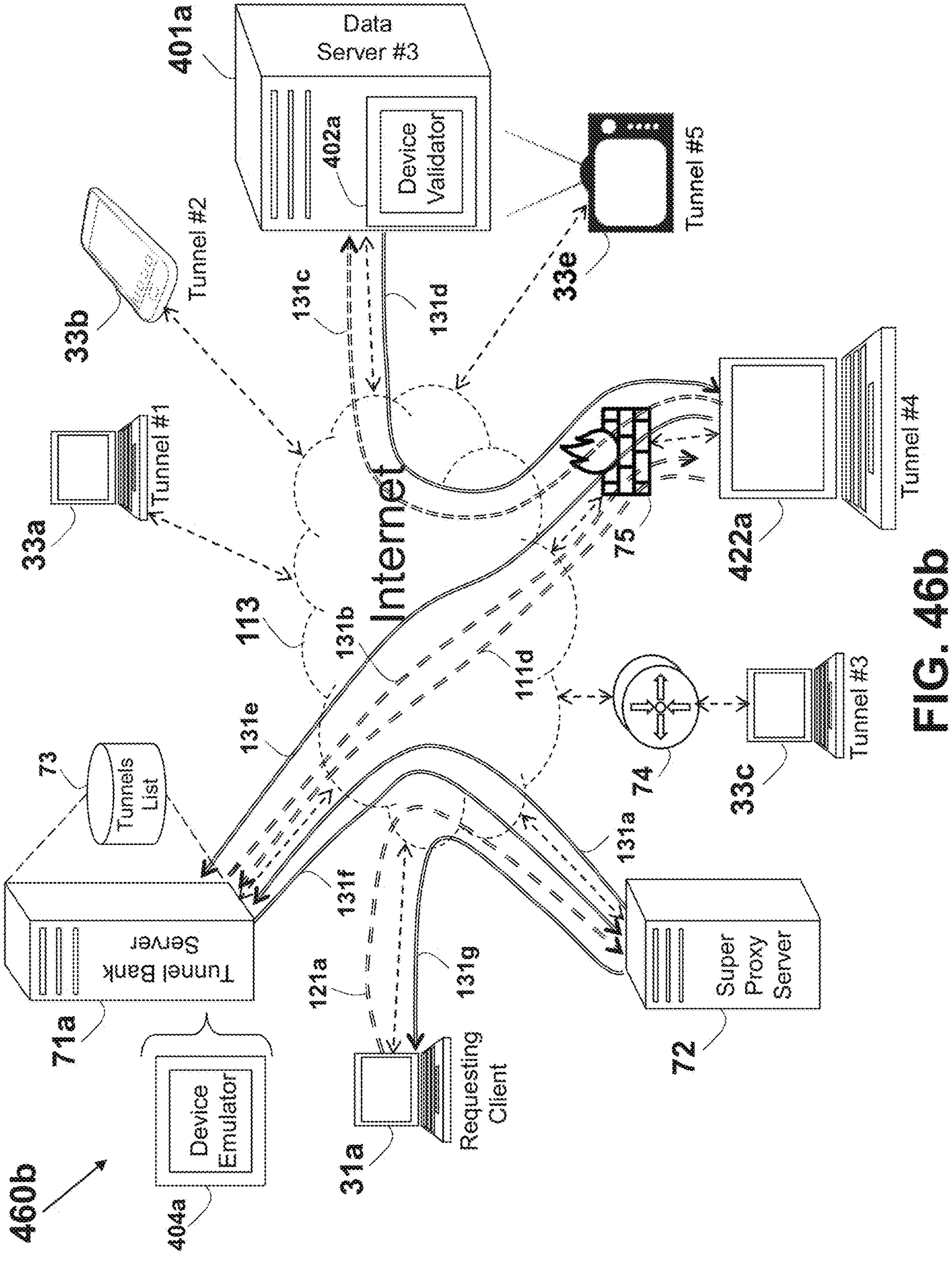
FIG. 46*b* depicts schematically messages exchanged over the Internet for fetching content from a limiting web server to the client device via a TB server that includes a Device Emulator functionality.

Another example of separating the IP address anonymity and the user emulating functionality is shown in an arrangement 460 shown in FIG. 46, which is based on the arrangement 430 shown in FIG. 43. A request for content is received by the tunnel device #4 421*a* from the requesting client device #1 31*a* via intermediate server, such as over the path 131*b* as part of the "Receive Request" step 174*a*. The Device Emulator functionality 404*a* in the tunnel device #4 421*a* forms a new request, based on the received URL, such as by executing part of, or whole of, the flow-chart 440*a*, and transmits the newly formed request to the Tunnel Device #2 33*b*, over a communication path 461*a*. The Tunnel Device #2 33*b* executes a tunnel device functionality of transparently passing the request, serving as the source device and thus using its own IP address as the source address, to the limiting web server 401*a* over a communication path 461*b*. The request that is received by the Data Server #3 401*a* include the source IP address of the tunnel device #2 33*b*, but the format and structure prepared by the Device Emulator functionality 404*a* in the Tunnel device #4 421*a*, with the URL that is defined and requested by the requesting client 31*a*. The requested content, such as a web-page, an HTML object, or any part or combination thereof, is returned from the limiting web server 401*a* to the Tunnel Device #2 33*b* over the communication path 461*c*, which relays the received content to the tunnel device #4 421*a* over a communication path 461*d*, which in turn relays the content to the requesting client #1 31*a*.

In one example, the Device Emulator functionality 404*a*, such as in the "Modify Request" step 413, changes or modifies a value that relates to a feature, property, characteristic, or attribute that is used to identify or 'fingerprint' a device or user, such as the client device 31*a*, or any other device along the path of the content request from the client device 31*a* to a limiting web browser, such as the Data Server #3 401*a*. Such value modification changes the fingerprint data that is obtained without such value changing or modification by the limiting web server as part of the Device Validator 402*a* functionality, such as in the "Validate Device (Fingerprinting)" step 394, so that the content requesting device is not identified as part of the "Legitimate Device?" step 395, and thus is not blacklisted as part of the "Add to Blacklist" step 396 and is not blocked as part of the "Block Request" step 397.

For example, features, properties, characteristics, or attributes that may be gathered in the "Validate Device (Fingerprinting)" step 394 may be gathered through a browser and that could help obtain a digital fingerprint such as the type, version and personal configuration of the browser, the set of characteristics installed that give information on the applications installed, the language, the time zone, the screen configuration and the technical elements of the terminal, IP address, etc. It may further include information on other, more advanced techniques that in normal conditions might allow for more specific identification of the device such as canvas fingerprinting, canvas font fingerprinting, webRTC fingerprinting, and audiocontext fingerprinting. Other data used for fingerprinting may include installation of ad-blockers on the browser, memory of the device, number of monitors connected to the device, device with accelerometer, presence of virtual keyboards, list of supported actions in the case of multi-touch screens, available audio and video codecs, terminal device battery use profile, and list of applications installed.

A value may be associated with a User Agent, which is a string that the browser sends to a web server in the HTTP request headers. This text chain contains information on the browser being used and the operating system of the device, and may contain information on the versions of the browser and operating system. Alternatively or in addition, a value may be associated with HTTP Accept Header that is sent to a web server in the HTTP requests to indicate the type of content the browser will accept in the server responses. Alternatively or in addition, a value may be associated with HTTP Accept-Charset Header that is sent to the server in HTTP requests to indicate the set of characters accepted in HTTP requests, for example 'utf-8'. Alternatively or in addition, a value may be associated with HTTP Accept-Encoding Header that is sent to the server in HTTP requests to indicate the set of characters accepted in requests, for example 'gzip, deflate'. Alternatively or in addition, a value may be associated with HTTP Accept—Encoding Header that is sent to the server in HTTP requests to indicate the set of characters accepted in requests, for example 'en-US'. Alternatively or in addition, a value may be associated with a list of plugins activated in the browser, and/or that may be activated in the browser, which value may be obtained through javascript. Alternatively or in addition, a value may be associated with the platform on which the instance of the browser is executing, for example 'Win32', which value can be obtained through javascript.

Alternatively or in addition, a value may be associated with whether the browser has cookies enabled or not, that may be detected through javascript. Alternatively or in addition, a value may be associated with HTTP Do not track Header, by which most current browser are able to inform the websites they visit, their advertisers and their content providers that the user does not want their browsing to be tracked. This is done through a HTTP header request and can be detected using javascript. Alternatively or in addition, a value may be associated with a Time zone of the browser, which can be obtained using javascript. Alternatively or in addition, a value may be associated with a resolution of the screen, which can be obtained using javascript. Alternatively or in addition, a value may be associated with a use of local storage by using Javascript. Alternatively or in addition, a value may be associated with use of session storage by using Javascript. Alternatively or in addition, a value may be associated with a WebGL Vendor, since some browsers provide complete identification for the graphic card installed on the system, or with a WebGL Renderer, since some browsers provide the complete name of the graphic driver installed on the system. Alternatively or in addition, a value may be associated with a list of text fonts that can be detected through javascript. Alternatively or in addition, a value may be associated with a use of ad-blockers or whether the device has a touch screen.

In one example, the Device Validator 402*a* is based on, or uses, hardware settings that may be accessed via a web-browser. In this case, the Device Emulator 404*a* functionality, such as in the "Modify Request" step 413, changes or modifies a respective value of the hardware setting, such as the screen resolution, number of CPU cores, the amount of dedicated memory, or the identification of network interfaces. Although the combination of the above settings is far from being able to provide a unique set, once combined with browser settings and other fingerprinting methods they can contribute to the creation of a unique signature.

Screen properties may be retrieved to achieve through JavaScript or Flash. The use of JavaScript's window.screen object allows the retrieval of basic information about the screen of the client. It is possible to gather information about screen height (in pixels), width, and bit depth of the color palette available for displaying images. The Java technology allows to retrieve information about the number of available processors, and the amount of free, max and total RAM memory. Browsers showed different behavior for this data retrieval: while Internet Explorer, Mozilla Firefox and Midori provided the requested information, others returned no data at all. This technique contributes to cross-browser fingerprinting, as Java accesses OS interfaces.

Java enables the retrieval of the name and status of physical and virtual networks. Among the type of information returned is the name of the interface, the status (i.e., if the interface is enabled or not), the Maximum Transmission Unit (MTU), if it is point-to-point, if it supports multicast, if it is loopback, and if the interface is virtual. The information retrieved with this technique is system-related, therefore it is suitable for cross-browser fingerprinting. This feature can have practical application in situations where a website wants to make sure that the user that signs in using a different hardware from the usual is, in fact, the real user. In case of an incoming new signature, the website can prompt the user with a security question or request a multi-channel authentication. Disadvantages: The hardware's collectable information is slim and there is not enough diversity in order to build a unique signature. Therefore, fingerprinting by collection of hardware features must rely on additional techniques in order to be effective.

System related settings, such as the OS version, the amount of available RAM or the current system time are features that can also be retrieved to create cross-browser fingerprints. Java and Flash plugins are known to access system settings in a fashion that is not totally privacy friendly, as they bypass the browser's controls. The online ActionScript 3.0 Reference for Adobe Flash Platform website informs that "[t]he Capabilities class provides properties that describe the system and runtime that are hosting the application. ( . . . ) By using the Capabilities class to determine what capabilities the client has, you can provide appropriate content to as many users as possible". The data collection through the Flash plugin allows browser fingerprinting and cross-browser fingerprinting, because there is plugin-related information (browser configuration) and system information being retrieved. The Java plugin can provide information about the local Java Virtual Machine (JVM). This technique provides system-related information, therefore allowing to perform cross-browser fingerprint. In one example, the fingerprinting of devices may use comparison of the clock skew between the client system and the server clock.

Different OSs have their own font sets, and various software suites, such as Microsoft Office or Adobe Creative Suite, usually add their own set of fonts to the system. Additionally, users can add their own fonts to the system, as well. The resulting set of fonts can be diverse enough to build a signature or, at least, allow the identification of the OS, making this one of the most commonly mentioned fingerprinting techniques, together with plugin detection. Fonts can be enumerated using JavaScript, Flash, Silverlight or Java, with different levels of efficiency. Because system fonts are managed at the OS level, this technique allows to perform cross-browser fingerprinting. The font detection done through JavaScript and CSS takes advantage of the fact that each character appears differently in different fonts. So different fonts will take different width and height for the same string of characters of same font-size. By measuring the output, the fingerprinting is able to identify if the rendered font is different from the fall back and, if that case, is resident in the system.

In one example, changes or modifications of a value is associated with cached objects, that may include HTTP Cache, Browsing History, Local Shared Objects (Flash Cookies), Web Storage (HTML5 Cookies), or any combination thereof. The technique of using stored objects on the client side as a way to uniquely identify a device is fairly similar across the technologies that have this ability: first the fingerprinter checks the cached object holder for the presence of any previous unique ID (stored from a former visit). If no ID exists the website uses the cached object to store a somewhat random but unique ID that will allow further visits to be tracked and linked to this device. Flash and HTML5 have their own mechanisms for storing data, which are described furthermore.

HTTP Cache. HTTP Cache refers to the caching of webpage contents that allows to reduce bandwidth usage, waiting times and server load. When requesting a resource that has been downloaded and stored previously, the client browser indicates the version of the stored object and asks the server if it should download a newer one. If the server has the chance to indicate the client's browser that it should or not replace a file already stored on its system, then it has a certain degree of control over that file and can use it as an ID for tracking purposes.

Browsing History. The collection of the URLs in the browser's history is typically done by using the technique that allows to determine if a particular URL has been visited by a client's browser through applying CSS styles distinguishing between visited and unvisited links. The creation of a signature of the browsing history may be used to create "history profiles" (that act as fingerprints), where URLs are categorized by website subject (e.g., Shopping, Entertainment, Travel, Vehicles, etc.).

Local Shared Objects (Flash Cookies). In the Flash MX version, Macromedia introduced the Local Shared Object (LSO), which provides an easier way to store information (i.e., only requires the use of ActionScript). LSOs provide the only method by which a Flash application can store information on a user's computer. Intended uses of the object include storing a user's name, a favorite color, or the progress in a game.

Web Storage (HTML5 Cookies). HTML5 introduced two related mechanisms, similar to HTTP session cookies, for storing name-value pairs on the client side: sessionStorage and localStorage, such as according to the HTML Standard entitled: "Storage object provides access to a list of key/value pairs, which are sometimes called items". The functionalities of history, HTTP cookies and (normal) cached content cleaning, are available in most browsers nowadays.

Browser vendors are free to include their own logic in the code that is embodied in their software, so that certain operation when performed by two different browsers might be the same, although their underlying mechanisms are different. Using Browser Rounding and Fractional Pixels, referring to the way that different browser handle math calculations, and rounding in particular, can be used to identify the client's browser and contribute to the fingerprinting process. System settings such as the type of contents supported by the browser, the local clock time or the client's system default language can be externalized by the browser software. Using Plugin and Mime-type Enumeration, when a website needs to query if a certain plugin exists in the clients system, to properly display/run some type of content, it can retrieve an array of plugins by accessing to JavaScript's navigator.plugins. Further the Do-Not-Track is part of HTTP header field (DNT) with the objective of increasing the privacy of the webpage users. The header contains a flag that indicates whether the client is willing to be tracked across websites.

Figure 45:
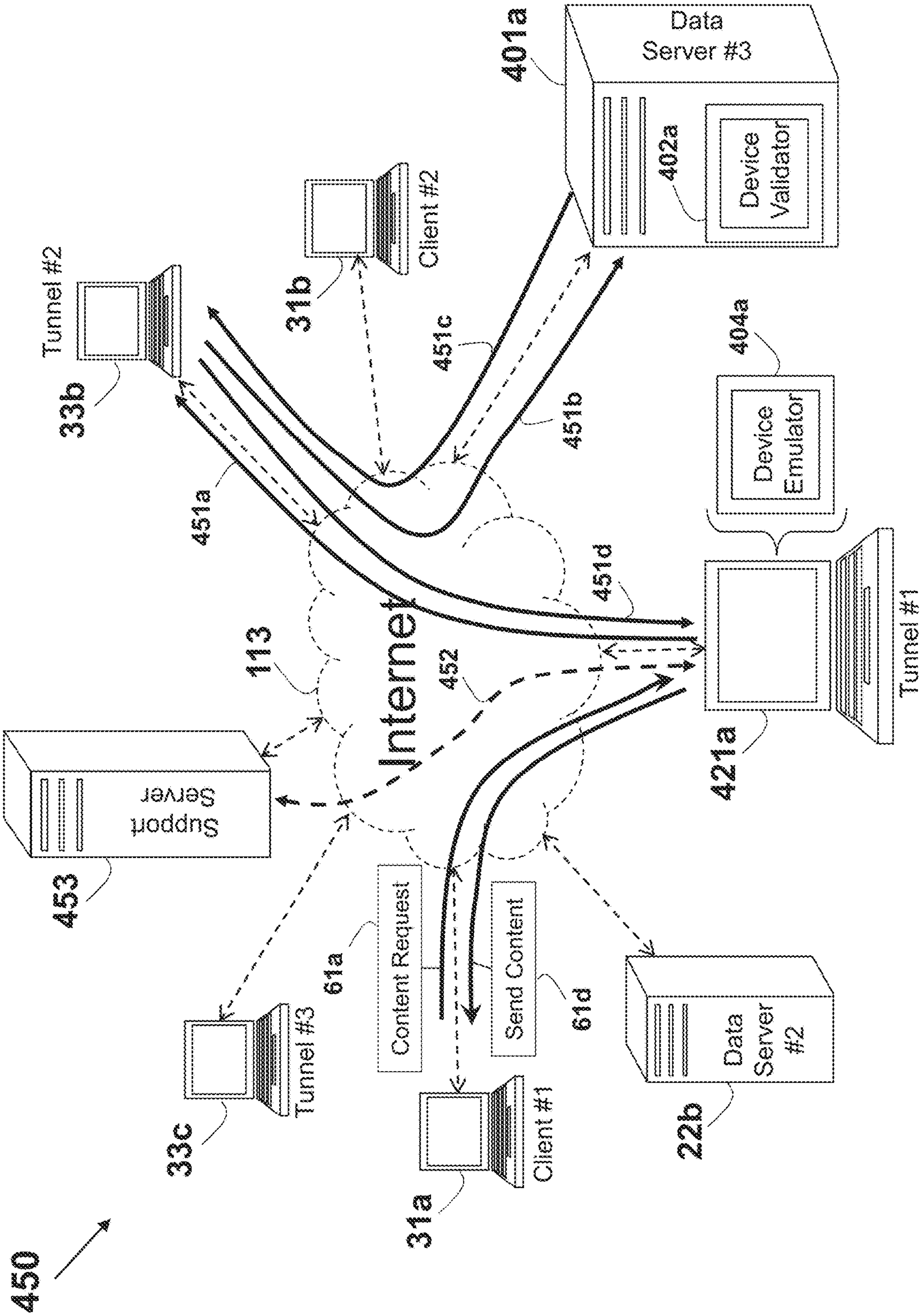
FIG. 45 depicts schematically messages exchanged over the Internet in a non-direct fetching scheme using an additional tunnel device added to a tunnel device with a Device Emulator functionality and a limiting web server.

The device emulator 404*a* is exampled in the arrangement 450 shown in FIG. 45 as providing the capability to emulate a single device to the Device validator 402*a* in the Data Server #3 401*a*, that is similar or different from a device, such as the Tunnel Device #1 421*a*, that does not implement any device emulator functionality. For example, the fingerprint data collected by the Device Validator 402*a* for the Tunnel Device #1 421*a* due to the embedded functionality of the device emulator 404*a* is distinct from the fingerprint data obtained with no such functionality, thus allowing anonymity and privacy.

Figure 47:
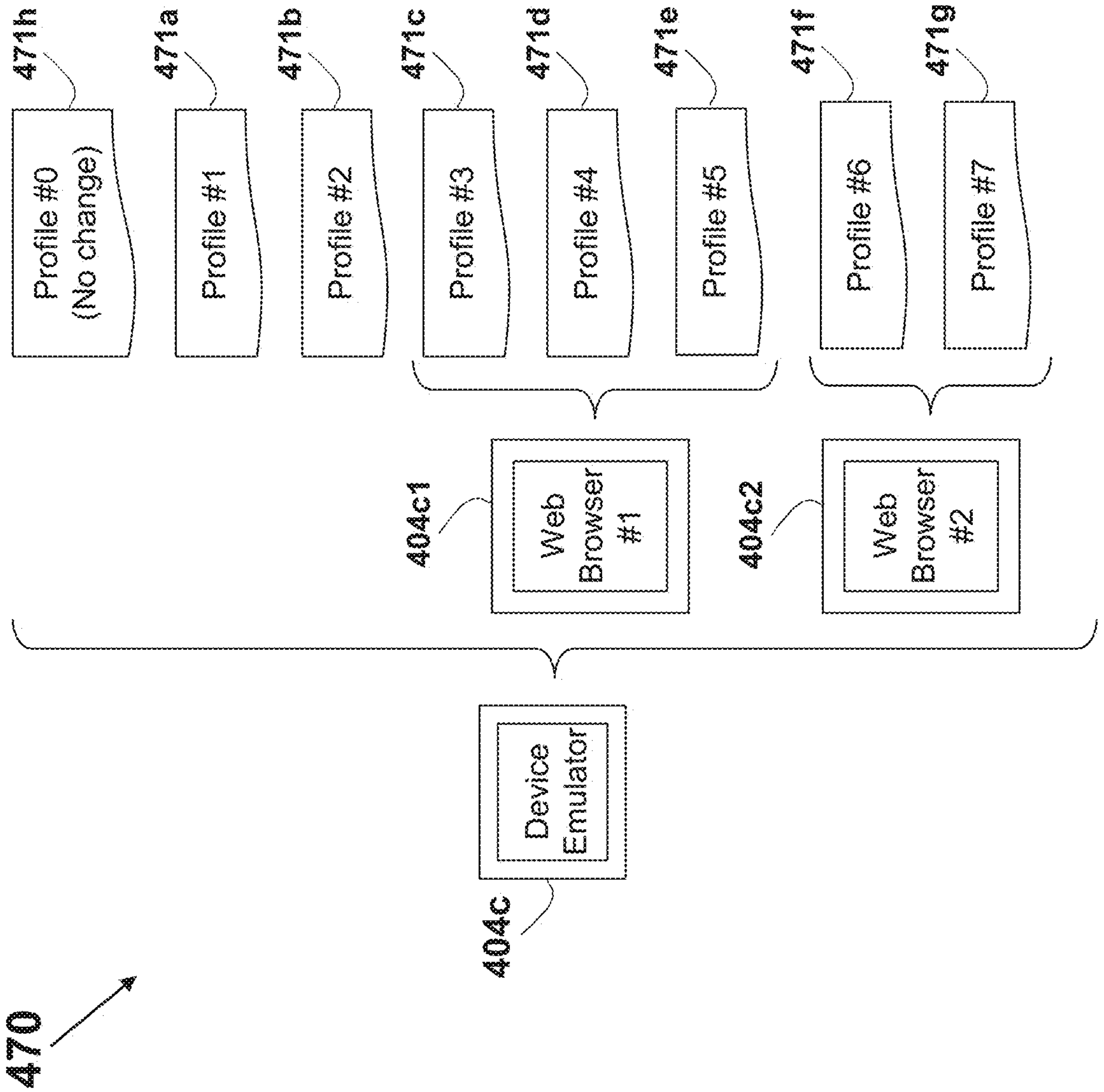
FIG. 47 depicts schematically multiple profiles that may be used by a device emulator.

In one example, a device emulator functionality may use multiple profiles, where each profile represents a different emulated device to be captured by the Device validator 402*a* in the Data Server #3 401*a*. The device emulator functionality may select to implement a specific profile from the available profiles, hence representing a different device to the Device validator 402*a*. Such a multi-profile device emulator 404*c* is shown in the scheme 470 shown in FIG. 47, exampling the use of 8 different profiles, referred to as a 'Profile #0 (No change)' 471*h*, a profile #1 471*a*, a profile #2 471*b*, a profile #3 471*c*, a profile #4 471*d*, a profile #5 471*e*, a profile #6 471*f*, and a profile #7 471*g*. While the device emulator 404*c* in FIG. 47 is shown to be able to use any one of the 8 different profiles, any number of profiles may equally be used, such as at least 2, 3, 4, 5, 6, 7, 8, 10, 12, 15, 20, 25, 30, 50, 80, 100, 120, 150, 200, 500, 1,000, 2,000, 5,000, or 10,000 profiles, or less than 3, 4, 5, 8, 10, 12, 15, 20, 25, 30, 50, 80, 100, 120, 150, 200, 500, 1,000, 2,000, 5,000, 10,000 or 20,000 profiles. In one example, one of, part of, or all of, the available profiles are artificially generated. Alternatively or in addition, one of, part of, or all of, the available profiles are profiles of real human users, that were captured and stored as part of normal operation of a device or a browser, and thus may be used as non-artificial profiles that mimics real users.

The difference between any two profiles, such as between the profile #1 471*a* and profile #2 471*b*, may include a change or a modification in a value that relates to a one or more features, properties, characteristics, or attributes, that are used to identify or 'fingerprint' a device or user. Any number of changed or modified values between any two profiles may be used, and may correspond to any number of features, properties, characteristics, or attributes, such at least 2, 3, 4, 5, 6, 7, 8, 10, 12, 15, 20, 25, 30, 50, 80, 100, 120, 150, 200, 500, 1,000, 2,000, 5,000, or 10,000 different values, or less than 3, 4, 5, 8, 10, 12, 15, 20, 25, 30, 50, 80, 100, 120, 150, 200, 500, 1,000, 2,000, 5,000, 10,000 or 20,000 different values.

In one example, only two possible values (such as YES/NO or Exist/Non-Exist) are relevant for a specific feature, property, characteristic, or attribute. For example, the feature of 'Cookies-Enabled' may correspond to two possible values: 'Enabled' and 'Non-Enabled'. In such a case, one profile (such as the profile #1 471*a*) may use one of the possible values (such as 'Enabled') while other profile (such as the profile #2 471*b*) may use the other of the possible values (such as 'Non-Enabled'). Similarly, a specific feature, property, characteristic, or attribute may be associated with multiple values. For example, such feature, property, characteristic, or attribute may be associated with multiple values, each containing a string, such as identifiers of languages (e.g., 'English', Chinese', and 'German'), or of various operating systems, where values may be Microsoft Internet Explorer, Google Chrome, Opera™, or Mozilla Firefox®. In such a case, one profile (such as the profile #1 471*a*) may use one of the possible values (such as 'Mozilla Firefox®.') while other profile (such as the profile #2 471*b*) may use the other of the possible values (such as 'Opera™'). Further, a specific feature, property, characteristic, or attribute may be associated with a natural number or a range of numbers, typically natural number, such as 1 to 5 or 1 to 100, that may represent a count, a quantity, or a number of items. Such examples may include the Time zone of the browser (ranging 0 to 24 hours, or −12 to +12 hours), or the number of CPU cores (that may range, for example, from 1-12). In such a case of the number of CPU cores, one profile (such as the profile #1 471*a*) may use one of the possible values from the range (such as '4') while other profile (such as the profile #2 471*b*) may use the other of the possible values from the range (such as '2').

Any difference between two profiles may include at least one specific feature, property, characteristic, or attribute, that may affect a different fingerprint data that is part of a browser fingerprinting, canvas fingerprinting, canvas font fingerprinting, webRTC fingerprinting, audiocontext fingerprinting, or any combination thereof. Alternatively or in addition, any difference between two profiles may include at least one specific feature, property, characteristic, or attribute, that may affect a different fingerprint data that is associated with type, version, characteristics, or configuration of a software application installed or used in the first client device or in the first device, or is associated with user configuration of hardware or software in any device that comprises the device emulator 404*c*, such as in any client device or in any server device. Alternatively or in addition, any difference between two profiles may include at least one specific feature, property, characteristic, or attribute, that may affect a different fingerprint data that is associated with a hardware component of any device that comprises the device emulator 404*c*, such as in any client device or in any server device. Alternatively or in addition, any difference between two profiles may include at least one specific feature, property, characteristic, or attribute, that may affect a different fingerprint data that is associated with a HTTP header field.

Figure 42B:
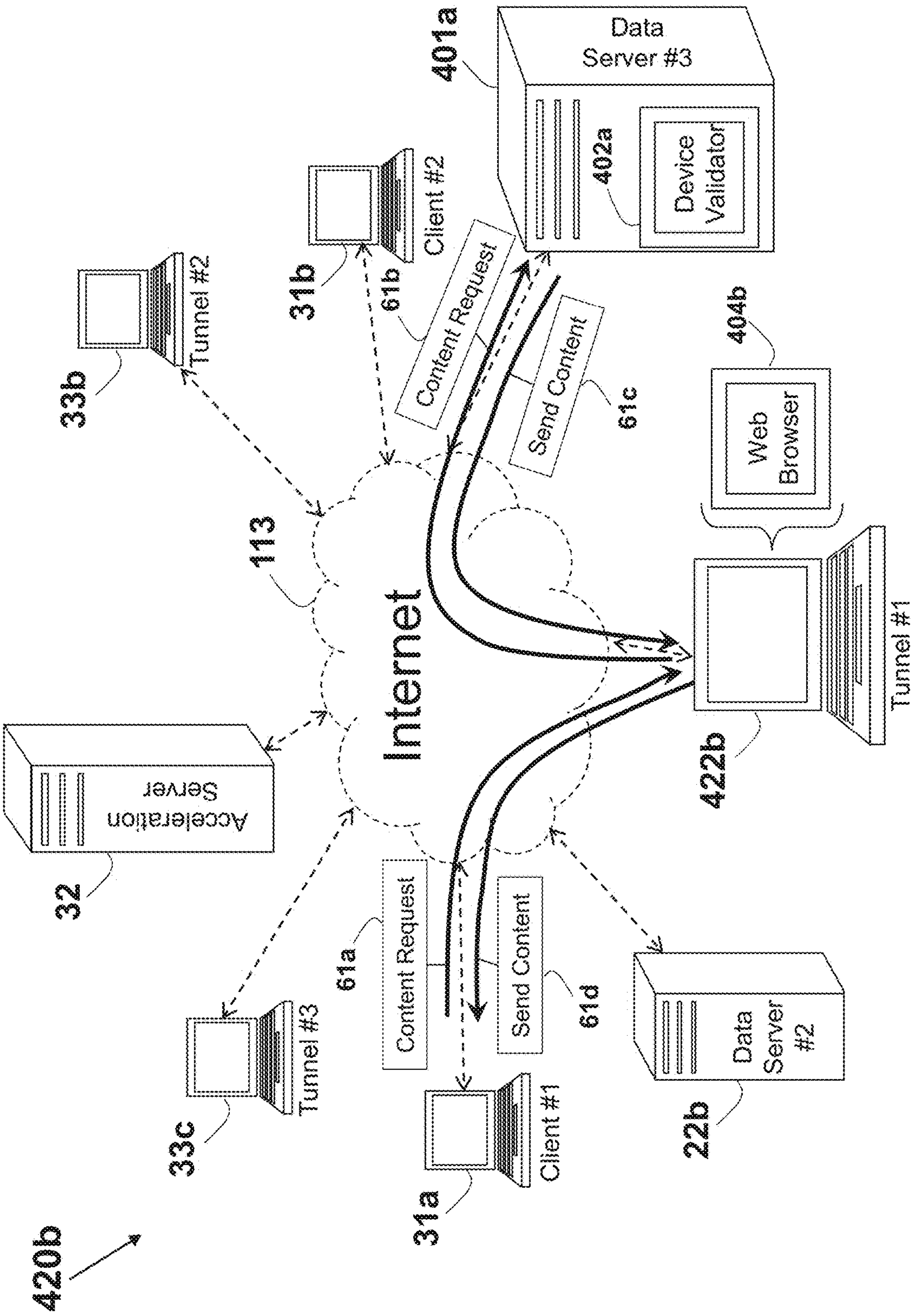
FIG. 42*b* depicts schematically messages exchanged over the Internet in a non-direct fetching scheme with a web browser functionality in a tunnel device and a limiting web server.

As exampled in the arrangement 420*b* shown in FIG. 42*b*, the device emulator 404*a* may include, or may be based on, the web browser 404*b*. Similarly, the Device Emulator 404*c* may include multiple web browsers, and one or more profiles may be associated with each web browser. The scheme 470 illustrates the case where the Device Emulator 404*c* includes two web-browsers, referred to as a web-browser #1 404*c*1 and web browser #2 404*c*2. While two web browsers are example, any number of web browsers may be equally used, and a device emulator may include at least 2, 3, 4, 5, 6, 7, 8, 10, 12, 15, 20, 25, 30, 50, 80, or 100 similar or different web browsers, or may include less than 3, 4, 5, 8, 10, 12, 15, 20, 25, 30, 50, 80, 100, 120, 150, or 200 similar or different web browsers. Any two web browsers included in the Device Emulator 404*c* may be different types (such as from different vendors) of web browsers, or may be different versions or updates of the same type and vendor of web browser.

Any web browser that is included in the Device Emulator 404*c* may be associated with one or more different, distinct, or similar profiles. The scheme 470 illustrates the case where the web-browser #1 **404*c*1 is associated with three profiles that are the profile #3 471*c*, the profile #4 471*d*, and the profile #5 471*e*, and where the web browser #2 404*c*2 is associated with two profiles that are the profile #6 471*f* and the profile #7 471*g***. While exampled as using two or three profiles per web browsers, any number of profiles may be equally associated with each web browser, and any web browser may be associated with at least 1, 2, 3, 4, 5, 6, 7, 8, 10, 12, 15, 20, 25, 30, 50, 80, or 100 similar or different profiles, or may be associated with less than 2, 3, 4, 5, 8, 10, 12, 15, 20, 25, 30, 50, 80, 100, 120, 150, or 200 similar or different profiles. Different profiles that are associated with the same web browser may relate to different settings, different configurations, different user profiles, or different cookies or history (such as different browsing histories).

Any of the used profiles may further be associated with using an additional tunnel device, such as using the tunnel device #2 **33*b* in the arrangement 450 shown in FIG. 45 or in the arrangement 460 shown in FIG. 46. In such a case, when selecting a profile that indicate such feature, the web server is accessed via the additional tunnel device. One of the possible profiles, shown as the Profile #0 (No Change) 471*h* in the scheme 470 shown in FIG. 47, is associated with no emulating functionality, such as where the device emulator 404*c* is inactive or idle, where the original fingerprint data of the device that implements the device emulator 404*c* is available to be captured by the Device validator 402*a* in the Data Server #3 401*a***.

Figure 48:
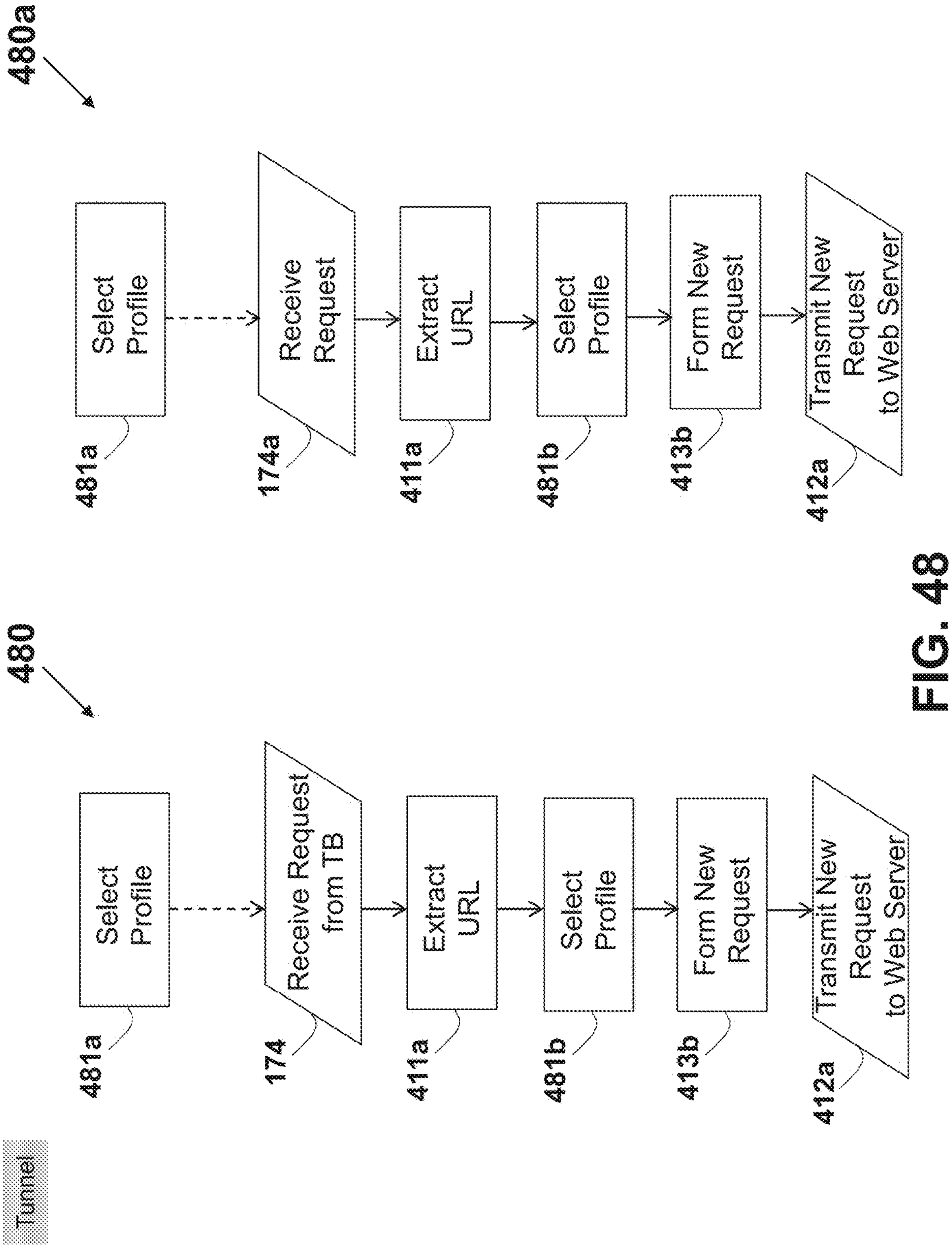
FIG. 48 illustrates schematically simplified flowcharts relating to implementing a User Emulator functionality that uses multiple profiles.

A profile may be selected as part of a "Select Profile" step **481*a* that is part of a flow-chart 480 shown in FIG. 48, which corresponds to the flowchart 440 shown in FIG. 44. Upon selecting a profile, or upon changing from a formerly selected profile to another profile, the current profile is used by the respective device, so that the fingerprint data obtained by the Device validator 402*a* in the Data Server #3 401*a* is associated with the selected profile. In one example, the request formed as part of the "Form New Request" step 413*b* is based on the current operational profile, that was selected as part of the "Select Profile" step 481*a*. Similarly, a profile may be selected as part of the "Select Profile" step 481*a* that is part of a flow-chart 480*a* shown in FIG. 48, which corresponds to the flowchart 440*a* shown in FIG. 44**.

In one example, a different profile is selected each time a URL to be fetched is identified, such as in the "Extract URL" step **411*a*, shown as a "Select Profile" step 481*b* in the flow-charts 480 and 480*a* shown in FIG. 48. For example, a selection (or a re-selecting) of a profile may be performed for each URL, for each domain, for each web-page, or for each web-site. In such cases, the same profile is used, providing consistency and stability, for all consecutive requests of the same domain, the same web-page, or the same web-site. Alternatively or in addition, a selection (or a re-selecting) of a profile may be time based. For example, a new profile may be periodically selected, such as where the time period of the periodic selection is at least 1, 2, 5, 8, 10, 12, 15, 20, 25, 30, 50, 80, 100, 120, 150, 200, 500, 1,000, 2,000, 5,000, or 10,000 milliseconds, seconds, minutes, or hours, or wherein the time period is less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, or hours. Alternatively or in addition, the selection events may be based on calendar timing such as based on time-of-day. For example, a selection event may be based on a calendar month, a week, a day of the week, an hour of a day, or a minute in an hour. For example, seven profiles may be used, each associated with a different day of the week. Alternatively or in addition, 24 distinct profiles may be available, each associated with at least one different hour of the day. Further, any time herein may comprise a month, a week, a day of the week, an hour of a day, or a minute in an hour. Alternatively or in addition, a selection event may be performed each time the device that embeds or implements the Device Emulator 404*c* is powered up, or any time where such device is connected to the Internet. Further, any profile selecting herein may be based on, or may be in response to, a time of an action or an event, either internally to the device that implements the Device Emulator 404*c***, or an event that is external to the device.

Further, any selecting of a profile herein may be based on, or may use, Last-In-First-Out (LIFO) or First-In-First-Out (FIFO) scheme. Alternatively or in addition, any selecting herein of any IP address from any selected list may be based on, or may be using, sequential or cyclic selection. Any message herein, such as the first message, may comprise a criterion, and any selecting herein of any list from any multiple distinct lists may be based on, may be using, or may be in response to, the criterion. Any selecting herein of any list from any multiple distinct lists may be based on load balancing. Alternatively or in addition, any selecting herein of any list from any multiple distinct lists may be based on, or may be using, random selection, sequential, or cyclic selection. Any message herein, such as the first message, may comprise a criterion, and any selecting herein of the list from any multiple distinct lists may be based on, may be using, or may be in response to, the criterion.

In one example, any profile selection herein from the available profiles may be based on, or may use, load balancing, or alternatively or in addition may be based on, or may use, a random selection. The random selection may use, or may be based on, one or more random numbers generated by a random number generator, and the random number generator may be hardware based, software based, or any combination thereof. Further, the random number generator herein may be using thermal noise, shot noise, nuclear decaying radiation, photoelectric effect, or quantum phenomena. Alternatively or in addition, any random number generator herein may be based on executing an algorithm for generating pseudo-random numbers. Alternatively or in addition, the selection may be deterministic based, such as where a profile is selected based on, or using, sequential or cyclic selection. In one example, the elements to select from are listed in an orderly fashion, such as according to a feature, attribute, or a characteristic, using any associated numerical value, according to any alphanumeric identifier, or according to the order they were formerly selected from the group or collection. In such a case, the elements are sequentially selected according to the list order. In one example, a LIFO (Last-In-First-Out) like scheme may be used, where the lastly selected profile is re-selected, and upon its unavailability, the profile that was selected before the last is selected. Alternatively or in addition, a FIFO (First-In-First-Out) like scheme may be used, where the oldest formerly selected profile is re-selected.

In one example, the device emulator **404*a* provides higher level of online privacy, such as higher level of privacy protection for an individual while connected to the Internet. It may allow for protecting access to personal information from being used, collected, shared, or stored while connected to the Internet. In one example, the device emulator 404*a* distort or prevent the fingerprinting operation by the web server, by rendering the actual fingerprinting information distorted or worthless. In one example, the device emulator 404*a* may override a canvas function (e.g., a toDataUrl( ) canvas function), and may further randomize the canvas fingerprint and/or otherwise distort the canvas fingerprint. Additionally, or alternatively, the device emulator 404***a* may tweak or alter a browser's screen object so that the corresponding dimensions are slightly randomized and/or rounded off. In addition, the device emulator 404*a* may modify the intercepted network traffic by obfuscating a fingerprinting object that the client device is attempting to upload to the server device.

Illustrative examples of the fingerprinting object modified by the device emulator 404*a* may include: a canvas fingerprint, a font list, screen dimensions, a user agent screen, a plug-in list, a webGL fingerprint, and/or an AudioContext fingerprint. A canvas fingerprint may refer to a fingerprinting script drawing of an invisible image using a Hypertext Markup Language version 5 canvas application programming interface, and then obtaining a 128-bit hash of the image using an additional application programming interface call (e.g., toDataUrl( ) where this hash may be quite unique and the hash may be used to identify a user's browser. A font list may refer to the list of all fonts that are installed on a user system. In recent years, browsers such as Firefox, Tor, and Safari have worked to mitigate the effectiveness of the fonts as a source of browser entropy by only exposing the factory-default fonts. Screen dimensions may refer to screen properties that may be stored in a JavaScript screen object. The user agent string may refer to the user agent that is stored in the JavaScript navigator object. The plug-in list may refer to a list of plug-ins installed by the user. Quite often, an out-of-date plug-in can boost the uniqueness of the fingerprint. A webGL fingerprint may be extracted by probing the capability of the webGL on the user system. An AudioContext fingerprint may be similar to the canvas fingerprint, but may be applied to the user system audio stack. In order to successfully modify and/or block one or more of the fingerprinting objects listed above, it may be helpful for the corresponding fingerprinting object to be interceptable (e.g., can the object be successfully identified and/or extracted?) and safe (e.g., can the modification or blocking of the fingerprinting object be performed without breaking partially or entirely the functionality of corresponding web content?).

With respect to the canvas fingerprint, a script (e.g., JavaScript) can be inserted, by the device emulator 404*a*, into the requested webpage that performs the following steps. Scripts may reimplement the toDataUrl( ) canvas application programming interface function calls. When these application programming interfaces are now called, a function (e.g., manipulate( ) may capture the canvas image. Additionally, this function may furthermore generate a random shift value between two integers (e.g., between 5 and 15), step diagonally through the pixel map and select 10 pixels, shift the RGP color values for these 10 pixels, and/or call the original application programming interface function (e.g., toDataUrl( ) and return the value for the slightly modified image. The usage of this script will essentially guarantee that the canvas fingerprint will change each time. Most of the browser settings listed above can be intercepted and modified. In one example, a browser fingerprinting may be limited by requiring the end-user to install the device emulator 404*a* as an extension and/or make configuration changes to all of the browsers that may be installed on a particular device. Additionally, some mobile applications may contain an embedded browser that can be prevented from performing fingerprinting of users through the use of a network-based service, due to the fact that these embedded browsers may prevent users from installing and/or configuring browser extensions or settings to prevent these procedures locally on the client device.

Figure 49:
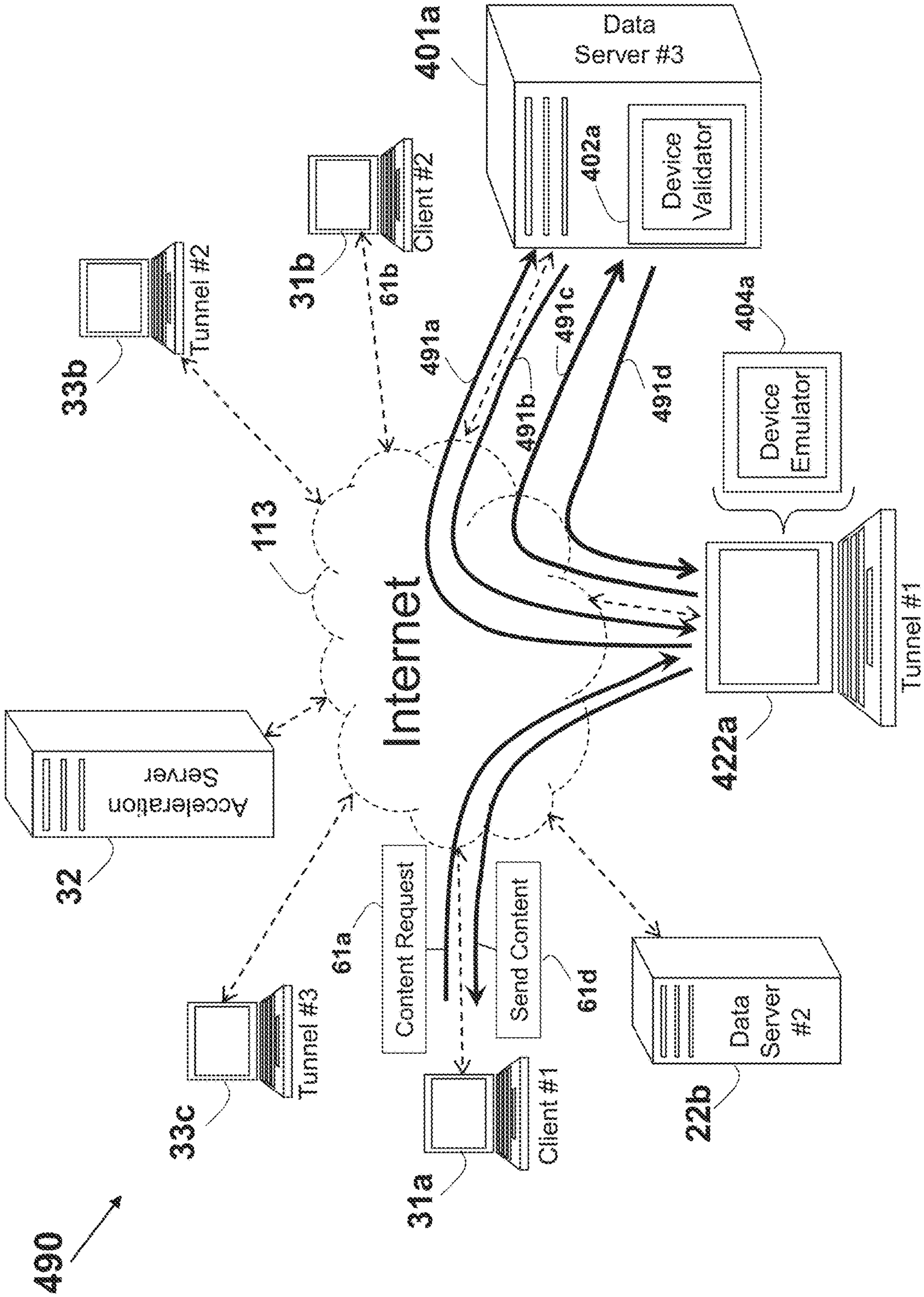
FIG. 49 depicts schematically messages exchanged over the Internet using different profiles in retrying of a non-direct fetching scheme with a Device Emulator functionality in a tunnel device and a limiting web server.

The U.S. Pat. No. 10,963,531 to Shribman et al. entitled: "System and Method for URL Fetching Retry Mechanism", which is incorporated in its entirety for all purposes as if fully set forth herein, discloses a method or retrying by multiple fetching attempts of a content from a web server to a client device, in order to overcome intermittent, temporary, or other fetching failures. Similarly, multiple attempts may be used, each using a different fingerprint, in order to overcome fingerprinting-based blocking of a specific user or device by a web server, such as in the 'Block Request' step 397 shown as part of the flow-chart 390*b* shown in FIG. 39. An arrangement 490 that generally uses using different fingerprints as part of retrying attempts is shown in FIG. 49, and corresponds to the arrangement 420*a* shown in FIG. 42*a*. A first content request 491 is sent to the Data Server #3 401*a*, which in case where the request is non-blocked in the 'Block Request' step 397, return the content as part of the content sending message 491*b*, that corresponds to the 'Send Content' step 392 in the flow-chart 390*b* shown in FIG. 39. In one example, no Device Emulator 404*a* is used, and the Tunnel Device #1 422*a* is blacklisted by the Data Server #3 401*a*, and this thus blocked as part of the 'Block Request' step 397, or is otherwise considered as a non-legitimate device as part of the "Legitimate Device?" step 395, and thus again blocked as part of the 'Block Request' step 397. In such a case, the response message 491*b* may be an error response, or may not be received by the Tunnel Device #1 422*a* before expiration of a specified timeout period.

Figure 49A:
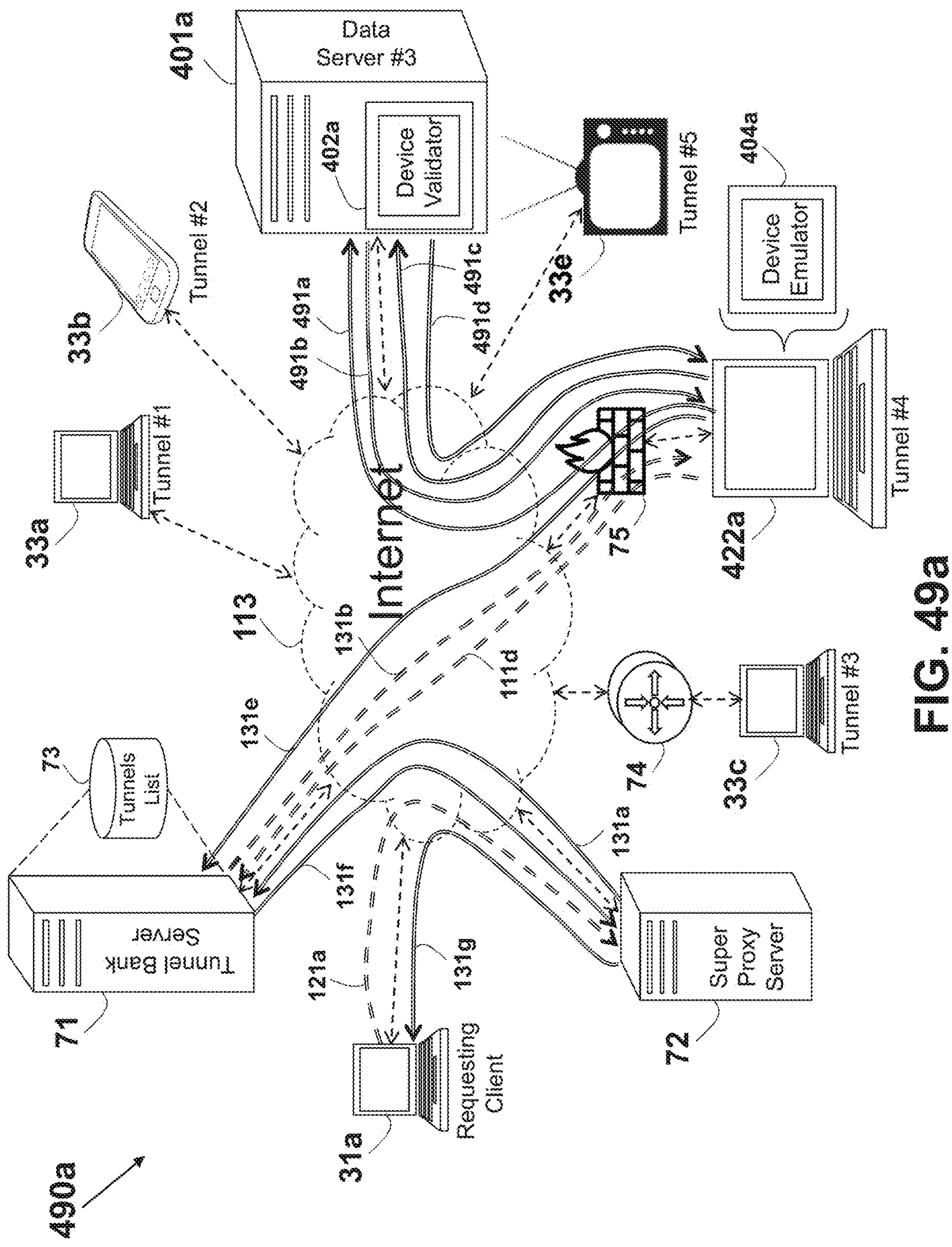
FIG. 49*a* depicts schematically messages exchanged over the Internet for using different profiles in retrying fetching of content from a limiting web server to the client device via the tunnel device that includes a User Emulator functionality.

Such a blocking by the Data Server #3 401*a* may be overcome by trying another attempt to retrieve the content, using a different (or first time selecting of) profile. The Tunnel Device #1 422*a* send another content request 491*c* to the Data Server #3 401*a* after selecting and using a new or another profile, that is distinct from the profile (or lack thereof) used at the first message trying 491*a*. In case where the newly used profile is not blocked as part of the 'Block Request' step 397, such as since it is not part of the blacklist or is considered legitimate by the Data Server #3 401*a*, a proper response with the requested content is sent over a return message path 491*d*. Similarly, an arrangement 490*a* that generally uses using different fingerprints as part of retrying attempts is shown in FIG. 49*a*, and corresponds to the arrangement 430 shown in FIG. 43. While a single fetching retry that comprises the request message path 491*c* and the content receiving path 491*d* is described in the arrangement 490 shown in FIG. 49, any number of such retries may be equally used, where a different profile (and thus a different respective fingerprint data) is used in each one of the fetching retries. If no proper content is received in any of the fetching retries, the fetching is considered as failed. The number of such retries may be at least 1, 2, 3, 5, 10, 20, 30, 50, or 100 times, or may be less than 2, 3, 5, 10, 20, 30, 50, 100, or 200 retries.

Figure 50:
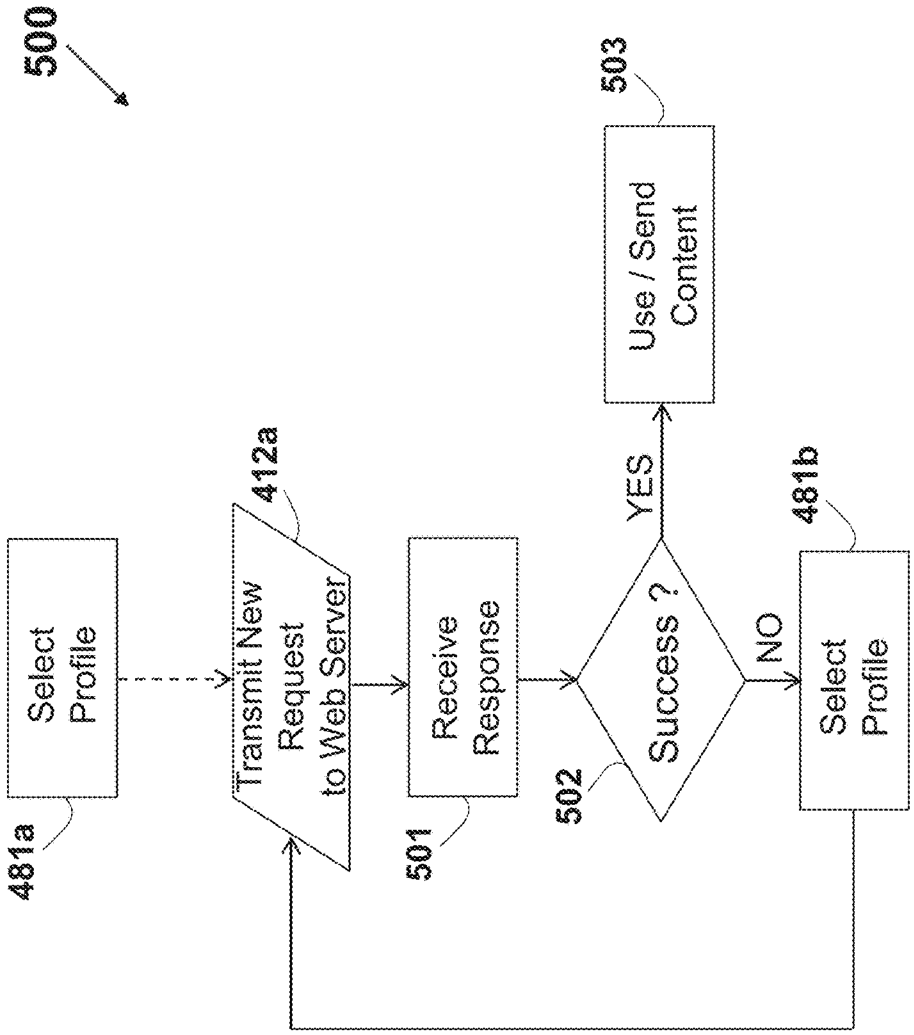
FIG. 50 illustrates schematically simplified flowcharts relating to implementing a User Emulator functionality Internet using different profiles in retrying of a non-direct fetching scheme.

A flow-chart 500 that is performed by the Device Emulator 404*s* and involves retrying using different profiles is shown in FIG. 50. The first request for content, corresponding to the message path 491*a* shown in the arrangements 490 and 491*a* in the respective FIGS. 49 and 49*a*, uses a profile that was selected as part of the "Select Profile" step 481*a*. As part of a "Receive Response" step 501, that corresponds to the return message path 491*b* in the arrangements 490 and 490*a* in the respective FIGS. 49 and 49*a* (and that includes the case of timeout expiration time), the response is received, and checked if it properly includes the requested content as part of a "Success?" step 502. In the case where the response is considered to properly include the requested content, the properly received content is used or send to the requesting device (that sent the URL request) as part of a "Use/Send Content" step 503, such as sending over the message path "Send Content" 61*d* to the client device #1 31*a*.

However, in the case where the response is not considered to properly include the requested content as part of the "Success?" step 502, which may be due to blocking by Device Validator 402*a* in the Data Server #3 401*a*, a new profile, different from the one selected in the "Select Profile" step 481*a* and used for the first request as part of the "Transmit New Request to Web Server" step 412*a*, is selected by the Device Emulator 404*a* as part of a "Select Profile" step 481*b*. The selecting scheme, process, or criterion used as part of the "Select Profile" step 481*b*, may be the same as, similar to, or different from, the selecting as part of the "Select Profile" step 481*a*. The new profile selected as part of the "Select Profile" step 481*b* is used for a new request, that corresponds to the request message path 491*c* in the arrangements 490 and 490*a* in the respective FIGS. 49 and 49*a*, as part of the "Transmit New Request to Web Server" step 412*a*. A response to such request (or a timeout expiration), that corresponds to the response message path 491*d* in the arrangements 490 and 490*a* in the respective FIGS. 49 and 49*a*, is then received as part of the "Receive Response" step 501, to be checked and analyzed to include the proper content.

In one example, the profile initially selected as part of the "Select Profile" step 481*a* in the flow-chart 500 is Profile #1 471*a* shown as part of the arrangement 470 in FIG. 47, and the profile selected after the failure of the first attempt as part of the "Select Profile" step 481*a* in the flow-chart 500 is Profile #2 471*b*. In another example, the profile initially selected as part of the "Select Profile" step 481*a* in the flow-chart 500 is Profile #0 (No Change) 471*h* that represent no modification to the device fingerprint by deactivating any modifications by the Device Emulator 404*a*, and the profile selected after the failure of the first attempt as part of the "Select Profile" step 481*a* in the flow-chart 500 is Profile #7 471*g*. In another example, the profile initially selected as part of the "Select Profile" step 481*a* in the flow-chart 500 is Profile #3 471*c* that involves initiating and operating the web browser #1 404*c*1 as shown in the arrangement 470 in FIG. 47, and the profile selected after the failure of the first attempt as part of the "Select Profile" step 481*a* in the flow-chart 500 is Profile #6 471*f* that uses initiating and operating the web browser #2 404*c*2. Further, the profile initially selected as part of the "Select Profile" step 481*a* in the flow-chart 500 is Profile #4 471*d* that involves initiating and operating the web browser #1 404*c*1 as shown as part of the arrangement 470 in FIG. 47, and the profile selected after the failure of the first attempt as part of the "Select Profile" step 481*a* in the flow-chart 500 is Profile #5 471*e*, that uses the same web browser but with other settings, configurations, or user profiles or history.

Any checking of any response herein as part of the "Success?" step 502 may comprise identifying and checking a HTTP status code that may be received by any device, such as the first device, in response to the sending of the URL request. Any response herein, such as the first response, may be determined as a proper response responsive to a status code of 2xx. Any response herein, such as the first response, may be determined as not being a proper response responsive to a status code of 4xx or 5xx, or responsive to a status code of HTTP 404 error message. Alternatively or in addition, any checking of any response herein as part of the "Success?" step 502 may comprise using a timeout mechanism, and any response herein may be determined as not being a proper response in response to not receiving a proper response after elapsed defined time period after an initiation of the fetching. Alternatively or in addition, any checking of any response herein as part of the "Success?" step 502 may comprise checking if an URL redirection is identified, such as by checking that the HTTP status code is 3xx Redirection, and any response herein may be determined as not being a proper response in response to detecting the URL redirection.

Alternatively or in addition, any method herein as part of the "Success?" step 502 may be used with a criterion that may relate to any feature, any characteristic, or any type, of the received content, and any checking of any response herein may comprise verifying if the content received satisfy the criterion. Any criterion herein may comprise a value, and any response herein may be determined as not being a proper response in response to comparing the content feature, characteristic, or type, to the value. Alternatively or in addition, any criterion herein may comprise a value of a size of a file, and any response herein may be determined as not being a proper response in response to comparing the received content size to the value.

Any method herein may comprise performing more than 2 fetchings, and the same first message may be sent by any device, such as the first device, to any device or server, such as the web server, in all of the fetchings. Alternatively or in addition, any method herein may comprise performing more than 2 fetchings, and the at least two different first messages may be sent by any device, such as the first device, to any device or server, such as the web server, in all of the fetchings. Alternatively or in addition, any method herein may comprise performing more than 2 fetchings, and a distinct first message may be sent by any device, such as the first device, to any device or server, such as the web server, in each of the fetchings.

The arrangement 450 shown in FIG. 45 examples the placing on the additional tunnel device #2 33*b* in the path between the Tunnel device #1 421*a* and the Data Server #3 401*a*. Since the Data Server #3 401*a* is only aware of the IP address (as a source address of the received request) along the path 451*b*, the IP address of the Tunnel device #1 421*a* is hidden from the Data Server #3 401*a*. In one example, the additional tunnel device #2 33*b* transparently passes the messages between the Tunnel device #1 421*a* and the Data Server #3 401*a*, so that any web tracking by the Device Validator 402*a* in the Data Server #3 401*a* is handled by the Device Emulator 404*a*, resulting in the emulating functionality of the Device Emulator 404*a* combined with the IP address of the additional tunnel device #2 33*b*. Similarly, the arrangement 460 shown in FIG. 46 examples the placing on the additional tunnel device #2 33*b* in the path between the Tunnel device #4 421*a* and the Data Server #3 401*a*.

Figure 31:
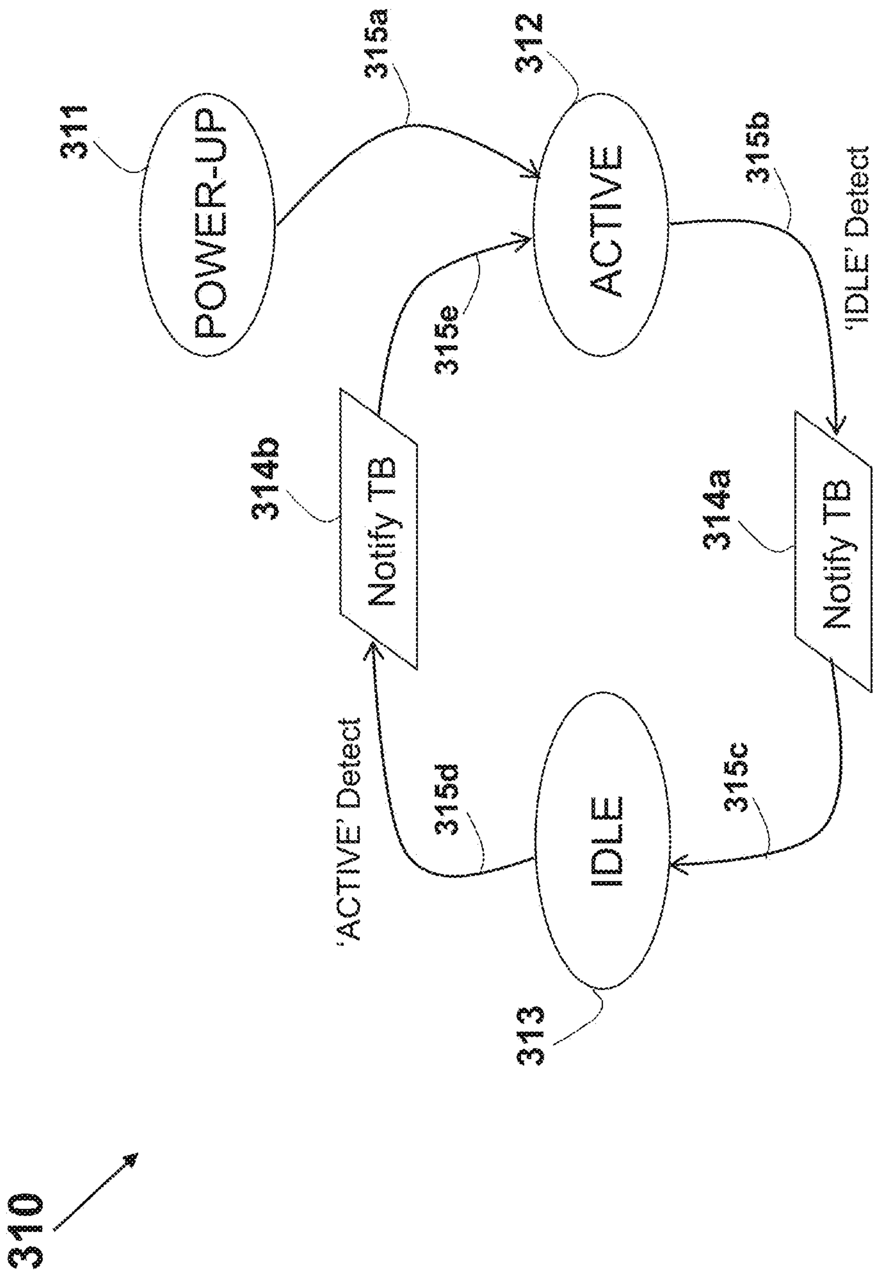
FIG. 31 (Prior Art)
FIG. 31 depicts schematically a state diagram of a tunnel device.

The selecting of the additional tunnel device #2 33*b* to be placed in the path between the tunnel device that embeds a device emulator, such as the Device Emulator 404*a*, and a web server, such as the Data Server #3 401*a*, may use any tunnel device selecting scheme, mechanism, algorithm, method, or criteria, and may be performed by any server device, such as the Support server 453, the TB server 71, the SP server 72, or by any client device such as the requesting client 31*a* or the Tunnel device #1 421*a*, or any combination thereof. In one example, the additional tunnel device (such as the additional tunnel device #2 33*b*) is selected from a group of tunnel devices that are in an IDLE state 313 of the state diagram 310 shown in FIG. 31.

Figure 14:
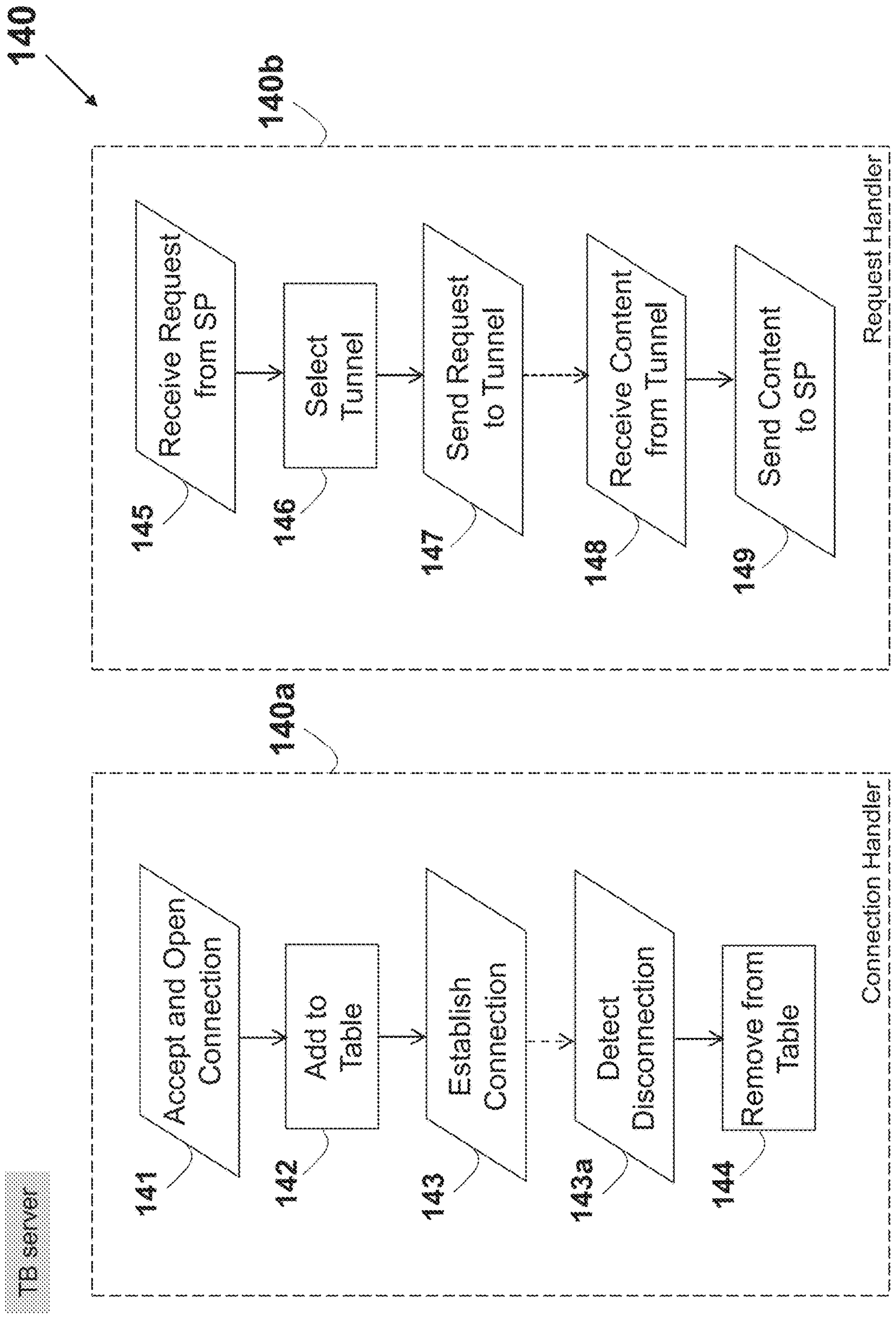
FIG. 14 (Prior Art)
FIG. 14 illustrates schematically a simplified flowchart relating to a TB server.
Figure 15:
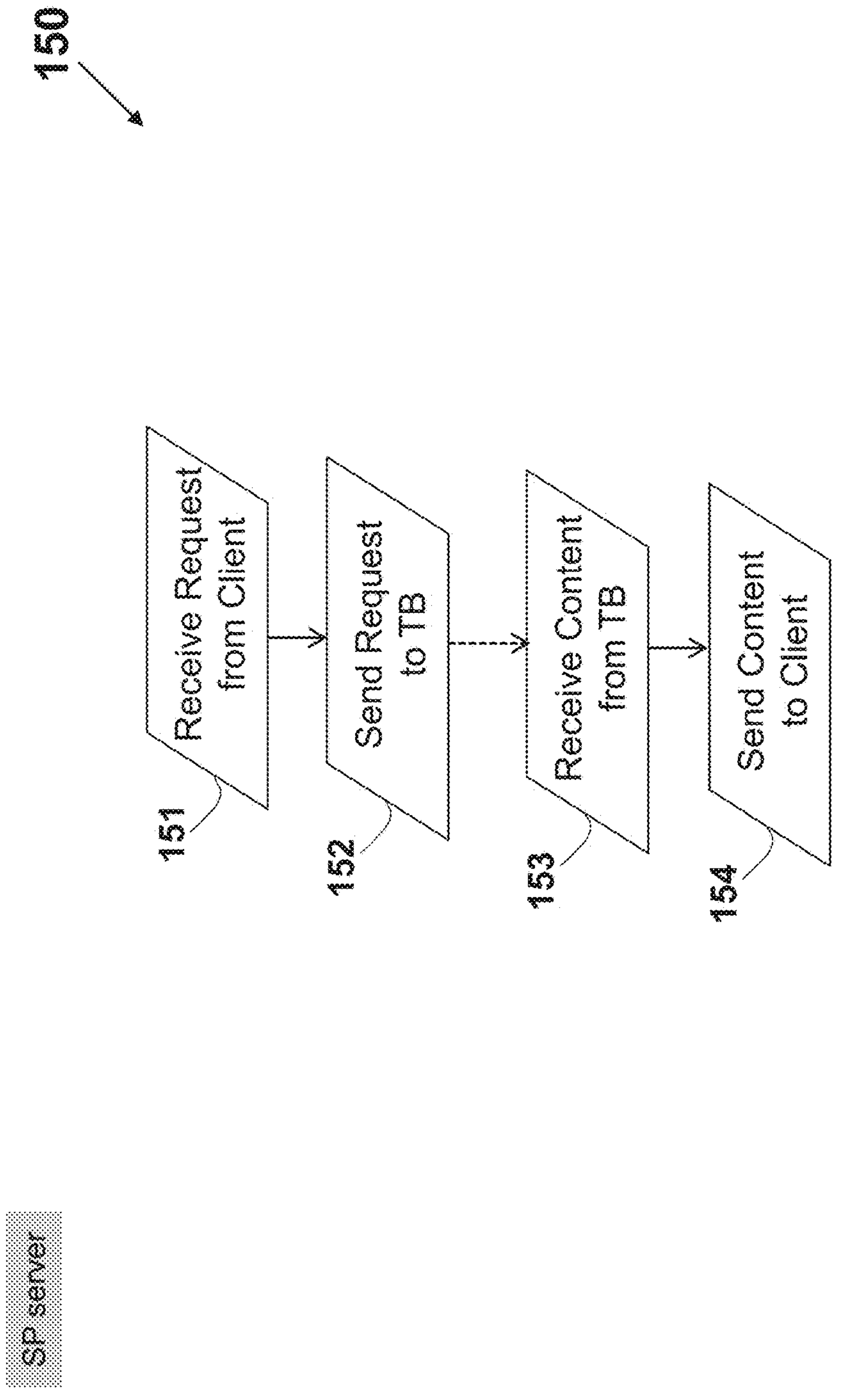
FIG. 15 (Prior Art)
FIG. 15 illustrates schematically a simplified flowchart relating to a SP server.
Figure 20:
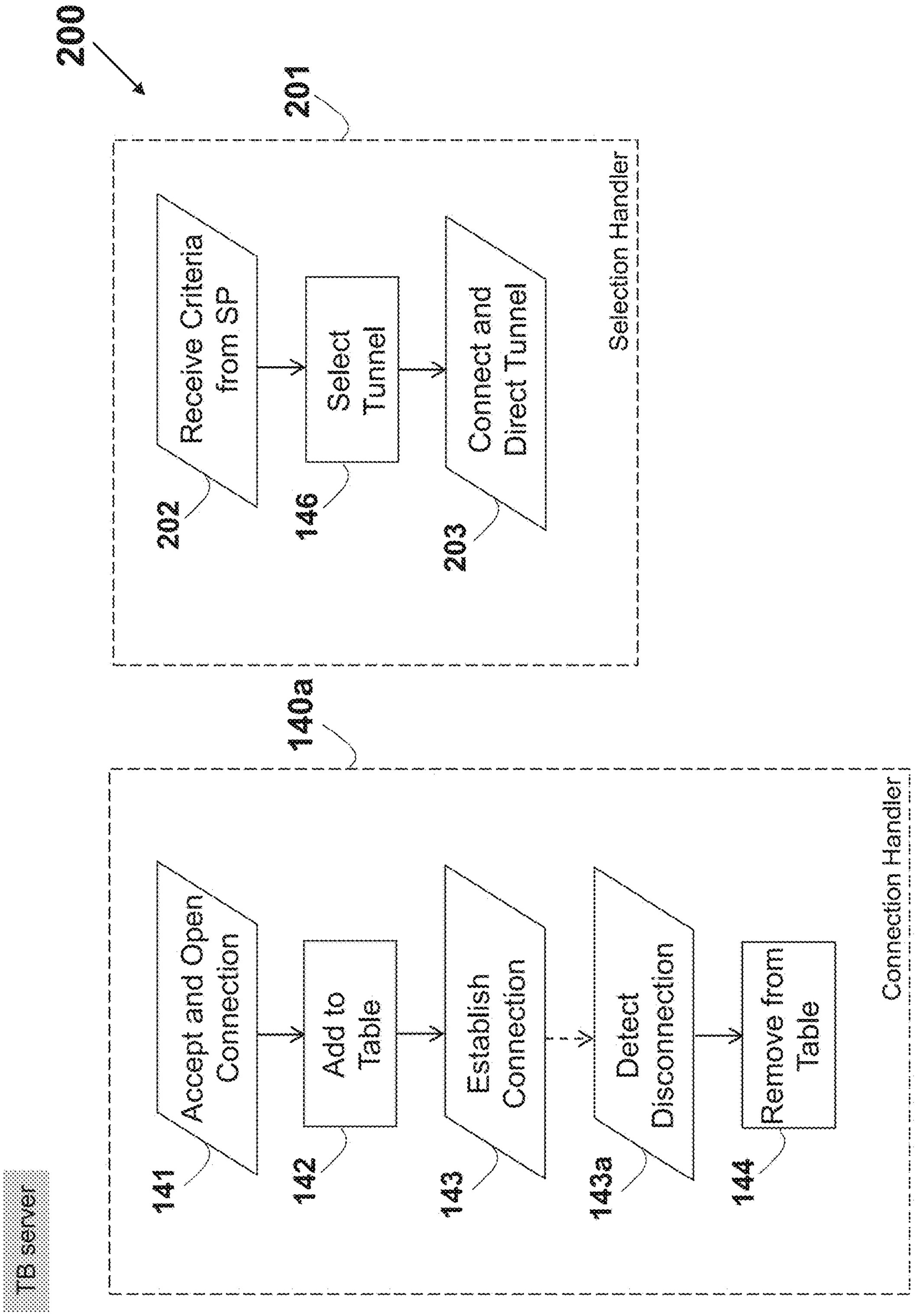
FIG. 20 (Prior Art)
FIG. 20 illustrates schematically another simplified flowchart relating to a TB server.
Figure 21:
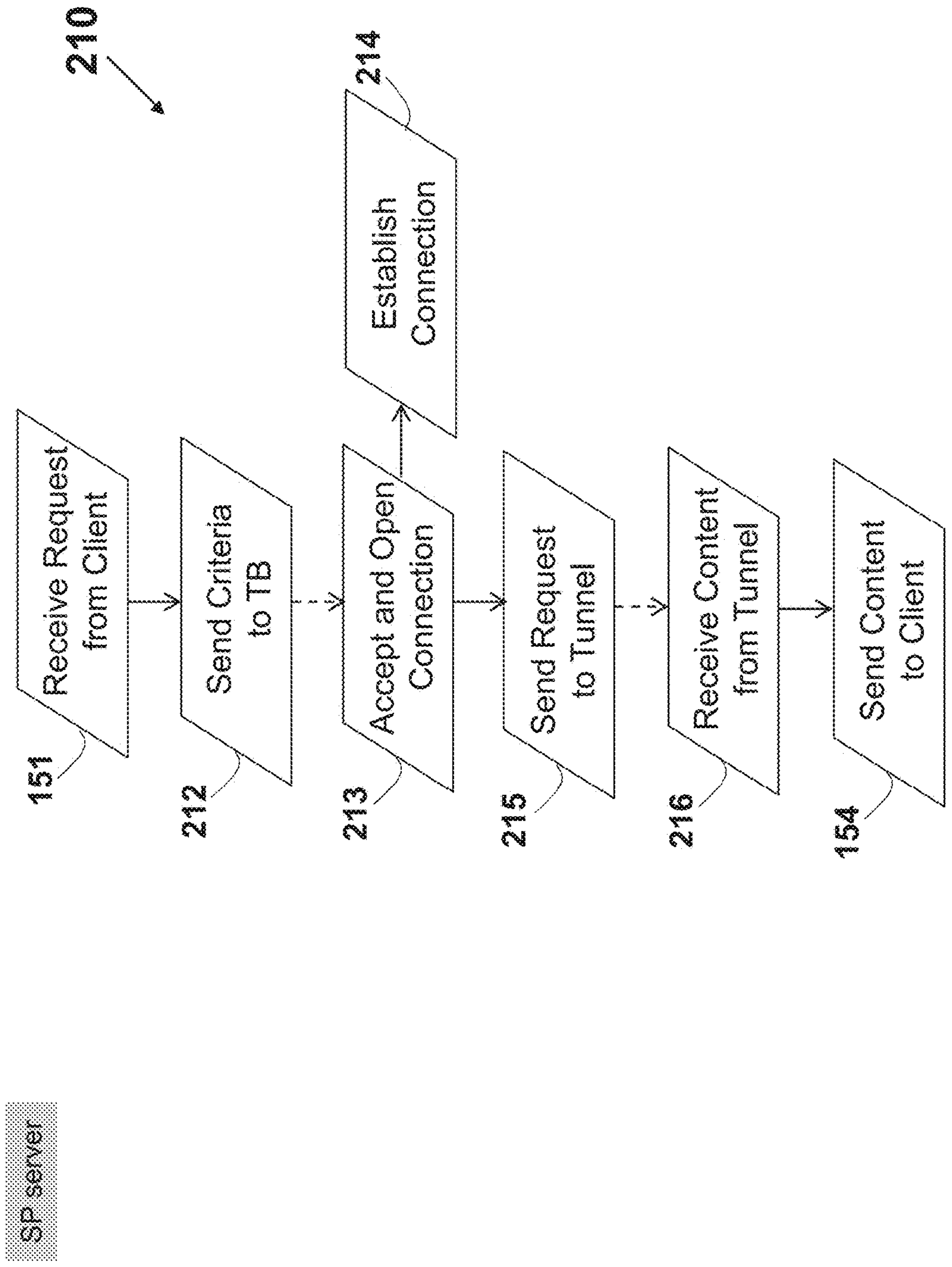
FIG. 21 (Prior Art)
FIG. 21 illustrates schematically another simplified flowchart relating to a SP server.

In one example, the selecting of the additional tunnel device (such as the additional tunnel device #2 33*b*) to be placed along the path between the tunnel device that embeds a device emulator, such as the Device Emulator 404*a*, and a web server, such as the Data Server #3 401*a*, may be based on, or may use the same as, similar to, or different from, the selecting step described in the "Tunnel Selection" step 83 shown as part of the flow chart 80 shown in FIG. 80, the selecting step described in the "Select Tunnel" step 146 shown as part of the flow chart 140*b* shown in FIG. 14, the selecting step described in the "Select Tunnel" step 146 shown as part of the flow chart 201 shown in FIG. 20, or any combination thereof. Further, any selection of a tunnel device, and any selected tunneling functionality, typically embedded in a 'tunnel device', may be according to U.S. Pat. No. 10,880,266 to Shribman et al., entitled: "System and Method for Improving Content Fetching by Selecting Tunnel Devices", according to U.S. Patent Application Publication No. 2022/0103525 to Shribman et al., entitled: "System and Method for Managing Non-Direct URL Fetching Service", according to U.S. Pat. No. 10,963,531 to Shribman et al. entitled: "System and Method for URL Fetching Retry Mechanism", according to in U.S. Pat. No. 9,241,044 to Shribman et al. entitled: "System and method for improving internet communication by using intermediate nodes", or in any combination thereof.

Figure 46C:
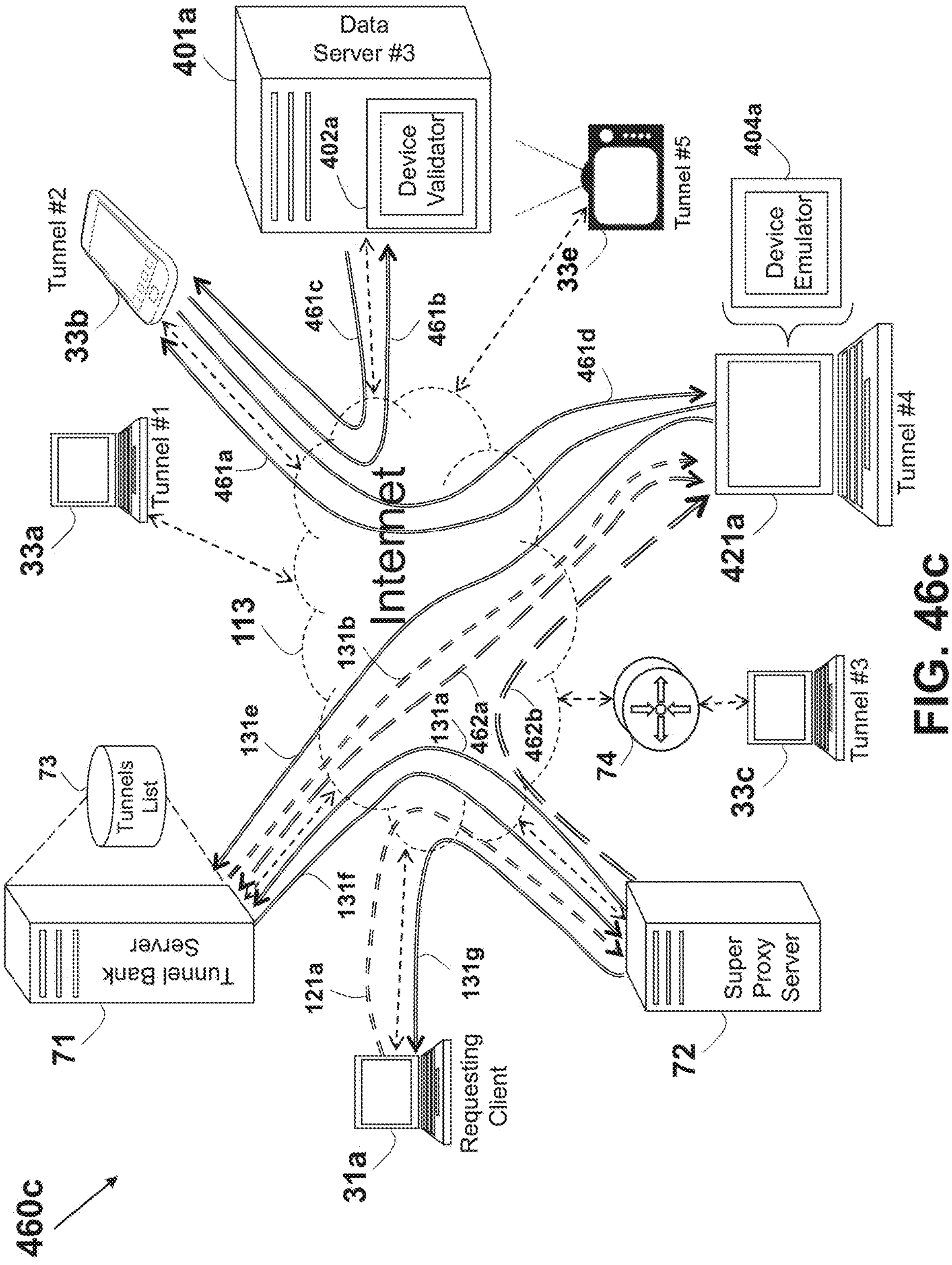
FIG. 46*c* depicts schematically messages exchanged over the Internet for fetching content from a limiting web server to the client device via the tunnel device that includes a Device Emulator functionality and a selected additional tunnel device.

An arrangement 460*c* shown in FIG. 46*c* examples selecting of the additional tunnel device by the TB server 71, for example from the list of available tunnel devices that are stored in the "Tunnels List" database 73. Using a communication path 462*a*, the Tunnel Device #4 421*a* sends a request for the additional tunnel, the TB server 71 selects an available tunnel, and sends the selected additional tunnel IP address as a response to the Tunnel Device #4 421*a*, to be used for sending the content request over the communication path 461*a*. Alternatively or in addition, the TB server 71 may send the selected additional tunnel identification to the SP server 72 over the communication path 131*f*, and in turn the SP server 72 sends the IP address of the additional device to the Tunnel Device #4 421*a* over a communication path 462*b*. Alternatively or in addition, the IP address of the tunnel address to use is sent to the Tunnel Device #4 421*a* as part of the content request received as part of the "Receive Request from TB" step 174 or the "Receive Request" step 174*a*. Further, the IP address of the additional tunnel device to use may be received from any device that sends the content request to the Tunnel Device #4 421*a*, either as part of the content request message or as a separate message.

Figure 46D:
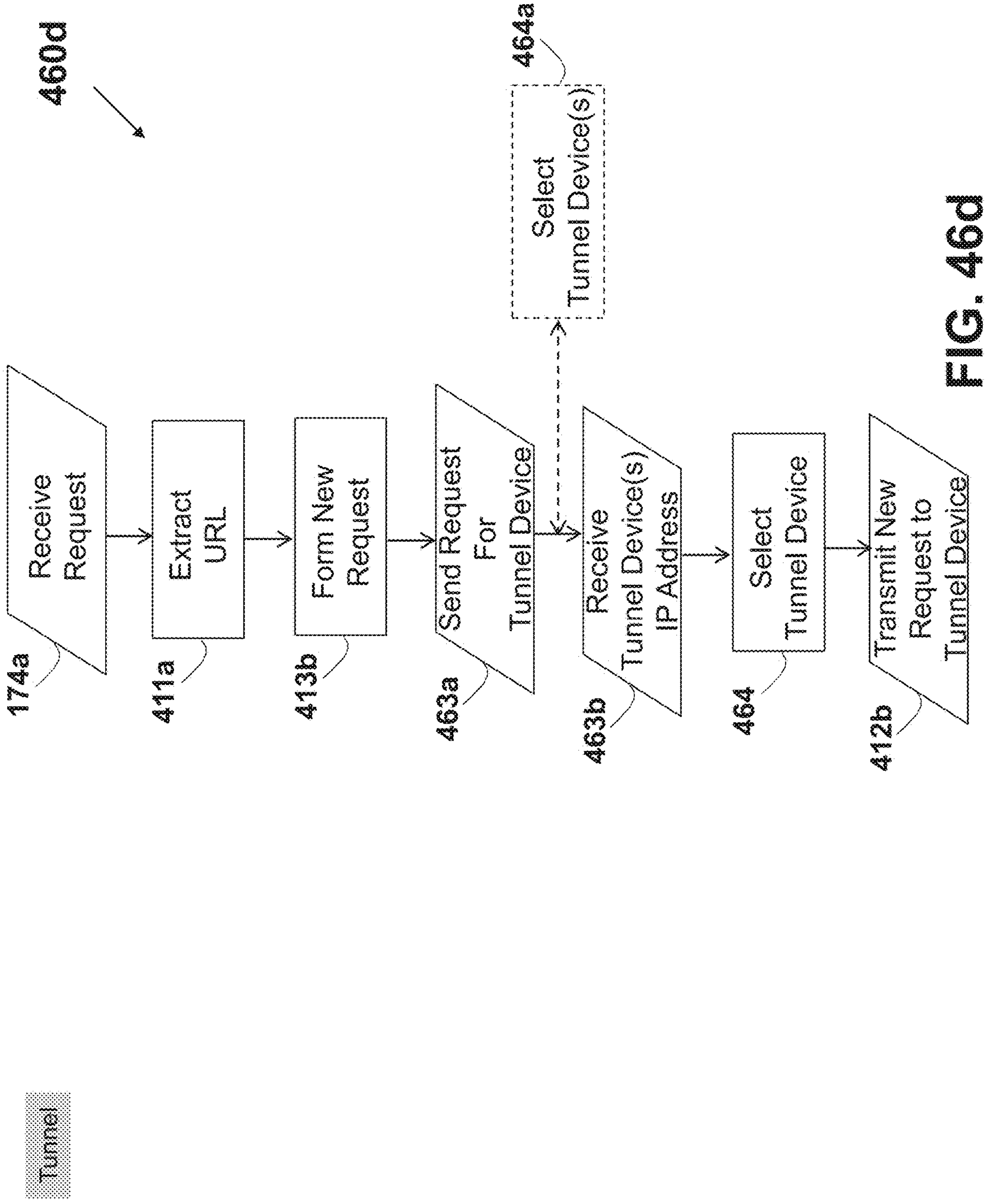
FIG. 46*d* illustrates schematically simplified flowcharts relating to implementing a User Emulator functionality when using a selected additional tunnel device.

A flow-chart 460*d* shown in FIG. 46*d* (that corresponds to the flow-chart 440*a* shown in the FIG. 44) illustrates steps by a tunnel device, such as the Tunnel Device #4 421*a*, to receive the IP address of the additional tunnel device to use. After (or before) a new request is formed as part of the "Form New Request" step 413*b*, the tunnel device, such as the Tunnel Device #4 421*a*, sends a request for IP address of additional tunnel device as part of a "Send Request For Tunnel Device" step 463*a*. While shown after the step of "Form New Request" 413*b*, the "Send Request For Tunnel Device" step 463*a* may be equally performed at any time before the actual sending of the request to the additional tunnel device as part of a "Transmit New Request to Tunnel Device" step 412*b*. The request sent as part of "Send Request For Tunnel Device" step 463*a* may be sent to the Support Server 453 over the communication path 452 in the arrangement 450 shown in FIG. 45, to the TB server 71 over the communication path 462*a* in the arrangement 460*c* shown in FIG. 46*c*, or to any other device. After the additional tunnel device is selected by any of the devices, such as by the TB server 71, as part of a "Select Tunnel Device(s)" step 464*a*, such as by using any criterion, it is sent as a response to the requesting tunnel device as part of a "Receive Tunnel Device(s) IP Address" step 463*b*, and used as a destination address as part of the "Transmit New Request to Tunnel Device" step 412*b*.

While exampled above regarding selecting and receiving a single IP address of a single additional tunnel device, the selection in the "Select Tunnel Device(s)" step 464*a* may equally include sending without selecting a list of all available tunnels, or selecting of a group of tunnel devices, where each of them may be used as an additional tunnel device, such as according to one or more criteria. In such a case, the requesting tunnel device may select a single additional tunnel device to use as part of a "Select Tunnel Device" step 464.

Any selecting of any IP address of an additional tunnel device from a list of IP addresses, such as in the "Select Tunnel Device" step 464 or in the "Select Tunnel Device(s)" step 464*a* in the flow-chart 460*d* shown in FIG. 46*d*, may be based on load balancing, and may be based on, or may be using, random, quazi-random, or deterministic selection. Alternatively or in addition, any selecting of any list from any multiple distinct lists or any selecting of any IP address from any selected list, may be based on, or may use, random selecting, that may use one or more random numbers generated by a random number generator. Any random number generator herein may be hardware based, and may be using thermal noise, shot noise, nuclear decaying radiation, photoelectric effect, or quantum phenomena. Alternatively or in addition, any random number generator herein may be software based, and may be based on executing an algorithm for generating pseudo-random numbers.

Further, any selecting of any IP address of an additional tunnel device from a list of IP addresses, such as in the "Select Tunnel Device" step 464 or in the "Select Tunnel Device(s)" step 464*a* in the flow-chart 460*d* shown in FIG. 46*d*, may be based on, or may use, Last-In-First-Out (LIFO) or First-In-First-Out (FIFO) scheme. Alternatively or in addition, any selecting herein of any IP address from any selected list may be based on, or may be using, sequential or cyclic selection. Further, any selection may be based on, or may use, a criterion, and any selecting herein may be based on, may be using, or may be in response to, the criterion. Any selecting herein of any list from any multiple distinct lists may be based on load balancing.

Any IP address herein may be associated with a value or with a value range of an attribute type. The value herein may comprise a numeric value or an identifier of a feature, an attribute, a characteristic, or a property of the attribute type, and any value range herein may comprise a numeric value range or identifiers of a feature, an attribute, a characteristic, or a property of the attribute type. Any attribute type herein may comprise a geographical location, and any value herein may comprise a name or an identifier of a continent, a country, a region, a city, a street, a ZIP code, or a timezone. Alternatively or in addition, any attribute type herein may comprise an Internet Service Provider (ISP) or Autonomous System Number (ASN), and any value herein may respectively comprise a name or an identifier of the ISP or the ASN number. Alternatively or in addition, any attribute type herein may correspond to a hardware of software of tunnel devices. Alternatively or in addition, any attribute type herein may correspond to a communication property, type, or feature of a communication link of any device, such as any tunnel devices. Alternatively or in addition, any attribute type herein may correspond to an operating system of any device, such as the tunnel devices. Alternatively or in addition, any attribute type herein may correspond to a RTT of the tunnel devices. Alternatively or in addition, any attribute type herein may correspond to a content type, and any value of the content type may comprise a video data, audio data, and no multimedia web-page. Any method herein may be used with multiple web servers, and any attribute type may correspond to a web server from the multiple web servers, and the values comprise an identifier of the web server, and any identifier herein may comprise an IP address of the web server, a domain name, a website name, or a URL.

Any server device herein, such as the SP server 72, the TB server 71, the Dedicated Boxes Manager server 345, the Proxy server 53, the Proxy Server 403, the DC Proxy Server 405, the Acceleration Server 32, the Support server 453, any other server herein, or any combination thereof, may be implemented as a dedicated device, such as stand-alone host computer that executes a server operating system. Alternatively or in addition, the functionalities provided by any server device herein, such as the SP server 72, the TB server 71, the Dedicated Boxes Manager server 345, the Proxy server 53, the Proxy Server 403, the DC Proxy Server 405, the Acceleration Server 32, the Support server 453, any other server herein, or any combination thereof, may be part of a cloud-based service, where the server device is implemented as Infrastructure as a Service (IaaS) or as a Software as a Service (SaaS) (or as a Platform as a Service (PaaS)), providing the benefits of a cloud based computing, such as consolidation, virtualization, better cost, reliability, level of service, and automation. One benefit involves balancing between off-premises and on-premises cloud storage options, or a mixture of the two options, depending on relevant decision criteria that is complementary to initial direct cost savings potential. The IaaS, the SaaS, the PaaS, or the cloud may be provided by a public-cloud providers, such as by Amazon AWS, Microsoft Azure, and Google GCP.

Any identification of any content or URL request herein may be intercepted and routed to be handled as part of the 'client' application or process. Such interception may be in the form of a filter driver (or any other intermediate driver), enabling the interception as part of the OS kernel. Alternatively or in addition, the interception may be in the form of an extension or a plug-in of the requesting application, such as a browser plug-in or a browser extension in the case where the application is a web browser. Alternatively or in addition, the interception of the request may use hooking of the requesting application, or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), data copy, a DDE protocol, or mailslots.

Any IP address may be selected based on estimated as being in the same area as the client device, the web server, or both. Any IP address may be selected based on estimated as being in the same continent, country, state, region, city, postal/zip code, latitude, longitude, or Timezone as the client device or the web server. Alternatively or in addition, any IP address may be selected based on being the recent one to be selected, or based on being the least recent to be selected. Alternatively or in addition, any IP address may be manually selected by the user, and any method herein may further comprise displaying to the user the multiple IP addresses, and selecting, by the user, the selected IP address from the group.

Each of the devices denoted herein as servers, such as the proxy server 53, the DC proxy server 56, the SP server 72, the TB server 71, the web server 22*b*, or the dedicated tunnel 33*a* (when implemented as a server), may function as a server in the meaning of client/server architecture, providing services, functionalities, and resources, to other devices (clients), commonly in response to the clients' request. Each of the server devices may further employ, store, integrate, or operate a server-oriented operating system, such as the Microsoft Windows Server® (2003 R2, 2008, 2008 R2, 2012, or 2012 R2 variant), Linux™ (or GNU/Linux) variants (such as Debian based: Debian GNU/Linux, Debian GNU/kFreeBSD, or Debian GNU/Hurd, Fedora™, Gentoo™, Linspire™, Mandriva, Red Hat® Linux available from Red Hat, Inc. headquartered in Raleigh, North Carolina, U.S.A., Slackware®, SuSE, or Ubuntu®), or UNIX®, including commercial UNIX® variants such as Solaris™ (available from Oracle Corporation headquartered in Redwood City, California, U.S.A.), AIX® (available from IBM Corporation headquartered in Armonk, New York, U.S.A.), or Mac™ OS X (available from Apple Inc. headquartered in Cupertino, California, U.S.A.), or free variants such as FreeBSD®, OpenBSD, and NetBSD®. Alternatively or in addition, each of the devices denoted herein as servers, may equally function as a client in the meaning of client/server architecture.

Devices that are not denoted herein as servers, such as client devices (such as the client device 31*a*) or any of the tunnel devices (including the dedicated tunnel 33*a* when implemented as a server or as a dedicated box)), may typically function as a client in the meaning of client/server architecture, commonly initiating requests for receiving services, functionalities, and resources, from other devices (servers or clients). Each of the devices may further employ, store, integrate, or operate a client-oriented (or end-point dedicated) operating system, such as Microsoft Windows® (including the variants: Windows 7, Windows XP, Windows 8, Windows 8.1, Windows 10, and Windows 11, available from Microsoft Corporation, headquartered in Redmond, Washington, U.S.A.), Linux, and Google Chrome OS available from Google Inc. headquartered in Mountain View, California, U.S.A. Further, each of these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), and later variants, iOS (available from Apple Inc., and includes variants such as versions 3-15), Windows® Phone (available from Microsoft Corporation and includes variants such as version 7, version 8, version 9, or version 10), or Blackberry® operating system (available from BlackBerry Ltd., headquartered in Waterloo, Ontario, Canada). Alternatively or in addition, each of the devices that are not denoted herein as servers, may equally function as a server in the meaning of client/server architecture.

Figure 16:
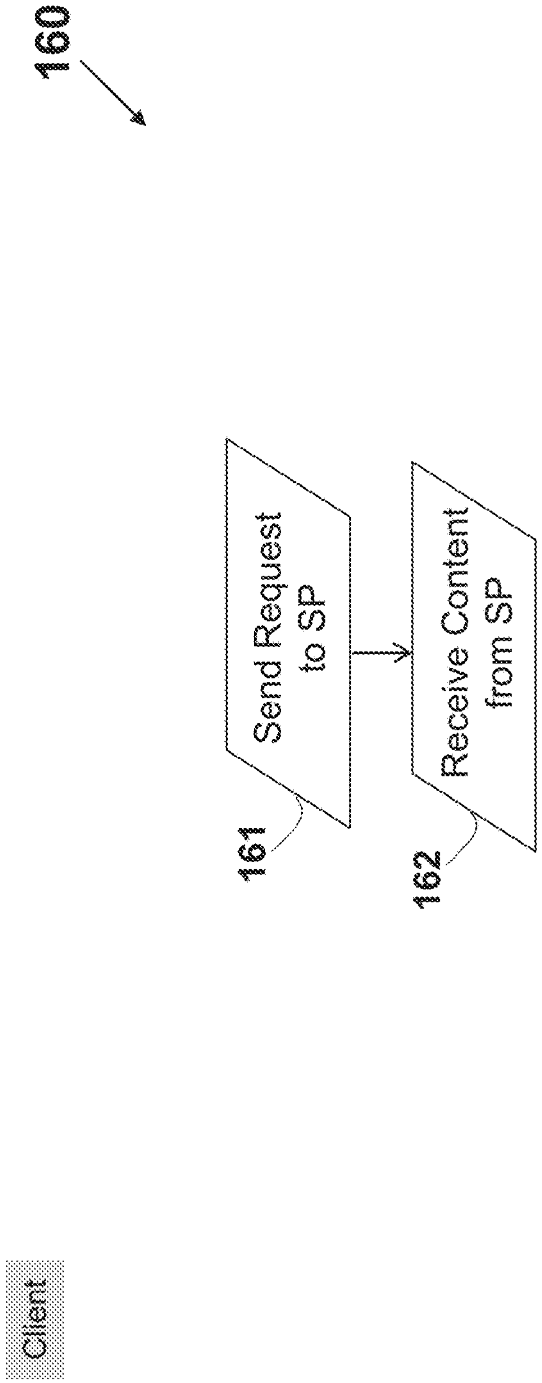
FIG. 16 (Prior Art)
FIGS. 16 and 16*a* illustrate schematically simplified flowcharts relating to a client device.
Figure 16A:
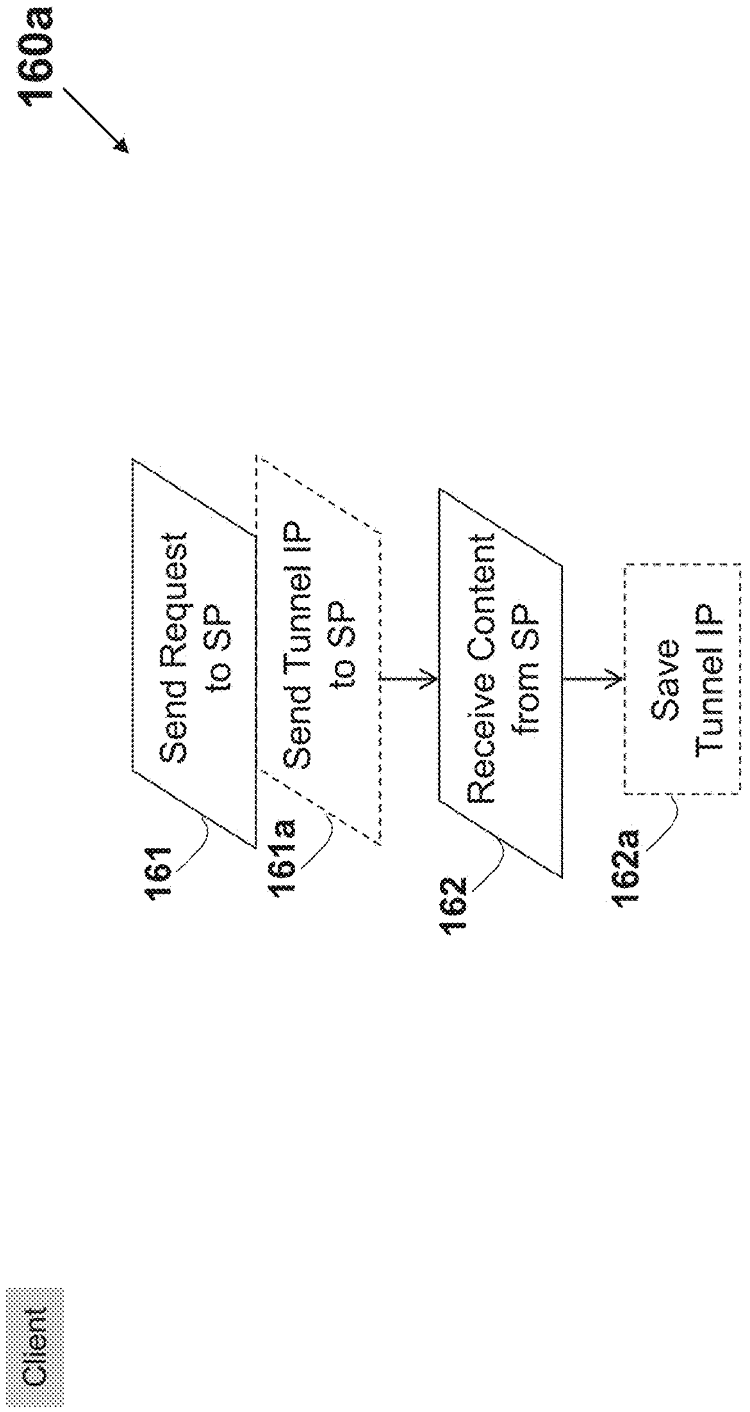
FIG. 16a (Prior Art)

The method and system described herein allows for a client device (such as the client device 31*a* operation described in the flow chart 160 in FIG. 16 or the flow chart 160*a* in FIG. 16*a*) to effectively fetch content from a data server (such as the web server 22*b*). The method and system may be used by the client device for supporting an application, such as a web browser application, when the application is requesting content from the Internet in general, and from a data server in particular. The request for Internet-related content may be intercepted by the 'client' application and process, initiating the client flowchart 160 shown in FIG. 16, or the flowchart 160*a* shown in FIG. 16*a*. In one example, the client device uses a communication-related application to be used by the application when no 'client' application is present, such as HTTP stack handling application. The request from the requesting application to the communication-related application is intercepted and routed to be handled as part of the 'client' application or process. Such interception may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), a data copy, a DDE protocol, or mailslots.

Examples of web browsers include Microsoft Internet Explorer (available from Microsoft Corporation, headquartered in Redmond, Washington, U.S.A.), Google Chrome which is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A), Opera Mini™ (developed by Opera Software ASA, headquartered in Oslo, Norway), and Android web browser.

Any communication between any two nodes may use the Socket Secure (SOCKS), WebSocket (ws), which may be WebSocket Secure (wss), or HTTP Proxy protocol. Further, any communication between any two nodes may use the HTTP or HTTPS protocol, and may be based on, may comprise, or may consist of, HTTP/1.1, HTTPS, HTTP/2, HTTP/3, or any combination thereof.

In one example, a communication between the client device 31*a* or any tunnel device (such as the tunnel #1 33*a*, the tunnel #2 33*b*, the tunnel #3 33*c*, the tunnel #4 33*d*, or the tunnel #5 33*e*) and any server, such as the TB server 71, the SP server 72, or the Web Server 22*b*, may use the SOCKS, WebSocket or HTTP Proxy protocol, wherein the respective device, such as the client device 31*a* or the tunnel device, executes the respective SOCKS, WebSocket or HTTP Proxy client-side protocol, and the respective server executes the respective SOCKS, WebSocket or HTTP Proxy server-side protocol. Alternatively or in addition, the respective device, such as the client device 31*a* or the tunnel device, executes the respective SOCKS, WebSocket or HTTP Proxy server-side protocol, and the respective server executes the respective SOCKS, WebSocket or HTTP Proxy client-side protocol. Further, a communication between the client device 31*a* or any tunnel device (such as the tunnel #1 33*a*, the tunnel #2 33*b*, the tunnel #3 33*c*, the tunnel #4 33*d*, or the tunnel #5 33*e*) and any server, such as the TB server 71, the SP server 72, or the Web Server 22*b*, may use the HTTP (or HTTPS) protocol, wherein the respective device, such as the client device 31*a* or the tunnel device, executes the HTTP (or HTTPS) client-side protocol, and the respective server executes the HTTP (or HTTPS) server-side protocol. Alternatively or in addition, the respective device, such as the client device 31*a* or the tunnel device, executes the HTTP (or HTTPS) server-side protocol, and the respective server executes the HTTP (or HTTPS) client-side protocol.

The term 'network element' (or 'element') or 'network node' (or 'node') is used herein to include, but not limited to, the client device 31*a*, a tunnel device (such as the tunnel device #1 33*a*), the proxy server 53, the DC proxy server 56, the SP server 72, the TB server 71, or a web server (such as the web server #1 22*a*). Any memory, storage, database, or cache mentioned herein may consist of, comprise, use, or be included in, the local cache as described in U.S. Pat. No. 8,135,912 to Shribman et al., entitled: "System and Method of Increasing Cache Size".

Any device, component, or apparatus herein, may be structured as, may be shaped or configured to serve as, or may be integrated with, a wearable device. In one example, any one or more of the tunnel devices herein, such as the tunnel device #1 33*a*, the tunnel device #2 33*b*, or the tunnel device #3 33*c*, may consist of, may comprise, may be integrated with, or may be part of, a wearable device. Similarly, any one or more of the client devices herein, such as the client device #1 31*a*, or the client device #2 31*b*, may consist of, may comprise, may be integrated with, or may be part of, a wearable device. Any wearable device or any apparatus or device herein may be wearable on an organ such as on the person's head, and the organ may be an eye, ear, face, check, nose, mouth, lip, forehead, or chin. Alternatively or in addition, wearable device or any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releasably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

Any method herein may provide anonymity to users in the Internet, such as in order not to be identified as a publisher (sender), or reader (receiver), of information. For example, the provided anonymity may be used to overcome censorship at the local, organizational, or national level, or to support personal privacy preferences such as preventing tracking or data mining activities, where the material or its distribution may be considered illegal or incriminating by possible eavesdroppers, the material may be legal but socially deplored, embarrassing, or problematic in the individual's social world, and fear of retribution (against whistleblowers, unofficial leaks, and activists who do not believe in restrictions on information nor knowledge). An anonymous web browsing herein may refer to browsing the World Wide Web while hiding the user's IP address and any other personally identifiable information from the websites that one is visiting. In one example, an anonymous web browsing may be useful to Internet users who want to ensure that their sessions cannot be monitored. For instance, it is used to circumvent traffic monitoring by organizations that want to find out or control which web sites employees visit. Further, since some web-sites respond differently when approached from mobile devices, anonymity may allow for accessing such a web-site from a non-mobile device, posing as a mobile device.

Any system or device herein may use a virtualization. Any system or device herein may further comprise a Virtual Machine (VM) executing a virtualized application. Any device herein, or any part thereof, such as the client device, the web server, at least one of the tunnel devices, the first server, or the second server, may be implemented as virtual hardware as part of the VM. At least one of any action or step herein by any device may be executed as part of the virtualized application.

Any network herein may be used with a virtualization, and any network herein may be executed as a virtualized network as part of a Virtual Machine (VM). The virtualization may be implemented by a host computer that may implement the VM, and any method herein may further comprise executing, by the host computer, a hypervisor or a Virtual Machine Monitor (VMM), and the virtualized may use or interface virtual hardware. Any virtualization herein may include, may be based on, or may use, full virtualization, para-virtualization, or hardware assisted virtualization. For example, any communication between two entities selected from a group consisting of the client device, the web server, at least one of the multiple tunnel devices, the first server, and the second server, may be executed as a virtualized network as part of a Virtual Machine (VM).

Any method herein, any step herein, any flow-chart herein, or any part thereof, may be used with a virtualization, and at least one of the steps or methods herein may be executed as part of a virtualized application as part of a Virtual Machine (VM). Any device herein, such as any tunnel device, the first device, or any part thereof, may be implemented as virtual hardware. Any virtualization herein may be used with a host computer that implements the VM, and may further comprising executing, by the host computer, a hypervisor or a Virtual Machine Monitor (VMM). Any virtualized application herein or any or hardware virtualization herein may use or may interface virtual hardware. Any virtualization herein may include, may be based on, or may use, full virtualization, para-virtualization, or hardware assisted virtualization.

Any operating system herein may be used with a virtualization, and any operating system herein may be executed as a guest operating system as part of a Virtual Machine (VM). The virtualization may be implemented by a host computer that may implement the VM, and any method herein may further comprise executing, by the host computer, a hypervisor or a Virtual Machine Monitor (VMM), and the guest operating system may use or interface virtual hardware. Any such virtualization herein may include, may be based on, or may use, full virtualization, para-virtualization, or hardware assisted virtualization.

Any element or entity herein, such as the client device, the web server, at least one of the multiple tunnel devices, the first server, and the second server, may be implemented as virtualized entity. Any virtualization may include, may be based on, or may use, desktop virtualization, network virtualization, storage virtualization, application virtualization, server virtualization, or any combination thereof. Further, any virtualization herein may include, may be based on, or may use, full virtualization, para-virtualization, or hardware assisted virtualization. Further, any virtualization herein may include, may be based on, or may use, a Virtual Machine (VM) on a host computer that executes a hypervisor or Virtual Machine Monitor (VMM), and the operating system may be a guest operating system that may use or interface a virtual hardware.

Any method herein may be used with a virtualization, where at least one of the steps may be executed as part of a virtualized application as part of a Virtual Machine (VM). Alternatively or in addition, the client device or any part thereof, the web server or any part thereof, at least one of the multiple tunnel devices or any part thereof, the first server or any part thereof, or the second server or any part thereof, may be implemented as virtual hardware. Further, any method herein may be used with a host computer that may implement the VM, and any method herein may further comprise executing, by the host computer, a hypervisor or a Virtual Machine Monitor (VMM), and any virtualized application herein or any hardware herein may use or may interface virtual hardware. Any virtualization herein may include, may be based on, or may uses, full virtualization, para-virtualization, or hardware assisted virtualization. At least two devices that may be selected from a group consisting of the client device, the web server, at least one of the multiple tunnel devices, the first server, and the second server, may be implemented as virtual hardware, and the at least two devices may be virtualized by the same host computer that implements the VM.

Any functionalities, devices, systems, modules, or any apparatuses described herein may be used in a vehicle or in a vehicular environment, and may be part of, integrated with, or connect to, automotive electronics in the vehicle. A vehicle is typically a mobile unit designed or used to transport passengers or cargo between locations, such as bicycles, cars, motorcycles, trains, ships, aircrafts, boats, and spacecrafts. The vehicle may be travelling on land, over or in liquid such as water, or may be airborne. Further, any vehicle herein may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The apparatuses described herein may be used to control, monitor or otherwise be part of, or communicate with, the vehicle motion system. Similarly, any apparatus described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically, automobiles have four wheels, and are constructed to principally transport people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

Any set or list of steps described herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

As used herein, the term "parallel" in the content of two time periods means that the two time periods are at least partly overlapping. In the content of parallel executing of actions, operations, or activities (such as processes, tasks, or transfers), the term "parallel" means the time periods associated with the actions or activities, are at least partly overlapping. For example, parallel actions may include a case where a second action is initiated before the first action is completed. Any parallel action, activity, or operation herein may use multitasking or multiprocessing, or otherwise using common or separate processing resources. Any parallel executing of actions, operations, or activities may be independent or dependent, such as by using shared resources. A time period of an action, operation, or activity starts when the action or activity is initiated, and ends when the action, operation, or activity is completed. In one example, the completion is defined by an event, action, or occurrence that is responsive to the action, operation, or activity. For example, a content fetching action may be completed when the content request is transmitted to the Internet by the requesting device, when the content request reaches or is received by another device, or when the requested content (or a failure status response) is received by the requesting device.

For example, any two actions or steps of sending, any two actions or steps of receiving, any two actions or steps of selecting, any two actions or steps of processing, or any combination thereof, may be performed in full or in part in parallel by the same entity (e.g., server, client, or tunnel) or separated entities, using multitasking or multiprocessing. Similarly, any steps of sending and receiving, sending and selecting, sending and processing, receiving and selecting, receiving and processing, or any combination thereof, may be performed in full or in part in parallel by the same entity (e.g., server, client, or tunnel) or separated entities, using multitasking or multiprocessing. The term 'sequential' herein means not in parallel, such as when two time periods are not overlapping, but rather follow each other without any overlapping.

Any selecting of an element (or multiple elements) from a collection or a group of elements herein, such as the selecting of a tunnel device (for example, by selecting its associated IP address) as part of the "Tunnel Selection" step 83 shown as part of the flow chart 80 or the "Select Tunnel" step 146 shown as part of the flow chart 140*b*, as well as any other selection herein, may be based on random, quazi-random, or deterministic selection. Similarly, the selection of a sub-group or a label (such as VIP label) may be based on random, quazi-random, or deterministic selection. Similarly, in case of availability of multiple proxy servers such as the proxy server 53, the selection of the proxy server to use may be based on random, quazi-random, or deterministic selection. Similarly, the selection of a sub-group or a label (such as VIP label) may be based on random, quazi-random, or deterministic selection. Similarly, the selecting of IP address from the IP addresses list 59 by the DC proxy server 56, may be based on random, quazi-random, or deterministic selection. Similarly, the selection of a sub-group or a label (such as VIP label) may be based on random, quazi-random, or deterministic selection.

Any selection herein of any IP address from any list, any selection of any device from any list, or any selection of any scheme, such as any fetching scheme, may be based on, or may use, load balancing. Further, any selection herein of any IP address from any list may be based on, or may use, random selection. Any random selection herein may use, or may be based on, one or more random numbers generated by a random number generator, and the random number generator may be hardware based, software based, or any combination thereof. Any random number generator herein may be using thermal noise, shot noise, nuclear decaying radiation, photoelectric effect, or quantum phenomena. Alternatively or in addition, any random number generator herein may be based on executing an algorithm for generating pseudo-random numbers.

Using random selection may allow for load balancing, preferably by equally distributing the workload across the elements, which may optimize resource use, maximize throughput, minimize response time, and avoid overload of any single resource. The randomness may be based on using a random signal generator. The random signal generator may be based on a digital random signal generator having a digital output. Alternatively, the random signal generator may be based on analog random signal generator having an analog output. Analog random signal generator may use a digital random signal generator whose output is converted to analog using analog to digital converter, or can use a repetitive analog signal generator (substantially not synchronized to any other timing in the system) whose output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers.

Alternatively or in addition, the selection may be deterministic based. In one example, the elements to select from are listed in an orderly fashion, such as according to a feature, attribute, or a characteristic, using their associated numerical value (e.g., IP address value), according to their alphanumeric identifier (e.g., host name or location name in ASCII value), according to the order that joined the collection or group, or according to the order they were formerly selected from the group or collection. In such a case, the elements are sequentially selected according to the list order. In one example, a LIFO (last in first out) like scheme may be used, where the lastly selected entity is re-selected, and upon its unavailability, the one entity that was selected before the last is selected. Alternatively or in addition, a FIFO (first in first out) like scheme is used, where the oldest formerly selected entity is selected.

Any input from a human user herein may use an input component that comprises, or consists of, a piece of computer hardware equipment used to provide data and control signals to an information processing system such as a computer or information appliance. Such input component 18 may be an integrated or a peripheral input device (e.g., hard/soft keyboard, mouse, resistive or capacitive touch display, etc.). Examples of input components include keyboards, mouse, scanners, digital cameras, and joysticks. Input component 18 can be categorized based on the modality of input (e.g., mechanical motion, audio, visual, etc.), whether the input is discrete (e.g. pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input components used to specify a position in space, can further be classified according to whether the input is direct or indirect. With direct input, the input space coincides with the display space, i.e., pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). Direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned. Further, the input component 18 may include dedicated hard controls for frequently used/accessed functions (e.g., repeat system message).

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions cause the processor to perform the one or more of the methods or steps described herein.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for a software compatibility with variants of Unix and other operating systems, such as POSIX.1-2008 that is simultaneously IEEE STD. 1003.1™ 2008 entitled: "*Standard for Information Technology—Portable Operating System Interface* (*POSIX*®) *Description*", and The Open Group Technical Standard Base Specifications, Issue 7, IEEE STD. 1003.1™, 2013 Edition.

Any server, client, tunnel, or other device herein, such as the SP server 72, the TB server 71, the proxy server 53, the DC proxy server 56, the client device 31*a*, the tunnel device #1 33*a*, the tunnel device #2 33*b*, the tunnel device #3 33*c*, the tunnel device #4 33*d*, the tunnel device #5 33*e*, or any combination thereof, may execute part of, or whole of, any one or more of the JavaScript program modules, subroutines, programs, or functions included in U.S. Provisional Application Ser. No. 62/809,847, which was filed on Feb. 25, 2019, in U.S. Provisional Application Ser. No. 62/855,036, which was filed on May 31, 2019, and in U.S. Provisional Application Ser. No. 62/948,265.

Any standard mentioned herein includes any version or variant of this standard, and any combination of such variants or versions. The term "HTTP" herein includes any variants and versions of HTTP, such as HTTP/1.1, HTTPS, HTTP/2, HTTP/3, or any combination thereof. For example, any request herein may comprise, may include, may consists of, or may be based on, HTTP/1.1 request, HTTPS request, HTTP/2 request, HTTP/3 request, or any combination thereof. For example, any client device herein may form and send a HTTP/1.1 request, HTTPS request, HTTP/2 request, HTTP/3 request, or any combination thereof, and any server herein may respond to received HTTP/1.1 request, HTTPS request, HTTP/2 request, HTTP/3 request, or any combination thereof. Deploying HTTPS also allows the use of HTTP/2 (or its predecessor, the now-deprecated protocol SPDY), that are new generations of HTTP, designed to reduce page load times and latency. HTTP Strict Transport Security (HSTS) is typically used with HTTPS to protect users from man-in-the-middle attacks, especially SSL stripping. While HTTPS URLs begin with "https://" and use port 443 by default, or alternatively 8443, the HTTP URLs begin with "http://" and use port 80 by default, and HTTP is not encrypted and is thus vulnerable to man-in-the-middle and eavesdropping attacks, which can let attackers gain access to website accounts and sensitive information, and modify webpages to inject malware or advertisements. HTTPS is designed to withstand such attacks and is considered secure against them (with the exception of older, deprecated versions of SSL).

Any device herein, such as the first device, may consist of, may comprise, may be part of, or may be integrated with, a server device, which may consist of, may comprise, may be part of, or may be integrated with, a proxy server. Any proxy server may consist of, may comprise, may be part of, or may be integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a SOCKS proxy server, a CGI web proxy server, a suffix proxy server, an I2P anonymous proxy server, a DNS proxy server, or any combination thereof.

Any device, such as client device or a server device, or network element herein may comprise, consist of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

Any system or apparatus herein may further be operative for storing, operating, or using, an operating system. Any system herein may comprise a Virtual Machine (VM) for virtualization, and the operating system may be executed as a guest operating system. Any system herein may further comprise a host computer that implements the VM, and the host computer may be operative for executing a hypervisor or a Virtual Machine Monitor (VMM), and the guest operating system may use or may interface virtual hardware. Any virtualization herein, such as any operating system virtualization, may include, may be based on, or may use, full virtualization, para-virtualization, or hardware assisted virtualization.

Unless otherwise dictated by the context or specifically disclosed in the text, any of the steps, functions, operations, or processes herein, such as any of the steps in any of the flow-charts herein, is performed automatically, typically by a processor under software or firmware control, in the respective device, without any intervention by a human operator or user. Further, any shifting between states, steps, functions, operations, or processes herein, such as shifting between any of the steps in any of the flow-charts herein, is performed automatically, typically by a processor under software or firmware control in the respective device, without any intervention by a human operator or user.

Unless otherwise noted, the terms "connected to" and "coupled to" (and their derivatives), as used herein, are to be construed as permitting both direct and indirect (i.e., via other elements or components) connection. In addition, the terms "a" or "an" as used in the specification and claims, are to be construed as meaning "at least one of.". Further, for case of use, the terms "including" and "having" (and their derivatives), as used in the specification and claims, are interchangeable with and have the same meaning as the word "comprising."

The term 'host' or 'network host' is used herein to include, but not limited to, a computer or other device connected to a computer network, such as the Internet. A network host may offer information resources, services, and applications to users or other nodes on the network, and is typically assigned a network layer host address. Computers participating in networks that use the Internet Protocol Suite may also be called IP hosts, and computers participating in the Internet are called Internet hosts, or Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address autoconfiguration methods. Network hosts that participate in applications that use the client-server model of computing, are classified as server or client systems. Network hosts may also function as nodes in peer-to-peer applications, in which all nodes share and consume resources in an equipotent manner.

As used herein, the term 'consumer' includes, without limitation, an individual person, a group of individuals, a corporation, a business, a government entity, or any other entity who buys, orders, purchases, uses, or any combination thereof, of goods or services for their own use, such as for personal, social, family, household, or similar needs. As used herein, the term 'client device' includes, without limitation, any consumer computer, that may be a fixed computing device, such as a personal computer or a computer workstation, or may be a Portable Digital Assistant (PDA), a mobile telephone, a smartphone, a wearable device, a smart watch, an electronic eyewear, a laptop computer, a tablet computer, or any combination of the aforementioned devices. A 'user' herein refers to a consumer that owns and/or operates a consumer computer.

As used herein, the term 'server device' includes, without limitation, any device that is not a client device and is not a consumer computer, but includes a computer or device that manages network resources. Server devices are typically dedicated devices, as they perform no other tasks besides their server task or functionality. Typically, a server device remains continuously online with greater availability and maximum up time to receive requests almost all of the time (switching off servers can be catastrophic to a network); efficiently processes multiple requests from multiple client devices at the same time; generates various logs associated with the client devices and traffic from/to the client devices; primarily interfaces and responds to requests from client devices (often without any user intervention and without any Graphical User Interface (GUI)), has greater fault tolerance and higher reliability with lower failure rates; provides scalability for increasing resources to serve increasing client demands; or any combination thereof.

The arrangements and methods described herein may be implemented using hardware, software or a combination of both. Any integration herein refers to hardware integration, software integration, and any combination thereof. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein is used herein to include as applicable, but not limited to, a software integration, a hardware integration, or any combination thereof.

Any networking protocol may be utilized for exchanging information between the network elements (e.g., clients, tunnels, peers, servers) within the network (such as the Internet). For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies. Any network herein, such as the first network or the second network, may be implemented as a virtualized network as part of a Virtual Machine (VM). Any system herein may comprise a host computer that implements the VM. The host computer may further be operative for executing a hypervisor or a Virtual Machine Monitor (VMM). Any virtualized network herein may use or may interface virtual hardware. Any virtualization herein may include, may be based on, or may use, full virtualization, para-virtualization, or hardware assisted virtualization.

Any data identifying herein, such as an identifying of a URL or a URL request, may be based on, or may use extracting, using SSL sniffing.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

Some embodiments may be used in conjunction with various devices, network elements, and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16c, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

While the communication sessions between the elements herein, such as between servers and clients, are exampled to be over the Internet 113 using Internet Protocol (IP) or TCP/IP, any other communication protocols may be equally used, such as a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing Institute of Electrical and Electronics Engineers (IEEE) IEEE 802.11, 802.11a, 802.11b, 802.11g, 802.11k, 802.11n, 802.11r, 802.16, 802.16d, 802.16c, 802.20, 802.21 standards. For example, each of, or all of, the communication path 111*a* between the tunnel device #1 33*a* and the TB server 71, the communication path 111*b* between the tunnel device #2 33*b* and the TB server 71, the communication path 111*c* between the tunnel device #3 33*c* and the TB server 71, the communication path 111*d* between the tunnel device #4 33*d* and the TB server 71, and the communication path 111*e* between the tunnel device #5 33*e* and the TB server 71, may use any one of the protocols associated with a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing Institute of Electrical and Electronics Engineers (IEEE) IEEE 802.11, 802.11a, 802.11b, 802.11g, 802.11k, 802.11n, 802.11r, 802.16, 802.16d, 802.16c, 802.20, 802.21 standards. Similarly, each of, or all of, the communication path 121*a* between the client device 31*a* and the SP server 72, the communication path 131*a* between the SP server 72 and the TB server 71, the communication path 131*c* or 131*d* between the tunnel device #4 33*d* and the web server 22*b*, and the communication path 191 or 192 between the SP server 72 and the tunnel device #4 33*d*, may use a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing Institute of Electrical and Electronics Engineers (IEEE) IEEE 802.11, 802.11a, 802.11b, 802.11g, 802.11k, 802.11n, 802.11r, 802.16, 802.16d, 802.16c, 802.20, 802.21 standards.

As used herein, the terms “program”, “programmable”, and “computer program” are meant to include any sequence or human or machine cognizable steps which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the likes, as well as in firmware or other implementations. Generally, program modules include routines, programs, objects, components, data structures, etc., that performs particular tasks or implement particular abstract data types. The term “application program” (also referred to as ‘application’, ‘software application’, or ‘application software’) is used herein to include, but not limited to, a computer program designed to perform a specific function directly for a user, or for another application program. Application software is typically a set of one or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source, software. Most applications are designed to help people perform an activity.

The terms “task” and “process” are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. They may also be practiced in distributed computing environments where tasks are performed by remote processing devices that are linked through a communications network. In a distributed computing environment, program modules may be located in both local and remote memory storage devices.

As used herein, the terms ‘if’ and ‘whether’ may be construed to mean “when” or “upon” or “in response to determining” or “in response to detecting,” depending on the context. Similarly, the phrase “if it is determined” or “if [a stated condition or event] is detected” may be construed to mean “upon determining” or “in response to determining” or “upon detecting [the stated condition or event]” or “in response to detecting [the stated condition or event],” depending on the context.

Any interaction with a human, such as a human user of any device herein, may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

Any database herein, such as the Dedicated Database 345*c* or the Tunnel List 73, may be a relational database, a non-relational database, an object-oriented database, an object database, an entity-relationship model database, an associative database, XML database, or any combination thereof. Further non-limiting examples include SQL, PostgreSQL, MySQL, Oracle, DB2, and Sybase. In some embodiments, the database may be internet-based. Further, a database may be web-based, or a database may be a cloud computing-based.

Any of the arrangements or actions described herein (or any part thereof) may be implemented as a system, a method, and/or a computer program product. The computer program product may include a computer readable storage medium (or media) having computer readable program instructions thereon for causing a processor to carry out aspects of the present invention. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a Random Access Memory (RAM), a Read-Only Memory (ROM), an Erasable Programmable Read-Only Memory (EPROM or Flash memory), a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

For any method described herein, corresponding computer readable program instructions are envisioned which, when executed by a processor, cause the processor to perform as one of the elements involved in the method, such as the TB server 71, the SP server 72, or any one of the tunnel devices 33*a-e*, 421*a*, 422*a-b*, including when implemented as a dedicated box 341 and/or a dedicated box integrated with a communication device as the router 74*b*. Each actor of the method may have its corresponding set of instructions, which specifies the steps to be performed by the respective actor. Any computer readable program instructions described herein may be downloaded to respective computing/processing devices from a computer readable storage medium or to an external computer or external storage device via a network, for example, the Internet, a local area network, a wide area network and/or a wireless network. Any network herein may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network mentioned herein. In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects of the present invention.

Aspects of the various arrangements described herein with reference to flowchart illustrations and/or block diagrams of methods, apparatus (systems), and computer program products according to embodiments of the invention. Further, each block of the flowchart illustrations and/or block diagrams, and combinations of blocks in the flowchart illustrations and/or block diagrams, may be implemented by computer readable program instructions.

Any computer readable program instructions or steps herein may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implements aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implements the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any program described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for use with a web server that stores a content identified by a Uniform Resource Locator (URL), the method comprising:

receiving, by a first client device from a first server over the Internet, a first request that includes the URL;

extracting, by the first client device, the URL from the first request;

forming, by the first client device, a second request that includes the URL, or modifying the first request to obtain the second request;

sending, by the first client device to a second client device over the Internet, the second request;

receiving, by the second client device from the first client device over the Internet, the second request;

sending, by the second client device to the web server over the Internet, the received second request; and executing, by the first or second client device, a first web browser stored therein, wherein the sending the received second request to the web server uses an IP address of the second client device, so that an IP address of the first client device is unknown to the web server, and wherein, except for using the IP address of the second client device as a source address, the second client device transparently passes messages between the first client device and the web server, wherein the web server executes a web tracker that is based on, or comprises, fingerprinting, wherein the method further comprising modifying from a first fingerprint to a second fingerprint that is different from the first fingerprint using, or as part of the executing, the web browser, wherein the second request or the first client device is associated with the second fingerprint, and wherein the forming of the second request or the sending of the second request is part of the modifying.

2. The method according to claim 1, wherein the forming of the second request uses the first web browser, or is performed as part of the executing of the stored first web browser.

3. The method according to claim 1, wherein the executing or launching of the stored first web browser is in response to powering up of the first or second client device or in response to the connecting to the Internet.

4. The method according to claim 1, wherein the executing or launching of the stored first web browser is in response to the receiving of the first request.

5. The method according to claim 1, wherein the first web browser is exclusively used for the modifying from the first fingerprint to the second fingerprint.

6. The method according to claim 1, wherein the first or second client device further stores an operation system, and wherein the first web browser is part of, or integrated with, the operating system.

7. The method according to claim 1, further comprising downloading, from an application store, by a human user, the first web browser.

8. The method according to claim 1, wherein the first web browser consists of, comprises of, or is based on, Microsoft Internet Explorer, Google Chrome, Opera™, or Mozilla Firefox®.

9. The method according to claim 1, wherein the first web browser comprises, is based on, or consists of, mobile web browser.

10. The method according to claim 9, wherein the mobile web browser consists of, comprises of, or is based on, Safari, Opera Mini™, or Android web browser.

11. The method according to claim 1, wherein the first web browser comprises, is based on, or consists of, headless browser.

12. The method according to claim 1, wherein the first client device further stores a second web browser that is different from the first web browser, the method further comprising executing the stored second web browser.

13. The method according to claim 12, further comprising downloading, from an application store, by a human user, the second web browser.

14. The method according to claim 1, for use with a group of profiles, each of the profiles in the group is associated with a distinct respective fingerprint data, wherein a web tracker in the web server is configured to obtain the first fingerprint of the first client device, the method further comprising selecting a profile from the group, and using the fingerprint of the selected profile to be obtainable by the web tracker from the first client device, and wherein the forming of the second request or the sending of the second request uses, or is based on, the fingerprint of the selected profile.

15. The method according to claim 14, wherein one of the profiles in the group is associated with the first fingerprint.

16. The method according to claim 14, wherein the number of profiles in the group is at least 2, 3, 4, 5, 6, 7, 8, 10, 12, 15, 20, 25, 30, 50, 80, 100, 120, 150, 200, 500, 1,000, 2,000, 5,000, or 10,000 profiles, or less than 3, 4, 5, 8, 10, 12, 15, 20, 25, 30, 50, 80, 100, 120, 150, 200, 500, 1,000, 2,000, 5,000, 10,000 or 20,000 profiles.

17. The method according to claim 14, wherein at least one of the fingerprints of the group is associated with a real time user that was captured as part of normal operation of a device or a web browser.

18. The method according to claim 17, wherein most of, or all of, fingerprints of the group are associated with real time users that were captured as part of normal operation of one or more devices or web browsers.

19. The method according to claim 14, wherein a pair of two fingerprints from the group, two or more pairs of two fingerprints from the group, most of the pairs of two fingerprints from the group, or any one of the pairs of two fingerprints from the group, are different by one or more features, properties, characteristics, or attributes of the fingerprints.

20. The method according to claim 19, wherein the one or more pairs of two fingerprints are different in values that are part of browser fingerprinting, canvas fingerprinting, canvas font fingerprinting, webRTC fingerprinting, audiocontext fingerprinting, cross-browser fingerprinting, or any combination thereof.

21. The method according to claim 19, wherein the one or more pairs of two fingerprints are different in values type, version, characteristics, or configuration, of a software application, of a hardware component, or of user configuration of the hardware component or the software application, that is installed or used in the first or second client device.

22. The method according to claim 19, wherein the one or more pairs of two fingerprints are different in passive fingerprinting, active fingerprinting, cookie-like fingerprinting, or any combination thereof, or wherein the one or more pairs of two fingerprints are different in Open Systems Interconnection (OSI) model Layer-2 feature or property, OSI Layer-3 feature or property, OSI Application Layer feature or property, OSI Session Layer feature or property, or any combination thereof.

23. The method according to claim 14, wherein at least one of the profiles in the group comprises a web browser.

24. The method according to claim 23, wherein the group of profiles include at least 2, 3, 4, 5, 6, 7, 8, 10, 12, 15, 20, 25, 30, 50, 80, or 100 similar or different web browsers, or less than 3, 4, 5, 8, 10, 12, 15, 20, 25, 30, 50, 80, 100, 120, 150, or 200 similar or different web browsers.

25. The method according to claim 24, wherein at least 2, 3, 4, 5, 6, 7, 8, 10, 12, 15, 20, 25, 30, 50, 80, or 100 profiles include the same web browser, or wherein less than 3, 4, 5, 8, 10, 12, 15, 20, 25, 30, 50, 80, 100, 120, 150, or 200 profiles include the same web browser.

26. The method according to claim 24, wherein two profiles that include the same web browser include different settings, different configurations, different user profiles, or different cookies or history, or any combination thereof.

27. The method according to claim 23, wherein two or more profiles include the same web browser.

28. The method according to claim 23, wherein at least two of the profiles comprise two distinct web browsers.

29. The method according to claim 28, wherein the two web browsers are of different types, from different vendors, are different versions or updates of the same type and vendor, or any combination thereof.

30. The method according to claim 14, wherein the selecting of the profile is in response to the receiving of the first request.

31. The method according to claim 14, wherein the selecting of the profile is in response to the URL, a domain in the first request, a web-page in the first request, a web-site in the first request, or any combination thereof.

32. The method according to claim 14, wherein the selecting of the profile is based on the time of the selecting or is time-based.

33. The method according to claim 14, further comprising periodically selecting a respective profile from the group, and using the fingerprint of the respectively selected profile to be obtainable by the web tracker from the first client device.

34. The method according to claim 33, wherein a time period of the periodic selection is at least 1, 2, 5, 8, 10, 12, 15, 20, 25, 30, 50, 80, 100, 120, 150, 200, 500, 1,000, 2,000, 5,000, or 10,000 milliseconds, seconds, minutes, or hours, or wherein the time period is less than 2, 3, 4, 5, 8, 10, 12, 15, 20, 25, 30, 50, 80, 100, 120, 150, 200, 500, 1,000, 2,000, 5,000, 10,000 or 20,000 milliseconds, seconds, minutes, or hours.

35. The method according to claim 33, wherein the selecting is based on a calendar time.

36. The method according to claim 35, wherein the selecting is based on a calendar month, a week, a day of the week, an hour of a day, a minute in an hour, or any combination thereof.

37. The method according to claim 33, wherein the selecting uses, or is based on, an action or an event that is external to, and sensed by, the first client device.

38. The method according to claim 33, wherein the selecting uses, or is based on, load balancing, or wherein the selecting uses, or is based on, random, quazi-random, or deterministic selection.

39. The method according to claim 33, wherein the selecting uses, or is based on, random selecting that uses one or more random numbers generated by a random number generator.

40. The method according to claim 39, wherein the random number generator is hardware-based that uses, or is based on, thermal noise, shot noise, nuclear decaying radiation, photoelectric effect, or quantum phenomena.

41. The method according to claim 39, wherein the random number generator is software-based that uses, or is based on, executing an algorithm for generating pseudo-random numbers.

42. The method according to claim 33, wherein the profiles are arranged in a sequence in the group, and wherein the selecting is based on, or uses, sequential selection, cyclic selection, Last-In-First-Out (LIFO), First-In-First-Out (FIFO) scheme, or any combination thereof.

43. The method according to claim 1, for use with a group of profiles, each of the profiles in the group is associated with a distinct respective fingerprint data, wherein a web tracker in the web server is configured to obtain a first fingerprint of the first client device, the method further comprising selecting a first profile from the group, and using the fingerprint of the selected first profile to be obtainable by the web tracker from the first client device, and wherein the forming of the second request or the sending of the second request uses, or is based on, the fingerprint of the selected profile.

44. The method according to claim 43, further comprising:

receiving, by the first client device from the web server, a first response, in response to the sending of the second request;

checking for determining whether the first response comprises, is based on, or consists of, proper response that comprises the content; and responsive to determining that the first response is not a proper response:

selecting and using a second profile from the group; and sending, by the first client device to the web server, a third request that includes the URL and uses, or is based on, a fingerprint associated with the second profile, wherein the sending of the received content by the first client device to the first client device is in response to determining that the first response comprises, is based on, or consists of, proper response.

45. The method according to claim 44, wherein the checking of the first response comprises identifying and checking a HTTP status code that is received in response to a sending of the second request.

46. The method according to claim 45, wherein the first response is determined as a proper response responsive to a status code of 2xx.

47. The method according to claim 45, wherein the first response is determined as not being a proper response responsive to a status code of 4xx or 5xx.

48. The method according to claim 45, wherein the first response is determined as not being a proper response responsive to a status code of HTTP 404 error message.

49. The method according to claim 45, wherein the checking of the first response comprises using a timeout mechanism.

50. The method according to claim 45, wherein the checking comprises checking if an URL redirection is identified in the first response, and wherein the first response is determined as not being a proper response in response to detecting the URL redirection.

51. The method according to claim 50, wherein the URL redirection is identified by checking that the HTTP status code is 3xx Redirection.

52. The method according to claim 45, for use with a criterion, wherein the checking of the first response comprises verifying if the content received in the first response satisfy the criterion.

53. The method according to claim 52, wherein the criterion relates to a feature, characteristic, or type, of the content.

54. The method according to claim 52, wherein the criterion comprises a value, and wherein the first response is determined as not being a proper response in response to comparing to the value a feature, characteristic, or type in the content received in the first response received.

55. The method according to claim 54, wherein the criterion comprises a value of a size of a file, and wherein the first response is determined as not being a proper response in response to comparing to the value the size of the received content in the first response.

56. The method according to claim 44, wherein the response is determined as not being a proper response in response to not receiving any response after elapsed defined time period after the sending of the second request.

57. The method according to claim 1, wherein the first or second client device comprises, or consists of, or is integrated with, a client device in a client/server architecture.

58. The method according to claim 57, wherein the client device comprises, consists of, or is based on, a consumer computer that is owned, operated, or used, by a user for a personal, social, family, or household use.

59. The method according to claim 1, further comprising storing, operating, or using, by the first or second client device, a client operating system.

60. The method according to claim 59, wherein the client operating system consists of, comprises, or is based on, one out of Microsoft Windows 7, Microsoft Windows XP, Microsoft Windows 8, Microsoft Windows 8.1, Linux, and Google Chrome OS.

61. The method according to claim 59, wherein the client operating system comprises, is based on, or consists of, a Real-Time Operating System (RTOS).

62. The method according to claim 61, wherein the RTOS comprises FreeRTOS, SafeRTOS, QNX, VxWorks, or Micro-Controller Operating Systems (μC/OS).

63. The method according to claim 59, wherein the client operating system comprises, is based on, or consists of, a mobile operating system.

64. The method according to claim 63, wherein the mobile operating system is based on, or comprises, Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

65. The method according to claim 1, wherein the first or second client device is housed in a single enclosure that comprises, is based on, or consists of, a hand-held enclosure or a portable enclosure.

66. The method according to claim 65, wherein the first or second client device consists of, comprises, is part of, or is integrated with, a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone.

67. The method according to claim 66, wherein the first or second client device consists of, comprises, is part of, or is integrated with, a smartphone that comprises, or is based on, an Apple iphone 6 or a Samsung Galaxy S6.

68. The method according to claim 1, wherein the first server comprises, is based on, or consists of, a dedicated device that manages network resources; is not a client device and is not a consumer device; is continuously online with greater availability and maximum up time to receive requests almost all of the time efficiently processes multiple requests from multiple client devices at the same time; generates various logs associated with the client devices and traffic from/to the client devices; primarily interfaces and responds to requests from client devices; has greater fault tolerance and higher reliability with lower failure rates; provides scalability for increasing resources to serve increasing client demands; or any combination thereof.

69. The method according to claim 1, wherein the first server is storing, operating, or using, a server operating system.

70. The method according to claim 69, wherein the server operating system consists or, comprises of, or based on, one out of Microsoft Windows Server®, Linux, or UNIX.

71. The method according to claim 69, wherein the server operating system consists or, comprises of, or based on, one out of Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®.

72. The method according to claim 1, wherein the first server consists of, includes, is part of, or is integrated with, a proxy server.

73. The method according to claim 72, wherein the proxy server consists of, includes, is part of, or is integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a Socks proxy server, a CGI web proxy server, a suffix proxy server, an I2P anonymous proxy server, a DNS proxy server, or any combination thereof.

74. The method according to claim 1, wherein the first server is virtualized virtualization executed as part of a Virtual Machine (VM).

75. The method according to claim 74, for use with a host computer that implements the VM, wherein the method further comprising executing, by the host computer, a hypervisor or a Virtual Machine Monitor (VMM).

76. The method according to claim 74, wherein the virtualization includes, is based on, or uses, full virtualization, para-virtualization, or hardware assisted virtualization.

77. The method according to claim 1, wherein the first server comprises, is based on, or consists of, a cloud-based server that is implemented as an Infrastructure as a Service (IaaS) or as a Software as a Service (Saas) by a public cloud-based service.

78. The method according to claim 77, wherein the public cloud-based service is provided by Amazon Web Services® (AWS®), Microsoft® Azure™, or Google® Compute Engine™ (GCP).

79. The method according to claim 1, wherein the first or second client device is integrated in part or entirely in an appliance.

80. The method according to claim 79, wherein a primary functionality of the appliance is associated with food storage, handling, or preparation.

81. The method according to claim 80, wherein a primary function of the appliance is heating food, and wherein the appliance comprises, is based on, or consists of, a microwave oven, an electric mixer, a stove, an oven, or an induction cooker.

82. The method according to claim 80, wherein the appliance on, or consists of, a comprises, is based refrigerator, a freezer, a food processor, a dishwasher, a food blender, a beverage maker, a coffeemaker, or an iced-tea maker.

83. The method according to claim 79, wherein a primary function of the appliance is associated with environmental control, and the appliance consists of, or is part of, an HVAC system.

84. The method according to claim 83, wherein a primary function of the appliance is associated with temperature control, and wherein the appliance comprises, is based on, or consists of, an air conditioner or a heater.

85. The method according to claim 79, wherein a primary function of the appliance is associated with cleaning, wherein the primary function is associated with clothes cleaning, and the appliance comprises, is based on, or consists of, a washing machine or a clothes dryer, or wherein the appliance comprises, is based on, or consists of, a vacuum cleaner.

86. The method according to claim 79, wherein a primary function of the appliance is associated with water control or water heating.

87. The method according to claim 79, wherein the appliance comprises, is based on, or consists of, an answering machine, a telephone set, a home cinema method, a HiFi method, a CD or DVD player, an electric furnace, a trash compactor, a smoke detector, a light fixture, or a dehumidifier.

88. The method according to claim 79, wherein the appliance comprises, is based on, or consists of, a battery-operated portable device, electronic and the appliance comprises, is based on, or consists of, a notebook, a laptop computer, a media player, a cellular phone, a Personal Digital Assistant (PDA), an image processing device, a digital camera, a video recorder, or a handheld computing device.

89. The method according to claim 79, wherein the integration involves sharing a component.

90. The method according to claim 89, wherein the integration involves housing in same enclosure, sharing same processor, or mounting onto same surface.

91. The method according to claim 89, wherein the integration involves sharing a same connector.

92. The method according to claim 91, wherein the connector comprises, is based on, or consists of, a power connector for connecting to a power source, and wherein the integration involves sharing the same connector for being powered from same power source, or wherein the integration involves sharing same power supply.

93. The method according to claim 1, wherein the first or second client device, consists of, comprises, is integrated with, or is part of, a wearable device that wearable on a person.

94. The method according to claim 93, wherein the wearable device is wearable on an organ of the person head.

95. The method according to claim 94, wherein the organ comprises, is based on, or consists of, an eye, ear, face, cheek, nose, mouth, lip, forehead, or chin.

96. The method according to claim 93, wherein the wearable device is constructed to have a form substantially similar to, is constructed to have a shape allowing mounting or wearing identical or similar to, or is constructed to have a form to at least in part substitute for, headwear, eyewear, or earpiece.

97. The method according to claim 96, wherein the headwear consists of, structured as, or comprises, a bonnet, a cap, a crown, a fillet, a hair cover, a hat, a helmet, a hood, a mask, a turban, a veil, or a wig.

98. The method according to claim 96, wherein the eyewear consists of, structured as, or comprises, glasses, sunglasses, a contact lens, a blindfold, or a goggle.

99. The method according to claim 96, wherein the earpiece consists of, structured as, or comprises, a hearing aid, a headphone, a headset, or an earplug.

100. The method according to claim 93, wherein the wearable device is shaped for permanently or releasably being attachable to, or be part of, a clothing piece of a person.

101. The method according to claim 100, wherein the attaching uses taping, gluing, pinning, enclosing, encapsulating, a pin, or a latch and hook clip.

102. The method according to claim 101, wherein the clothing piece comprises, is based on, or consists of, a top, bottom, or full-body underwear, or a headwear, a footwear, an accessory, an outwear, a suit, a dress, a skirt, or a top.

103. The method according to claim 93, wherein the wearable device further comprises an annular member defining an aperture therethrough that is sized for receipt therein of a part of a human body.

* * * * *